(12) United States Patent
Takahashi

(10) Patent No.: US 12,034,341 B2
(45) Date of Patent: Jul. 9, 2024

(54) ROTATING ELECTRICAL MACHINE

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 17/409,340

(22) Filed: Aug. 23, 2021

(65) Prior Publication Data

US 2021/0384784 A1  Dec. 9, 2021

Related U.S. Application Data

(63) Continuation of application No. PCT/JP2020/005152, filed on Feb. 10, 2020.

(30) Foreign Application Priority Data

Feb. 22, 2019  (JP) .................................. 2019-031058

(51) Int. Cl.
*H02K 1/2791* (2022.01)
*H02K 21/22* (2006.01)

(52) U.S. Cl.
CPC ........... *H02K 1/2791* (2022.01); *H02K 21/22* (2013.01)

(58) Field of Classification Search
CPC ...... H02K 1/2791; H02K 21/22; H02K 1/276; H02K 2213/03; H02K 3/04
See application file for complete search history.

(56) References Cited

U.S. PATENT DOCUMENTS

| | | |
|---|---|---|
| 2011/0285243 A1 | 11/2011 | Taniguchi |
| 2014/0361646 A1* | 12/2014 | Saito .................. H02K 3/28 310/51 |
| 2015/0115758 A1* | 4/2015 | Koka .................. H02K 21/14 318/139 |
| 2020/0161939 A1 | 5/2020 | Takahashi et al. |

FOREIGN PATENT DOCUMENTS

| | | |
|---|---|---|
| JP | H06-070522 A | 3/1994 |
| JP | 2012-029540 A | 2/2012 |
| JP | 2019-024297 A | 2/2019 |

OTHER PUBLICATIONS

Apr. 7, 2020 International Search Report issued in International Patent Application No. PCT/JP2020/005152.

* cited by examiner

*Primary Examiner* — Christopher M Koehler
*Assistant Examiner* — Riley Owen Stout
(74) *Attorney, Agent, or Firm* — Oliff PLC

(57) ABSTRACT

A rotating electrical machine includes a magnetic field-producing unit and an armature. A magnet unit is equipped with a plurality of magnets arranged adjacent each other in a circumferential direction. Each of the magnets is magnetically oriented to have an easy axis of magnetization which is aligned near a d-axis that is defined on a center of the magnetic pole to be more parallel to the d-axis than an easy axis of magnetization near a q-axis that is defined on a boundary between the magnetic poles. An armature winding includes conductive members which face the magnetic field-producing unit and are arranged at a given interval away from each other in the circumferential direction. Each of the magnets has an end surface which faces in the circumferential direction and is placed in direct contact with an end surface of a circumferentially adjacent one of the magnets.

1 Claim, 126 Drawing Sheets

COMPARATIVE EXAMPLE

VEHICLE INSIDE ⟵ ⟶ VEHICLE OUTSIDE

OUTER LAYER

INNER LAYER

DC MAGNETIZATION CURVE
DC PERMEABILITY CURVE

MAGNETIZING FORCE (A/m)

FIG.146(a)
FIG.146(b)
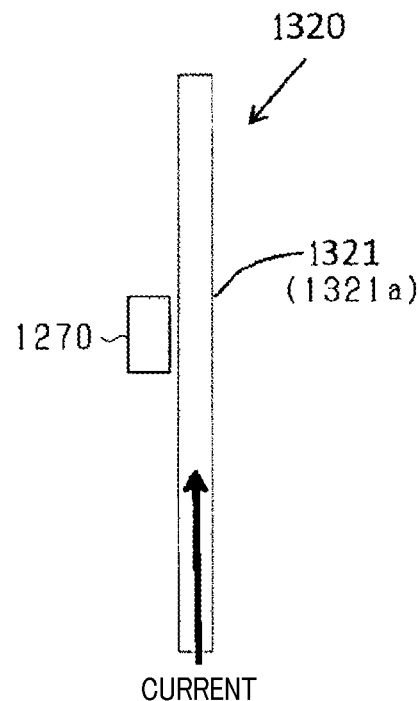
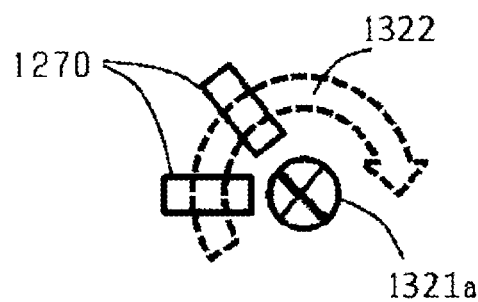
FIG.147
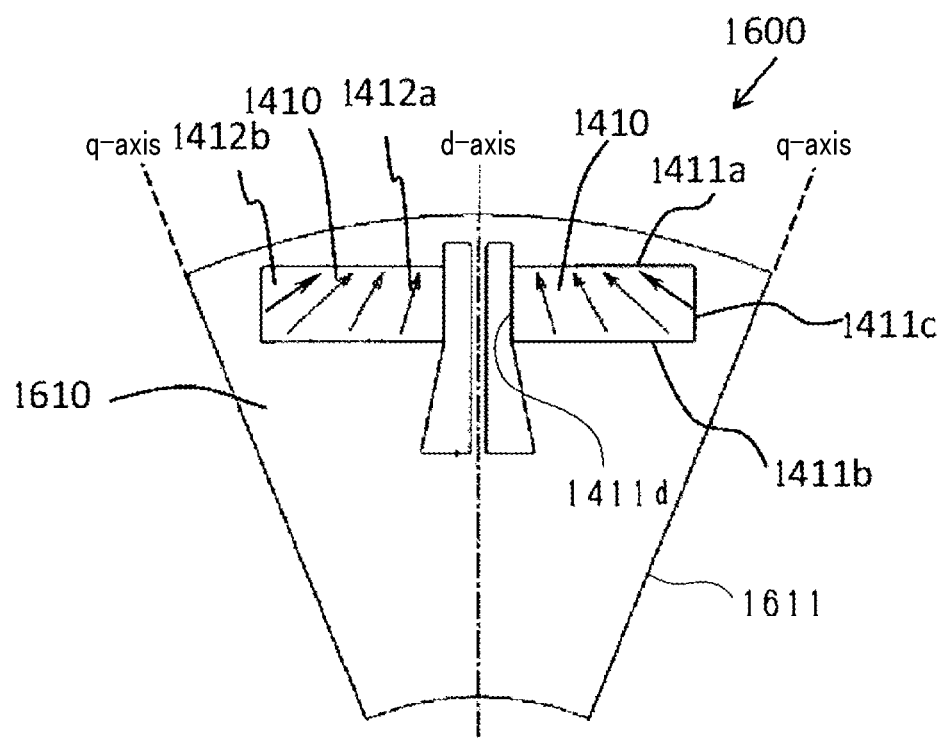

U-PHASE

V-PHASE

W-PHASE

ROTATING ELECTRICAL MACHINE

CROSS REFERENCE TO RELATED DOCUMENT

The present application claims the benefit of priority of Japanese Patent Application No. 2019-031058 filed on Feb. 22, 2019, the disclosure of which is incorporated in its entirety herein by reference.

TECHNICAL FIELD

This disclosure in this application relates generally to a rotating electrical machine.

BACKGROUND ART

IPM (Interior Permanent Magnet) rotors in which a rotating core which is made of a stack of magnetic steel plates has formed therein magnet housing holes in which magnets are disposed are becoming widely used in rotating electrical machines. Apart from the IPM rotors, SPM (Surface Permanent Magnet) rotors are also proposed as rotor for use in rotating electrical machines (for example, Patent Literatures 1 and 2).

PRIOR ART DOCUMENTS

Patent Literatures

PATENT LITERATURE 1 Japanese Patent First Publication No. 2011-250508
PATENT LITERATURE 2 Japanese Patent First Publication No. 1994-70522

SUMMARY OF THE INVENTION

The above type of rotating electrical machine is required to be streamlined and reduced in size thereof. There is still room for technical improvement for meeting these requirements.

This disclosure was made in view of the above problems. It is an object of this disclosure to provide a rotating electrical machine which is capable of being streamlined and reduced in size thereof.

A means for solving the above problems is a rotating electrical machine which comprises: (a) a magnetic field-producing unit which includes a magnet unit, the magnet unit being equipped with a plurality of magnetic poles arranged to have magnetic polarities located alternately in a circumferential direction of the magnetic field-producing unit; (b) an armature which is equipped with a multi-phase winding; and (c) a rotor which is implemented by one of the magnetic field-producing unit and the armature. The magnet unit includes a plurality of magnets which are arranged in the circumferential direction. The magnet unit is magnetically oriented to have an easy axis of magnetization in a region which is located near a d-axis that is defined on a center of the magnetic pole to be more parallel to the d-axis than an easy axis of magnetization in a region located near a q-axis that is defined on a boundary between the magnetic poles. The armature winding includes conductive members which face the magnetic field-producing unit and are arranged at a given interval away from each other in the circumferential direction. The armature includes inter-conductor members each of which is disposed between a respective adjacent two of the conductive members in the circumferential direction. Defining a total width of the inter-conductor members arranged within one of the magnetic poles in the circumferential direction as Wt, a saturation magnetic flux density of the inter-conductor members as Bs, a dimension of a portion of the magnet unit equivalent to one of the magnetic poles in the circumferential direction of the magnet unit as Wm, and a remanent flux density in the magnet unit as Br, either the inter-conductor members are made of material meeting a relation of Wt×Bs≤Wm×Br or non-magnetic material or no inter-conductor members alternatively exist between the conductive members. Each of the magnets has an end surface which faces in the circumferential direction and is placed in direct contact with an end surface of a circumferentially adjacent one of the magnets.

BRIEF DESCRIPTION OF THE DRAWINGS

The above described object, and other objects, features, or beneficial advantages in this disclosure will be apparent from the appended drawings or the following detailed discussion.

In the drawings.

Figure 142A:
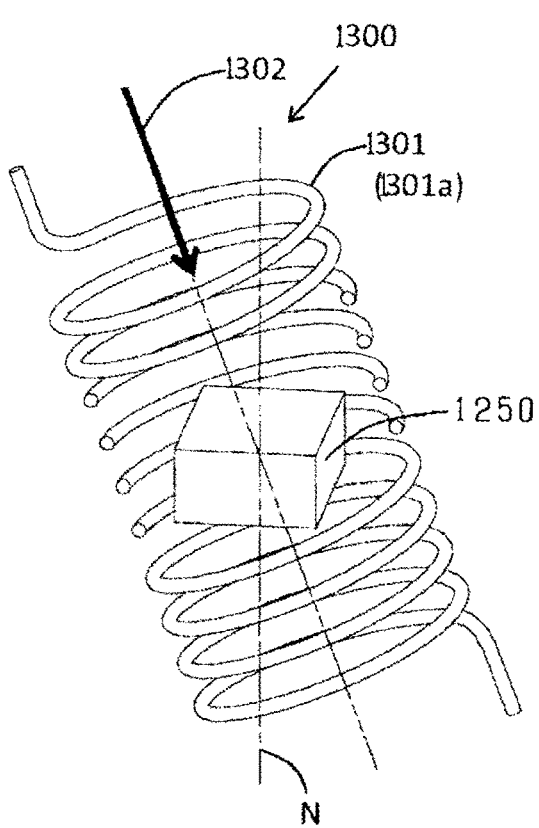
Figure 142B:
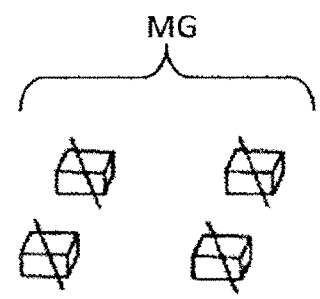

FIGS. 142(a) and 142(b) are views for explaining magnetic orientation process for a magnet.

Figure 143A:
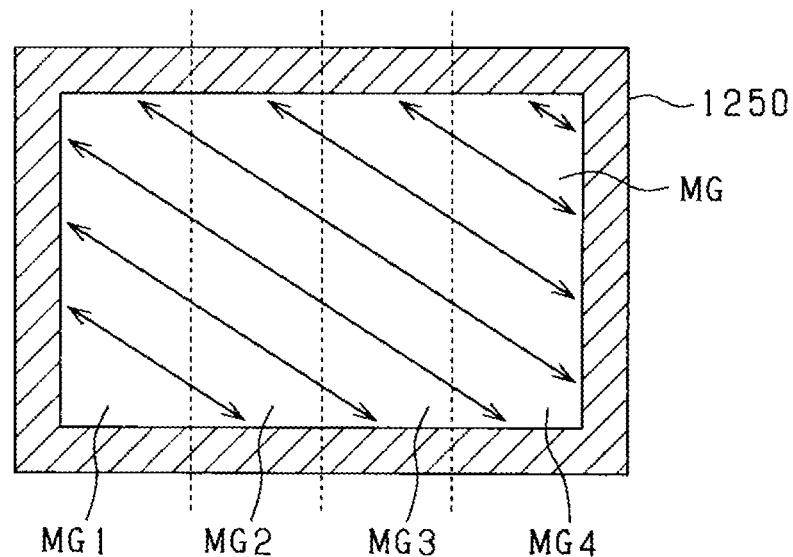
Figure 143B:
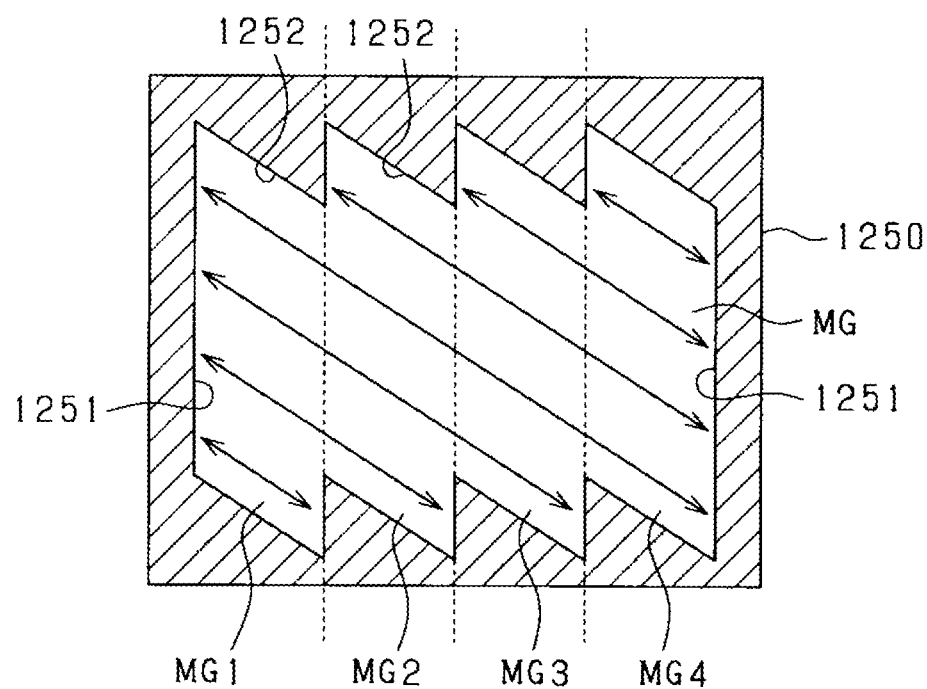

FIGS. 143(a) and 143(b) are sectional views which illustrate a die and a magnet in the die.

Figure 144A:
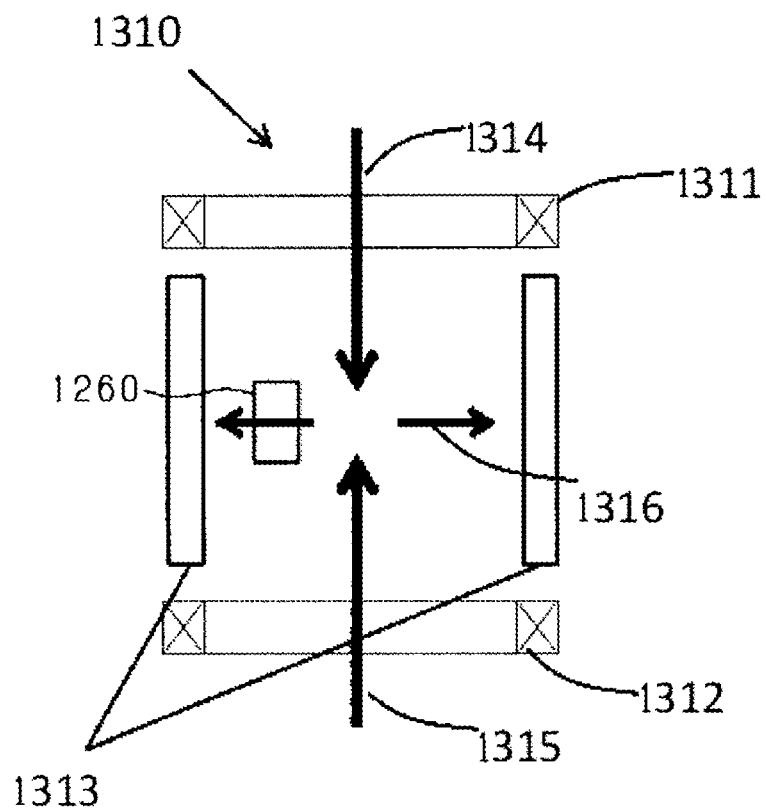
Figure 144B:
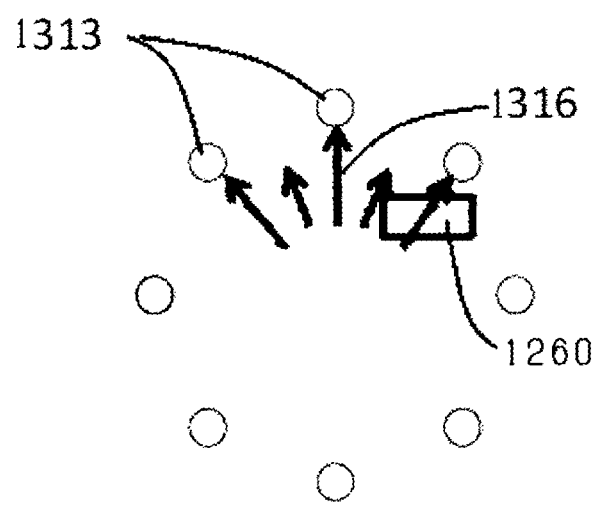

FIGS. 144(a) and 144(b) are views for explaining a magnetic orientation process for a magnet.

Figure 145A:
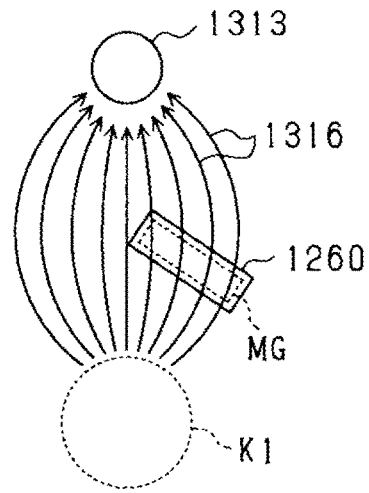
Figure 145B:
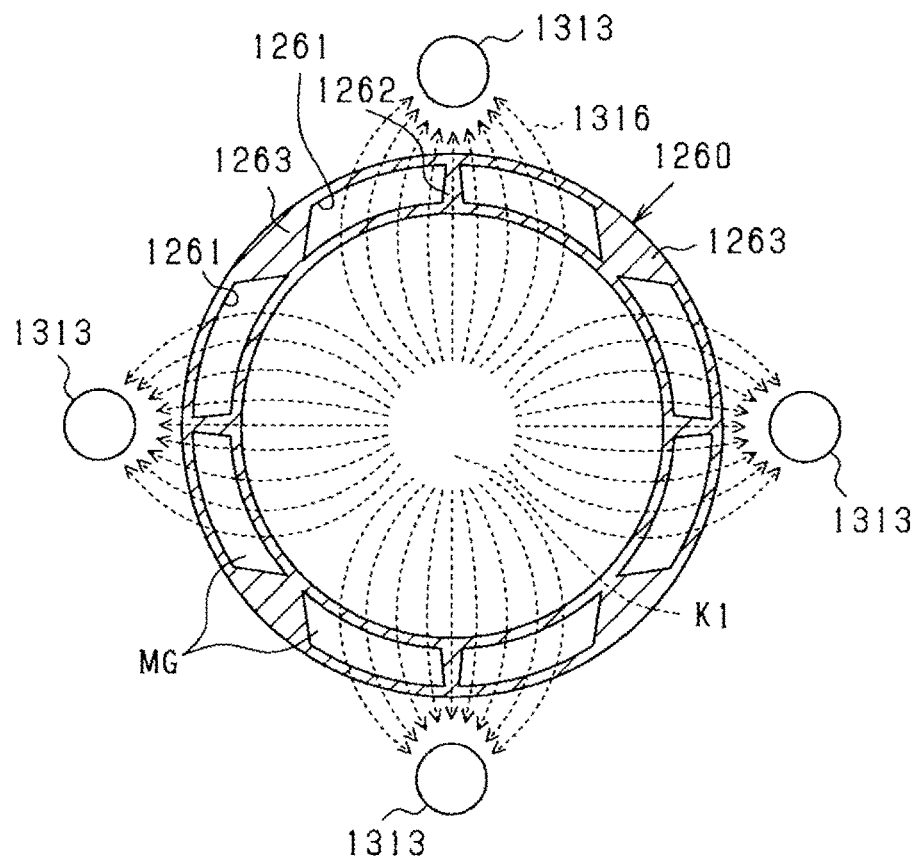

FIGS. 145(a) and 145(b) are views which illustrate magnetic orientations for a magnet.

FIGS. 146(a) and 146(b) are views for explaining a magnetic orientation process for a magnet.

FIG. 147 is a partial plan view which illustrates a structure of a rotor in the ninth embodiment.

Figure 148:
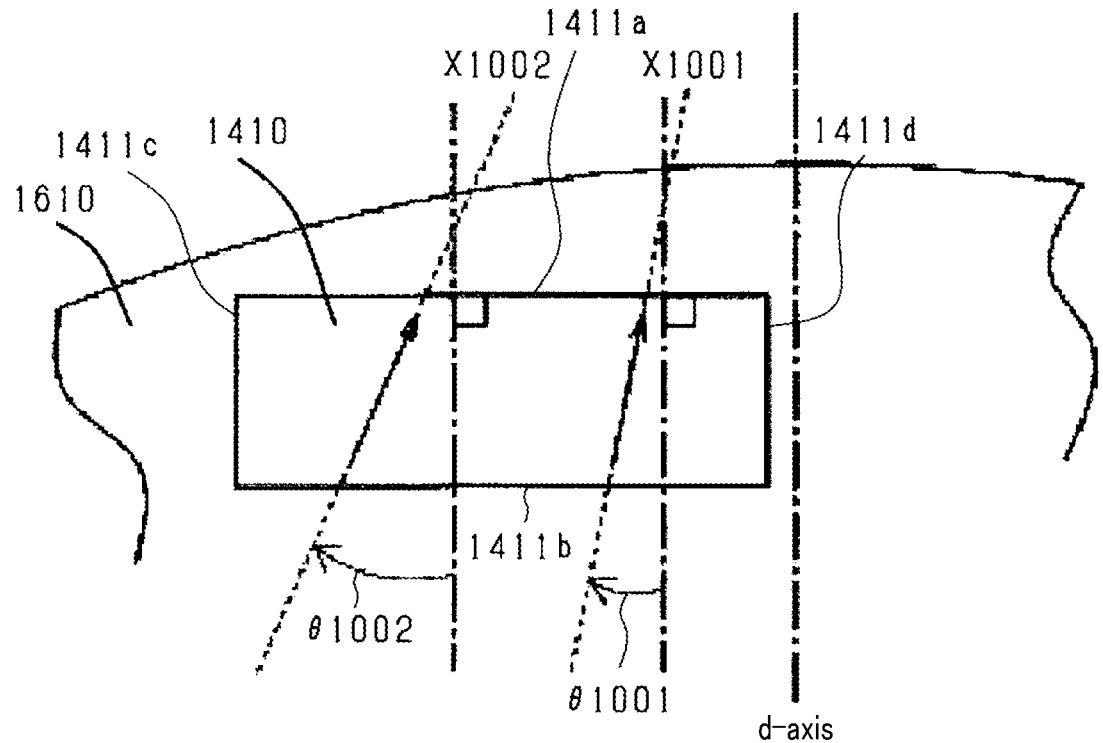

FIG. 148 is a view which illustrates directions of magnetic orientation of a magnet.

Figure 149:
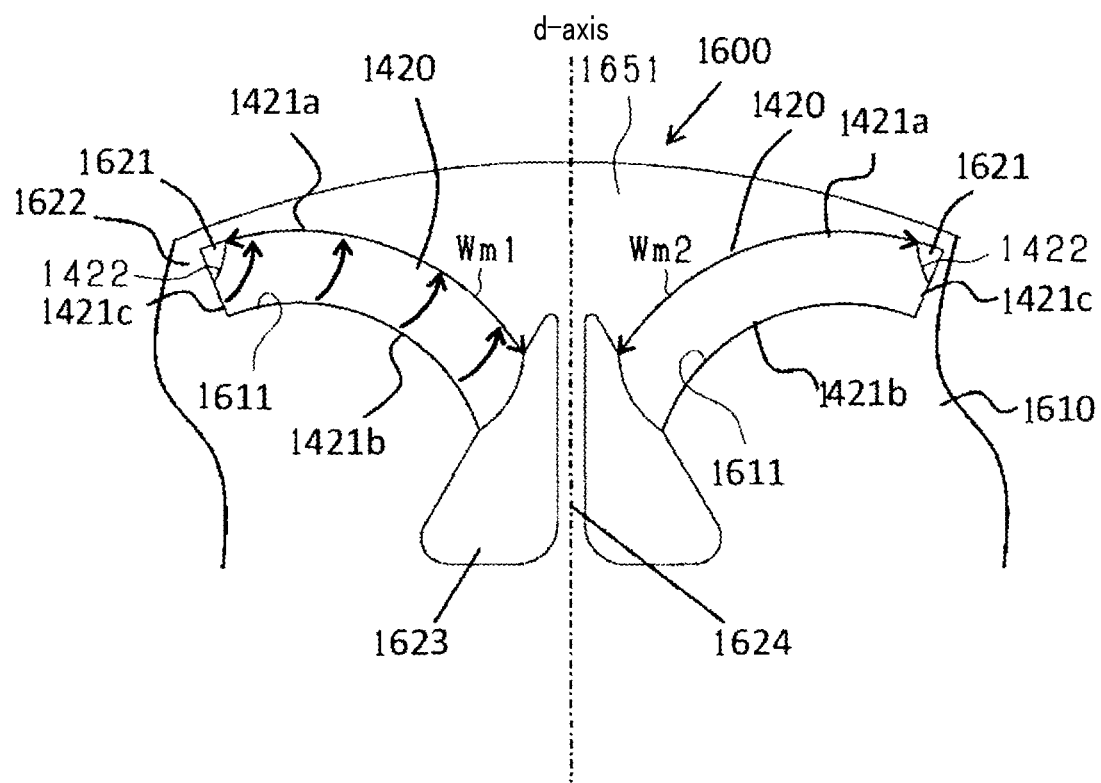

FIG. 149 is a plan view which illustrates a structure of a rotor according to the tenth embodiment.

Figure 150:
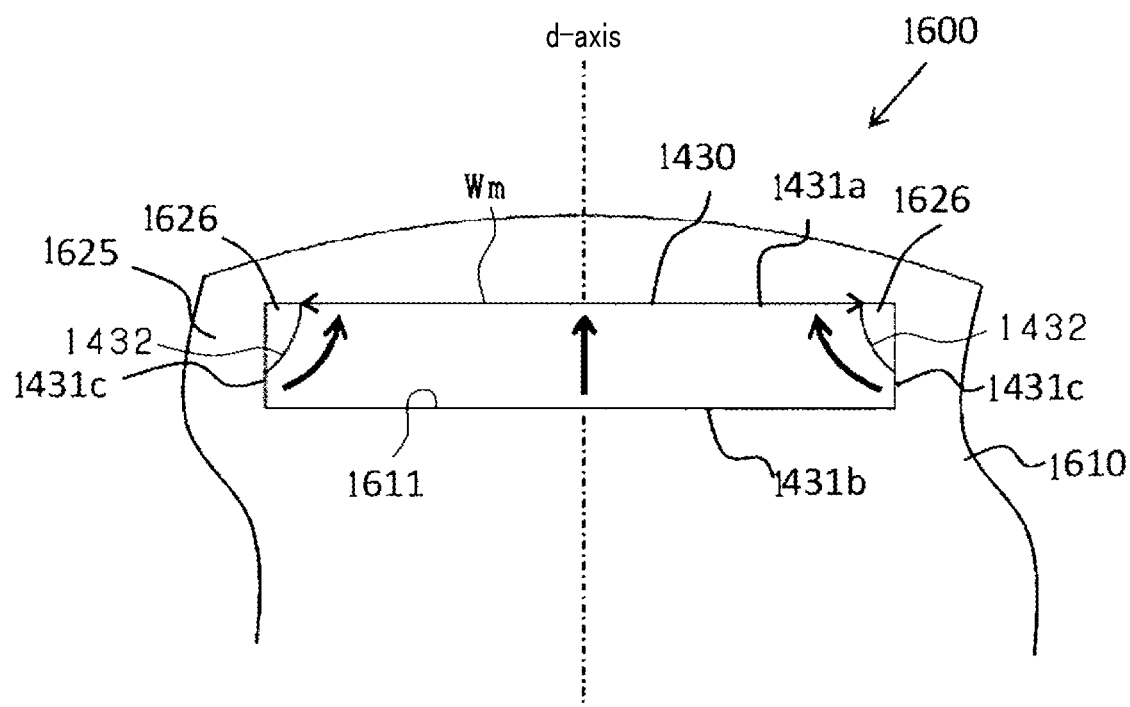

FIG. 150 is a partial plan view which shows a structure of a rotor in the eleventh embodiment.

Figure 151:
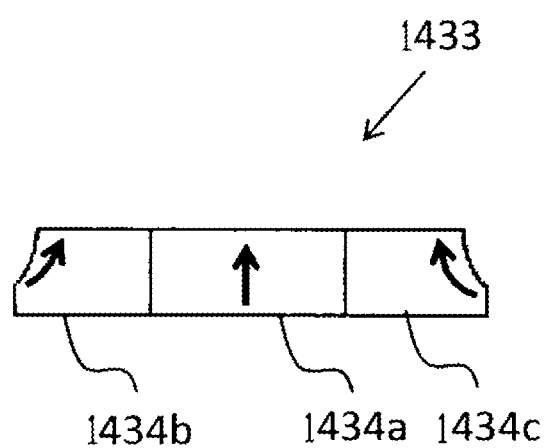

FIG. 151 is a view which illustrates a partially modified structure of a magnet.

Figure 152A:
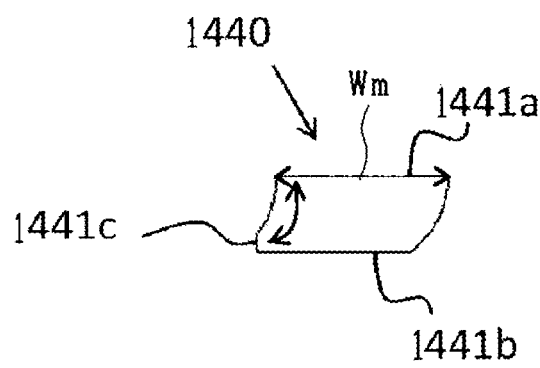
Figure 152B:
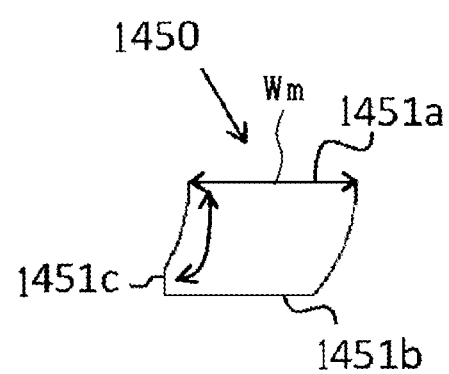

FIGS. 152(a) and 152(b) are transverse sectional views which illustrate a structure of a magnet in the twelfth embodiment.

Figure 153A:
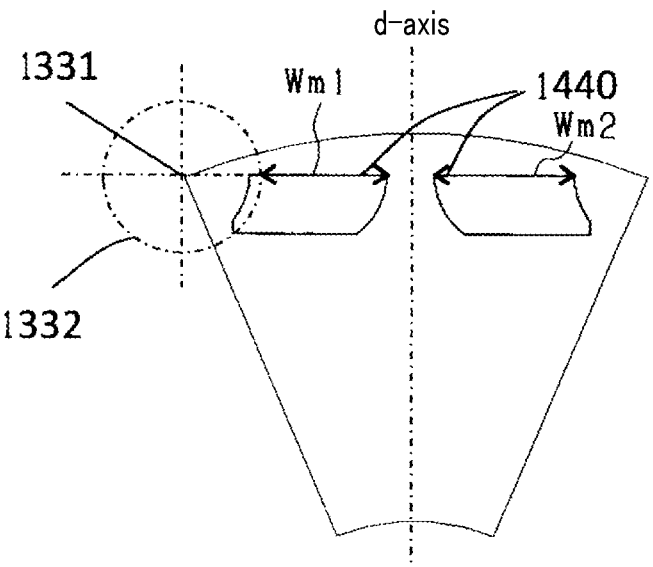
Figure 153B:
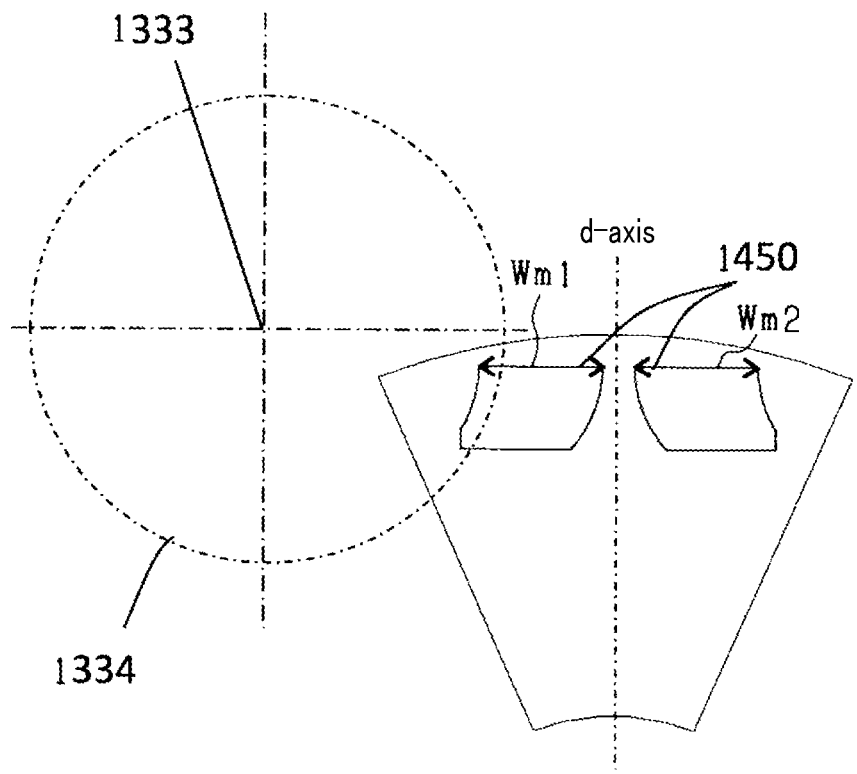

FIGS. 153(a) and 153(b) are views for additionally explaining directions of magnetic orientation of a magnet.

Figure 154A:
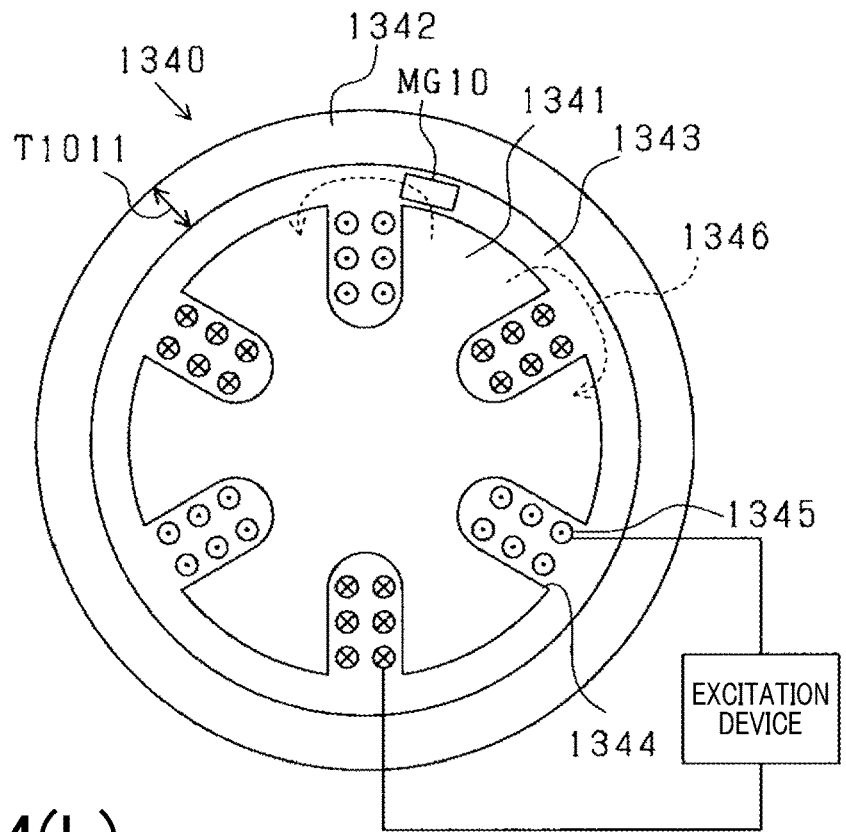
Figure 154B:
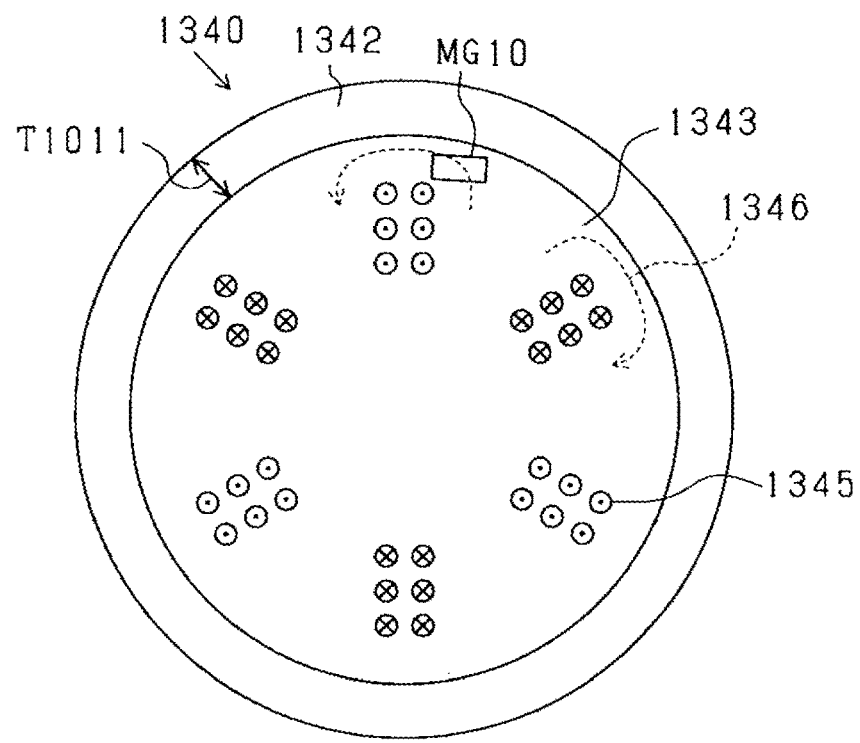

FIGS. 154(a) and 154(b) are views which illustrate schematic structures of a magnetizing device in the thirteenth embodiment.

Figure 155:
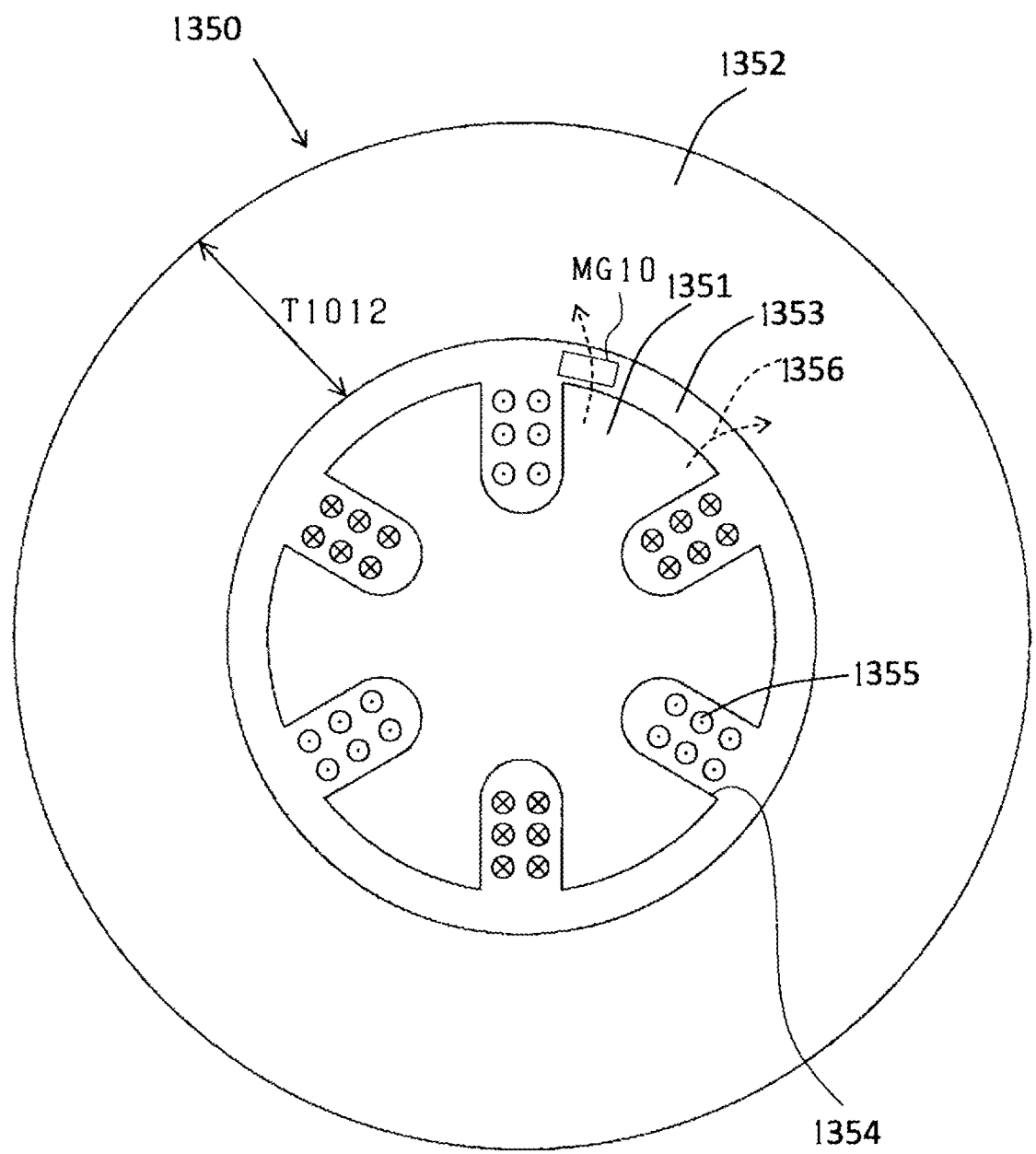

FIG. 155 is a view which illustrates a schematic structure of a magnetizing device according to the thirteenth embodiment.

Figure 156:
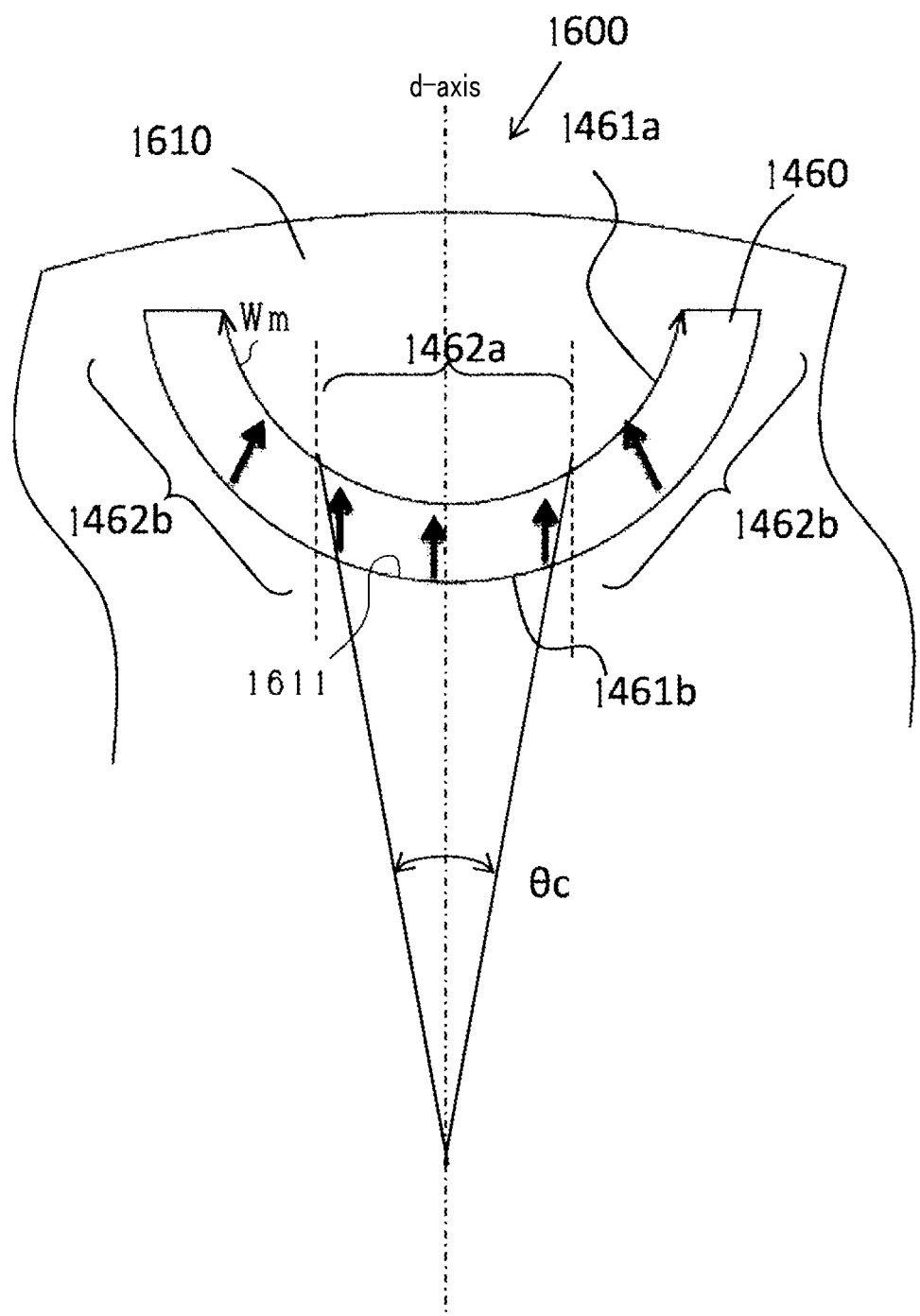

FIG. 156 is a plan view which illustrates a structure of a rotor according to the fourteenth embodiment.

Figure 157:
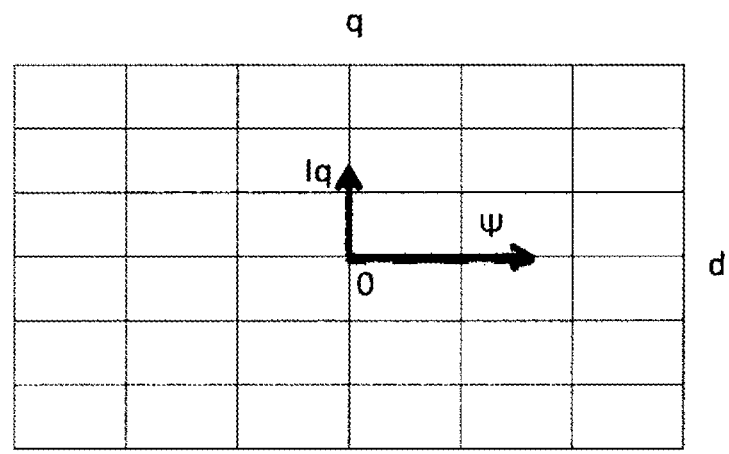

FIG. 157 is a view which illustrates voltage vectors on a d-axis and a q-axis.

Figure 158:
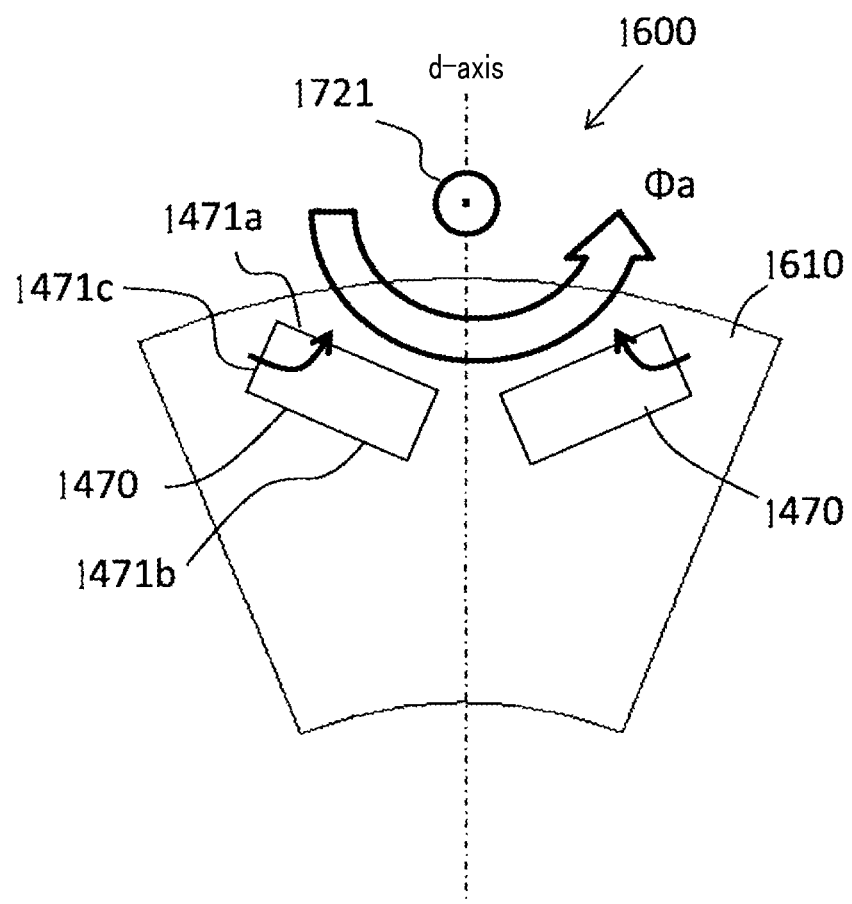

FIG. 158 is a view which illustrates a rotating magnetic field oriented perpendicular to a d-axis.

Figure 159A:
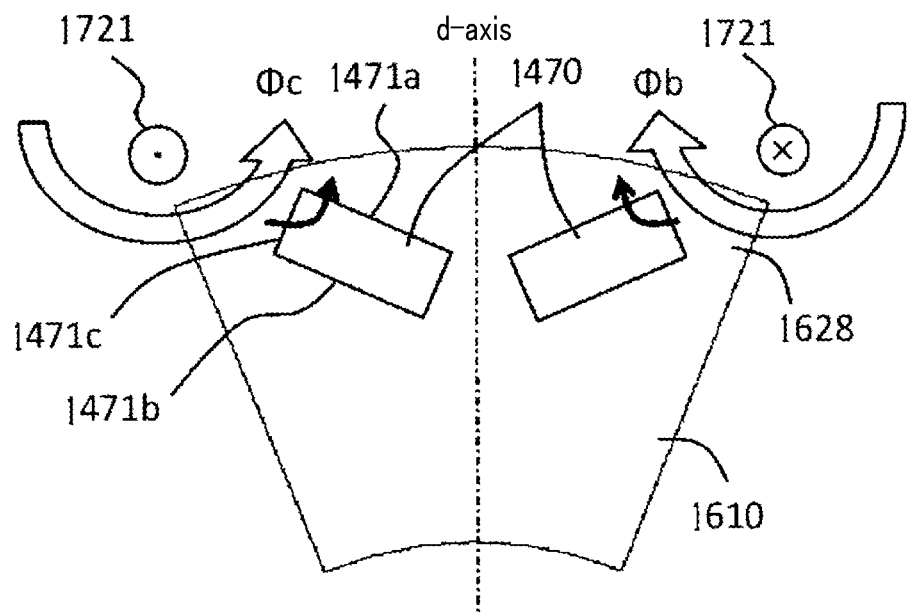
Figure 159B:
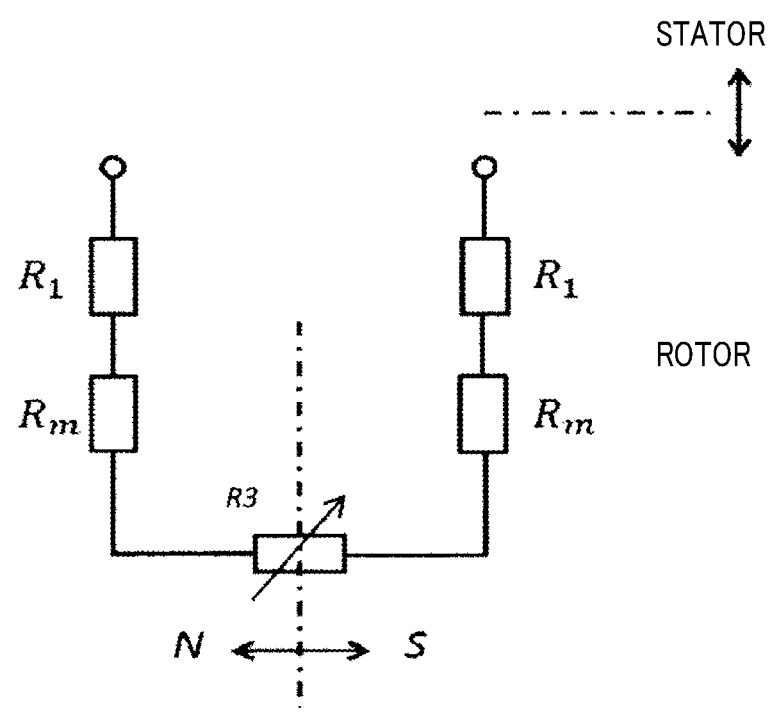

FIGS. 159(a) and 159(b) are views which illustrate a rotating magnetic field oriented perpendicular to a q-axis.

Figure 160:
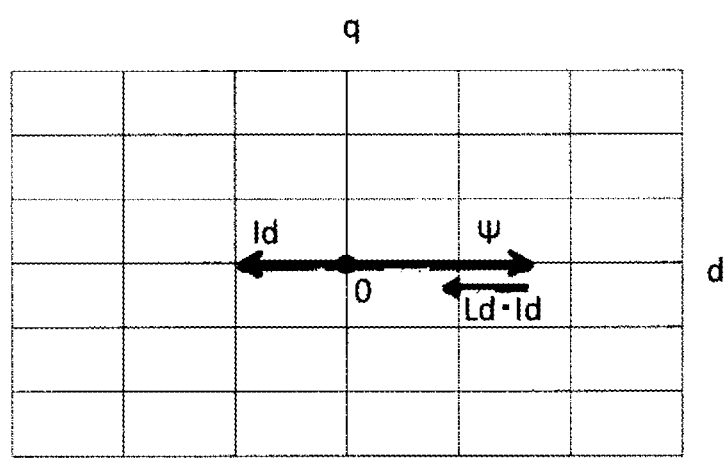

FIG. 160 is a view which represents voltage vectors on a d-axis and a q-axis.

Figure 161A:
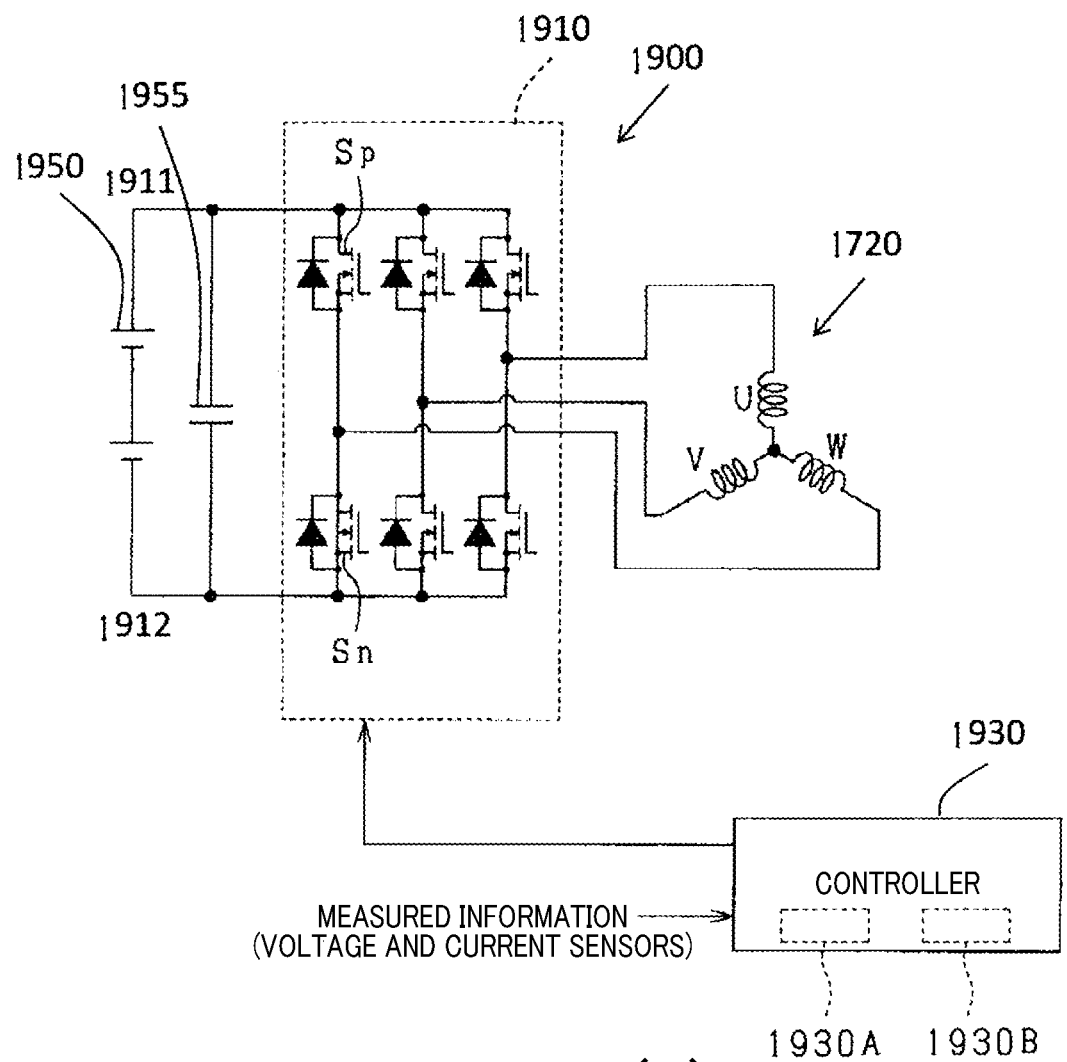
Figure 161B:
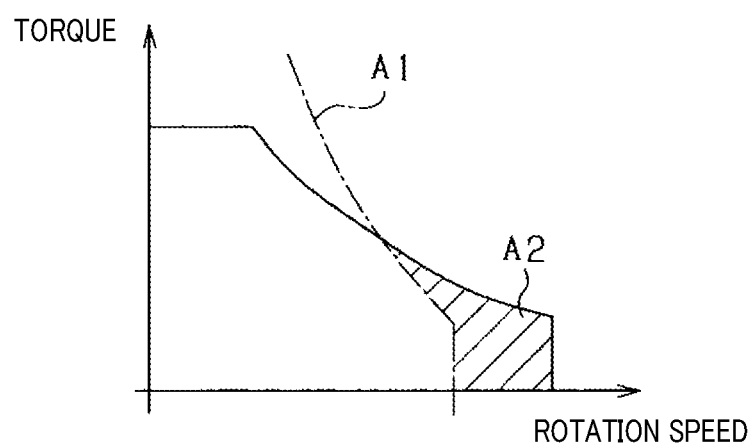

FIGS. 161(a) and 161(b) are views which schematically illustrate a rotating electrical machine driving system.

Figure 162:
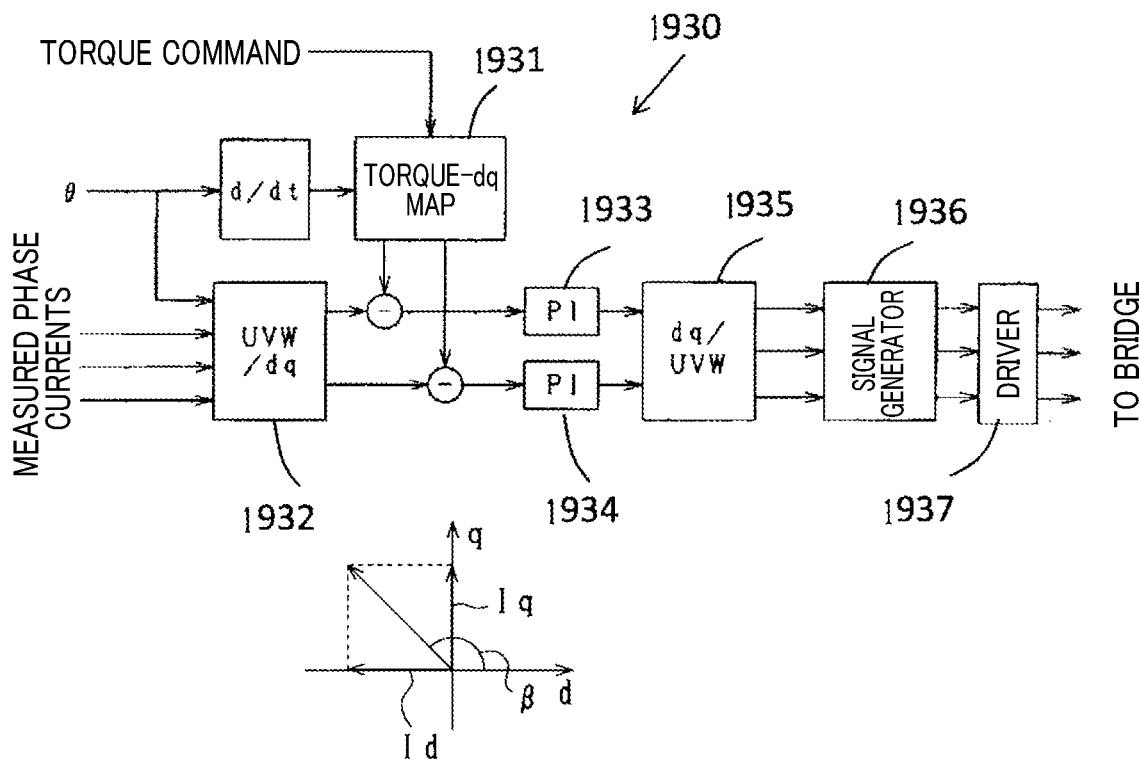

FIG. 162 is a block diagram which shows control processes for controlling excitation current for each phase.

Figure 163:
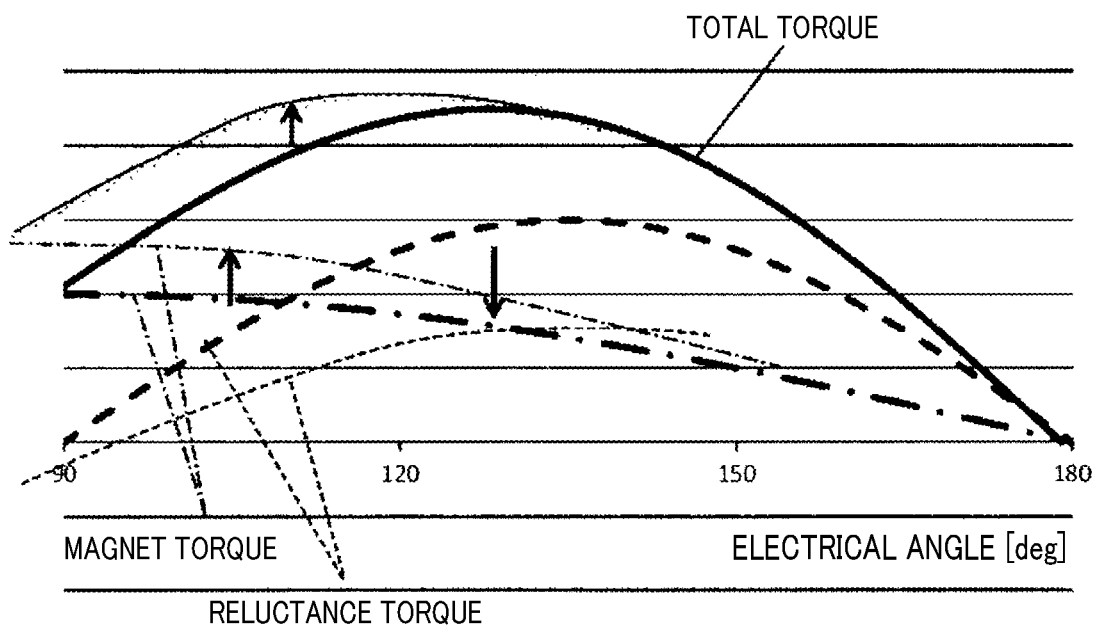

FIG. 163 is a view which represents changes in phase of total torque, magnetic torque, and reluctance torque.

Figure 164:
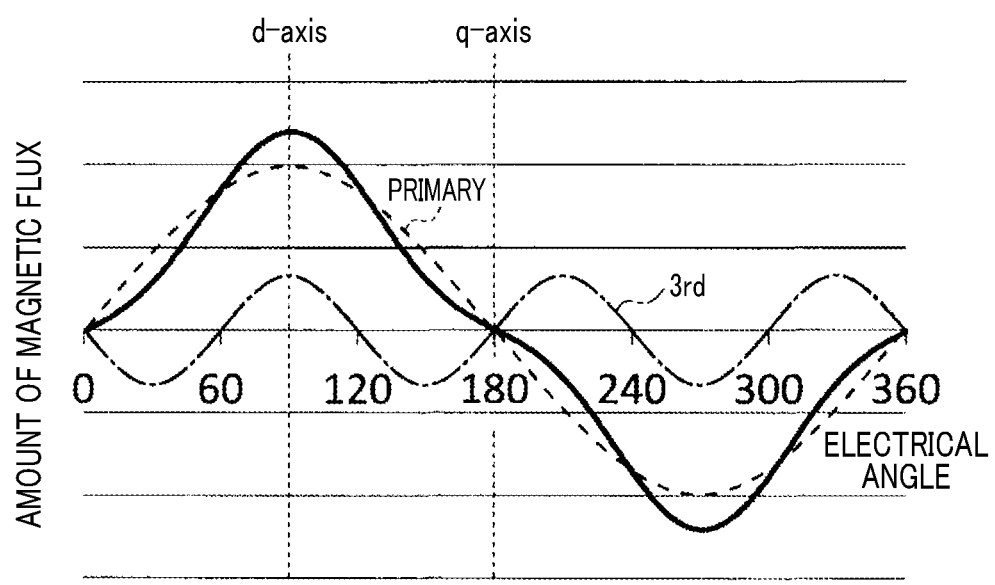

FIG. 164 is a view which represents waveforms of densities of surface magnetic fluxes in a rotor which are generated by a magnet.

Figure 165:
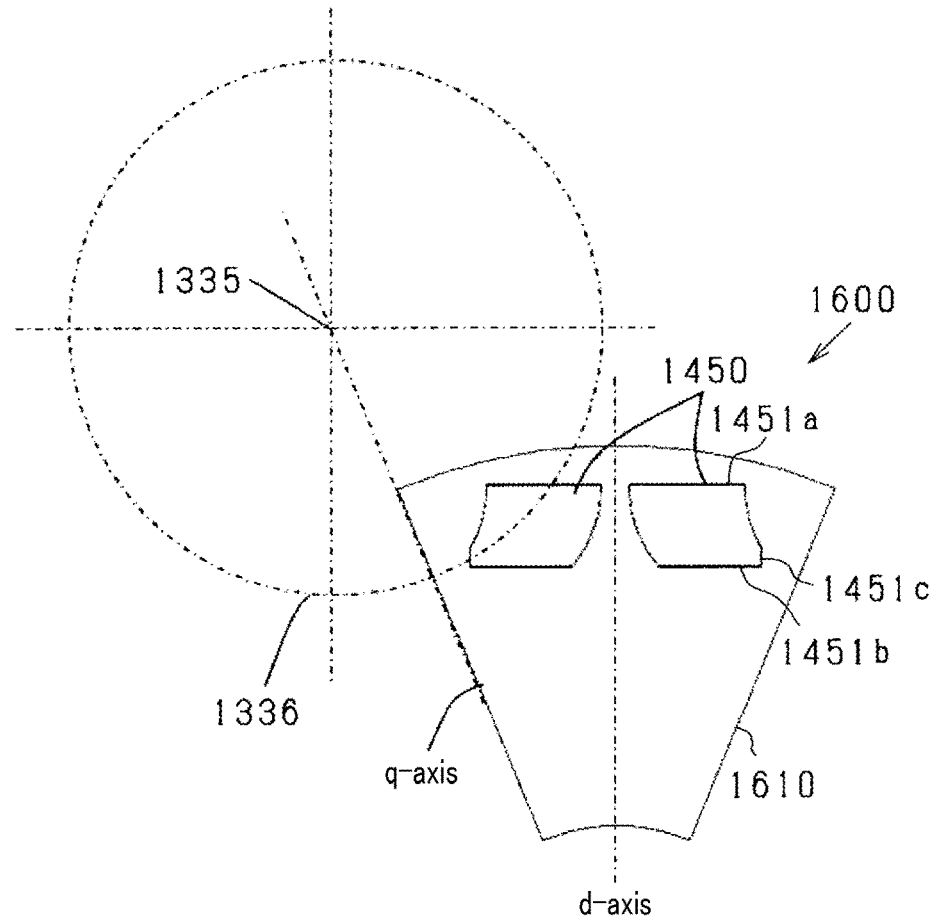

FIG. 165 is a partial plan view which illustrates a structure of a rotor.

Figure 166:
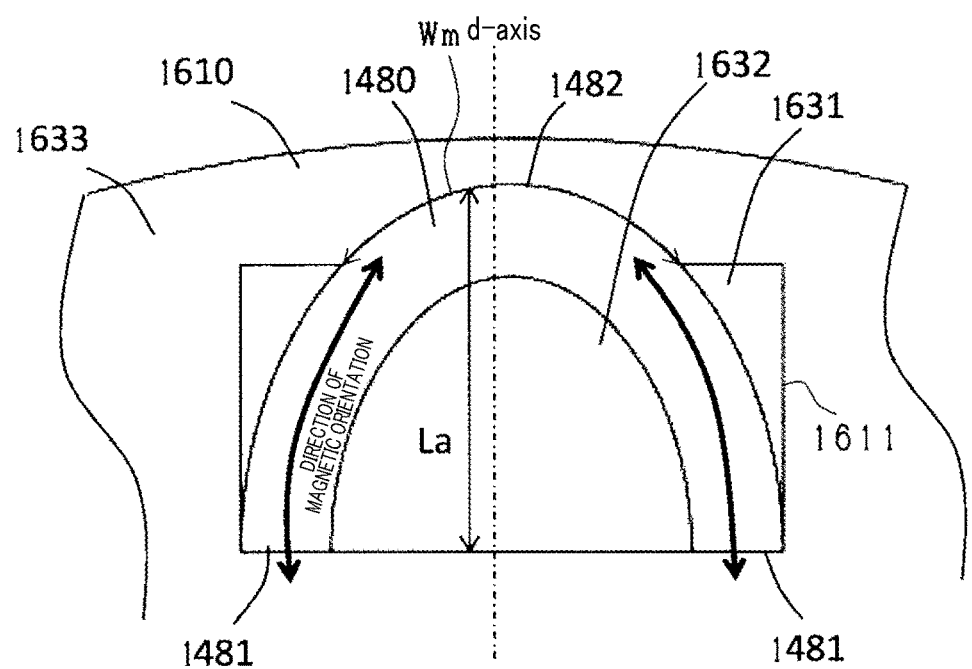

FIG. 166 is a transverse sectional view which illustrates a magnet according to the sixteenth embodiment.

Figure 167A:
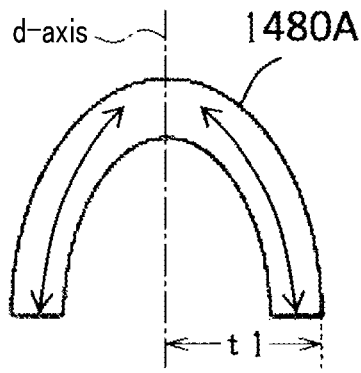
Figure 167B:
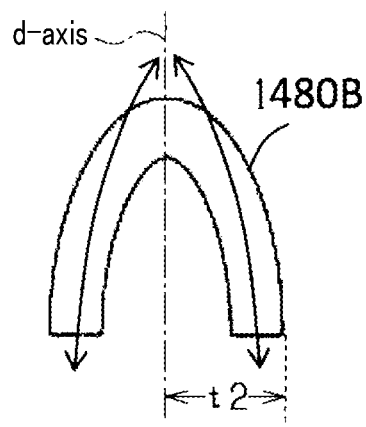
Figure 167C:
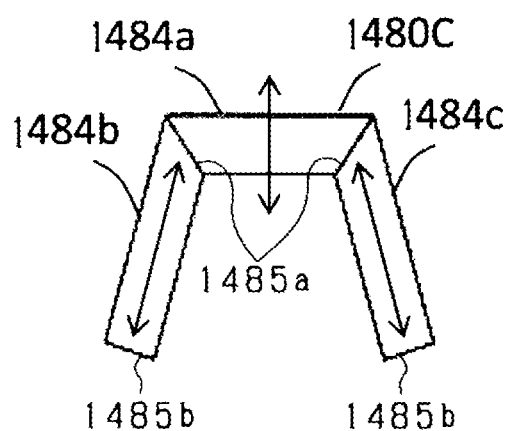

FIGS. 167(a) to 167(c) are views for explaining modifications of the sixteenth embodiment.

Figure 168:
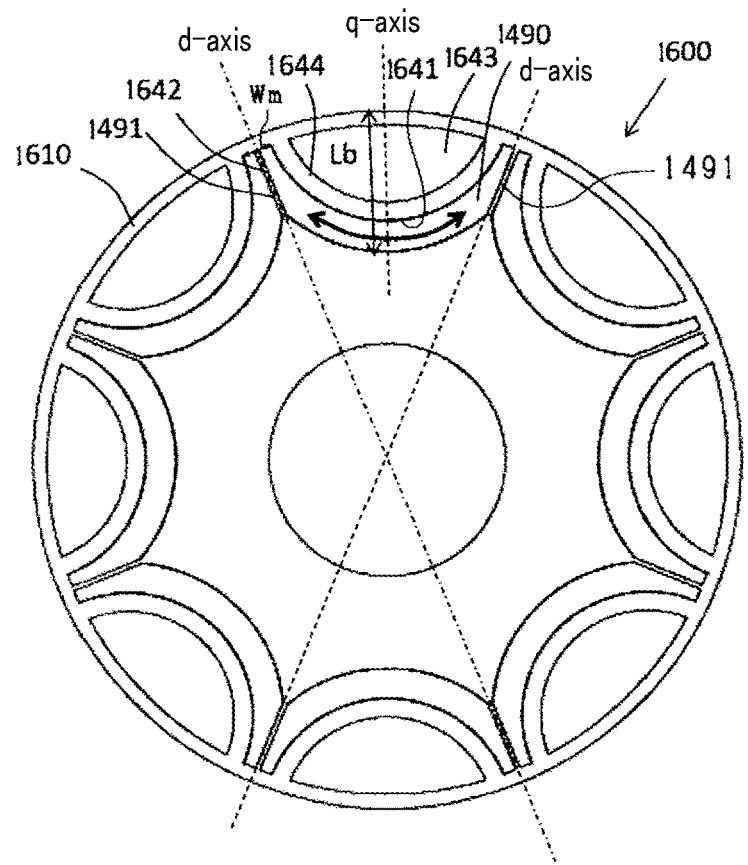

FIG. 168 is a transverse sectional view which illustrates a structure of a magnet according to the seventeenth embodiment.

Figure 169:
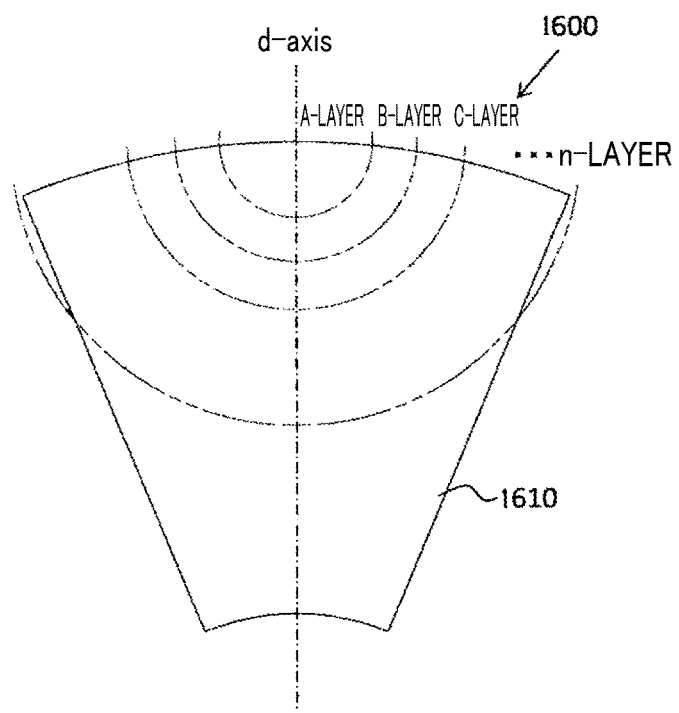

FIG. 169 is a view for explaining a structure in which magnets are arranged in a multi-layer form.

Figure 170:
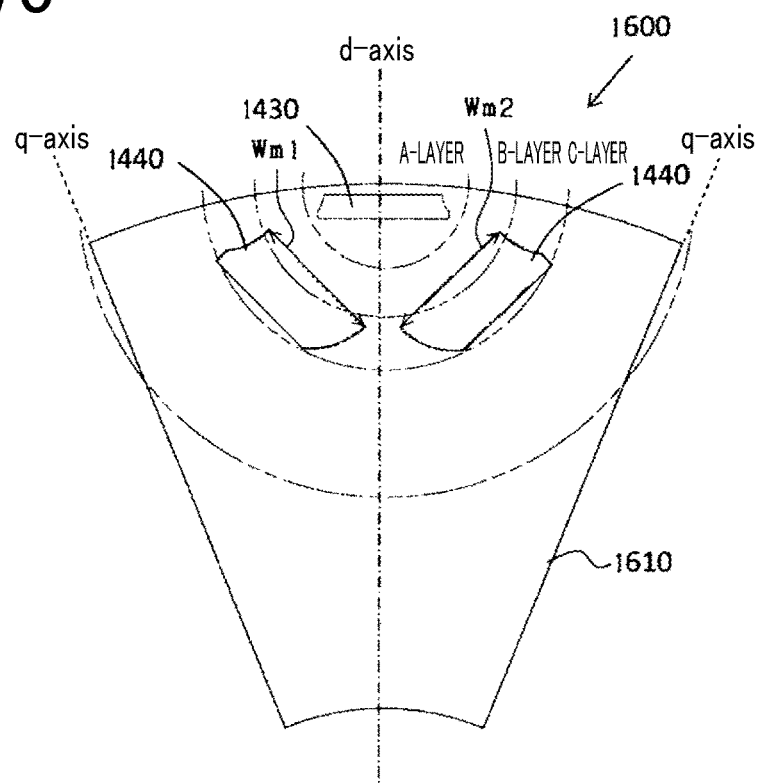

FIG. 170 is a view for explaining a structure in which magnets are arranged in a multi-layer form.

Figure 171A:
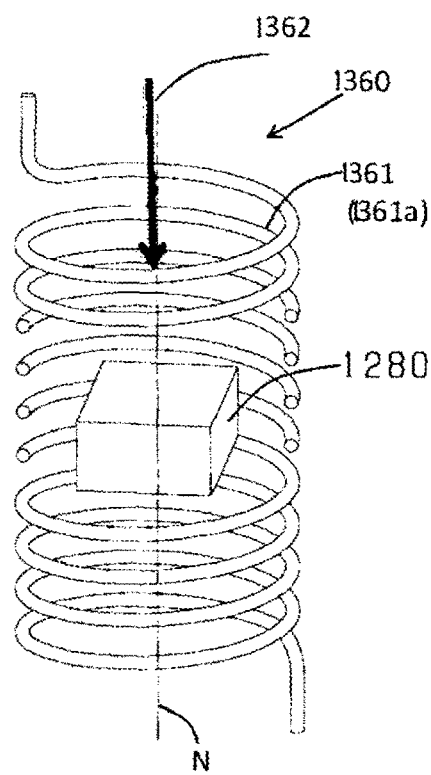
Figure 171B:
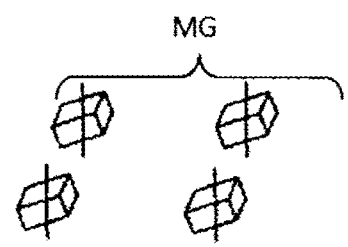

FIGS. 171(a) and 171(b) are views for explaining magnetic orientation processes in another example.

Figure 172:
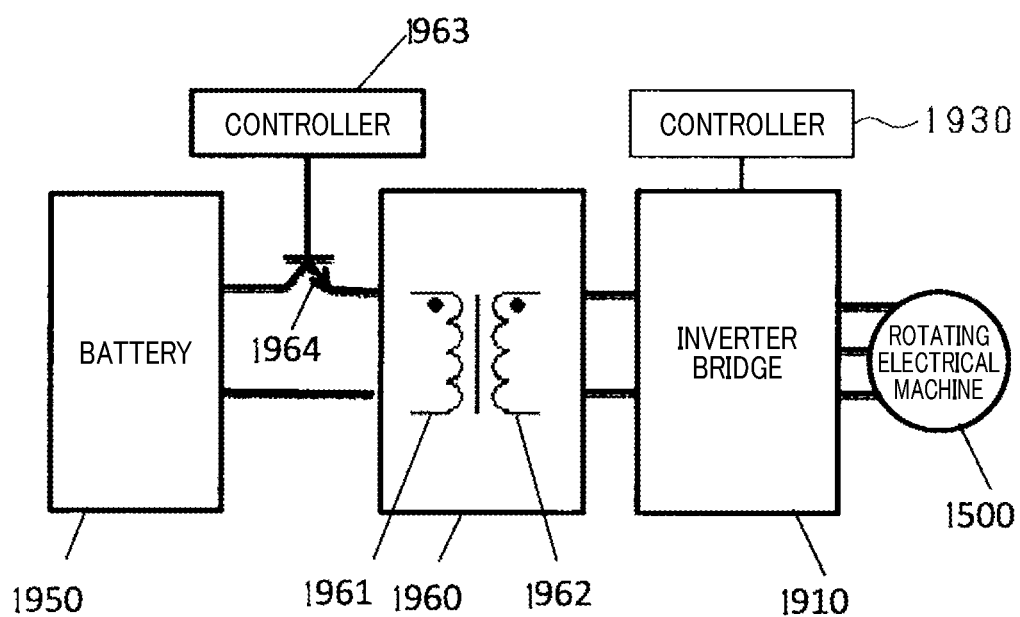

FIG. 172 is a view which illustrates a structure of a rotating electrical machine driving system equipped with a voltage controller.

Figure 173A:
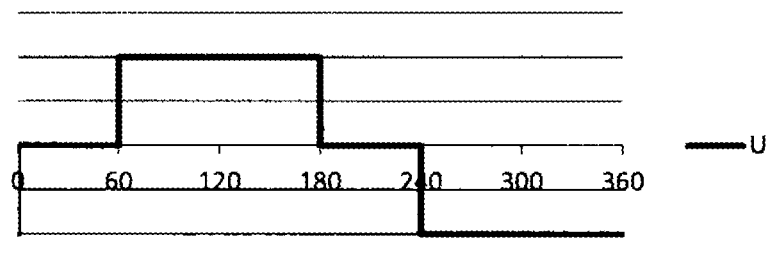
Figure 173B:
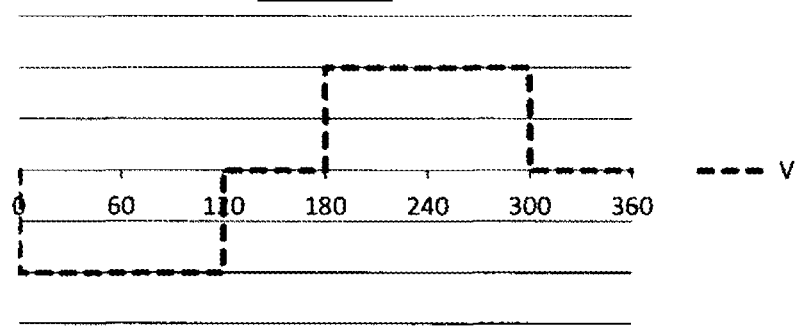
Figure 173C:
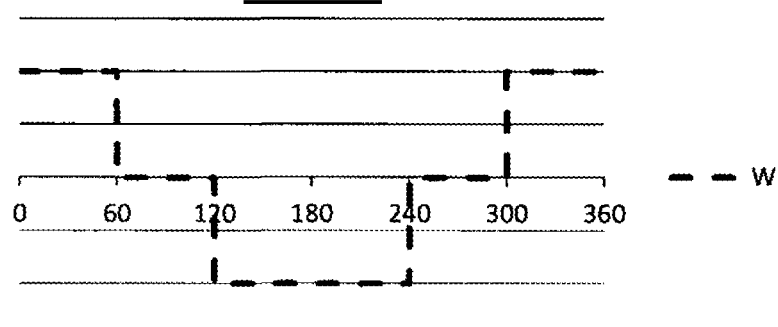

FIGS. 173(a) to 173(c) are views which illustrate 120° rectangular wave current for excitation for each phase.

Figure 174A:
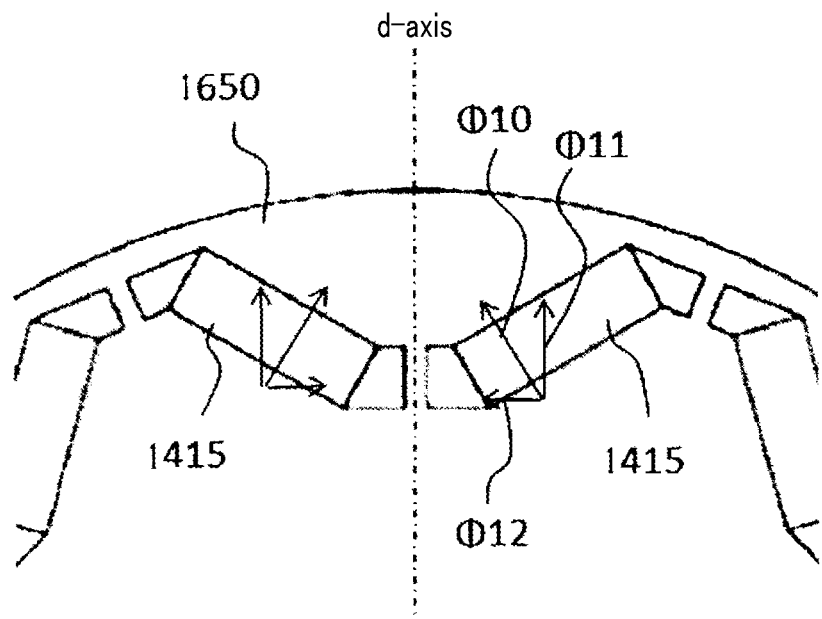
Figure 174B:
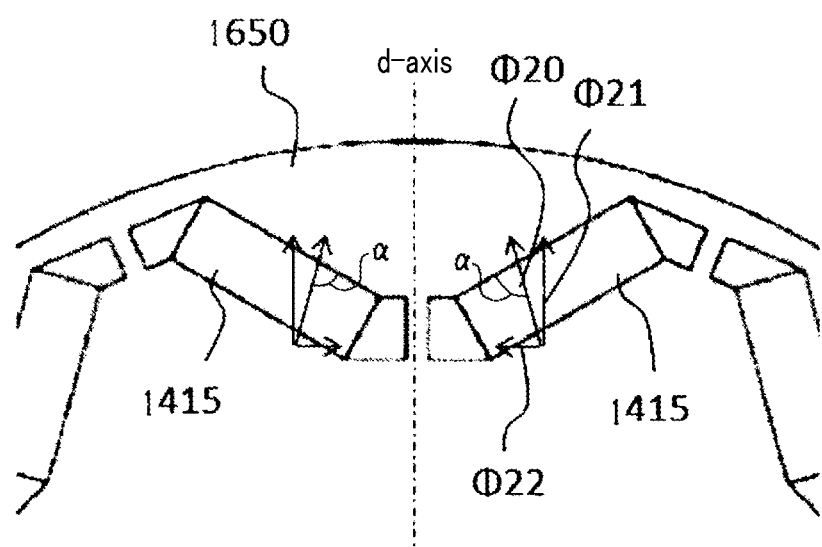

FIGS. 174(a) and 174(b) are views for explaining orientations of magnetic fluxes around a d-axis.

Figure 175:
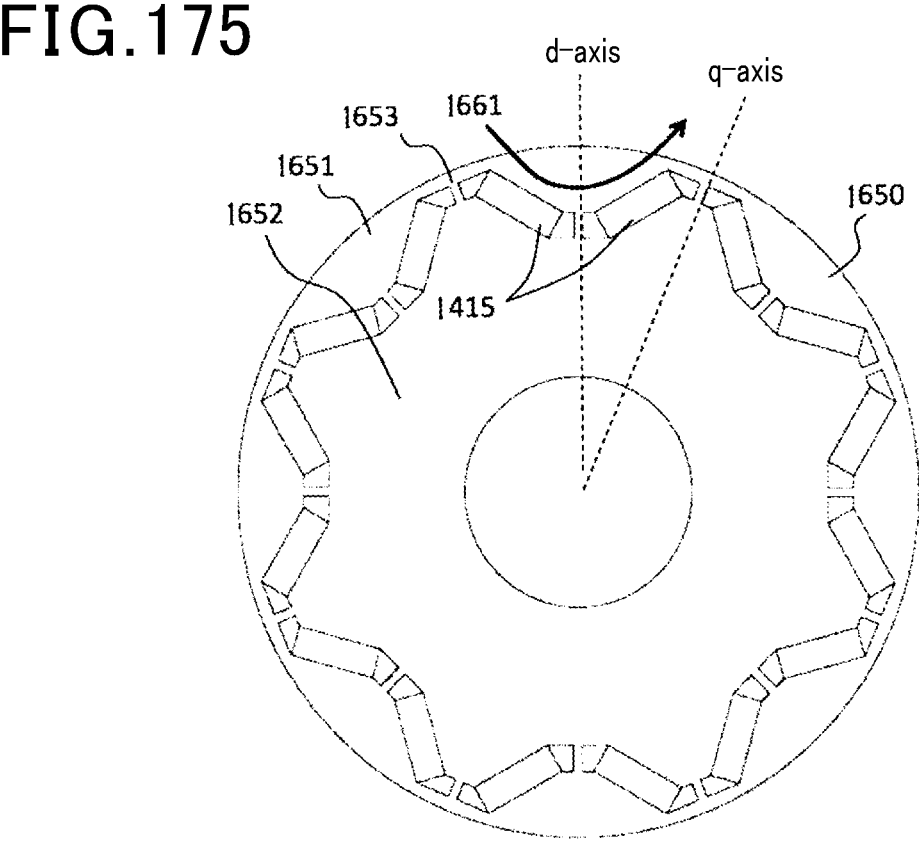

FIG. 175 is a view which illustrates paths through which magnetic fluxes pass in a normal motor mode without use of flux-weakening control.

Figure 176:
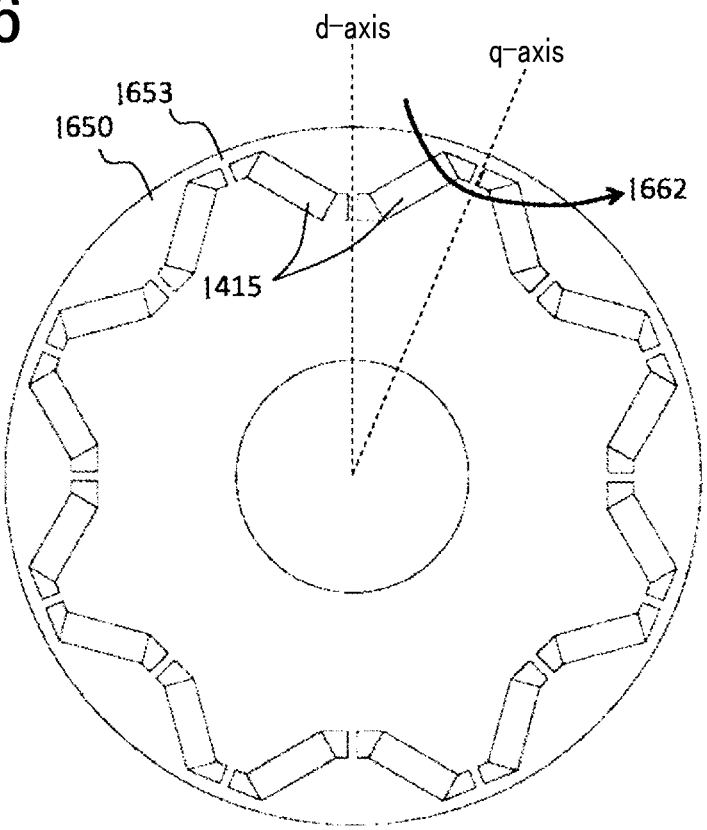

FIG. 176 is a view which illustrates paths through which magnetic fluxes pass in a flux-weakening control mode.

Figure 177:
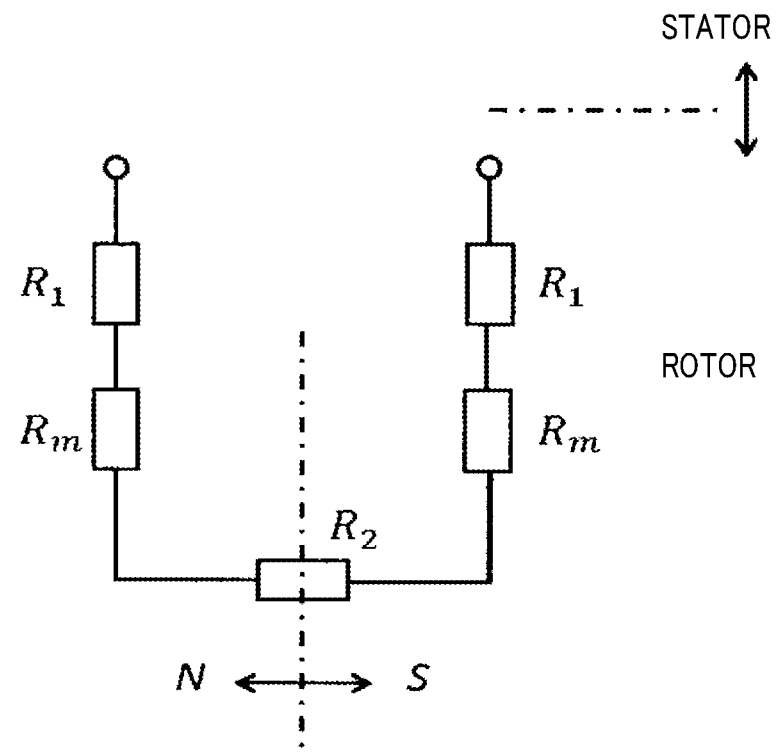

FIG. 177 is a view of an equivalent magnetic circuit for an interior permanent magnet rotor.

Figure 178:
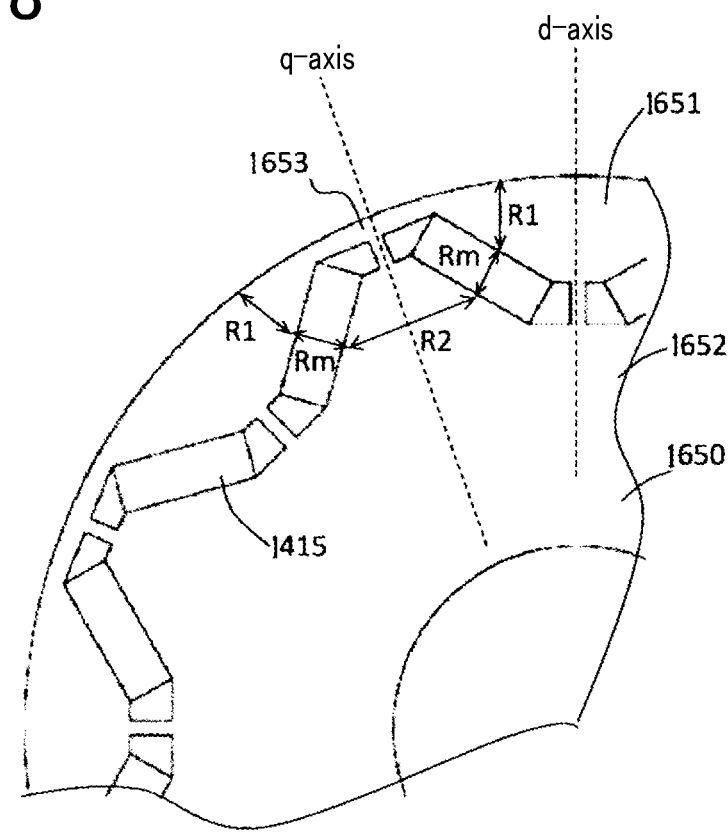

FIG. 178 is a view for explaining magnetic resistances around a q-axis.

Figure 179A:
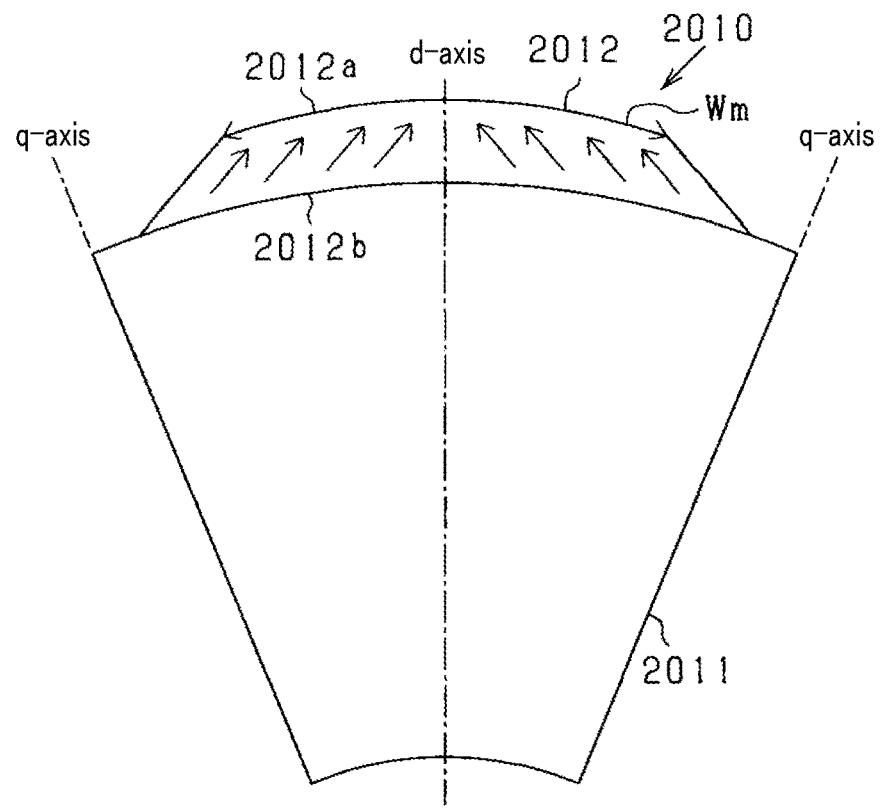
Figure 179B:
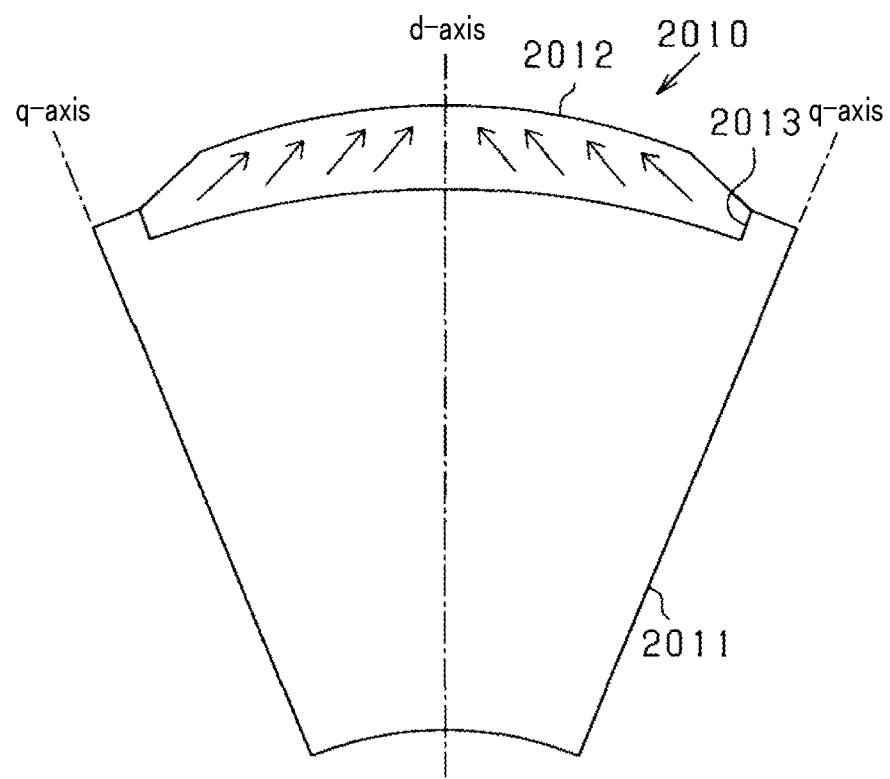

FIGS. 179(a) and 179(b) are views which illustrate structures of surface permanent magnet rotors.

Figure 180:
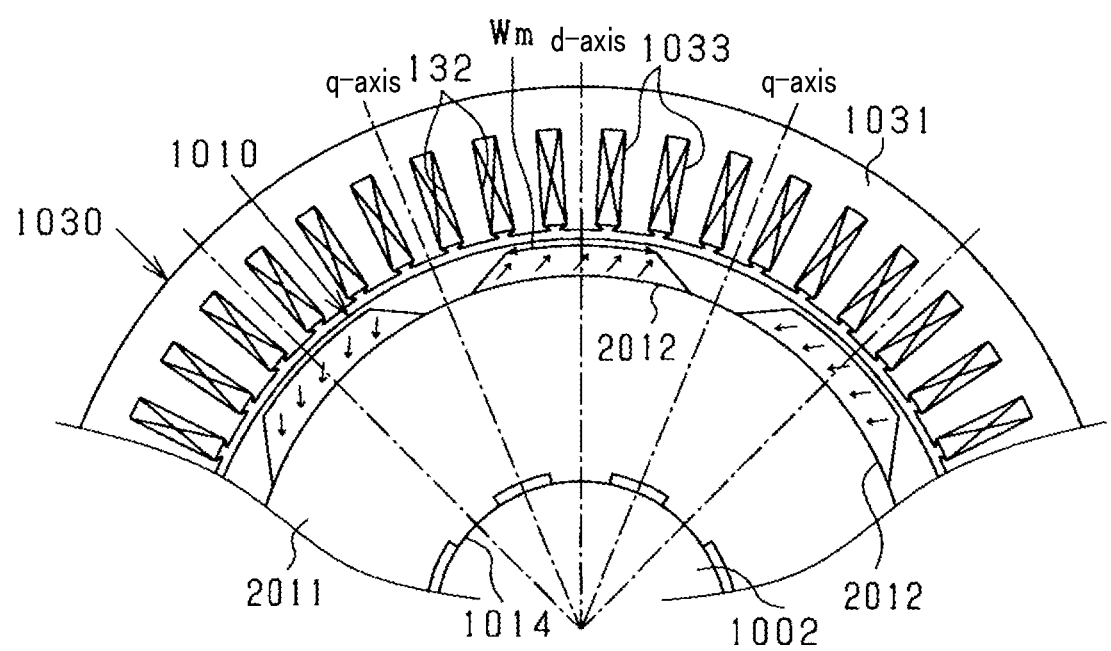

FIG. 180 is a view which illustrates structures of a surface permanent magnet rotor and a stator.

EMBODIMENTS FOR CARRYING OUT THE INVENTION

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or game applications. In the following embodiments, the same or equivalent parts will be denoted by the same reference numbers in the drawings, and explanation thereof in detail will be omitted.

First Embodiment

Figure 1:
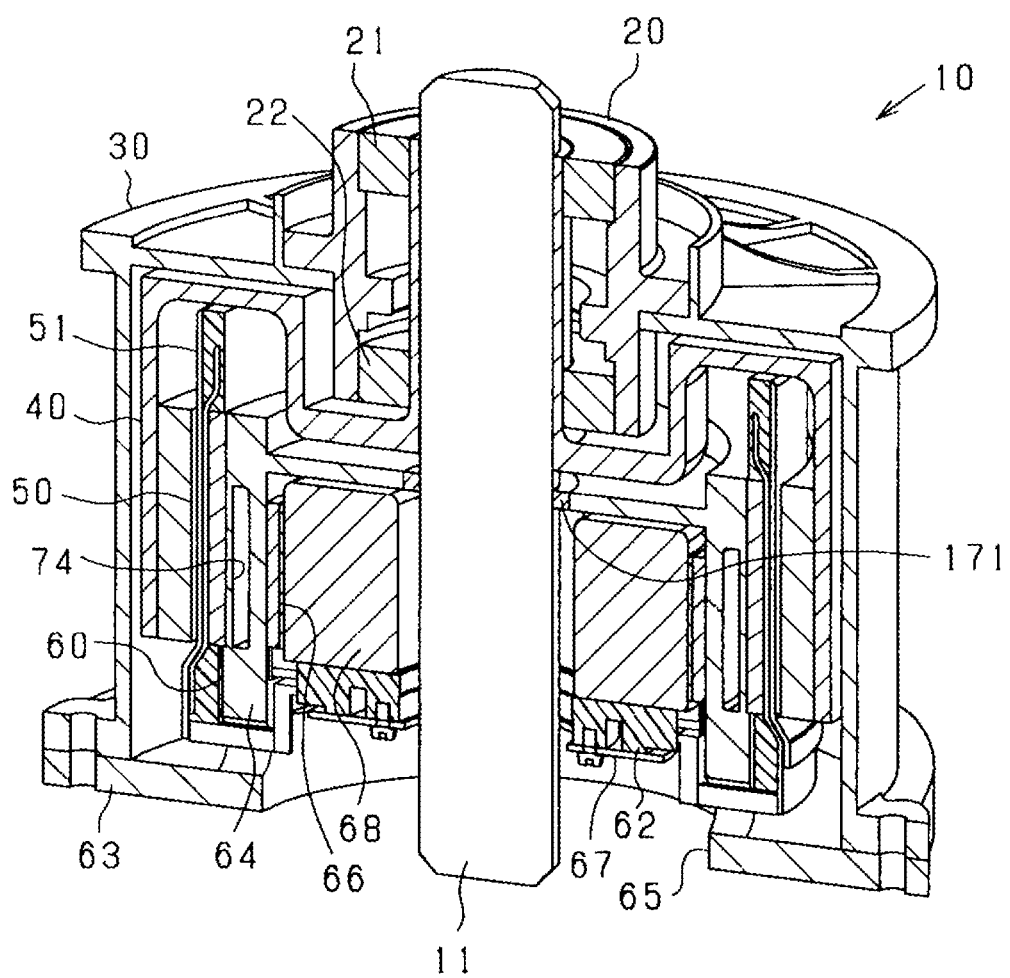
FIG. 1 is a perspective longitudinal sectional view of a rotating electrical machine.
Figure 2:
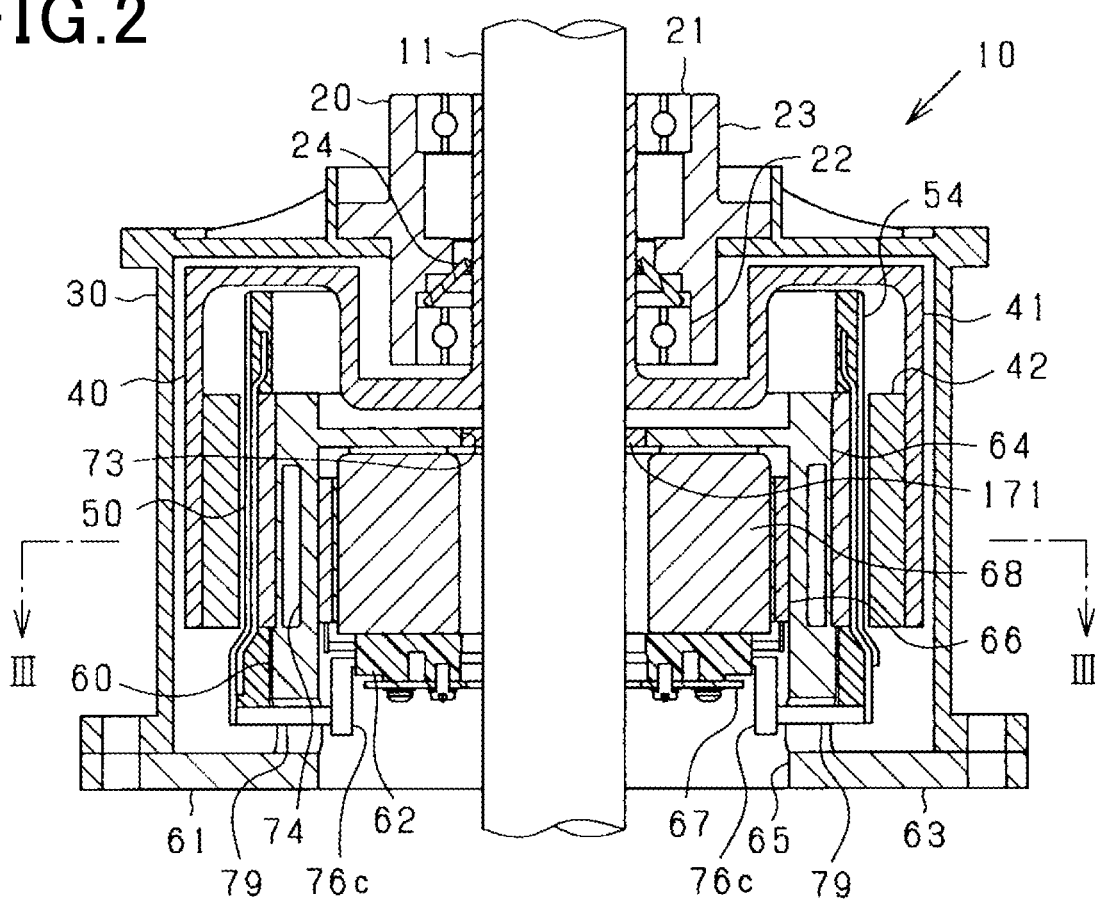
FIG. 2 is a longitudinal sectional view of a rotating electrical machine.
Figure 3:
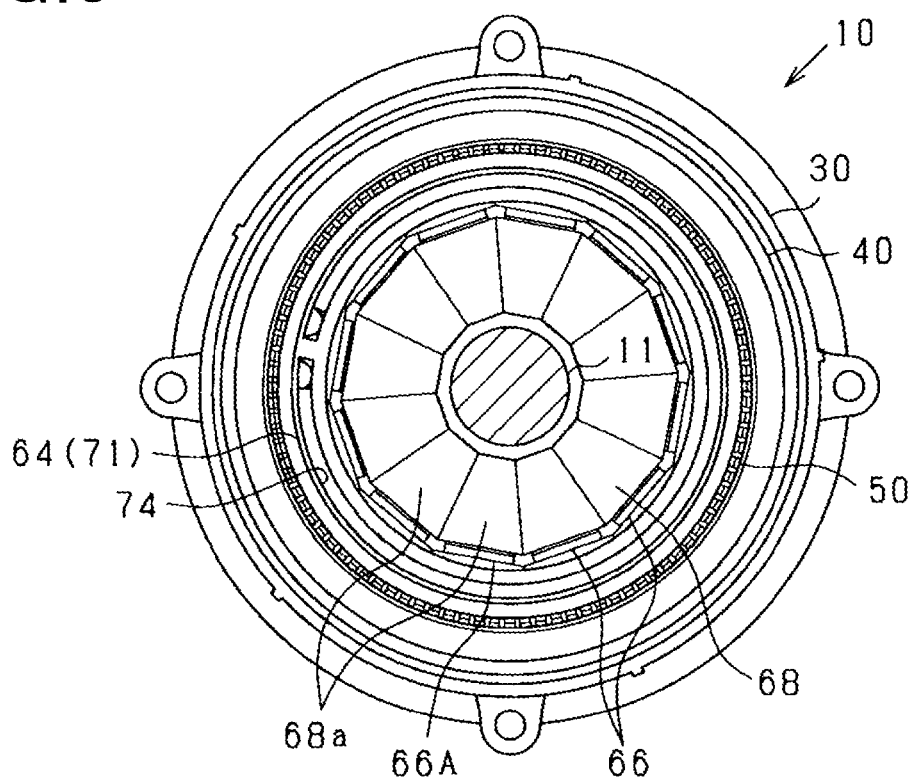
FIG. 3 is a sectional view taken along the line III-III in FIG. 2.
Figure 4:
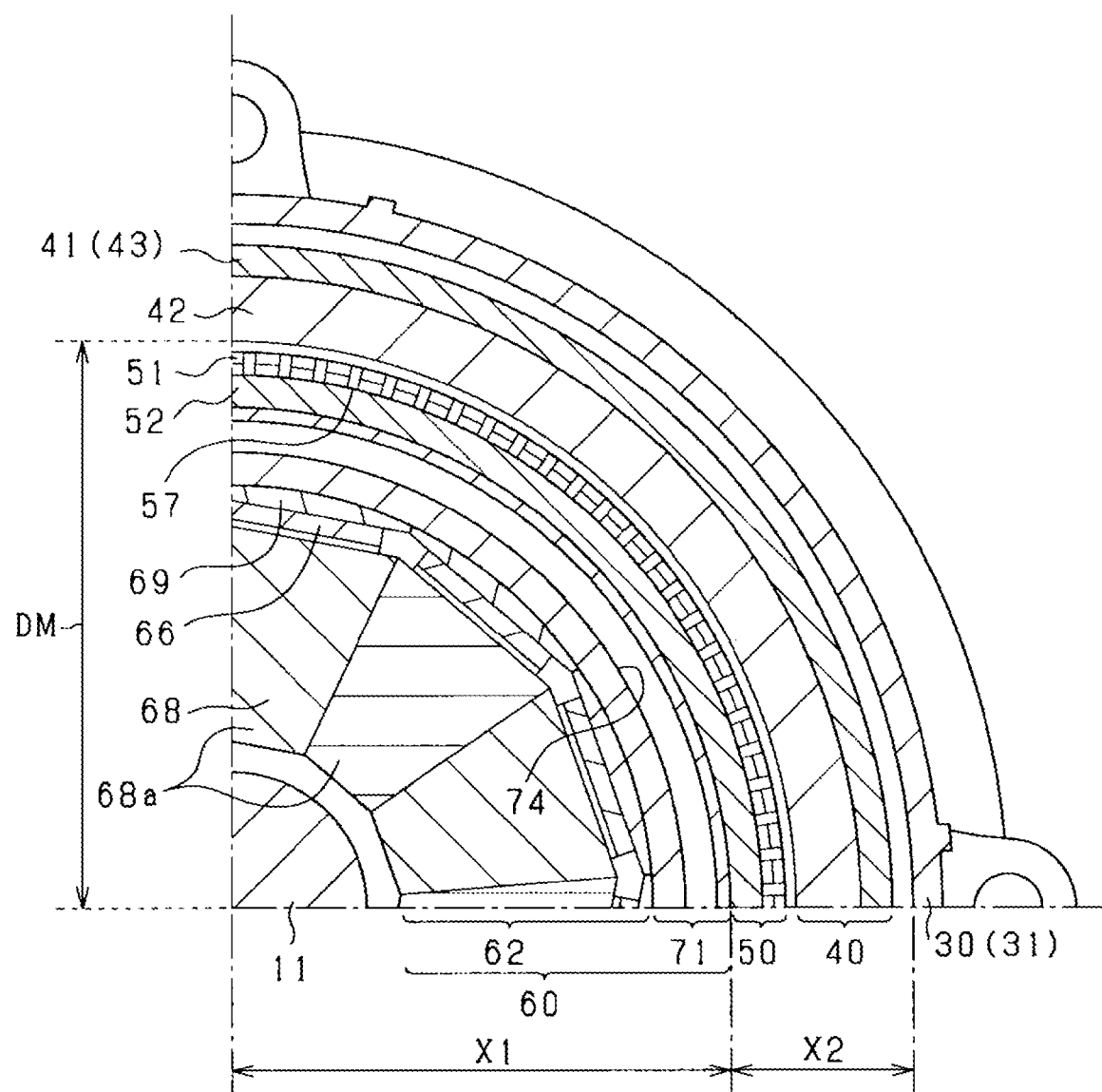
FIG. 4 is a partially enlarged sectional view of FIG. 3.
Figure 5:
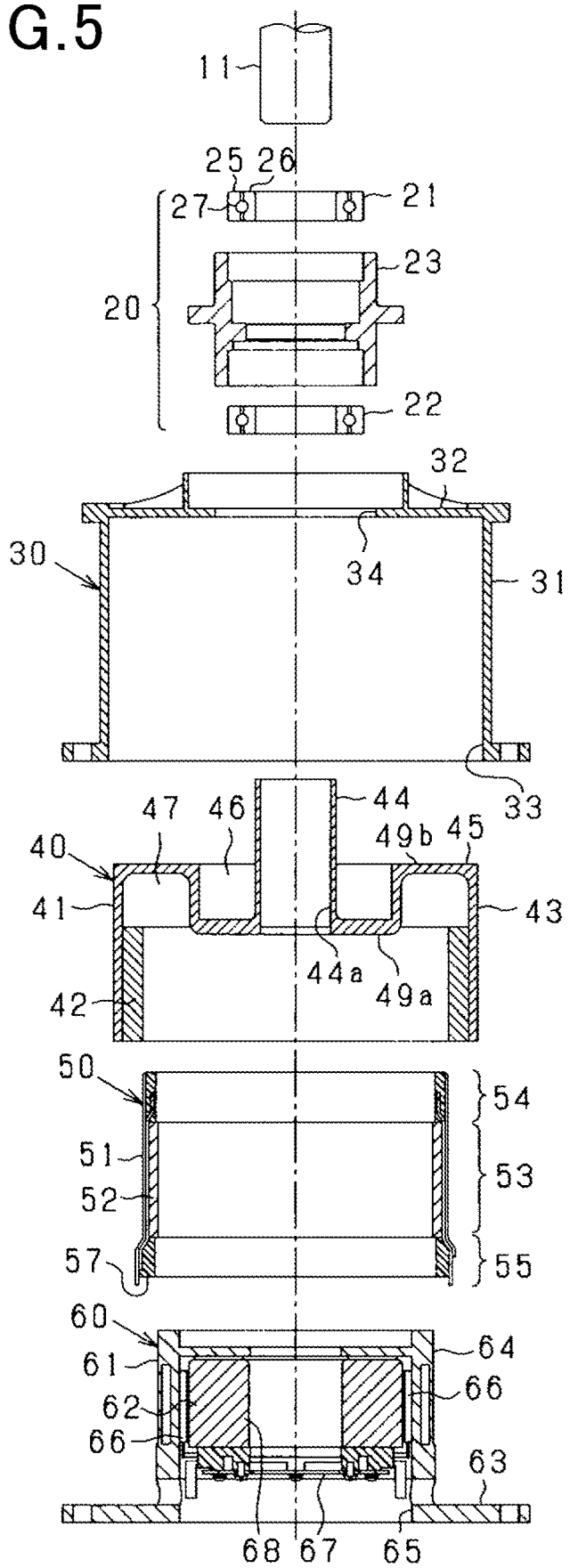
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a longitudinal sectional view along the rotating shaft 11 of the rotating electrical machine 10. FIG. 3 is a transverse sectional view (i.e., sectional view taken along the line III-III in FIG. 2) of the rotating electrical machine 10 perpendicular to the rotating shaft 11. FIG. 4 is a partially enlarged sectional view of FIG. 3. FIG. 5 is an exploded view of the rotating electrical machine 10. FIG. 3 omits hatching showing a section except the rotating shaft 11 for the sake of simplicity of the drawings. In the following discussion, a lengthwise direction of the rotating shaft 11 will also be referred to as an axial direction. A radial direction from the center of the rotating shaft 11 will be simply referred to as a radial direction. A direction along a circumference of the rotating shaft 11 about the center thereof will be simply referred to as a circumferential direction.

The rotating electrical machine 10 includes the bearing unit 20, the housing 30, the rotor 40, the stator 50, and the inverter unit 60. These members are arranged coaxially with each other together with the rotating shaft 11 and assembled in a given sequence to complete the rotating electrical machine 10. The rotating electrical machine 10 in this embodiment is equipped with the rotor 40 working as a magnetic field-producing unit or a field system and the stator 50 working as an armature and engineered as a revolving-field type rotating electrical machine.

The bearing unit 20 includes two bearings 21 and 22 arranged away from each other in the axial direction and the retainer 23 which retains the bearings 21 and 22. The bearings 21 and 22 are implemented by, for example, radial ball bearings each of which includes the outer race 25, the inner race 26, and a plurality of balls 27 disposed between the outer race 25 and the inner race 26. The retainer 23 is of a cylindrical shape. The bearings 21 and 22 are disposed radially inside the retainer 23. The rotating shaft 11 and the rotor 40 are retained radially inside the bearings 21 and 22 to be rotatable. The bearings 21 and 22 are used as a set of bearings to rotatably retain the rotating shaft 11.

Each of the bearings 21 and 22 holds the balls 27 using a retainer, not shown, to keep a pitch between the balls 27 constant. Each of the bearings 21 and 22 is equipped with seals on axially upper and lower ends of the retainer and also has non-conductive grease (e.g., non-conductive urease grease) installed inside the seals. The position of the inner race 26 is mechanically secured by a spacer to exert constant inner precompression on the inner race 26 in the form of a vertical convexity.

The housing 30 includes the cylindrical peripheral wall 31. The peripheral wall 31 has a first end and a second end opposed to each other in an axial direction thereof. The peripheral wall 31 has the end surface 32 on the first end and the opening 33 in the second end. The opening 33 occupies the entire area of the second end. The end surface 32 has formed in the center thereof the circular hole 34. The bearing unit 20 is inserted into the hole 34 and fixed using a fastener, such as a screw or a rivet. The hollow cylindrical rotor 40 and the hollow cylindrical stator 50 are disposed in an inner space defined by the peripheral wall 31 and the end surface 32 within the housing 30. In this embodiment, the rotating electrical machine 10 is of an outer rotor type, so that the stator 50 is arranged radially inside the cylindrical rotor 40 within the housing 30. The rotor 40 is retained in a cantilever form by a portion of the rotating shaft 11 located close to the end surface 32 in the axial direction.

The rotor 40 includes the hollow cylindrical magnetic holder 41 and the annular magnet unit 42 Disposed radially inside the magnet holder 41. The magnet holder 41 is of substantially a cup-shape and works as a magnet holding member. The magnet holder 41 includes the cylinder 43, the attaching portion 44 which is of a cylindrical shape and smaller in diameter than the cylinder 43, and the intermediate portion 45 connecting the cylinder 43 and the attaching portion 44 together. The cylinder 43 has the magnet unit 42 secured to an inner peripheral surface thereof.

The magnet holder 41 is made of cold rolled steel (SPCC), forging steel, or carbon fiber reinforced plastic (CFRP) which have a required degree of mechanical strength.

The rotating shaft 11 passes through the through-hole 44a of the attaching portion 44. The attaching portion 44 is secured to a portion of the rotating shaft 11 disposed inside the through-hole 44a. In other words, the magnet holder 41 is secured to the rotating shaft 11 through the attaching portion 44. The attaching portion 44 may preferably be joined to the rotating shaft 11 using concavities and convexities, such as a spline joint or a key joint, welding, or crimping, so that the rotor 40 rotates along with the rotating shaft 11.

The bearings 21 and 22 of the bearing unit 20 are secured radially outside the attaching portion 44. The bearing unit 20 is, as described above, fixed on the end surface 32 of the housing 30, so that the rotating shaft 11 and the rotor 40 are retained by the housing 30 to be rotatable. The rotor 40 is, thus, rotatable within the housing 30.

The rotor 40 is equipped with the attaching portion 44 arranged only at one of ends thereof opposed to each other in the axial direction of the rotor 40. This cantilevers the rotor 40 on the rotating shaft 11. The attaching portion 44 of the rotor 40 is rotatably retained at two points of supports using the bearings 21 and 22 of the bearing unit 20 which are located away from each other in the axial direction. In other words, the rotor 40 is held to be rotatable using the two bearings 21 and 22 which are separate at a distance away from each other in the axial direction on one of the axially opposed ends of the magnet holder 41. This ensures the stability in rotation of the rotor 40 even though the rotor 40 is cantilevered on the rotating shaft 11. The rotor 40 is retained by the bearings 21 and 22 at locations which are away from the center intermediate between the axially opposed ends of the rotor 40 in the axial direction thereof.

The bearing 22 of the bearing unit 20 which is located closer to the center of the rotor 40 (a lower one of the bearings 21 and 22 in the drawings) is different in dimension of a gap between each of the outer race 25 and the inner race and the balls 27 from the bearing 21 which is located farther away from the center of the rotor 40 (i.e., an upper one of the bearings 21 and 22). For instance, the bearing 22 closer to the center of the rotor 40 is greater in the dimension of the gap from the bearing 21. This minimizes adverse effects on the bearing unit 20 which arise from deflection of the rotor 40 or mechanical vibration of the rotor 40 Due to imbalance resulting from parts tolerance at a location close to the center of the rotor 40. Specifically, the bearing 22 closer to the center of the rotor 40 is engineered to have dimensions of the gaps or plays increased using precompression, thereby absorbing the vibration generating in the cantilever structure. The precompression may be provided by either fixed position preload or constant pressure preload. In the case of the fixed position preload, the outer race 25 of each of the bearings 21 and 22 is joined to the retainer 23 using press-fitting or welding. The inner race 26 of each of the bearings 21 and 22 is joined to the rotating shaft 11 by press-fitting or welding. The precompression may be created by placing the outer race 25 of the bearing 21 away from the inner race 26 of the bearing 21 in the axial direction or alternatively placing the outer race 25 of the bearing 22 away from the inner race 26 of the bearing 22 in the axial direction.

In the case of the constant pressure preload, a preload spring, such as a wave washer 24, is arranged between the bearing 22 and the bearing 21 to create the preload directed from a region between the bearing 22 and the bearing 21 toward the outer race 25 of the bearing 22 in the axial direction. In this case, the inner race 26 of each of the bearing 21 and the bearing 22 is joined to the rotating shaft 11 using press fitting or bonding. The outer race 25 of the bearing 21 or the bearing 22 is arranged away from the outer race 25 through a given clearance. This structure exerts pressure, as produced by the preload spring, on the outer race 25 of the bearing 22 to urge the outer race 25 away from the bearing 21. The pressure is then transmitted through the rotating shaft 11 to urge the inner race 26 of the bearing 21 toward the bearing 22, thereby bringing the outer race 25 of each of the bearings 21 and 22 away from the inner race 26 thereof in the axial direction to exert the preload on the bearings 21 and 22 in the same way as the fixed position preload.

The constant pressure preload does not necessarily need to exert the spring pressure, as illustrated in FIG. 2, on the outer race 25 of the bearing 22, but may alternatively be created by exerting the spring pressure on the outer race 25 of the bearing 21. The exertion of the preload on the bearings 21 and 22 may alternatively be achieved by placing the inner race 26 of one of the bearings 21 and 22 away from the rotating shaft 11 through a given clearance therebetween and joining the outer race 25 of each of the bearings 21 and 22 to the retainer 23 using press-fitting or bonding.

Further, in the case where the pressure is created to bring the inner race 26 of the bearing 21 away from the bearing 22, such pressure is preferably additionally exerted on the inner race 26 of the bearing 22 away from the bearing 21. Conversely, in the case where the pressure is created to bring the inner race 26 of the bearing 21 close to the bearing 22, such pressure is preferably additionally exerted on the inner race 26 of the bearing 22 to bring it close to the bearing 21.

In a case where the rotating electrical machine 10 is used as a power source for a vehicle, there is a risk that mechanical vibration having a component oriented in a direction in which the preload is created may be exerted on the preload generating structure or that a direction in which the force of gravity acts on an object to which the preload is applied may be changed. In order to alleviate such a problem, the fixed position preload is preferably used in the case where the rotating electrical machine 10 is mounted in the vehicle.

The intermediate portion 45 includes the annular inner shoulder 49a and the annular outer shoulder 49b. The outer shoulder 49b is arranged outside the inner shoulder 49a in the radial direction of the intermediate portion 45. The inner shoulder 49a and the outer shoulder 49b are separate from each other in the axial direction of the intermediate portion 45. This layout results in a partial overlap between the cylinder 43 and the attaching portion 44 in the radial direction of the intermediate portion 45. In other words, the cylinder 43 protrudes outside a base end portion (i.e., a lower portion, as viewed in the drawing) of the attaching portion 44 in the axial direction. The structure in this embodiment enables the rotor 40 to be retained by the rotating shaft 11 at a location closer to the center of gravity of the rotor 40 than a case where the intermediate portion 45 is shaped to be flat without any shoulder, thereby ensuring the stability in operation of the rotor 40.

In the above described structure of the intermediate portion 45, the rotor 40 has the annular bearing housing recess 46 which is formed in an inner portion of the intermediate portion 45 and radially surrounds the attaching portion 44. The bearing housing recess 46 has a portion of the bearing unit 20 disposed therein. The rotor 40 also has the coil housing recess 47 which is formed in an outer portion of the intermediate portion 45 and radially surrounds the bearing housing recess 46. The coil housing recess 47 has disposed therein the coil end 54 of the stator winding 51 of the stator 50, which will be described later in detail. The housing recesses 46 and 47 are arranged adjacent each other in the axial direction. In other words, a portion of the bearing unit 20 is laid to overlap the coil end 54 of the stator winding 51 in the axial direction. This enables the rotating electrical machine 10 to have a length decreased in the axial direction.

The intermediate portion 45 extends or overhangs outward from the rotating shaft 11 in the radial direction. The intermediate portion 45 is equipped with a contact avoider which extends in the axial direction and avoids a physical contact with the coil end 54 of the stator winding 51 of the stator 50. The intermediate portion 45 will also be referred to as an overhang.

The coil end 54 may be bent radially inwardly or outwardly to have a decreased axial dimension, thereby enabling the axial length of the stator 50 to be decreased. A direction in which the coil end 54 is bent is preferably determined depending upon installation thereof in rotor 40. In the case where the stator 50 is installed radially inside the rotor 40, a portion of the coil end 54 which is inserted into the rotor 40 is preferably bent radially inwardly. A coil end opposite the coil end 54 may be bent either inwardly or outwardly, but is preferably bent to an outward side where there is an enough space in terms of the production thereof.

The magnet unit 42 working as a magnetic portion is made up of a plurality of permanent magnets which are disposed radially inside the cylinder 43 to have different magnetic poles arranged alternately in a circumferential direction thereof. The magnet unit 42, thus, has a plurality of magnetic poles arranged in the circumferential direction. The magnet unit 42 will also be described later in detail.

The stator 50 is arranged radially inside the rotor 40. The stator 50 includes the stator winding 51 wound in a substantially cylindrical (annular) form and the stator core 52 used as a base member arranged radially inside the stator winding 51. The stator winding 51 is arranged to face the annular magnet unit 42 through a given air gap therebetween. The stator winding 51 includes a plurality of phase windings each of which is made of a plurality of conductors which are arranged at a given pitch away from each other in the circumferential direction and joined together. In this embodiment, two three-phase windings: one including a U-phase winding, a V-phase winding, and a W-phase winging and the other including an X-phase winding, a Y-phase winding, and a Z-phase winding are used to complete the stator winding 51 as a six-phase winding.

The stator core 52 is formed by an annular stack of magnetic steel plates made of soft magnetic material and mounted radially inside the stator winding 51. The magnetic steel plates are, for example, silicone nitride steel plates made by adding a small percent (e.g., 3%) of silicone nitride to iron. The stator winding 51 corresponds to an armature winding. The stator core 52 corresponds to an armature core.

The stator winding 51 overlaps the stator core 52 in the radial direction and includes the coil side portion 53 disposed radially outside the stator core 52 and the coil ends 54 and 55 overhanging at ends of the stator core 52 in the axial direction. The coil side portion 53 faces the stator core 52 and the magnet unit 42 of the rotor 40 in the radial direction. The stator 50 is arranged inside the rotor 40. The coil end 54 that is one (i.e., an upper one, as viewed in the drawings) of the axially opposed coil ends 54 and 55 and arranged close to the bearing unit 20 is disposed in the coil housing recess 47 defined by the magnet holder 41 of the rotor 40. The stator 50 will also be described later in detail.

The inverter unit 60 includes the unit base 61 secured to the housing 30 using fasteners, such as bolts, and a plurality of electrical components 62 mounted on the unit base 61. The unit base 61 is made from, for example, carbon fiber reinforced plastic (CFRP). The unit base 61 includes the end plate 63 secured to an edge of the opening 33 of the housing 30 and the casing 64 which is formed integrally with the end plate 63 and extends in the axial direction. The end plate 63 has the circular opening 65 formed in the center thereof. The casing 64 extends upward from a peripheral edge of the opening 65.

The stator 50 is arranged on an outer peripheral surface of the casing 64. Specifically, an outer diameter of the casing 64 is selected to be identical with or slightly smaller than an inner diameter of the stator core 52. The stator core 52 is attached to the outer side of the casing 64 to complete a unit made up of the stator 50 and the unit base 61. The unit base 61 is secured to the housing 30, so that the stator 50 is unified with the housing 50 in a condition where the stator core 52 is installed on the casing 64.

The stator core 52 may be bonded, shrink-fit, or press-fit on the unit base 61, thereby eliminating positional shift of the stator core 52 relative to the unit base 61 both in the circumferential direction and in the axial direction.

The casing 64 has a radially inner storage space in which the electrical components 62 are disposed. The electrical components 62 are arranged to surround the rotating shaft 11 within the storage space. The casing 64 functions as a storage space forming portion. The electrical components 62 include the semiconductor modules 66, the control board 67, and the capacitor module 68 which constitute an inverter circuit.

The unit base 61 serves as a stator holder (i.e., an armature holder) which is arranged radially inside the stator 50 and retains the stator 50. The housing 30 and the unit base 61 define a motor housing for the rotating electrical machine 10. In the motor housing, the retainer 23 is secured to a first end of the housing 30 which is opposed to a second end of the housing 30 through the rotor 40 in the axial direction. The second end of the housing 30 and the unit base 61 are joined together. For instance, in an electric-powered vehicle, such as an electric automobile, the motor housing is attached to a side of the vehicle to install the rotating electrical machine 10 in the vehicle.

Figure 6:
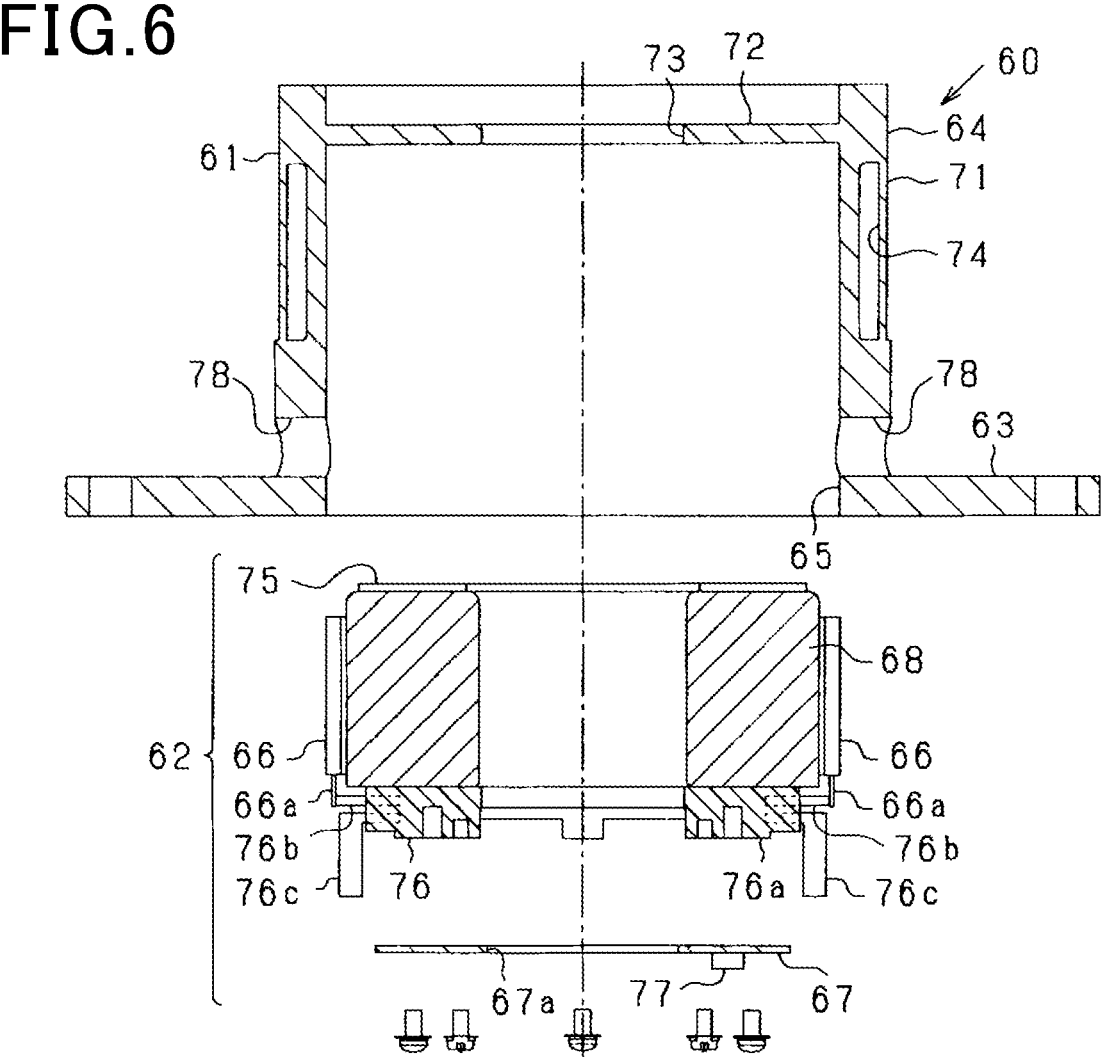
FIG. 6 is an exploded view of an inverter unit.

The inverter unit 60 will be also be described using FIG. 6 that is an exploded view in addition to FIGS. 1 to 5.

The casing 64 of the unit base 61 includes the cylinder 71 and the end surface 72 that is one of ends of the cylinder 71 which are opposed to each other in the axial direction of the cylinder 71 (i.e., the end of the casing 64 close to the bearing unit 20). The end of the cylinder 71 opposed to the end surface 72 in the axial direction is shaped to fully open to the opening 65 of the end plate 63. The end surface 72 has formed in the center thereof the circular hole 73 through which the rotating shaft 11 is insertable. The hole 73 has fitted therein the sealing member 171 which hermetically seals an air gap between the hole 73 and the outer periphery of the rotating shaft 11. The sealing member 171 is preferably implemented by, for example, a resinous slidable seal.

The cylinder 71 of the casing 64 serves as a partition which isolates the rotor 40 and the stator 50 arranged radially outside the cylinder 71 from the electrical components 62 arranged radially inside the cylinder 71. The rotor 40, the stator 50, and the electrical components 62 are arranged radially inside and outside the cylinder 71.

The electrical components 62 are electrical devices making up the inverter circuit equipped with a motor function and a generator function. The motor function is to deliver electrical current to the phase windings of the stator winding 51 in a given sequence to turn the rotor 40. The generator function is to receive a three-phase ac current flowing through the stator winding 51 in response to the rotation of the rotating shaft 11 and generate and output electrical power. The electrical components 62 may be engineered to perform either one of the motor function and the generator function. In a case where the rotating electrical machine 10 is used as a power source for a vehicle, the generator function provides a regenerative function to output a regenerated electrical power.

Specifically, the electrical components 62, as demonstrated in FIG. 4, include the hollow cylindrical capacitor module 68 arranged around the rotating shaft 11 and the semiconductor modules 66 mounted on the capacitor module 68. The capacitor module 68 has a plurality of smoothing capacitors 68a connected in parallel to each other. Specifically, each of the capacitors 68a is implemented by a stacked-film capacitor which is made of a plurality of film capacitors stacked in a trapezoidal shape in cross section. The capacitor module 68 is made of the twelve capacitors 68a arranged in an annular shape.

The capacitors 68a may be produced by preparing a long film which has a given width and is made of a stack of films and cutting the long film into isosceles trapezoids each of which has a height identical with the width of the long film and whose short bases and long bases are alternately arranged. Electrodes are attached to the thus produced capacitor devices to complete the capacitors 68a.

The semiconductor module 66 includes, for example, a semiconductor switch, such as a MOSFET or an IGBT and is of substantially a planar shape. In this embodiment, the rotating electrical machine 10 is, as described above, equipped with two sets of three-phase windings and has the inverter circuits, one for each set of the three-phase windings. The electrical components 62, therefore, include a total of twelve semiconductor modules 66 which are arranged in an annular form to make up the semiconductor module group 66A.

The semiconductor modules 66 are interposed between the cylinder 71 of the casing 64 and the capacitor module 68. The semiconductor module group 66A has an outer peripheral surface placed in contact with an inner peripheral surface of the cylinder 71. The semiconductor module group 66A also has an inner peripheral surface placed in contact with an outer peripheral surface of the capacitor module 68. This causes heat, as generated in the semiconductor modules 66, to be transferred to the end plate 63 through the casing 64, so that it is dissipated from the end plate 63.

The semiconductor module group 66A preferably has the spacers 69 disposed radially outside the outer peripheral surface thereof, i.e., between the semiconductor modules 66 and the cylinder 71. A combination of the capacitor modules 68 is so arranged as to have a regular dodecagonal section extending perpendicular to the axial direction thereof, while the inner periphery of the cylinder 71 has a circular transverse section. The spacers 69 are, therefore, each shaped to have a flat inner peripheral surface and a curved outer peripheral surface. The spacers 69 may alternatively be formed integrally with each other in an annular shape and disposed radially outside the semiconductor module group 66A. The spacers 69 are highly thermally conductive and made of, for example, metal, such as aluminum or heat dissipating gel sheet. The inner periphery of the cylinder 71 may alternatively be shaped to have a dodecagonal transverse section like the capacitor modules 68. In this case, the spacers 69 are each preferably shaped to have a flat inner peripheral surface and a flat outer peripheral surface.

In this embodiment, the cylinder 71 of the casing 64 has formed therein the coolant path 74 through which coolant flows. The heat generated in the semiconductor modules 66 is also released to the coolant flowing in the coolant path 74. In other words, the casing 64 is equipped with a cooling mechanism. The coolant path 74 is, as clearly illustrated in FIGS. 3 and 4, formed in an annular shape and surrounds the electrical components 62 (i.e., the semiconductor modules 66 and the capacitor module 68). The semiconductor modules 66 are arranged along the inner peripheral surface of the cylinder 71. The coolant path 74 is laid to overlap the semiconductor modules 66 in the radial direction.

The stator 50 is arranged outside the cylinder 71. The electrical components 62 are arranged inside the cylinder 71. This layout causes the heat to be transferred from the stator 50 to the outer side of the cylinder 71 and also transferred from the electrical components 62 (e.g., the semiconductor modules 66) to the inner side of the cylinder 71. It is possible to simultaneously cool the stator 50 and the semiconductor modules 66, thereby facilitating dissipation of thermal energy generated by heat-generating members of the rotating electrical machine 10.

Further, at least one of the semiconductor modules 66 which constitute part or all of the inverter circuits serving to energize the stator winding 51 to drive the rotating electrical machine is arranged in a region surrounded by the stator core 52 disposed radially outside the cylinder 71 of the casing 64. Preferably, one of the semiconductor modules 66 may be arranged fully inside the region surrounded by the stator core 52. More preferably, all the semiconductor modules 66 may be arranged fully in the region surrounded by the stator core 52.

At least a portion of the semiconductor modules 66 is arranged in a region surrounded by the coolant path 74.

Preferably, all the semiconductor modules 66 may be arranged in a region surrounded by the yoke 141.

The electrical components 62 include the insulating sheet 75 disposed on one of axially opposed end surfaces of the capacitor module 68 and the wiring module 76 disposed on the other end surface of the capacitor module 68. The capacitor module 68 has two axially-opposed end surfaces: a first end surface and a second end surface. The first end surface of the capacitor module 68 closer to the bearing unit 20 faces the end surface 72 of the casing 64 and is laid on the end surface 72 through the insulating sheet 75. The second end surface of the capacitor module 68 closer to the opening 65 has the wiring module 76 mounted thereon.

The wiring module 76 includes the resin-made circular plate-shaped body 76a and a plurality of bus bars 76b and 76c embedded in the body 76a. The bus bars 76b and 76c electrically connect the semiconductor modules 66 and the capacitor module 68 together. Specifically, the semiconductor modules 66 are equipped with the connecting pins 66a extending from axial ends thereof. The connecting pins 66a connect with the bus bars 76b radially outside the body 76a. The bus bars 76c extend away from the capacitor module 68 radially outside the body 76a and have top ends connecting with the wiring members 79 (see FIG. 2).

The capacitor module 68, as described above, has the insulating sheet 75 mounted on the first end surface thereof. The capacitor module 68 also has the wiring module 76 mounted on the second end surface thereof. The capacitor module 68, therefore, has two heat dissipating paths which extend from the first and second end surfaces of the capacitor module 68 to the end surface 72 and the cylinder 71. Specifically, a heat dissipating path is defined which extends from the first end surface to the end surface 72. Another heat dissipating path is defined which extends from the second end surface to the cylinder 71. This enables the heat to be released from the end surfaces of the capacitor module 68 other than the outer peripheral surface on which the semiconductor modules 66 are arranged. In other words, it is possible to dissipate the heat not only in the radial direction, but also in the axial direction.

The capacitor module 68 is of a hollow cylindrical shape and has the rotating shaft 11 arranged therewithin at a given interval away from the inner periphery of the capacitor module 68, so that heat generated by the capacitor module 68 will be dissipated from the hollow cylindrical space. The rotation of the rotating shaft 11 usually produces a flow of air, thereby enhancing cooling effects.

The wiring module 76 has the disc-shaped control board 67 attached thereto. The control board 67 includes a printed circuit board (PCB) on which given wiring patterns are formed and also has ICs and the control device 77 mounted thereon. The control device 77 serves as a controller and is made of a microcomputer. The control board 67 is secured to the wiring module 76 using fasteners, such as screws. The control board 67 has formed in the center thereof the hole 67a through which the rotating shaft 11 passes.

The wiring module 76 has a first surface and a second surface opposed to each other in the axial direction, that is, a thickness-wise direction of the wiring module 76. The first surface faces the capacitor module 68. The wiring module 76 has the control board 67 mounted on the second surface thereof. The bus bars 76c of the wiring module 76 extend from one of surfaces of the control board 67 to the other. The control board 67 may have cut-outs for avoiding physical interference with the bus bars 76c. For instance, the control board 67 may have the cut-outs formed in portions of the circular outer edge thereof.

The electrical components 62 are, as described already, arranged inside the space surrounded by the casing 64. The housing 30, the rotor 40, and the stator 50 are disposed outside the space in the form of layers. This structure serves to shield against electromagnetic noise generated in the inverter circuits. Specifically, the inverter circuit works to control switching operations of the semiconductor modules 66 in a PWM control mode using a given carrier frequency. The switching operations usually generate electromagnetic noise against which the housing 30, the rotor 40, and the stator 50 which are arranged outside the electrical components 62 shield.

Further, at least a portion of the semiconductor modules 66 is arranged inside the region surrounded by the stator core 52 located radially outside the cylinder 71 of the casing 64, thereby minimizing adverse effects of magnetic flux generated by the semiconductor modules 66 on the stator winding 51 as compared with a case where the semiconductor modules 66 and the stator winding 51 are arranged without the stator core 52 interposed therebetween. The magnetic flux created by the stator winding 51 also hardly affects the semiconductor modules 66. It is more effective that the whole of the semiconductor modules 66 are located in the region surrounded by the stator core 52 disposed radially outside the cylinder 71 of the casing 64. When at least a portion of the semiconductor modules 66 is surrounded by the coolant path 74, it offers a beneficial advantage that the heat produced by the stator winding 51 or the magnet unit 42 is prevented from reaching the semiconductor modules 66.

The cylinder 71 has the through-holes 78 which are formed near the end plate 63 and through which the wiring members 79 (see FIG. 2) pass to electrically connect the stator 50 disposed outside the cylinder 71 and the electrical components 62 arranged inside the cylinder 71. The wiring members 79, as illustrated in FIG. 2, connect with ends of the stator winding 51 and the bus bars 76c of the wiring module 76 using crimping or welding techniques. The wiring members 79 are implemented by, for example, bus bars whose joining surfaces are preferably flattened. A single through-hole 78 or a plurality of through-holes 78 are preferably provided. This embodiment has two through-holes 78. The use of the two through-holes 78 facilitates the ease with which terminals extending from the two sets of the three-phase windings are connected by the wiring members 79, and is suitable for achieving multi-phase wire connections.

The rotor 40 and the stator 50 are, as described already in FIG. 4, arranged within the housing 30 in this order in a radially inward direction. The inverter unit 60 is arranged radially inside the stator 50. If a radius of the inner periphery of the housing 30 is defined as d, the rotor 40 and the stator 50 are located radially outside a distance of d×0.705 away from the center of rotation of the rotor 40. If a region located radially inside the inner periphery of the stator 50 (i.e., the inner circumferential surface of the stator core 52) is defined as a first region X1, and a region radially extending from the inner periphery of the stator 50 to the housing 30 is defined as a second region X2, a cross-sectional area of the first region X1 is set greater than that of the second region X2. In a region where the magnet unit 42 of the rotor 40 overlaps the stator winding 51, the volume of the first region X1 is larger than that of the second region X2.

The rotor 40 and the stator 50 are fabricated as a magnetic circuit component assembly. In the housing 30, the first region X1 which is located radially inside the inner peripheral surface of the magnetic circuit component assembly is larger in volume than the region X2 which lies between the inner peripheral surface of the magnetic circuit component assembly and the housing 30 in the radial direction.

Next, the structures of the rotor 40 and the stator 50 will be described below in more detail.

Typical rotating electrical machines are known which are equipped with a stator with an annular stator core which is made of a stack of steel plates and has a stator winding wound in a plurality of slots arranged in a circumferential direction of the stator core. Specifically, the stator core has teeth extending in a radial direction thereof at a given interval away from a yoke. Each slot is formed between the two radially adjacent teeth. In each slot, a plurality of conductors are arranged in the radial direction in the form of layers to form the stator winding.

However, the above described stator structure has a risk that when the stator winding is energized, an increase in magnetomotive force in the stator winding may result in magnetic saturation in the teeth of the stator core, thereby restricting torque density in the rotating electrical machine. In other words, rotational flux, as created by the energization of the stator winding of the stator core, is thought of as concentrating on the teeth, which has a risk of causing magnetic saturation.

Generally, IPM (Interior Permanent Magnet) rotors are known which have a structure in which permanent magnets are arranged on a d-axis of a d-q axis coordinate system, and a rotor core is placed on a q-axis of the d-q axis coordinate system. Excitation of a stator winding near the d-axis will cause an excited magnetic flux to flow from a stator to a rotor according to Fleming's rules. This causes magnetic saturation to occur widely in the rotor core on the q-axis.

Figure 7:
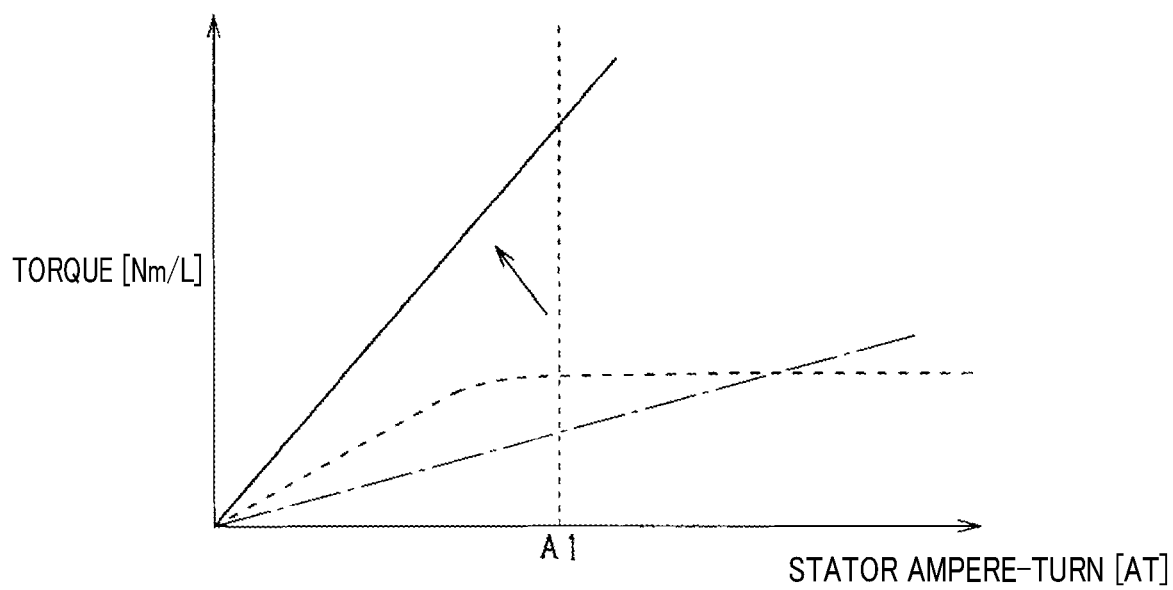
FIG. 7 is a torque diagrammatic view which demonstrates a relationship between ampere-turns and torque density in a stator winding.

FIG. 7 is a torque diagrammatic view which demonstrates a relationship between an ampere-turn (AT) representing a magnetomotive force created by the stator winding and a torque density (Nm/L). A broken line indicates characteristics of a typical IPM rotor-rotating electrical machine. FIG. 7 shows that in the typical rotating electrical machine, an increase in magnetomotive force in the stator will cause magnetic saturation to occur at two places: the tooth between the slots and the q-axis rotor (i.e., the rotor core on the q-axis), thereby restricting an increase in torque. In this way, a design value of the ampere-turn is restricted at A1 in the typical rotating electrical machine.

In order to alleviate the above problem in this embodiment, the rotating electrical machine 10 is designed to have an additional structure, as will be described below, in order to eliminate the restriction arising from the magnetic saturation. Specifically, as a first measure, the stator 50 is designed to have a slot-less structure for eliminating the magnetic saturation occurring in the teeth of the stator core of the stator and also to use an SPM (Surface Permanent Magnet) rotor for eliminating the magnetic saturation occurring in a q-axis core of the IPM rotor. The first measure serves to eliminate the above described two places where the magnetic saturation occurs, but however, may result in a decrease in torque in a low-current region (see an alternate long and short dash line in FIG. 7). In order to alleviate this problem, as a second measure, a polar anisotropic structure is employed to increase the length of a magnetic path of magnets in the magnet unit 42 of the rotor 40 to enhance a magnetic force in order to increase a magnetic flux in the SPM rotor to minimize the torque decrease.

Additionally, as a third measure, a flattened conductor structure is employed to decrease a thickness of conductors of the coil side portion 53 of the stator winding 51 in the radial direction of the stator 50 for compensating for the torque decrease. The above magnetic force-enhanced polar anisotropic structure is thought of as resulting in a flow of large eddy current in the stator winding 51 facing the magnet unit 42. The third measure is, however, to employ the flattened conductor structure in which the conductors have a decreased thickness in the radial direction, thereby minimizing the generation of the eddy current in the stator winding 51 in the radial direction. In this way, the above first to third structures are, as indicated by a solid line in FIG. 7, expected to greatly improve the torque characteristics using high-magnetic force magnets and also alleviate a risk of generation of a large eddy current resulting from the use of the high-magnetic force magnets.

Additionally, as a fourth measure, a magnet unit is employed which has a polar anisotropic structure to create a magnetic density distribution approximating a sine wave. This increases a sine wave matching percentage using pulse control, as will be described later, to enhance the torque and also results in a moderate change in magnetic flux, thereby minimizing an eddy-current loss (i.e., a copper loss caused by eddy current) as compared with radial magnets.

The sine wave matching percentage will be described below. The sine wave matching percentage may be derived by comparing a waveform, a cycle, and a peak value of a surface magnetic flux density distribution measured by actually moving a magnetic flux probe on a surface of a magnet with those of a sine wave. The since wave matching percentage is given by a percentage of an amplitude of a primary waveform that is a waveform of a fundamental wave in a rotating electrical machine to that of the actually measured waveform, that is, an amplitude of the fundamental wave to which a harmonic component is added. An increase in the sine wave matching percentage will cause the waveform in the surface magnetic flux density distribution to approach the waveform of the sine wave. When an electrical current of a primary sine wave is delivered by an inverter to a rotating electrical machine equipped with magnets having an improved sine wave matching percentage, it will cause a large degree of torque to be produced, combined with the fact that the waveform in the surface magnetic flux density distribution of the magnet is close to the waveform of a sine wave. The surface magnetic flux density distribution may alternatively be derived using electromagnetic analysis according to Maxwell's equations.

As a fifth measure, the stator winding 51 is designed to have a conductor strand structure made of a bundle of wires. In the conductor strand structure of the stator winding 51, the wires are connected parallel to each other, thus enabling a high current or large amount of current to flow in the stator winding 51 and also minimizing an eddy current occurring in the conductors widened in the circumferential direction of the stator 50 more effectively than the third measure in which the conductors are flattened in the radial direction because each of the wires has a decreased transverse sectional area. The use of the bundle of the wires will cancel an eddy current arising from magnetic flux occurring according to Ampere's circuital law in response to the magnetomotive force produced by the conductors.

The use of the fourth and fifth measures minimizes the eddy-current loss resulting from the high magnetic force produced by the high-magnetic force magnets provided by the second measure and also enhance the torque.

Figure 8:
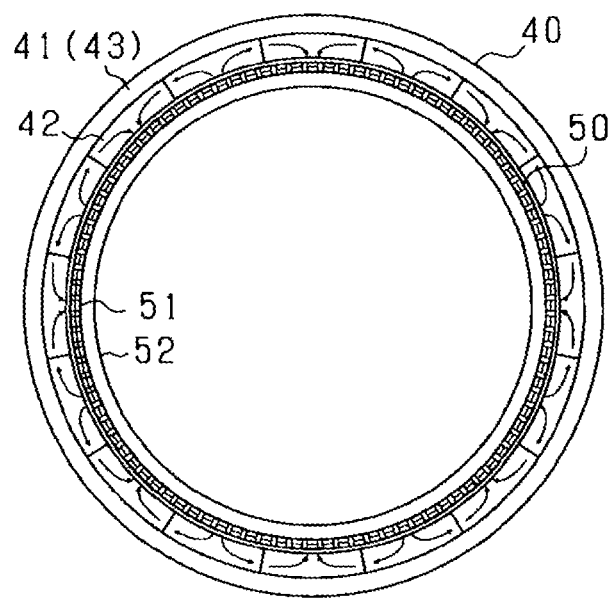
FIG. 8 is a transverse sectional view of a rotor and a stator.
Figure 9:
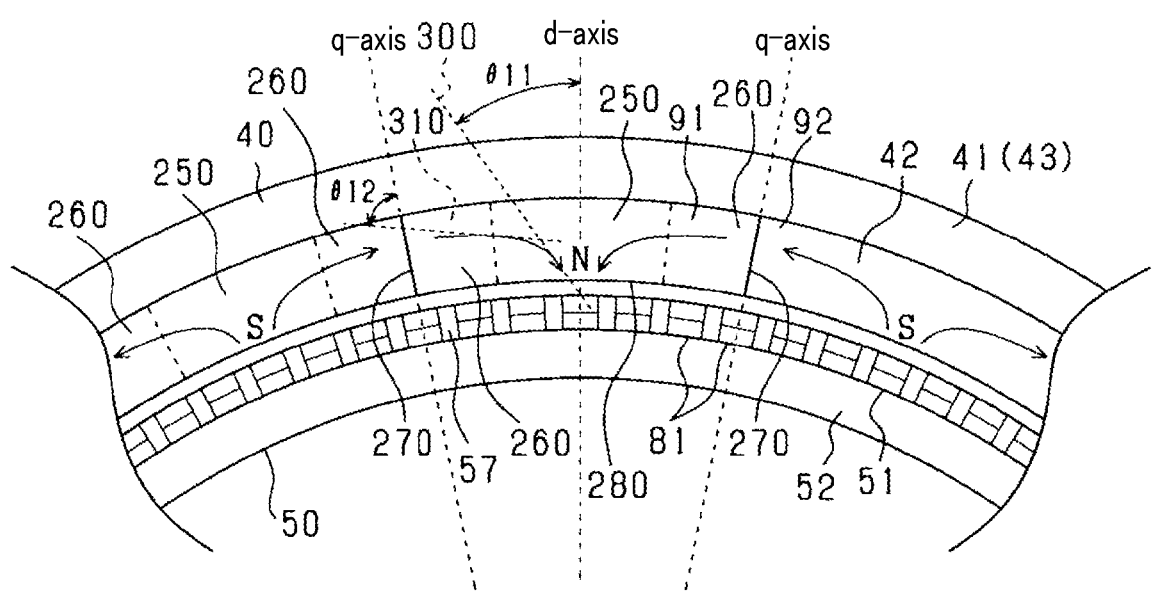
FIG. 9 is an enlarged view of part of FIG. 8.
Figure 10:
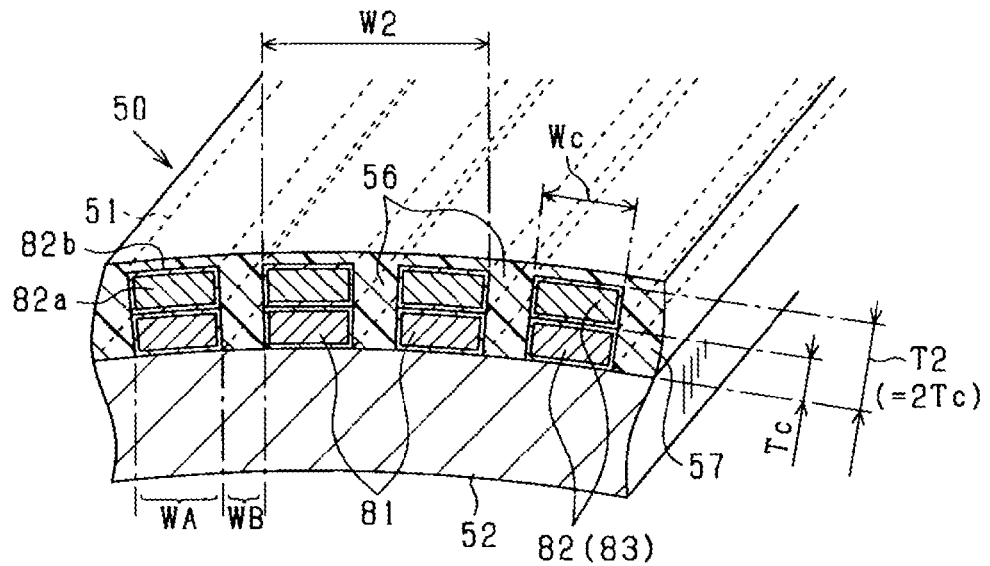
FIG. 10 is a transverse sectional view of a stator.
Figure 11:
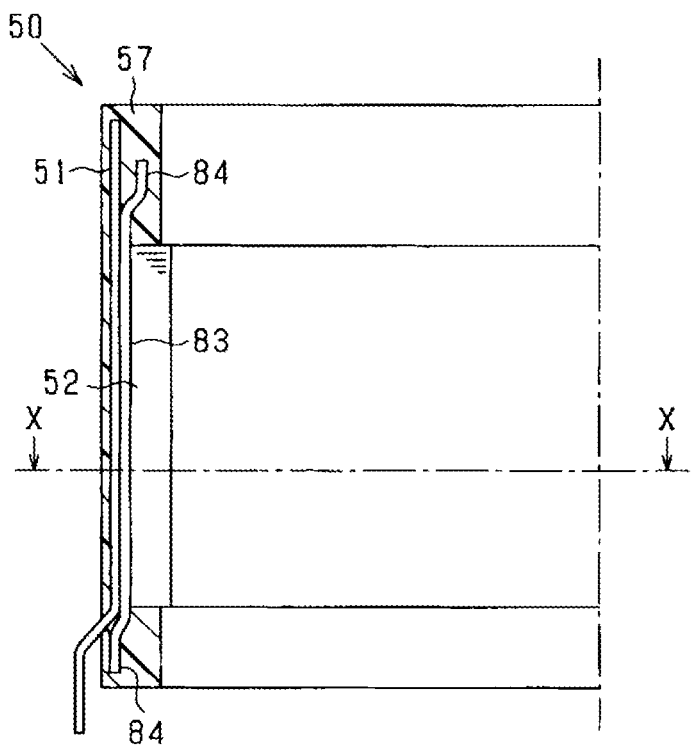
FIG. 11 is a longitudinal sectional view of a stator.
Figure 12:
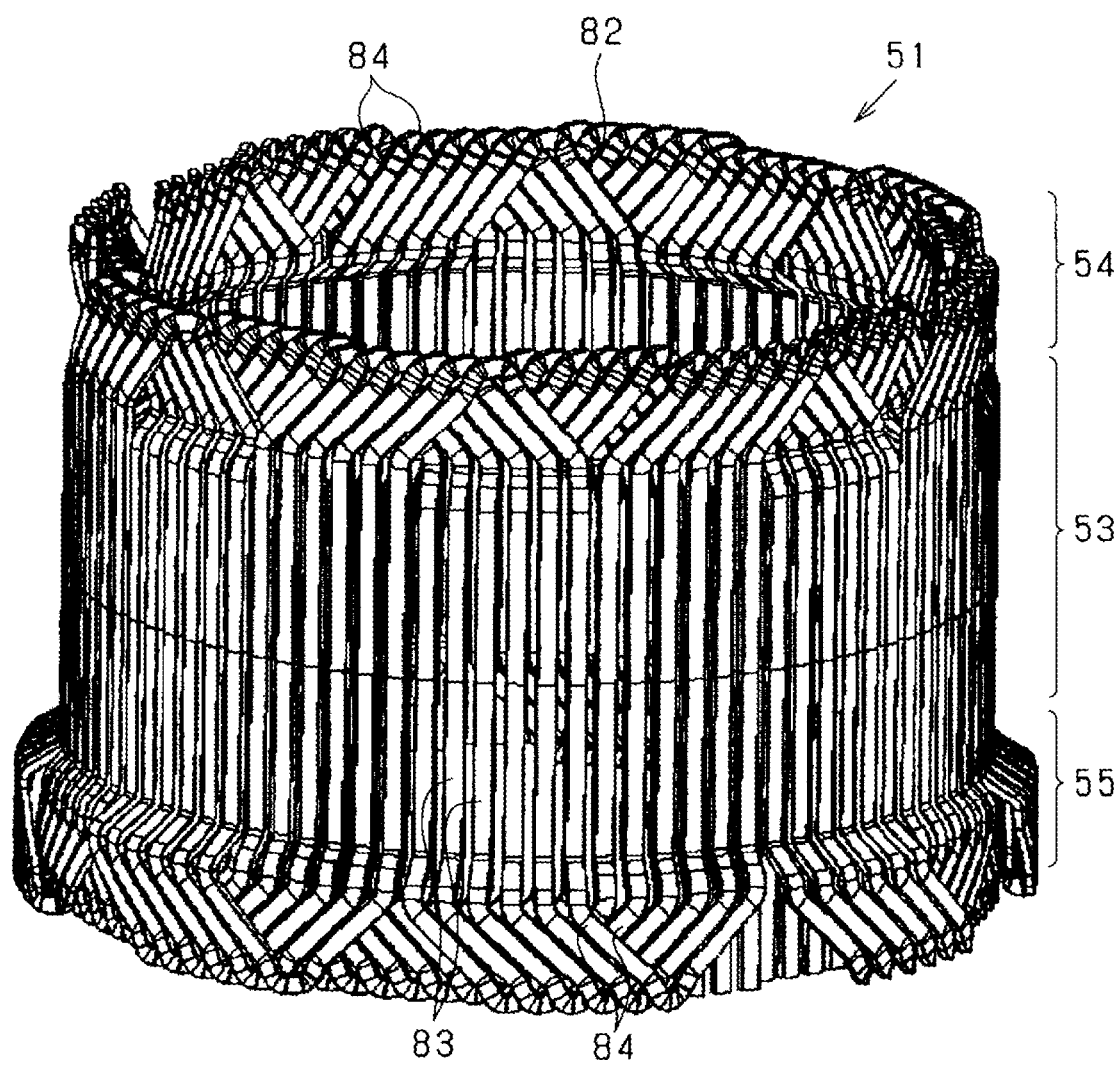
FIG. 12 is a perspective view of a stator winding.

The slot-less structure of the stator 50, the flattened conductor structure of the stator winding 51, and the polar anisotropic structure of the magnet unit 42 will be described below. The slot-less structure of the stator 50 and the flattened conductor structure of the stator winding 51 will first be discussed. FIG. 8 is a transverse sectional view illustrating the rotor 40 and the stator 50. FIG. 9 is a partially enlarged view illustrating the rotor 40 and the stator 50 in FIG. 8. FIG. 10 is a transverse sectional view of the stator 50 taken along the line X-X in FIG. 11. FIG. 11 is a longitudinal sectional view of the stator 50. FIG. 12 is a perspective view of the stator winding 51. FIGS. 8 and 9 indicate directions of magnetization of magnets of the magnet unit 42 using arrows.

The stator core 52 is, as clearly illustrated in FIGS. 8 to 11, of a cylindrical shape and made of a plurality of magnetic steel plates stacked in the axial direction of the stator core 52 to have a given thickness in a radial direction of the stator core 52. The stator winding 51 is mounted on the outer periphery of the stator core 52 which faces the rotor 40. The outer peripheral surface of the stator core 52 facing the rotor 40 serves as a conductor mounting portion (i.e., a conductor area). The outer peripheral surface of the stator core 52 is shaped as a curved surface without any irregularities. A plurality of conductor groups 81 are arranged on the outer peripheral surface of the stator core 52 at given intervals away from each other in the circumferential direction of the stator core 52. The stator core 52 functions as a back yoke that is a portion of a magnetic circuit working to rotate the rotor 40. The stator 50 is designed to have a structure in which a tooth (i.e., a core) made of a soft magnetic material is not disposed between a respective two of the conductor groups 81 arranged adjacent each other in the circumferential direction (i.e., the slot-less structure). In this embodiment, a resin material of the sealing member 57 is disposed in the space or gap 56 between a respective adjacent two of the conductor groups 81. In other words, the stator 50 has an inter-conductor member which is disposed between the conductor groups 81 arranged adjacent each other in the circumferential direction of the stator 50 and made of a non-magnetic material. The inter-conductor members serve as the sealing members 57. Before the sealing members 57 are placed to seal the gaps 56, the conductor groups 81 are arranged in the circumferential direction radially outside the stator core 52 at a given interval away from each other through the gaps 56 that are conductor-to-conductor regions. This makes up the slot-less structure of the stator 50. In other words, each of the conductor groups 81 is, as described later in detail, made of two conductors 82. An interval between a respective two of the conductor groups 81 arranged adjacent each other in the circumferential direction of the stator 50 is occupied only by a non-magnetic material. The non-magnetic material, as referred to herein, includes a non-magnetic gas, such as air, or a non-magnetic liquid. In the following discussion, the sealing members 57 will also be referred to as inter-conductor members.

The structure, as referred to herein, in which the teeth are respectively disposed between the conductor groups 81 arrayed in the circumferential direction means that each of the teeth has a given thickness in the radial direction and a given width in the circumferential direction of the stator 50, so that a portion of the magnetic circuit, that is, a magnet magnetic path lies between the adjacent conductor groups 81. In contrast, the structure in which no tooth lies between the adjacent conductor groups 81 means that there is no magnetic circuit between the adjacent conductor groups 81.

The stator winding (i.e., the armature winding) 51, as illustrated in FIG. 10, has a given thickness T2 (which will also be referred to below as a first dimension) and a width W2 (which will also be referred to below as a second dimension). The thickness T2 is given by a minimum distance between an outer side surface and an inner side surface of the stator winding 51 which are opposed to each other in the radial direction of the stator 50. The width W2 is given by a dimension of a portion of the stator winding 51 which functions as one of multiple phases (i.e., the U-phase, the V-phase, the W-phase, the X-phase, the Y-phase, and the Z-phase in this embodiment) of the stator winding 51 in the circumferential direction. Specifically, in a case where the two conductor groups 81 arranged adjacent each other in the circumferential direction in FIG. 10 serve as one of the three phases, for example, the U-phase winding, a distance between circumferentially outermost ends of the two circumferentially adjacent conductor groups 81 is the width W2. The thickness T2 is smaller than the width W2.

The thickness T2 is preferably set smaller than the sum of widths of the two conductor groups 81 within the width W2. If the stator winding 51 (more specifically, the conductor 82) is designed to have a true circular transverse section, an oval transverse section, or a polygonal transverse section, the cross section of the conductor 82 taken in the radial direction of the stator 50 may be shaped to have a maximum dimension W12 in the radial direction of the stator 50 and a maximum dimension W11 in the circumferential direction of the stator 50.

The stator winding 51 is, as can be seen in FIGS. 10 and 11, sealed by the sealing members 57 which are formed by a synthetic resin mold. Specifically, the stator winding 51 and the stator core 52 are put in a mould together when the sealing members 57 are moulded by the resin. The resin may be considered as a non-magnetic material or an equivalent thereof whose Bs (saturation magnetic flux density) is zero.

As a transverse section is viewed in FIG. 10, the sealing members 57 are provided by placing synthetic resin in the gaps 56 between the conductor groups 81. The sealing members 57 serve as insulators arranged between the conductor groups 81. In other words, each of the sealing members 57 functions as an insulator in one of the gaps 56. The sealing members 57 occupy a region which is located radially outside the stator core 52, and includes all the conductor groups 81, in other words, which is defined to have a dimension larger than that of each of the conductor groups 81 in the radial direction.

As a longitudinal section is viewed in FIG. 11, the sealing members 57 lie to occupy a region including the turns 84 of the stator winding 51. Radially inside the stator winding 51, the sealing members 57 lie in a region including at least a portion of the axially opposed ends of the stator core 52. In this case, the stator winding 51 is fully sealed by the resin except for the ends of each phase winding, i.e., terminals joined to the inverter circuits.

The structure in which the sealing members 57 are disposed in the region including the ends of the stator core 52 enables the sealing members 57 to compress the stack of the steel plates of the stator core 52 inwardly in the axial direction. In other words, the sealing members 57 work to firmly retain the stack of the steel plates of the stator core 52. In this embodiment, the inner peripheral surface of the stator core 52 is not sealed using resin, but however, the whole of the stator core 52 including the inner peripheral surface may be sealed using resin.

In a case where the rotating electrical machine 10 is used as a power source for a vehicle, the sealing members 57 are preferably made of a high heat-resistance fluororesin, epoxy resin, PPS resin, PEEK resin, LCP resin, silicone resin, PAI resin, or PI resin. In terms of a linear coefficient expansion to minimize breakage of the sealing members 57 due to an expansion difference, the sealing members 57 are preferably made of the same material as that of an outer film of the conductors of the stator winding 51. The silicone resin whose linear coefficient expansion is twice or more those of other resins is preferably excluded from the material of the sealing members 57. In a case of electrical products, such as electric vehicles equipped with no combustion engine, PPO resin, phenol resin, or FRP resin which resists 180° C. may be used, except in fields where an ambient temperature of the rotating electrical machine is expected to be not higher than 100° C.

The degree of torque outputted by the rotating electrical machine 10 is usually proportional to the degree of magnetic flux. In a case where a stator core is equipped with teeth, a maximum amount of magnetic flux in the stator core is restricted depending upon the saturation magnetic flux density in the teeth, while in a case where the stator core is not equipped with teeth, the maximum amount of magnetic flux in the stator core is not restricted. Such a structure is, therefore, useful for increasing an amount of electrical current delivered to the stator winding 51 to increase the degree of torque produced by the rotating electrical machine 10.

This embodiment employs the slot-less structure in which the stator 50 is not equipped with teeth, thereby resulting in a decrease in inductance of the stator 50. Specifically, a stator of a typical rotating electrical machine in which conductors are disposed in slots isolated by teeth from each other has an inductance of approximately 1 mH, while the stator 50 in this embodiment has a decreased inductance of 5 to 60 μH. The rotating electrical machine 10 in this embodiment is of an outer rotor type, but has a decreased inductance of the stator 50 to decrease a mechanical time constant Tm. In other words, the rotating electrical machine 10 is capable of outputting a high degree of torque and designed to have a decreased value of the mechanical time constant Tm. If inertia is defined as J, inductance is defined as L, torque constant is defined as Kt, and back electromotive force constant is defined as Ke, the mechanical time constant Tm is calculated according to the equation of Tm=(J×L)/(Kt×Ke). This shows that a decrease in inductance L will result in a decrease in mechanical time constant Tm.

Each of the conductor groups 81 arranged radially outside the stator core 52 is made of a plurality of conductors 82 whose transverse section is of a flattened rectangular shape and which are disposed on one another in the radial direction of the stator core 52. Each of the conductors 82 is oriented to have a transverse section meeting a relation of radial dimension<circumferential dimension. This causes each of the conductor groups 81 to be thin in the radial direction. A conductive region of the conductor group 81 also extends inside a region occupied by teeth of a typical stator. This creates a flattened conductive region structure in which a sectional area of each of the conductors 82 is increased in the circumferential direction, thereby alleviating a risk that the amount of thermal energy may be increased by a decrease in sectional area of a conductor arising from flattening of the conductor. A structure in which a plurality of conductors are arranged in the circumferential direction and connected in parallel to each other is usually subjected to a decrease in sectional area of the conductors by a thickness of a coated layer of the conductors, but however, has beneficial advantages obtained for the same reasons as described above. In the following discussion, each of the conductor groups 81 or each of the conductors 82 will also be referred to as a conductive member.

The stator 50 in this embodiment is, as described already, designed to have no slots, thereby enabling the stator winding 51 to be designed to have a conductive region of an entire circumferential portion of the stator 50 which is larger in size than a non-conductive region unoccupied by the stator winding 51 in the stator 50. In typical rotating electrical machines for vehicles, a ratio of the conductive region/the non-conductive region is usually one or less. In contrast, this embodiment has the conductor groups 81 arranged to have the conductive region substantially identical in size with or larger in size than the non-conductive region. If the conductor region, as illustrated in FIG. 10, occupied by the conductor 82 (i.e., the straight section 83 which will be described later in detail) in the circumferential direction is defined as WA, and a conductor-to-conductor region that is an interval between a respective adjacent two of the conductors 82 is defined as WB, the conductor region WA is larger in size than the conductor-to-conductor region WB in the circumferential direction.

The conductor group 81 of the stator winding 51 has a thickness in the radial direction thereof which is smaller than a circumferential width of a portion of the stator winding 51 which lies in a region of one magnetic pole and serves as one of the phases of the stator winding 51. In the structure in which each of the conductor groups 81 is made up of the two conductors 82 stacked in the form of two layers lying on each other in the radial direction, and the two conductor groups 81 are arranged in the circumferential direction within a region of one magnetic pole for each phase, a relation of Tc×2<Wc×2 is met where Tc is the thickness of each of the conductors 82 in the radial direction, and Wc is the width of each of the conductors 82 in the circumferential direction. In another structure in which each of the conductor groups 81 is made up of the two conductors 82, and each of the conductor groups 81 lies within the region of one magnetic pole for each phase, a relation of Tc×2<Wc is preferably met. In other words, in the stator winding 51 which is designed to have conductor portions (i.e., the conductor groups 81) arranged at a given interval away from each other in the circumferential direction, the thickness of each conductor portion (i.e., the conductor group 81) in the radial direction is set smaller than the width of a portion of the stator winding 51 lying in the region of one magnetic pole for each phase in the circumferential direction.

In other words, each of the conductors 82 is preferably shaped to have the thickness Tc in the radial direction which is smaller than the width Wc in the circumferential direction. The thickness 2Tc of each of the conductor groups 81 each made of a stack of the two conductors 82 in the radial direction is preferably smaller than the width Wc of each of the conductor groups 81 in the circumferential direction.

The degree of torque produced by the rotating electrical machine 10 is substantially inversely proportional to the thickness of the stator core 52 in the radial direction. The conductor groups 81 arranged radially outside the stator core 52 are, as described above, designed to have the thickness decreased in the radial direction. This design is useful in increasing the degree of torque outputted by the rotating electrical machine 10. This is because a distance between the magnet unit 42 of the rotor 40 and the stator core 52 (i.e., a distance in which there is no iron) may be decreased to decrease the magnetic resistance. This enables interlinkage magnetic flux in the stator core 52 produced by the permanent magnets to be increased to enhance the torque.

The decrease in thickness of the conductor groups 81 facilitates the ease with which a magnetic flux leaking from the conductor groups 81 is collected in the stator core 52, thereby preventing the magnetic flux from leaking outside the stator core 52 without being used for enhancing the torque. This avoids a drop in magnetic force arising from the leakage of the magnetic flux and increases the interlinkage magnetic flux in the stator core 52 produced by the permanent magnets, thereby enhancing the torque.

Each of the conductors 82 is made of a coated conductor formed by covering the surface of the conductor body 82a with the coating 82b. The conductors 82 stacked on one another in the radial direction are, therefore, insulated from each other. Similarly, the conductors 82 are insulated from the stator core 52. The insulating coating 82b may be a coating of each wire 86, as will be described later in detail, in a case where each wire 86 is made of wire with a self-bonded coating or may be made by an additional insulator disposed on a coating of each wire 86. Each phase winding made of the conductors 82 is insulated by the coating 82b except an exposed portion thereof for joining purposes. The exposed portion includes, for example, an input or an output terminal or a neutral point in a case of a star connection. The conductor groups 81 arranged adjacent each other in the radial direction are firmly adhered to each other using resin or self-bonding coated wire, thereby minimizing a risk of insulation breakdown, mechanical vibration, or noise caused by rubbing of the conductors 82.

Figure 13:
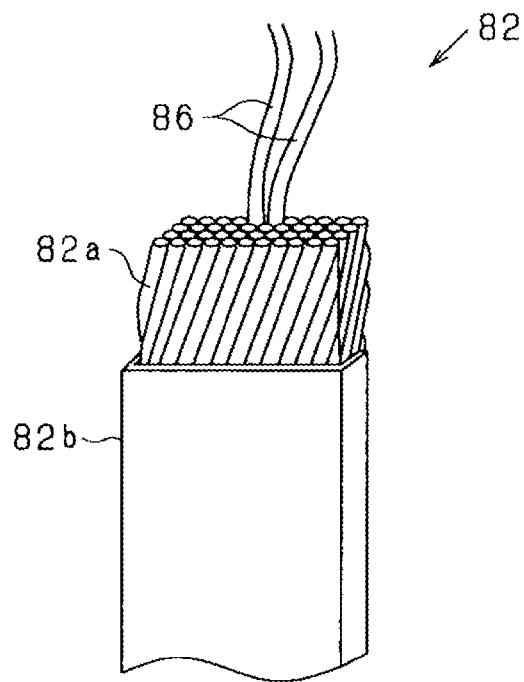
FIG. 13 is a perspective view of a conductor.
Figure 14:
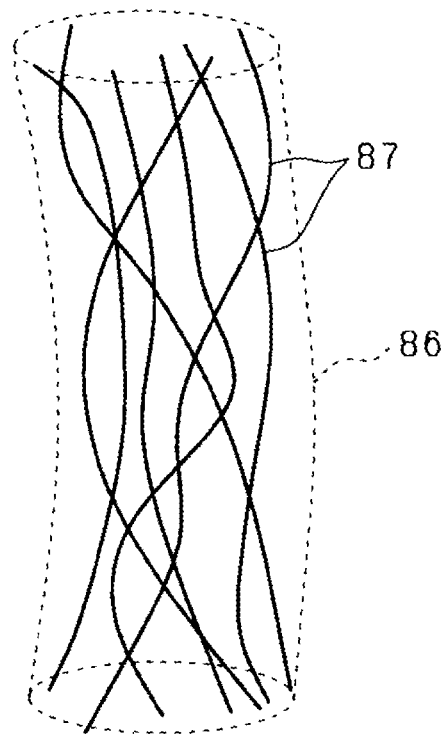
FIG. 14 is a schematic view illustrating a structure of wire.

In this embodiment, the conductor body 82a is made of a collection of a plurality of wires 86. Specifically, the conductor body 82a is, as can be seen in FIG. 13, made of a strand of the twisted wires 86. Each of the wires 86 is, as can be seen in FIG. 14, made of a bundle of a plurality of thin conductive fibers 87. For instance, each of the wires 86 is made of a complex of CNT (carbon nanotube) fibers. The CNT fibers include boron-containing microfibers in which at least a portion of carbon is substituted with boron. Instead of the CNT fibers that are carbon-based microfibers, vapor grown carbon fiber (VGCF) may be used, but however, CNT fiber is preferable. The surface of the wire 86 is covered with a layer of insulating polymer, such as enamel. The surface of the wire 86 is preferably covered with an enamel coating, such as polyimide coating or amide-imide coating.

The conductors 82 constitute n-phase windings of the stator winding 51. The wires 86 of each of the conductors 82 (i.e., the conductor body 82a) are placed in contact with each other. Each of the conductors 82 has one or more portions which are formed by twisting the wires 86 and define one or more portions of a corresponding one of the phase-windings. A resistance value between the twisted wires 86 is larger than that of each of the wires 86. In other words, the respective adjacent two wires 86 have a first electrical resistivity in a direction in which the wires 86 are arranged adjacent each other. Each of the wires 86 has a second electrical resistivity in a lengthwise direction of the wire 86. The first electrical resistivity is larger than the second electrical resistivity. Each of the conductors 82 may be made of an assembly of wires, i.e., the twisted wires 86 covered with insulating members whose first electrical resistivity is very high. The conductor body 82a of each of the conductors 82 is made of a strand of the twisted wires 86.

The conductor body 82a is, as described above, made of the twisted wires 86, thereby reducing an eddy current created in each of the wires 86, which reduces an eddy current in the conductor body 82a. Each of the wires 86 is twisted, thereby causing each of the wires 86 to have portions where directions of applied magnetic field are opposite each other, which cancels a back electromotive force. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

How to insulate the wires 86 from each other is not limited to the above described use of the polymer insulating layer, but the contact resistance may be used to resist a flow of current between the wires 86. In other words, the above beneficial advantage is obtained by a difference in potential arising from a difference between the resistance between the twisted wires 86 and the resistance of each of the wires 86 as long as the resistance between the wires 86 is larger than that of each of the wires 86. For instance, the contact resistance may be increased by using production equipment for the wires 86 and production equipment for the stator 50 (i.e., an armature) of the rotating electrical machine 10 as discrete devices to cause the wires 86 to be oxidized during a transport time or a work interval.

Each of the conductors 82 is, as described above, of a low-profile or flattened rectangular shape in cross section. The multiple conductors 82 are arranged in the radial direction. Each of the conductors 82 is made of a strand of the wires 86 each of which is formed by a self-bonding coating wire equipped with, for example, a fusing or bonding layer or an insulating layer and which are twisted with the bonding layers fused together. Each of the conductors 82 may alternatively be made by forming twisted wires with no bonding layer or twisted self-bonding coating wires into a desired shape using synthetic resin. The insulating coating 82b of each of the conductors 82 may have a thickness of 80 μm to 100 μm which is larger than that of a coating of typical wire (i.e., 5 μm to 40 μm). In this case, a required degree of insulation between the conductors 82 is achieved even if no insulating sheet is interposed between the conductors 82.

It is also advisable that the insulating coating 82b be higher in degree of insulation than the insulating layer of the wire 86 to achieve insulation between the phase windings. For instance, the polymer insulating layer of the wire 86 has a thickness of, for example, 5 μm. In this case, the thickness of the insulating coating 82b of the conductor 82 is preferably selected to be 80 μm to 100 μm to achieve the insulation between the phase windings.

Each of the conductors 82 may alternatively be made of a bundle of the untwisted wires 86. In brief, each of the conductors 82 may be made of a bundle of the wires 86 whose entire lengths are twisted, whose portions are twisted, or whose entire lengths are untwisted. Each of the conductors 82 constituting the conductor portion is, as described above, made of a bundle of the wires 86. The resistance between the wires 86 is larger than that of each of the wires 86.

The conductors 82 are each bent and arranged in a given pattern in the circumferential direction of the stator winding 51, thereby forming the phase-windings of the stator winding 51. The stator winding 51, as illustrated in FIG. 12, includes the coil side portion 53 and the coil ends 54 and 55. The conductors 82 have the straight sections 83 which extend straight in the axial direction of the stator winding 51 and form the coil side portion 53. The conductors 82 have the turns 84 which are arranged outside the coil side portion 53 in the axial direction and form the coil ends 54 and 55. Each of the conductor 82 is made of a wave-shaped string of conductor formed by alternately arranging the straight sections 83 and the turns 84. The straight sections 83 are arranged to face the magnet unit 42 in the radial direction. The straight sections 83 are arranged at a given interval away from each other and joined together using the turns 84 located outside the magnet unit 42 in the axial direction. The straight sections 83 correspond to a magnet facing portion.

In this embodiment, the stator winding 51 is shaped in the form of an annular distributed winding. In the coil side portion 53, the straight sections 83 are arranged at an interval away from each other which corresponds to each pole pair of the magnet unit 42 for each phase. In each of the coil ends 54 and 55, the straight sections 83 for each phase are joined together by the turn 84 which is of a V-shape. The straight sections 83 which are paired for each pole pair are opposite to each other in a direction of flow of electrical current. A respective two of the straight sections 83 which are joined together by each of the turns 84 are different between the coil end 54 and the coil end 55. The joints of the straight sections 83 by the turns 84 are arranged in the circumferential direction on each of the coil ends 54 and 55 to complete the stator winding in a hollow cylindrical shape.

More specifically, the stator winding 51 is made up of two pairs of the conductors 82 for each phase. The stator winding 51 is equipped with a first three-phase winding set including the U-phase winding, the V-phase winding, and the W-phase winding and a second three-phase phase winding set including the X-phase winding, the Y-phase winding, and the Z-phase winding. The first three-phase phase winding set and the second three-phase winding set are arranged adjacent each other in the radial direction in the form of two layers. If the number of phases of the stator winding 51 is defined as S (i.e., 6 in this embodiment), the number of the conductors 82 for each phase is defined as m, 2×S×m=2Sm conductors 82 are used for each pole pair in the stator winding 51. The rotating electrical machine in this embodiment is designed so that the number of phases S is 6, the number m is 4, and 8 pole pairs are used. 6×4×8=192 conductors 82 are arranged in the circumferential direction of the stator core 52.

The stator winding 51 in FIG. 12 is designed to have the coil side portion 53 which has the straight sections 82 arranged in the form of two overlapping layers disposed adjacent each other in the radial direction. Each of the coil ends 54 and 55 has a respective two of the turns 84 which extend from the radially overlapping straight sections 82 in opposite circumferential directions. In other words, the conductors 82 arranged adjacent each other in the radial direction are opposite to each other in direction in which the turns 84 extend except for ends of the stator winding 51.

Figure 15A:
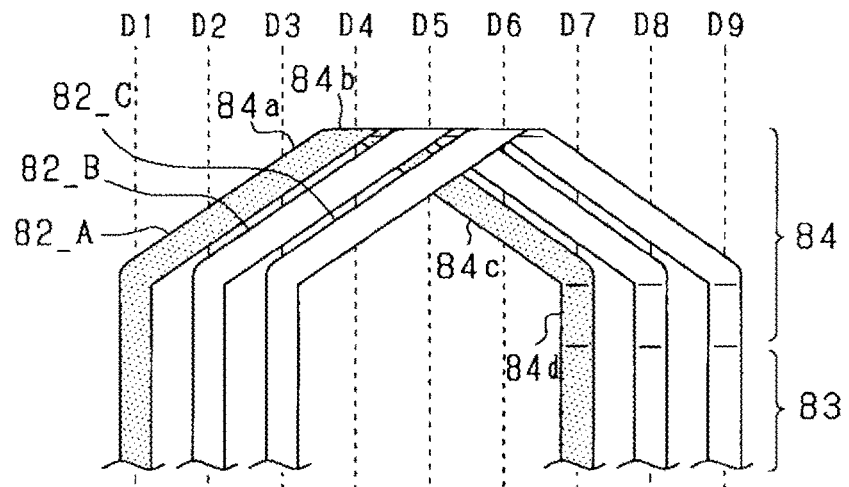
FIGS. 15(a) and 15(b) are views showing the layout of conductors at the $n^{th}$ layer position.
Figure 15B:
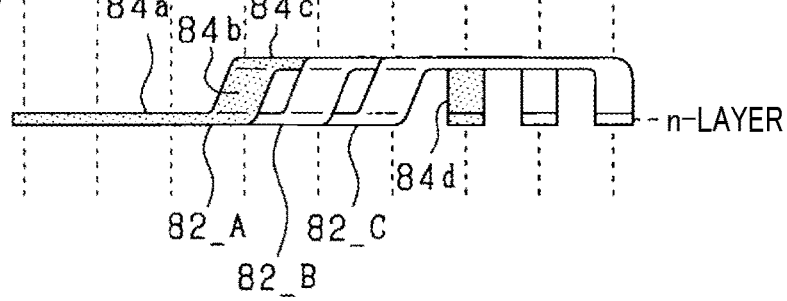

A winding structure of the conductors 82 of the stator winding 51 will be described below in detail. In this embodiment, the conductors 82 formed in the shape of a wave winding are arranged in the form of a plurality of layers (e.g., two layers) disposed adjacent or overlapping each other in the radial direction. FIGS. 15(a) and 15(b) illustrate the layout of the conductors 82 which form the $n^{th}$ layer. FIG. 15(a) shows the configurations of the conductor 82, as the side of the stator winding 51 is viewed. FIG. 15(b) shows the configurations of the conductors 82 as viewed in the axial direction of the stator winding 51. In FIGS. 15(a) and 15(b), locations of the conductor groups 81 are indicated by symbols D1, D2, D3 . . . , and D9. For the sake of simplicity of disclosure, FIGS. 15(a) and 15(b) show only three conductors 82 which will be referred to herein as the first conductor 82_A, the second conductor 82_B, and the third conductor 82_C.

The conductors 82_A to 82_C have the straight sections 83 arranged at a location of the $n^{th}$ layer, in other words, at the same position in the circumferential direction. Every two of the straight sections 82 which are arranged at 6 pitches (corresponding to 3×m pairs) away from each other are joined together by one of the turns 84. In other words, in the conductors 82_A to 82_C, an outermost two of the seven straight sections 83 arranged in the circumferential direction of the stator winding 51 on the same circle defined about the center of the rotor 40 are joined together using one of the turns 84. For instance, in the first conductor 82_A, the straight sections 83 placed at the locations D1 and D7 are joined together by the inverse V-shaped turn 84. The conductors 82_B and 82_C are arranged at an interval equivalent to an interval between a respective adjacent two of the straight sections 83 away from each other in the circumferential direction at the location of the $n^{th}$ layer. In this layout, the conductors 82_A to 82_C are placed at a location of the same layer, thereby resulting in a risk that the turns 84 thereof may physically interfere with each other. In order to alleviate such a risk, each of the turns 84 of the conductors 82_A to 82_C in this embodiment is shaped to have an interference avoiding portion formed by offsetting a portion of the turn 84 in the radial direction.

Specifically, the turn 84 of each of the conductors 82_A to 82_C includes the slant portion 84a, the head portion 84b, the slant portion 84c, and the return portion 84d. The slant portion 84a extends in the circumferential direction of the same circle (which will also be referred to as a first circle). The head portion 84 extends from the slant portion 84a radially inside the first circle (i.e., upward in FIG. 15(b)) to reach another circle (which will also be referred to as a second circle). The slant portion 84c extends in the circumferential direction of the second circle. The return portion 84d returns from the second circle back to the first circle. The head portion 84b, the slant portion 84c, and the return portion 84d define the interference avoiding portion. The slant portion 84c may be arranged radially outside the slant portion 84a.

In other words, each of the conductors 82_A to 82_C has the turn 84 shaped to have the slant portion 84a and the slant portion 84c which are arranged on opposite sides of the head portion 84b at the center in the circumferential direction. The locations of the slant portions 84a and 84b are different from each other in the radial direction (i.e., a direction perpendicular to the drawing of FIG. 15(a) or a vertical direction in FIG. 15(b)). For instance, the turn 84 of the first conductor 82_A is shaped to extend from the location D1 on the $n^{th}$ layer in the circumferential direction, be bent at the head portion 84b that is the center of the circumferential length of the turn 84 in the radial direction (e.g., radially inwardly), be bent again in the circumferential direction, extend again in the circumferential direction, and then be bent at the return portion 84d in the radial direction (e.g., radially outwardly) to reach the location D7 on the $n^{th}$ layer.

With the above arrangements, the slant portions 84a of the conductors 82_A to 82_C are arranged vertically or downward in the order of the first conductor 82_A, the second conductor 82_B, and the third conductor 82_C. The head portions 84b change the order of the locations of the conductors 82_A to 82_C in the vertical direction, so that the slant portions 84c are arranged vertically or downward in the order of the third conductor 82_3, the second conductor 82_B, and the first conductor 82_A. This layout achieves an arrangement of the conductors 82_A to 82_C in the circumferential direction without any physical interference with each other.

In the structure wherein the conductors 82 are laid to overlap each other in the radial direction to form the conductor group 81, the turns 84 leading to a radially innermost one and a radially outermost one of the straight sections 83 forming the two or more layers are preferably located radially outside the straight sections 83. In a case where the conductors 83 forming the two or more layers are bent in the same radial direction near boundaries between ends of the turns 84 and the straight sections 83, the conductors 83 are preferably shaped not to deteriorate the insulation therebetween due to physical interference of the conductors 83 with each other.

Figure 16:
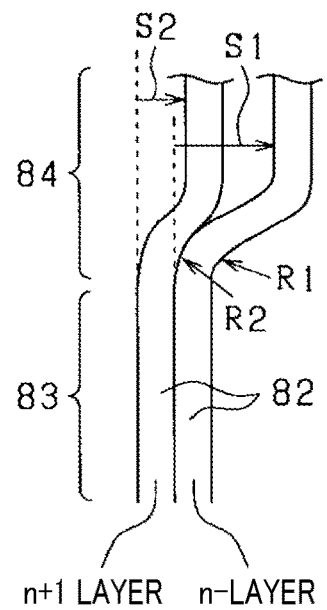
FIG. 16 is a side view showing conductors at the $n^{th}$ layer position and the $(n+1)^{th}$ layer position.

In the example of FIGS. 15(a) and 15(b), the conductors 82 laid on each other in the radial direction are bent radially at the return portions 84d of the turns 84 at the location D7 to D9. It is advisable that the conductor 82 of the $n^{th}$ layer and the conductor 82 of the $n+1^{th}$ layer be bent, as illustrated in FIG. 16, at radii of curvature different from each other. Specifically, the radius of curvature R1 of the conductor 82 of the $n^{th}$ layer is preferably selected to be smaller than the radius of curvature R2 of the conductor 82 of the $n+1^{th}$ layer.

Additionally, radial displacements of the conductor 82 of the $n^{th}$ layer and the conductor 82 of the $n+1^{th}$ layer are preferably selected to be different from each other. If the amount of radial displacement of the conductor 82 of the $n^{th}$ layer is defined as S1, and the amount of radial displacement of the conductor 82 of the $n+1^{th}$ layer located radially outside the nth layer defined as S2, the amount of radial displacement S1 is preferably selected to be greater than the amount of radial displacement S2.

The above layout of the conductors 82 eliminates the risk of interference with each other, thereby ensuring a required degree of insulation between the conductors 82 even when the conductors 82 laid on each other in the radial direction are bent in the same direction.

The structure of the magnet unit 42 of the rotor 40 will be described below. In this embodiment, the magnet unit 42 is made of permanent magnets in which a remanent flux density Br=1.0 T, and an intrinsic coercive force Hcj=400 kA/m. The permanent magnets used in this embodiment are implemented by sintered magnets formed by sintering grains of magnetic material and compacting them into a given shape and have the following specifications. The intrinsic coercive force Hcj on a J-H curve is 400 kA/m or more. The remanent flux density Br on the J-H curve is 1.0 T or more. Magnets designed so that when 5,000 to 10,000 AT is applied thereto by phase-to-phase excitation, a magnetic distance between paired poles, i.e., between a N-pole and an S-pole, in other words, of a path in which a magnetic flux flows between the N-pole and the S-pole, a portion lying in the magnet has a length of 25 mm may be used to meet a relation of Hcj=10000A without becoming demagnetized.

In other words, the magnet unit 42 is engineered so that a saturation magnetic flux density Js is 1.2 T or more, a grain size is 10 μm or less, and a relation of Js×α≥1.0 T is met where a is an orientation ratio.

The magnet unit 42 will be additionally described below. The magnet unit 42 (i.e., magnets) has a feature that Js meets a relation of 2.15 T≥Js≥1.2 T. In other words, magnets used in the magnet unit 42 may be FeNi magnets having NdFe11 TiN, Nd2Fe14B, Sm2Fe17N3, or L10 crystals. Note that samarium-cobalt magnets, such as SmCo5, FePt, Dy2Fe14B, or CoPt magnets can not be used. When magnets in which high Js characteristics of neodymium are slightly lost, but a high degree of coercive force of Dy is ensured using the heavy rare earth dysprosium, like in isomorphous compounds, such as Dy2Fe14B and Nd2Fe14B, sometimes meets a relation of 2.15 T≥Js≥1.2 T, they may be used in the magnet unit 42. Such a type of magnet will also be referred to herein as [Nd1-xDyx]2Fe14B]. Further, a magnet contacting different types of compositions, in other words, a magnet made from two or more types of materials, such as FeNi and Sm2Fe17N3, may be used to meet a relation of 2.15 T≥Js≥1.2 T. A mixed magnet made by adding a small amount of, for example, Dy2Fe14B in which Js<1 T to an Nd2Fe14B magnet in which Js=1.6 T, meaning that Js is sufficient to enhance the coercive force, may also be used to meet a relation of 2.15 T≥Js≥1.2 T.

In use of the rotating electrical machine at a temperature outside a temperature range of human activities which is higher than, for example, 60° C. exceeding temperatures of deserts, for example, within a passenger compartment of a vehicle where the temperature may rise to 80° C. in summer, the magnet preferably contains FeNi or Sm2Fe17N3 components which are less dependent on temperature. This is because motor characteristics are greatly changed by temperature-dependent factors thereof in motor operations within a range of approximately −40° which is within a range experienced by societies in Northern Europe to 60° C. or more experienced in desert regions or at 180 to 240° C. that is a heat resistance temperature of the enamel coating, which leads to a difficulty in achieving a required control operation using the same motor driver. The use of FeNi containing the above described L10 crystals or Sm2Fe17N3 magnets will result in a decrease in load on the motor driver because characteristics thereof have temperature-dependent factors lower than half that of Nd2Fe14B magnets.

Additionally, the magnet unit 42 is engineered to use the above described magnet mixing so that a particle size of fine powder before being magnetically oriented is lower than or equal to 10 μm and higher than or equal to a size of single-domain particles. The coercive force of a magnet is usually increased by decreasing the size of powered particles thereof to a few hundred nm. In recent years, smallest possible particles have been used. If the particles of the magnet are too small, the BHmax (i.e., the maximum energy product) of the magnet will be decreased due to oxidization thereof. It is, thus, preferable that the particle size of the magnet is higher than or equal to the size of the single-domain particles. The particle size being only up to the size of the single-domain particles is known to increase the coercive force of the magnet. The particle size, as referred to herein, refers to the diameter or size of fine powdered particles in a magnetic orientation operation in production processes of magnets.

Each of the first magnet 91 and the second magnet 92 of the magnet unit 42 are made of sintered magnets formed by firing or heating magnetic powder at high temperatures and compacting it. The sintering is achieved so as to meet conditions where the saturation magnetization Js of the magnet unit 42 is 1.2 T (Tesla) or more, the particle size of the first magnet 91 and the second magnet 92 is 10 μm or less, and Js×α is higher than or equal to 1.0 T (Tesla) where α is an orientation ratio. Each of the first magnet 91 and the second magnet 92 are also sintered to meet the following conditions. By performing the magnetic orientation in the magnetic orientation operation in the production processes of the first magnet 91 and the second magnet 92, they have an orientation ratio different to the definition of orientation of magnetic force in a magnetization operation for isotropic magnets. The magnet unit 42 in this embodiment is designed to have the saturation magnetization Js more than or equal to 1.2 T and the orientation ratio α of the first magnet 91 and the second magnet 92 which is high to meet a relation of Jr≥Js×α≥1.0 T. The orientation ratio α, as referred to herein, is defined in the following way. If each of the first magnet 91 and the second magnet 92 has six easy axes of magnetization, five of the easy axes of magnetization are oriented in the same direction A10, and a remaining one of the easy axes of magnetization is oriented in the direction B10 angled at 90 degrees to the direction A10, then a relation of α=5/6 is met. Alternatively, if each of the first magnet 91 and the second magnet 92 has six easy axes of magnetization, five of the easy axes of magnetization are oriented in the same direction A10, and a remaining one of the easy axes of magnetization is oriented in the direction B10 angled at 45 degrees to the direction A10, then a relation of α=(5+ 0.707)/6 is met since a component oriented in the direction A10 is expressed by cos 45°=0.707. The first magnet 91 and the second magnet 92 in this embodiment are, as described above, each made using sintering techniques, but however, they may be produced in another way as long as the above conditions are satisfied. For instance, a method of forming an MQ3 magnet may be used.

In this embodiment, permanent magnets are used which are magnetically oriented to control the easy axis of magnetization thereof, thereby enabling a magnetic circuit length within the magnets to be longer than that within typical linearly oriented magnets which produces a magnetic flux density of 1.0 T or more. In other words, the magnetic circuit length for one pole pair in the magnets in this embodiment may be achieved using magnets with a small volume. Additionally, a range of reversible flux loss in the magnets is not lost when subjected to severe high temperatures, as compared with use of typical linearly oriented magnets. The inventors of this application have found that characteristics similar to those of anisotropic magnets are obtained even using prior art magnets.

The easy axis of magnetization represents a crystal orientation in which a crystal is easy to magnetize in a magnet. The orientation of the easy axis of magnetization in the magnet, as referred to herein, is a direction in which an orientation ratio is 50% or more where the orientation ratio indicates the degree to which easy axes of magnetization of crystals are aligned with each other or a direction of an average of magnetic orientations in the magnet.

The magnet unit 42 is, as clearly illustrated in FIGS. 8 and 9, of an annular shape and arranged inside the magnet holder 41 (specifically, radially inside the cylinder 43). The magnet unit 42 is equipped with the first magnets 91 and the second magnets 92 which are each made of a polar anisotropic magnet. Each of the first magnets 91 and each of the second magnets 92 are different in magnetic polarity from each other. The first magnets 91 and the second magnets 92 are arranged alternately in the circumferential direction of the magnet unit 42. Each of the first magnets 91 is engineered to have a portion creating an N-pole near the stator winding 51. Each of the second magnets 92 is engineered to have a portion creating an S-pole near the stator winding 51. The first magnets 91 and the second magnets 92 are each made of, for example, a permanent rare earth magnet, such as a neodymium magnet.

Each of the magnets 91 and 92 is engineered to have a direction of magnetization (which will also be referred to below as a magnetization direction) which extends in an annular shape in between a d-axis (i.e., a direct-axis) and a q-axis (i.e., a quadrature-axis) in a known d-q coordinate system where the d-axis represents the center of a magnetic pole, and the q-axis represents a magnetic boundary between the N-pole and the S-pole, in other words, where a density of magnetic flux is zero Tesla. In each of the magnets 91 and 92, the magnetization direction is oriented in the radial direction of the annular magnet unit 42 Close to the d-axis and also oriented in the circumferential direction of the annular magnet unit 42 Closer to the q-axis. This layout will also be described below in detail. Each of the magnets 91 and 92, as can be seen in FIG. 9, includes a first portion 250 and two second portions 260 arranged on opposite sides of the first portion 250 in the circumferential direction of the magnet unit 42. The first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. To say it in a different way, the easy axis of magnetization has a first portion lying in the first portion 250 of each of the magnets 91 and 92 and second portions lying in the second portions 260 of each of the magnets 91 and 92. The first portion of the easy axis of magnetization extends more parallel to the d-axis than the second portions of the easy axis of magnetization do. In other words, the magnet unit 42 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis.

More specifically, if a direction from the stator 50 (i.e., an armature) toward the magnet unit 42 on the d-axis is defined to be positive, the angle θ11 represents an angle which the easy axis of magnetization 300 makes with the d-axis. Similarly, if a direction from the stator 50 (i.e., an armature) toward the magnet unit 42 on the q-axis is defined to be positive, the angle θ12 represents an angle which the easy axis of magnetization 310 makes with the q-axis. In this embodiment, each of the angle θ11 and the angle θ12 is set to be 90° or less. Each of the easy axes of magnetization 300 and 310, as referred to herein, is defined in the following way. If in each of the magnets 91 and 92, a first one of the easy axes of magnetization is oriented in a direction A11, and a second one of the easy axes of magnetization is oriented in a direction B11, an absolute value of cosine of an angle θ which the direction A11 and the direction B11 make with each other (i.e., |cos θ|) is defined as the easy axis of magnetization 300 or the easy axis of magnetization 310.

The magnets 91 are different in easy axis of magnetization from the magnets 92 in regions close to the d-axis and the q-axis. Specifically, in the region close to the d-axis, the direction of the easy axis of magnetization is oriented approximately parallel to the d-axis, while in the region close to the q-axis, the direction of the easy axis of magnetization is oriented approximately perpendicular to the q-axis. Annular magnetic paths are created according to the directions of easy axes of magnetization. In each of the magnets 91 and 92, the easy axis of magnetization in the region close to the d-axis may be oriented parallel to the d-axis, while the easy axis of magnetization in the region close to the q-axis may be oriented perpendicular to the q-axis.

Each of the magnets 91 and 92 is shaped to have a first peripheral surface facing the stator 50 (i.e., a lower surface viewed in FIG. 9 which will also be referred to as a stator-side outer surface) and a second peripheral surface facing the q-axis in the circumferential direction. The first and second peripheral surfaces function as magnetic flux acting surfaces into and from which magnetic flux flows. The magnetic paths are each created to extend between the magnetic flux acting surfaces (i.e., between the stator-side outer surface and the second peripheral surface facing the q-axis).

Figure 17:
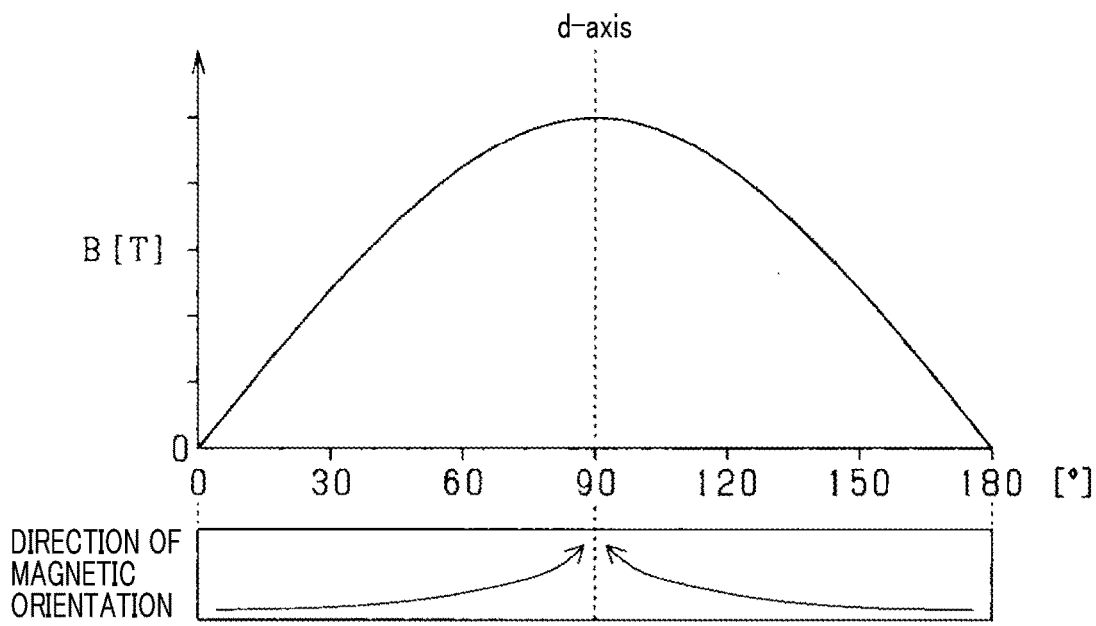
FIG. 17 is a view representing a relation between an electrical angle and a magnetic flux density in magnets of an embodiment.
Figure 18:
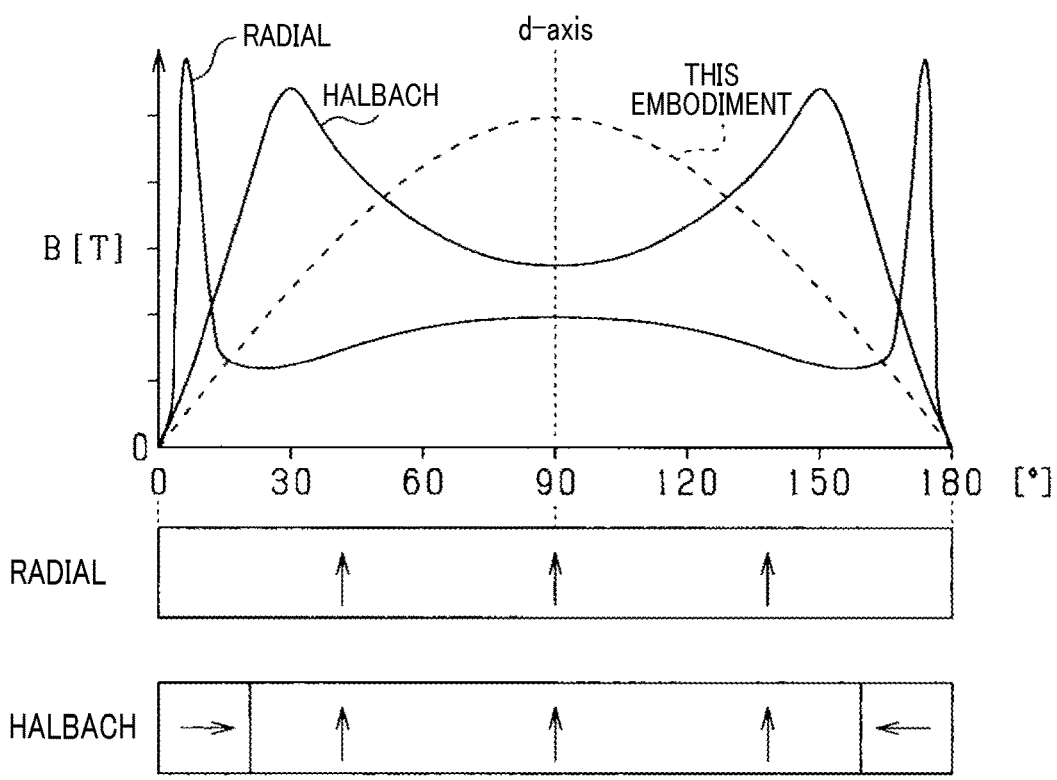
FIG. 18 is a view which represents a relation between an electrical angle and a magnetic flux density in a comparative example of magnet arrangement.

In the magnet unit 42, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 17. This facilitates concentration of magnetic flux around the center of the magnetic pole unlike a distribution of magnetic flux density of a radial anisotropic magnet demonstrated in FIG. 18 as a comparative example, thereby enabling the degree of torque produced by the rotating electrical machine 10 to be increased. It has also been found that the magnet unit 42 in this embodiment has the distribution of the magnetic flux density distinct from that of a typical Halbach array magnet. In FIGS. 17 and 18, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

Accordingly, the above described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 18, the magnetic flux density changes sharply near the q-axis. The more sharp the change in magnetic flux density, the more an eddy current generated in the stator winding 51 will increase. The magnetic flux close to the stator winding 51 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

The magnet unit 42 Creates a magnetic flux oriented perpendicular to the magnetic flux acting surface 280 close to the stator 50 near the d-axis (i.e., the center of the magnetic pole) in each of the magnets 91 and 92. Such a magnetic flux extends in an arc-shape farther away from the d-axis as departing from the magnetic flux acting surface 280 close to the stator 50. The more perpendicular to the magnetic flux acting surface the magnetic flux extends, the stronger the magnetic flux is. The rotating electrical machine 10 in this embodiment is, as described above, designed to shape each of the conductor groups 81 to have a decreased thickness in the radial direction, so that the radial center of each of the conductor groups 81 is located close to the magnetic flux acting surface of the magnet unit 42, thereby causing the strong magnetic flux to be applied to the stator 50 from the rotor 40.

The stator 50 has the cylindrical stator core 52 arranged radially inside the stator winding 51, that is, on the opposite side of the stator winding 51 to the rotor 40. This causes the magnetic flux extending from the magnetic flux acting surface of each of the magnets 91 and 92 to be attracted by the stator core 52, so that it circulates through the magnetic path partially including the stator core 52. This enables the orientation of the magnetic flux and the magnetic path to be optimized.

Steps to assemble the bearing unit 20, the housing 30, the rotor 40, the stator 50, and the inverter unit 60 illustrated in FIG. 5 will be described below as a production method of the rotating electrical machine 10. The inverter unit 60 is, as illustrated in FIG. 6, equipped with the unit base 61 and the electrical components 62. Operation processes including installation processes for the unit base 61 and the electrical components 62 will be explained. In the following discussion, an assembly of the stator 50 and the inverter unit 60 will be referred to as a first unit. An assembly of the bearing unit 20, the housing 30, and the rotor 40 will be referred to as a second unit.

The production processes include:

a first step of installing the electrical components 62 radially inside the unit base 61;

a second step of installing the unit base 61 radially inside the stator 50 to make the first unit;

a third step of inserting the attaching portion 44 of the rotor 40 into the bearing unit 20 installed in the housing 30 to make the second unit;

a fourth step of installing the first unit radially inside the second unit; and a fifth step of fastening the housing 30 and the unit base 61 together. The order in which the above steps are performed is the first step→the second step→the third step→the fourth step→the fifth step.

In the above production method, the bearing unit 20, the housing 30, the rotor 40, the stator 50, and the inverter unit 60 are assembled as a plurality of sub-assemblies, and the sub-assemblies are assembled, thereby facilitating handling thereof and achieving completion of inspection of each sub-assembly. This enables an efficient assembly line to be established and thus facilitates multi-product production planning.

In the first step, a high thermal conductivity material is applied or adhered to at least one of the radial inside of the unit base 61 and the radial outside of the electrical components 62. Subsequently, the electrical components may be mounted on the unit base 61. This achieves efficient transfer of heat, as generated by the semiconductor modules 66, to the unit base 61.

In the third step, an insertion operation for the rotor 40 may be achieved with the housing 30 and the rotor 40 arranged coaxially with each other. Specifically, the housing 30 and the rotor 40 are assembled while sliding one of the housing 30 and the rotor 40 along a jig which positions the outer peripheral surface of the rotor 40 (i.e., the outer peripheral surface of the magnetic holder 41) or the inner peripheral surface of the rotor 40 (i.e., the inner peripheral surface of the magnet unit 42) with respect to, for example, the inner peripheral surface of the housing 30. This achieves the assembly of heavy-weight parts without exertion of unbalanced load to the bearing unit 20. This results in improvement of reliability in operation of the bearing unit 20.

In the fourth step, the first unit and the second unit may be installed while being placed coaxially with each other. Specifically, the first unit and the second unit are installed while sliding one of the first unit and the second unit along a jig which positions the inner peripheral surface of the unit base 61 with respect to, for example, the inner peripheral surfaces of the rotor 40 and the attaching portion 44. This achieves the installation of the first and second units without any physical interference therebetween within a small clearance between the rotor 40 and the stator 50, thereby eliminating risks of defects caused by the installation, such as physical damage to the stator winding 51 or damage to the permanent magnets.

The above steps may alternatively be scheduled as the second step→the third step→the fourth step→the fifth step→the first step. In this order, the delicate electrical components 62 are finally installed, thereby minimizing stress on the electrical components in the installation processes.

Figure 19:
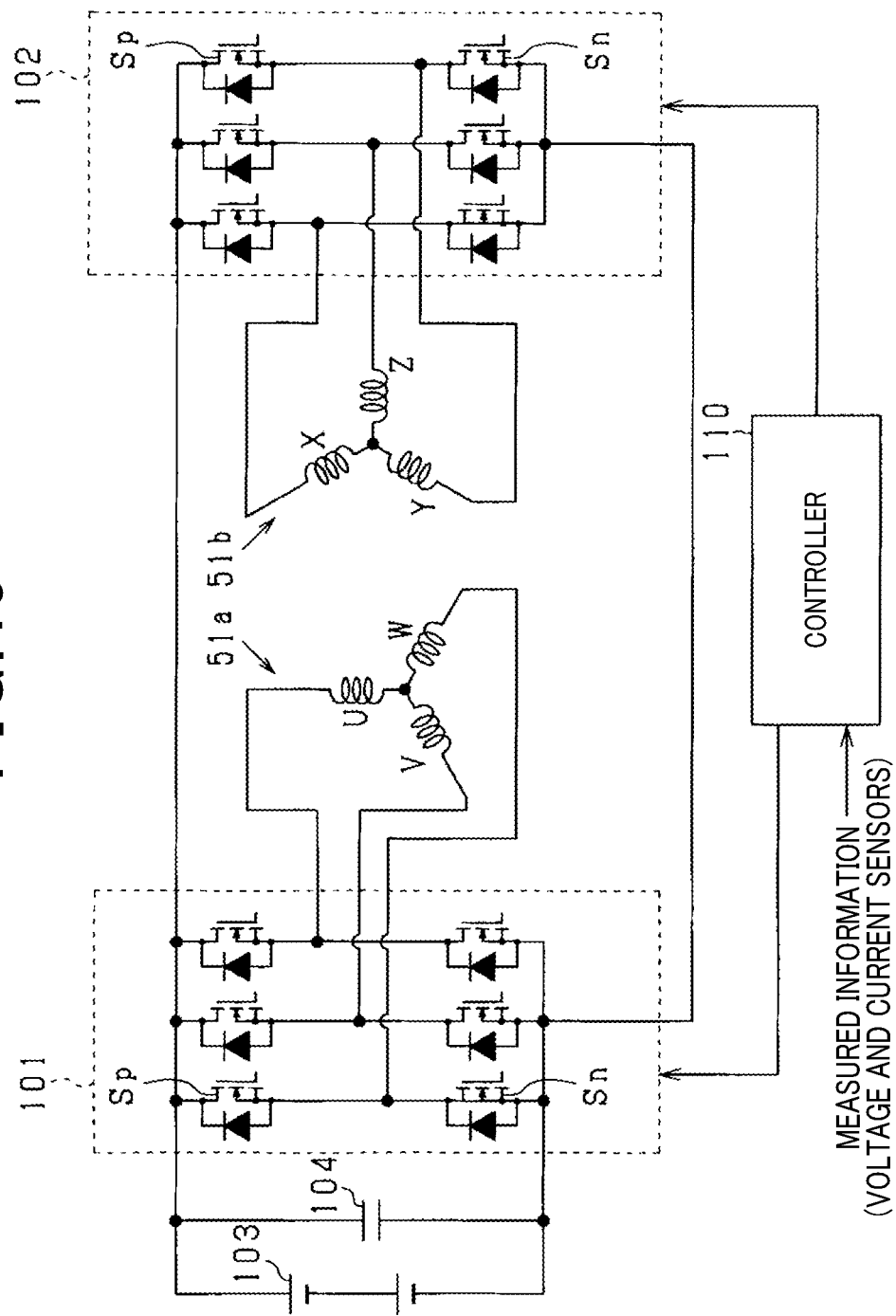
FIG. 19 is an electrical circuit diagram of a control system for a rotating electrical machine.
Figure 20:
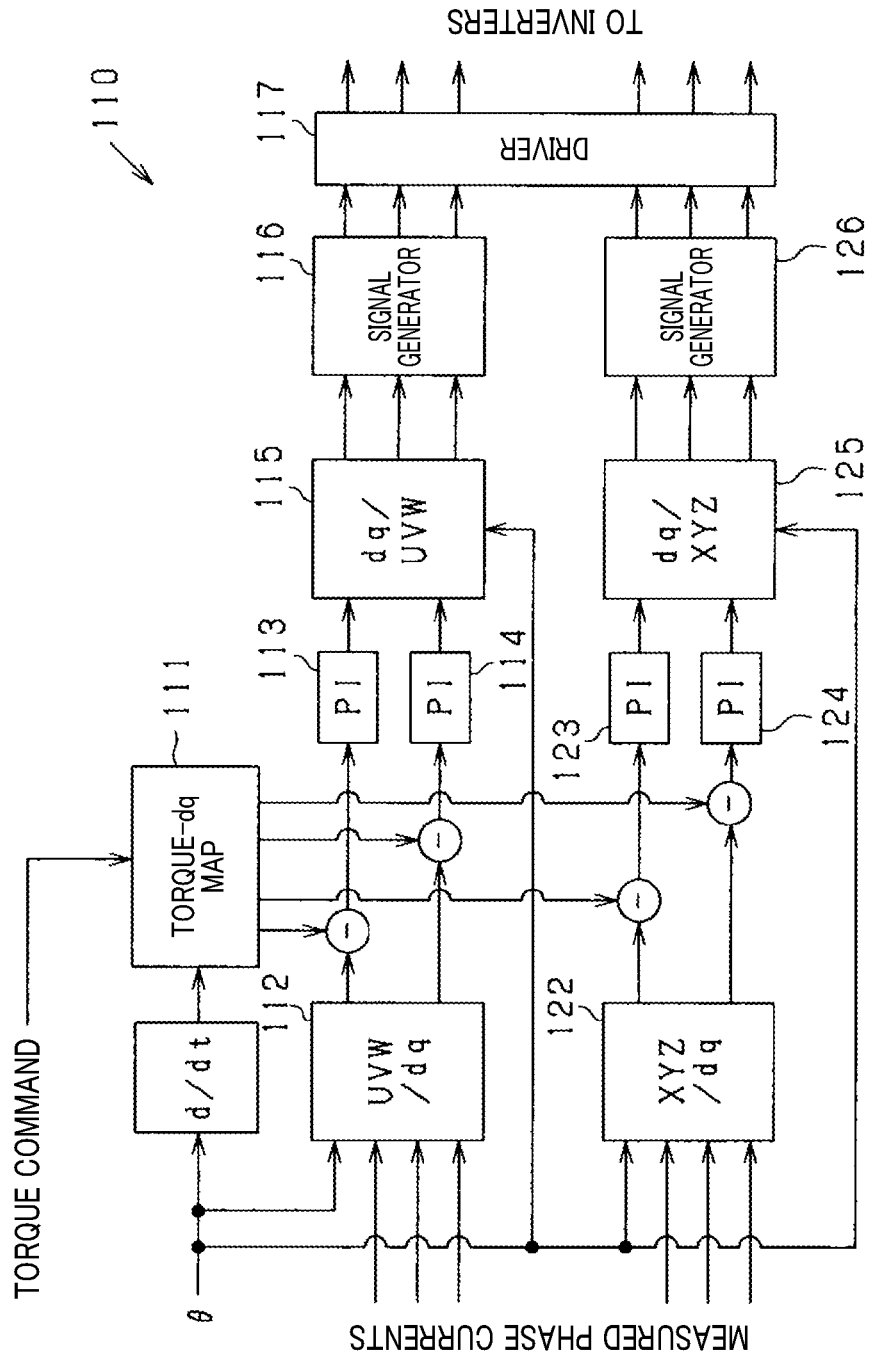
FIG. 20 is a functional block diagram which shows a current feedback control operation of a control device.

The structure of a control system for controlling an operation of the rotating electrical machine 10 will be described below. FIG. 19 is an electrical circuit diagram of the control system for the rotating electrical machine 10. FIG. 20 is a functional block diagram which illustrates control steps performed by the controller 110.

FIG. 19 illustrates two sets of three-phase windings 51a and 51b. The three-phase winding 51a includes a U-phase winding, a V-phase winding, and a W-phase winding. The three-phase winding 51b includes an X-phase winding, a Y-phase winding, and a Z-phase winding. The first inverter 101 and the second inverter 102 are provided as electrical power converters for the three-phase windings 51a and 51b, respectively. The inverters 101 and 102 are made of bridge circuits with as many upper and lower arms as there are the phase-windings. The current delivered to the phase windings of the stator winding 51 is regulated by turning on or off switches (i.e., semiconductor switches) mounted on the upper and lower arms.

The dc power supply 103 and the smoothing capacitor 104 are connected parallel to the inverters 101 and 102. The dc power supply 103 is made of, for example, a plurality of series-connected cells. The switches of the inverters 101 and 102 correspond to the semiconductor modules 66 in FIG. 1. The capacitor 104 corresponds to the capacitor module 68 in FIG. 1.

The controller 110 is equipped with a microcomputer made of a CPU and memories and works to perform control energization by turning on or off the switches of the inverters 101 and 102 using several types of measured information measured in the rotating electrical machine 10 or requests for a motor mode or a generator mode of the rotating electrical machine 10. The controller 110 corresponds to the control device 77 shown in FIG. 6. The measured information about the rotating electrical machine 10 includes, for example, an angular position (i.e., an electrical angle) of the rotor 40 measured by an angular position sensor, such as a resolver, a power supply voltage (i.e., voltage inputted into the inverters) measured by a voltage sensor, and electrical current delivered to each of the phase-windings, as measured by a current sensor. The controller 110 produces and outputs an operation signal to operate each of the switches of the inverters 101 and 102. A request for electrical power generation is a request for driving the rotating electrical machine 10 in a regenerative mode, for example, in a case where the rotating electrical machine 10 is used as a power source for a vehicle.

The first inverter 101 is equipped with a series-connected part made up of an upper arm switch Sp and a lower arm switch Sn for each of the three-phase windings: the U-phase winding, the V-phase winding, and the W-phase winding. The upper arm switches Sp are connected at high-potential terminals thereof to a positive terminal of the dc power supply 103. The lower arm switches Sn are connected at low-potential terminals thereof to a negative terminal (i.e., ground) of the dc power supply 103. Intermediate joints of the upper arm switches Sp and the lower arm switches Sn are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The second inverter 102 is, like the first inverter 101, equipped with a series-connected part made up of an upper arm switch Sp and a lower arm switch Sn for each of the three-phase windings: the X-phase winding, the Y-phase winding, and the Z-phase winding. The upper arm switches Sp are connected at high-potential terminals thereof to the positive terminal of the dc power supply 103. The lower arm switches Sn are connected at low-potential terminals thereof to the negative terminal (i.e., ground) of the dc power supply 103. Intermediate joints of the upper arm switches Sp and the lower arm switches Sn are connected to ends of the X-phase winding, the Y-phase winding, and the Z-phase winding. The X-phase winding, the Y-phase winding, and the Z-phase winding are connected in the form of a star connection (i.e., Y-connection). The other ends of the X-phase winding, the Y-phase winding, and the Z-phase winding are connected with each other at a neutral point.

FIG. 20 illustrates a current feedback control operation to control electrical currents delivered to the U-phase winding, the V-phase winding, and the W-phase winding and a current feedback control operation to control electrical currents delivered to the X-phase winding, the Y-phase winding, and the Z-phase winding. The control operation for the U-phase winding, the V-phase winding, and the W-phase winding will first be discussed.

In FIG. 20, the current command determiner 111 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity co derived by differentiating an electrical angle θ with respect to time. The current command determiner 111 is shared between the U-, V-, and W-phase windings and the X-, Y-, and W-phase windings. The generator-mode torque command value is a regenerative torque command value in a case where the rotating electrical machine 10 is used as a power source of a vehicle.

The d-q converter 112 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 113 determines a command voltage for the d-axis as a manipulated variable for bringing the d-axis current into agreement with the current command value for the d-axis in a feedback mode. The q-axis current feedback control device 114 determines a command voltage for the q-axis as a manipulated variable for bringing the q-axis current into agreement with the current command value for the q-axis in a feedback mode. The feedback control devices 113 and 114 calculates the command voltage as a function of a deviation of each of the d-axis current and the q-axis current from a corresponding one of the current command values using PI feedback techniques.

The three-phase converter 115 works to convert the command values for the d-axis and the q-axis into command values for the U-phase, V-phase, and W-phase windings. Each of the devices 111 to 115 is engineered as a feedback controller to perform a feedback control operation for a fundamental current in the d-q transformation theory. The command voltages for the U-phase, V-phase, and W-phase windings are feedback control values.

The operation signal generator 116 uses the known triangle wave carrier comparison to produce operation signals for the first inverter 101 as a function of the three-phase command voltages. Specifically, the operation signal generator 116 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal.

The same structure as described above is provided for the X-, Y-, and Z-phase windings. The d-q converter 122 works to convert currents (i.e., three phase currents), as measured by current sensors mounted for the respective phase windings, into a d-axis current and a q-axis current that are components in the two-dimensional rotating Cartesian coordinate system in which the d-axis is defined as the direction of the axis of the magnetic field.

The d-axis current feedback control device 123 determines a command voltage for the d-axis. The q-axis current feedback control device 124 determines a command voltage for the q-axis. The three-phase converter 125 works to convert the command values for the d-axis and the q-axis into command values for the X-phase, Y-phase, and Z-phase windings. The operation signal generator 126 produces operation signals for the second inverter 102 as a function of the three-phase command voltages. Specifically, the operation signal generator 126 works to switch operation signals (i.e., duty signals) for the upper and lower arms for the three-phase windings (i.e., the X-, Y-, and Z-phase windings) based on comparison of levels of signals derived by normalizing the three-phase command voltages using the power supply voltage with a level of a carrier signal, such as a triangle wave signal.

The driver 117 works to turn on or off the switches Sp and Sn in the inverters 101 and 102 in response to the switch operation signals produced by the operation signal generators 116 and 126.

Subsequently, a torque feedback control operation will be described below. This operation is to increase an output of the rotating electrical machine 10 and reduce torque loss in the rotating electrical machine 10, for example, in a high-speed and high-output range wherein output voltages from the inverters 101 and 102 rise. The controller 110 selects one of the torque feedback control operation and the current feedback control operation and perform the selected one as a function of an operating condition of the rotating electrical machine 10.

Figure 21:
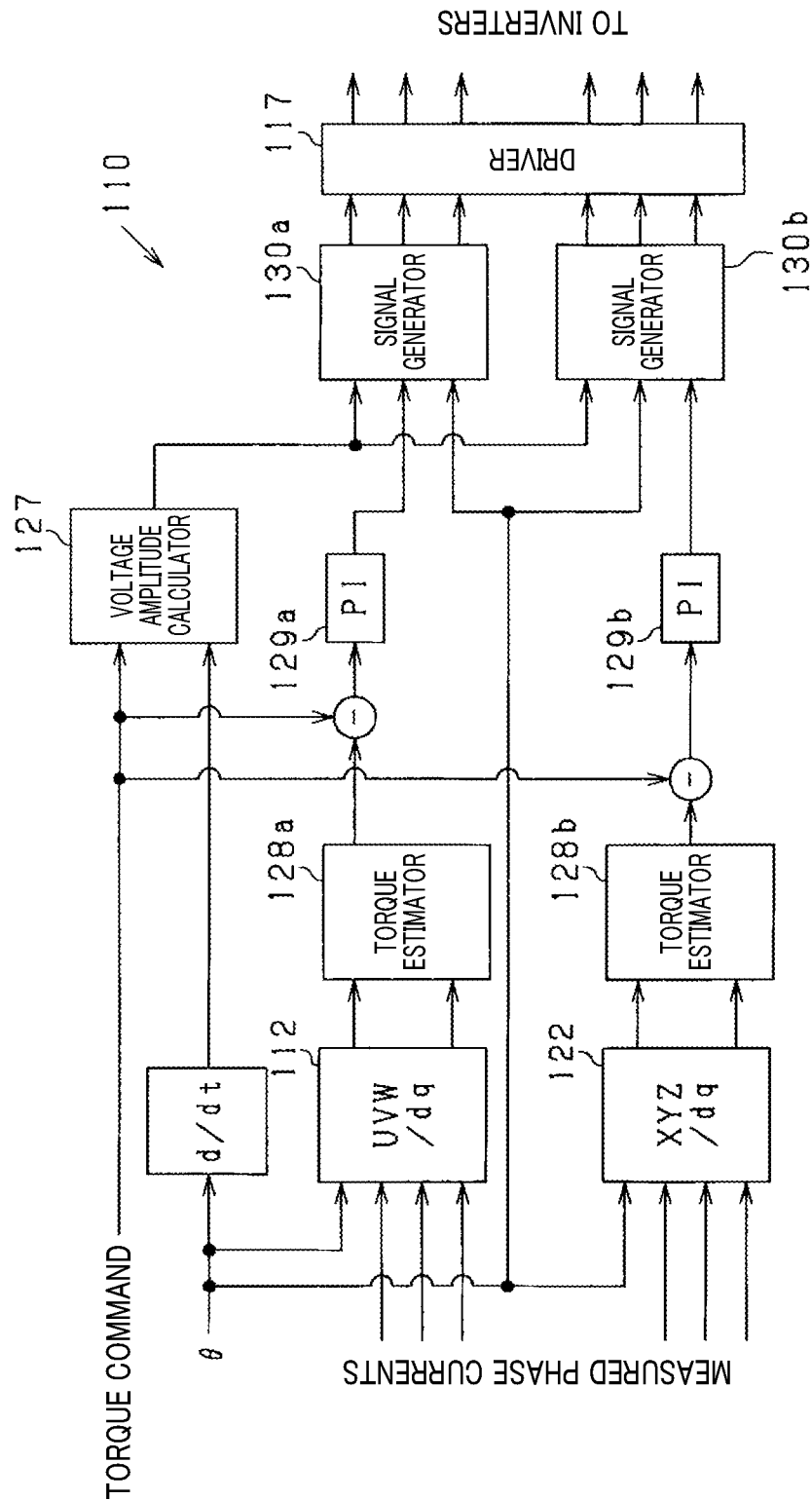
FIG. 21 is a functional block diagram which shows a torque feedback control operation of a control device.

FIG. 21 shows the torque feedback control operation for the U-, V-, and W-phase windings and the torque feedback control operation for the X-, Y-, and Z-phase windings. In FIG. 21, the same reference numbers as employed in FIG. 20 refer to the same parts, and explanation thereof in detail will be omitted here. The control operation for the U-, V-, and W-phase windings will be described first.

The voltage amplitude calculator 127 works to calculate a voltage amplitude command that is a command value of a degree of a voltage vector as a function of the motor-mode torque command value or the generator-mode torque command value for the rotating electrical machine 10 and the electrical angular velocity co derived by differentiating the electrical angle θ with respect to time.

The torque calculator 128a works to estimate a torque value in the U-phase, V-phase, or the W-phase as a function of the d-axis current and the q-axis current converted by the d-q converter 112. The torque calculator 128a may be designed to calculate the voltage amplitude command using a map listing relations among the d-axis current, the q-axis current, and the voltage amplitude command.

The torque feedback controller 129a calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 129a calculates the voltage phase command as a function of a deviation of the estimated torque value from the motor-mode torque command value or the generator-mode torque command value using PI feedback techniques.

The operation signal generator 130a works to produce the operation signal for the first inverter 101 using the voltage amplitude command, the voltage phase command, and the electrical angle θ. Specifically, the operation signal generator 130a calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal.

The operation signal generator 130a may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The same structure as described above is provided for the X-, Y-, and Z-phase windings. The torque calculator 128b works to estimate a torque value in the X-phase, Y-phase, or the Z-phase as a function of the d-axis current and the q-axis current converted by the d-q converter 122.

The torque feedback controller 129b calculates a voltage phase command as a manipulated variable for bringing the estimated torque value into agreement with the motor-mode torque command value or the generator-mode torque command value in the feedback mode. Specifically, the torque feedback controller 129b calculates the voltage phase command as a function of a deviation of the estimated torque value from the motor-mode torque command value or the generator-mode torque command value using PI feedback techniques.

The operation signal generator 130b works to produce the operation signal for the second inverter 102 using the voltage amplitude command, the voltage phase command, and the electrical angle θ. Specifically, the operation signal generator 130b calculates the command values for the three-phase windings based on the voltage amplitude command, the voltage phase command, and the electrical angle θ and then generates the switching operation signals for the upper and lower arms for the three-phase windings by means of PWM control based on comparison of levels of signals derived by normalizing the three-phase command voltages using the power supply voltage with a level of a carrier signal, such as a triangle wave signal. The driver 117 then works to turn on or off the switches Sp and Sn for the three-phase windings in the inverters 101 and 102 in response to the switching operation signals derived by the operation signal generators 130*a* and 130*b*.

The operation signal generator 130*b* may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The rotating electrical machine 10 has a risk that generation of an axial current may result in electrical erosion in the bearing 21 or 22. For example, when the stator winding 51 is excited or de-excited in response to the switching operation, a small switching time gap (i.e., switching unbalance) may occur, thereby resulting in distortion of magnetic flux, which leads to the electrical erosion in the bearings 21 and 22 retaining the rotating shaft 11. The distortion of magnetic flux depends upon the inductance of the stator 50 and creates an electromotive force oriented in the axial direction, which results in dielectric breakdown in the bearing 21 or 22 to develop the electrical erosion.

In order to avoid the electrical erosion, this embodiment is engineered to take three measures as discussed below. The first erosion avoiding measure is to reduce the inductance by designing the stator 50 to have a core-less structure and also to shape the magnetic flux in the magnet unit 42 to be smooth to minimize the electrical erosion. The second erosion avoiding measure is to retain the rotating shaft in a cantilever form to minimize the electrical erosion. The third erosion avoiding measure is to unify the annular stator winding 51 and the stator core 52 using molding techniques using a moulding material to minimize the electrical erosion. The first to third erosion avoiding measures will be described below in detail.

In the first erosion avoiding measure, the stator 50 is designed to have no teeth in gaps between the conductor groups 81 in the circumferential direction. The sealing members 57 made of non-magnetic material are arranged in the gaps between the conductor groups 81 instead of teeth (iron cores) (see FIG. 10). This results in a decrease in inductance of the stator 50, thereby minimizing the distortion of magnetic flux caused by the switching time gap occurring upon excitation of the stator winding 51 to reduce the electrical erosion in the bearings 21 and 22. The inductance on the d-axis is preferably less than that on the q-axis.

Additionally, each of the magnets 91 and 92 is magnetically oriented to have the easy axis of magnetization which is directed near the d-axis to be more parallel to the d-axis than that near the q-axis (see FIG. 9). This strengthens the magnetic flux on the d-axis, thereby resulting in a smooth change in surface magnetic flux (i.e., an increase or decrease in magnetic flux) from the q-axis to the d-axis on each magnetic pole of the magnets 91 and 92. This minimizes a sudden voltage change arising from the switching imbalance to avoid the electrical erosion.

In the second erosion avoiding measure, the rotating electrical machine 10 is designed to have the bearings 21 and 22 located away from the axial center of the rotor 40 toward one of the ends of the rotor 40 opposed to each other in the axial direction thereof (see FIG. 2). This minimizes the risk of the electrical erosion as compared with a case where a plurality of bearings are arranged outside axial ends of a rotor. In other words, in the structure wherein the rotor has ends retained by the bearings, generation of a high-frequency magnetic flux results in creation of a closed circuit extending through the rotor, the stator, and the bearings (which are arranged axially outside the rotor). This leads to a risk that the axial current may result in electrical erosion in the bearings. In contrast, the rotor 40 are retained by the plurality of bearings 21 and 22 in the cantilever form, so that the above closed circuit does not occur, thereby minimizing the electrical erosion in the bearings 21 and 22.

In addition to the above one-side layout of the bearings 21 and 22, the rotating electrical machine 10 also has the following structure. In the magnet holder 41, the intermediate portion 45 extending in the radial direction of the rotor 40 is equipped with the contact avoider which axially extends to avoid physical contact with the stator 50 (see FIG. 2). This enables a closed circuit through which the axial current flows through the magnet holder 41 to be lengthened to increase the resistance thereof. This minimizes the risk of the electrical erosion of the bearings 21 and 22.

The retainer 23 for the bearing unit 20 is secured to the housing 30 and located on one axial end side of the rotor 40, while the housing 30 and the unit base 61 (i.e., a stator holder) are joined together on the other axial end of the rotor 40 (see FIG. 2). These arrangements properly achieve the structure in which the bearings 21 and 22 are located only on the one end of the length of the rotating shaft 11. Additionally, the unit base 61 is connected to the rotating shaft 11 through the housing 30, so that the unit base 61 is located electrically away from the rotating shaft 11. An insulating member such as resin may be disposed between the unit base 61 and the housing 30 to place the unit base 61 and the rotating shaft 11 electrically farther away from each other. This also minimizes the risk of the electrical erosion of the bearings 21 and 22.

The one-side layout of the bearings 21 and 22 in the rotating electrical machine 10 in this embodiment decreases the axial voltage applied to the bearings 21 and 22 and also decreases the potential difference between the rotor 40 and the stator 50. A decrease in the potential difference applied to the bearings 21 and 22 is, thus, achieved without use of conductive grease in the bearings 21 and 22. The conductive grease usually contains fine particles such as carbon particles, thus leading to a risk of generation of acoustic noise. In order to alleviate the above problem, this embodiment uses a non-conductive grease in the bearings 21 and 22 to minimize the acoustic noise in the bearings 21 and 22. For instance, in a case where the rotating electrical machine 10 is used with an electrical vehicle, it is usually required to take a measure to eliminate the acoustic noise. This embodiment is capable of properly taking such a measure.

In the third erosion avoiding measure, the stator winding 51 and the stator core 52 are unified together using a mouldling material to minimize a positional error of the stator winding 51 in the stator 50 (see FIG. 11). The rotating electrical machine 10 in this embodiment is designed not to have inter-conductor members (e.g., teeth) between the conductor groups 81 arranged in the circumferential direction of the stator winding 51, thus leading to a concern about the positional error or misalignment of the stator winding 51. The misalignment of the conductor of the stator winding 51 may be minimized by unifying the stator winding 51 and the stator core 52 in the mold. This eliminates risks of the distortion of magnetic flux arising from the misalignment of the stator winding 51 and the electrical erosion in the bearings 21 and 22 resulting from the distortion of the magnetic flux.

The unit base 61 serving as a housing to firmly fix the stator core 52 is made of carbon fiber reinforced plastic (CFRP), thereby minimizing electrical discharge to the unit base 61 as compared with when the unit base 61 is made of aluminum, thereby avoiding electrical erosion.

An additional erosion avoiding measure may be taken to make at least one of the outer race 25 and the inner race 26 of each of the bearings 21 and 22 using a ceramic material or alternatively to install an insulating sleeve outside the outer race 25.

Other embodiments will be described below in terms of differences between themselves and the first embodiment.

Second Embodiment

In this embodiment, the polar anisotropic structure of the magnet unit 42 of the rotor 40 is changed and will be described below in detail.

Figure 22:
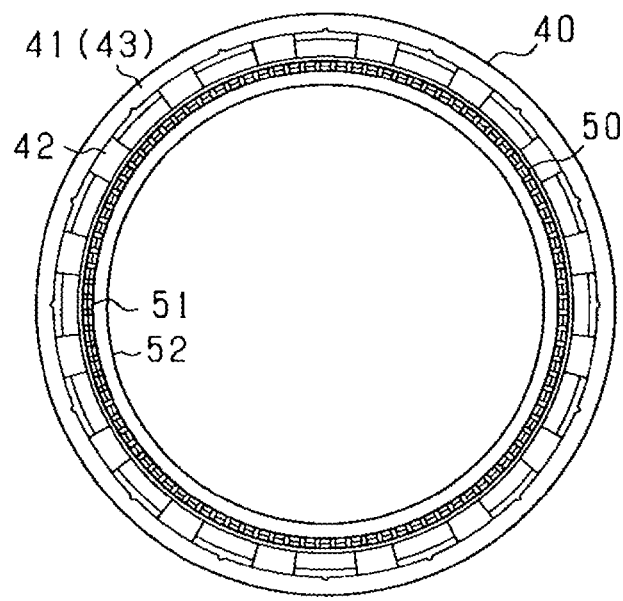
FIG. 22 is a transverse sectional view of a rotor and a stator in the second embodiment.
Figure 23:
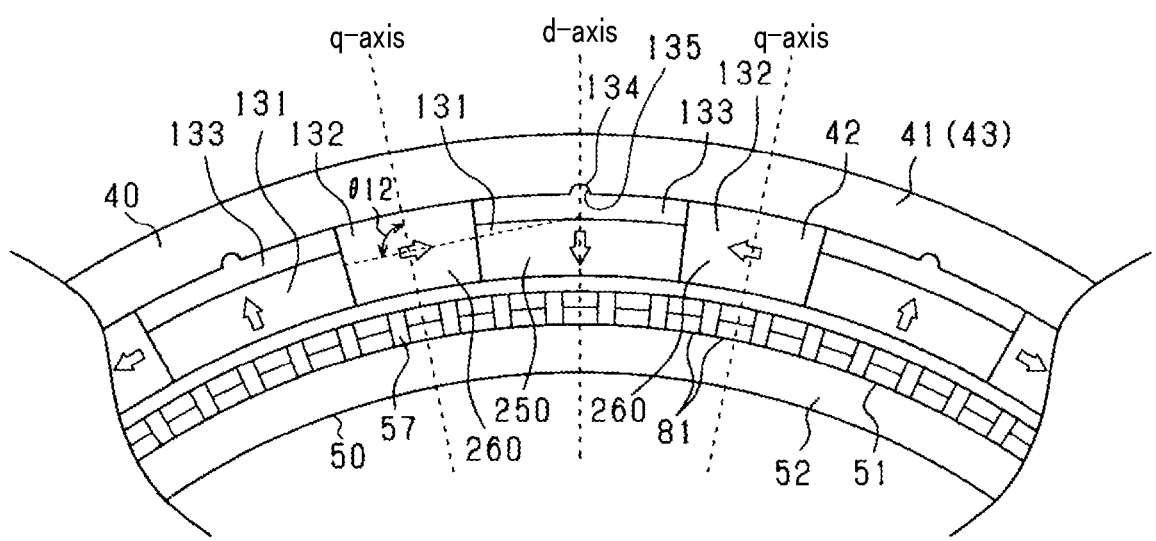
FIG. 23 is a partially enlarged view of FIG. 22.

The magnet unit 42 is, as clearly illustrated in FIGS. 22 and 23, made using a magnet array referred to as a Halbach array. Specifically, the magnet unit 42 is equipped with the first magnets 131 and the second magnets 132. The first magnets 131 have a magnetization direction (i.e., an orientation of a magnetization vector thereof) oriented in the radial direction of the magnet unit 42. The second magnets 132 have a magnetization direction (i.e., an orientation of the magnetization vector thereof) oriented in the circumferential direction of the magnet unit 42. The first magnets 131 are arrayed at a given interval away from each other in the circumferential direction. Each of the second magnets 132 is disposed between the first magnets 131 arranged adjacent each other in the circumferential direction. The first magnets 131 and the second magnets 132 are each implemented by a rare-earth permanent magnet, such as a neodymium magnet.

The first magnets 131 are arranged away from each other in the circumferential direction so as to have N-poles and S-poles which are created in radially inner portions thereof and face the stator 50. The N-poles and the S-poles are arranged alternately in the circumferential direction. The second magnets 132 are arranged to have N-poles and S-poles alternately located adjacent the first magnets 131 in the circumferential direction. The cylinder 43 which surrounds the magnets 131 and 132 may be formed as a soft magnetic core made of a soft magnetic material and which functions as a back core. The magnet unit 42 in this embodiment are designed to have the easy axis of magnetization oriented in the same way as in the first embodiment relative to the d-axis and the q-axis in the d-q axis coordinate system.

The magnetic members 133 each of which is made of a soft magnetic material are disposed radially outside the first magnets 131, in other words, close to the cylinder 43 of the magnet holder 41. Each of the magnetic members 133 may be made of magnetic steel sheet, soft iron, or a dust core material. Each of the magnetic members 133 has a length identical with that of the first magnet 131 (especially, a length of an outer periphery of the first magnet 131) in the circumferential direction. An assembly made up of each of the first magnets 131 and a corresponding one of the magnetic members 133 has a thickness identical with that of the second magnet 132 in the radial direction. In other words, each of the first magnets 131 has the thickness smaller than that of the second magnet 132 by that of the magnetic member 133 in the radial direction. The magnets 131 and 132 and the magnetic members 133 are firmly secured to each other using, for example, adhesive agent. In the magnet unit 42, the radial outside of the first magnets 131 faces away from the stator 50. The magnetic members 133 are located on the opposite side of the first magnets 131 to the stator 50 in the radial direction (i.e., farther away from the stator 50).

Each of the magnetic members 133 has the key 134 in a convex shape which is formed on the outer periphery thereof and protrudes radially outside the magnetic member 133, in other words, protrudes into the cylinder 43 of the magnet holder 41. The cylinder 43 has the key grooves 135 which are formed in an inner peripheral surface thereof in a concave shape and in which the keys 134 of the magnetic members 133 are fit. The protruding shape of the keys 134 is contoured to conform with the recessed shape of the key grooves 135. As many of the key grooves 135 as the keys 134 of the magnetic members 133 are formed. The engagement between the keys 134 and the key grooves 135 serves to eliminate misalignment or a positional deviation of the first magnets 131, the second magnets 132, and the magnet holder 41 in the circumferential direction (i.e. a rotational direction). The keys 134 and the key grooves 135 (i.e., convexities and concavities) may be formed either on the cylinders 43 of the magnet holder 41 or in the magnetic members 133, respectively. Specifically, the magnetic members 133 may have the key grooves 135 in the outer periphery thereof, while the cylinder 43 of the magnet holder 41 may have the keys 134 formed on the inner periphery thereof.

The magnet unit 42 has the first magnets 131 and the second magnets 132 alternately arranged to increase the magnetic flux density in the first magnets 131. This results in concentration of magnetic flux on one surface of the magnet unit 42 to enhance the magnetic flux close to the stator 50.

The layout of the magnetic members 133 radially arranged outside the first magnets 131, in other words, farther away from the stator 50 reduces partial magnetic saturation occurring radially outside the first magnets 131, thereby alleviating a risk of demagnetization in the first magnets 131 arising from the magnetic saturation. This results in an increase in magnetic force produced by the magnet unit 42. In other words, the magnet unit 42 in this embodiment is viewed to have portions which are usually subjected to the demagnetization and replaced with the magnetic members 133.

Figure 24A:
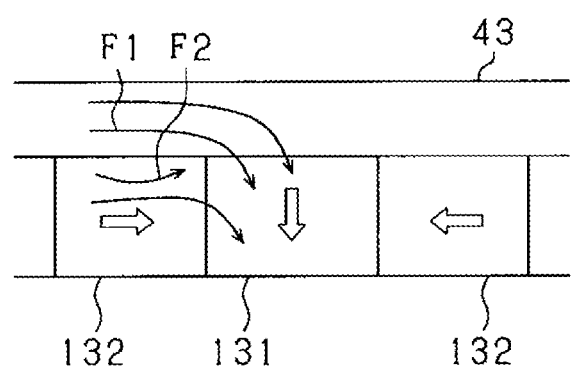
FIGS. 24(a) and 24(b) are views demonstrating flows of magnetic flux in a magnet unit.
Figure 24B:
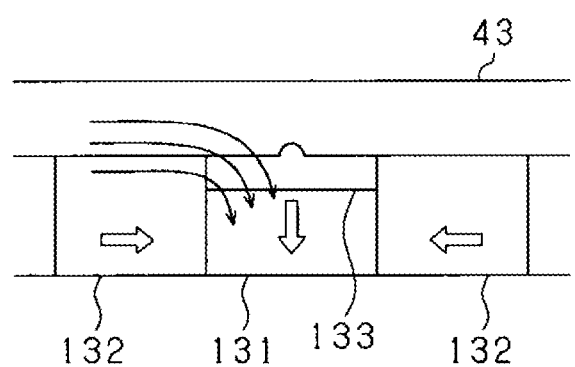

FIGS. 24(a) and 24(b) are illustrations which demonstrate flows of magnetic flux in the magnet unit 42. FIG. 24(a) illustrates a conventional structure in which the magnet unit 42 is not equipped with the magnetic members 133. FIG. 24(b) illustrates the structure in this embodiment in which the magnet unit 42 is equipped with the magnetic members 133. FIGS. 24(a) and 24(b) are linearly developed views of the cylinder 43 of the magnet holder 41 and the magnet unit 42. Lower sides of FIGS. 24(a) and 24(b) are close to the stator 50, while upper sides thereof are farther away from the stator 50.

In the structure shown in FIG. 24(a), a magnetic flux acting surface of each of the first magnets 131 and a side surface of each of the second magnets 132 are placed in contact with the inner peripheral surface of the cylinder 43. A magnetic flux acting surface of each of the second magnets 132 is placed in contact with the side surface of one of the first magnets 131. Such layout causes a combined magnetic flux to be created in the cylinder 43. The combined magnetic flux is made up of a magnetic flux F1 which passes outside the second magnet 132 and then enters the surface of the first magnets 131 contacting the cylinder 43 and a magnetic flux which flows substantially parallel to the cylinder 43 and attracts a magnetic flux F2 produced by the second magnet 132. This leads to a risk that the magnetic saturation may occur near the surface of contact between the first magnet 131 and the second magnet 132 in the cylinder 43.

In the structure in FIG. 24(b) wherein each of the magnetic members 133 is disposed between the magnetic flux acting surface of the first magnet 131 and the inner periphery of the cylinder 43 farther away from the stator 50, the magnetic flux is permitted to pass through the magnetic member 133. This minimizes the magnetic saturation in the cylinder 43 and increases resistance against the demagnetization.

The structure in FIG. 24(b), unlike FIG. 24(a), functions to eliminate the magnetic flux F2 facilitating the magnetic saturation. This effectively enhances the permeance in the whole of the magnetic circuit, thereby ensuring the stability in properties of the magnetic circuit under elevated temperature.

As compared with radial magnets used in conventional SPM rotors, the structure in FIG. 24(b) has an increased length of the magnetic path passing through the magnet. This results in a rise in permeance of the magnet which enhances the magnetic force to increase the torque. Further, the magnetic flux concentrates on the center of the d-axis, thereby increasing the sine wave matching percentage. Particularly, the increase in torque may be achieved effectively by shaping the waveform of the current to a sine or trapezoidal wave under PWM control or using 120° excitation switching ICs.

In a case where the stator core 52 is made of magnetic steel sheets, the thickness of the stator core 52 in the radial direction thereof is preferably half or greater than half the thickness of the magnet unit 42 in the radial direction. For instance, it is preferable that the thickness of the stator core 52 in the radial direction is greater than half the thickness of the first magnets 131 arranged at the pole-to-pole center in the magnet unit 42. It is also preferable that the thickness of the stator core 52 in the radial direction is smaller than that of the magnet unit 42. In this case, a magnet magnetic flux is approximately 1 T, while the saturation magnetic flux density in the stator core 52 is 2 T. The leakage of magnetic flux to inside the inner periphery of the stator core 52 is avoided by selecting the thickness of the stator core 52 in the radial direction to be greater than half that of the magnet unit 42.

Magnets arranged to have the Halbach structure or the polar anisotropic structure usually have an arc-shaped magnetic path, so that the magnetic flux may be increased in proportion to a thickness of ones of the magnets which handle a magnetic flux in the circumferential direction. In such a structure, the magnetic flux flowing through the stator core 52 is thought of as not exceeding the magnetic flux flowing in the circumferential direction. In other words, when the magnetic flux produced by the magnets is 1 T, while ferrous metal whose saturation magnetic flux density is 2 T is used to make the stator core 52, a light weight and compact electrical rotating machine may be produced by selecting the thickness of the stator core 52 to be greater than half that of the magnets. The demagnetizing field is usually exerted by the stator 50 on the magnetic field produced by the magnets, so that the magnetic flux produced by the magnets will be 0.9 T or less. The magnetic permeability of the stator core may, therefore, be properly kept by selecting the thickness of the stator core to be half that of the magnets.

Modifications of the above structure will be described below.

First Modification

Figure 25:
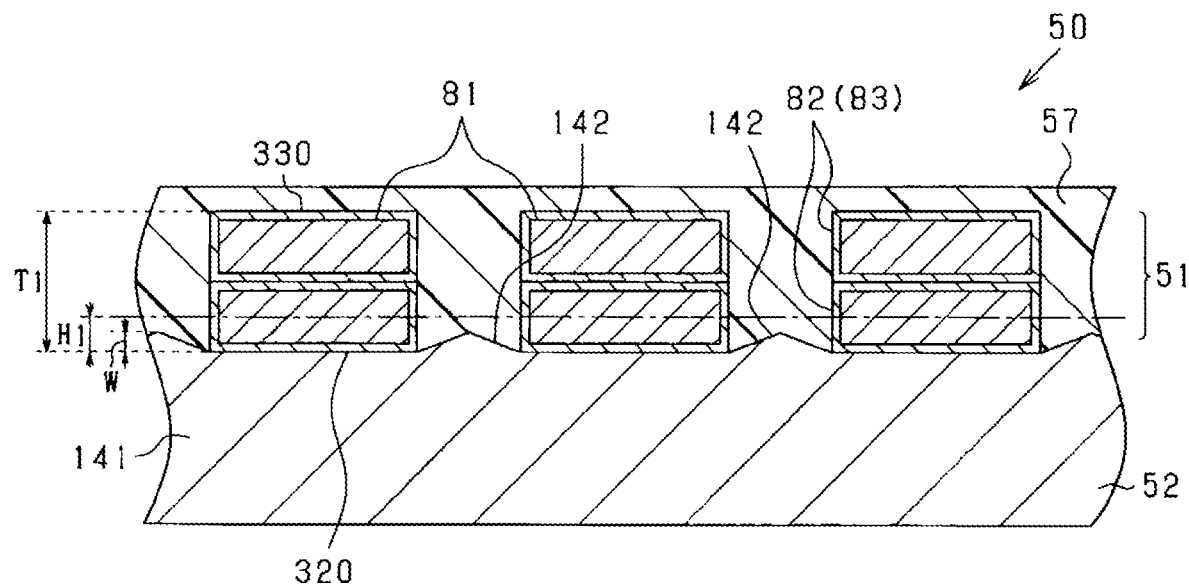
FIG. 25 is a sectional view of a stator in the first modification.

In the above embodiment, the outer peripheral surface of the stator core 52 has a curved surface without any irregularities. The plurality of conductor groups 81 are arranged at a given interval away from each other on the outer peripheral surface of the stator core 52. This layout may be changed. For instance, the stator core 52 illustrated in FIG. 25 is equipped with the circular ring-shaped yoke 141 and the protrusions 142. The yoke 141 is located on the opposite side (i.e., a lower side, as viewed in the drawing) of the stator winding 51 to the rotor 40 in the radial direction. Each of the protrusions 142 protrudes into a gap between a respective two of the straight sections 83 arranged adjacent each other in the circumferential direction. The protrusions 142 are arranged at a given interval away from each other in the circumferential direction radially outside the yoke 141, i.e., close to the rotor 40. Each of the conductor groups 81 of the stator winding 51 engages the protrusions 142 in the circumferential direction, in other words, the protrusions 142 are used as positioners to position and array the conductor groups 81 in the circumferential direction. The protrusions 142 Correspond to inter-conductor members.

A radial thickness of each of the protrusions 142 from the yoke 141, in other words, a distance W, as illustrated in FIG. 25, between the inner surface 320 of the straight sections 82 which is placed in contact with the yoke 141 and the top of the protrusion 412 in the radial direction of the yoke 141 is selected to be smaller than half a radial thickness (as indicated by H1 in the drawing) of the straight sections 83 arranged adjacent the yoke 141 in the radial direction. In other words, non-conductive members (i.e., the sealing members 57) preferably each occupy three-fourths of a dimension (i.e., thickness) T1 (i.e., twice the thickness of the conductors 82, in other words, a minimum distance between the surface 320 of the conductor group 81 placed in contact with the stator core 52 and the surface 330 of the conductor group 81 facing the rotor 40) of the conductor groups (i.e., conductors) 81 in the radial direction of the stator winding 51 (i.e., the stator core 52). Such selection of the thickness of the protrusions 142 Causes each of the protrusions 142 not to function as a tooth between the conductor groups 81 (i.e., the straight sections 83) arranged adjacent each other in the circumferential direction, so that there are no magnetic paths which would usually be formed by the teeth. The protrusions 142 need not necessarily to be arranged between a respective circumferentially adjacent two of all the conductor groups 81, but however, a single protrusion 142 may be disposed at least only between two of the conductor groups 81 which are arranged adjacent each other in the circumferential direction. For instance, the protrusions 142 may be disposed away from each other in the circumferential direction at equal intervals each of which corresponds to a given number of the conductor groups 81. Each of the protrusions 142 may be designed to have any shape, such as a rectangular or arc-shape.

The straight sections 83 may alternatively be arranged in a single layer on the outer peripheral surface of the stator core 52. In a broad sense, the thickness of the protrusions 142 from the yoke 141 in the radial direction may be smaller than half that of the straight sections 83 in the radial direction.

If an imaginary circle whose center is located at the axial center of the rotating shaft 11 and which passes through the radial centers of the straight sections 83 placed adjacent the yoke 141 in the radial direction is defined, each of the protrusions 142 may be shaped to protrude only within the imaginary circle, in other words, not to protrude radially outside the imaginary circle toward the rotor 40.

The above structure in which the protrusions 142 have the limited thickness in the radial direction and do not function as teeth in the gaps between the straight sections 83 arranged adjacent each other in the circumferential direction enables the adjacent straight sections 83 to be disposed closer to each other as compared with a case where teeth are provided in the gaps between the straight sections 83. This enables a sectional area of the conductor body 82a to be increased, thereby reducing heat generated upon excitation of the stator winding 51. The absence of the teeth enables magnetic saturation to be eliminated to increase the amount of electrical current delivered to the stator winding 51. It is, however, possible to alleviate the adverse effects arising from an increase in amount of heat generated by the increase in electrical current delivered to the stator winding 51. The stator winding 51, as described above, has the turns 84 which are shifted in the radial direction and equipped with the interference avoiding portions with the adjacent turns 84, thereby enabling the turns 84 to be disposed away from each other in the radial direction. This enhances the heat dissipation from the turns 84. The above structure is enabled to optimize the heat dissipating ability of the stator 50.

The radial thickness of the protrusions 142 may not be restricted by the dimension H1 in FIG. 25 as long as the yoke 141 of the stator core 52 and the magnet unit 42 (i.e., each of the magnets 91 and 92) of the rotor 40 are arranged at a given distance away from each other. Specifically, the radial thickness of the protrusions 142 may be larger than or equal to the dimension H1 in FIG. 25 as long as the yoke 141 and the magnet unit 42 arranged 2 mm or more away from each other. For instance, in a case where the radial thickness of the straight section 83 is larger than 2 mm, and each of the conductor groups 81 is made up of the two conductors 82 stacked in the radial direction, each of the protrusions 142 may be shaped to occupy a region ranging to half the thickness of the straight section 83 not contacting the yoke 141, i.e., the thickness of the conductor 82 located farther away from the yoke 141. In this case, the above beneficial advantages will be obtained by increasing the conductive sectional area of the conductor groups 81 as long as the radial thickness of the protrusions 142 is at least H1×3/2.

Figure 26:
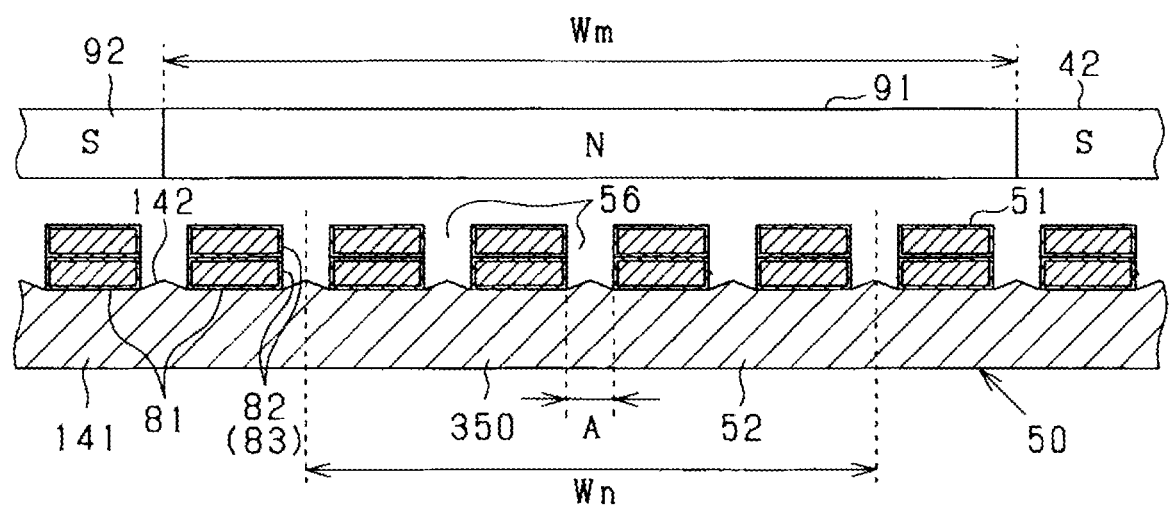
FIG. 26 is a sectional view of a stator in the first modification.

The stator core 52 may be designed to have the structure illustrated in FIG. 26. FIG. 26 omits the sealing members 57, but the sealing members 57 may be used. FIG. 26 illustrates the magnet unit 42 and the stator core 52 as being arranged linearly for the sake of simplicity.

In the structure of FIG. 26, the stator 50 has the protrusions 142 as inter-conductor members each of which is arranged between a respective two of the conductors 82 (i.e., the straight sections 83) located adjacent each other in the circumferential direction. The stator 50 is equipped with the portions 350 each of which magnetically operates along with one of the magnetic poles (i.e., an N-pole or an S-pole) of the magnet unit 42 when the stator winding 51 is excited. The portions 350 extend in the circumferential direction of the stator 50. If each of the portions 350 has a length Wn in the circumferential direction of the stator 50, the sum of widths of the protrusions 142 lying in a range of this length Wn (i.e., the total dimension of the protrusions 412 in the circumferential direction of the stator 50 in the range of length Wn) is defined as Wt, the saturation magnetic flux density of the protrusions 412 is defined as Bs, a width of the magnet unit 42 equivalent to one of the magnetic poles of the magnet unit 42 in the circumferential direction of the magnet unit 42 is defined as Wm, and the remanent flux density in the magnet unit 42 is defined as Br, the protrusions 142 are made of a magnetic material meeting a relation of $$Wt \times Bs \leq Wm \times Br \quad (1)$$

The range Wn is defined to contain ones of the conductor groups 81 which are arranged adjacent each other in the circumferential direction and which overlap in time of excitation thereof with each other. It is advisable that a reference (i.e., a border) used in defining the range Wn be set to the center of the gap 56 between the conductor groups 81. For instance, in the structure illustrated in FIG. 26, the plurality of conductor groups 81 lying in the range Wn include the first, the second, the third, and the fourth conductor groups 81, as numbered from the magnetic center of the N-pole, where the first and the second conductor groups 81 are closest to the magnetic center of the N-pole. The range Wn is defined to include the total of those four conductor groups 81. Ends (i.e., outer limits) of the range Wn are defined to lie at the centers of the gaps 56.

In FIG. 26, the range Wn contains half of the protrusion 142 inside each of the ends thereof. The total of the four protrusions 142 lie in the range Wn. If the width of each of the protrusions 142 (i.e., a dimension of the protrusion 142 in the circumferential direction of the stator 50, in other words, an interval between the adjacent conductor groups 81) is defined as A, the sum of widths Wt of the protrusions 142 lying in the range Wn meets a relation of Wt=½A+A+A+A+½A=4A.

Specifically, the three-phase windings of the stator winding 51 in this embodiment are made in the form of distributed windings. In the stator winding 51, the number of the protrusions 142 for each pole of the magnet unit 42, that is, the number of the gaps 56 each between the adjacent conductor groups 81 is selected to be "the number of phases×Q" where Q is the number of the conductors 82 for each phase which are placed in contact with the stator core 52. In other words, in the case where the conductors 82 are stacked in the radial direction of the rotor 40 to constitute each of the conductor groups 81, Q is the number of inner ones of the conductors 82 of the conductor groups 81 for each phase. In this case, when the three-phase windings of the stator winding 51 are excited in a given sequence, the protrusions 142 for two of the three-phases within each pole are magnetically excited. The total circumferential width Wt of the protrusions 142 excited upon excitation of the stator winding 51 within a range of each pole of the magnet unit 42, therefore, meets a relation of "the number of the phases excited×Q×A=2×2×A where A is the width of each of the protrusions 142 (i.e., the gap 56) in the circumferential direction.

The total width Wt is determined in the above way. Additionally, the protrusions 142 of the stator core 52 are made of magnetic material meeting the above equation (1). The total width Wt is also viewed as being equivalent to a circumferential dimension of where the relative magnetic permeability is expected to become greater than one within each pole. The total width Wt may alternatively be determined as a circumferential width of the protrusions 142 in each pole with some margin. Specifically, since the number of the protrusions 142 for each pole of the magnet unit 42 is given by the number of phases×Q, the width of the protrusions 412 in each pole (i.e., the total width Wt) may be given by the number of phases×Q×A=3×2×A=6A.

The distributed winding, as referred to herein, means that there is a pair of poles (i.e., the N-pole and the S-pole) of the stator winding 51 for each pair of magnetic poles. The pair of poles of the stator winding 51, as referred to herein, is made of the two straight sections 83 in which electrical current flows in opposite directions and the turn 84 electrically connecting them together. Note that a short pitch winding or a full pitch winding may be viewed as an equivalent of the distributed winding as long as it meets the above conditions.

Next, the case of a concentrated winding will be described below. The concentrated winding, as referred to herein, means that the width of each pair of magnetic poles is different from that of each pair of poles of the stator winding 51. An example of the concentrated winding includes a structure in which there are three conductor groups 81 for each pair of magnetic poles, in which there are three conductor groups 81 for two pairs of magnetic poles, in which there are nine conductor groups 81 for four pairs of magnetic poles, or in which there are nine conductor groups 81 for five pairs of magnetic poles.

In the case where the stator winding 51 is made in the form of the concentrated winding, when the three-phase windings of the stator winding 51 are excited in a given sequence, a portion of the stator winding 51 for two phases is excited. This causes the protrusions 142 for two phases to be magnetically excited. The circumferential width Wt of the protrusions 142 which is magnetically excited upon excitation of the stator winding in a range of each pole of the magnet unit 42 is given by Wt=A×2. The width Wt is determined in this way. The protrusions 142 are made of magnetic material meeting the above equation (1). In the above described case of the concentrated winding, the sum of widths of the protrusions 142 arranged in the circumferential direction of the stator 50 within a region surrounded by the conductor groups 81 for the same phase is defined as A. The dimension Wm in the concentrated winding is given by [an entire circumference of a surface of the magnet unit 42 facing the air gap]×[the number of phases]±[the number of the distributed conductor groups 81].

Usually, a neodymium magnet, a samarium-cobalt magnet, or a ferrite magnet whose value of BH is higher than or equal to 20[MGOe (kJ/m^3)] has Bd=1.0 T or more. Iron has Br=2.0 T or more. The protrusions 142 of the stator core 52 may, therefore, be made of magnetic material meeting a relation of Wt<½×Wm for realizing a high-power motor.

In a case where each of the conductors 82 is, as described later, equipped with the outer coated layer 182, the conductors 82 may be arranged in the circumferential direction of the stator core with the outer coated layers 182 placed in contact with each other. In this case, the width Wt may be viewed to be zero or equivalent to thicknesses of the outer coated layers 182 of the conductors 82 contacting with each other.

The structure illustrated in FIG. 25 or 26 is designed to have inter-conductor members (i.e., the protrusions 142) which are too small in size for the magnet-produced magnetic flux in the rotor 40. The rotor 40 is implemented by a surface permanent magnet rotor which has a flat surface and a low inductance, and does not have a salient pole in terms of a magnetic resistance. Such a structure enables the inductance of the stator 50 to be decreased, thereby reducing a risk of distortion of the magnetic flux caused by the switching time gap in the stator winding 51, which minimizes the electrical erosion of the bearings 21 and 22.

Second Modification

Figure 27:
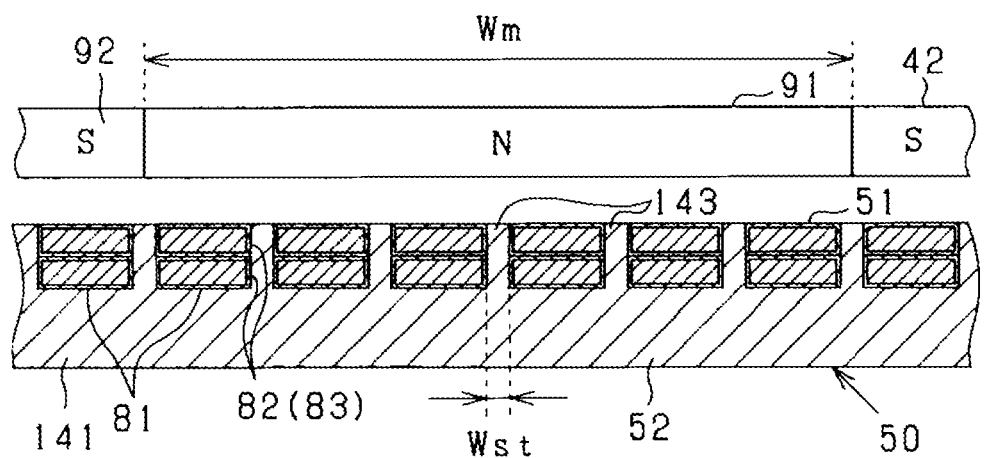
FIG. 27 is a sectional view of a stator in the second modification.

The stator 50 equipped with the inter-conductor members made to meet the above equation may be designed to have the following structure. In FIG. 27, the stator core 52 is equipped with the teeth 143 as inter-conductor members which are formed in an outer peripheral portion (an upper portion, as viewed in the drawing) of the stator core 52. The teeth 143 protrude from the yoke 141 and are arranged at a given interval away from each other in the circumferential direction of the stator core 52. Each of the teeth 143 has a thickness identical with that of the conductor group 81 in the radial direction. The teeth 143 have side surfaces placed in contact with the conductors 82 of the conductor groups 81. The teeth 143 may alternatively be located away from the conductors 82 through gaps.

The teeth 143 are shaped to have a restricted width in the circumferential direction. Specifically, each of the teeth 143 has a stator tooth which is very thin for the volume of magnets. Such a structure of the teeth 143 serves to achieve saturation by the magnet-produced magnetic flux at 1.8T or more to reduce the permeance, thereby decreasing the inductance.

If a surface area of a magnetic flux acting surface of the magnet unit 42 facing the stator 50 for each pole is defined as Sm, and the remanent flux density of the magnet unit 42 is defined as Br, the magnetic flux in the magnet unit 42 will be Sm×Br. A surface area of each of the teeth 143 facing the rotor 40 is defined as St. The number of the conductors 83 for each phase is defined as m. When the teeth 143 for two phases within a range of one pole are magnetically excited upon excitation of the stator winding 51, the magnetic flux in the stator 50 is expressed by St×m×2×Bs. The decrease in inductance may be achieved by selecting the dimensions of the teeth 143 to meet a relation of $$St \times m \times 2 \times Bs < Sm \times Br \qquad (2).$$

In a case where the dimension of the magnet unit 42 is identical with that of the teeth 143 in the axial direction, the above equation (2) may be rewritten as an equation (3) of Wst×m×2×Bs<Wm×Br where Wm is the circumferential width of the magnet unit 42 for each pole, and Wst is the circumferential width of the teeth 143. For example, when Bs=2 T, Br=1 T, and m=2, the equation (3) will be Wst<Wm/8. In this case, the decrease in inductance may be achieved by selecting the width Wst of the teeth 143 to be smaller than one-eighth (⅛) of the width Wm of the magnet unit 42 for one pole. When m is one, the width Wst of the teeth 143 is preferably selected to be smaller than one-fourth (¼) of the width Wm of the magnet unit 42 for one pole.

"Wst×m×2" in the equation (3) corresponds to a circumferential width of the teeth 143 magnetically excited upon excitation of the stator winding 51 in a range of one pole of the magnet unit 42.

The structure in FIG. 27 is, like in FIGS. 25 and 26, equipped with the inter-conductor members (i.e., the teeth 143) which are very small in size for the magnet-produced magnetic flux in the rotor 40. Such a structure is capable of reducing the inductance of the stator 50 to alleviate a risk of distortion of the magnetic flux arising from the switching time gap in the stator winding 51, which minimizes the probability of the electrical erosion of the bearings 21 and 22. Note that the definitions of parameters, such as Wt, Wn, A, and Bs, associated with the stator 50 or parameters, such as Wm and Br, associated with the magnet unit 42 may refer to those in the above described first modification.

Third Modification

Figure 28:
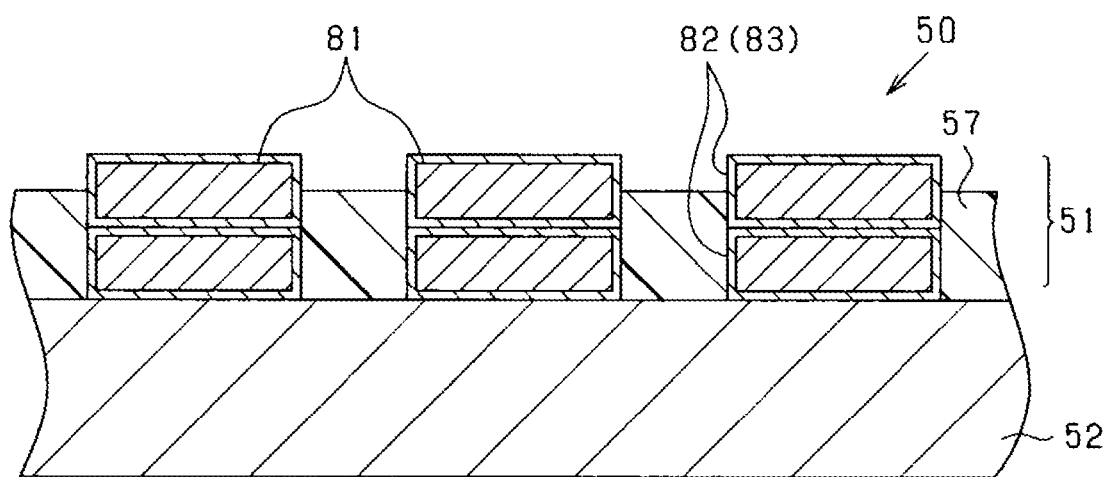
FIG. 28 is a sectional view of a stator in the third modification.

The above embodiment has the sealing members 57 which cover the stator winding 51 and occupy a region including all of the conductor groups 81 radially outside the stator core 52, in other words, lie in a region where the thickness of the sealing members 57 is larger than that of the conductor groups 81 in the radial direction. This layout of the sealing members 57 may be changed. For instance, the sealing members 57 may be, as illustrated in FIG. 28, designed so that the conductors 82 protrude partially outside the sealing members 57. Specifically, the sealing members 57 are arranged so that portions of the conductors 82 that are radially outermost portions of the conductor groups 81 are exposed outside the sealing members 57 toward the stator 50. In this case, the thickness of the sealing members 57 in the radial direction may be identical with or smaller than that of the conductor groups 81.

Fourth Modification

Figure 29:
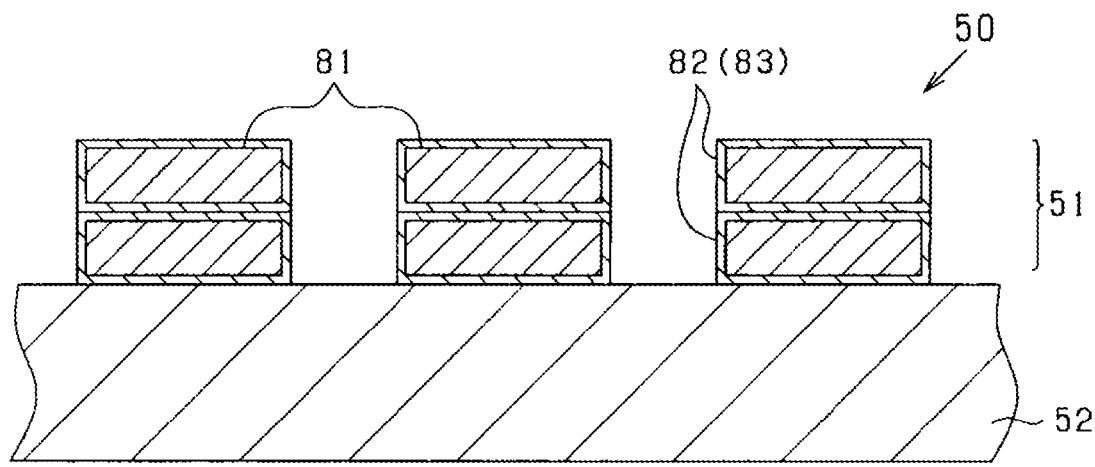
FIG. 29 is a sectional view of a stator in the fourth modification.

The stator 50 may be, as illustrated in FIG. 29, designed not to have the sealing members 57 covering the conductor groups 81, i.e., the stator winding 51. In this case, a gap is created between the adjacent conductor groups 81 arranged in the circumferential direction without a inter-conductor member therebetween. In other words, no inter-conductor member is disposed between the conductor groups 81 arranged in the circumferential direction. Air may be arranged in the gaps between the conductor groups 81. The air may be viewed as a non-magnetic member or an equivalent thereof whose Bs is zero (0).

Fifth Modification

The inter-conductor members of the stator 50 may be made of a non-magnetic material other than resin. For instance, a non-metallic material, such as SUS304 that is austenitic stainless steel.

Sixth Modification

The stator 50 may be designed not to have the stator core 52. Specifically, the stator 50 is made of the stator winding 51 shown in FIG. 12. The stator winding 51 of the stator 50 may be covered with a sealing member. The stator 50 may alternatively be designed to have an annular winding retainer made from non-magnetic material such as synthetic resin instead of the stator core 52 made from soft magnetic material.

Seventh Modification

Figure 30:
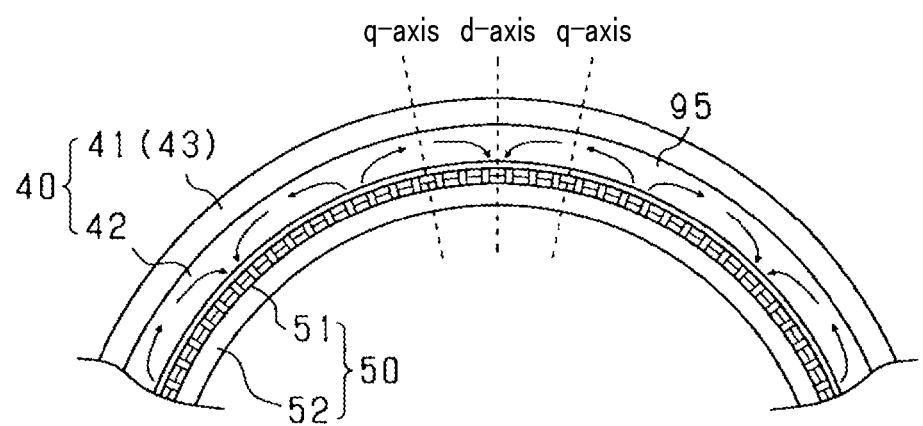
FIG. 30 is a sectional view of a stator in the seventh modification.

The structure in the first embodiment uses the magnets 91 and 92 arranged in the circumferential direction to constitute the magnet unit 42 of the rotor 40. The magnet unit 42 may be made using an annular permanent magnet. For instance, the annular magnet 95 is, as illustrated in FIG. 30, secured to a radially inner periphery of the cylinder 43 of the magnet holder 41. The annular magnet 95 is equipped with a plurality of different magnetic poles whose magnetic polarities are arranged alternately in the circumferential direction of the annular magnet 95. The magnet 95 lies integrally both on the d-axis and the q-axis. The annular magnet 95 has a magnetic orientation directed in the radial direction on the d-axis of each magnetic pole and a magnetic orientation directed in the circumferential direction on the q-axis between the magnetic poles, thereby creating arc-shaped magnetic paths.

The annular magnet 95 may be designed to have an easy axis of magnetization directed parallel or nearly parallel to the d-axis near the d-axis and also to have an easy axis of magnetization directed perpendicular or near perpendicular to the q-axis near the q-axis, thereby creating the arc-shaped magnetic paths.

Eighth Modification

This modification is different in operation of the controller 110 from the above embodiment or modifications. Only differences from those in the first embodiment will be described below.

Figure 31:
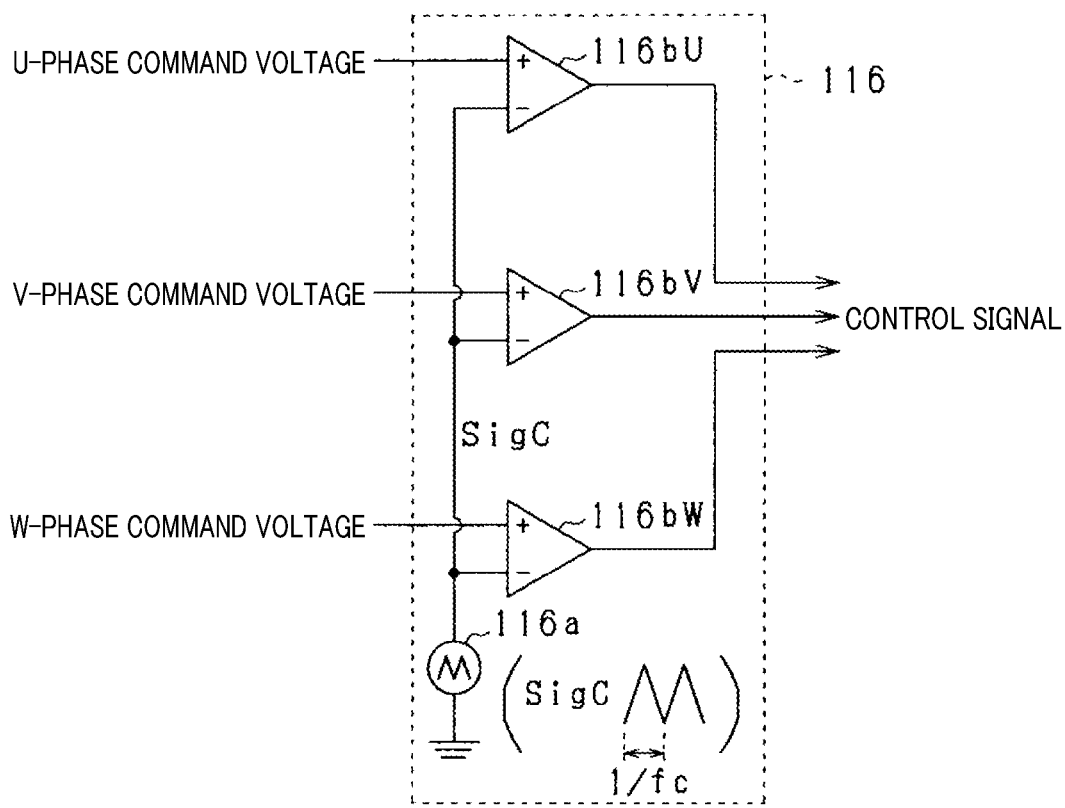
FIG. 31 is a functional block diagram which illustrates a portion of operations of an operation signal generator in the eighth modification 8.

The operations of the operation signal generators 116 and 126 illustrated in FIG. 20 and the operation signal generators 130a and 130b illustrated in FIG. 21 will first be discussed below using FIG. 31. The operations executed by the operation signal generators 116, 126, 130a, and 130b are basically identical with each other. Only the operation of the operation signal generator 116 will, therefore, be described below for the sake of simplicity.

The operation signal generator 116 includes the carrier generator 116a, the U-phase comparator 116bU, the V-phase comparator 116bV, and the W-phase comparator 116bW. The carrier generator 116a produces and outputs the carrier signal SigC in the form of a triangle wave signal.

The U-, V-, and W-phase comparators 116bU, 116bV, and 116bW receive the carrier signal SigC outputted by the carrier generator 116a and the U-, V-, and W-phase command voltages produced by the three-phase converter 115. The U-, V-, and W-phase command voltages are produced, for example, in the form of a sine wave and outputted 120° out of electrical phase with each other.

The U-, V-, and W-phase comparators 116bU, 116bV, and 116bW compare the U-, V-, and W-phase command voltages with the carrier signal SigC to produce operation signals for the switches Sp and Sn of the upper and lower arms in the first inverter 101 for the U-, V-, and W-phase windings under PWM (Pulse Width Modulation) control. Specifically, the operation signal generator 116 works to produce operation signals for the switches Sp and Sn of the upper and lower arms for the U-, V-, and W-phase windings under the PWM control based on comparison of levels of signals derived by normalizing the U-, V-, and W-phase command voltages using the power supply voltage with a level of the carrier signal SigC. The driver 117 is responsive to the operation signals outputted by the operation signal generator 116 to turn on or off the switches Sp and Sn in the first inverter 101 for the U-, V-, and W-phase windings.

The controller 110 alters the carrier frequency fc of the carrier signal SigC, i.e., a switching frequency for each of the switches Sp and Sn. The carrier frequency fc is altered to be higher in a low torque range or a high-speed range in the rotating electrical machine 10 and alternatively lower in a high torque range in the rotating electrical machine 10. This altering is achieved in order to minimize a deterioration in ease of control of electrical current flowing through each of the U-, V-, and W-phase windings.

In brief, the core-less structure of the stator 50 serves to reduce the inductance in the stator 50. The reduction in inductance usually results in a decrease in electrical time constant in the rotating electrical machine 10. This leads to a risk that a ripple of current flowing through each of the phase windings may be increased, thereby resulting in the deterioration in ease of control of the current flowing through the phase winding, which causes control divergence. The adverse effects of the above deterioration on the ease of control usually become higher when the current (e.g., an effective value of the current) flowing through the winding lies in a low current region than when the current lies in a high current range. In order to alleviate such a problem, the controller 110 in this embodiment is designed to alter the carrier frequency fc.

How to alter the carrier frequency fc will be described below with reference to FIG. 32. This operation of the operation signal generator 116 is executed by the controller 110 cyclically at a given interval.

First, in step S10, it is determined whether electrical current flowing through each of the three-phase windings 51a lies in the low current range. This determination is made to determine whether torque now produced by the rotating electrical machine 10 lies in the low torque range. Such a determination may be achieved according to the first method or the second method, as discussed below.

First Method

The estimated torque value of the rotating electrical machine 10 is calculated using the d-axis current and the q-axis current converted by the d-q converter 112. If the estimated torque value is determined to be lower than a torque threshold value, it is concluded that the current flowing through the winding 51a lies in the low current range. Alternatively, if the estimated torque value is determined to be higher than or equal to the torque threshold value, it is concluded that the current lies in the high current range. The torque threshold value is selected to be half, for example, the degree of starting torque (also called locked rotor torque) in the rotating electrical machine 10.

Second Method

If an angle of rotation of the rotor 40 measured by an angle sensor is determined to be higher than or equal to a speed threshold value, it is determined that the current flowing through the winding 51a lies in the low current range, that is, in the high speed range. The speed threshold value may be selected to be a rotational speed of the rotating electrical machine 10 when a maximum torque produced by the rotating electrical machine 10 is equal to the torque threshold value.

If a NO answer is obtained in step S10, meaning that the current lies in the high current range, then the routine proceeds to step S11 wherein the carrier frequency fc is set to the first frequency fL.

Alternatively, if a YES answer is obtained in step S10, then the routine proceeds to step S12 wherein the carrier frequency fc is set to the second frequency fH that is higher than the first frequency fL.

As apparent from the above discussion, the carrier frequency fc when the current flowing through each of the three-phase windings lies in the low current range is selected to be higher than that when the current lies in the high current range. The switching frequency for the switches Sp and Sn is, therefore, increased in the low current range, thereby minimizing a rise in current ripple to ensure the stability in controlling the current.

When the current flowing through each of the three-phase windings lies in the high current range, the carrier frequency fc is selected to be lower than that when the current lies in the low current range. The current flowing through the winding in the high current range usually has an amplitude larger than that when the current lies in the low current range, so that the rise in current ripple arising from the reduction in inductance has a low impact on the ease of control of the current. It is, therefore, possible to set the carrier frequency fc in the high current range to be lower than that in the low current range, thereby reducing a switching loss in the inverters 101 and 102.

This modification is capable of realizing the following modes.

Figure 32:
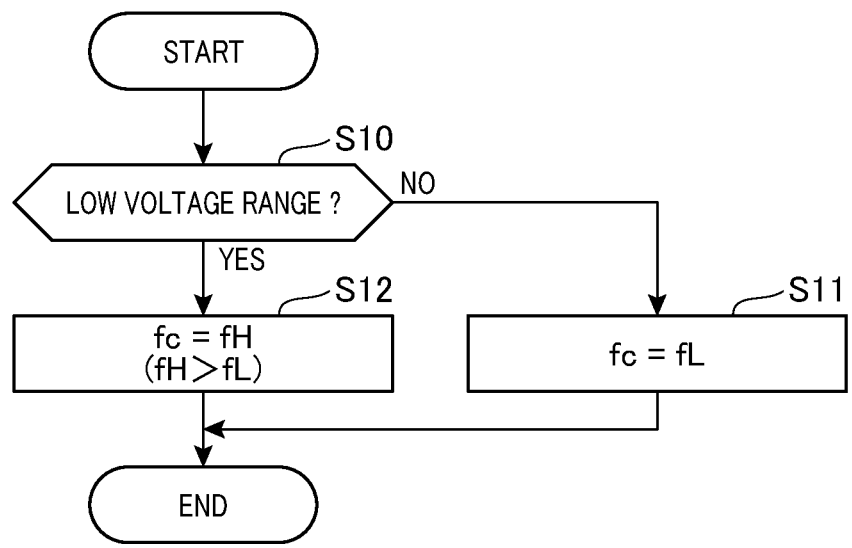
FIG. 32 is a flowchart representing a sequence of steps to execute a carrier frequency altering operation.

If a YES answer is obtained in step S10 in FIG. 32 when the carrier frequency fc is set to the first frequency fL, the carrier frequency fc may be changed gradually from the first frequency fL to the second frequency fH.

Alternatively, if a NO answer is obtained in step S10 when the carrier frequency fc is set to the second frequency fH, the carrier frequency fc may be changed gradually from the second frequency fH to the first frequency fL.

The operation signals for the switches may alternatively be produced using SVM (Space Vector Modulation) instead of the PWM. The above alteration of the switching frequency may also be made.

Ninth Modification

Figures 33A, 33B, 33C:
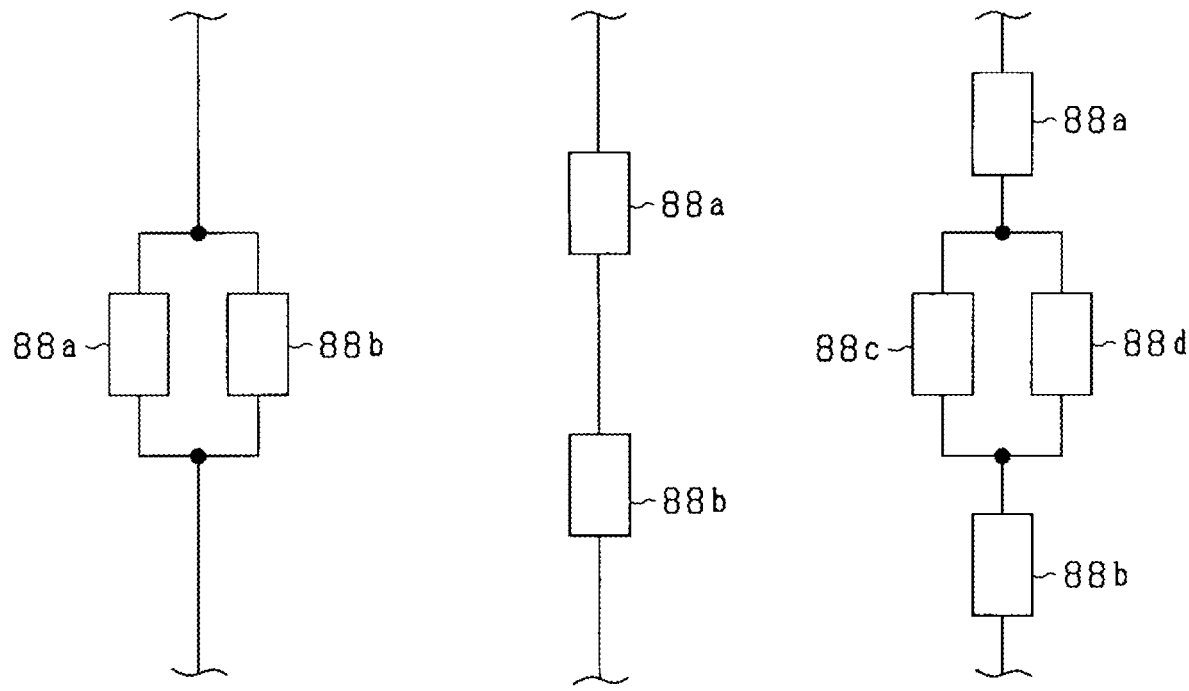
FIGS. 33(a), 33(b), and 33(c) are views which illustrate connections of conductors constituting a conductor group in the ninth modification.

In each of the embodiments, two pairs of conductors making up the conductor groups 81 for each phase are, as illustrated in FIG. 33(a), arranged parallel to each other. FIG. 33(a) is a view which illustrates an electrical connection of the first and second conductors 88a and 88b that are the two pairs of conductors. The first and second conductors 88a and 88b may alternatively be, as illustrated in FIG. 33(b), connected in series with each other instead of the connection in FIG. 33(a).

Figure 34:
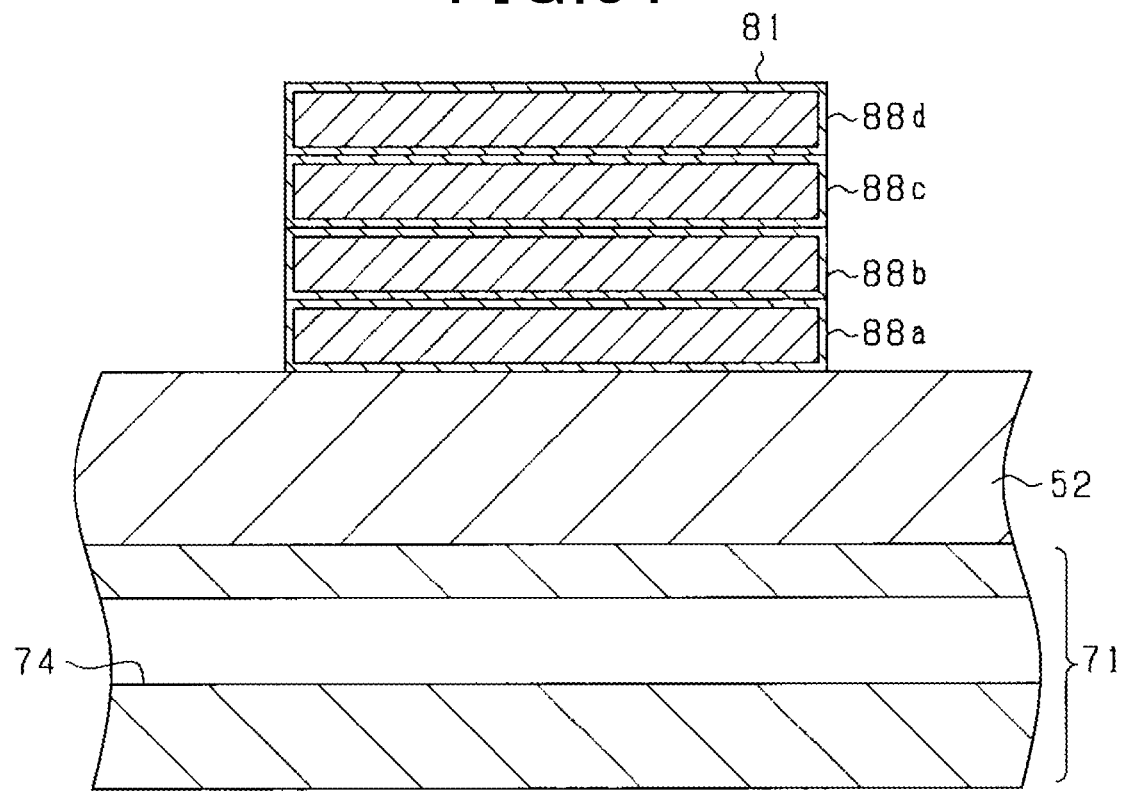
FIG. 34 is a view which illustrates a stack of four conductors in the ninth modification.

Three or more pairs of conductors may be stacked in the form of multiple layers. FIG. 34 illustrates four pairs of conductors: the first to fourth conductors 88a to 88d which are stacked. The first conductor 88a, the second conductor 88b, the third conductor 88c, and the fourth conductor 88d are arranged in this order from the stator core 52 in the radial direction.

The third and fourth conductors 88c and 88d are, as illustrated in FIG. 33(c), connected in parallel to each other. The first conductor 88a is connected to one of joints of the third and fourth conductors 88c and 88d. The second conductor 88b is connected to the other joint of the third and fourth conductors 88c and 88d. The parallel connection of conductors usually results in a decrease in current density of those conductors, thereby minimizing thermal energy produced upon energization of the conductors. Accordingly, in the structure in which a cylindrical stator winding is installed in a housing (i.e., the unit base 61) with the coolant path 74 formed therein, the first and second conductors 88a and 88b which are connected in non-parallel to each other are arranged close to the stator core 52 placed in contact with the unit base 61, while the third and fourth conductors 88c and 88d which are connected in parallel to each other are disposed farther away from the stator core 52. This layout equalizes the cooling ability of the conductors 88a to 88d stacked in the form of multiple layers.

The conductor group 81 including the first to fourth conductors 88a to 88d may have a thickness in the radial direction which is smaller than a circumferential width of the conductor groups 81 for one phase within a region of one pole.

Tenth Modification

Figure 35:
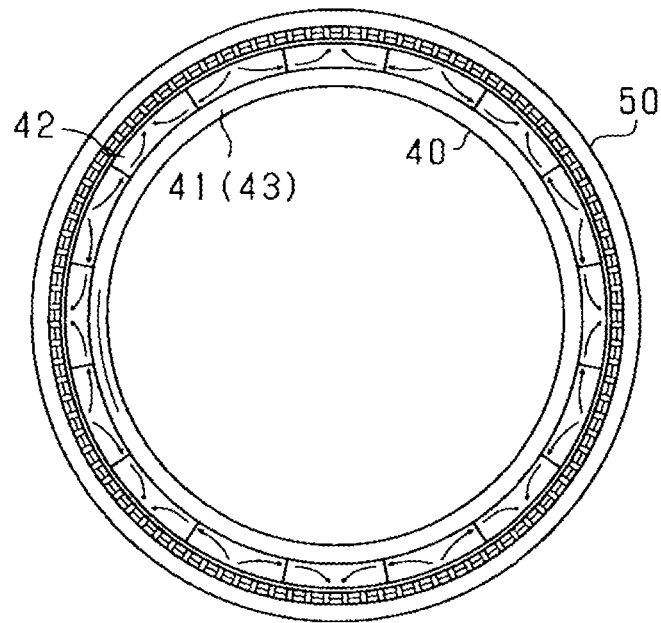
FIG. 35 is a transverse sectional view of an inner rotor type rotor and a stator in the tenth modification.
Figure 36:
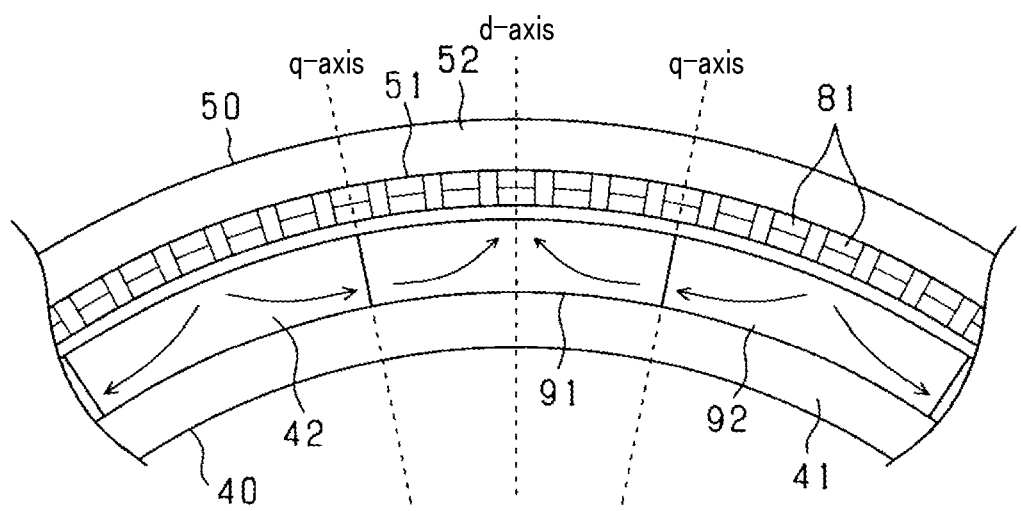
FIG. 36 is a partially enlarged view of FIG. 35.

The rotating electrical machine 10 may alternatively be designed to have an inner rotor structure (i.e., an inward rotating structure). In this case, the stator 50 may be mounted, for example, on a radial outside within the housing 30, while the rotor 40 may be disposed on a radial inside within the housing 30. The inverter unit 60 may be mounted one or both axial sides of the stator 50 or the rotor 40. FIG. 35 is a transverse sectional view of the rotor 40 and the stator 50. FIG. 36 is an enlarged view which partially illustrates the rotor 40 and the stator 50 in FIG. 35.

The inner rotor structure in FIGS. 35 and 36 is substantially identical with the outer rotor structure in FIGS. 8 and 9 except for the layout of the rotor 40 and the stator 50 in the radial direction. In brief, the stator 50 is equipped with the stator winding 51 having the flattened conductor structure and the stator core 52 with no teeth. The stator winding 51 is installed radially inside the stator core 52. The stator core 52, like the outer rotor structure, has any of the following structures.

(A) The stator 50 has the inter-conductor members each of which is disposed between the conductor portions in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit equivalent to one magnetic pole in the circumferential direction, and Br is the remanent flux density in the magnet unit.

(B) The stator 50 has the inter-conductor members each of which is disposed between the conductor portions in the circumferential direction. The inter-conductor members are each made of a non-magnetic material.

(C) The stator 50 has no inter-conductor member disposed between the conductor portions in the circumferential direction.

The same is true of the magnets 91 and 92 of the magnet unit 42. Specifically, the magnet unit 42 is made up of the magnets 91 and 92 each of which is magnetically oriented to have the easy axis of magnetization which is directed near the d-axis to be more parallel to the d-axis than that near the q-axis which is defined on the boundary of the magnetic poles. The details of the magnetization direction in each of the magnets 91 and 92 are the same as described above. The magnet unit 42 may be the annular magnet 95 (see FIG. 30).

Figure 37:
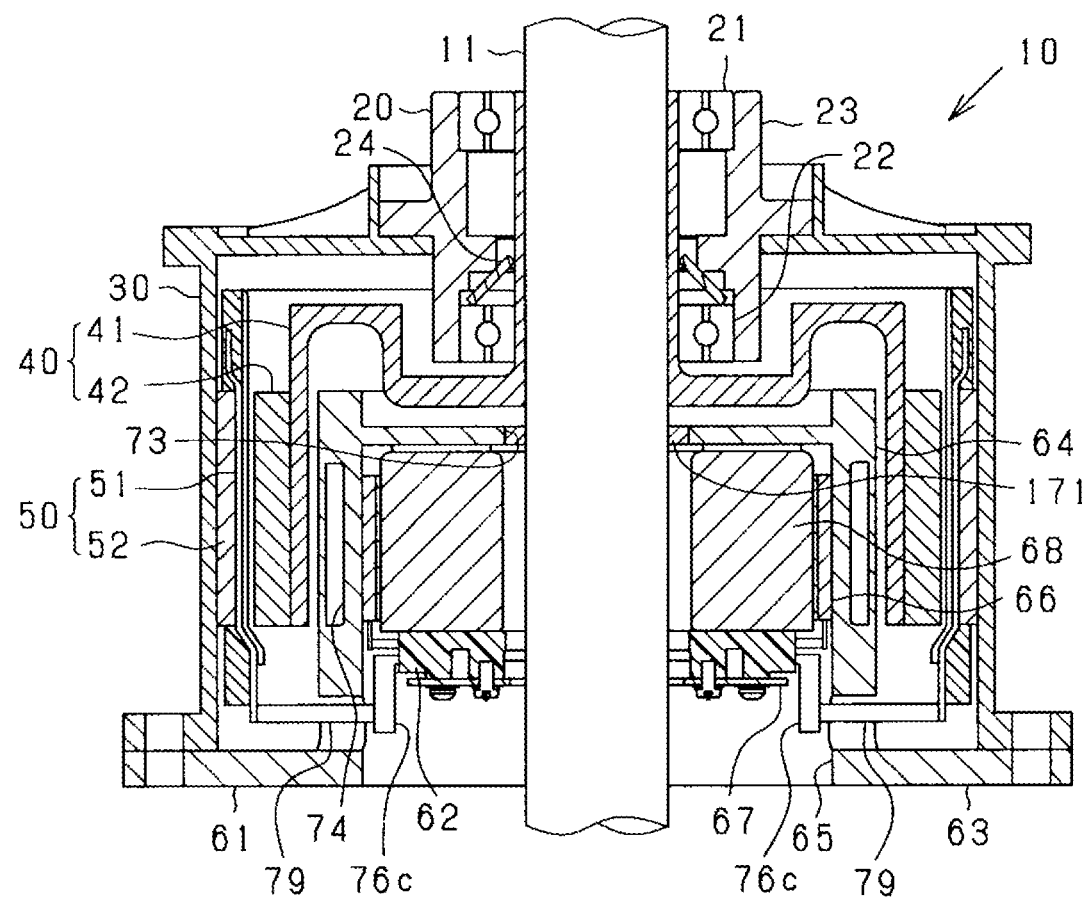
FIG. 37 is a longitudinal sectional view of an inner rotor type rotating electrical machine.

FIG. 37 is a longitudinal sectional view of the rotating electrical machine 10 designed to have the inner rotor structure. FIG. 37 corresponds to FIG. 2. Differences from the structure in FIG. 2 will be described below in brief. In FIG. 37, the annular stator 50 is retained inside the housing 30. The rotor 40 is disposed inside the stator 50 with an air gap therebetween to be rotatable. The bearings 21 and 22 are, like in FIG. 2, offset from the axial center of the rotor 40 in the axial direction of the rotor 40, so that the rotor 40 is retained in the cantilever form. The inverter 60 is mounted inside the magnet holder 41 of the rotor 40.

Figure 38:
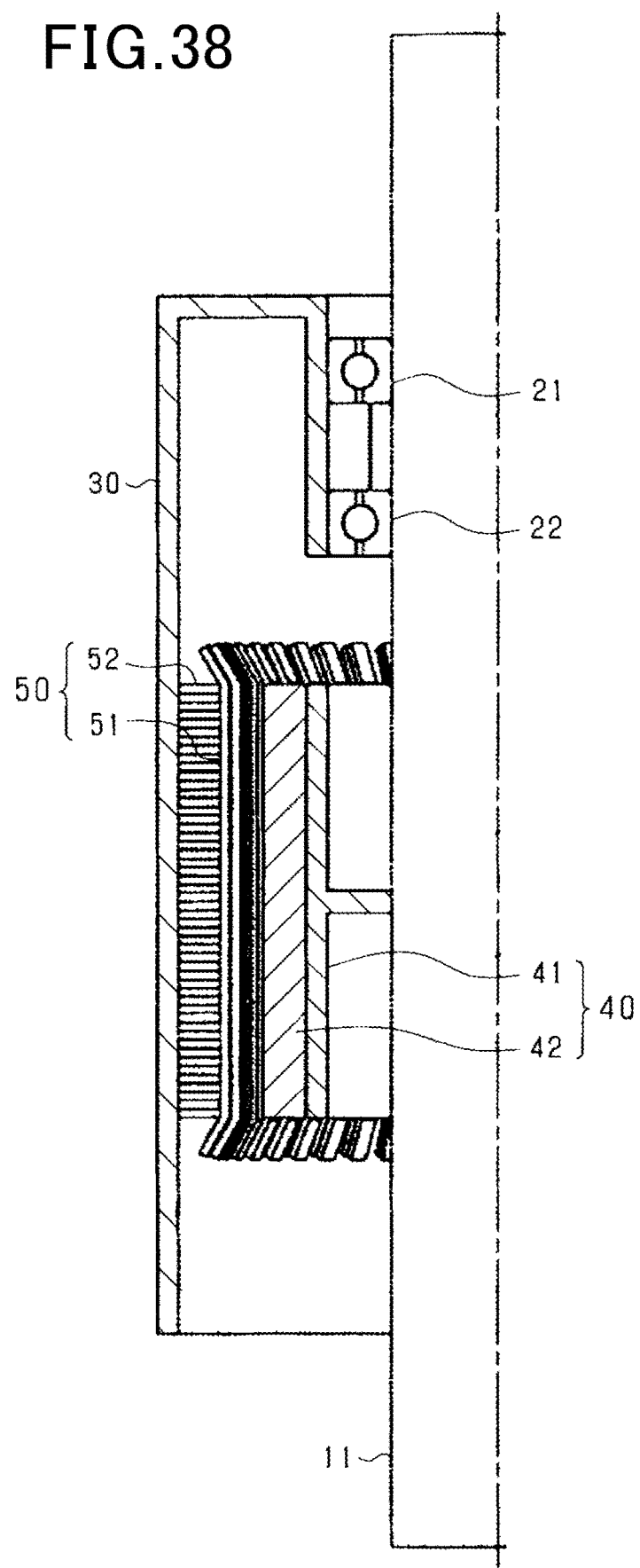
FIG. 38 is a longitudinal sectional view which schematically illustrates a structure of an inner rotor type rotating electrical machine.

FIG. 38 illustrates the inner rotor structure of the rotating electrical machine 10 which is different from that described above. The housing 30 has the rotating shaft 11 retained by the bearings 21 and 22 to be rotatable. The rotor 40 is secured to the rotating shaft 11. Like the structure in FIG. 2, each of the bearings 21 and 22 is offset from the axial center of the rotor 40 in the axial direction of the rotor 40. The rotor 40 is equipped with the magnet holder 41 and the magnet unit 42.

The rotating electrical machine 10 in FIG. 38 is different from that in FIG. 37 in that the inverter unit 60 is not located radially inside the rotor 40. The magnet holder 41 is joined to the rotating shaft 11 radially inside the magnet unit 42. The stator 50 is equipped with the stator winding 51 and the stator core 52 and secured to the housing 30.

Eleventh Modification

Figure 39:
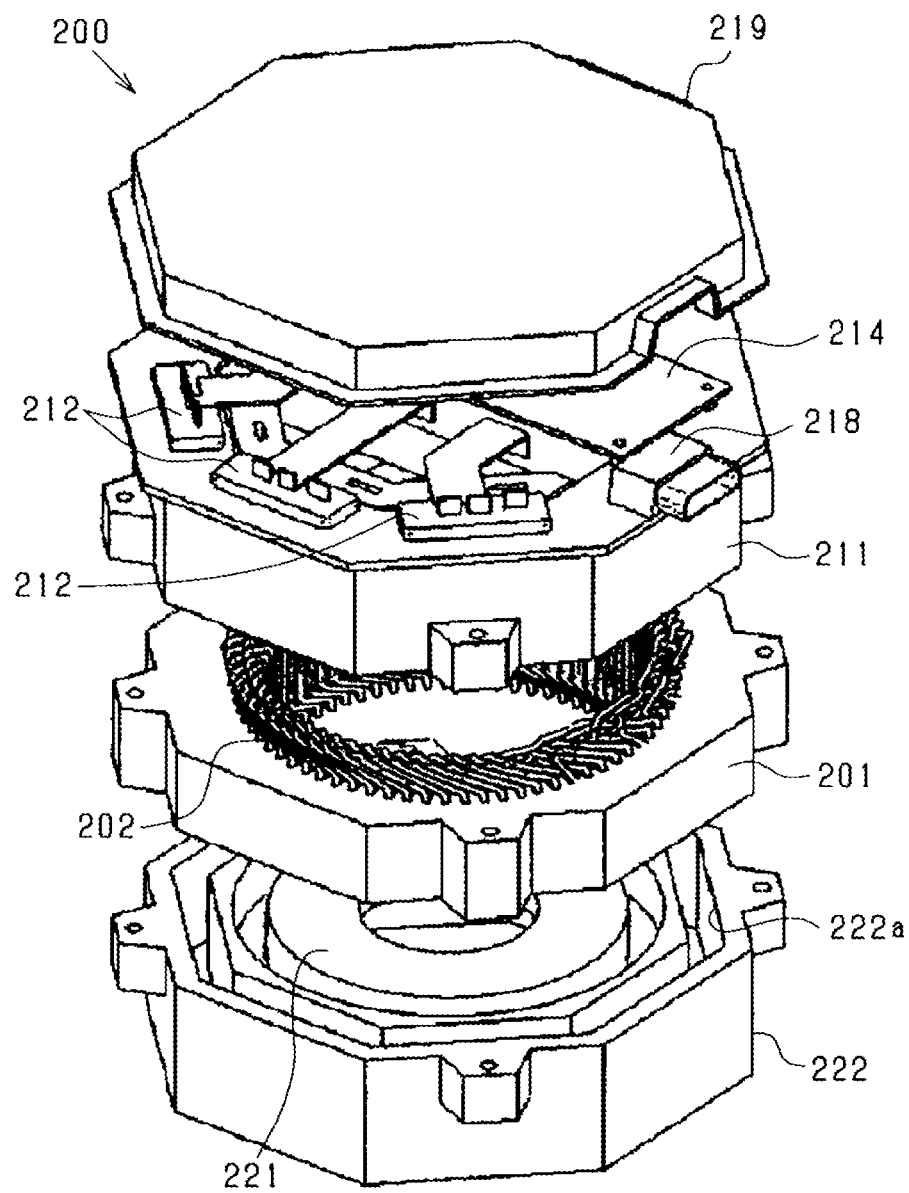
FIG. 39 is a view which illustrates a structure of an inner rotor type rotating electrical machine in the eleventh modification.
Figure 40:
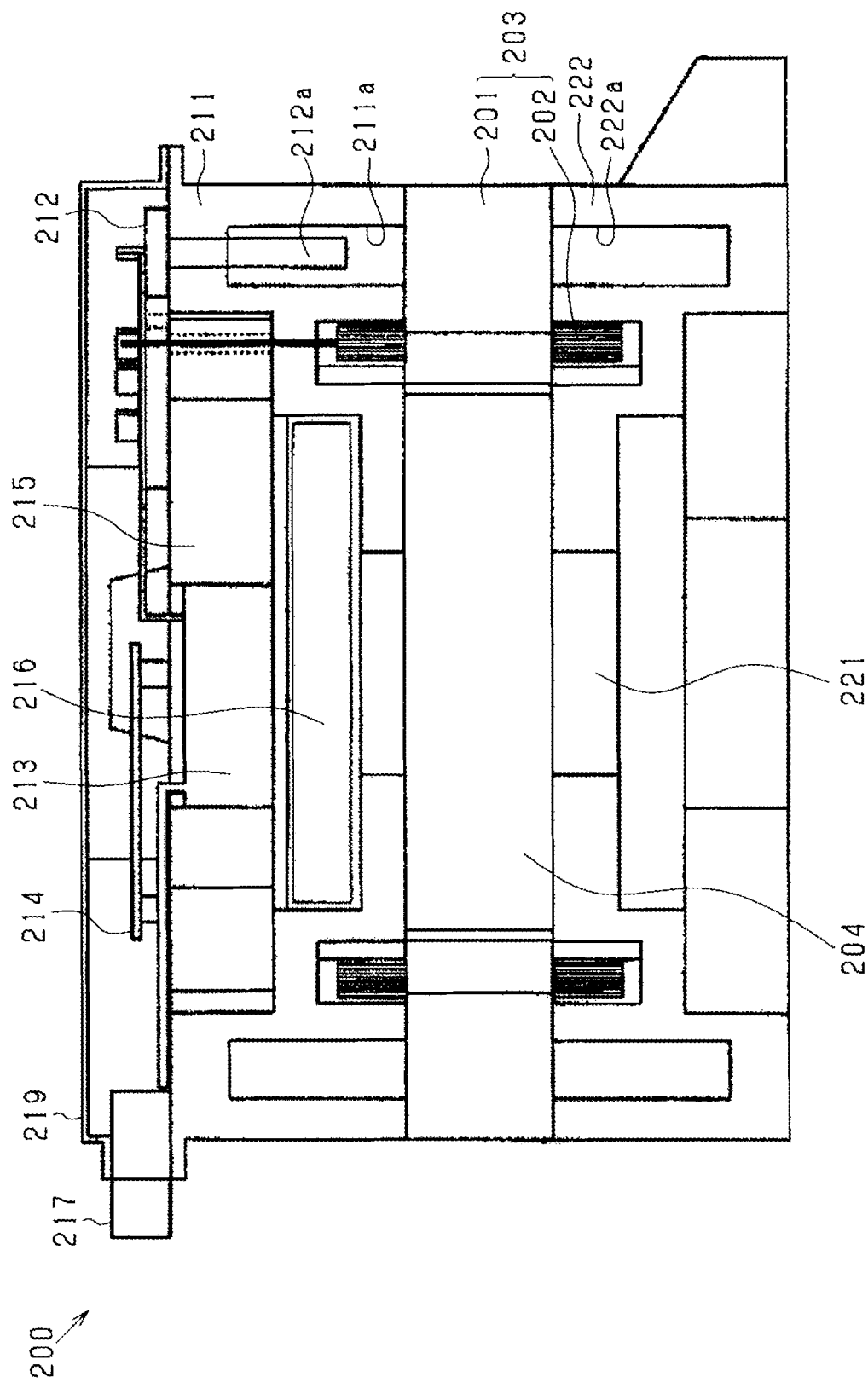
FIG. 40 is a view which illustrates a structure of an inner rotor type rotating electrical machine in the eleventh modification.

The inner rotor structure of a rotating electrical machine which is different from that described above will be discussed below. FIG. 39 is an exploded view of the rotating electrical machine 200. FIG. 40 is a sectional side view of the rotating electrical machine 200. In the following discussion, a vertical direction is based on the orientation of the rotating electrical machine 200.

The rotating electrical machine 200, as illustrated in FIGS. 39 and 40, includes the stator 203 and the rotor 204. The stator 203 is equipped with the annular stator core 201 and the multi-phase stator winding 202. The rotor 204 is disposed inside the stator core 201 to be rotatable. The stator 203 works as an armature. The rotor 204 works as a field magnet. The stator core 201 is made of a stack of silicone steel plates. The stator winding 202 is installed in the stator core 201. Although not illustrated, the rotor 204 is equipped with a rotor core and a plurality of permanent magnet arranged in the form of a magnet unit. The rotor core has formed therein a plurality of holes which are arranged at equal intervals away from each other in the circumferential direction of the rotor core. The permanent magnets which are magnetized to have magnetization directions changed alternately in adjacent magnetic poles are disposed in the holes of the rotor core. The permanent magnets of the magnet unit may be designed, like in FIG. 23, to have a Halbach array structure or a similar structure. The permanent magnets of the magnet unit may alternatively be made of anisotropic magnets, as described with reference to FIG. 9 or 30, in which the magnetic orientation (i.e., the magnetization direction) extends in an arc-shape between the d-axis which is defined on the magnetic center and the q-axis which is defined on the boundary of the magnetic poles.

The stator 203 may be made to have one of the following structures.

(A) The stator 203 has the inter-conductor members each of which is disposed between the conductor portions in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit equivalent to one magnetic pole in the circumferential direction, and Br is the remanent flux density in the magnet unit.

(B) The stator 203 has the inter-conductor members each of which is disposed between the conductor portions in the circumferential direction. The inter-conductor members are each made of a non-magnetic material.

(C) The stator 203 has no inter-conductor member disposed between the conductor portions in the circumferential direction.

The rotor 204 has the magnet unit which is made up of a plurality of magnets each of which is magnetically oriented to have the easy axis of magnetization which is directed near the d-axis to be more parallel to the d-axis than that near the q-axis which is defined on the boundary of the magnetic poles.

The annular inverter case 211 is disposed on one end side of an axis of the rotating electrical machine 200. The inverter case 211 has a lower surface placed in contact with an upper surface of the stator core 201. The inverter case 211 has disposed therein a plurality of power modules 212 constituting an inverter circuit, the smoothing capacitors 213 working to reduce a variation in voltage or current (i.e., a ripple) resulting from switching operations of semiconductor switches, the control board 214 equipped with a controller, the current sensor 215 working to measure a phase current, and the resolver stator 216 serving as a rotational speed sensor for the rotor 204. The power modules 212 are equipped with IGBTs serving as semiconductor switches and diodes.

The inverter case 211 has the power connector 217 which is disposed on a circumferential edge thereof for connection with a dc circuit for a battery mounted in a vehicle. The inverter case 211 also has the signal connector 218 which is disposed on the circumferential edge thereof for achieving transmission of signals between the rotating electrical machine 200 and a controller installed in the vehicle. The inverter case 211 is covered with the top cover 219. The dc power produced by the battery installed in the vehicle is inputted into the power connector 217, converted by the switches of the power modules 212 to an alternating current, and then delivered to phase windings of the stator winding 202.

The bearing unit 221 and the annular rear case 222 are disposed on the opposite end side of the axis of the stator core to the inverter case 211. The bearing unit 221 retains a rotation axis of the rotor 204 to be rotatable. The rear case 222 has the bearing unit 221 disposed therein. The bearing unit 221 is equipped with, for example, two bearings and offset from the center of the length of the rotor 204 toward one of the ends of the length of the rotor 204. The bearing unit 221 may alternatively be engineered to have a plurality of bearings disposed on both end sides of the stator core 201 opposed to each other in the axial direction, so that the bearings retain both the ends of the rotation shaft. The rear case 222 is fastened to a gear case or a transmission of the vehicle using bolts, thereby securing the rotating electrical machine 200 to the vehicle.

The inverter case 211 has formed therein the cooling flow path 211a through which cooling medium flows. The cooling flow path 211a is defined by closing an annular recess formed in a lower surface of the inverter case 211 by an upper surface of the stator core 201. The cooling flow path 211a surrounds a coil end of the stator winding 202. The cooling flow path 211a has the module cases 212a of the power modules 212 disposed therein. Similarly, the rear case 222 has formed therein the cooling flow path 222a which surrounds a coil end of the stator winding 202. The cooling flow path 222a is defined by closing an annular recess formed in an upper surface of the rear case 222 by a lower surface of the stator core 201. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the first modification.

Twelfth Modification

Figure 41:
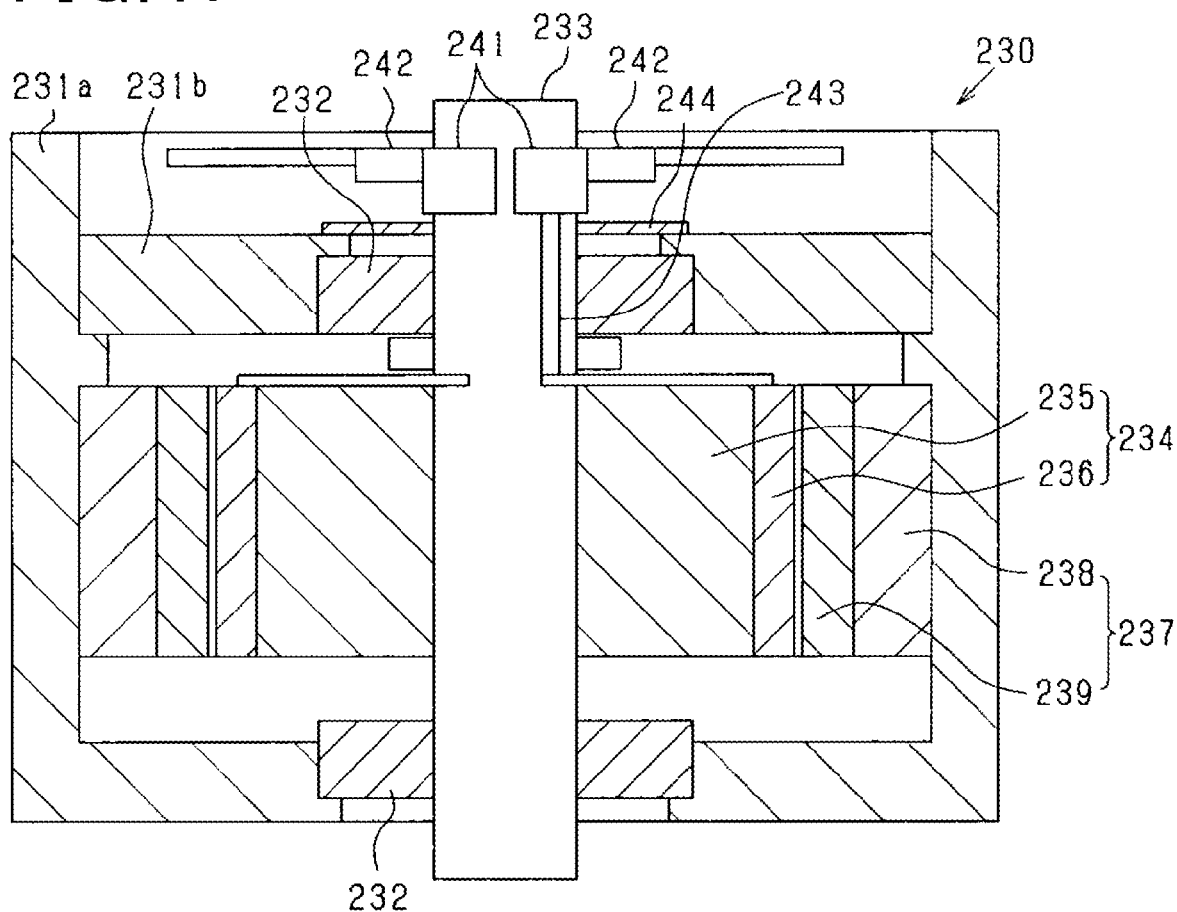
FIG. 41 is a view which illustrates a structure of a revolving armature type of rotating electrical machine in the twelfth modification.

The above discussion has referred to the revolving-field type of rotating electrical machines, but a revolving armature type of rotating electrical machine may be embodied. FIG. 41 illustrates the revolving armature type of rotating electrical machine 230.

The rotating electrical machine 230 in FIG. 41 has the bearing 232 retained by the housings 231a and 231b. The bearing 232 retains the rotating shaft 233 to be rotatable. The bearing 232 is made of, for example, an oil-impregnated bearing in which a porous metal is impregnated with oil. The rotating shaft 233 has secured thereto the rotor 234 which works as an armature. The rotor 234 includes the rotor core 235 and the multi-phase rotor winding 236 secured to an outer periphery of the rotor core 235. The rotor core 235 of the rotor 234 is designed to have the slot-less structure. The multi-phase rotor winding 236 has the flattened conductor structure as described above. In other words, the multi-phase rotor winding 236 is shaped to have an area for each phase which has a dimension in the circumferential direction which is larger than that in the radial direction.

The stator 237 is disposed radially outside the rotor 234. The stator 237 works as a field magnet. The stator 237 includes the stator core 238 and the magnet unit 239. The stator core 238 is secured to the housing 231a. The magnet unit 239 is attached to an inner periphery of the stator core 238. The magnet unit 239 is made up of a plurality of magnets arranged to have magnetic poles alternately arrayed in the circumferential direction. Like the magnet unit 42 Described above, the magnet unit 239 is magnetically oriented to have the easy axis of magnetization which is directed near the d-axis to be more parallel to the d-axis than that near the q-axis that is defined on a boundary between the magnetic poles. The magnet unit 239 is equipped with magnetically oriented sintered neodymium magnets whose intrinsic coercive force is 400 [kA/m] or more and whose remanent flux density is 1.0 [T] or more.

The rotating electrical machine 230 in this embodiment is engineered as a two-pole three-coil brush coreless motor. The multi-phase rotor winding 236 is made of three coils. The magnet unit 239 is designed to have two poles. A ratio of the number of poles and the number of coils in typical brush motors is 2:3, 4:10, or 4:21 depending upon intended use.

The rotating shaft 233 has the commutator 241 secured thereto. A plurality of brushes 242 are arranged radially outside the commutator 241. The commutator 241 is electrically connected to the multi-phase rotor winding 236 through the conductors 234 embedded in the rotating shaft 233. The commutator 241, the brushes 242, and the conductors 243 are used to deliver dc current to the multi-phase rotor winding 236. The commutator 241 is made up of a plurality of sections arrayed in a circumferential direction thereof depending upon the number of phases of the multi-phase rotor winding 236. The brushes 242 may be connected to a dc power supply, such as a storage battery, using electrical wires or using a terminal block.

The rotating shaft 233 has the resinous washer 244 disposed between the bearing 232 and the commutator 241. The resinous washer 244 serves as a sealing member to minimize leakage of oil seeping out of the bearing 232, implemented by an oil-impregnated bearing, to the commutator 241.

Thirteenth Modification

Each of the conductors 82 of the stator winding 51 of the rotating electrical machine 10 may be designed to have a stack of a plurality of insulating coatings or layers laid on each other. For instance, each of the conductors 82 may be made by covering a bundle of a plurality of insulating layer-coated conductors (i.e., wires) with an insulating layer, so that the insulating layer (i.e., an inner insulating layer) of each of the conductors 82 is covered with the insulating layer (i.e., an outer insulating layer) of the bundle. The outer insulating layer is preferably designed to have an insulating ability greater than that of the inner insulating layer. Specifically, the thickness of the outer insulating layer is selected to be larger than that of the inner insulating layer. For instance, the outer insulating layer has a thickness of 100 μm, while the inner insulating layer has a thickness of 40 μm. Alternatively, the outer insulating layer may have a permittivity lower than that of the inner insulating layer. Each of the conductors 82 may have any of the above structure. Each wire is preferably made of a collection of conductive members or fibers.

As apparent from the above discussion, the rotating electrical machine 10 becomes useful in a high-voltage system of a vehicle by increasing the insulation ability of the outermost layer of the conductor 82. The above structure enables the rotating electrical machine 10 to be driven in low pressure conditions such as high-altitude areas.

Fourteenth Modification

Each of the conductors 82 equipped with a stack of a plurality of insulating layers may be designed to have at least one of a linear expansion coefficient and the degree of adhesion strength different between an outer one and an inner one of the insulating layers. The conductors 82 in this modification are illustrated in FIG. 42.

Figure 42:
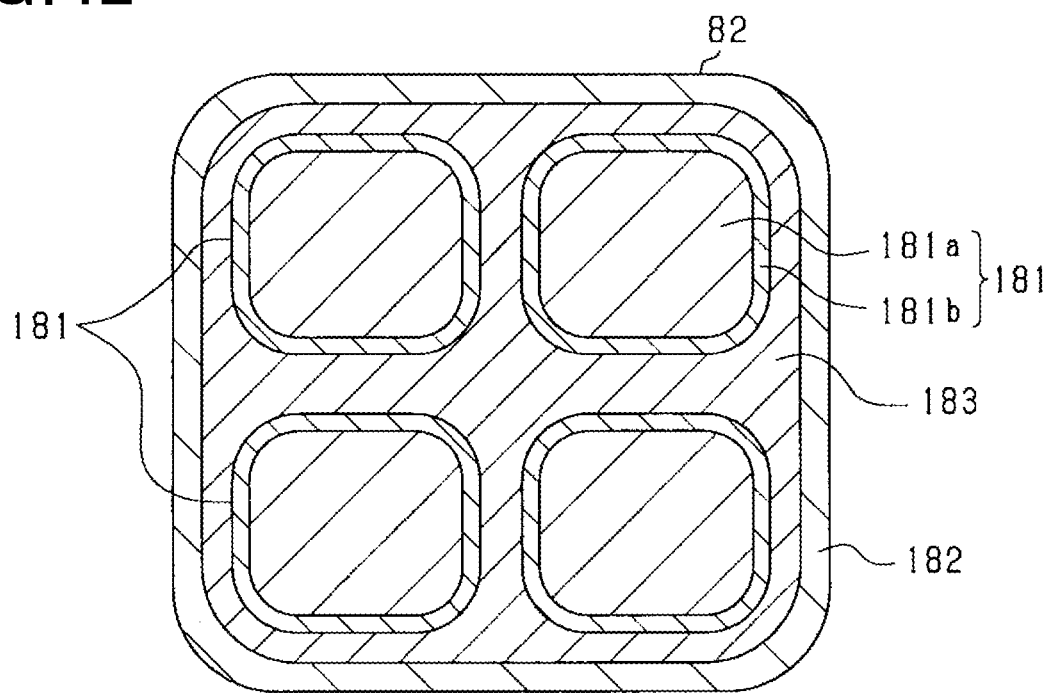
FIG. 42 is a sectional view which illustrates a structure of a conductor in the fourteenth modification.

In FIG. 42, the conductor 82 includes a plurality of (four in the drawing) wires 181, the outer coated layer 182 (i.e., an outer insulating layer) with which the wires 181 are covered and which is made of, for example, resin, and the intermediate layer 183 (i.e., an intermediate insulating layer) which is disposed around each of the wires 181 within the outer coated layer 182. Each of the wires 181 includes the conductive portion 181a made of copper material and the conductor-coating layer (i.e., an inner insulating layer) made of electrical insulating material. The outer coated layer 182 serves to electrically insulate between phase-windings of the stator winding. Each of the wires 181 is preferably made of a collection of conductive members or fibers.

The intermediate layer 183 has a linear expansion coefficient higher than that of the coated layer 181b, but lower than that of the outer coated layer 182. In other words, the linear expansion coefficient of the conductor 82 is increased from an inner side to an outer side thereof. Typically, the outer coated layer 182 is designed to have a linear expansion coefficient higher than that of the coated layer 181b. The intermediate layer 183, as described above, has a linear expansion coefficient intermediate between those of the coated layer 181b and the outer coated layer 182 and thus serves as a cushion to eliminate a risk that the inner and outer layers may b e simultaneously broken.

Each of the wires 181 of the conductor 82 has the conductive portion 181a and the coated layer 181b adhered to the conductive portion 181a. The coated layer 181b and the intermediate layer 183 are also adhered together. The intermediate layer 183 and the outer coated layer 182 are adhered together. Such joints have a strength of adhesion decreasing toward an outer side of the conductor 82. In other words, the strength of adhesion between the conductive portion 181a and the coated layer 181b is lower than that between the coated layer 181b and the intermediate layer 183 and between the intermediate layer 183 and the outer coated layers 182. The strength of adhesion between the coated layer 181b and the intermediate layer 183 may be higher than or identical with that between the intermediate layer 183 and the outer coated layers 182. Usually, the strength of adhesion between, for example, two coated layers may be measured as a function of a tensile strength required to peel the coated layers away from each other. The strength of adhesion of the conductor 82 is selected in the above way to minimize the risk that the inner and outer layers may be broken together arising from a temperature difference between inside and outside the conductor 82 when heated or cooled.

Usually, the heat generation or temperature change in the rotating electrical machine results in copper losses arising from heat from the conductive portion 181a of the wire 181 and from an iron core. These two types of loss result from the heat transmitted from the conductive portion 181a in the conductor 82 or from outside the conductor 82. The intermediate layer 183 does not have a heat source. The intermediate layer 183 has the strength of adhesion serving as a cushion for the coated layer 181b and the outer coated layer 182, thereby eliminating the risk that the coated layer 181b and the outer coated layer 182 may be simultaneously broken. This enables the rotating electrical machine to be used in conditions, such as in vehicles, wherein a resistance to high pressure is required, or the temperature greatly changes.

In addition, the wire 181 may be made of enamel wire with a layer (i.e., the coated layer 181b) coated with resin, such as PA, PI or PAI. Similarly, the outer coated layer 182 outside the wire 181 is preferably made of PA, PI, and PAI and has a large thickness. This minimizes a risk of breakage of the outer coated layer 182 caused by a difference in linear expansion coefficient. Instead of use of PA, PI, PAI to make the outer coated layer 182 having a large thickness, material, such as PPS, PEEK, fluororesin, polycarbonate, silicone, epoxy, polyethylene naphthalate, or LCP which has a dielectric permittivity lower than that of PI or PAI is preferably used to increase the conductor density of the rotating electrical machine. The use of such resin enhances the insulating ability of the outer coated layer 182 even when it has a thickness smaller than or equal to that of the coated layer 181b and increases the occupancy of the conductive portion. Usually, the above resin has the degree of electric permittivity higher than that of an insulating layer of enamel wire. Of course, there is an example where the state of formation or additive results in a decrease in electric permittivity thereof. Usually, PPS and PEEK is higher in linear expansion coefficient than an enamel-coated layer, but lower than another type of resin and thus is useful only for the outer of the two layers.

The strength of adhesion of the two types of coated layers arranged outside the wire 181 (i.e., the intermediate insulating layer and the outer insulating layer) to the enamel coated layer of the wire 181 is preferably lower than that between the copper wire and the enamel coated layer of the wire 181, thereby minimizing a risk that the enamel coated layer and the above two types of coated layers are simultaneously broken.

In a case where the stator is equipped with a water cooling mechanism, a liquid cooling mechanism, or an air cooling mechanism, thermal stress or impact stress is thought of as being exerted first on the outer coated layers 182. The thermal stress or the impact stress is decreased by partially bonding the insulating layer of the wire 181 and the above two types of coated layers together even if the insulation layer is made of resin different from those of the above two types of coated layers. In other words, the above described insulating structure may be created by placing a wire (i.e., an enamel wire) and an air gap and also arranging a fluororesin, polycarbonate, silicone, epoxy, polyethylene naphthalate, or LCP. In this case, adhesive which is made from epoxy, low in electric permittivity, and also low in linear expansion coefficient is preferably used to bond the outer coated layer and the inner coated layer together. This eliminates breakage of the coated layers caused by friction arising from vibration of the conductive portion or breakage of the outer coated layer due to the difference in linear expansion coefficient as well as the mechanical strength.

The outermost layer which serves to ensure the mechanical strength or securement of the conductor 82 having the above structure is preferably made from resin material, such as epoxy, PPS, PEEK, or LCP which is easy to shape and similar in dielectric constant or linear expansion coefficient to the enamel coated layer, typically in a final process for a stator winding.

Typically, the resin potting is made using urethane or silicone. Such resin, however, has a linear expansion coefficient approximately twice that of other types of resin, thus leading to a risk that thermal stress is generated when the resin is subjected to the resin potting, so that it is sheared. The above resin is, therefore, unsuitable for use where requirements for insulation are severe and 60V or more. The final insulation process to make the outermost layer using injection moulding techniques with epoxy, PPS, PEEK, or LCP satisfies the above requirements.

In the above modifications, the coated layer 181b of each of the wires 181, the intermediate layer 183, and the outer coated layer 182 may be designed to have the same coefficient of linear expansion, thereby resulting in an increased resistance to damage caused by expansion or contraction thereof. When a single-layered coating is applied to a copper conductor using adhesive agent which is typically called varnish, such as epoxy resin or LCP resin, a combination of the coating and the adhesive agent is considered as a coated layer in this embodiment. Additionally, an adhesive layer which is usually attached to an enamel-coated layer of a conductor in the form of a self-bonding wire, in other words, a self-bonding layer is also considered as a coated layer in this embodiment.

The coated layer 181b is expected to be used at high temperatures and thus preferably made from resin, such as PI or PAI. The self-bonding coat of the self-bonding wire is usually made of PA having a low coefficient of linear expansion. For instance, PA having resistance to 180° C. to 200° C. is used for a conductor resisting 200° C. or higher.

Comparing coefficients of linear expansion, that of PI is at most 2e-5, while that of PAI is at most 4e-5. That of PA, however, is at least 7e-5. In terms of the coefficient of linear expansion, the use of PI or PAI, therefore, meets the above requirements. Of course, PI is preferred. PA may, however, be denaturalized. For instance, addition of filler to PA will provide a coefficient of linear expansion to PA which approximates that of the filler. A mixture of PI and filter may be suitable for the coated layer 181b. Self-bonding wires with enamel-coated layers (i.e., the coated layers 181b) made from PI or self-bonding wires with bonding-coats made from PAI in the form of enamel-coated layers without use of easy-to-denaturalize PA may, therefore, be useful in high-temperature conditions.

Other modifications will be listed below.

The distance DM between a surface of the magnet unit 42 which faces the armature and the axial center of the rotor in the radial direction may be selected to be 50 mm or more. For instance, the distance DM, as illustrated in FIG. 4, between the radial inner surface of the magnet unit 42 (i.e., the first and second magnets 91 and 92) and the center of the axis of the rotor 40 may be selected to be 50 mm or more.

The small-sized slot-less structure of the rotating electrical machine whose output is several tens or hundreds watt is known which is used for models. The inventors of this application have not seen examples where the slot-less structure is used with large-sized industrial rotating electrical machines whose output is more than 10 kW. The inventors have studied the reason for this.

Modern major rotating electrical machines are categorized into four main types: a brush motor, a squirrel-cage induction motor, a permanent magnet synchronous motor, and a reluctance motor.

Brush motors are supplied with exciting current using brushes. Large-sized brush motors, therefore, have an increased size of brushes, thereby resulting in complex maintenance thereof. With the remarkable development of semiconductor technology, brushless motors, such as induction motors, have been used instead. In the field of small-sized motors, a large number of coreless motors have also come on the market in terms of low inertia or economic efficiency.

Squirrel-cage induction motors operate on the principle that a magnetic field produced by a primary stator winding is received by a secondary stator core to deliver induced current to bracket-type conductors, thereby creating magnetic reaction field to generate torque. In terms of small-size and high-efficiency of the motors, it is inadvisable that the stator and the rotor be designed not to have iron cores.

Reluctance motors are motors designed to use a change in reluctance in an iron core. It is, thus, inadvisable in principle that the iron core be omitted.

In recent years, permanent magnet synchronous motors have used an IPM (Interior Permanent Magnet) rotor. Especially, most large-sized motors use an IPM rotor unless there are special circumstances.

IPM motors has properties of producing both magnet torque and reluctance torque. The ratio between the magnet torque and the reluctance torque is timely controlled using an inverter. For these reasons, the IMP motors are thought of as being compact and excellent in ability to be controlled.

Figure 43:
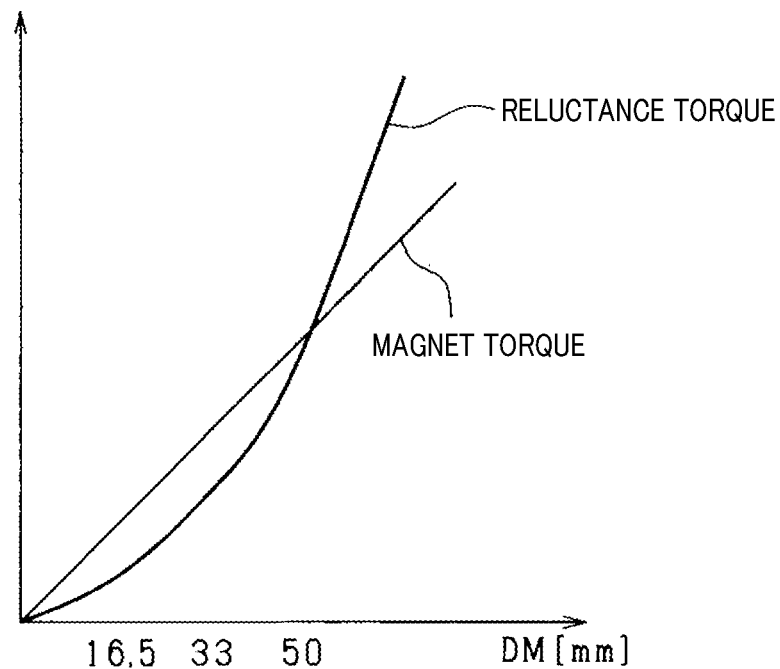
FIG. 43 is a view which illustrates a relation among reluctance torque, magnet torque, and distance DM.

According to analysis by the inventors, torque on the surface of a rotor producing the magnet torque and the reluctance torque is expressed in FIG. 43 as a function of the distance DM between the surface of the magnet unit which faces the armature and the center of the axis of the rotor, that is, the radius of a stator core of a typical inner rotor indicated on the horizontal axis.

The potential of the magnet torque, as can be seen in the following equation (eq1), depends upon the strength of magnetic field created by a permanent magnet, while the potential of the reluctance torque, as can be seen in the following equation (eq2), depends upon the degree of inductance, especially, on the q-axis.

$$\text{The magnet torque} = k \cdot \Psi \cdot Iq \tag{eq1}$$

$$\text{The reluctance torque} = k \cdot (Lq - Ld) \cdot Iq \cdot Id \tag{eq2}$$

Comparison between the strength of magnetic field produced by the permanent magnet and the degree of inductance of a winding using the distance DM shows that the strength of magnetic field created by the permanent magnet, that is, the amount of magnetic flux is proportional to a total area of a surface of the permanent magnet which faces the stator. In case of a cylindrical stator, such a total area is a cylindrical surface area of the permanent magnet. Technically speaking, the permanent magnet has an N-pole and an S-pole, and the amount of magnetic flux is proportional to half the cylindrical surface area. The cylindrical surface area is proportional to the radius of the cylindrical surface and the length of the cylindrical surface. When the length of the cylindrical surface is constant, the cylindrical surface area is proportional to the radius of the cylindrical surface.

Figure 44:
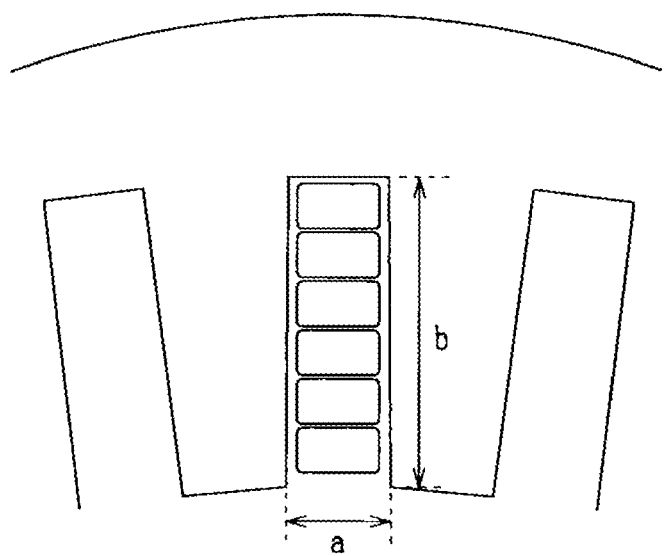
FIG. 44 is a view which illustrates teeth.

The inductance Lq of the winding depends upon the shape of the iron core, but its sensitivity is low and rather proportional to the square of the number of turns of the stator winding, so that it is strongly dependent upon the number of the turns. The inductance L is expressed by a relation of $L = \mu \cdot N^2 \times S/\delta$ where $\mu$ is permeability of a magnetic circuit, N is the number of turns, S is a sectional area of the magnetic circuit, and $\delta$ is an effective length of the magnetic circuit. The number of turns of the winding depends upon the size of space occupied by the winding. In the case of a cylindrical motor, the number of turns, therefore, depends upon the size of space occupied by the winding of the stator, in other words, areas of slots in the stator. The slot is, as demonstrated in FIG. 44, rectangular, so that the area of the slot is proportional to the product of a and b where a is the width of the slot in the circumferential direction, and b is the length of the slot in the radial direction.

The width of the slot in the circumferential direction becomes large with an increase in diameter of the cylinder, so that the width is proportional to the diameter of the cylinder. The length of the slot in the radial direction is proportional to the diameter of the cylinder. The area of the slot is, therefore, proportional to the square of the diameter of the cylinder. It is apparent from the above equation (eq2) that the reluctance torque is proportional to the square of current in the stator. The performance of the rotating electrical machine, therefore, depends upon how much current is enabled to flow in the rotating electrical machine, that is, depends upon the areas of the slots in the stator. The reluctance is, therefore, proportional to the square of the diameter of the cylinder for a cylinder of constant length. Based on this fact, a relation of the magnetic torque and the reluctance torque with the distance DM is shown by plots in FIG. 43.

The magnet torque is, as shown in FIG. 43, increased linearly as a function of the distance DM, while the reluctance torque is increased in the form of a quadratic function as a function of the distance DM. FIG. 43 shows that when the distance DM is small, the magnetic torque is dominant, while the reluctance torque becomes dominant with an increase in diameter of the stator core. The inventors of this application have arrived at the conclusion that an intersection of lines expressing the magnetic torque and the reluctance torque in FIG. 43 lies near 50 mm that is the radius of the stator core. It seems that it is difficult for a motor whose output is 10 kW and whose stator core has a radius much larger than 50 mm to omit the stator core because the use of the reluctance torque is now mainstream. This is one of reasons why the slot-less structure is not used in large-sized motors.

The rotating electrical machine using an iron core in the stator always faces a problem associated with magnetic saturation of the iron core. Particularly, radial gap type rotating electrical machines have a longitudinal section of the rotating shaft which is of a fan shape for each magnetic pole, so that the further inside the rotating electrical machine, the smaller the width of a magnetic circuit, so that inner dimensions of teeth forming slots in the core become a factor of the limit of performance of the rotating electrical machine. Even if a high performance permanent magnet is used, generation of magnetic saturation in the permanent magnet will lead to a difficulty in producing a required degree of performance of the permanent magnet. It is necessary to design the permanent magnet to have an increased inner diameter in order to eliminate a risk of occurrence of the magnetic saturation, which results in an increase size of the rotating electrical machine.

For instance, a typical rotating electrical machine with a distributed three-phase winding is designed so that three to six teeth serve to produce a flow of magnetic flux for each magnetic pole, but encounters a risk that the magnetic flux may concentrate on a leading one of the teeth in the circumferential direction, thereby causing the magnetic flux not to flow uniformly in the three to six teeth. For instance, the flow of magnetic flux concentrates on one or two of the teeth, so that the one or two of the teeth in which the magnetic saturation is occurring will move in the circumferential direction with rotation of the rotor, which may lead to a factor causing slot ripple.

For the above reasons, it is required to omit the teeth in the slot-less structure of the rotating electrical machine whose distance DM is 50 mm or more to eliminate the risk of generation of the magnetic saturation. The omission of the teeth, however, results in an increase in magnetic resistance in magnetic circuits of the rotor and the stator, thereby decreasing torque produced by the rotating electrical machine. The reason for such an increase in magnetic resistance is that there is, for example, a large air gap between the rotor and the stator. The slot-less structure of the rotating electrical machine whose distance DM is 50 mm or more, therefore, has room for improvement for increasing the output torque. There are numerous beneficial advantages to use the above torque-increasing structure in the slot-less structure of rotating electrical machines whose distance DM is 50 mm or more.

Not only the outer rotor type rotating electrical machines, but also the inner rotor type rotating electrical machines are preferably designed to have the distance DM of 50 mm or more between the surface of the magnet unit which faces the armature and the center of the axis of the rotor in the radial direction.

The stator winding 51 of the rotating electrical machine 10 may be designed to have only the single straight section 83 of the conductor 82 arranged in the radial direction. Alternatively, a plurality of straight sections 83, for example, three, four, five, or six straight sections 83 may be stacked on each other in the radial direction.

For example, the structure illustrated in FIG. 2 has the rotating shaft 11 extending outside the ends of length of the rotating electrical machine 10, but however, may alternatively be designed to have the rotating shaft 11 protruding outside only one of the ends of the rotating electrical machine 10. In this case, it is advisable that a portion of the rotating shaft 11 which is retained by the bearing unit 20 in the cantilever form be located on one of the ends of the rotating electrical machine, and that the rotating shaft 11 protrude outside such an end of the rotating electrical machine. This structure has the rotating shaft 11 not protruding inside the inverter unit 60, thus enabling a wide inner space of the inverter unit 60, i.e., the cylinder 71 to be used.

The above structure of the rotating electrical machine 10 uses non-conductive grease in the bearings 21 and 22, but however, may alternatively be designed to have conductive grease in the bearings 21 and 22. For instance, conductive grease containing metallic particles or carbon particles may be used.

A bearing or bearings may be mounted on only one or both axial ends of the rotor 40 for retaining the rotating shaft 11 to be rotatable. For example, the structure of FIG. 1 may have a bearing or bearings mounted on only one side or opposite sides of the inverter unit 60 in the axial direction.

The magnet holder 41 of the rotor 40 of the rotating electrical machine 10 has the intermediate portion 45 equipped with the inner shoulder 49*a* and the annular outer shoulder 49*b*, however, the magnet holder 41 may alternatively be designed to have the flat intermediate portion 45 without the shoulders 49*a* and 49*b*.

The conductor body 82*a* of each of the conductors 82 of the stator winding 51 of the rotating electrical machine 10 is made of a collection of the wires 86, however, may alternatively be formed using a square conductor having a rectangular cross section. The conductor 82 may alternatively be made using a circular conductor having a circular cross section or an oval cross section.

The rotating electrical machine 10 has the inverter unit 60 arranged radially inside the stator 50, but however, may alternatively be designed not to have the inverter 60 disposed inside the stator 50. This enables the stator 50 to have a radial inner void space in which parts other than the inverter unit 60 may be mounted.

The rotating electrical machine 10 may be designed not to have the housing 30. In this case, the rotor 40 or the stator 50 may be retained by a wheel or another part of a vehicle.

In-Wheel Motor for Vehicle

Figure 45:
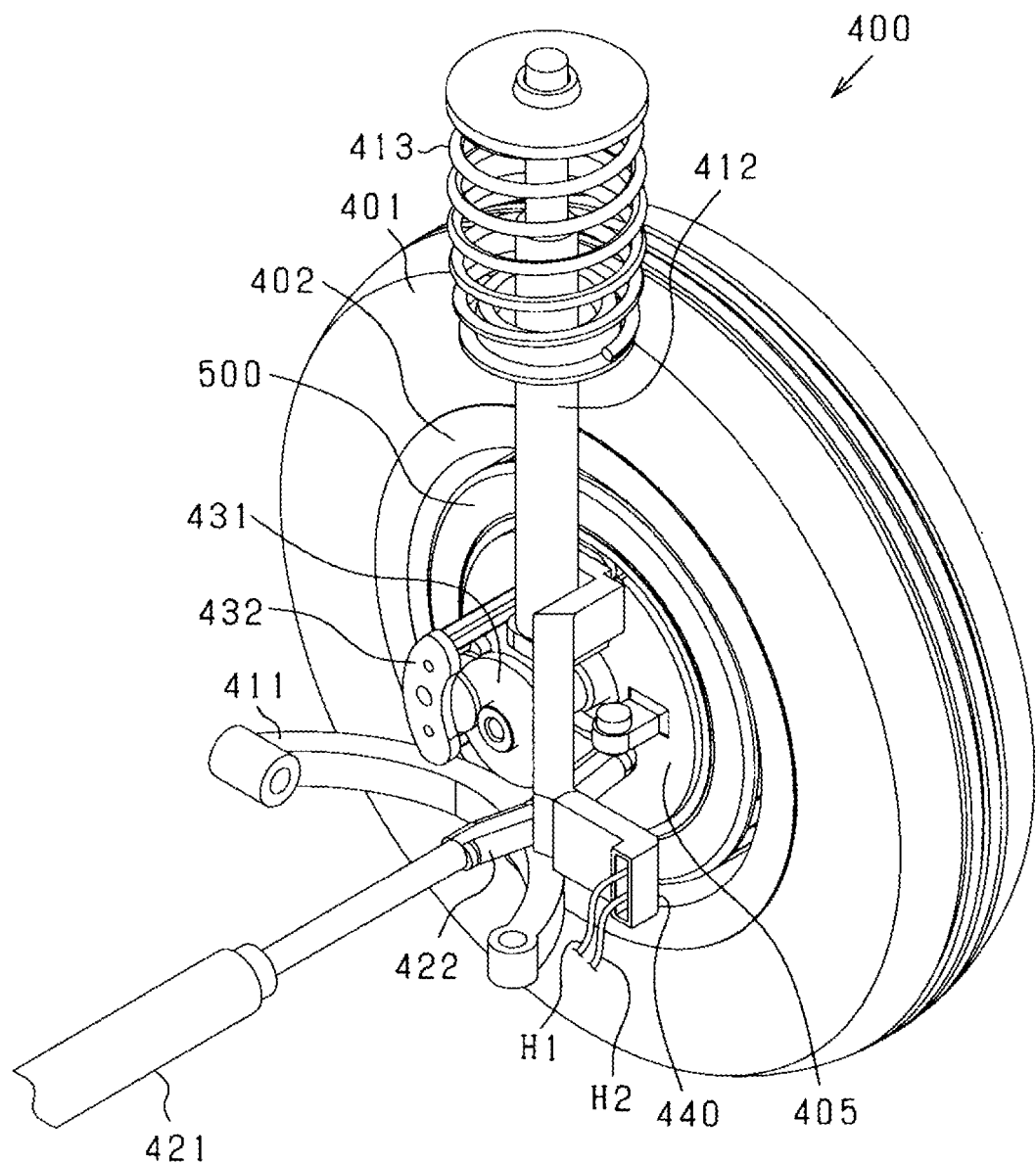
FIG. 45 is a perspective view which illustrates a structure of a wheel assembly with an in-wheel motor and a peripheral structure.
Figure 46:
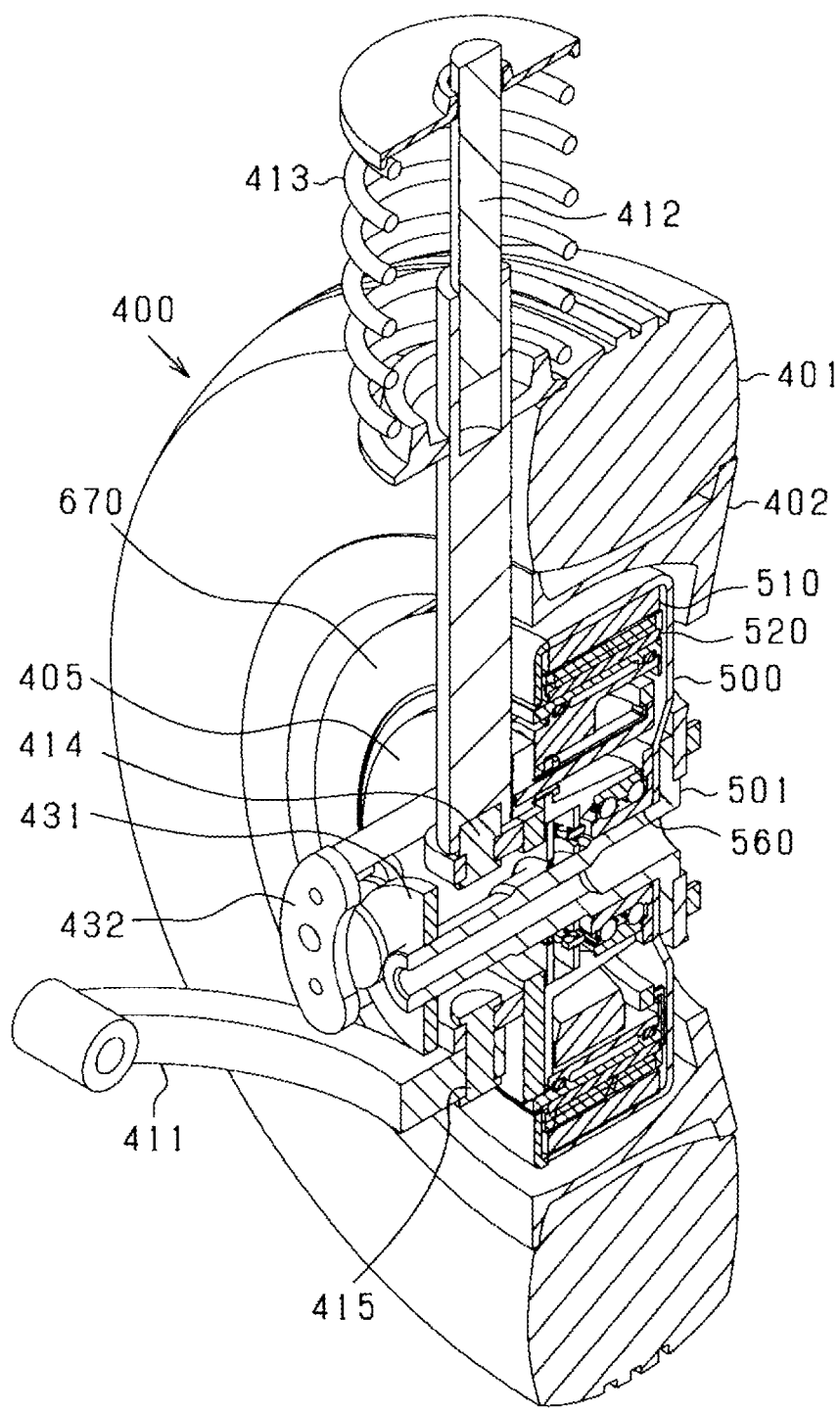
FIG. 46 is a longitudinal sectional view which illustrates a wheel assembly and a peripheral structure.
Figure 47:
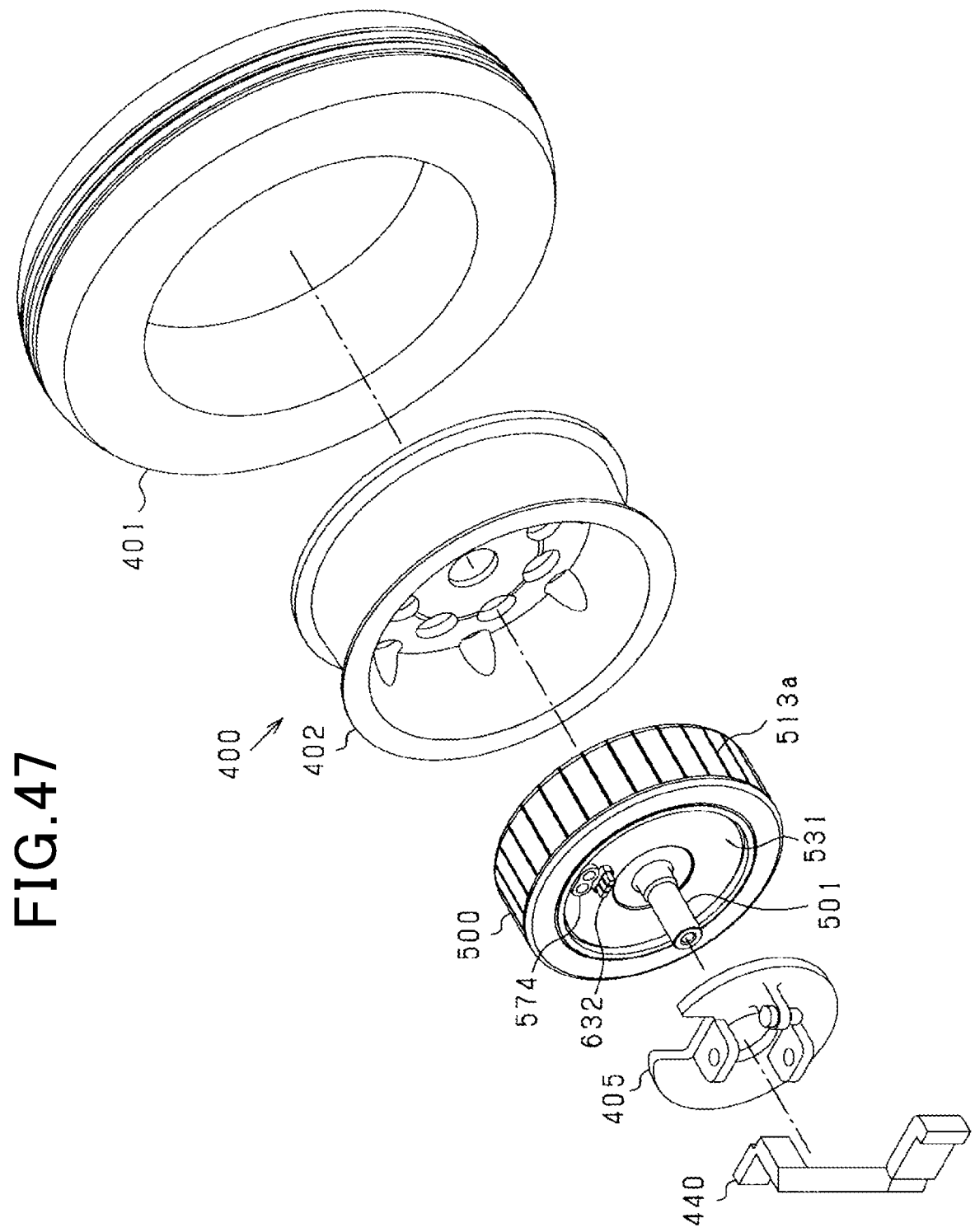
FIG. 47 is an exploded view of a wheel assembly.

Embodiments in which a rotating electrical machine is incorporated into a hub of a wheel of a vehicle, such as, an automotive vehicle in the form of an in-wheel motor will be described below. FIG. 45 is a perspective view which illustrates the tire wheel assembly 400 engineered to have an in-wheel motor structure and a surrounding structure. FIG. 46 is a longitudinal sectional view which illustrates the tire wheel assembly 400 and the surrounding structure. FIG. 47 is a perspective exploded view of the tire wheel assembly 400. These views are perspective illustrations of the tire wheel assembly 400, as viewed from inside the vehicle. The vehicle may use the in-wheel motor structure in different modes. For instance, in a case where the vehicle is equipped with four wheels: two front wheel and two rear wheels, either or both of the front wheels and the rear wheel may be engineered to have the in-wheel motor structure in this embodiment. Alternatively, the in-wheel motor structure may also be used with a vehicle equipped with a front or a rear single wheel. The wheel motor, as referred to herein, is designed as a vehicle power unit.

The tire wheel assembly 400, as illustrated in FIGS. 45 to 47, includes the tire 401 that is a known air inflated tire, the wheel 402 fit in the tire 401, and the rotating electrical machine 500 secured inside the wheel 402. The rotating electrical machine 500 is equipped with a stationary portion including a stator and a rotating portion including a rotor. The rotating electrical machine 500 is firmly attached at the stationary portion to the vehicle body and also attached at the rotating portion to the wheel 402. The tire 401 and the wheel 402 are rotated with rotation of the rotating portion of the rotating electrical machine 500. The structure of the rotating electrical machine 500 including the stationary portion and the rotating portion will be described later in detail.

The tire wheel assembly 400 also has peripheral devices: a suspension, a steering device, and a brake device mounted thereon. The suspension retains the tire wheel assembly 400 secured to a vehicle body, not shown. The steering device works to turn the tire wheel assembly 400. The brake device works to apply a brake to the tire wheel assembly 400.

The suspension is implemented by an independent suspension, such as trailing arm suspension, a strut-type suspension, a wishbone suspension, or a multi-link suspension. In this embodiment, the suspension includes the lower arm 411, the suspension arm 412, and the spring 413. The lower arm 411 extends toward the center of the vehicle body. The suspension arm 412 and the spring 413 extend vertically. The suspension arm 412 may be engineered as a shock absorber whose detailed structure will be omitted in the drawings. The lower arm 411 and the suspension arm 412 are joined to the vehicle body and also joined to the disc-shaped base plate 405 secured to the stationary portion of the rotating electrical machine 500. The lower arm 411 and the suspension arm 412 are, as clearly illustrated in FIG. 46, retained coaxially with each other by the rotating electrical machine 500 (i.e., the base plate 405) using the support shafts 414 and 415.

The steering device may be implemented by a rack-and-pinion, a ball-and-nut steering system, a hydraulic power steering system, or an electronic power steering system. In this embodiment, the steering device is made up of the rack unit 421 and the tie rod 422. The rack unit 421 is connected to the base plate 405 of the rotating electrical machine 500 through the tie rod 422. Rotation of a steering shaft, not shown, will cause the rack unit 421 to be driven, thereby moving the tie rod 422 in a lateral direction of the vehicle. This causes the tire wheel assembly 400 to be turned around the lower arm 411 and the support shafts 414 and 415 of the suspension arm 412, thereby changing the orientation of the tire wheel assembly 400.

The brake device may preferably be made of a disc brake or a drum brake. In this embodiment, the brake device includes the disc rotor 431 and the brake caliper 432. The disc rotor 431 is secured to the rotating shaft 501 of the rotating electrical machine 500. The brake caliper 432 is secured to the base plate 405 of the rotating electrical machine 500. The brake caliper 432 has a brake pad which is hydraulically actuated and pressed against the disc rotor 431 to create a brake in the form of mechanical friction, thereby stopping rotation of the tire wheel assembly 400.

The tire wheel assembly 400 also has mounted thereon the storage duct 440 in which he electrical cable H1 and the cooling pipe H2 extending from the rotating electrical machine 500 are disposed. The storage duct 440 extends from an end of the stationary portion of the rotating electrical machine 500 parallel to an end surface of the rotating electrical machine 500 without physical interference with the suspension arm 412 and is firmly joined to the suspension arm 412, thereby fixing a location of the joint of the storage duct 440 to the suspension arm 412 relative to the base plate 405. This minimizes mechanical stress which arises from vibration of the vehicle and acts on the electrical cable H1 and the cooling pipe H2. The electrical cable H1 is electrically connected to a power supply, not shown, and an ECU, not shown, which are mounted in the vehicle. The cooling pipe H2 is connected to a radiator, not shown.

The structure of the rotating electrical machine 500 will be described below in detail. This embodiment will refer to an example where the rotating electrical machine 500 is designed as the in-wheel motor. The rotating electrical machine 500 is excellent in operation efficiency and output performance as compared with a conventional electrical motor of a power unit equipped with a speed reducer for use in vehicles. The rotating electrical machine 500 may alternatively be employed as an electrical motor in another application other than the power unit for vehicles if it may be produced at low cost. In such a case, the rotating electrical machine 500 ensures high performance. The operation efficiency, as referred to herein, represents an indication used in fuel economy tests in which automobiles are operated in given driving modes.

Figure 48:
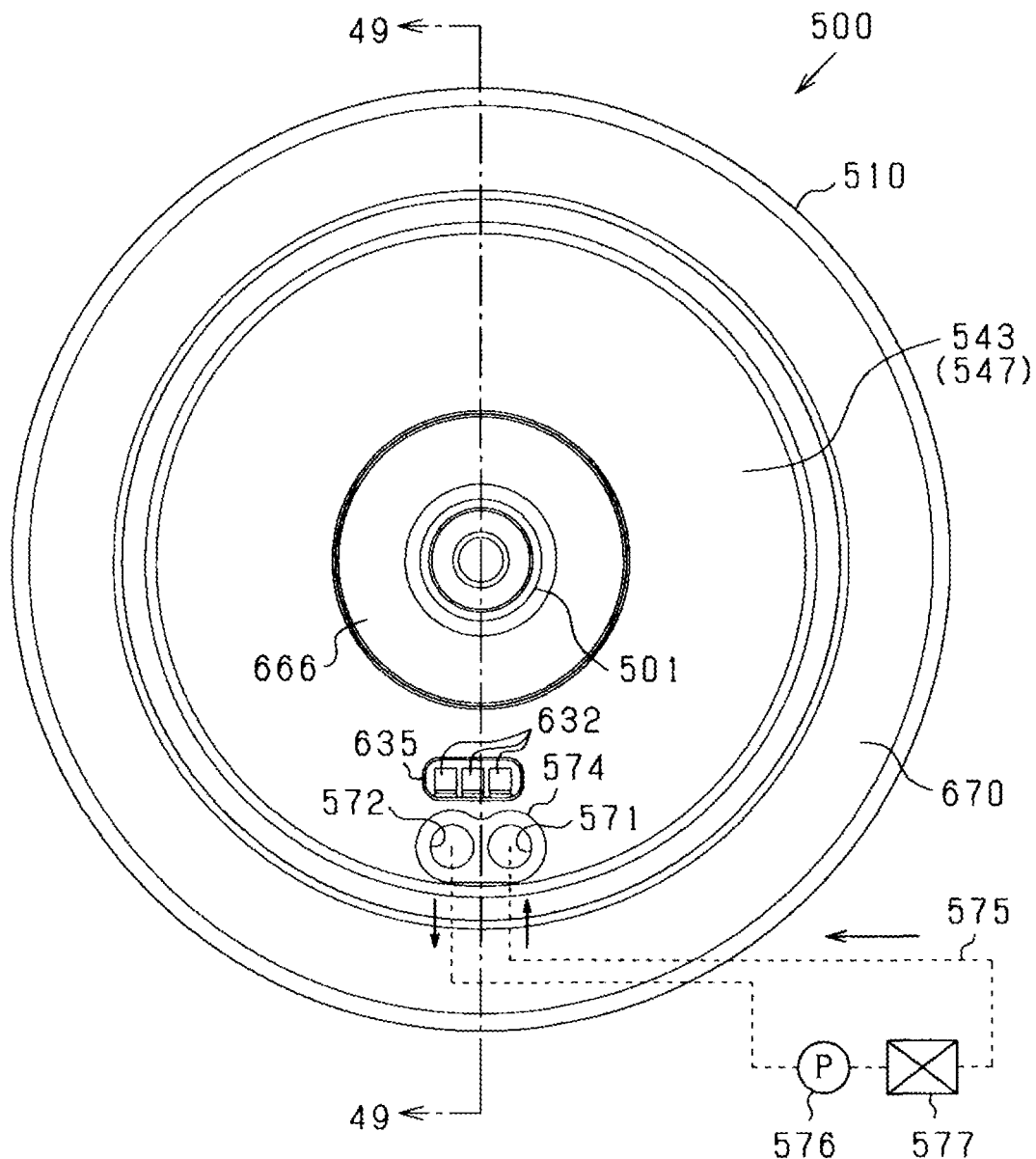
FIG. 48 is a side view which illustrates a rotating electrical machine, as viewed from a protruding portion of a rotating shaft.
Figure 49:
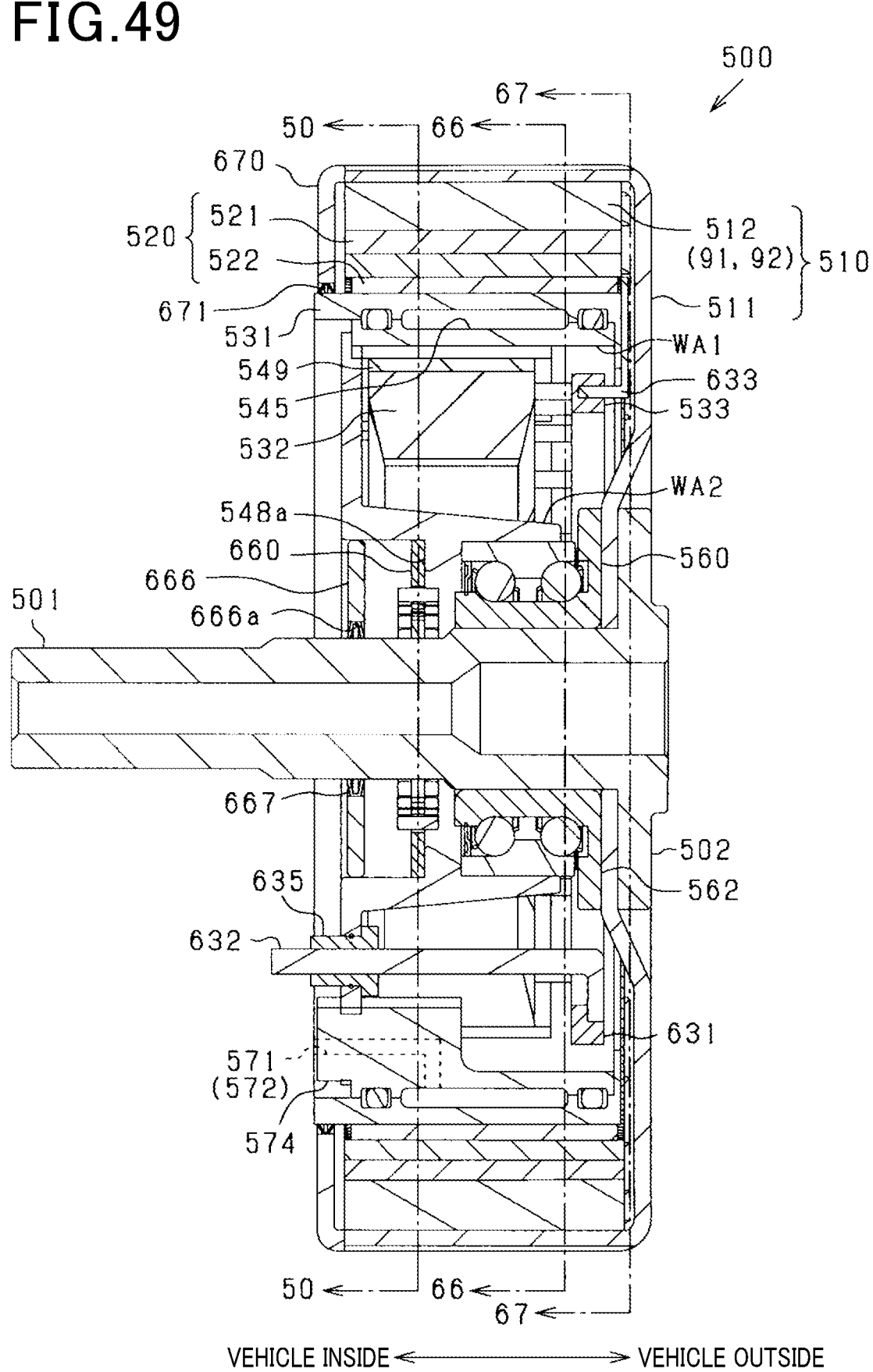
FIG. 49 is a sectional view taken along the line 49-49 in FIG. 48.
Figure 50:
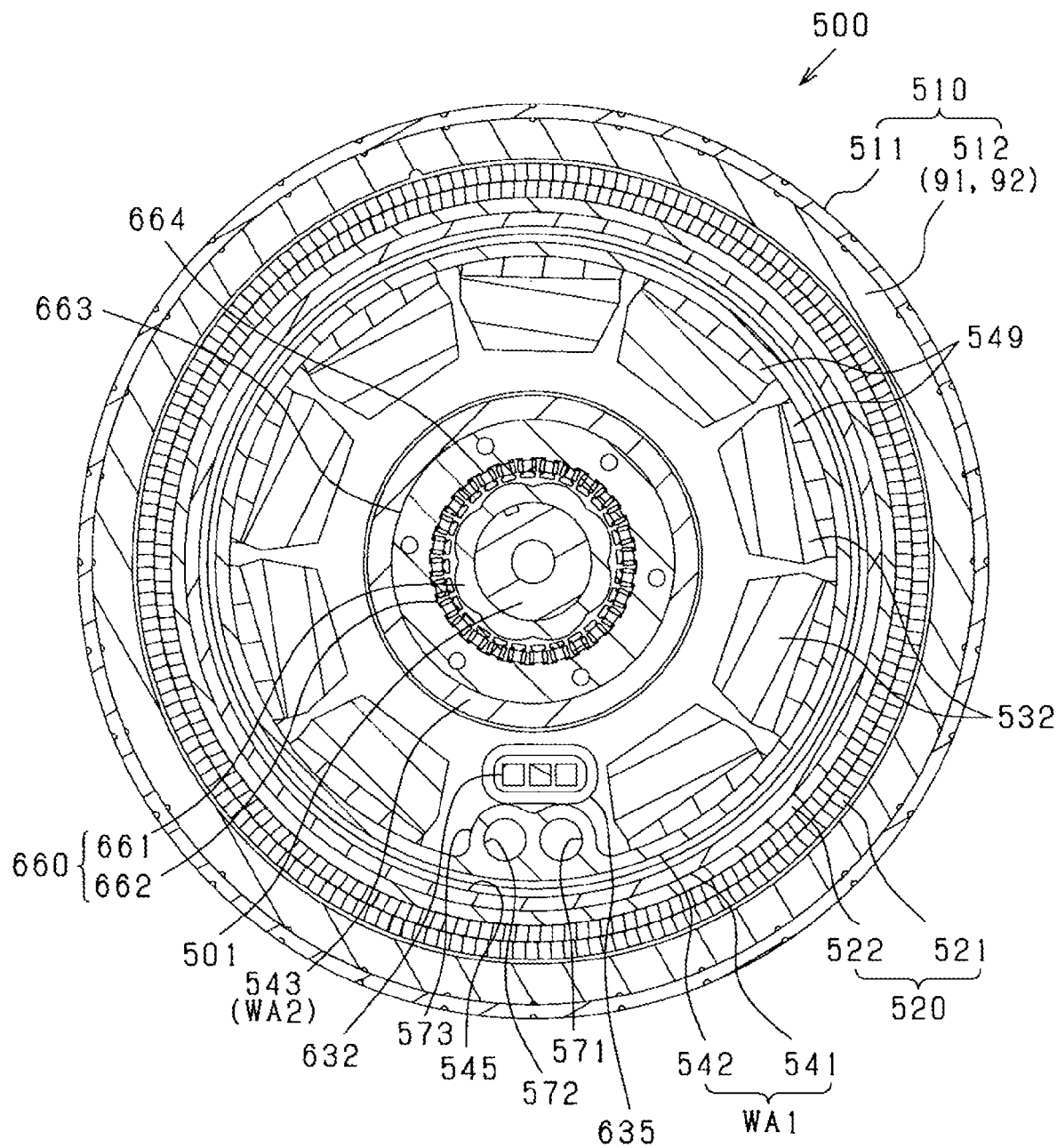
FIG. 50 is a sectional view taken along the line 50-50 in FIG. 49.
Figure 51:
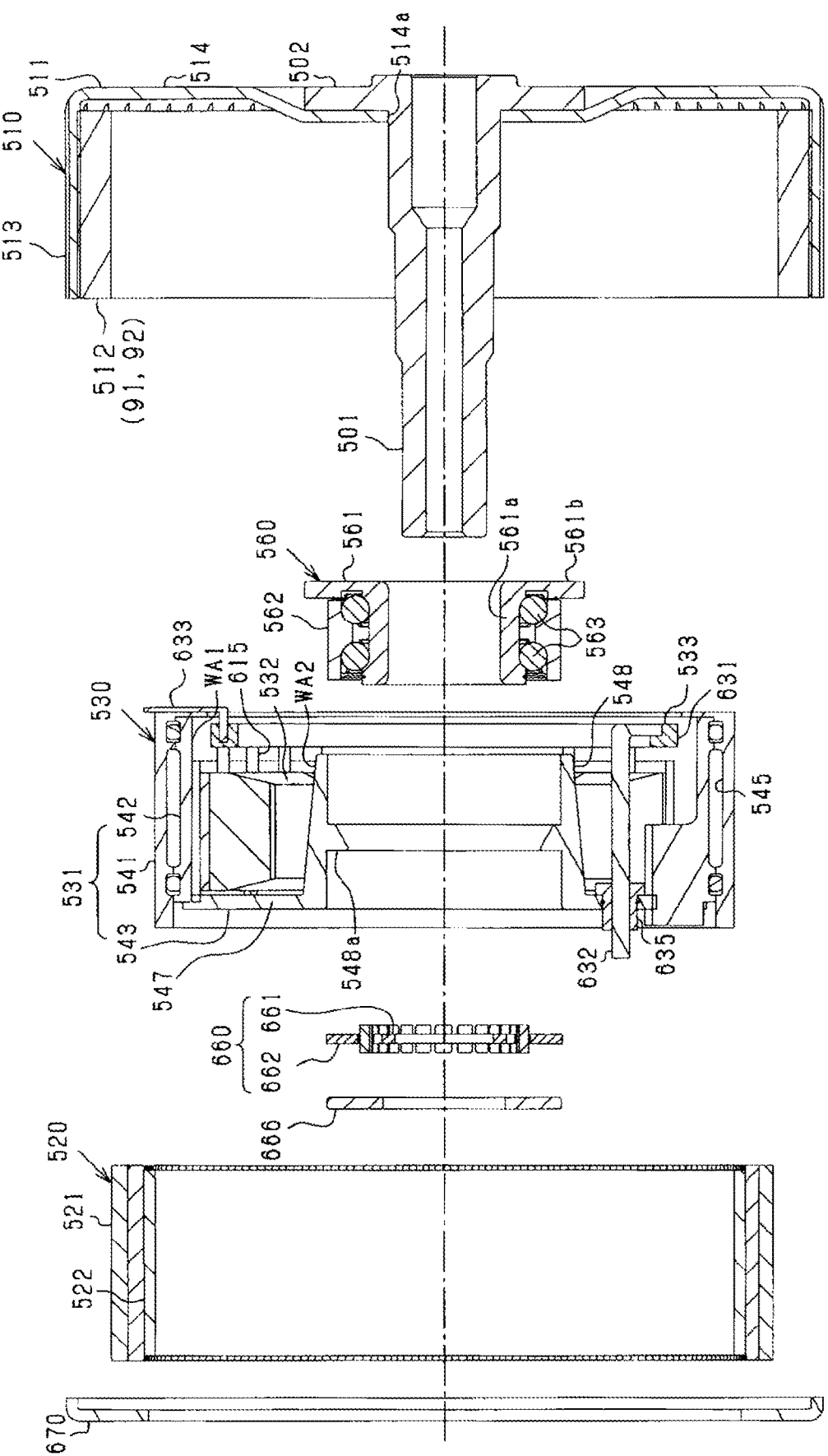
FIG. 51 is an exploded sectional view of a rotating electrical machine.

The outline of the rotating electrical machine 500 is shown in FIGS. 48 to S1. FIG. 48 is a side elevation of the rotating electrical machine 500, as viewed in an axial direction of the rotating shaft 501 (i.e., from inside the vehicle). FIG. 49 is a longitudinal sectional view of the rotating electrical machine 500, as taken along the line 49-49 in FIG. 48. FIG. 50 is a transverse sectional view of the rotating electrical machine 500, as taken along the line 50-50 in FIG. 49. FIG. 51 is an exploded sectional view of the rotating electrical machine 500. In the following discussion, a direction in which the rotating shaft 501 extends outside the vehicle body will be referred to as an axial direction, and a direction perpendicular to the length of the rotating shaft 501 will be referred to as a radial direction in FIG. 51. In FIG. 48, opposite directions extending in a circular form from a point on a center line which passes through the center of the rotating shaft 501, in other words, the center of rotation of the rotating portion of the rotating electrical machine 500 and defines the cross section 49 of the rotating electrical machine 500 will be referred to as a circumferential direction. In other words, the circumferential direction is either a clockwise direction or a counterclockwise direction from a point on the cross section 49. In FIG. 49, the right side is an outer side of the vehicle, while the left side is an inner side of the vehicle. In other words, when the rotating electrical machine 500 is mounted in the vehicle, the rotor 510 which will be described later in detail is disposed closer to the outer side of the vehicle body than the rotor cover 670 is.

The rotating electrical machine 500 in this embodiment is designed as an outer-rotor surface-magnet rotating electrical machine. The rotating electrical machine 500 includes the rotor 510, the stator 520, the inverter unit 530, the bearing 560, and the rotor cover 670. These parts are each arranged coaxially with the rotating shaft 501 provided integrally with the rotor 510 and assembled in a given order in the axial direction to complete the rotating electrical machine 500.

In the rotating electrical machine 500, the rotor 510 and the stator 520 are hollow cylindrical and face each other through an air gap. Rotation of the rotating shaft 501 causes the rotor 510 to rotate radially outside the stator 520. The rotor 510 works as a field generator. The stator 520 works as an armature.

The rotor 510 includes the hollow cylindrical rotor carrier 511 and the annular magnet unit 512 secured to the rotor carrier 511. The rotating shaft 501 is firmly joined to the rotor carrier 511.

The rotor carrier 511 includes the cylindrical portion 513. The magnet unit 512 is firmly attached to an inner circumferential surface of the cylindrical portion 513. In other words, the magnet unit 512 is surrounded by the cylindrical portion 513 of the rotor carrier 511 from radially outside it.

The cylindrical portion 513 has a first end and a second end which are opposed to each other in the axial direction. The first end faces the outside of the vehicle body. The second end faces the base plate 405. In the rotor carrier 511, the end plate 514 continues to the first end of the cylindrical portion 513. In other words, the cylindrical portion 513 and the end plate 514 are formed or joined integrally with each other. The cylindrical portion 513 has an opening in the second end. The rotor carrier 511 may be made by a cold rolled steel plate having a high mechanical strength. For example, the rotor carrier 511 is made of SPCC (steel plate cold commercial) or SPHC (steel plate hot commercial) which has a thickness larger than SPCC. The rotor carrier 511 may alternatively be made of forging steel or carbon fiber reinforced plastic (CFRP).

The length of the rotating shaft 501 is larger than a dimension of the rotor carrier 511 in the axial direction. In other words, the rotating shaft 501 protrudes from the open end of the rotor carrier 511 inwardly in the vehicle to have an end on which the brake device is mounted.

The end plate 514 of the rotor carrier 511 has the center hole 514a passing through a thickness thereof. The rotating shaft 501 passes through the hole 514a of the end plate 514 and is retained by the rotor carrier 511. The rotating shaft 501 has the flange 502 extending from a joint of the rotor carrier 511 to the rotating shaft 501 in a direction traversing or perpendicular to the length of the rotating shaft 501. The flange 502 has a surface joined to an outer surface of the end plate 514 which faces outside the vehicle, so that the rotating shaft 501 is secured to the rotor carrier 511. In the tire wheel assembly 400, the wheel 402 is joined to the rotating shaft 501 using fasteners, such as bolts, extending from the flange 502 outwardly in the vehicle.

The magnet unit 512 is made up of a plurality of permanent magnets which arranged adjacent each other and whose magnetic polarities are disposed alternately in a circumferential direction of the rotor 510. The magnet unit 512, thus, has a plurality of magnetic poles arranged in the circumferential direction. The permanent magnets are secured to the rotor carrier 511 using, for example, adhesive. The magnet unit 512 has the same structure as that of the magnet unit 42 Discussed with reference to FIGS. 8 and 9 and is made of sintered neodymium magnets whose intrinsic coercive force is 400 [kA/m] or more and whose remanent flux density is 1.0 [T] or more.

The magnet unit 512 is, like the magnet unit 42 in FIG. 9, made of polar anisotropic magnets and includes the first magnets 91 and the second magnets 92 which are different in magnetic polarity from each other. As already described with reference to FIGS. 8 and 9, each of the magnets 91 and 92, as can be seen in FIG. 9, includes the first portion 250 and the two second portions 260 arranged on opposite sides of the first portion 250 in the circumferential direction of the magnet unit 512. In other words, the first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. In other words, the magnet unit 512 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis. Annular magnetic paths are, therefore, created according to the directions of easy axes of magnetization. In each of the magnets 91 and 92, the easy axis of magnetization in a region close to the d-axis may be oriented parallel to the d-axis, while the easy axis of magnetization in a region close to the q-axis may be oriented perpendicular to the q-axis. In brief, the magnet unit 512 is magnetically oriented to have the easy axis of magnetization in the region close to the d-axis (i.e., the center of the magnetic pole) which is oriented more parallel to the d-axis than in the region close to the q-axis (i.e., the boundary between the magnetic poles).

Accordingly, the above described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole. The magnet unit 512 may be designed to have the same structure as that of the magnet unit 42 illustrated in FIGS. 22 and 23 or illustrated in FIG. 30.

The magnet unit 512 may be equipped with a rotor core (i.e., a back yoke) which is made of a plurality of magnetic steel plates stacked in the axial direction and arranged close to the cylindrical portion 513 of the rotor carrier 511, i.e., near the outer circumference thereof. In other words, the rotor core may be disposed radially inside the cylindrical portion 513 of the rotor carrier 511, and the permanent magnets (i.e., the magnets 91 and 92) may be arranged radially inside the rotor core.

Figure 52:
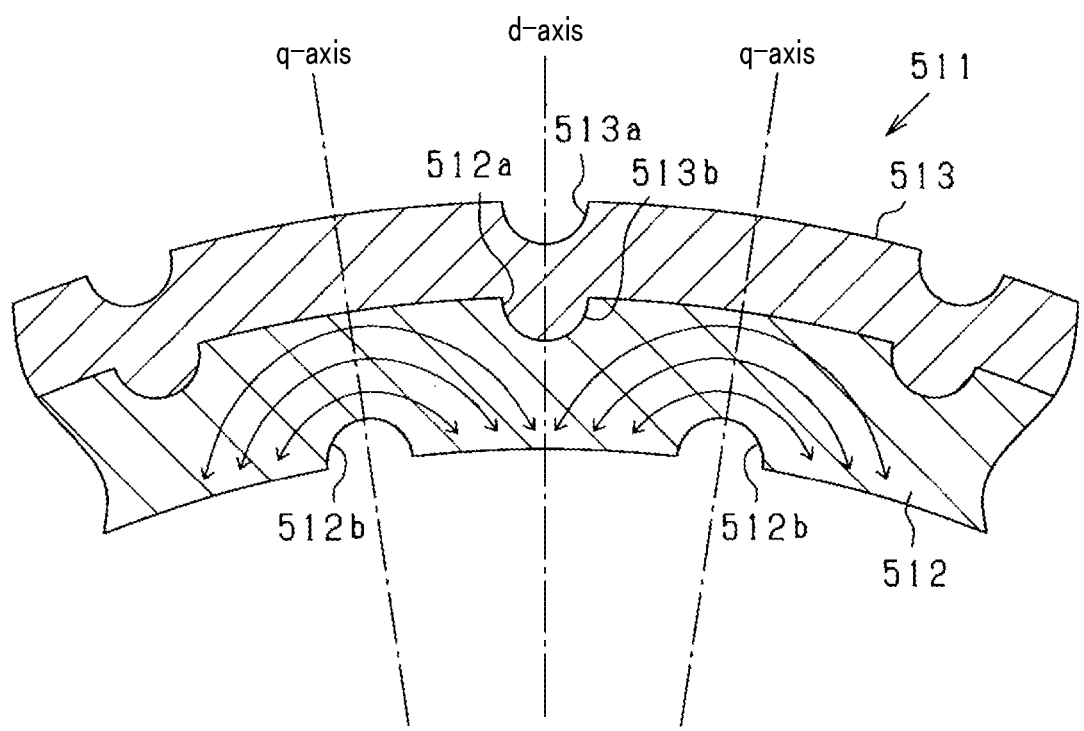
FIG. 52 is a partially sectional view of a rotor.

Referring back to FIG. 47, the cylindrical portion 513 of the rotor carrier 511 has formed therein the recesses 513a which are arranged at a given interval away from each other in the circumferential direction of the cylindrical portion 513 and extend in the axial direction of the cylindrical portion 513. The recesses 513a are made, for example, using a stamp or a press. The cylindrical portion 513, as can be seen in FIG. 52, has convexities or protrusions 513b each of which is formed on an inner circumference thereof in alignment with a respective one of the recesses 513 in the radial direction of the cylindrical portion 513. The magnet unit 512 has formed in the outer circumference thereof the recesses 512a each of which is fit on a respective one of the protrusions 513b of the cylindrical portion 513. In other words, the protrusions 513b of the cylindrical portion 513 are disposed in the recesses 512a, thereby holding the magnet unit 512 from moving in the circumferential direction of the rotor carrier 511. The protrusions 513b of the rotor carrier 511, thus, serve as stoppers to stop the magnet unit 512 from being rotated. The protrusions 513b may alternatively be formed in a known way other than the pressing techniques.

FIG. 52 demonstrates magnetic paths which are produced by the magnets of the magnet unit 512 and indicated by arrows. Each of the magnetic paths extends in an arc-shape and crosses the q-axis that is located at the boundary between the magnetic poles. Each of the magnetic paths is oriented parallel or nearly parallel to the d-axis in the region close to the d-axis. The magnet unit 512 has the recesses 512b which are formed in an inner circumferential surface thereof and located on the q-axis. The magnetic paths in the magnet unit 512 have lengths different between a region near the stator 520 (i.e., a lower side in the drawing) and a region far from the stator 520 (i.e., an upper side in the drawing). Specifically, the length of the magnetic path close to the stator 520 is shorter than that of the magnetic path far from the stator 520. Each of the recesses 512b is located on the shortest length of the magnetic path. In other words, in view of an insufficient amount of magnetic flux around the shorter magnetic path, the magnet unit 512 is shaped to have removed portions in which the magnetic flux is weak.

Generally, the effective magnetic flux density Bd of a magnet becomes high with an increase in length of a magnetic circuit passing through the magnet. The permeance coefficient Pc and the effective magnetic flux density Bd of the magnet have a relationship in which when one of them becomes high, the other also becomes high. The structure illustrated in FIG. 52 enables the volume of the magnets to be reduced with a minimized risk of decrease in permeance coefficient Pc that is an indication of the degree of the effective magnetic flux density of the magnets. On the B-H coordinate system, an intersection of a permeance straight line and a demagnetization curve is an operating point according to the configuration of a magnet. The magnetic flux density on the operating point represents the effective magnetic flux density Bd. The rotating electrical machine 500 in this embodiment is engineered to have the stator 520 in which the amount of iron is decreased and highly effective in having the magnetic circuit crossing the q-axis.

The recesses 512b of the magnet unit 512 may be used as air paths extending in the axial direction, thereby enhancing the cooling ability of the rotating electrical machine 500.

Figure 53:
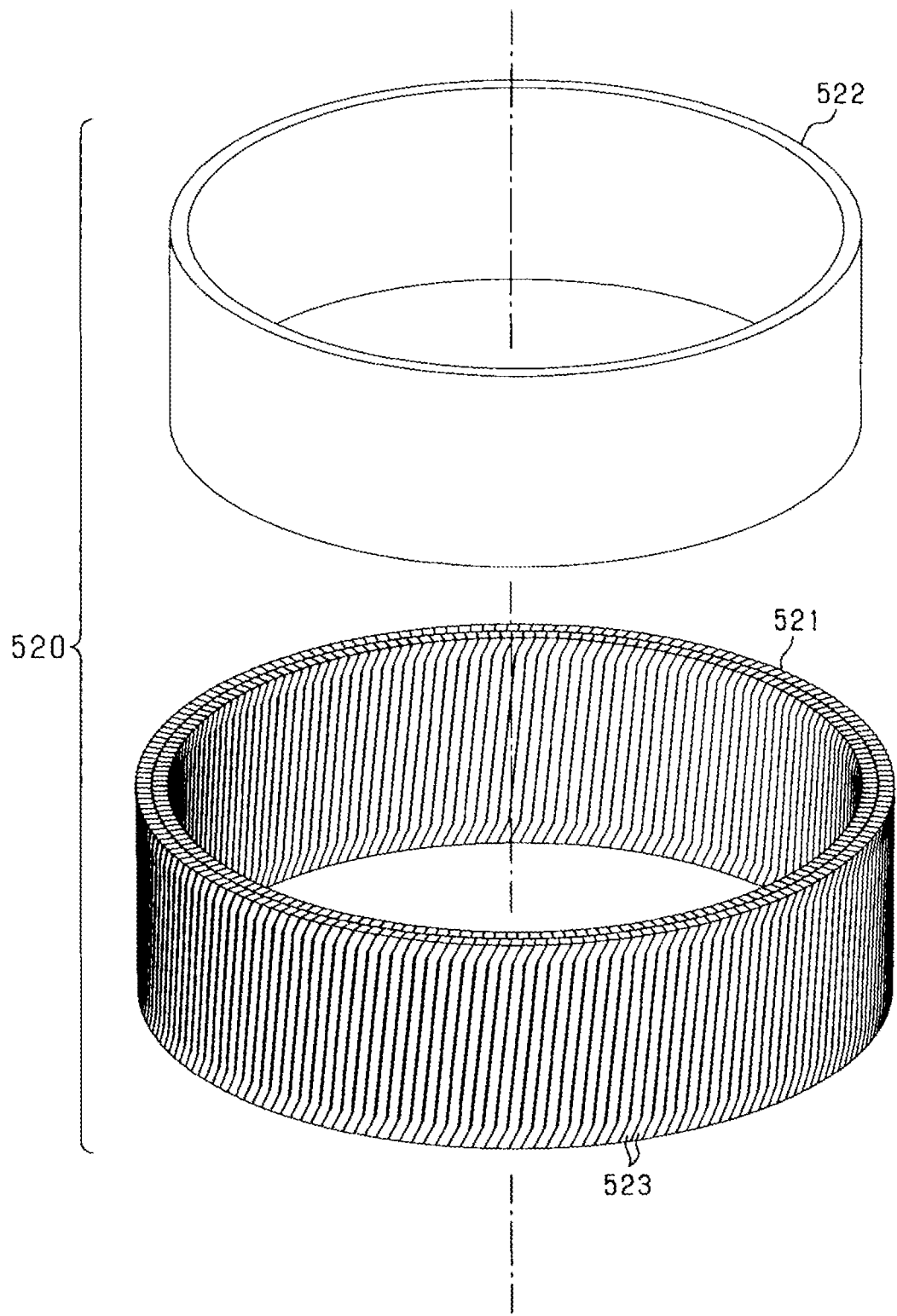
FIG. 53 is a perspective view of a stator winding and a stator core.

Next, the structure of the stator 520 will be described below. The stator 520 includes the stator winding 521 and the stator core 522. FIG. 53 is an exploded view of the stator winding 521 and the stator core 522.

The stator winding 521 is made up of a plurality of phase-windings which are of a hollow cylindrical shape. The stator core 522 serving as a base member is arranged radially inside the stator winding 521. In this embodiment, the stator winding 521 includes three-phase windings: a U-phase winding, a V-phase winding, and a W-phase winding. Each of the U-phase winding, the V-phase winding, and the W-phase winding is made of two layers of the conductor 523: an outer layer and an inner layer located radially inside the outer layer. The stator 520 is, like the above described stator 50, designed to have a slot-less structure and the flattened stator winding 521. The stator 520, therefore, has substantially the same structure of the stator 50 illustrated in FIGS. 8 to 16.

The structure of the stator core 522 will be described below. The stator core 522 is, like the above described stator core 52, made of a plurality of magnetic steel plates stacked in the axial direction in the shape of a hollow cylinder having a given thickness in the radial direction. The stator winding 521 is mounted on a radially outer circumference of the stator core 522 which faces the rotor 510. The stator core 522 does not have any irregularities on the outer circumferential surface thereof. In the assembly of the stator core 522 and the stator winding 521, the conductors 523 of the stator winding 521 are arranged adjacent each other in the circumferential direction on the outer circumferential surface of the stator core 522. The stator core 522 functions as a back core.

The stator 520 may be made to have one of the following structures.

(A) The stator 520 has an inter-conductor members each of which is disposed between the conductors 523 in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit 512 equivalent to one magnetic pole in the circumferential direction, and Br is the remanent flux density in the magnet unit 512.

(B) The stator 520 has the inter-conductor members each of which is disposed between the conductors 523 in the circumferential direction. The inter-conductor members are each made of a non-magnetic material.

(C) The stator 520 has no inter-conductor member disposed between the conductors 523 in the circumferential direction.

The above structure of the stator 520 results in a decrease in inductance as compared with typical rotating electrical machines equipped with teeth (i.e., iron core) which create a magnetic path between conductors of a stator winding. Specifically, the structure of the stator 520 enables the inductance to be one-tenth or less of that in the prior art structure. Usually, the reduction in inductance will result in a reduction in impedance. The rotating electrical machine 500 is, therefore, designed to increase output power relative to input power to increase the degree of output torque. The rotating electrical machine 500 is also enabled to produce a higher degree of output than rotating electrical machines which use a magnet-embedded rotor and output torque using impedance voltage (i.e., reluctance torque).

In this embodiment, the stator winding 521 is formed along with the stator core 522 in the form of a single unit using a resinous molding material (i.e., insulating material). The molding material occupies an interval between a respective adjacent two of the conductors 523 arranged in the circumferential direction. This structure of the stator 520 is equivalent to that described in the above item (B). The conductors 523 arranged adjacent each other in the circumferential direction may have surfaces which face each other in the circumferential direction and are placed in direct contact with each other or opposed to each other through a small air gap therebetween. This structure is equivalent to the above item (C). When the structure in the above item (A) is used, the outer circumferential surface of the stator core 522 is preferably shaped to have protrusions in accordance with orientation of the conductors 523 in the axial direction, that is, a skew angle in a case where the stator winding 521 is of a skew structure.

Figure 54A:
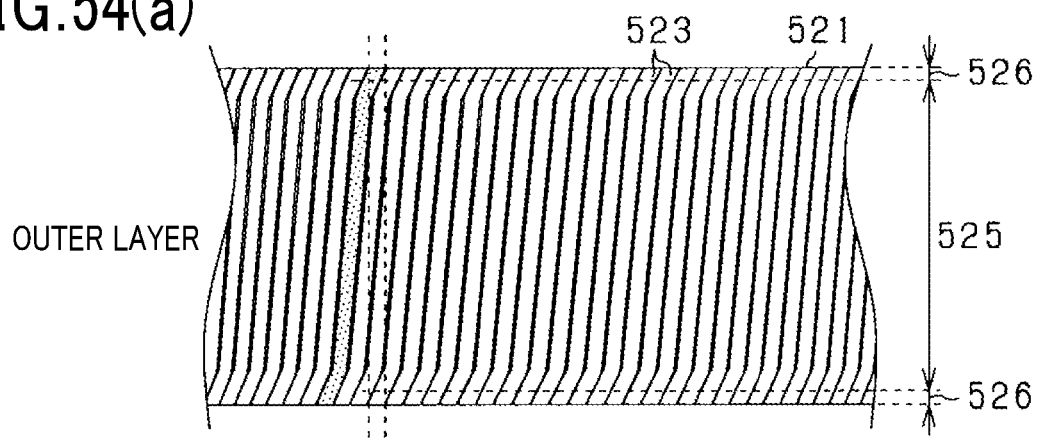
FIGS. 54(a) and 54(b) are front views which illustrate a development of a stator winding.
Figure 54B:
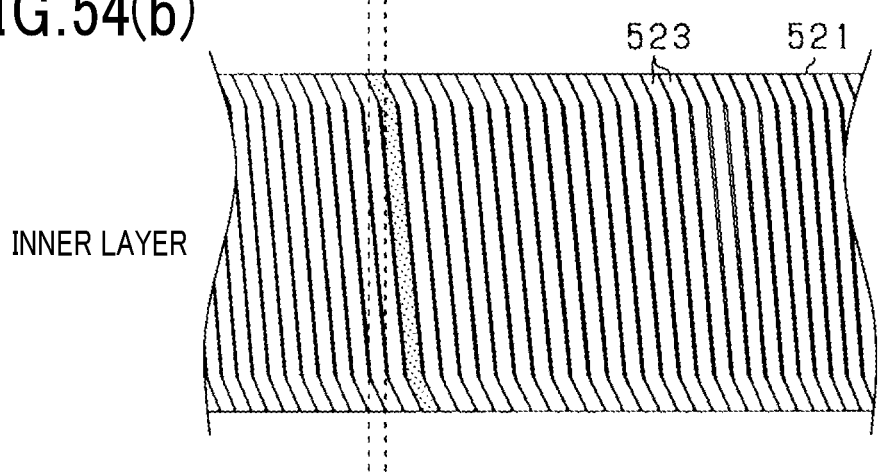

The structure of the stator winding 521 will be described below with reference to FIGS. 54(a) and 54(b). FIG. 54(a) is a partially developed view which illustrates an assembly of the conductors 523 arranged in the form of an outer one of two layers overlapping each other in the radial direction of the stator winding 521. FIG. 54(b) is a partially developed which illustrates an assembly of the conductors 523 arranged in the form of an inner one of the two layers.

The stator winding 521 is designed as an annular distributed winding. The stator winding 521 is made up of the conductors 523 arranged in the form of two layers: an outer layer and an inner layer overlapping each other in the radial direction of the stator winding 521. The conductors 523 of the outer layer are, as can be seen in FIGS. 54(a) and 54(b), skewed at an orientation different from that of the conductors 523 of the inner layer. The conductors 523 are electrically insulated from each other. Each of the conductors 523 is, as illustrated in FIG. 13, preferably made of an aggregation of wires 86. For instance, two each of the conductors 523 through which current flows in the same direction for the same phase are arranged adjacent each other in the circumferential direction of the stator winding 521. Accordingly, in the stator winding 521, a respective circumferentially arranged two of the conductors 523 in each of the outer and inner layers, that is, a total four of the conductors 523 constitutes one conductor portion of the stator winding 521 for each phase. The conductor portions are provided one in each magnetic pole.

The conductor portion is preferably shaped to have a thickness (i.e., a dimension in the radial direction) which is less than a width thereof (i.e., a dimension in the circumferential direction) for each phase in each pole. In other words, the stator winding 521 is preferably designed to have a flattened conductor structure. For instance, a total eight of the conductors 523: four arrayed adjacent each other in the circumferential direction in each of the outer and inner layers preferably define each conductor portion for each phase in the stator winding 521. Alternatively, each of the conductors 523 may be shaped to have a transverse section, as illustrated in FIG. 50, whose width (i.e., a dimension in the circumferential direction) is larger than a thickness thereof (i.e., a dimension in the radial direction). The stator winding 521 may alternatively be designed to have the same structure as that of the stator winding 51 shown in FIG. 12. This structure, however, requires the rotor carrier 511 to have an inner chamber in which coil ends of the stator winding 521 are disposed.

The stator winding 521, as can be seen in FIG. 54(a), has the coil side 525 which overlaps the stator core 522 in the radial direction thereof. The coil side 525 is made up of portions of the conductors 523 which obliquely extend or slant at a given angle to the axis of the stator winding 521 and are arranged adjacent each other in the circumferential direction. The stator winding 521 also has the coil ends 526 located outside the coil side 525 in the axial direction thereof. Each of the coil ends 526 is made up of portions of the conductors 523 which are turned inwardly in the axial direction to make joints of the conductors 523 of the coil side 525. FIG. 54(a) illustrates the coil side 525 and the coil ends 526 in the outer layer of the conductors 523 of the stator winding 521. The conductors 523 of the inner layer and the conductors 523 of the outer layer are electrically connected together by the coil ends 526. In other words, each of the conductors 523 of the outer layer is turned in the axial direction and leads to a respective one of the conductors 523 of the inner layer through the coil end 526. In brief, a direction in which current flows in the stator winding 521 is reversed between the outer and inner layers of the conductors 523 connected to extend in the circumferential direction.

Figure 55:
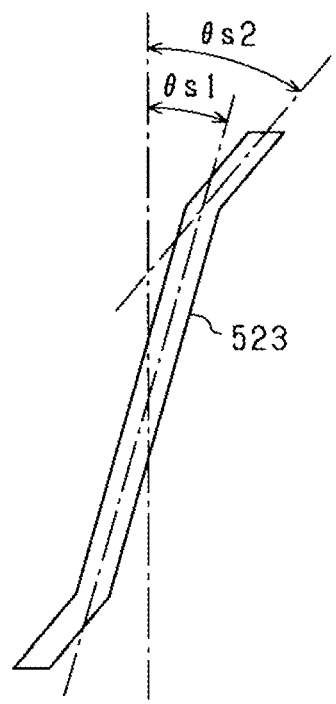
FIG. 55 is a view which demonstrates skew of a conductor.

The stator winding 521 has end regions defining ends thereof opposed to each other in the axial direction and an intermediate region between the end regions. Each of the conductors 523 has skew angles different between each of the end regions and the intermediate region. Specifically, the skew angle is an angle which each of the conductors 523 makes with a line extending parallel to the axis of the stator winding 521. The conductors 523, as illustrated in FIG. 55, have the skew angle $\theta_{s1}$ in the intermediate region and the skew angle $\theta_{s2}$ in the end regions which is different from the skew angle $\theta_{s1}$. The skew angle $\theta_{s1}$ is smaller than the skew angle $\theta_{s2}$. The end regions of the stator winding 521 are defined to partially occupy the coil side 525. The skew angle $\theta_{s1}$ and the skew angle $\theta_{s2}$ are angles at which the conductors 523 are inclined in the axial direction of the stator winding 521. The skew angle $\theta_{s1}$ in the intermediate region is preferably selected to be an angle suitable for removing harmonic components of magnetic flux resulting from excitation of the stator winding 521.

The skew angle of each of the conductors 523 of the stator winding 521 is, as described above, selected to be different between the intermediate region and the end regions. The skew angle $\theta_{s1}$ in the intermediate region is set smaller than the skew angle $\theta_{s2}$ in the end regions, thereby decreasing the size of the coil ends 526, but enabling a winding factor of the stator winding 521 to be increased. In other words, it is possible for the stator winding 521 to decrease the length of the coil ends 526, i.e., portions of the conductors 523 extending outside the stator core 522 in the axial direction without sacrificing a desired winding factor, which enables the rotating electrical machine 500 to be reduced in size and the degree of torque to be increased.

An adequate range of the skew angle $\theta_{s1}$ in the intermediate region will be discussed below. In the case where the X conductors 523 where X is the number of the conductors 523 are arranged in one magnetic pole of the stator winding 521, excitation of the stator winding 521 is thought of as producing an $X^{th}$ harmonic. If the number of phases is defined as S, and the number of the conductors 523 for each phase is defined as m, then X=2×S×m. The inventor of this application has focused the fact that an $X^{th}$ harmonic is equivalent to a combination of an $(X-1)^{th}$ harmonic and $(X+1)^{th}$ harmonic, and the $X^{th}$ harmonic may be reduced by reducing at least either of the $(X-1)^{th}$ harmonic or the $(X+1)^{th}$ harmonic and found that the $X^{th}$ harmonic will be reduced by selecting the skew angle $\theta_{s1}$ to fall in a range of 360°/(X+1) to 360°/(X−1) in terms of electrical angle.

For instance, if S=3, and m=2, the skew angle $\theta_{s1}$ is determined to fall in a range of 360°/13 to 360°/11 in order to decrease the 12$^{th}$ harmonic (i.e., X=12). Specifically, the skew angle $\theta_{s1}$ is selected from a range of 27.7° to 32.7°.

The skew angle $\theta_{s1}$ of each of the conductors 523 in the intermediate region determined in the above way will facilitate or enhance interlinkage of magnetic fluxes, as produced by N-poles and S-poles of the magnets arranged alternately, in the intermediate regions of the conductors 523, thereby increasing the winding factor of the stator winding 521.

The skew angle $\theta_{s2}$ in the end regions is determined to be larger than the skew angle $\theta_{s1}$ in the intermediate region of the conductors 523. The skew angle $\theta_{s2}$ is selected to meet a relation of $\theta_{s1} < \theta_{s2} < 90°$.

In the stator winding 521, the end of each of the conductors 523 of the inner layer is joined to the end of a respective one of the conductors 523 of the outer layer by welding or bonding techniques. Alternatively, each of the conductors 523 of the inner layer and a respective one of the conductors 523 of the outer layer may be made by a single conductor with a curved or bent portion defining an end joint thereof. In the stator winding 521, one of the ends of each phase winding, i.e., one of the axially opposed coil ends 526 of each phase winding is electrically connected to a power converter (i.e., an inverter) using, for example, a bus. The structure of the stator winding 521 in which the conductors 523 are joined together in ways different between the coil end 526 closer to the bus bar and the coil end 526 farther away from the bus bar will be described below.

First Structure

The conductors 523 are welded together at the coil ends 526 closer to the bus bars, while they are connected in a way other than welding at the coil ends 526 farther away from the bus bars. For instance, a single conductor may be shaped to have a curved or bent portion which defines the coil end 523 farther away from the bus bar and to make a respective two of the conductors 523. The end of each phase winding is, as described above, welded to the bus bar at the coil end 526 closer to the bus bar. The coil ends 526 closer to the bus bars may, therefore, be welded together to connect the conductors 523 in a single step. This improves the efficiency in producing the stator winding 521.

Second Structure

The conductors 523 are connected in a way other than welding at the coil ends 526 closer to the bus bars and welded together at the coil ends 526 farther away from the bus bars. In a case where the conductors 523 are welded together at the coil ends 526 closer to the bus bars, it is necessary to increase an interval between the bus bars and the coil ends 526 in order to avoid a mechanical interference between the welds and the bus bars. The second structure, however, eliminates such a need and enables an interval between the bus bars and the coil ends 526 to be decreased, thereby loosing requirements for an axial dimension of the stator winding 521 or for the bus bars.

Third Structure

The conductors 523 are jointed together at all the coil ends 526 using welding techniques. This structure enables each of the conductors 523 to be made of a shorter length of conductor than the above structures and also eliminates the need for bending or curving conductors to improve the efficiency in completing the stator winding 521.

Fourth Structure

The stator winding 521 is completed without welding the coil ends 526 of all the conductors 523. This minimizes or eliminates welded portions of the stator winding 521, thereby minimizing a risk that electrical insulation of the conductors 532 may be damaged at welds.

The stator winding 521 may be produced by preparing a weaved assembly of conductor strips placed horizontally and then bending them into a cylinder. In this case, the coil ends 526 of the conductor strips may be welded together before the conductor strips are bent. The bending of the conductor strips into a cylinder may be achieved by wrapping the assembly of the conductor strips about a circular cylinder which is identical in diameter with the stator core 522 or alternatively by wrapping the assembly of the conductor trips directly around the stator core 522.

The stator winding 521 may alternatively be designed to have one of the following structures.

The stator winding 521 illustrated in FIGS. 54(*a*) and 54(*b*) may alternatively have the intermediate region and the end regions which are identical in skew angle with each other.

The stator winding 521 illustrated in FIGS. 54(*a*) and 54(*b*) may alternatively have the conductors 523 which are arranged adjacent each other in the circumferential direction in the same phase and have ends joined together using connecting conductors extending perpendicular to the axial direction of the stator winding 521.

The stator winding 521 may be made in the form of 2×n annular layers. For example, the stator winding 521 may be shaped to have 4 or 6 overlapping annular layers.

The structure of the inverter unit 530 working as a power converter unit will be described below with reference to FIGS. 56 and 57 which are exploded sectional views. FIG. 57 illustrates two sub-assemblies of parts of the inverter unit 530 shown in FIG. 56.

The inverter unit 530 includes the inverter housing 531, a plurality of electrical modules 532 disposed in the inverter housing 531 and the bus bar module 533 which electrically connects the electrical modules 532 together.

The inverter housing 531 includes the hollow cylindrical outer wall 541, the hollow cylindrical inner wall 542, and the bossed member 543. The inner wall 542 is smaller in outer diameter than the outer wall 541 and arranged radially inside the outer wall 541. The bossed member 543 is secured to one of axially opposed ends of the inner wall 542. These members 541, 542, and 543 are each preferably made of an electrically conductive material, such as carbon fiber reinforced plastic (CFRP). The inverter housing 531 has the outer wall 541 and the inner wall 542 overlapping each other in the radial direction thereof. The bossed member 543 is, as illustrated in FIG. 57, attached to the axial end of the inner wall 542.

The stator core 522 is secured to an outer periphery of the outer wall 541 of the inverter housing 531, thereby assembling the stator 520 and the inverter unit 530 as a single unit.

Figure 56:
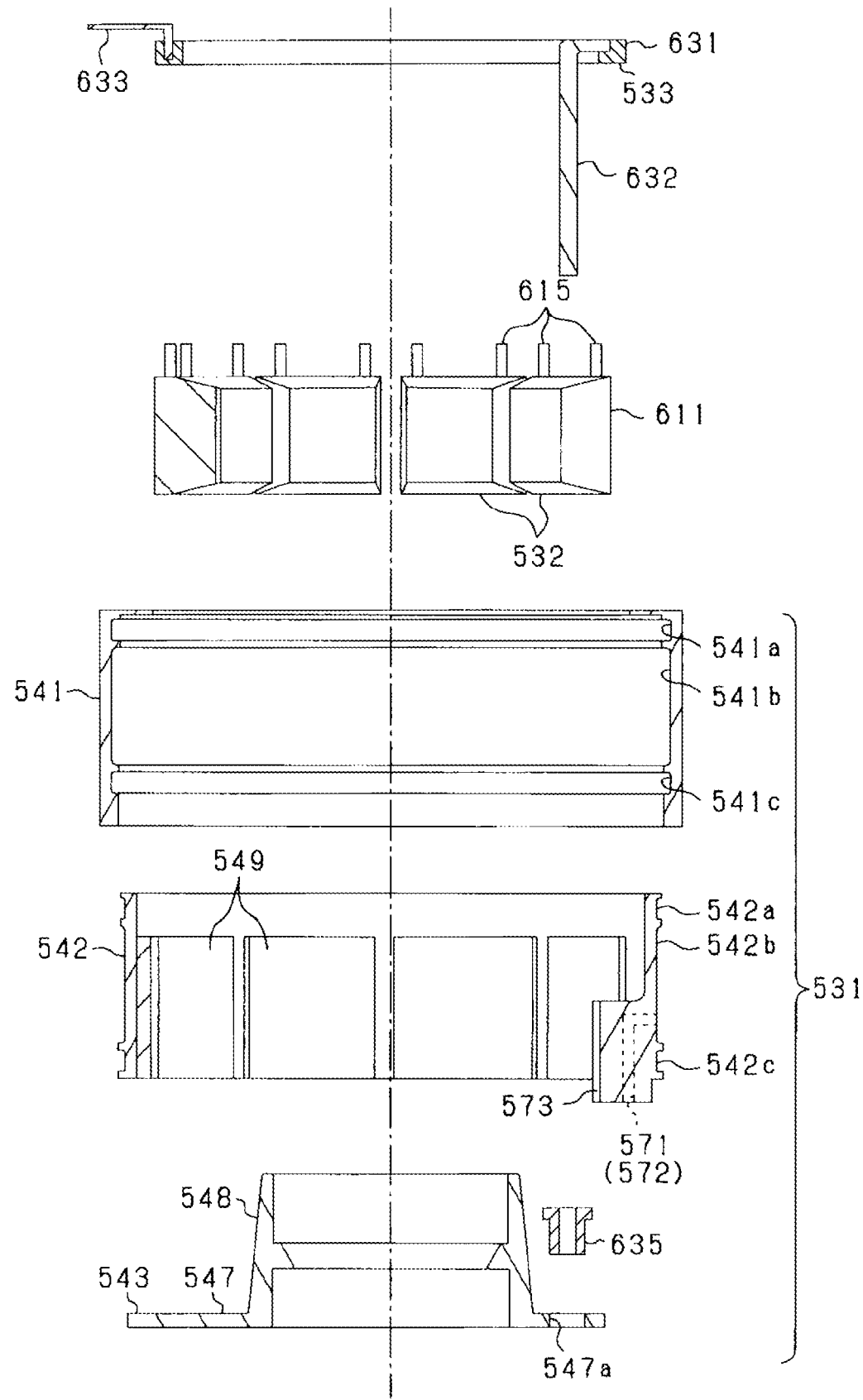
FIG. 56 is an exploded sectional view of an inverter unit.
Figure 57:
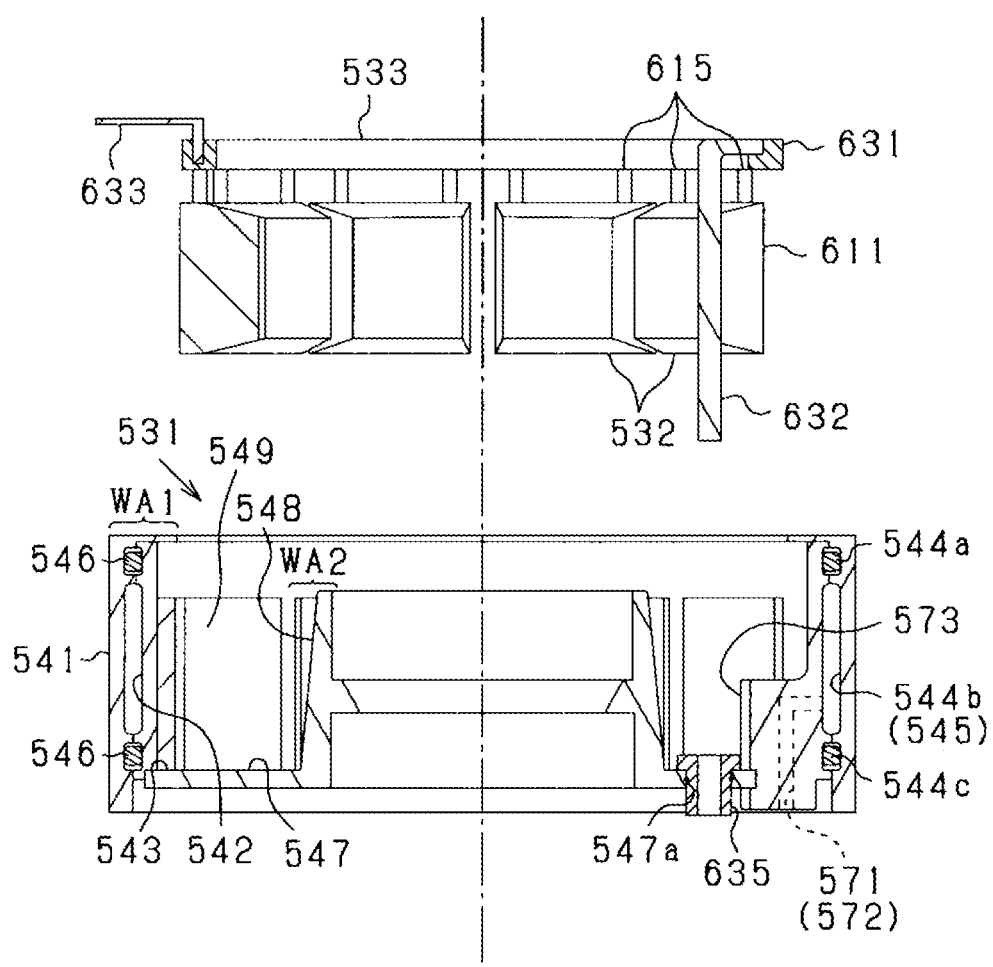
FIG. 57 is an exploded sectional view of an inverter unit.

The outer wall 541, as illustrated in FIG. 56, has a plurality of grooves or recesses 541*a*, 541*b*, and 541C formed in an inner peripheral surface thereof. The inner wall 542 has a plurality of grooves or recesses 542*a*, 542*b*, and 542C formed in an outer peripheral surface thereof. When the outer wall 541 and the inner wall 542 are assembled together, three inner chambers: the annular chambers 544*a*, 544*b*, and 544*c* are, as can be seen in FIG. 57, defined by the recesses 541*a*, 541*b*, and 541C and the recesses 542*a*, 542*b*, and 542C. The annular chamber 544*b* located intermediate between the annular chambers 544*a* and 544*c* is used as the coolant path 545 through which cooling water or coolant flows. The annular chambers 544*a* and 544*c* located axially outside the annular chamber 544*b* (i.e., the coolant path 545) have the sealing members 546 disposed therein. The sealing members 546 hermetically seal the annular chamber 544*b* (i.e., the coolant path 545). The coolant path 545 will also be discussed later in detail.

The bossed member 543 includes the annular disc-shaped end plate 547 and the boss 548 protruding from the end plate 547 into the housing 531. The boss 548 is of a hollow cylindrical shape. Specifically, the inner wall 542 has a first end and a second end which is opposed to the first end in the axial direction and closer to a protruding end of the rotating shaft 501 (i.e., the inside of the vehicle). The bossed member 543 is, as can be seen in FIG. 51, secured to the second end of the inner wall 542. In the tire wheel assembly 400 illustrated in FIGS. 45 to 47, the base plate 405 is secured to the inverter housing 531 (more specifically, the end plate 547 of the bossed member 543).

The inverter housing 531 is of a double-walled structure made up of outer and inner peripheral walls overlapping each other in the radial direction of the inverter housing 531. The outer peripheral wall of the inverter housing 531 is defined by a combination of the outer wall 541 and the inner wall 542. The inner peripheral wall of the inverter housing 531 is defined by the boss 548. In the following discussion, the outer peripheral wall defined by the outer wall 541 and the inner wall 542 will also be referred to as an outer peripheral wall WA1. The inner peripheral wall defined by the boss 548 will also be referred to as an inner peripheral wall WA2.

The inverter housing 531 has an annular inner chamber which is defined between the outer peripheral wall WA1 and the inner peripheral wall WA2 and in which the electrical modules 532 are arranged adjacent each other in the circumferential direction thereof. The electrical modules 532 are firmly attached to an inner periphery of the inner wall 542 using adhesive or vises (i.e., screws). The inverter housing 531 will also be referred to as a housing member. The electrical modules 532 will also be referred to as electrical parts or electrical devices.

The bearing 560 is disposed inside the inner peripheral wall WA2 (i.e., the boss 548). The bearing 560 retains the rotating shaft 501 to be rotatable. The bearing 560 is designed as a hub bearing which is disposed in the center of the wheel 402 to support the tire wheel assembly 400 to be rotatable. The bearing 560 is located to overlap the rotor 510, the stator 520, and the inverter unit 530 in the radial direction thereof. In the rotating electrical machine 500 of this embodiment, the above described magnetic orientation of the rotor 510 enables the magnet unit 512 to have a decreased thickness. The stator 520, as described above, has a slot-less structure and uses flattened conductors. This enables the magnetic circuit to have a thickness decreased in the radial direction, thereby increasing the volume of space radially inside the magnetic circuit. These arrangements enable the magnetic circuit, the inverter unit 530, and the bearing 560 to be stacked in the radial direction. The boss 548 also serves as a bearing retainer in which the bearing 560 is disposed.

The bearing 560 is implemented by, for example, a radial ball bearing, as can be seen in FIG. 51, including the cylindrical inner race 561, the cylindrical outer race 561 which is larger in diameter than the inner race 561 and arranged radially outside the inner race 561, and the balls 563 disposed between the inner race 561 and the outer race 562. The outer race 562 is fit in the bossed member 543, thereby securing the bearing 560 to the inverter housing 531. The inner race 561 is fit on the rotating shaft 501. The inner race 561, the outer race 562, and the balls 563 are made of metallic material, such as carbon steel.

The inner race 561 of the bearing 560 includes the cylinder 561a in which the rotating shaft 501 is disposed and the flange 561b which extends from an end of the cylinder 561a in a direction perpendicular to the axis of the bearing 560. The flange 561b is placed in contact with an inner surface of the end plate 514 of the rotor carrier 511. After the bearing 560 is mounted on the rotating shaft 501, the rotor carrier 511 is retained or held between the flange 502 and the flange 561b of the inner race 561. The angle (i.e., 90° in this embodiment) which the flange 503 of the rotating shaft 501 makes with the axis of the rotating shaft 501 is identical with that which the flange 561b of the inner race 561 makes with the axis of the rotating shaft 501. The rotor carrier 511 is firmly held between the flanges 502 and 561b.

The rotor carrier 511 is supported by the inner race 561 of the bearing 560 from inside, thereby ensuring the stability in holding the rotor carrier 511 relative to the rotating shaft 501 at a required angle, which achieves a desired degree of parallelism of the magnet unit 512 to the rotating shaft 501. This enhances the resistance of the rotor carrier 511 to mechanical vibration even though the rotor carrier 511 is designed to have a size increased in the radial direction.

Next, the electrical modules 532 installed in the inverter housing 531 will be discussed below.

The electrical modules 532 is made up of a plurality of modules each of which includes electrical devices, such as semiconductor switches, and smoothing capacitors which constitute a power converter. Specifically, the electrical modules 532 include the switch modules 532A equipped with semiconductor switches (i.e., power devices) and the capacitor modules 532B equipped with smoothing capacitors.

A plurality of spaces 549 are, as illustrated in FIGS. 49 and 50, secured to the inner peripheral surface of the inner wall 542. The spaces 549 each have a flat surface to which one of the electrical modules 532 is attached. The inner peripheral surface of the inner wall 542 is curved, while each of the electrical modules 532 has a flat surface to be attached to the inner wall 542. Each of the spaces 549 is, therefore, shaped to have the flat surface which faces away from the inner wall 542. The electrical modules 532 are secured to the flat surfaces of the spacers 549.

The spacers 549 need not necessarily to be interposed between the inner wall 542 and the electrical modules 532. For example, the inner wall 542 may be shaped to have flat sections. Alternatively, each of the electrical modules 532 may be shaped to have a curved surface attached directly to the inner wall 542. The electrical modules 532 may alternatively be secured to the inverter housing 531 in non-contact with the inner peripheral surface of the inner wall 542. For instance, the electrical modules 532 may be fixed on the end plate 547 of the bossed member 543. The switch modules 532A may be secured to the inner peripheral surface of the inner wall 542 in non-contact therewith. Similarly, the capacitor modules 532B may be secured to the inner peripheral surface of the inner wall 542 in non-contact therewith.

In a case where the spacers 549 are disposed on the inner peripheral surface of the inner wall 542, a combination of the outer peripheral wall WA1 and the spacers 549 will be referred to as a cylindrical portion. Alternatively, in a case where the spacers 549 are not used, the outer peripheral wall WA1 itself will be referred to as a cylindrical portion.

The outer peripheral wall WA1 of the inverter housing 531, as described already, has formed therein the coolant path 545 in which cooling water flows to cool the electrical modules 532. Instead of the cooling water, cooling oil may be used. The coolant path 545 is of an annular shape contoured to conform with the configuration of the outer peripheral wall WA1. The cooling water passes the electrical modules 532 from an upstream to a downstream side in the coolant path 545. In this embodiment, the coolant path 545 extends in an annular shape and surrounds or overlaps the electrical modules 532 in the radial direction.

The inner wall 542 has formed therein the inlet path 571 through which the cooling water is inputted into the coolant path 545 and the outlet path 572 through which the cooling water is discharged from the coolant path 545. The inner wall 542, as described already, has the electrical modules 532 disposed on the inner peripheral surface thereof. Only one of intervals each between a respective circumferentially adjacent two of the electrical modules 532 is shaped to be larger than the others. In such a large interval, a portion of the inner wall 542 protrudes radially inwardly to form the bulging portion 573. The bulging portion 573 has formed therein the inlet path 571 and the outlet path 572 which are arranged adjacent each other in the circumferential direction of the inner wall 542.

Figure 58:
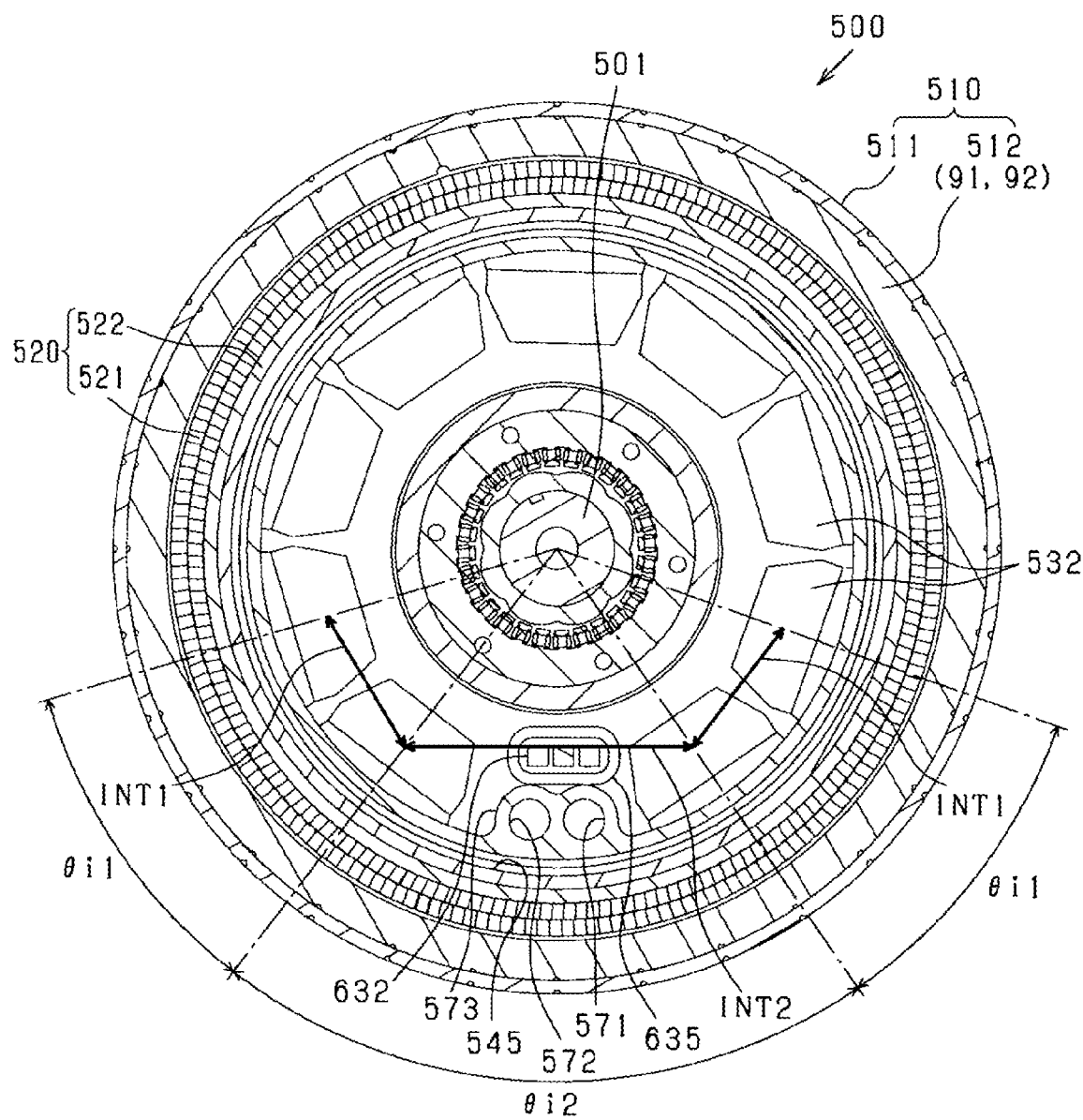
FIG. 58 is a view which demonstrates layout of electrical modules in an inverter housing.

FIG. 58 illustrates the layout of the electrical modules 532 in the inverter housing 531. FIG. 58 represents the same longitudinal section of the rotating electrical machine 500 as in FIG. 50.

The electrical modules 532 are, as can be seen in FIG. 58, arranged at the first interval INT1 or the second interval INT2 away from each other in the circumferential direction of the rotating electrical machine 500. Only selected two of the electrical modules 532 are, as clearly illustrated in FIG. 58, located at the second interval INT2 away from each other. The second interval INT2 is selected to be larger than the first interval INT1. Each of the intervals INT1 and INT2 is, for example, a distance between the centers of an adjacent two of the electrical modules 532 arranged in the circumferential direction. The bulging portion 573 is located in the interval INT2 between the electrical modules 532. In other words, the intervals between the electrical modules 532 include a longer interval (i.e., the second interval INT2) in which the bulging portion 573 lies.

Each of the intervals INT1 and INT2 may be given by an arc-shaped distance between the two adjacent electrical modules 532 along a circle around the center defined on the rotating shaft 501. Each of the intervals INT1 and INT2 may alternatively be expressed, as illustrated in FIG. 58, by an angular interval $\theta i1$ or $\theta i2$ around the center defined on the rotating shaft 501 where $\theta i1 < \theta i2$).

In the structure illustrated in FIG. 58, the electrical modules 532 are placed in non-contact with each other in the circumferential direction of the rotating electrical machine 500, but however, they may be arranged in contact with each other in the circumferential direction except for the second interval INT2.

Referring back to FIG. 48, the end plate 547 of the bossed member 543 has formed therein the inlet/outlet port 574 in which ends of the inlet path 571 and the outlet path 572 are formed. The inlet path 571 and the outlet path 572 connect with the circulation path 575 through which the cooling water is circulated. The circulation path 575 is defined by a coolant pipe. The circulation path 575 has the pump 576 and the heat dissipating device 577 installed therein. The pump 576 is actuated to circulate the cooling water in the coolant path 545 and the circulation path 575. The pump 576 is implemented by an electrically powered pump. The heat dissipating device 577 is made of a radiator working to release thermal energy of the cooling water to air.

The stator 520 is, as illustrated in FIG. 50, arranged outside the outer peripheral wall WA1. The electrical modules 532 are arranged inside the outer peripheral wall WA1. Accordingly, thermal energy generated by the stator 520 is transferred to the outer peripheral wall WA1 from outside, while thermal energy generated by the electrical modules 532 is transferred to the outer peripheral wall WA1 from inside. The cooling water flowing through the coolant path 545, therefore, simultaneously absorbs the thermal energy generated by both the stator 520 and the electrical modules 532, thereby facilitating dissipation of heat from the rotating electrical machine 500.

The electrical structure of the power converter will be described below with reference to FIG. 59.

Figure 59:
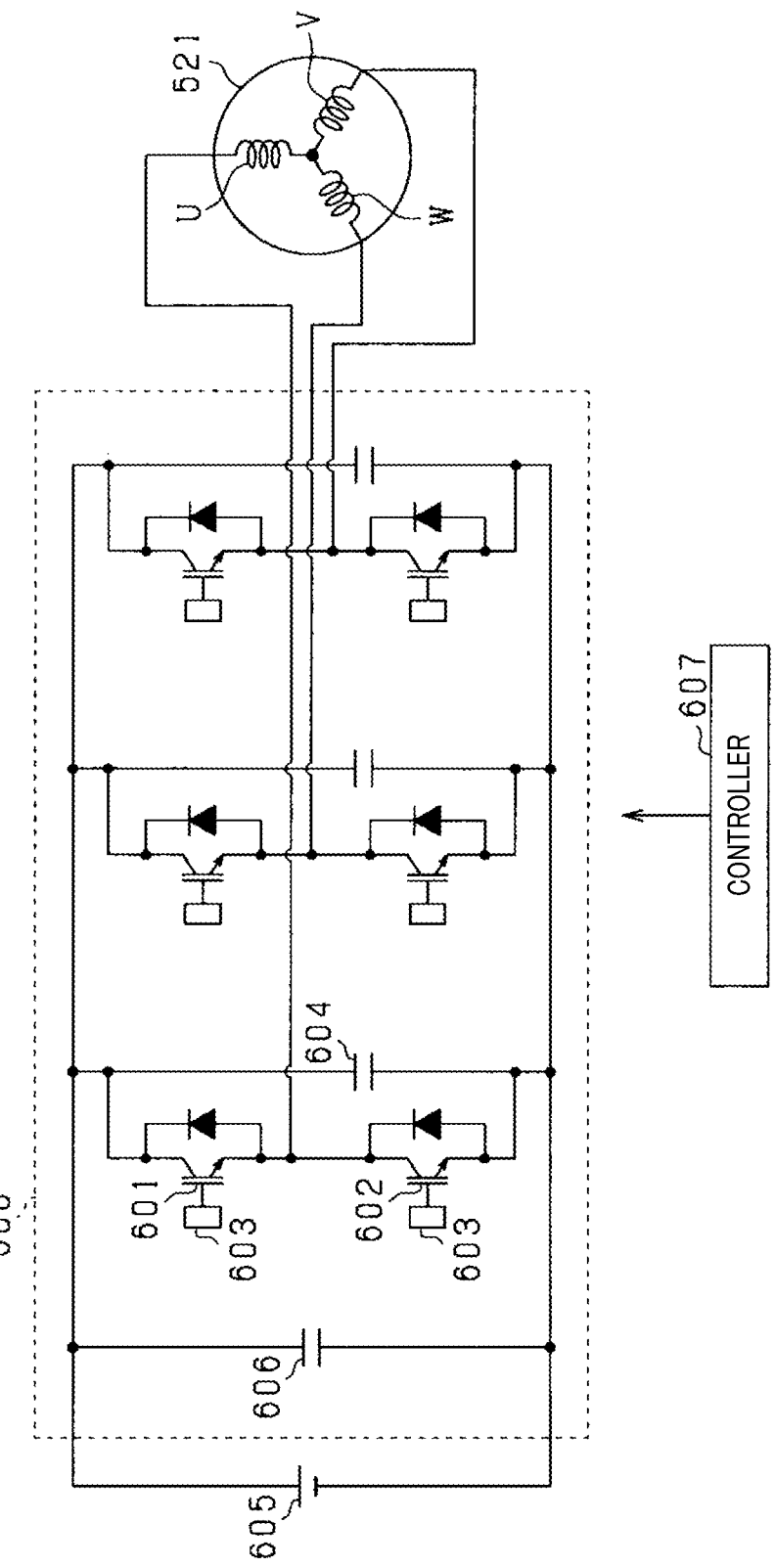
FIG. 59 is a circuit diagram which illustrates an electrical structure of a power converter.

The stator winding 521 is, as illustrated in FIG. 59, made up of a U-phase winding, a V-phase winding, and a W-phase winding. The stator winding 521 connects with the inverter 600. The inverter 600 is made of a bridge circuit having as many upper and lower arms as the phases of the stator winding 521. The inverter 600 is equipped with a series-connected part made up of the upper arm switch 601 and the lower arm switch 602 for each phase. Each of the switches 601 and 602 is turned on or off by a corresponding one of the driver circuits 603 to energize or deenergize a corresponding one of the phase windings. Each of the switches 601 and 602 is made of, for example, a semiconductor switch, such as a MOSFET or IGBT. The capacitor 604 is also connected to each of the series-connected parts made up of the switches 601 and 602 to output electrical charge required to achieve switching operations of the switches 601 and 602.

The control device 607 serves as a controller and is made up of a microcomputer equipped with a CPU and memories. The control device 607 analyzes information about parameters sensed in the rotating electrical machine 500 or a request for a motor mode or a generator mode in which the rotating electrical machine 500 operates to control switching operations of the switches 601 and 602 to excite or deexcite the stator winding 521. For instance, the control device 607 performs a PWM operation at a given switching frequency (i.e., carrier frequency) or an operation using a rectangular wave to turn on or off the switches 601 and 602. The control device 607 may be designed as a built-in controller installed inside the rotating electrical machine 500 or an external controller located outside the rotating electrical machine 500.

The rotating electrical machine 500 in this embodiment has a decreased electrical time constant because the stator 520 is engineered to have a decreased inductance. It is, therefore, preferable to increase the switching frequency (i.e., carrier frequency) and enhance the switching speed in the rotating electrical machine 500. In terms of such requirements, the capacitor 604 serving as a charge supply capacitor is connected parallel to the series-connected part made up of the switches 601 and 602 for each phase of the stator winding 521, thereby reducing the wiring inductance, which deals with electrical surges even through the switching speed is enhanced.

The inverter 600 is connected at a high potential terminal thereof to a positive terminal of the dc power supply 605 and at a low potential terminal thereof to a negative terminal (i.e., ground) of the dc power supply 605. The smoothing capacitor 606 is connected to the high and low potential terminals of the inverter 600 in parallel to the dc power supply 605.

Each of the switch modules 532A includes the switches 601 and 602 (i.e., semiconductor switching devices generating heat), the driver circuits 603 (i.e., electric devices constituting the driver circuits 603), and the charge supply capacitor 604. Each of the capacitor modules 532B includes the smoothing capacitor 606 generating heat. The structure of the switch modules 532A is shown in FIG. 60.

Figure 60:
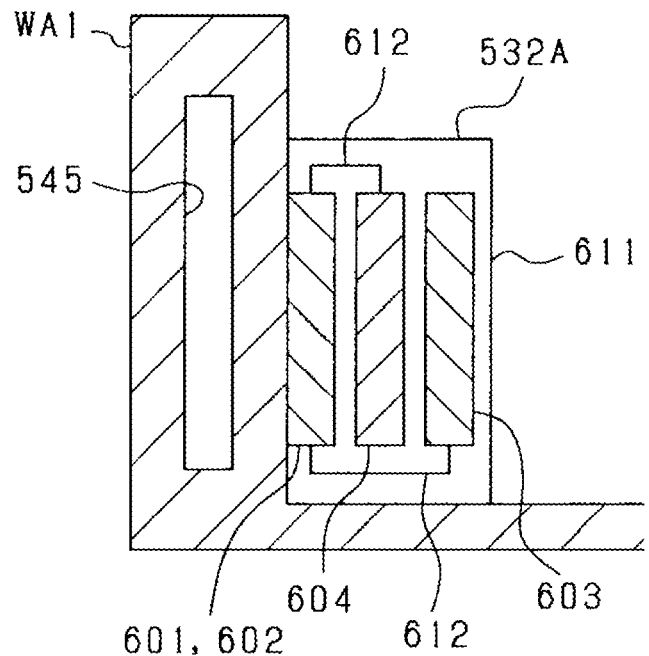
FIG. 60 is a sectional view which illustrates a cooling structure of a switch module.

Each of the switch modules 532A, as illustrated in FIG. 60, includes the module case 611, the switches 601 and 602 for one of the phases of the stator winding 521, the driver circuits 603, and the charge supply capacitor the charge supply capacitor 604. Each of the driver circuits 603 is made of a dedicated IC or a circuit board and installed in the switch module 532A.

The module case 611 is made from insulating material, such as resin. The module case 611 is secured to the outer peripheral wall WA1 with a side surface thereof contacting the inner peripheral surface of the inner wall 542 of the inverter unit 530. The module case 611 has, for example, resin molded therein. In the module case 611, the switches 601 and 602, the driver circuits 603, and the capacitor 604 are electrically connected together using wires 612. The switch modules 532A are, as described above, attached to the outer peripheral wall WA1 through the spacers 549, but however, FIG. 60 emits the spacers 549 for the brevity of illustration.

In a condition where the switch modules 532A are firmly attached to the outer peripheral wall WA1, a portion of each of the switch modules 532A which is closer to the outer peripheral wall WA1, i.e., the coolant path 545 is more cooled. In terms of such ease of cooling, the order in which the switches 601 and 602, the driver circuits 603, and the capacitor 604 are arranged is determined. Specifically, the switches 601 and 602 have the largest amount of heat generation. The capacitor 604 has an intermediate amount of heat generation. The driver circuits 603 have the smallest amount of heat generation. Accordingly, the switches 601 and 602 are located closest to the outer peripheral wall WA1. The driver circuits 603 are located farther away from the outer peripheral wall WA1. The capacitor 604 is interposed between the switches 601 and 602 and the driver circuit 603. In other words, the switches 601 and 602, the capacitor 604, the driver circuit 603 are arranged in this order close to the outer peripheral wall WA1. An area of each of the switch modules 532A which is attached to the inner wall 542 is preferably smaller in size than an area of the inner peripheral surface of the inner wall 542 which is contactable with the switch modules 532A.

Although not illustrated in detail, the capacitor modules 532B have the capacitor 606 disposed in a module case similar in configuration and size to the switch modules 532A. Each of the capacitor modules 532B is, like the switch modules 532A, secured to the outer peripheral wall WA1 with the side surface of the module case 611 placed in contact with the inner peripheral surface of the inner wall 542 of the inverter housing 531.

The switch modules 532A and the capacitor modules 532B need not necessarily be arranged coaxially with each other inside the outer peripheral wall WA1 of the inverter housing 531. For instance, the switch modules 532A may alternatively be disposed radially inside or outside the capacitor modules 532B.

When the rotating electrical machine 500 is operating, the switch modules 532A and the capacitor modules 532B transfer heat generated therefrom to the coolant path 545 through the inner wall 542 of the outer peripheral wall WA1, thereby cooling the switch modules 532A and the capacitor modules 532B.

Figure 61A:
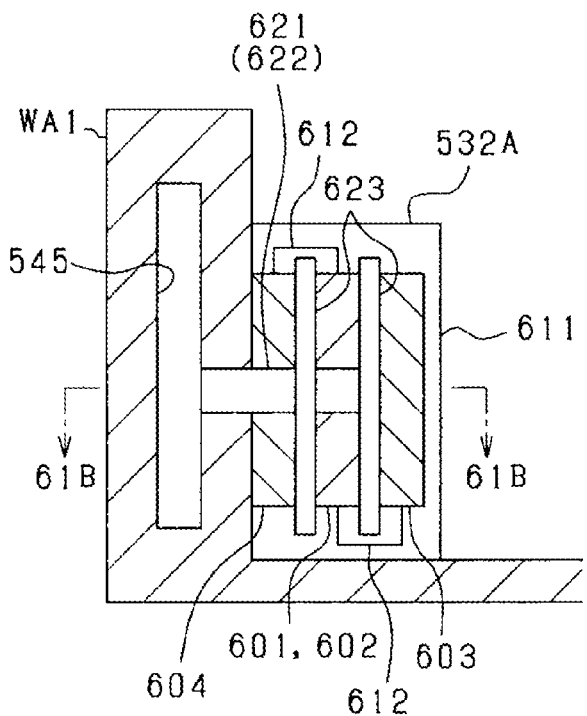
FIGS. 61(a) and 61(b) are sectional views which illustrate a cooling structure of a switch module.
Figure 61B:
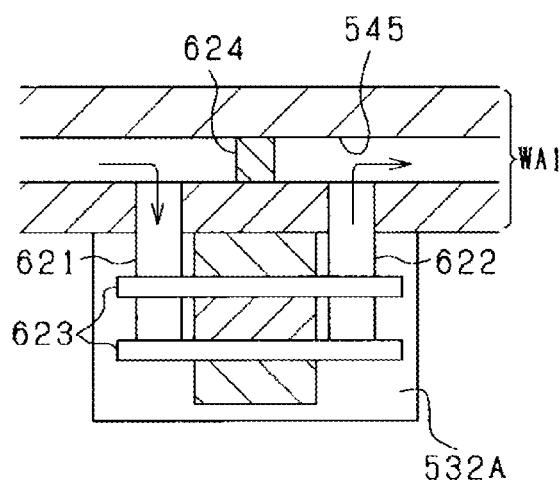

Each of the electrical modules 532 may be designed to have formed therein a flow path into which coolant is delivered to cool the electrical module 532. The cooling structure of the switch modules 532A will be described below with reference to FIGS. 61(a) and 61(b). FIG. 61(a) is a longitudinal sectional view of each of the switch modules 532A along a line passing through the outer peripheral wall WA1. FIG. 61(b) is a sectional view taken along the line 61B-61B in FIG. 61(a).

Like in FIG. 60, the switch module 532A, as illustrated in FIGS. 61(a) and 61(b), includes the module case 611, the switches 601 and 602 for a corresponding one of the phases of the stator winding 521, the driver circuits 603, the capacitor 604, and a cooling device made of a pair of pipes 621 and 622 and the coolers 623. The pipe 621 of the cooling device is designed as an inlet pipe through which cooling water is delivered from the coolant path 545 in the outer peripheral wall WA1 to the coolers 623. The pipe 622 of the cooling device is designed as an outlet pipe through which the cooling water is discharged from the coolers 623 to the coolant path 545. The cooler 623 is prepared for an object to be cooled. The cooling device may, therefore, be designed to have a single cooler 623 or a plurality of coolers 623. In the structure shown in FIGS. 61(a) and 61(b), the two coolers 623 are arranged at a given interval away from each other in a direction perpendicular to the length of the coolant path 545, in other words, the radial direction of the inverter unit 530. The pipes 621 and 622 connect with the coolers 623. Each of the coolers 623 has an inner void. Each of the coolers 623 may be equipped with inner fins for enhancing the cooling ability.

In the structure equipped with the two coolers 623 which will also be referred to as a first cooler 623 and a second cooler 623 where the first cooler 623 is located closer to the outer peripheral wall WA1 than the second cooler 623 is, a first space between the first cooler 623 and the outer peripheral wall WA1, a second space between the first and second coolers 623, and a third space located inside the second cooler 623 away from the outer peripheral wall WA1 are locations where electrical devices are disposed. The second space, the first space, and the third space have a higher degree of cooling capability in this order. In other words, the second space is a location which has the highest degree of cooling ability. The first space close to the outer peripheral wall WA1 (i.e., the coolant path 545) is higher in cooling capability than the third space farther away from the outer peripheral wall WA1. In view of this relation in cooling capability, the switches 601 and 602 are arranged in the second space between the first and second coolers 623. The capacitor 604 is arranged in the first space between the first cooler 623 and the outer peripheral wall WA1. The driver circuits 603 are arranged in the third space located farther away from the outer peripheral wall WA1. Although not illustrated, the driver circuits 603 may alternatively be disposed in the first space, while the capacitor 604 may be disposed in the third space.

In either case, in the module case 611, the switches 601 and 602 are electrically connected to the driver circuits 603 using the wires 612, while the switches 601 and 602 are connected to the capacitor 604 using the wires 612. The switches 601 and 602 are located between the driver circuits 603 and the capacitor 604, so that the wires 612 extending from the switches 601 and 602 to the driver circuit 603 are oriented in a direction opposite a direction in which the wires 612 extending from the switches 601 and 602 to the capacitor 604.

The pipes 621 and 622 are, as can be seen in FIG. 61(b), arranged adjacent each other in the circumferential direction, that is, from an upstream side to a downstream side of the coolant path 545. The cooling water, therefore, enters the coolers 623 from the pipe 621 located on the upstream side and is then discharged from the pipe 622 located on the downstream side. The stopper 624 is preferably disposed between the inlet pipe 621 and the outlet pipe 621 in the coolant path 545 to stop flow of the cooling water in order to facilitate entry of cooling water into the cooling device. The stopper 624 may be designed as a shutter or block to close the coolant path 545 or an orifice to decrease a transverse sectional area of the coolant path 545.

Figure 62A:
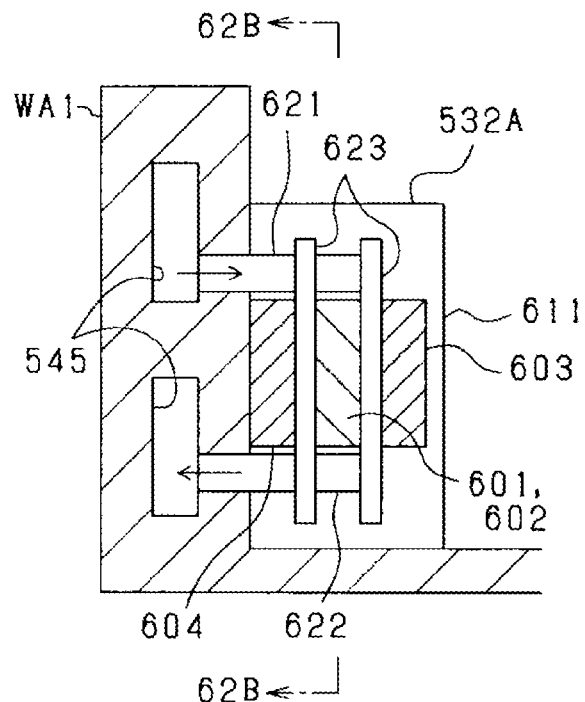
FIGS. 62(a), 62(b), and 62(c) are partial views which illustrate a cooling structure of a switch module.
Figure 62B:
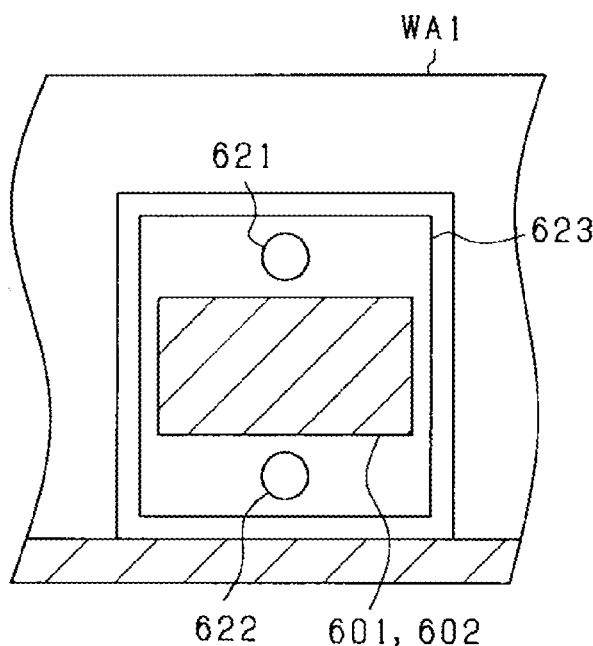
Figure 62C:
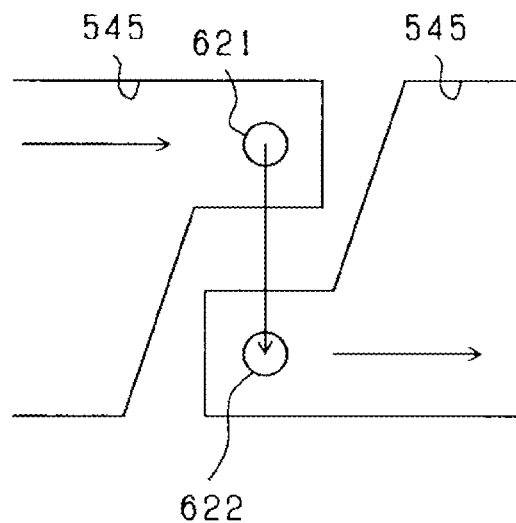

FIGS. 62(a) to 62(c) illustrate a modified form of the cooling structure of the switch modules 532A. FIG. 62(a) is a longitudinal section of the switch module 532A along a line traversing the outer peripheral wall WA1. FIG. 62(b) is a sectional view taken along the line 62B-62B in FIG. 62(a).

The structure in FIGS. 62(a) and 62(b) has the inlet pipe 621 and the outlet pipe 622 which are different in layout from those illustrated in FIGS. 62(a) and 62(b). Specifically, the inlet and outlet pipes 621 and 622 are arranged adjacent each other in the axial direction. The coolant path 545, as clearly illustrated in FIG. 62(c), includes an inlet section leading to the inlet pipe 621 and an outlet section leading to the outlet pipe 622. The inlet section and the outlet section are physically separate from each other in the axial direction and hydraulically connected through the pipes 621 and 622 and the coolers 623.

Each of the switch modules 532A may alternatively be designed to have one of the following structures.

Figure 63A:
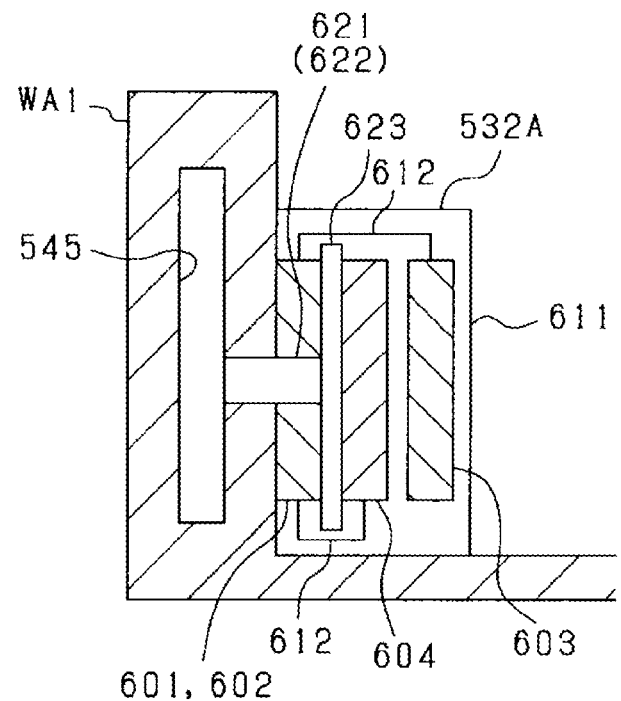
FIGS. 63(a) and 63(b) are partially sectional views each of which illustrates a cooling structure of a switch module.

The structure in FIG. 63(a) is, unlike in FIG. 61(a), equipped with the single cooler 263. In the module case 611, a space (which will be referred to as a first space) between the cooler 623 and the outer peripheral wall WA1 in the radial direction of the module case 611 has a higher degree of cooling capability. A space (which will be referred to as a second space) located inside the cooler 623 farther away from the outer peripheral wall WA1 has a lower degree of cooling capability. In view of this relation in cooling capability, the structure in FIG. 63(a) has the switches 601 and 602 arranged in the first space close to the outer peripheral wall WA1 outside the cooler 623. The capacitor 604 is arranged in the second space located inside the cooler 623. The driver circuits 603 are disposed farther away from the cooler 623.

Each of the switch modules 532A is, as described above, designed to have the switches 601 and 602, the driver circuits 603, and the capacitor 604 disposed within the module case 611 for one of the phases of the stator winding 521, but may be modified to have the switches 601 and 602 and the driver circuits 603 or the capacitor 604 disposed in the module case 611 for one of the phases of the stator winding 521.

Figure 63B:
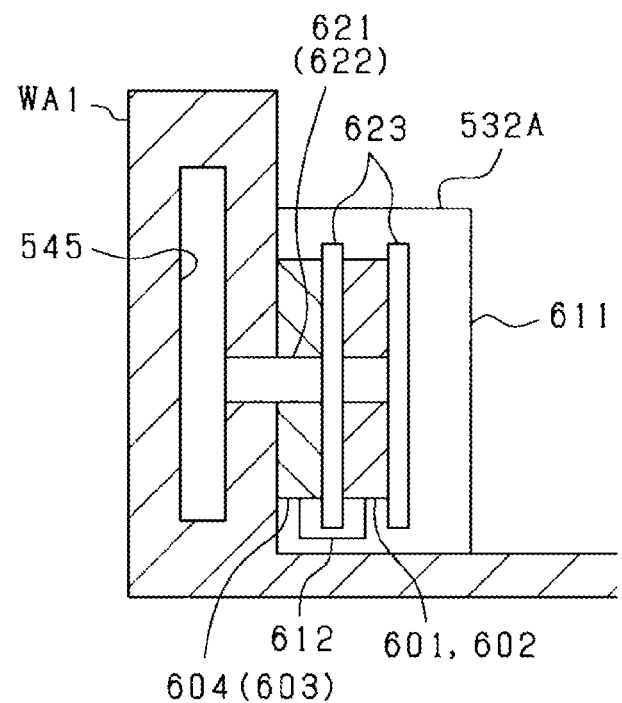

In FIG. 63(b), the module case 611 has the inlet pipe 621, the outlet pipe 622, and the two coolers 623 mounted therein. One of the coolers 623 located closer to the outer peripheral wall WA1 will be referred to as a first cooler. One of the coolers 623 located farther away from the outer peripheral wall WA1 will be referred to as a second cooler. The switches 601 and 602 are arranged between the first and second coolers 623. The capacitor 604 or the driver circuits 603 are arranged close to the outer peripheral wall WA1 outside the first cooler 623. The switches 601 and 602 and the driver circuit 603 are assembled as a single semiconductor module which is disposed in the module case 611 along with the capacitor 604.

In the structure of the switch module 532A illustrated in FIG. 63(b), the capacitor 604 is located outside or inside one of the first and second coolers 623 on the opposite side of the one of the first and second coolers 623 to the switches 601 and 602. In the illustrated example, the capacitor 604 is located between the first cooler 623 and the outer peripheral wall WA1. The switch module 532A may alternatively be designed to have two capacitors 604 disposed on the both sides of the first cooler 623 in the radial direction of the stator winding 521.

The structure in this embodiment delivers cooling water into only the switch modules 532A other than the capacitor module 532B through the coolant path 545, but may alternatively be designed to supply the cooling water to both the modules 532A and 532B through the coolant path 545.

Figure 64:
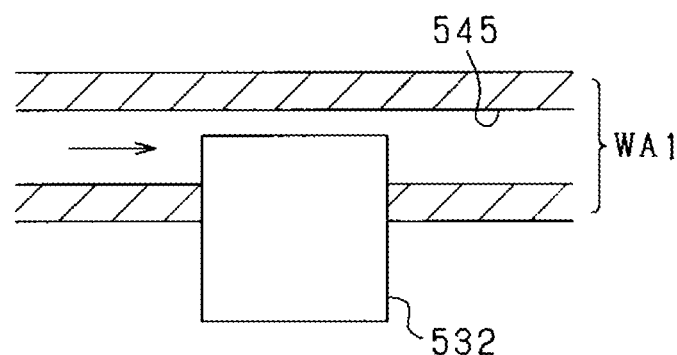
FIG. 64 is a partial view which illustrates a cooling structure of a switch module.

It is also possible to bring cooling water into direct contact with the electrical modules 532 to cool them. For instance, the electrical modules 532 may be, as illustrated in FIG. 64, embedded in the outer peripheral wall WA1 to achieve a direct contact of the outer surface of the electrical modules 532 with the cooling water. In this case, each of the electrical modules 532 may be partially exposed to the cooling water flowing in the coolant path 545. Alternatively, the coolant path 545 may be shaped to have a size increased to be larger than that in FIG. 58 in the radial direction to arrange the electrical modules 532 fully within the coolant path 545. In the case where the electrical modules 532 are embedded in the coolant path 545, the module case 611 of each of the electrical modules 532 may be equipped with fins disposed in the coolant path 545, that is, exposed to the cooling water to enhance the ability to cool the electrical modules 532.

The electrical modules 532, as described above, include the switch modules 532A and the capacitor modules 532B which are different in amount of heat generation from the switch modules 532A. In terms of such a difference, it is possible to modify the layout of the electrical modules 532 in the inverter housing 531 in the following way.

Figure 65:
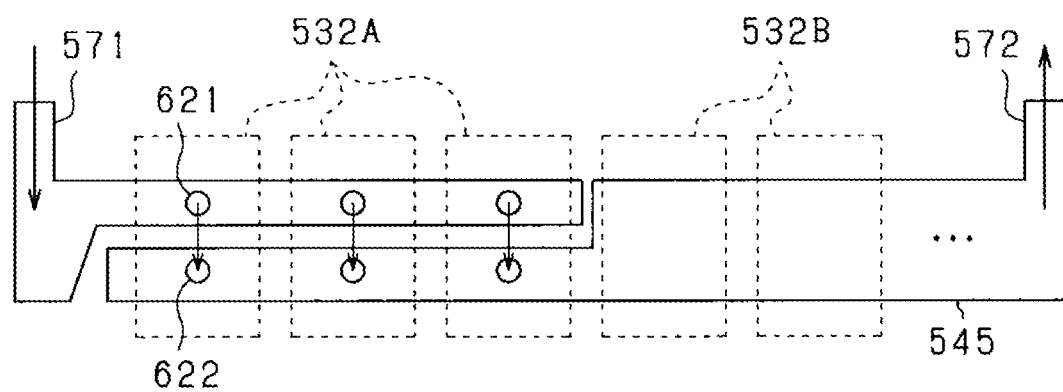
FIG. 65 is a view which illustrates layout of electrical modules and a coolant path.

For instance, the switch modules 532A are, as illustrated in FIG. 65, arranged away from each other in the circumferential direction of the stator 520 and located as a whole closer to the upstream side of the coolant path 545 (i.e., the inlet path 571) than to the downstream side (i.e., the outlet path 572) of the coolant path 545. The cooling water entering the inlet path 571 is first used to cool the switch modules 532A and then used to cool the capacitor modules 532B. In the structure illustrated in FIG. 65, the inlet and outlet pipes 621 and 622 are, like in FIGS. 62(a) and 62(b), arranged adjacent each other in the axial direction, but however, may be, like in FIGS. 61(a) and 61(b), oriented adjacent each other in the circumferential direction.

Figure 66:
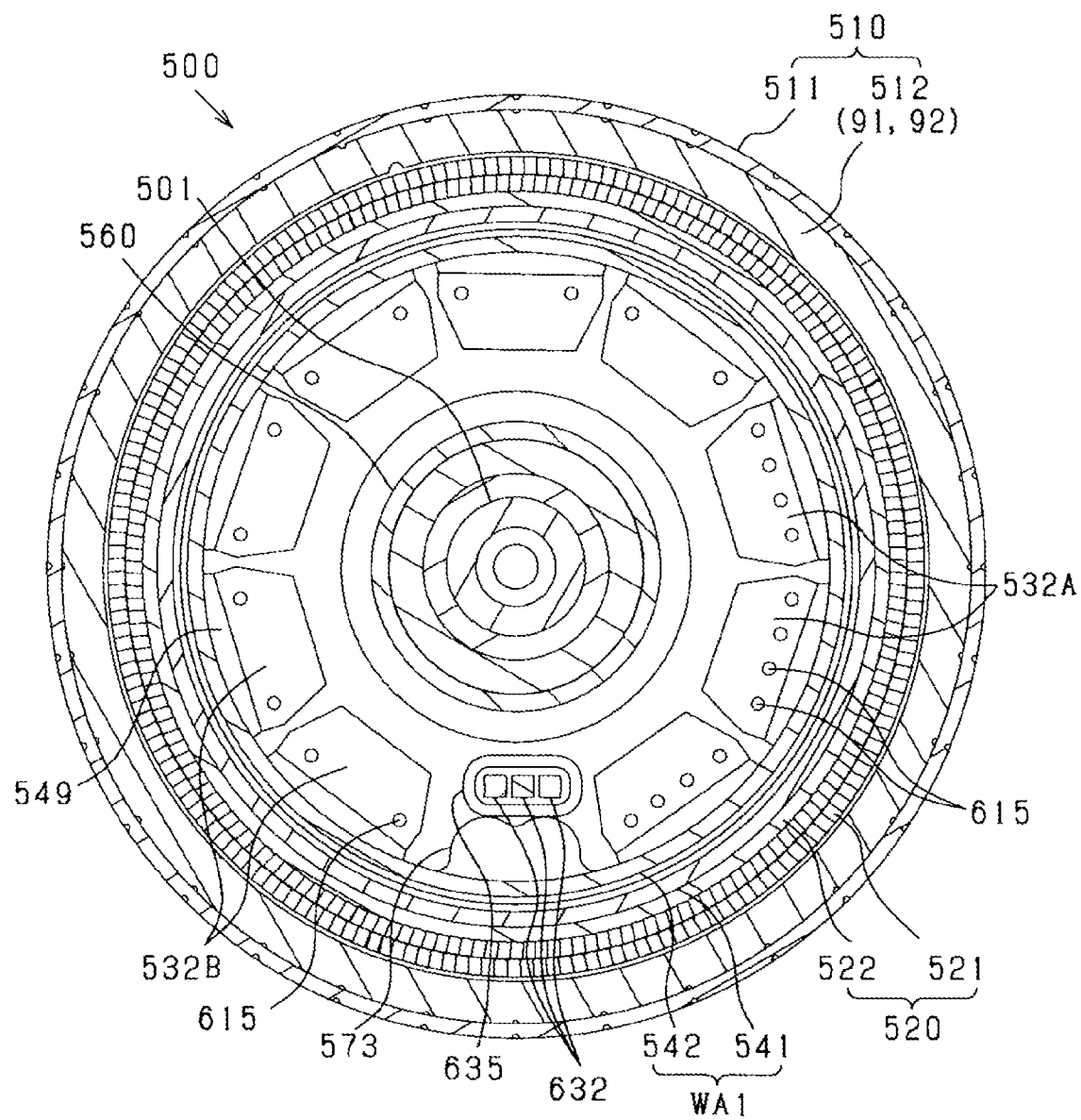
FIG. 66 is a sectional view taken along the line 66-66 in FIG. 49.
Figure 67:
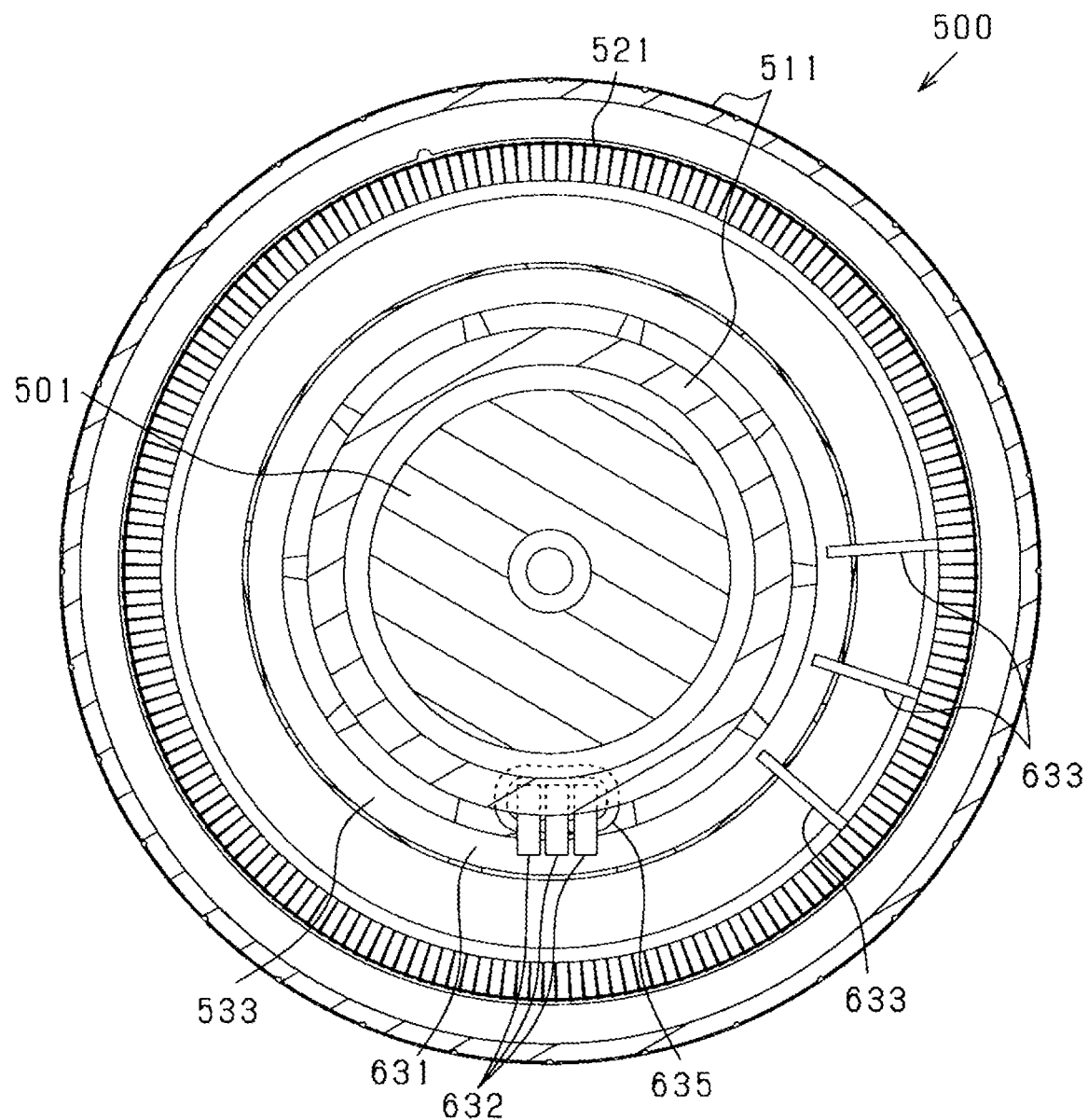
FIG. 67 is a sectional view taken along the line 67-67 in FIG. 49.
Figure 68:
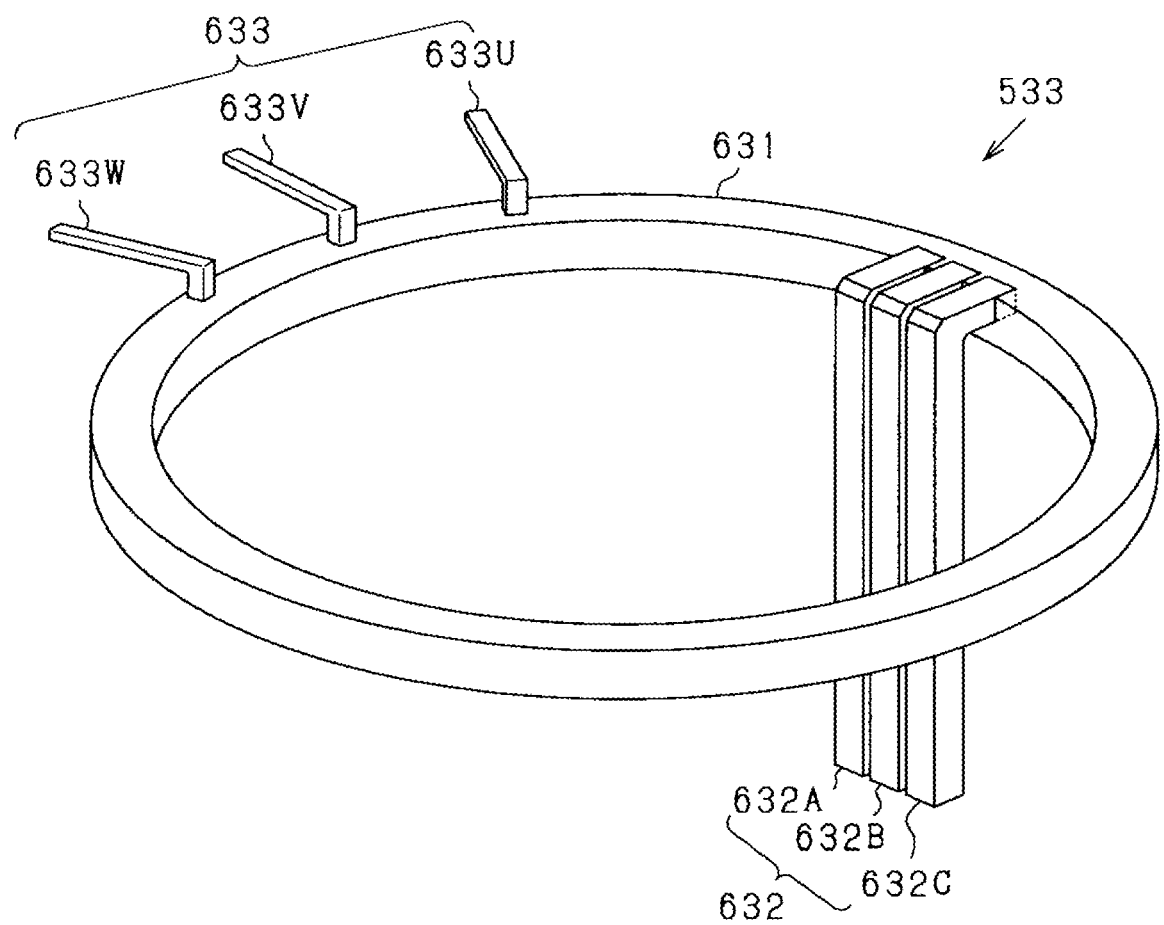
FIG. 68 is a perspective view which illustrates a bus bar module.

The electrical structure of the electrical modules 532 and the bus bar module 533 will be described below. FIG. 66 is a transverse section taken along the line 66-66 in FIG. 49. FIG. 67 is a transverse section taken along the line 67-67 in FIG. 49. FIG. 68 is a perspective view which illustrates the bus bar module 533. Electrical connections of the electrical modules 532 and the bus bar module 533 will be discussed with reference to FIGS. 66 to 68.

The inverter housing 531 has the three switch modules 532A (which will also be referred to below as a first module group) which are, as illustrated in FIG. 66, arranged adjacent each other circumferentially next to the bulging portion 573 on the inner wall 542 in which the inlet path 571 and the outlet path 572 are formed in communication with the coolant path 545. The six capacitor modules 532B are also arranged circumferentially adjacent each other next to the first module group. In summary, the inverter housing 531 has ten regions (i.e., the number of the modules 532A and 532B plus one) defined on the inner peripheral surface of the outer peripheral wall WA1. The ten regions are arranged adjacent each other in the circumferential direction of the inverter housing 531. The electrical modules 532 are disposed, one in each of ninth of the regions, while the bulging portion 573 occupies the remaining one of the regions. The three switch modules 532A will also be referred to as a U-phase module, a V-phase module, and a W-phase module.

Each of the electrical modules 532 (i.e., the switch modules 532A and the capacitor modules 532B) is, as illustrated in FIGS. 66, 56, and 57, equipped with a plurality of module terminals 615 extending from the module case 611. The module terminals 615 serve as input/output terminals through which electrical signals are inputted into or outputted from the electrical modules 532. The module terminals 615 each have a length extending in the axial direction of the inverter housing 531. More specifically, the module terminals 615, as can be seen in FIG. 51, extend from the module case 611 toward the bottom of the rotor carrier 511 (i.e., the outside of the vehicle).

The module terminals 615 of the electrical modules 532 are connected to the bus bar module 533. The switch modules 532A and the capacitor modules 532B are different in number of the module terminals 615 from each other. Specifically, each of the switch modules 532A is equipped with the four module terminals 615, while each of the capacitor modules 532B is equipped with the two module terminals 615.

The bus bar module 533, as clearly illustrated in FIG. 68, includes the annular ring 631, the three external terminals 632, and the winding connecting terminals 633. The external terminals 632 extend from the annular ring 631 and achieve connections with external devices, such as a power supply and an ECU (Electronic Control Unit). The winding connecting terminals 633 are connected to ends of the phase windings of the stator winding 521. The bus bar module 533 will also be referred to as a terminal module.

The annular ring 631 is located radially inside the outer peripheral wall WA1 of the inverter housing 531 and adjacent one of axially opposed ends of each of the electrical modules 532. The annular ring 631 includes an annular body made from an insulating material, such as resin, and a plurality of bus bars embedded in the annular body. The bus bars connect with the module terminals 615 of the electrical modules 532, the external terminals 632, and the phase windings of the stator winding 521, which will be also described later in detail.

The external terminals 632 include the high-potential power terminal 632A connecting with a power unit, the low-potential power terminal 632B connecting with the power unit, and the single signal terminal 632C connecting with the external ECU. The external terminals 632 (i.e., 632A to 632C) are arranged adjacent each other in the circumferential direction of the annular ring 631 and extend in the axial direction of the annular ring 631 radially inside the annular ring 631. The bus bar module 533 is, as illustrated in FIG. 51, mounted in the inverter housing 531 together with the electrical modules 532. Each of the external terminals 632 has an end protruding outside the end plate 547. Specifically, the end plate 547 of the bossed member 543, as illustrated in FIGS. 56 and 57, has the hole 547a formed therein. The cylindrical grommet 635 is fit in the hole 547a. The external terminals 632 pass through the grommet 635. The grommet 635 also functions as a hermetically sealing connector.

Figure 70:
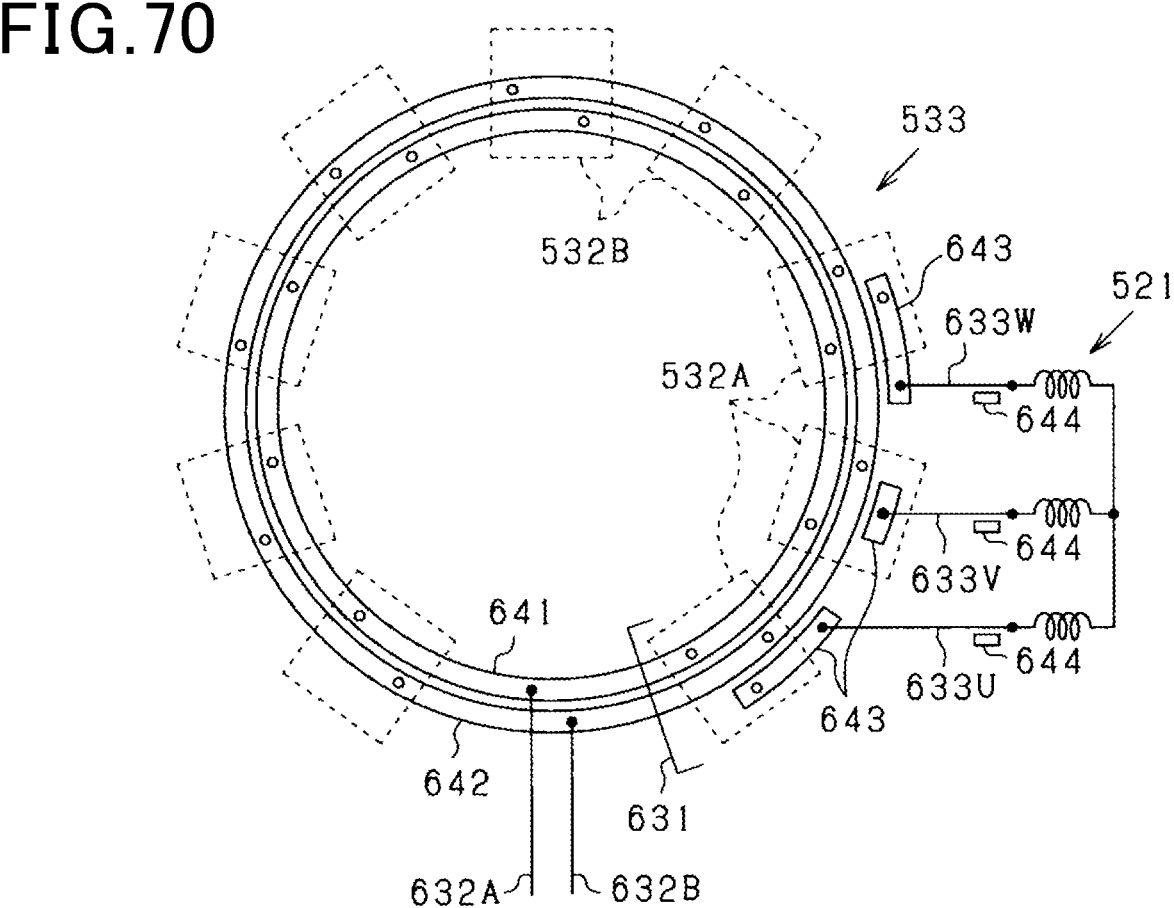
FIG. 70 is a view which illustrates electrical connections between electrical modules and a bus bar module.

The winding connecting terminals 633 connect with ends of the phase windings of the stator winding 521 and extend radially outward from the annular ring 631. Specifically, the winding connecting terminals 633 include the winding connecting terminal 633U connecting with the end of the U-phase winding of the stator winding 521, the winding connecting terminal 633V connecting with the end of the V-phase winding of the stator winding 521, and the winding connecting terminal 633W connecting with the end of the W-phase winding of the stator winding 521. Each of the winding connecting terminals 633 is, as illustrated in FIG. 70, the current sensor 634 which measure an electrical current flowing through a corresponding one of the U-phase winding, the V-phase winding, and the W-phase winding.

The current sensor 634 may be arranged outside the electrical module 532 around the winding connecting terminal 633 or installed inside the electrical module 532.

Figure 69:
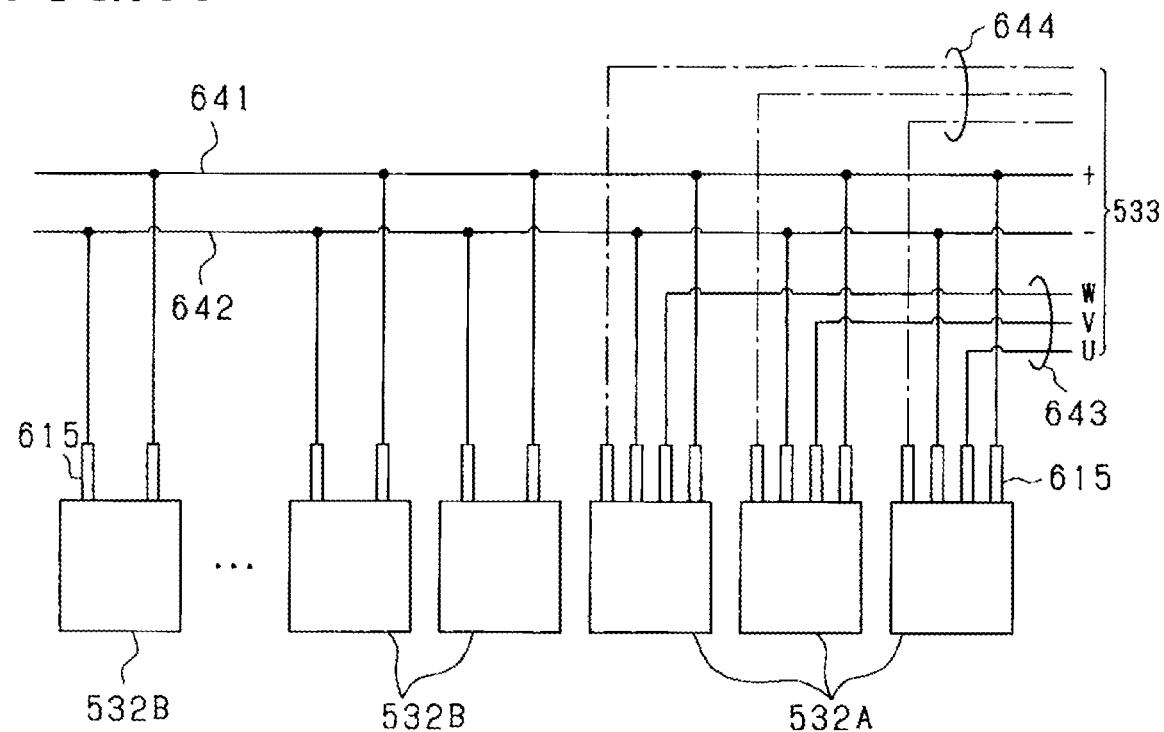
FIG. 69 is a circuit diagram which illustrates a relation in electrical connection between electrical modules and a bus bar module.

Connections between the electrical modules 532 and the bus bar module 533 will be described below in detail with reference to FIGS. 69 and 70. FIG. 69 is a development view of the electrical modules 532 which schematically illustrates electrical connections of the electrical modules 532 with the bus bar module 533. FIG. 70 is a view which schematically illustrate electrical connections of the electrical modules 532 arranged in an annular shape with the bus bar module 533. In FIG. 69, power supply lines are expressed by solid lines, while signal transmission lines are expressed by chain lines. FIG. 70 shows only the power supply lines.

The bus bar module 533 includes the first bus bar 641, the second bus bar 642, and the third bus bars 643 as power supply bus bars. The first bus bar 641 is connected to the high-potential power terminal 632A. The second bus bar 642 is connected to the low-potential power terminal 632B. The three third bus bars 643 are connected to the U-phase winding connecting terminals 633U, the V-phase winding connecting terminals 633V, and the W-phase winding connecting terminals 633W.

The winding connecting terminals 633 and the third bus bars 643 usually generate heat due to the operation of the rotating electrical machine 10. A terminal block, not shown, may, therefore, be disposed between the winding connecting terminals 633 and the third bus bars 643 in contact with the inverter housing 531 equipped with the coolant path 545. Alternatively, the winding connecting terminals 633 and/or the third bus bars 643 may be bent in a crank form to achieve physical contact with the inverter housing 531 equipped with the coolant path 545.

The above structure serves to release heat generated by the winding connecting terminals 633 or the third bus bars 643 to cooling water flowing in the coolant path 545.

FIG. 70 depicts the first bus bar 641 and the second bus bar 642 as completely circular bus bars, but however, may alternatively be of a C-shape. Each of the winding connecting terminals 633U, 633V, and 633W may alternatively be connected directly to a corresponding one of the switch modules 532A (i.e., the module terminals 615) without use of the bus bar module 533.

Each of the switch modules 532A is equipped with the four module terminals 615 including a positive terminal, a negative terminal, a winding terminal, and a signal terminal. The positive terminal is connected to the first bus bar 641. The negative terminal is connected to the second bus bar 642. The winding terminal is connected to one of the third bus bars 643.

The bus bar module 533 is also equipped with the fourth bus bars 644 as signal transmission bus bars. The signal terminal of each of the switch modules 532A is connected to one of the fourth bus bars 644. The fourth bus bar 644 are connected to the signal terminal 632C.

In this embodiment, each of the switch modules 532A receives a control signal transmitted from an external ECU through the signal terminal 632C. Specifically, the switches 601 and 602 in each of the switch modules 532A are turned on or off in response to the control signal inputted through the signal terminal 632C. Each of the switch modules 532A is, therefore, connected to the signal terminal 632C without passing through a control device installed in the rotating electrical machine 500. The control signals may alternatively be, as illustrated in FIG. 71, produced by the control device of the rotating electrical machine 500 and then inputted to the switch modules 532A.

Figure 71:
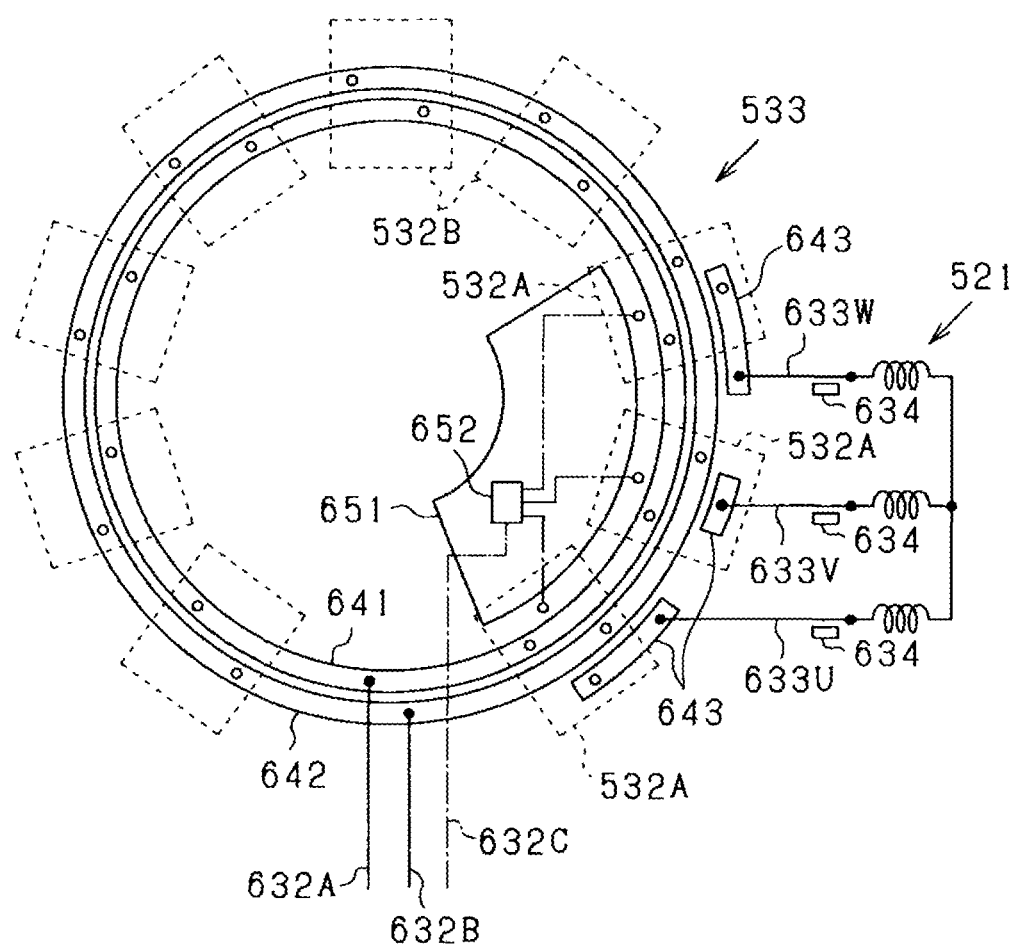
FIG. 71 is a view which illustrates electrical connections between electrical modules and a bus bar module.

The structure of FIG. 71 has the control board 651 on which the control device 652 is mounted. The control device 652 is connected to the switch modules 532A. The signal terminal 632C is connected to the control device 652. For instance, an external ECU serving as a host control device outputs a command signal associated with the motor mode or the generation mode to the control device 652. The control device 652 then controls on-off operations of the switches 601 and 602 of each of the switch modules 532A.

In the inverter unit 530, the control board 651 may be arranged closer to the outside of the vehicle (i.e., the bottom of the rotor carrier 511) than the bus bar module 533 is. The control board 651 may alternatively be disposed between the electrical modules 532 and the end plate 547 of the bossed member 543. The control board 651 may be located to overlap at least a portion of each of the electrical modules 532 in the axial direction.

Each of the capacitor modules 532B is equipped with two module terminals 615 serving as a positive terminal and a negative terminal. The positive terminal is connected to the first bus bar 641. The negative terminal is connected to the second bus bar 642.

Referring back to FIGS. 49 and 50, the inverter housing 531 has disposed therein the bulging portion 573 which is equipped with the inlet path 571 and the outlet path 572 for cooling water. The inlet path 571 and the outlet path 572 are aligned with the electrical modules 532 arranged adjacent each other in the circumferential direction of the inverter housing 531. The external terminals 632 are arranged adjacent the bulging portion 573 in the radial direction of the inverter housing 531. In other words, the bulging portion 573 and the external terminals 632 are located at the same angular position in the circumferential direction of the inverter housing 531. In this embodiment, the external terminals 632 are disposed radially inside the bulging portion 573. As the inverter housing 531 is viewed from inside the vehicle, the inlet/outlet port 574 and the external terminals 632 are, as clearly illustrated in FIG. 48, aligned with each other in the radial direction of the end plate 547 of the bossed member 543.

The bulging portion 573 and the external terminals 632 are, as clearly illustrated in FIG. 66, arranged adjacent the electrical modules 532 in the circumferential direction, thereby enabling the inverter unit 530 to be reduced in size, which also enables the rotating electrical machine 500 to be reduced in size.

Referring back to the structure of the tire wheel assembly 400 in FIGS. 45 and 47, the cooling pipe H2 is joined to the inlet/outlet port 574. The electrical cable H1 is joined to the external terminals 632. The electrical cable H1 and the cooling pipe H2 are arranged inside the storage duct 440.

In the inverter housing 531, the three switch modules 532A are arranged adjacent each other next to the external terminals 632 in the circumferential direction. The six capacitor modules 532B are arranged next to the array of the switch modules 532A in the circumferential direction. Such layout may be modified in the following way. For instance, the array of the three switch modules 532A may be arranged at a location farthest away from the external terminals 632, that is, diametrically opposed to the external terminals 632 across the rotating shaft 501. Alternatively, the switch modules 532A may be arranged at an increased interval away from each other in the circumferential direction, so that the capacitor modules 532B may be disposed between the switch modules 532A.

The layout of the switch modules 532A located farthest away from the external terminals 632, that is, diametrically opposed to the external terminals 632 across the rotating shaft 501 minimizes a risk of failure in operation of the switch modules 532A caused by mutual inductance between the external terminals 632 and the switch modules 532A.

Next, the structure of the resolver 660 working as an angular position sensor will be described below.

The inverter housing 531, as illustrated in FIGS. 49 to 51, has disposed therein the resolver 660 which measures the electrical angle θ of the rotating electrical machine 500. The resolver 660 functions as an electromagnetic induction sensor and includes the resolver rotor 661 secured to the rotating shaft 501 and the resolver stator 662 which radially faces an outer circumference of the resolver rotor 661. The resolver rotor 661 is made of a ring-shaped disc fit on the rotating shaft 501 coaxially with the rotating shaft 501. The resolver stator 662 includes the circular stator core 663 and the stator coil 664 wound around teeth of the stator core 663. The stator coil 664 includes a single-phase exciting coil and two-phase output coils.

The exciting coil of the stator coil 664 is energized by a sine wave excitation signal to generate magnetic flux which interlinks with the output coils. This causes a positional relation of the exciting coil with the two output coils to be changed cyclically as a function of an angular position of the resolver rotor 661 (i.e., a rotation angle of the rotating shaft 501), so that the number of magnetic fluxes interlining with the output coils is changed cyclically. In this embodiment, the exciting coil and the output coils are arranged so that voltages, as developed at the output coils, are out of phase by π/2. Output voltage generated by the output coils will, therefore, be waves derived by modulating the excitation signal with modulating waves sin θ and cos θ. Specifically, if the excitation signal is expressed by sinQt, the modulated waves will be sin θ×sinQt and cos θ×sinQt.

The resolver 660 is equipped with a resolver digital converter. The resolver digital converter works to perform wave detection using the modulated wave and the excitation signal to calculate the electrical angle θ. For instance, the resolver 660 is connected to the signal terminal 632C. An output of the resolver digital converter is inputted to an external device through the signal terminal 632C. In a case where a control device is installed in the rotating electrical machine 500, the output of the resolver digital converter is inputted to the control device.

The structure of the resolver 660 installed in the inverter housing 531 will be described below.

The bossed member 543 of the inverter housing 531, as illustrated in FIGS. 49 and 51, has formed thereon the hollow cylindrical boss 548. The boss 548 has the protrusion 548a formed on an inner periphery thereof in the shape of an inner shoulder. The protrusion 548a projects in a direction perpendicular to the axial direction of the inverter housing 531. The resolver stator 662 is secured using screws in contact with the protrusion 548a. In the boss 548, the bearing 650 is arranged on an opposite side of the protrusion 548a to the resolver 660.

Within the boss 548, the housing cover 666 is arranged on an opposite side of the resolver 660 to the protrusion 548a in the axial direction. The housing cover 666 is made of an annular ring shaped disc and closes an inner chamber of the boss 548 in which the resolver 660 is disposed. The housing cover 666 is made from an electrically conductive material, such as a carbon fiber reinforced plastic (CFRP). The housing cover 666 has formed in the center thereof the center hole 666a through which the rotating shaft 501 passes. The center hole 666a, as clearly illustrated in FIG. 49, has disposed therein the sealing member 667 which hermetically seal an air gap between the center hole 666*a* and the outer periphery of the rotating shaft 501. The sealing member 667 hermetically seals the inner chamber of the boss 548 in which the resolver 660 is disposed. The sealing member 667 may be designed as a slidable seal made from resin.

The inner chamber in which the resolver 660 is disposed is surrounded or defined by the annular boss 548 of the bossed member 543 and which has axially-opposed ends closed by the bearing 560 and the housing cover 666. The outer circumference of the resolver 660 is, therefore, surrounded by the conductive material, thereby minimizing adverse effects of electromagnetic noise on the resolver 660.

The inverter housing 531 is, as described above in FIG. 57, designed to have a double-walled structure equipped with the outer peripheral wall WA1 and the inner peripheral wall WA2. The stator 520 is arranged radially outside the outer peripheral wall WA1. The electrical modules 532 are arranged between the outer peripheral wall WA1 and the inner peripheral wall WA2. The resolver 660 is disposed radially inside the inner peripheral wall WA2. The inverter housing 531 is made from conductive material. The stator 520 and the resolver 660 are, therefore, isolated from each other through a conductive wall (i.e., a conductive double wall), that is, the outer peripheral wall WA1 and the inner peripheral wall WA2, thereby minimizing a risk of magnetic interference between the stator 520 (i.e., the magnetic circuit) and the resolver 660.

The rotor cover 670 which is arranged in the open end of the rotor carrier 511 will be described below in detail.

The rotor carrier 511, as illustrated in FIGS. 49 and 50, has the end open in the axial direction. The rotor cover 670 which is made of a substantially ring-shaped disc is disposed on the open end, i.e., partially covers the open end. The rotor cover 670 is secured to the rotor carrier 511 using, for example, welding techniques or vises (i.e., screws). The rotor cover 670 is preferably shaped to have a portion smaller in size (i.e. diameter) than the inner periphery of the rotor carrier 511 to hold the magnet unit 512 from moving in the axial direction. The rotor cover 670 has an outer diameter identical with that of the rotor carrier 511, but has an inner diameter slightly greater than an outer diameter of the inverter housing 531. The outer diameter of the inverter housing 531 is equal to the inner diameter of the stator 520.

The stator 520 is, as described above, attached to the outer circumference of the inverter housing 531. Specifically, the stator 520 and the inverter housing 531 joined together. The inverter housing 531 has a portion protruding in the axial direction from the joint of the stator 520 and the inverter housing 531. Such a protrusion of the inverter housing 531 is, as clearly illustrated in FIG. 49, surrounded by the rotor cover 670. The sealing member 671 is disposed between the inner circumference of the rotor cover 670 and the outer periphery of the inverter housing 531 to hermetically seal an air gap therebetween. The sealing member 671, therefore, hermetically closes an inner chamber of the rotor cover 670 in which the magnet unit 512 and the stator 520 are disposed. The sealing member 671 may be made of a slidable seal made from resin.

The above embodiment offers the following beneficial advantages.

The rotating electrical machine 500 has the outer peripheral wall WA1 of the inverter housing 531 arranged radially inside the magnetic circuit made up of the magnet unit 512 and the stator winding 521 and also has the coolant path 545 formed in the outer peripheral wall WA1. The rotating electrical machine 500 also has the plurality of electrical modules 532 arranged along the inner circumference of the outer peripheral wall WA1. This enables the magnetic circuit, the coolant path 545, and the power converter to be arranged in a stacked shape in the radial direction of the rotating electrical machine 500, thereby permitting an axial dimension of the rotating electrical machine 500 to be reduced and also achieving effective layout of parts in the rotating electrical machine 500. The rotating electrical machine 500 also ensures the stability in cooling the electrical modules 532 composing the power converter, thereby enabling the rotating electrical machine 500 to operate with high efficiency and to be reduced in size thereof.

The electrical modules 532 (i.e., the switch modules 532A and the capacitor modules 532B) equipped with heat generating devices, such as semiconductor switches or capacitors are placed in direct contact with the inner peripheral surface of the outer peripheral wall WA1, thereby causing heat, as generated by the electrical modules 532, to be transferred to the outer peripheral wall WA1, so that the electrical modules 532 are well cooled.

In each of the switch modules 532A, the coolers 623 are disposed outside the switches 601 and 602. In other words, the switches 601 and 602 are arranged between the coolers 623. The capacitor 604 is placed on an opposite side of at least one of the coolers 623 to the switches 601 and 602, thereby enhancing the cooling of the capacitor 604 as well as the switches 601 and 602.

In each of the switch modules 532A, the coolers 623 are, as described above, placed on both sides of the switches 601 and 602. The driver circuit 603 is arranged on an opposite side of at least one of the coolers 623 to the switches 601 and 602, while the capacitor 604 is arranged on the other opposite side of the cooler 623, thereby enhancing the cooling of the driver circuit 603 and the capacitor 604 as well as the switches 601 and 602.

For instance, each of the switch modules 532A is designed to have the coolant path 545 which delivers cooling water into the modules to cool the semiconductor switches. Specifically, each module 532A is cooled by the outer peripheral wall WA1 through which the cooling water passes and also by the cooling water flowing in the module 532A. This enhances the cooling of the switch modules 532A.

The rotating electrical machine 500 is equipped with a cooling system in which cooling water is delivered into the coolant path 545 from the external circulation path 575. The switch modules 532A are placed on an upstream side of the coolant path 545 close to the inlet path 571, while the capacitor modules 532B are arranged downstream of the switch modules 532A. Generally, the cooling water flowing through the coolant path 545 has a lower temperature on the upstream side than the downstream side. The switch modules 532A are, therefore, cooled better than the capacitor modules 532B.

The electrical modules 532 are, as described above, arranged at shorter intervals (i.e., the first intervals INT1) or a longer interval (i.e., the second interval INT2) away from each other in the circumferential direction of the rotating electrical machine 500. In other words, the intervals between the electrical modules 532 include a single longer interval (i.e., the second interval INT2). The bulging portion 573 which is equipped with the inlet path 571 and the outlet path 572 lies in the longer interval. These arrangements enable the inlet path 571 and the outlet path 572 of the coolant path 545 to be arranged radially inside the outer peripheral wall WA1. Usually, it is required to increase the volume or flow rate of cooling water in order to enhance the cooling efficiency. Such a requirement may be met by increasing an area of an opening of each of the inlet path 571 and the outlet path 572. This is achieved in this embodiment by placing the bulging portion 573 in the longer interval (i.e., the second interval INT2) between the electrical modules 532, which enables the inlet path 571 and the outlet path 572 to be shaped to have required sizes.

The external terminals 632 of the bus bar module 533 are arranged adjacent the bulging portion 573 in the radial direction of the rotor 510 radially inside the outer peripheral wall WA1. In other words, the external terminals 632 is placed together with the bulging portion 573 within the larger interval (i.e., the second interval INT2) between the electrical modules 532 arranged adjacent each other in the circumferential direction of the rotor 510. This achieves a suitable layout of the external terminals 632 without physical interference with the electrical modules 532.

The outer-rotor type rotating electrical machine 500 is, as described above, engineered to have the stator 520 attached to the radially outer circumference of the outer peripheral wall WA1 and also have the plurality of electrical modules 532 arranged radially inside the outer peripheral wall WA1. This layout causes heat generated by the stator 520 to be transferred to the outer peripheral wall WA1 from radially outside and also causes heat generated by the electrical modules 532 to be transferred to the outer peripheral wall WA1 from radially inside. The stator 520 and the electrical modules 532 are simultaneously cooled by cooling water flowing through the coolant path 545, thereby facilitating dissipation of thermal energy generated by heat-producing parts installed in the rotating electrical machine 500.

The electrical modules 532 arranged radially inside the outer peripheral wall WA1 and the stator winding 521 arranged radially outside the outer peripheral wall WA1 are electrically connected together using the winding connecting terminals 633 of the bus bar module 533. The winding connecting terminals 633 are disposed away from the coolant path 545 in the axial direction of the rotating electrical machine 500. This facilitates electrical connections of the electrical modules 532 to the stator winding 521 even in a structure in which the coolant path 545 extends in an annular form in the outer peripheral wall WA1, in other words, the outside and the inside of the outer peripheral wall WA1 are isolated from each other by the coolant path 545.

The rotating electrical machine 500 in this embodiment is designed to have a decreased size of teeth or no teeth (i.e., iron cores) between the conductors 523 of the stator 520 arranged adjacent each other in the circumferential direction to reduce a limitation on a torque output which results from magnetic saturation occurring between the conductors 532. The rotating electrical machine 500 also has the conductors 523 of a thin flat shape to enhance a degree of torque output. This structure enables a region radially inside the magnetic circuit to be increased in size by reducing the thickness of the stator 520 without altering the outer diameter of the rotating electrical machine 500. The region is used to have the outer peripheral wall WA1 equipped with the coolant path 545 disposed therein and enables the electrical modules 532 to be placed radially inside the outer peripheral wall WA1.

The rotating electrical machine 500 is equipped with the magnet unit 512 in which magnet-produced magnetic fluxes are concentrated on the d-axis to enhance a degree of output torque. Such a structure of the magnet unit 512 enables a radial thickness thereof to be reduced and the region radially inside the magnetic circuit to be, as described above, increased in volume thereof. The region is used to have the outer peripheral wall WA1 with the coolant path 545 disposed therein and also have the plurality of electrical modules 532 to be placed radially inside the outer peripheral wall WA1.

The above region also be used to have the bearing 560 and the resolver 660 arranged therein in addition to the magnetic circuit, the outer peripheral wall WA1, and the electrical modules 532.

The tire wheel assembly 400 using the rotating electrical machine 500 as an in-wheel motor is attached to the vehicle body using the base plate 405 secured to the inverter housing 531 and a mount mechanism, such as suspensions. The rotating electrical machine 500 is designed to have a reduced size, thus occupying a decreased size of space in the vehicle body. This enables the volume of space required for installation of a power unit, such as a storage battery in the vehicle or the volume of a passenger compartment of the vehicle to be increased.

Modified forms of the in-wheel motor will be described below.

First Modification of In-Wheel Motor

The rotating electrical machine 500 has the electrical modules 532 and the bus bar module 533 arranged radially inside the outer peripheral wall WA1 of the inverter unit 530 and also has the stator 520 arranged radially outside the outer peripheral wall WA1. Locations of the bus bar modules 533 relative to the electrical modules 532 are optional. The phase windings of the stator winding 521 may be connected to the bus bar module 533 radially across the outer peripheral wall WA1 using winding connecting wires (e.g., the winding connecting terminals 633) whose locations are optional.

For example, the bus bar module 533 or the winding connecting wires may be arranged in the following layouts.

($\alpha$1) The bus bar module 533 may be located closer to the outer side of the vehicle, that is, the bottom of the rotor carrier 511 than the electrical modules 532 are in the axial direction of the rotating electrical machine 500.

($\alpha$2) The bus bar module 533 may be located closer to the inner side of the vehicle, that is, farther away from the rotor carrier 511 than the electrical modules 532 is in the axial direction.

The winding connecting wires may be placed on the following location.

($\beta$1) The winding connecting wires may be arranged close to the outer side of the vehicle, that is, the bottom of the rotor carrier 511 in the axial direction of the rotating electrical machine 500.

($\beta$2) The winding connecting wires may be located closer to the inner side of the vehicle, that is, far away from the rotor carrier 511.

Four types of locations of the electrical modules 532, the bus bar module 533, and the winding connecting wires will be described below with reference to FIGS. 72($a$) to 72($d$). FIGS. 72($a$) to 72($d$) are longitudinal sectional views which partially illustrate modified forms of the rotating electrical machine 500. The same reference numbers as employed in the above embodiments refer to the same parts, and explanation thereof in detail will be omitted here. The winding connecting wires 637 are electrical conductors connecting of the phase windings of the stator winding 521 with the bus bar module 533 and correspond to the above described winding connecting terminals 633.

In the structure illustrated in FIG. 72($a$), a locational relation of the bus bar module 533 to the electrical modules 532 corresponds to the above described layout ($\alpha$1). The winding connecting wires 637 are arranged in the above layout ($\beta$1). Specifically, connections of the electrical modules 532 to the bus bar module 533 and connections of the stator winding 521 to the bus bar module 533 are made on the outer side of the vehicle (i.e., close to the bottom of the rotor carrier 511). This layout is identical with that in FIG. 49.

The structure in 72(a) enables the coolant path 545 to be formed in the outer peripheral wall WA1 without any physical interference with the winding connecting wires 637 and also facilitates the layout of the winding connecting wires 637 connecting the stator winding 521 and the bus bar module 533 together.

Figure 72A:
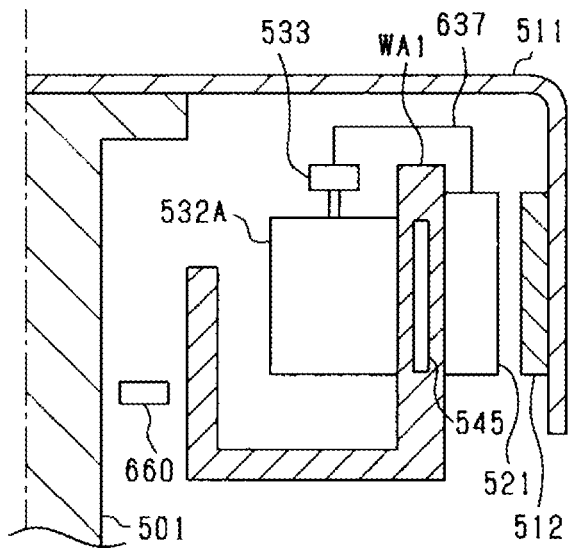
FIGS. 72(a), 72(b), 72(c), and 72(d) are structural views of the first modified form of an in-wheel motor.
Figure 72B:
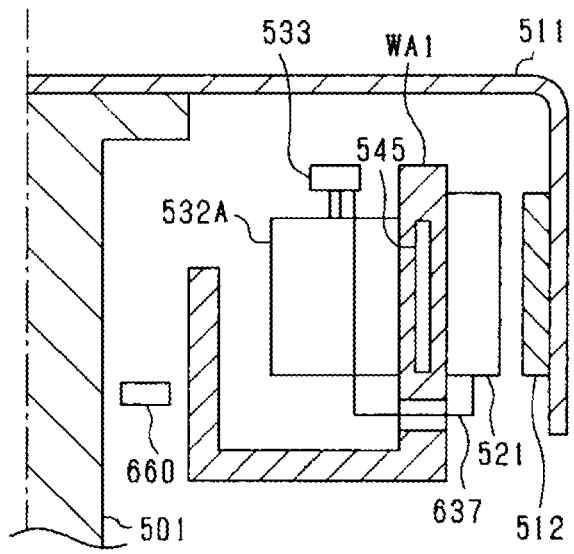

In the structure illustrated in FIG. 72(b), a locational relation of the bus bar module 533 to the electrical modules 532 corresponds to the above described layout (α1). The winding connecting wires 637 are arranged in the above layout (β2). Specifically, connections of the electrical modules 532 to the bus bar module 533 are made on the outer side of the vehicle (i.e., close to the bottom of the rotor carrier 511, while the stator winding 521 and the bus bar module 533 are connected close to the inner side of the vehicle (i.e., far away from the rotor carrier 511).

The structure in FIG. 72(b) enables the coolant path 545 to be formed in the outer peripheral wall WA1 without any physical interference with the winding connecting wires 637.

Figure 72C:
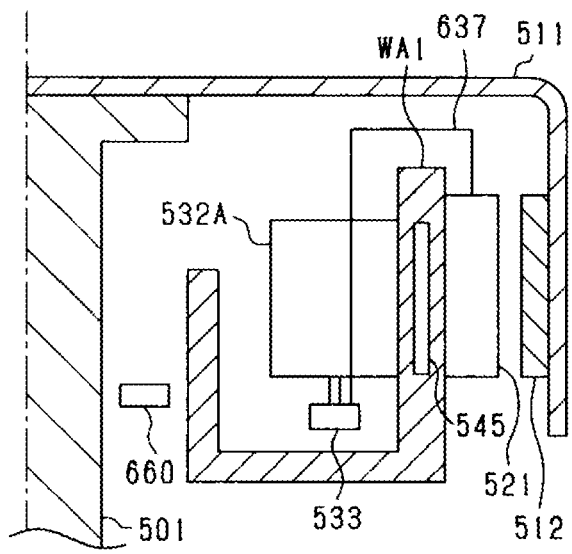

In the structure illustrated in FIG. 72(c), a locational relation of the bus bar module 533 to the electrical modules 532 corresponds to the above described layout (α2). The winding connecting wires 637 are arranged in the above layout (β1). Specifically, connections of the electrical modules 532 to the bus bar module 533 are made on the inner side of the vehicle (i.e., far away from the bottom of the rotor carrier 511, while the stator winding 521 and the bus bar module 533 are connected close to the outer side of the vehicle (i.e., close to the rotor carrier 511).

Figure 72D:
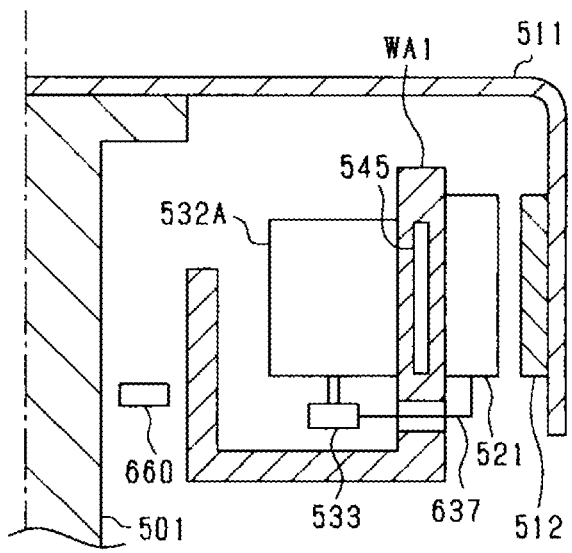

In the structure illustrated in FIG. 72(d), a locational relation of the bus bar module 533 to the electrical modules 532 corresponds to the above described layout (α2). The winding connecting wires 637 are arranged in the above layout (β2). Specifically, connections of the electrical modules 532 to the bus bar module 533 and connections of the stator winding 521 to the bus bar module 533 are made on the inner side of the vehicle (i.e., far away from the bottom of the rotor carrier 511).

The structure in FIG. 72(c) or 72(d) in which the bus bar module 533 is arranged farther away from the rotor carrier 511 than the electrical modules 532, thereby facilitating layout of electrical wires leading to, for example, an electrical device, such as a fan motor, if installed in the rotor carrier 511. The structure also enables the bus bar module 533 to be placed close to the resolver 660 mounted closer to the inner side of the vehicle than the bearings 563 are, thereby facilitating layout of electrical wires leading to the resolver 660.

Second Modification of In-Wheel Motor

Modified forms of a mount structure of the resolver rotor 661 will be described below. Specifically, the rotating shaft 501, the rotor carrier 511, and the inner race 561 of the bearing 560 are rotated together in the form of a rotating unit. The structure in which the resolver rotor 611 is mounted to the rotating unit will be described below.

Figure 73A:
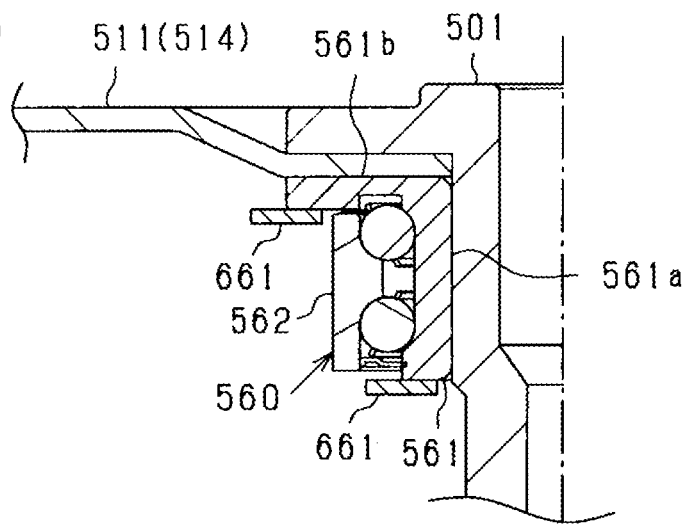
FIGS. 73(a), 73(b), and 73(c) are structural views of the second modified form of an in-wheel motor.
Figure 73B:
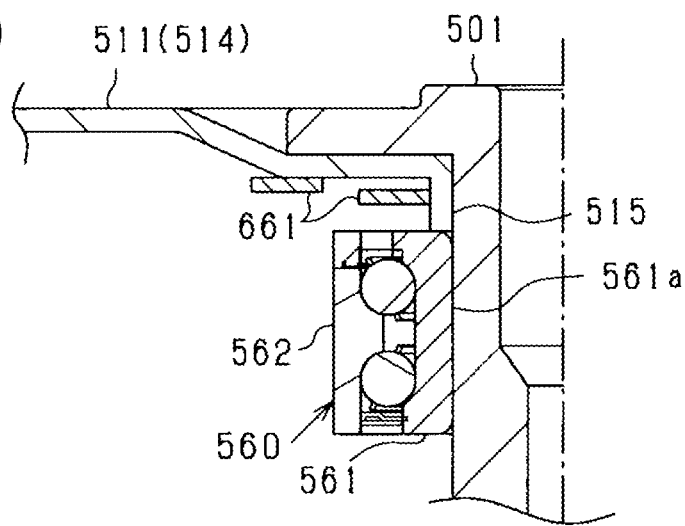
Figure 73C:
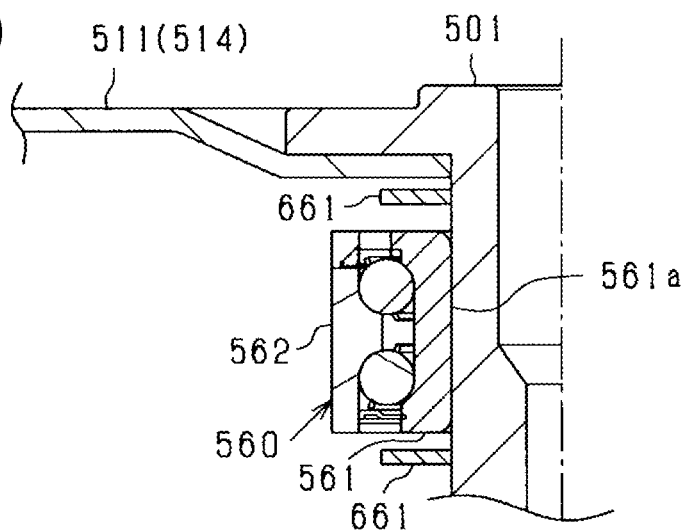

FIGS. 73(a) to 73(c) are structural views which illustrate modifications of the mount structure for attaching the resolver rotor 661 to the rotating unit. In any of the modifications, the resolver 660 is arranged within a hermetically sealed space which is surrounded by the rotor carrier 511 and the inverter housing 531 and protected from splashing of water or mud. FIG. 73(a) shows the same structure of the bearing 560 as that in FIG. 49. The structures in FIGS. 73(b) and 73(c) have the bearing 560 which is different in structure from that illustrated in FIG. 49 and arranged away from the end plate 514 of the rotor carrier 511. FIGS. 73(a) to 73(c) each demonstrate two available locations where the resolver rotor 661 is mounted. Although not clearly illustrated, the boss 548 of the bossed member 543 may be extended to or near the outer circumference of the resolver rotor 661 to have the resolver stator 662 secured to the boss 548.

In the structure illustrated in FIG. 73(a) the resolver rotor 661 is attached to the inner race 561 of the bearing 560. Specifically, the resolver rotor 661 is secured to a surface of the flange 561b of the inner race 561 which faces in the axial direction or an end surface of the cylinder 561a of the inner race 561 which faces in the axial direction.

In the structure illustrated in FIG. 73(b), the resolver rotor 661 is attached to the rotor carrier 511. Specifically, the resolver rotor 661 is secured to an inner peripheral surface of the end plate 514 of the rotor carrier 511. The rotor carrier 511 has the hollow cylinder 515 extending from an inner circumferential edge of the end plate 514 along the rotating shaft 501. The resolver rotor 661 may alternatively be secured to an outer periphery of the cylinder 515 of the rotor carrier 511. In the latter case, the resolver rotor 661 is disposed between the end plate 514 of the rotor carrier 511 and the bearing 560.

In the structure illustrated in FIG. 73(c), the resolver rotor 661 is attached to the rotating shaft 501. Specifically, the resolver rotor 661 is mounted on the rotating shaft 501 between the end plate 514 of the rotor carrier 511 and the bearing 560 or on the opposite side of the bearing 560 to the rotor carrier 511.

Third Modification of In-Wheel Motor

Modifications of the structures of the inverter housing 531 and the rotor cover 670 will be described below with reference to 74(a) and 74(b) which are longitudinal sectional view schematically illustrating the structure of the rotating electrical machine 500. The same reference number as employed in the above embodiments refer to the same parts. The structure in FIG. 74(a) substantially corresponds to that illustrated in FIG. 49. The structure in FIG. 74(b) substantially corresponds to a partially modified form of that in 74(a).

Figure 74A:
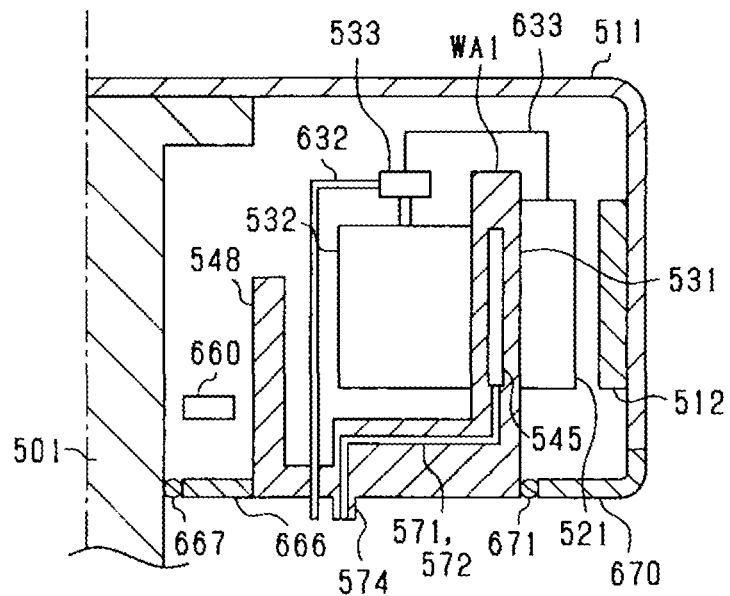
FIGS. 74(a) and 74(b) are structural views of the third modified form of an in-wheel motor.

In the structure illustrated in FIG. 74(a), the rotor cover 670 secured to an open end of the rotor carrier 511. The rotor cover 670 surrounds the outer peripheral wall WA1 of the inverter housing 531. In other words, the rotor cover 670 has an inner circumferential end surface facing the outer peripheral surface of the outer peripheral wall WA1. The sealing member 671 is disposed between the inner circumferential end surface of the rotor cover 670 and the outer peripheral surface of the outer peripheral wall WA1. The housing cover 666 is disposed inside the boss 548 of the inverter housing 531. The sealing member 667 is disposed between the housing cover 666 and the rotating shaft 501. The external terminals 632 of the bus bar module 533 extend through the wall of the inverter housing 531 downward, as viewed in FIG. 74(a).

The inverter housing 531 has formed therein the inlet path 571 and the outlet path 572 which communicate with the coolant path 545. The inverter housing 531 has also formed thereon the inlet/outlet port 574 in which open ends of the inlet path 571 and the outlet path 572 lie.

Figure 74B:
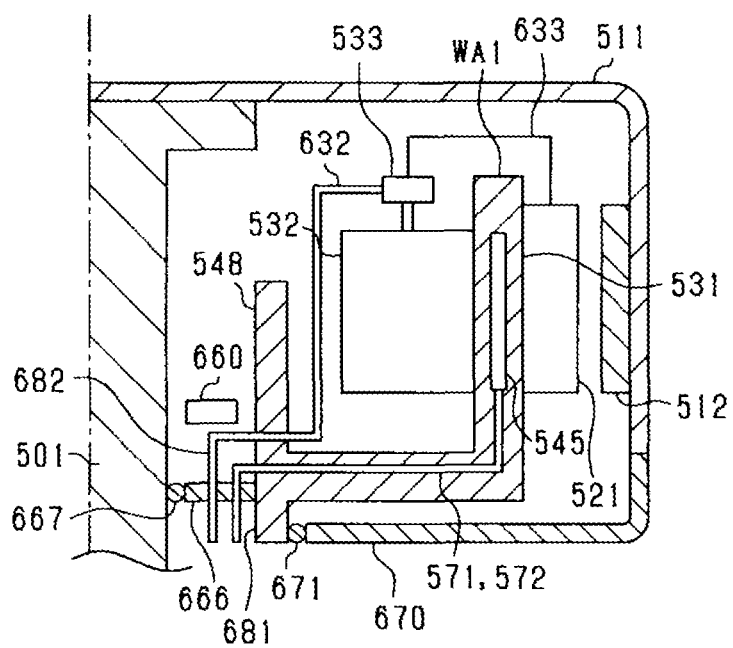

In the structure illustrated in FIG. 74(b), the inverter housing 531 (i.e., the bossed member 543) has the annular protrusion 681 formed thereon in the shape of a flange. The annular protrusion 681 extends substantially parallel to the rotating shaft 501 inwardly in the inverter housing 531 (i.e., in the vehicle). The rotor cover 670 surrounds the protrusion 681 of the inverter housing 531. In other words, the rotor cover 670 has an inner end surface facing the outer periphery of the protrusion 681. The sealing member 671 is interposed between the inner end surface of the rotor cover 670 and the outer periphery of the protrusion 681. The external terminals 632 of the bus bar module 533 extend through the wall of the boss 548 of the inverter housing 531 into the inner space of the boss 548 and also pass through the wall of the housing cover 666 toward the inside of the vehicle (downward, as viewed in FIG. 74(b)).

The inverter housing 531 has formed therein the inlet path 571 and the outlet path 572 which communicate with the coolant path 545. The inlet path 571 and the outlet path 572 extend to the inner periphery of the boss 548 and then connect with the connecting pipes 682 which extend inwardly through the wall of the housing cover 666 (i.e. downward as viewed in FIG. 74(b)). Portion of the pipes 682 extending inside the housing cover 666 (i.e., toward the inside of the vehicle) serve as the inlet/outlet port 574.

The structure in FIG. 74(a) or 74(b) hermetically seals the inner space of the rotor carrier 511 and the rotor cover 670 and achieves smooth rotation of the rotor carrier 511 and the rotor cover 670 relative to the inverter housing 531.

Particularly, the structure in FIG. 74(b) is designed to have the rotor cover 670 which is smaller in inner diameter than that in FIG. 74(a). The inverter housing 531 and the rotor cover 670 are, therefore, laid to overlap each other in the axial direction of the rotating shaft 501 inside the electrical modules 532 in the vehicle, thereby minimizing a risk of adverse effects of electromagnetic noise in the electrical modules 532. The decreased inner diameter of the rotor cover 670 results in a decrease in diameter of a sliding portion of the sealing member 671, thereby reducing mechanical loss of rotation of the sliding portion.

Fourth Modification of In-Wheel Motor

A modification of the structure of the stator winding 521 will be described below with reference to FIG. 75.

Figure 75:
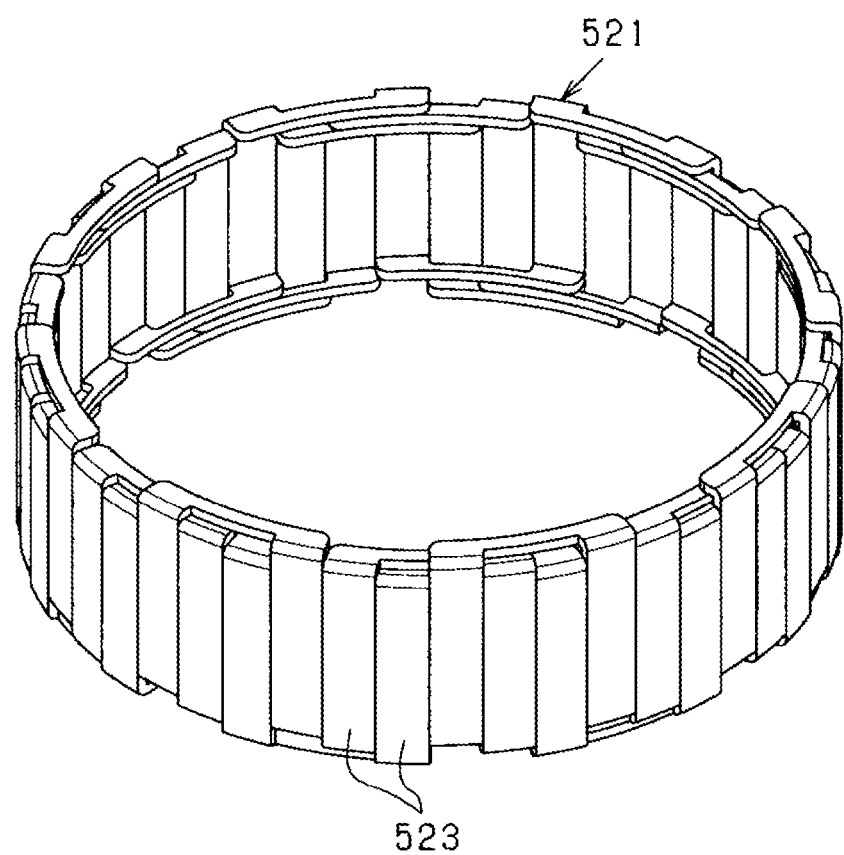
FIG. 75 is a structural view of the fourth modified form of an in-wheel motor.

The stator winding 521 is, as clearly illustrated in FIG. 75, made of conductors which are shaped to have a rectangular transverse section and wave-wound with a long side thereof extending in the circumferential direction of the stator winding 521. Each of the three-phase conductors 532 of the stator winding 521 has coil ends and coil sides. The coil sides are arranged at a given interval away from each other and connected together by the coil ends. The coil sides of the conductors 523 which are arranged adjacent each other in the circumferential direction of the stator winding 521 have side surfaces which face in the circumferential direction and placed in contact with each other or at a small interval away from each other.

The coil ends of each of the phase windings of the stator winding 521 are bent in the radial direction. Specifically, the stator winding 521 (i.e., the conductors 523) is bent inwardly in the radial direction at locations which are different among the U-, V-, and W-phase windings and away from each other in the axial direction, thereby avoiding physical interference with each other. In the illustrated structure, the coil ends of the conductors 523 of the U-, V-, and W-phase windings are, as described above, bent at right angles inwardly in the radial direction of the stator winding 521 at locations axially offset from each other by a distance equivalent to the thickness of the conductors 523. The coil sides of the conductors 523 which are arranged adjacent each other in the circumferential direction have lengths which extend in the axial direction and are preferably identical with each other.

The production of the stator 520 in which the stator core 522 is installed in the stator winding 521 may be achieved by preparing the hollow cylindrical stator winding 521 which has a slit to make end surfaces facing in the circumferential direction, in other words, to make the stator winding 521 in a substantially C-shape, fitting the stator core 522 inside an inner periphery of the stator winding 521, and then joining the facing end surfaces to complete the stator winding 521 of a complete hollow cylindrical shape.

Alternatively, the stator 520 may be produced by preparing the stator core 522 made of three discrete core sections arranged adjacent each other in the circumferential direction and then placing the core sections inside the inner periphery of the hollow cylindrical stator winding 521.

Other Modifications

The rotating electrical machine 500 is, as illustrated in FIG. 50, designed to have the inlet path 571 and the outlet path 572 of the coolant path 545 which are collected in one place. This layout may be modified in the following way. For instance, the inlet path 571 and the outlet path 572 may be placed at locations separate from each other in the circumferential direction of the rotating electrical machine 500. Specifically, the inlet path 571 and the outlet path 572 may be arranged at an angular interval of 180° away from each other in the circumferential direction, in other words, diametrically opposed to each other. At least one of the inlet path 571 and the outlet path 572 may be made up of a plurality of discrete paths.

The tire wheel assembly 400 in this embodiment is designed to have the rotating shaft 501 protruding in one of axially opposite directions of the rotating electrical machine 500, but however, the rotating shaft 501 may alternatively have end portions protruding both in the axial opposite directions. This is suitable for vehicles equipped with a single front or a single rear wheel.

The rotating electrical machine 500 may alternatively be designed to have an inner rotor-structure for use in the tire wheel assembly 400.

Each of the magnets 91 and 92 in the above embodiments may be arranged to have an end surface which faces in the circumferential direction and is placed in direct contact with that of a respective circumferentially adjacent one of the magnets 91 and 92. All the magnets 91 and 92 need not have the end surfaces arranged in direct contact with those of the circumferentially adjacent magnets 91 and 92. For instance, one or some of the magnets 91 and 92 may be arranged to have the end surfaces disposed away from those of the circumferentially adjacent magnets 91 and 92.

The first inverter 101 and the second inverter 102 in the above embodiments have the phase windings which are connected in the form of a star connection (i.e., Y-connection), but however, the phase windings may be connected in another form, for example, a delta-connection.

The thicknesses of the magnets 91 and 92 in the above embodiments in the radial direction will also be described below. As the fourth measure in the above embodiments (particularly, the first embodiment), a magnet unit is employed which has a polar anisotropic structure to create a magnetic density distribution approximating a sine wave. This increases a sine wave matching percentage using pulse control to enhance the torque and also results in a moderate change in magnetic flux, thereby minimizing an eddy-current loss as compared with radial magnets.

In a case where the magnet unit 42 is designed to have a magnetic density distribution approximating a sine wave, it is preferable to use the magnets 91 and 92 configured to have the easy axes of magnetization which are oriented in an arc shape, thereby forming arc-shaped magnet magnetic paths extending along the easy axes of magnetization.

Figure 76A:
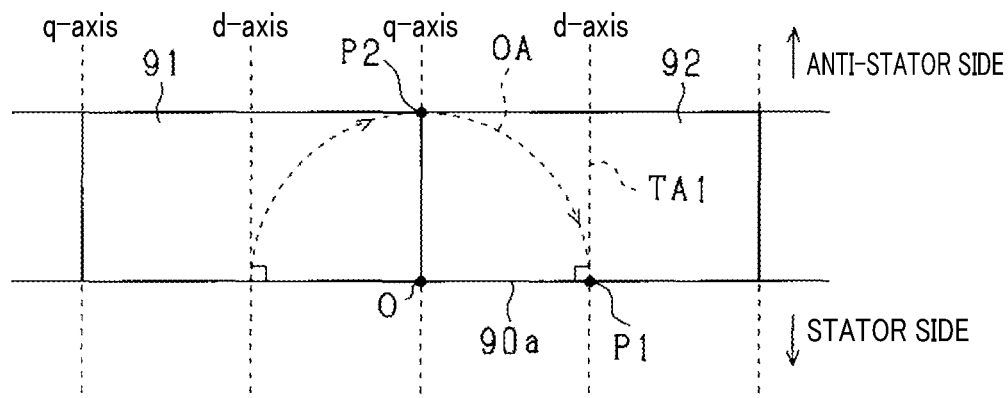
FIGS. 76(a) and 76(b) are developed view which illustrates magnets in another modification.
Figure 76B:
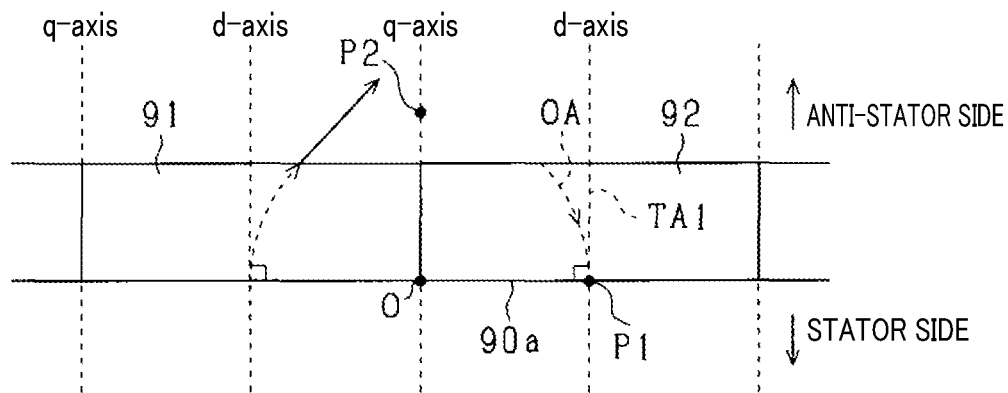

In case of use of the above magnets 91 and 92, it is advisable that the thickness of the magnets 91 and 92 be selected to have the magnets 91 and 92, as illustrated in FIG. 76(a), occupy the point P2 of intersection between the q-axis and the magnetic orientation arc OA. This is because such layout of the magnets 91 and 92 minimizes a leakage of magnetic flux from a side of the magnet unit 42 which faces away from the stator 50. Specifically, if the magnet 91 or 92, as demonstrated in FIG. 76(b), does not occupy the point P2 of intersection between the q-axis and the magnetic orientation arc OA in the radial direction, it will result in leakage of magnetic flux, as denoted by a solid arrow, from the side of the magnet unit 42 which faces away from the stator 50. FIGS. 76(a) and 76(b) are linearly developed views which illustrate the magnets 91 and 92. In FIGS. 76(a) and 76(b), a lower portion is a side facing the stator 50, while an upper portion is a side facing away from the stator 50.

The magnetic orientation arc OA is a circular arc which extends about the center O defined on the q-axis that is a boundary between the magnetic poles of the magnets 91 and 92 through the first point PI of intersection between the d-axis that is the center of the magnetic pole of each of the magnets 91 and 92 and the stator-facing outer surface 90a of each of the magnets 91 and 92. The center O is a point of intersection the q-axis and the stator-facing outer surface 90a, but however, may be shifted by a given amount from that point of intersection in the radial direction. For instance, the center O may be defined in an air gap between each of the magnets 91 and 92 and the stator 50, e.g., close to the stator 50 within such an air gap. It is also advisable that the tangent line TAI that touches the magnetic orientation arc OA at the first intersecting point PI completely coincide with the q-axis. In other words, the magnetic orientation arc OA is preferably defined to extend perpendicular (or near perpendicular) to the stator-facing outer surface 90a at the first intersecting point P1. The magnetic orientation arc OA may be defined to have the tangent line TAI which touches the magnetic orientation arc OA at the first intersecting point PI and makes an angle (e.g., an acute angle) with the q-axis which lies in a given range.

Figure 77:
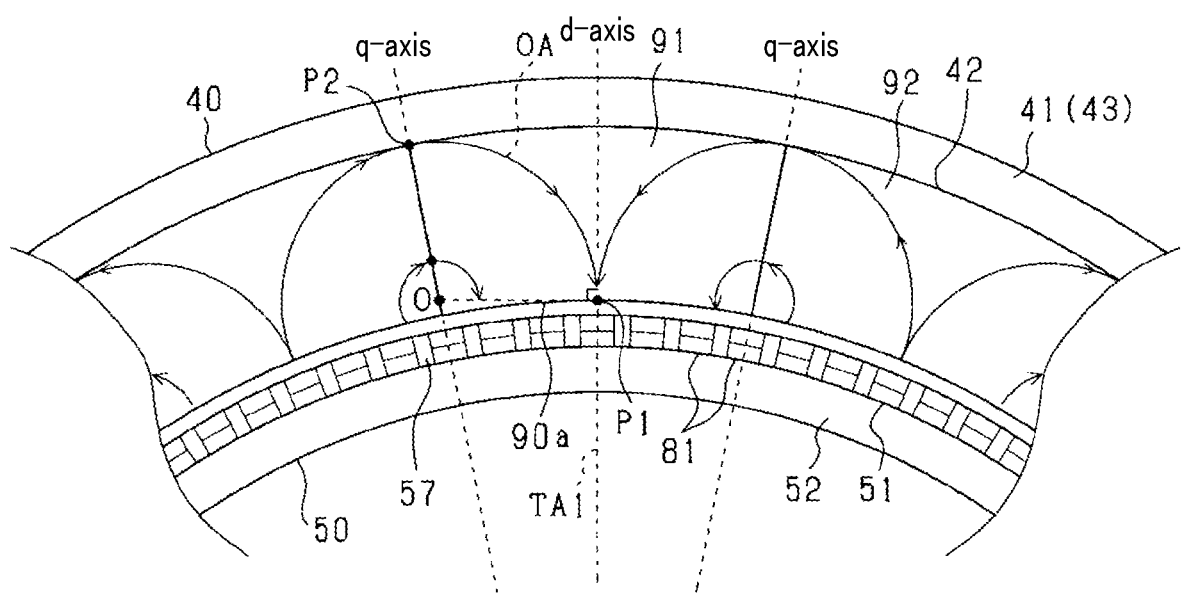
FIG. 77 is a transverse sectional view which shows a rotor and a stator in another modification.

FIGS. 76(a) and 76(b) illustrate the center O as lying at an intersection between the q-axis and the stator-facing outer surface 90a. The magnets 91 and 92 are, however, actually arranged, as shown in FIG. 77, along an arc extending in the circumferential direction of the rotor 40. Accordingly, in a case where the magnetic orientation arc OA is created to extend perpendicular to the stator-facing outer surface 90a, the center O is, as can be seen in FIG. 77, located outside the stator-facing outer surface 90a in the radial direction because of the curvature of the magnets 91 and 92.

Magnets in which the intrinsic coercive force is 400 [kA/m] or high, the remanent flux density is 1.0 [T] or higher, and an arc-shaped magnet magnetic path extends along the easy axis of magnetization or in which crystal particles of a main phase are smaller in size than 10 [μm] and the saturation magnetic flux density Js is higher than 1.2 [T] are usually high in production cost thereof. In other words, in order to meet the above specifications, the magnets need to be made of neodymium magnets or contain expensive rare earth, such as terbium or dysprosium. Consequently, an increase in thickness of the magnets 91 and 92, as illustrated in FIG. 76(a), to increase the volume thereof in order to minimize the leakage of magnetic flux will result in concern about the manufacturing cost. It is, therefore, desirable to decrease the thickness of the magnets 91 and 92 in the radial direction of the magnet unit 42. For this purpose, the magnets 91 and 92 may be designed to have a structure illustrated in FIG. 78.

Figure 78:
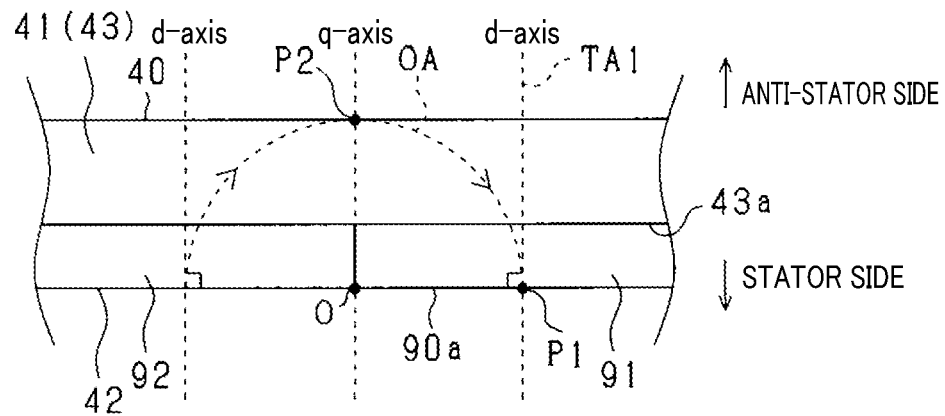
FIG. 78 is a developed view which illustrates a cylinder and a magnet unit in another modification.

FIG. 78 illustrates the cylinder 43 of the magnet holder 41 and the magnet unit 42 as being developed linearly. A lower portion of FIG. 78 will be referred to as a stator-facing side facing the stator 50 (i.e., the armature), while an upper portion will be referred to as a far-stator side (i.e., a far-armature side). The magnet unit 42 is, as can be seen in FIG. 78, arranged to have the easy axis of magnetization oriented in an arc-shape and includes the magnets 91 and 92 which define an arc-shaped magnet magnetic path extending along the easy axis of magnetization. Specifically, the magnet magnetic path 134 produced by the magnets 91 and 92 includes a magnetic path which extends around the center O, as defined on the q-axis that lines on the boundary between the magnetic poles of the magnets 91 and 92, on the magnetic orientation arc OA passing through the first point PI of intersection between the d-axis that lies at the center of the magnetic pole of each of the magnets 91 and 92 and the stator-facing outer surface 90a (i.e., an armature-facing circumference) of the magnets 91 and 92.

The magnetic orientation arc OA is defined to have the tangent line TAI which touches the magnetic orientation arc OA at the first intersecting point PI and extends parallel or nearly parallel to the d-axis. FIG. 78 illustrates the center O as lying at an intersection between the q-axis and the stator-facing outer surface 90a, but however, the center O is, like in FIG. 77, actually located radially outside the stator-facing outer surface 90a because of the curvature of the magnets 91 and 92.

The magnet unit 42 is, as illustrated in FIG. 78, firmly secured to an inner periphery of the cylinder 43 made from soft magnetic material. In other words, the cylinder 43 of the magnet holder 41 is stacked on the magnets 91 and 92 in the radial direction. In this embodiment, the stator-facing outer peripheral surface 43a of the cylinder 43 is located radially closer to the stator 50 than the second point P2 of intersection between the q-axis and the magnetic orientation arc OA is. The magnetic orientation arc OA lies inside the cylinder 43. In other words, the magnets 91 and 92 shown in FIG. 78 are configured to have a thickness smaller than that of the magnets 91 and 92 shown in FIG. 76(a) in the radial direction, however, the cylinder 43 functioning as a magnetic member is disposed to eliminate a risk of leakage of magnetic flux.

It is advisable that the thickness of the magnets 91 and 92 in FIG. 78 in the radial direction be selected to be larger than a value of πDL/the number of magnetic poles/2 and smaller than or equal to a value of πDL/the number of magnetic poles where DL is a distance between the center of the rotating shaft 14 and the stator-facing peripheral surface of each of the magnets 91 and 92 in the radial direction. In a case where the thickness of the magnets 91 and 92 is selected to be πDL/the number of magnetic poles, the magnetic orientation will not directly affect the magnetic force. The magnets 91 and 92 in FIG. 78 need not have the easy axis of magnetization oriented along the magnetic orientation arc OA. Each of the magnets 91 and 92 needs at least to an easy axis of magnetization aligned near the d-axis to be more parallel to the d-axis than an easy axis of magnetization near the q-axis defined on the boundary of the magnetic poles of the magnets 91 and 92.

In the modification in FIG. 78, the magnet magnetic path created in the magnets 91 and 92 which are arranged adjacent each other in the circumferential direction of the magnet unit 42, as described above, extends continuously through the cylinder 43 of the magnet holder 41. The cylinder 43 of the magnet holder 41, therefore, functions as a back yoke. A combination of the magnets 91 and 92 and the cylinder 43 in FIG. 78, thus, constitutes the magnet unit 42.

Figure 79:
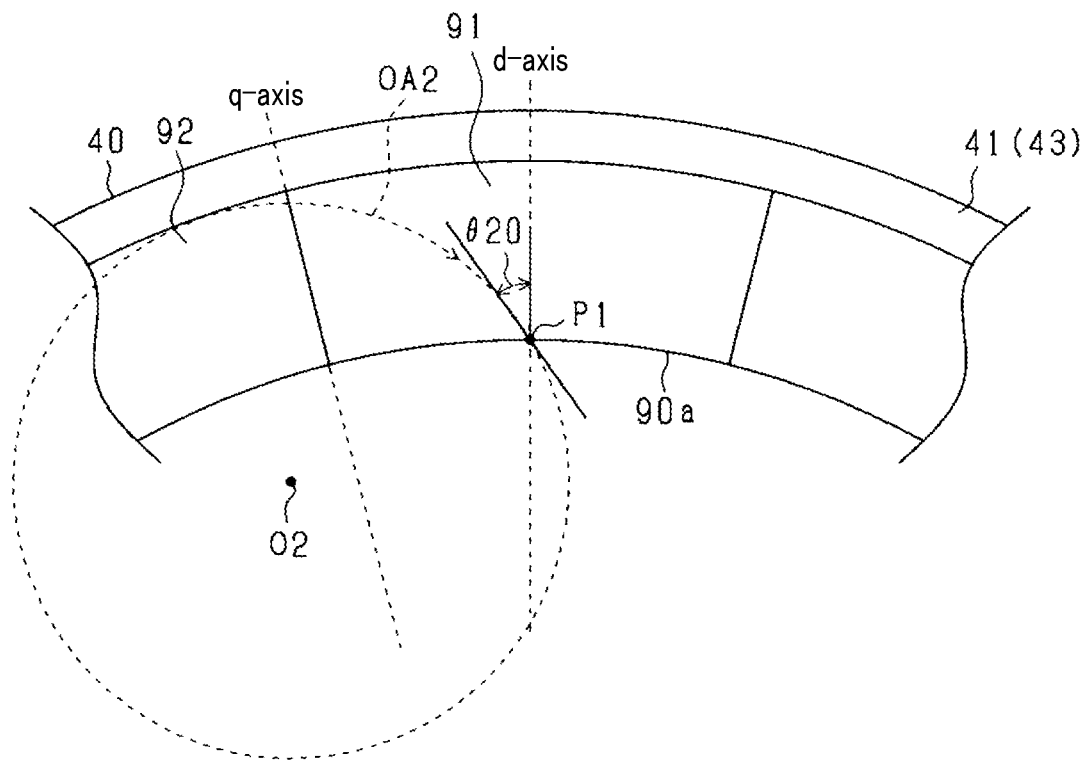
FIG. 79 is a developed view which shows a cylinder and a magnet unit in another modification.

The magnetic orientation of the magnets 91 and 92 may alternatively be directed, as illustrated in FIG. 79, in order to decrease the thickness of the magnets 91 and 92. Specifically, the magnetic orientation arc OA2 which extends through the first point PI of intersection between the d-axis and the stator-facing outer surface 90a of the magnets 91 and 92 is created about the center O2 which lies on an opposite side of the q-axis to the first intersecting point P1 in the circumferential direction and is located closer to the stator 50 than the magnets 91 and 92 are in the radial direction. The magnets 91 and 92 are magnetized to have the easy axis of magnetization extending along the magnetic orientation arc OA2. This enables the magnets 91 and 92 to have a decreased thickness and minimizes a risk of leakage of magnetic flux from the magnets 91 and 92. it is also possible to decrease the width of the magnets 91 and 92. This enables a total volume of material of the magnets 91 and 92 to be reduced. It is advisable that an angle θ20 which the d-axis makes with the magnetic orientation arc OA2 at the first intersecting point P1 be selected to be an acute angle.

Figure 80:
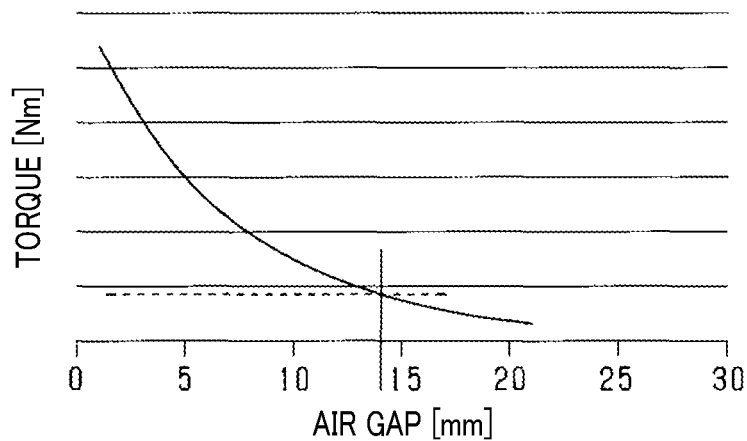
FIG. 80 is a view which represents a relation between an air gap and torque.
Figure 81:
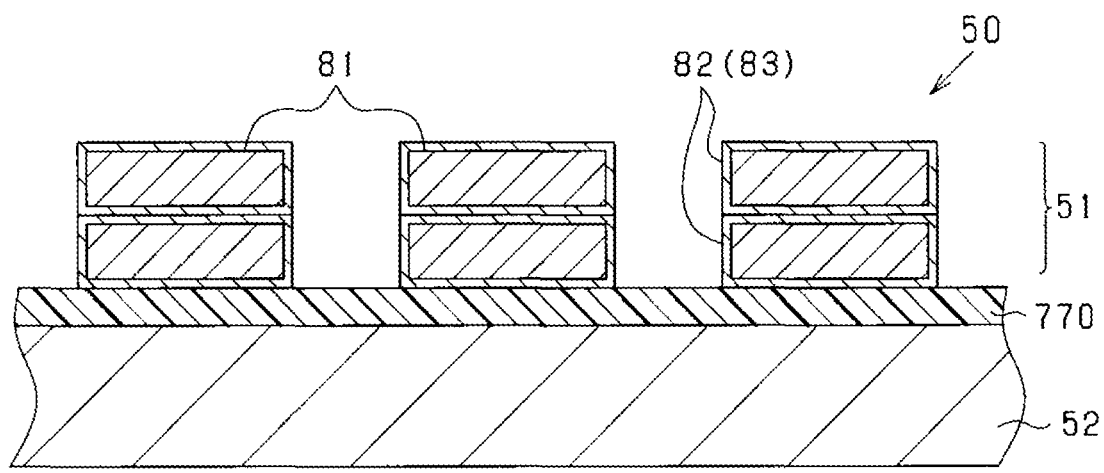
FIG. 81 is a transverse sectional view which illustrates a stator in another modification.

The differences between the rotating electrical machine 10 in the above embodiments and a typical IPM motor will also be discussed below. A relation between an air gap between the stator 50 and the rotor 40 of the above described rotating electrical machine 10 and torque outputted by the rotating electrical machine 10 is represented in FIG. 80. FIG. 80 demonstrate experimental data about the rotating electrical machine 10 in which the saturation magnetic flux density Js is 1.2 [T] or more, and the orientation ratio α is 0.9 or more in a condition where the current density is 40 A rms/mm^2 in conductors having a resistance equivalent or near equivalent to that of copper. The data show that the output torque from the rotating electrical machine 10 becomes higher than that produced by the IPM motor when the air gap is 14.5 mm or less. In FIG. 80, the torque outputted by the rotating electrical machine 10 in the above embodiments is indicated by a solid line. The torque outputted by the typical IPM motor when the air gap is 1 mm is indicated by a broken line In the above embodiments, the resinous film 770 (i.e., insulating sheet) may be, as illustrated in FIG. 81, disposed between the stator core 52 and the stator winding 51. The resinous film 770 may be made from varnish. Use of the resinous film 770 ensures electrical isolation between the stator core 52 and the stator winding 51.

Figure 82:
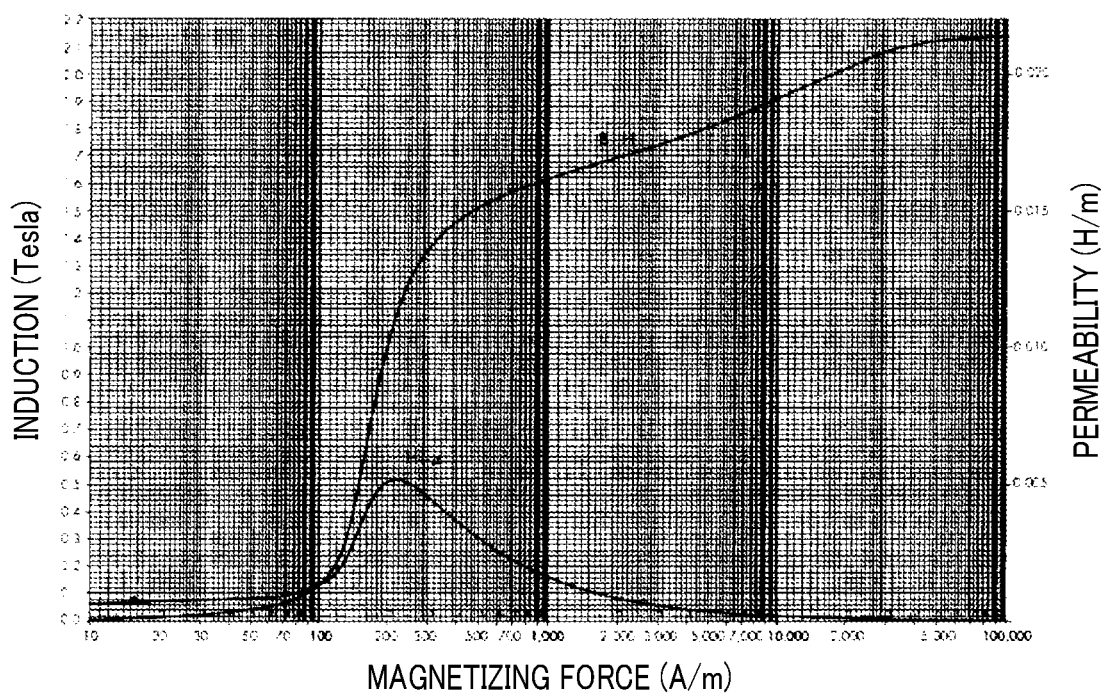
FIG. 82 is a view which represents a dc magnetization curve and a dc magnetic permeability curve.

The magnetic saturation in the above embodiments will be additionally discussed below. The magnetic saturation, as referred to herein, may be expressed using "B50" instead of "Bs". "B50" is a representative value of characteristics of magnetic steel sheet specified in the Japanese Industrial Standard (JIS). There are a large number of manufacturers using "B50". "Bs" may not be cataloged. Usually, "B50" is, as shown in FIG. 82, lower than "Bs" by 0.1 [T] and, in most cases, between 1.65 and 1.75 [T] according to the catalogs. "Bs" is usually between 1.8 and 1.9 [T]. A region of "B50", as demonstrated in FIG. 82, lies out of a high magnetic permeability region where an iron core is excellent for the magnetic north, but near a magnetic saturation region. A magnetic permeability of 1000 A/m or more near 5000 A/m is commonly used in terms of the length of a magnetic path in each pole pair of an electrical motor and an exciting ampere-turn. The use of "B50" instead of "Bs" ensures a high degree of design reliability. In case of a dust core or a powder magnetic core, 8000 A/m or 10000 A/m are conventionally often used in catalogs. In such a case, "B50" should be employed.

Figure 83:
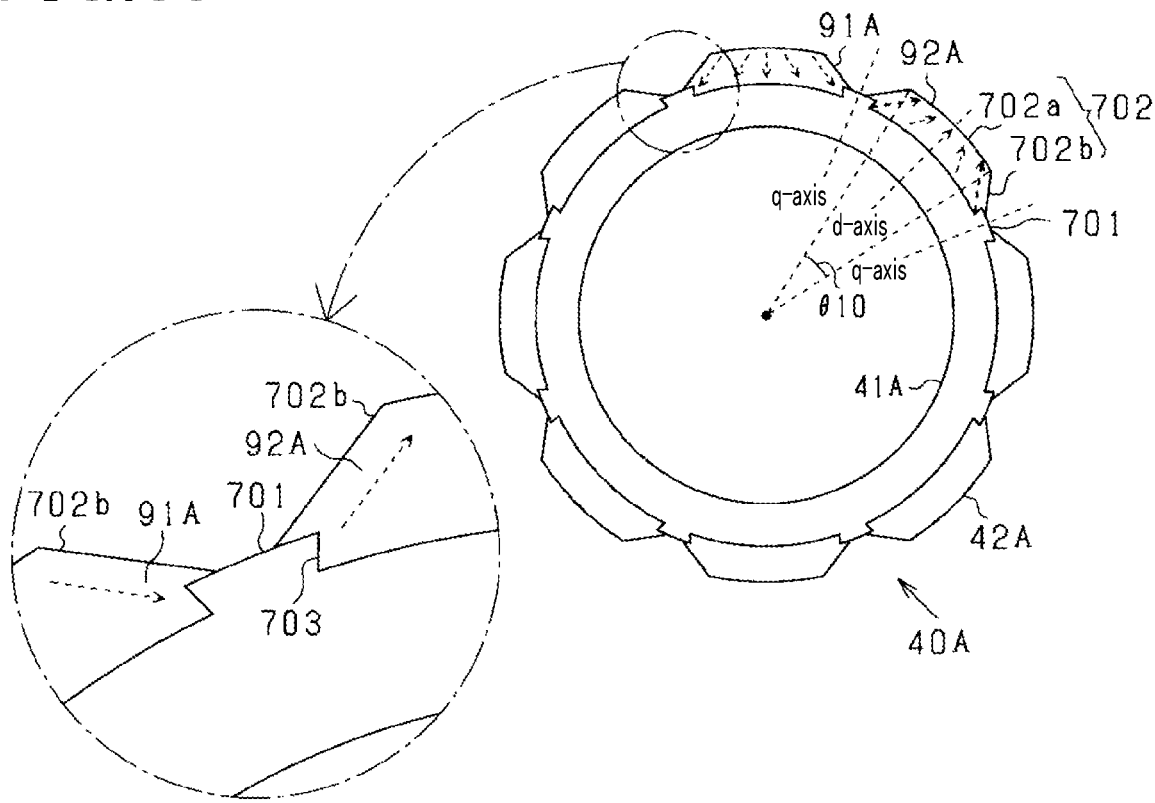
FIG. 83 is a transverse sectional view which illustrates a magnet holder and a magnet unit in another modification.

The structures of the magnet holder 41 and the magnet unit 42 in the above embodiments may be altered. For instance, the magnet holder 41 and the magnet unit 42 may have structures illustrated in FIG. 83. FIG. 83 shows the rotor 40A of an inner-rotor rotating electrical machine. The rotor 40A is arranged to be rotatable in a hollow cylindrical stator, not shown, and faces an inner periphery of the cylindrical stator. The magnet holder 41A of the rotor 40A is of a hollow cylindrical shape and has the magnet unit 42A attached to an outer circumference thereof. The outer circumferential surface of the magnet holder 41A has formed thereon engaging portions 701 which protrude outward in the radial direction of the magnet holder 41A and establish mechanical engagement with the magnets 91A and 92A of the magnet unit 42A. The engaging portions 701 are arranged at equal intervals away from each other in the circumferential direction of the magnet holder 41A. The engaging portions 701 extend in the axial direction. Each of the engaging portions 701 has a radially inside width and a radially outside width larger than the radially inside width in the circumferential direction of the magnet holder 41A.

The magnet unit 42A is equipped with a plurality of magnets 91A and 92A arranged in the circumferential direction thereof. The magnets 91A and 92A are magnetized to have magnetic poles, every adjacent two of which are different in direction of magnetization. Specifically, the easy axis of magnetization (indicated by a broken line) closer to the q-axis in each of the magnets 91A and 92A is, as clearly illustrated in FIG. 82, inclined relative to the radial direction of the magnet unit 41A (i.e., the d-axis) at an angle which the easy axis of magnetization closer to the q-axis makes with the d-axis and is larger than that the easy axis of magnetization lying closer to the d-axis makes with the d-axis. The angles of inclination of the easy axes of magnetization in the radial direction become large toward the q-axis.

The stator-facing peripheral surface 702 (i.e., an armature-facing circumference) that is an outer circumferential surface of each of the magnets 91A and 92A includes two oblique surfaces 702b which are opposed to each other in the circumferential direction and inclined at an angle relative to the radial direction. In other words, the stator-facing peripheral surface 702 of each of the magnets 91A and 92A includes the flux input surface 702a curved along the circumferential direction of the magnet unit 41A and the oblique surfaces 702b arranged on the right and left sides of the flux input surface 702a in the circumferential direction. The oblique surfaces 702b are oriented along the easy axes of magnetization and inclined at an angle relative to the radial direction of the magnet unit 41A. In other words, each of the magnets 91A and 92A is formed to have cut corners which are opposed to each other in the circumferential direction and face the stator. The oblique surfaces 702a extending substantially along the easy axes of magnetization serve to lengthen a continuously extending magnet magnetic path. A breakage of the magnet magnetic path will lead to an increased risk that the magnet magnetic path may be subjected to a diamagnetic field due to air so that it is demagnetized. The oblique surfaces 702b oriented substantially along the easy axes of magnetization, therefore, serve to enhance the density of magnetic flux emerging from the flux input surface 702a.

In a case where the stator is designed to have a core-less (i.e., a teeth-less) structure, magnetic flux emerging from the magnets 91A and 92A passes directly through the stator winding. The reduction in harmonic is achieved by increasing an air gap around the q-axis between the stator-facing peripheral surface 702 of each of the magnets 91A and 92A and the stator to be larger in size than that around the d-axis. In other words, the reduction in harmonic is accomplished by removing the corners of each of the magnets 91A and 92A, that is, the circumferentially opposed sides of the flux input surface 702a which face the q-axes. The reduction in harmonic may also be achieved by selecting an angle θ10 for one magnetic pole defining an area of the flux input surface 702a to be 144°, 120°, 102°, or 72° in electrical angle. When the angle θ10 for one magnetic pole is selected to be 144° or 72°, $5^{th}$ harmonic will be reduced. When the angle θ10 is selected to be 120°, $3^{rd}$ harmonic will be reduced. When the angle θ10 is selected to be 102°, $7^{th}$ harmonic will be reduced.

Each of the magnets 91A and 92A has the recesses 701 formed in edges or corners thereof which are opposed to each other in the circumferential direction of the rotor 40A and face the magnet holder 41A, i.e., face away from the armature. Each of the recesses 701 is contoured to conform with the configuration of a corresponding one of the engaging portions 701. In other words, the circumferentially-opposed corners of each of the magnets 91A and 92A are recessed. The recesses 703 extend in the axial direction.

The formation of the recesses 703 in a production process of each of the magnets 91A and 92A requires the recesses 703 to have a size of at least 1 mm for delivering magnetic particles into a magnet forming die. Typical machining technologies usually require at least plus or minus 0.5 mm margin of error to form the recesses 703. When it is, therefore, required to make a minimum size of the recesses 703, the size of the recesses 703 will be a maximum of 1.5 mm. When the size of the recesses 703 is selected to be 1.5 mm or less, it will minimize a risk of demagnetization of the magnets 91A and 92A.

The recesses 703 are located on magnet magnetic paths extending in the vicinity of the oblique surfaces 702b, in other words, on extensions of the easy axes of magnetization. The recesses 703 are fit on the magnetized engaging portions 701 without any air gaps therebetween. In other words, the engaging portions 701 are arranged to close an omission of the magnet magnetic path extending between the circumferentially adjacent the magnets 91A and 92A. To say it in a different way, the engaging portions 701 which are made from magnetic material ensure continuity of the magnet magnetic path created between the adjacent magnets 91A and 92A, thereby eliminating a risk of leakage of magnetic flux from the rotor 40A. This enhances the magnetic flux density in the flux input surface 702a of each of the magnets 91A and 92A.

Each of the recesses 703 is configured to achieve engagement with one of the engaging portions 701 in the circumferential direction, thereby eliminating a risk that the magnets 91A and 92A may be dislodged outward in the radial direction. A dimension of each of the flux input surfaces 702a in the circumferential direction of the magnets 91A and 92A is equivalent to the circumferential length Wm of a portion of the magnet unit 42 which corresponds to each magnetic pole.

Figure 84:
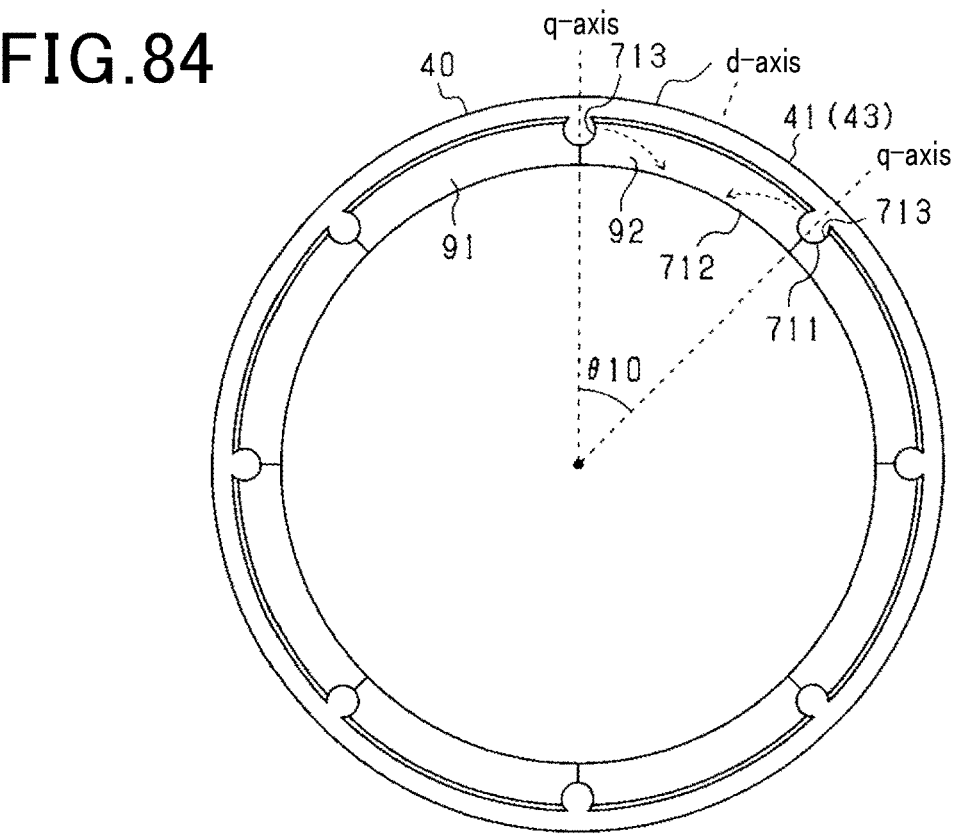
FIG. 84 is a transverse sectional view which illustrates a magnet holder and a magnet unit in another modification.

The magnet holder 41 and the magnet unit 42 may be designed to have structures illustrated in FIG. 84. Specifically, the magnet holder 41 has the engaging portions 711 which are formed in an inner periphery thereof (i.e., a radially inner surface facing the armature) and fit in the magnets 91 and 92 of the magnet unit 42. The engaging portions 711 are arranged at equal intervals away from each other in the circumferential direction of the magnet holder 41. The engaging portions 711 each extend in the axial direction. The engaging portions 711 are shaped to have a circular transverse section.

The easy axes of magnetization in each of the magnets 91 and 92 of the magnet unit 42 extend, as denoted by broken lines, in an arc shape centered on the q-axis. Each of the magnets 91A and 92A has an inner circumferential surface which will be referred to as a stator-facing peripheral surface 712 serving as a flux input surface. The stator-facing peripheral surface 712 has a circumferential dimension equivalent to the length Wm of a portion of the magnet unit 42 corresponding to each magnetic pole. It is advisable that the angle θ10 for one magnetic pole defining an area of the stator-facing peripheral surface 712 be selected to be 144°, 120°, 102°, or 72° in electrical angle.

Each of the magnets 91 and 92 has the recesses 713 formed in corners thereof which are opposed to each other in the circumferential direction of the rotor 40 and face the magnet holder 41, i.e., face away from the stator. Each of the recesses 713 is contoured to conform with the configuration of a corresponding one of the engaging portions 711. In other words, the circumferentially-opposed corners of each of the magnets 91 and 92 are recessed. The recesses 711 extend in the axial direction.

The recesses 713 are located on magnet magnetic paths, in other words, extensions of the easy axes of magnetization. The recesses 713 are fit on the magnetized engaging portions 711 without any air gaps therebetween. In other words, the engaging portions 711 are arranged to close an omission of the magnet magnetic path extending between the circumferentially adjacent the magnets 91 and 92. To say it in a different way, the engaging portions 711 which are made from magnetic material ensure continuity of the magnet magnetic path created between the adjacent magnets 91 and 92, thereby eliminating a risk of leakage of magnetic flux from the rotor 40. Each of the recesses 713 is configured to achieve engagement with one of the engaging portions 711 in the circumferential direction, thereby eliminating a risk that the magnets 91 and 92 may be dislodged outward in the radial direction.

Figure 85:
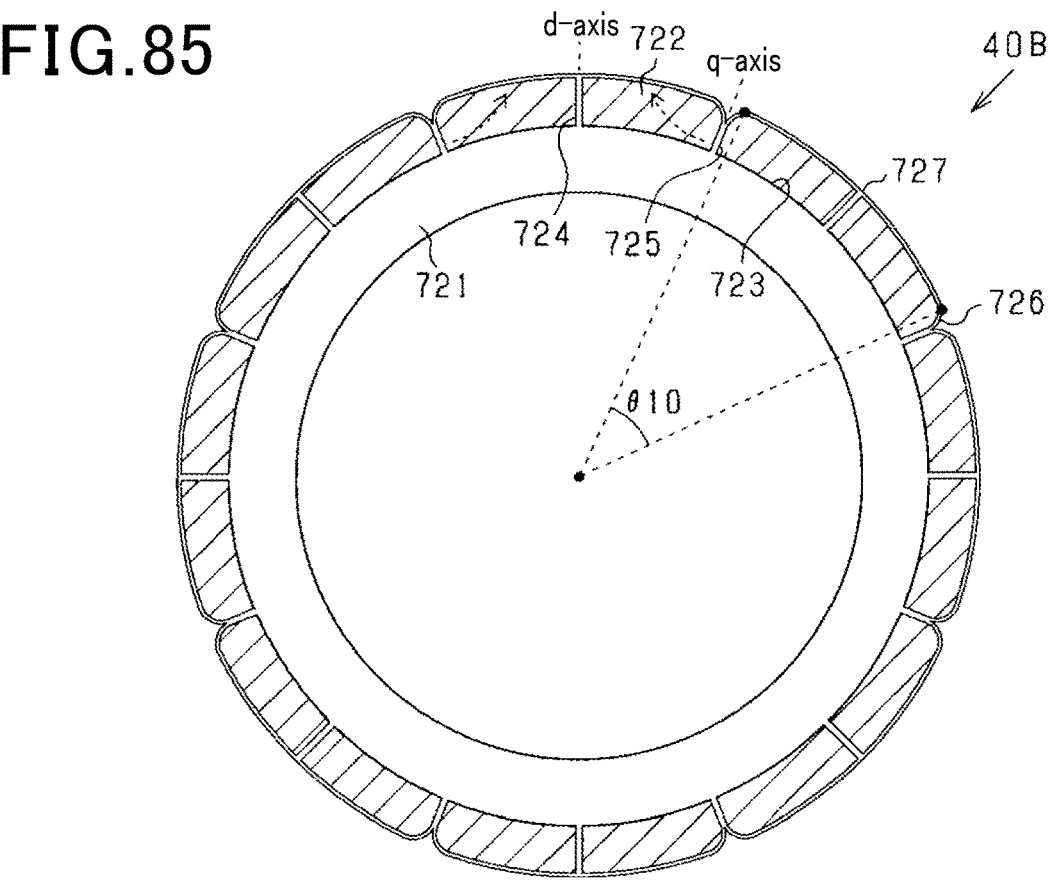
FIG. 85 is a transverse sectional view which illustrates a magnet holder and a magnet unit in another modification.

The magnet holder 41 and the magnet unit 42 may alternatively be designed to have structures illustrated in FIG. 85. FIG. 85 shows the rotor 40B engineered for an inner-rotor rotating electrical machine. The rotor 40B is arranged to be rotatable in a hollow cylindrical stator, not shown, and faces an inner periphery of the cylindrical stator. The rotor 40B is designed as an IPM rotor and includes the rotor core 721 and a plurality of permanent magnets 722 constituting a magnet unit. The rotor core 721 has formed therein a plurality of magnet insert holes 723 which are arranged at equal intervals away from each other in the circumferential direction of the rotor core 721. The magnet insert holes 723 have disposed therein the permanent magnets 722 which are magnetized to have magnetization directions changed alternately in adjacent magnetic poles. The permanent magnets 722 have polar anisotropic characteristics in which each easy axis of magnetization, as indicated by a broken line in FIG. 9 or 30, extends in an arc shape between the d-axis that is the center of each magnetic pole and the q-axis that is a boundary between the adjacent magnetic poles. In other words, magnet magnetic paths extend in an arc shape.

The magnet insert holes 723 are isolated from each other by the dividing walls 724 extending along the d-axes. The magnet insert holes 723 are also isolated from each other by the diving walls 725 extending along the q-axes. The rotor core 721 has formed in an outer periphery thereof the recesses 726 which are radially inwardly recessed along the q-axes, thereby causing a corner of each of the permanent magnets 722 which is located close to the q-axis and slants relative to the q-axis. In other words, each of the permanent magnets 722 has a cut corner which faces radially outward (i.e., toward the armature) close to the q-axis. This reduces harmonics in the above way. It is advisable that the angle θ10 for one magnetic pole defining an area of each of the flux input surfaces 727 between the adjacent recesses 726 be selected to be 144°, 120°, 102°, or 72° in electrical angle. Each of the flux input surfaces 727 has a circumferential dimension equivalent to the length Wm of a portion of the magnet unit 42 corresponding to each magnetic pole.

The formation of the recesses 726 on the q-axes enables the rotor core 721 to be reduced in weight. Particularly, in a case where the stator is designed to have a core-less (i.e., a teeth-less) structure, a large degree of torque output is not expected due to an inductance difference occurring in the rotor core 721. It is, thus, advisable that the rotor core 721 be designed to have the recesses 726 each having a depth extending radially inwardly to reduce the weight thereof.

Figure 86A:
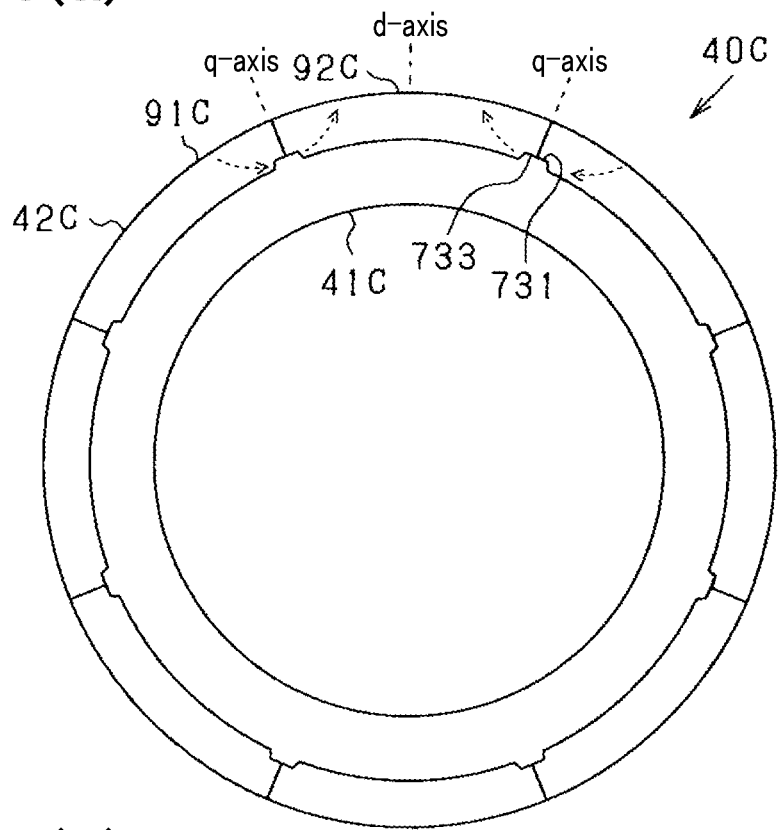
FIGS. 86(a) and 86(b) are transverse sectional views which illustrate a magnet holder and a magnet unit in another modification.
Figure 86B:
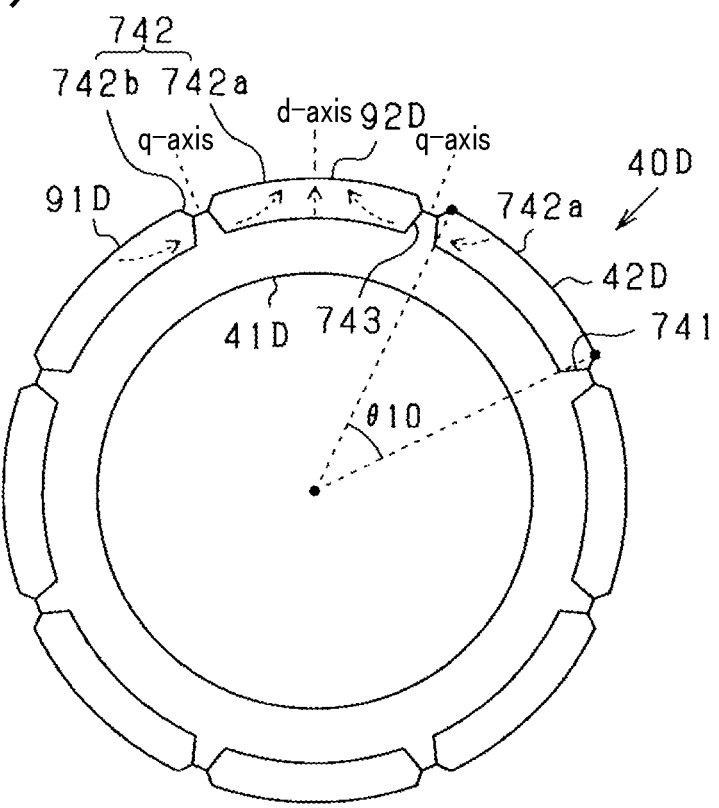

The magnet holder 41 and the magnet unit 42 may be designed to have structures illustrated in FIGS. 86(a) and 86(b). FIGS. 86(a) and 86(b) illustrate the rotors 40C and 40D for use in an inner rotor rotating electrical machine. In FIG. 86(a), the rotor 40C is arranged to be rotatable in a hollow cylindrical stator, not shown, and faces an inner periphery of the cylindrical stator. The magnet holder 41C of the rotor 40C is of a hollow cylindrical shape and has the magnet unit 42C secured to an outer periphery thereof. The magnet holder 41C has formed in the outer periphery thereof the engaging portions 731 which protrude radially outwardly (i.e., toward the stator) and achieve engagement with the magnets 91C and 92C of the magnet unit 42C. The engaging portions 731 are arranged at equal intervals away from each other in the circumferential direction of the rotor 40C. The engaging portions 731 each extend in the axial direction.

The magnet unit 42C includes the magnets 91C and 92C which arranged adjacent each other in the circumferential direction thereof. The magnets 91C and 92C are magnetized to have magnetic poles, every adjacent two of which are different in direction of magnetization. The easy axis of magnetization (indicated by a broken line) closer to the q-axis in each of the magnets 91C and 92C is, as clearly illustrated in FIG. 86(a), inclined relative to the radial direction of the magnet unit 42C (i.e., the d-axis) at an angle which the easy axis of magnetization closer to the q-axis makes with the d-axis and is larger than that the easy axis of magnetization lying closer to the d-axis makes with the d-axis. In other words, the angles of inclination of the easy axes of magnetization in the radial direction become large toward the q-axis. More specifically, the magnets 91C and 92C have polar anisotropic characteristics in which each easy axis of magnetization, as indicated by a broken line in FIG. 9 or 30, extends in an arc shape between the d-axis that is the center of each magnetic pole and the q-axis that is the boundary between the adjacent magnetic poles. In other words, magnet magnetic paths extend in an arc shape.

Each of the magnets 91C and 82C has the recesses 733 formed in corners thereof which are opposed to each other in the circumferential direction of the magnet unit 40C and face the magnet holder 41C (i.e., away from the armature). The recesses 733 are contoured to conform with the configuration of the engaging portions 731. In other words, the corners of each of the magnets 91C and 92C which are opposed to each other in the circumferential direction are recessed. The recesses 733 extend in the axial direction.

The recesses 733 are located on magnet magnetic paths produced by each of the magnets 91C and 92C, in other words, extensions of the easy axes of magnetization. The recesses 733 are fit on the magnetized engaging portions 731 without any air gaps therebetween. In other words, the engaging portions 731 are arranged to close a gap in the magnet magnetic path extending between the circumferentially adjacent the magnets 91C and 92C. To say it in a different way, the engaging portions 731 which are made from magnetic material ensure continuity of the magnet magnetic path created between the adjacent magnets 91C and 92C, thereby eliminating a risk of leakage of magnetic flux from the rotor 40C, which enhances the density of magnetic flux.

The rotor 40D in FIG. 86(b) will be described below. The rotor 40D is arranged to be rotatable in a hollow cylindrical stator, not shown, and faces an inner periphery of the cylindrical stator. The magnet holder 41D of the rotor 40D is of a hollow cylindrical shape and has the magnet unit 42D secured to an outer periphery thereof. The magnet holder 41D has formed in the outer periphery thereof the engaging portions 741 which protrude radially outwardly (i.e., toward the stator) and achieve engagement with the magnets 91D and 92DC of the magnet unit 42D. The engaging portions 741 are arranged at equal intervals away from each other in the circumferential direction of the rotor 40D. The engaging portions 741 each extend in the axial direction. Each of the engaging portions 741 is shaped to taper to have a circumferential dimension of a radially outer portion thereof which is smaller than that of a radially inner portion thereof. In other words, each of the engaging portions 741 tapers toward the top thereof.

The magnet unit 42D includes the magnets 91D and 92D which arranged adjacent each other in the circumferential direction thereof. The magnets 91D and 92D are magnetized to have magnetic poles, every adjacent two of which are different in direction of magnetization. The easy axis of magnetization (indicated by a broken line) closer to the q-axis in each of the magnets 91D and 92DC is, as clearly illustrated in FIG. 86(b), oblique relative to the radial direction of the magnet unit 42D (i.e., the d-axis) at an angle which the easy axis of magnetization closer to the q-axis makes with the d-axis and is larger than that the easy axis of magnetization lying closer to the d-axis makes with the d-axis. In other words, the angles of inclination of the easy axes of magnetization in the radial direction become large toward the q-axis. More specifically, the magnets 91D and 92DC have polar anisotropic characteristics in which each easy axis of magnetization, as indicated by a broken line in FIG. 9 or FIG. 30, extends in an arc shape between the d-axis that is the center of each magnetic pole and the q-axis that is the boundary between the adjacent magnetic poles. In other words, magnet magnetic paths extend in an arc shape.

Each of the magnets 91D and 92D has the stator-facing peripheral surface 742 (i.e., an outer circumferential surface thereof facing the armature) which includes the oblique surfaces 742b. The oblique surfaces 742b lie on circumferentially opposed ends of each of the stator-facing peripheral surface 742 and are inclined relative to the radial direction of the rotor 40D. Specifically, the stator-facing peripheral surface 742 of each of the magnets 91D and 92D includes the flux input surface 742a and the oblique surfaces 742b. The flux input surface 742a is curved and extends in the circumferential direction. The oblique surfaces 742b lie on circumferentially opposed ends of the flux input surface 742a.

In other words, circumferentially opposed corners of each of the magnets 91D and 92D which face the stator are cut. The circumferentially opposed corners of each of the magnets 91D and 92D which face the stator have shorter magnet magnetic paths, thereby eliminating a risk that the density of magnetic flux may be lowered even when the above corners are removed. The removal of such corners also results in a decreased volume of material of the magnets 91D and 92D. The reduction in harmonic is achieved by selecting the angle θ10 for one magnetic pole defining an area of each of the flux input surfaces 742a to be 144°, 120°, 102°, or 72° in electrical angle. Each of the flux input surfaces 742a has a circumferential dimension equivalent to the length Wm of a portion of the magnet unit 42 corresponding to each magnetic pole.

Each of the magnets 91D and 92D have the oblique surfaces 743 formed on portions of the circumferentially opposed ends thereof which face the magnet holder 41C (i.e., away from the armature). Each of the oblique surfaces 743 is countered to conform with a respective one of the circumferentially opposed ends (i.e., the tapered surfaces) of each of the engaging portions 741. The oblique surfaces 743 extend in the axial direction. Each of the oblique surfaces 743 touches a corresponding one of the engaging portions 741 in the circumferential direction to achieve engagement therebetween.

The engaging portions 741 are located on magnet magnetic paths produced by each of the magnets 91D and 92D, in other words, extensions of the easy axes of magnetization. The oblique surfaces 743 are fit on the magnetized engaging portions 741 without any air gaps therebetween. In other words, the engaging portions 741 are arranged to close an omission of the magnet magnetic path extending between the circumferentially adjacent the magnets 91D and 92D. To say it in a different way, the engaging portions 741 which are made from magnetic material ensure continuity of the magnet magnetic path created between the adjacent magnets 91D and 92D, thereby eliminating a risk of leakage of magnetic flux from the rotor 40D, which enhances the density of magnetic flux in the flux input surfaces 742a.

Each of the rotors 40C and 40D illustrated in FIGS. 86(a) and 86(b) may be equipped with a magnet removal prevention ring mounted on the outer periphery thereof. When such a magnetic removal prevention ring may be made from magnetic material, it usually leads to a risk that the magnetic flux may be self-contained, i.e., short-circuited without passing through a stator winding through the ring near a boundary between circumferentially adjacent magnetic poles (i.e., the q-axis). Each of the magnets 91C, 92C, 91D, and 92D of the rotors 40C and 40D is, as described above, oriented to have an easy axis of magnetization inclined at a larger angle to the radial direction near the q-axis than that near the d-axis. This orientation of the easy axis of magnetization minimizes the risk that the magnetic flux may be self-contained near the q-axis as compared with a case where the easy axis of magnetization is oriented along the radial direction.

The production method for the casing 64 will be additionally described below. The casing 64 may be produced using a core to have a hollow structure, i.e., the coolant path 74. The casing 64 may be die-casted. The assembly of the stator core 52 and the casing 64 may be achieved by cooling the casing 64 to create a cold fit of the stator core 52 in the casing 64. The casing 64 may be made from resin.

How to mount the semiconductor modules 66 and the capacitor module 68 in the casing 64 in the above embodiments will be additionally described below. The semiconductor modules 66 and the capacitor module 68 may be secured to the casing 64 using bolts, adhesive agent, welding techniques, FSW (Friction Stir Welding) techniques, or crimping techniques.

How to weld the end of the stator winding 51 to a weld article, such as a bus bar, will also be described below. The joint of the end of the stator winding 51 to the weld article may be achieved using fusing techniques, TIG welding, or laser welding. Such welding is preferably performed by stripping a portion or whole of a wire-coating from the end of the stator winding 51.

The formation of the stator winding 51 in the above embodiments may be achieved by pressing the stator winding 51 after being looped around the stator core 52 in order to improve a space factor that is a ratio of a total volume of a conductor to a volume occupied by the conductor. The formation of the stator winding 51 may alternatively be achieved by looping the stator winding 51 around the stator core 52 and simultaneously pressing the stator winding 51 to increase the space factor.

In the above embodiments, the stator winding 51 may be looped directly around the stator core 52 and then firmly secured to the stator core 52 using varnish or adhesive agent.

The stator core 52 may be produced by a stack of rolled steel plates (e.g., SPCC) in the above embodiments.

How to produce the magnet holder 41 in the above embodiments will be additionally described below. The magnet holder 41 may be die-casted. The magnet holder 41 may alternatively be made using a press.

The magnet unit 42 (i.e., the magnets 91 and 92) may be mounted on the magnet holder 41 using adhesive agent, crimping techniques, or resin material in the above embodiments. The magnet unit 42 may alternatively be secured to the magnet holder 41 using resin-molding techniques.

Figure 87:
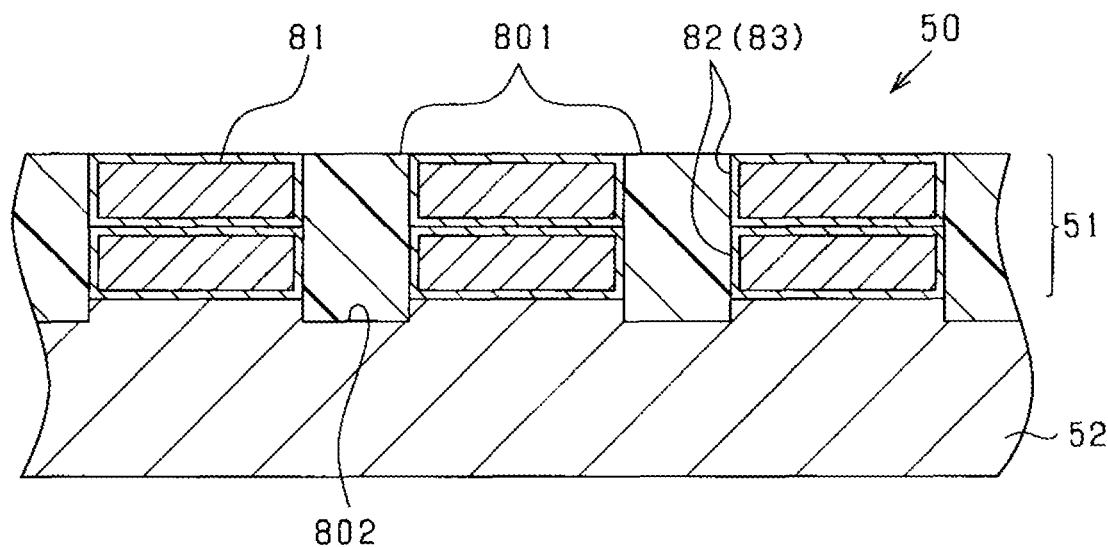
FIG. 87 is a transverse sectional view which illustrates a magnet holder and a magnet unit in another modification.

The protrusions 801 made from non-magnetic material may be, as illustrated in FIG. 87, disposed one between a respective adjacent two of the conductor groups 81 in the above embodiments. The protrusions 801 are firmly secured to the stator core 52 and protrude radially outward (i.e., toward the rotor 40). The protrusions 801 are arranged at equal intervals away from each other in the circumferential direction of the stator 50. The protrusions 801 are shaped to have a circumferential width which achieves direct contact with the conductor groups 81 in the circumferential direction.

The protrusions 801 are placed to touch the conductor groups 81 in the circumferential direction and thus serve as positioners to locate the conductor groups 81 in correct positions. FIG. 87 illustrates the protrusions 801 as having a width to fully close intervals between the conductor groups 81 arranged adjacent each other in the circumferential direction, but however, each of the protrusions 801 may alternatively be shaped to directly contact only one of the adjacent conductor groups 81.

The stator core 52 has formed in the outer surface thereof the grooves 802 extending in the axial direction. The protrusions 801 are fit in the grooves 802, so that they are firmly fixed on the stator core 52. In FIG. 87, the protrusions 801 are each formed in the shape of a wall extending in the axial direction. Instead of the protrusions 801, pin-shaped protrusion may be provided. In this case, the stator core 52 may have formed in the outer surface thereof insert holes in which the pin-shaped protrusion are inserted.

Figure 88:
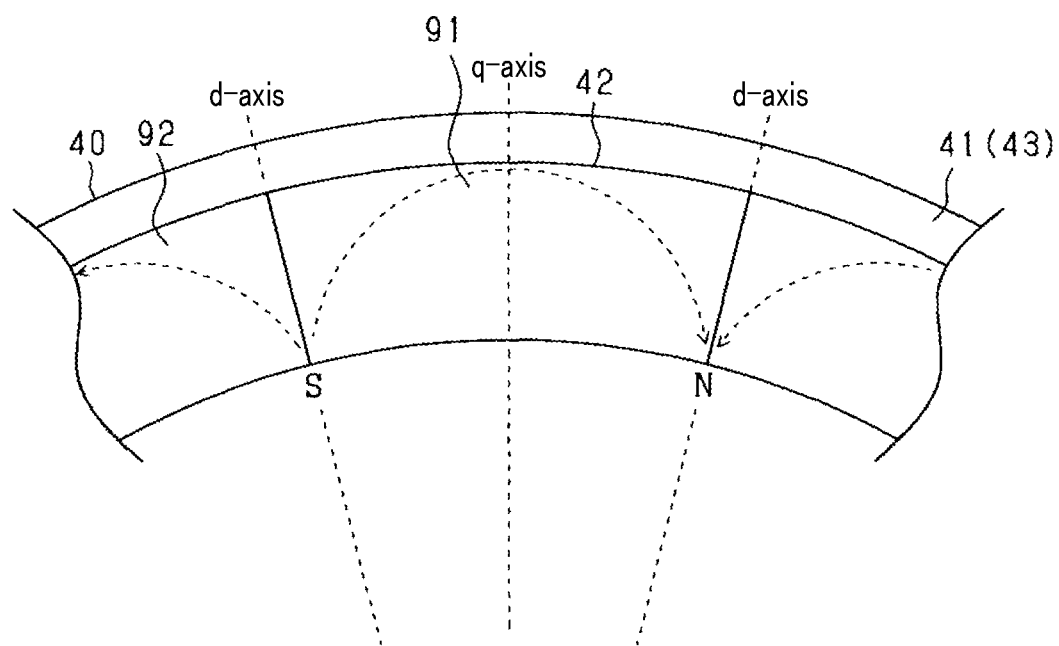
FIG. 88 is a transverse sectional view which illustrates a magnet holder and a magnet unit in another modification.

The circumferentially adjacent magnets 91 and 92 of the magnet unit 42 in the above embodiments may be, as illustrated in FIG. 88, each disposed between the d-axes located adjacent each other in the circumferential direction of the rotor 40. In this case, one (e.g., S-pole) of circumferentially opposed magnetic poles of each of the magnets 91 and 92 is different from the other magnetic pole (e.g., N-pole).

Figure 89:
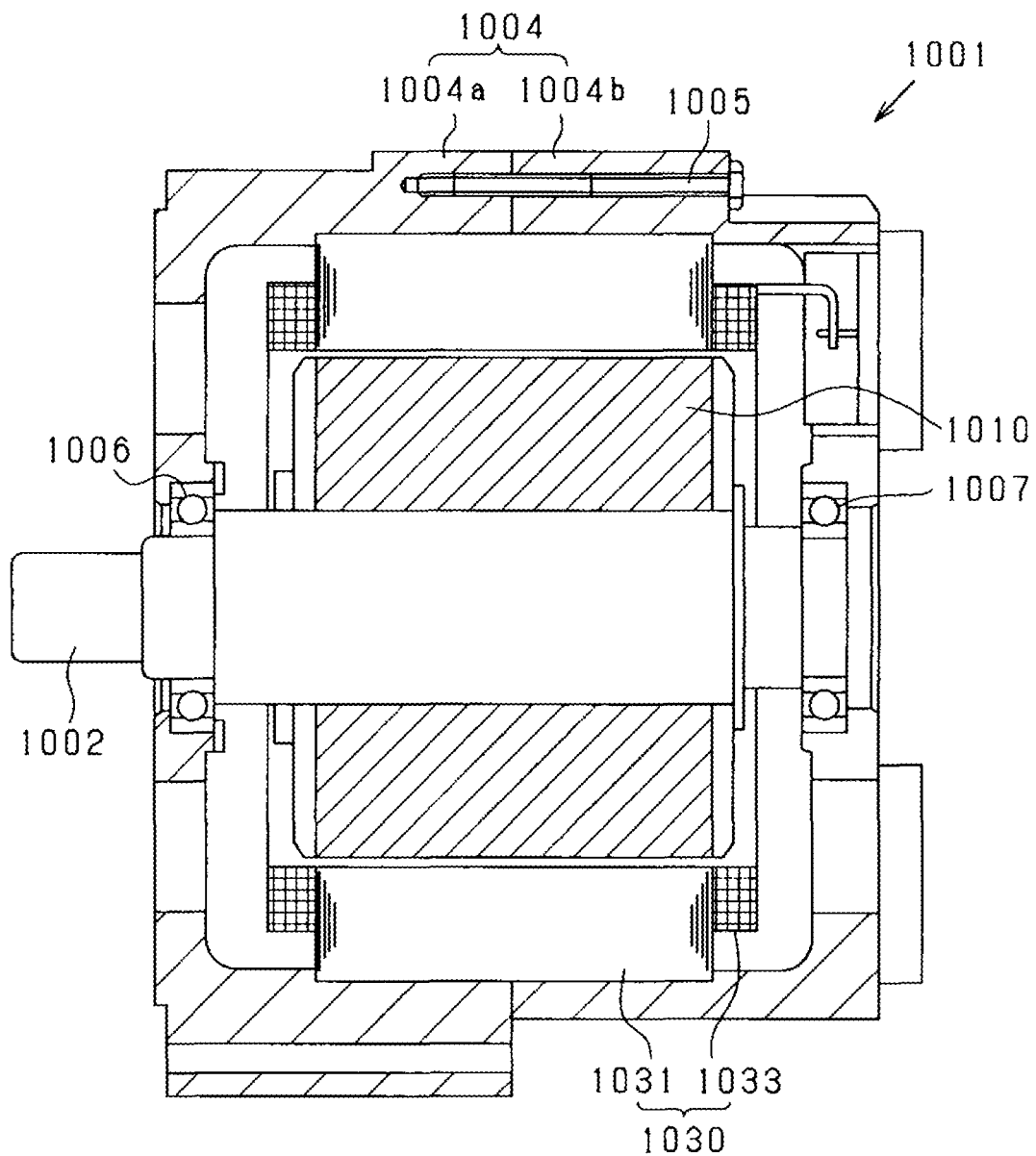
FIG. 89 is a longitudinal sectional view of a rotating electrical machine according to the third embodiment.
Figure 90:
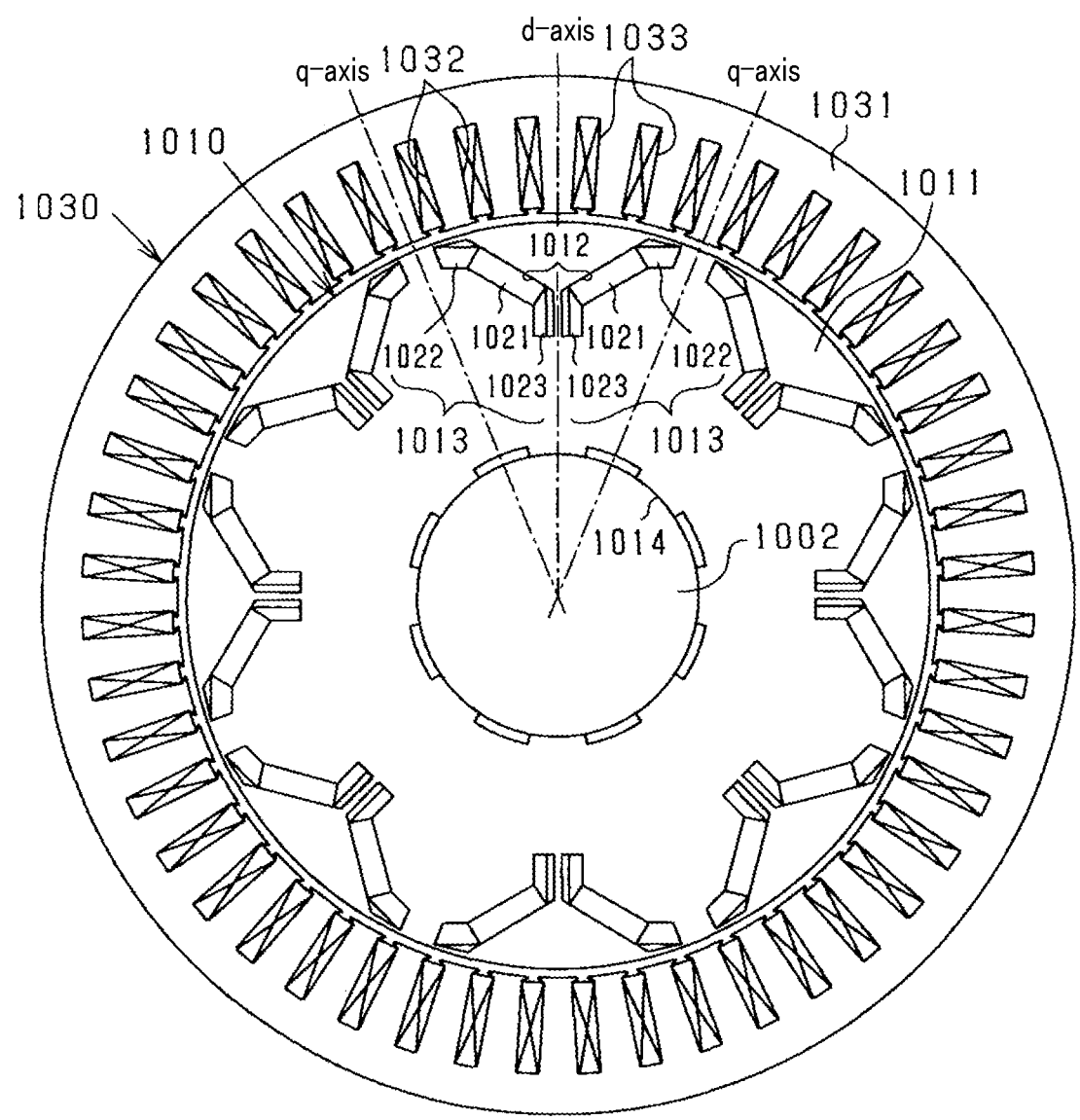
FIG. 90 is a transverse sectional view which illustrates a rotor and a stator of a rotating electrical machine in the third embodiment.

The rotating electrical machine 1001 in this embodiment (i.e., the third embodiment) is implemented by an inner-rotor interior permanent magnet rotating electrical machine (i.e., IPM motor) used as an electrical motor for vehicles. The structure of the rotating electrical machine 1001 will be described with reference to FIGS. 89 and 90. FIG. 89 is a longitudinal sectional view taken along the rotating shaft 1002 of the rotating electrical machine 1001. FIG. 90 is a transverse sectional view, as taken in a direction perpendicular to the rotating shaft 1002, which illustrates the rotor 1010 and the stator 1030. In the following discussion, a direction in which the rotating shaft 1002 extends will be referred to as an axial direction. A direction radially extending from the rotating shaft 1002 will be referred to as a radial direction. A direction extending circumferentially around the rotating shaft 1002 will be referred to as a circumferential direction.

The rotating electrical machine 1001 includes the rotor 1010 mounted on the rotating shaft 1002, the annular stator 1030 arranged around the rotor 1010, and the housing 1004 in which the rotor 1010 and the stator 1030 are disposed. The rotor 1010 and the stator 1030 are arranged coaxially with each other. The rotor 1010 is disposed to face a radially inner periphery of the stator 1030. An air gap is created between the inner periphery of the stator 1030 and the outer periphery of the rotor 1010. The housing 1004 includes a pair of hollow cylindrical housing members 1004a and 1004b with bottoms. The housing members 1004a and 1004b have openings joined together using the bolts 1005 to complete the housing 1004. The housing 1004 has disposed therein the bearings 1006 and 1007 which retain the rotating shaft 1002 and the rotor 1010 to be rotatable.

The rotor 1010 is, as illustrated in FIG. 90, equipped with the hollow cylindrical rotor core 1011 which has an inner periphery thereof secured to the rotating shaft 1002. The rotor core 1011 has formed therein a plurality of magnet housing holes 1012 which are arranged adjacent each other in the circumferential direction. The plurality of magnets 1013 (i.e., permanent magnets) are disposed in each of the magnet housing holes 1012. This layout will also be described later in detail.

The stator 1030 includes the cylindrical stator core 1031 which is made of a stack of magnetic steel plates. The stator core 1031 has formed therein a plurality of slots 1032 which extend through the stator core 1031 in the axial direction and are arranged at equal intervals away from each other in the circumferential direction. The slots 1032 has, for example, the three-phase stator winding 1033 wound therein. In this embodiment, the 48 slots 1032 are arranged at equal intervals away from each other in the circumferential direction to arrange the three-phase stator winding 1033 in a layout corresponding to the number of magnetic poles of the rotor 1010.

Figure 91:
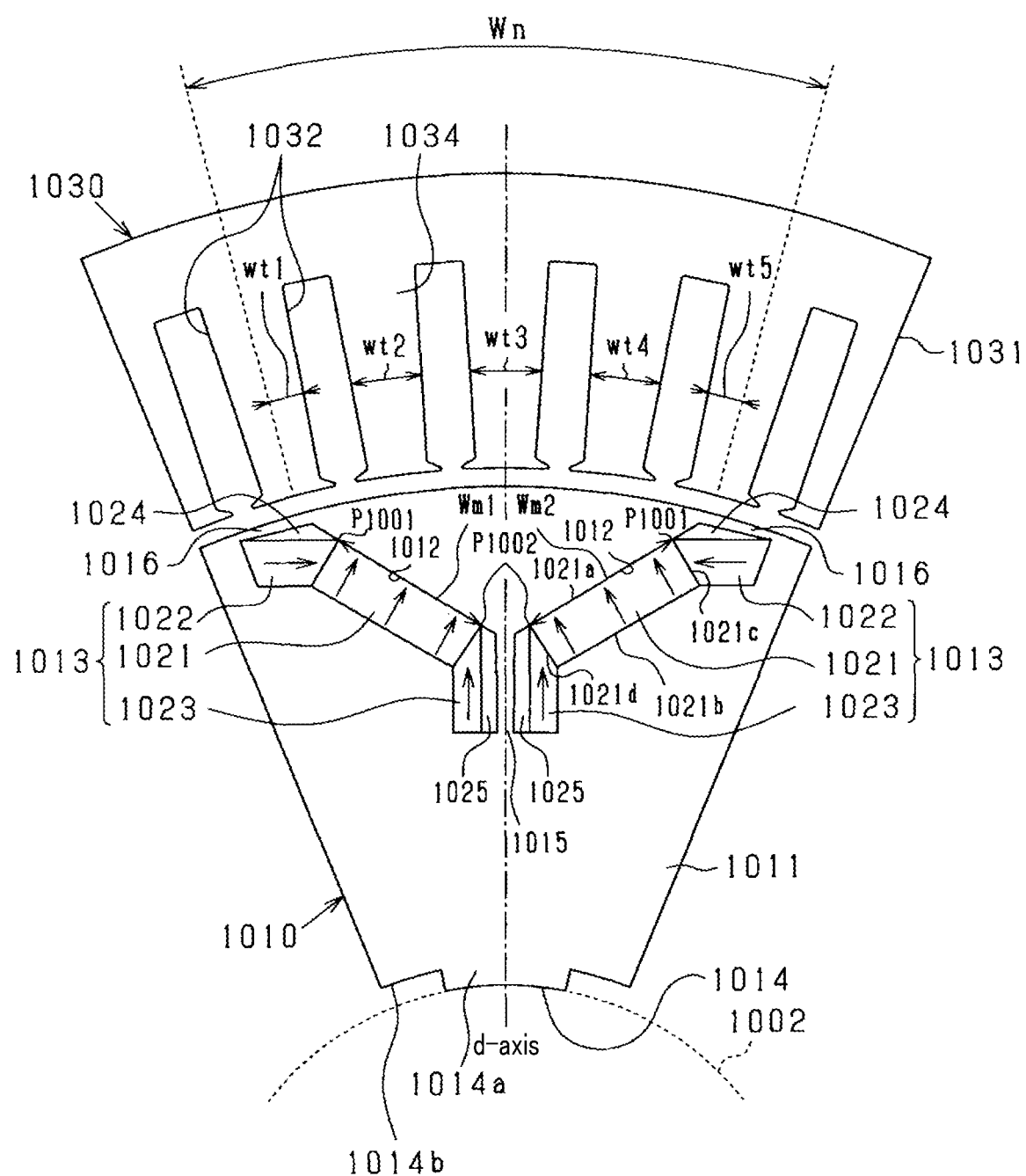
FIG. 91 is a partial plan view which illustrates a rotor and a stator of a rotating electrical machine in the third embodiment.
Figure 92:
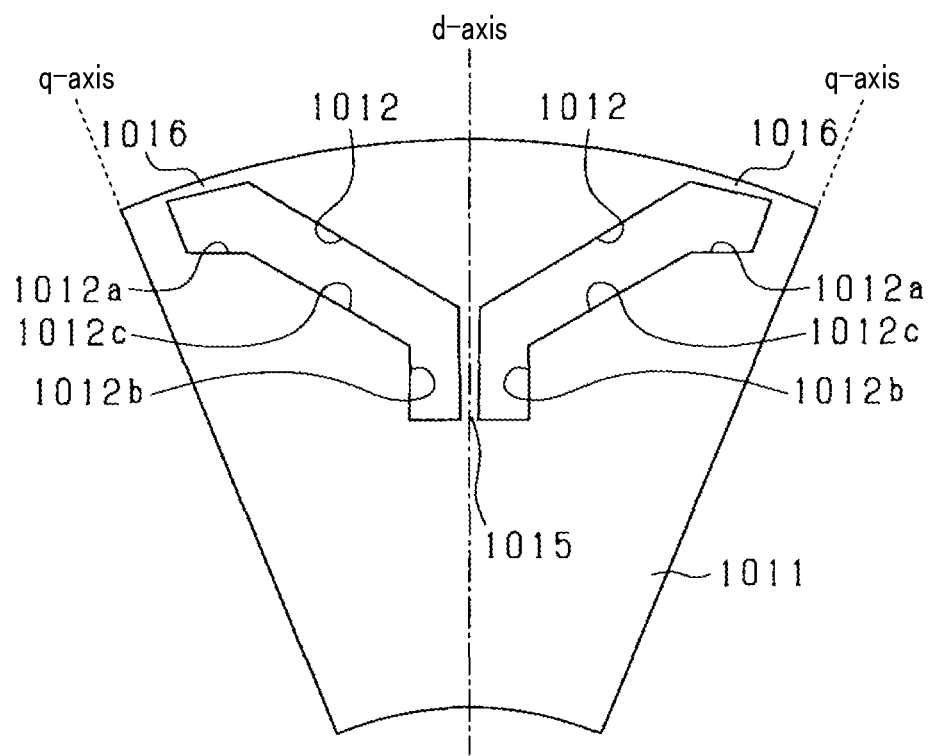
FIG. 92 is a partial plan view which illustrates a rotor core in the third embodiment.

Next, the magnet housing holes 1012 and the magnets 1013 of the rotor core 1011 will be described below in detail with reference to FIGS. 91 and 92. FIGS. 91 and 92 illustrate only one of, for example, a total of 8 magnetic poles in the rotating electrical machine 1001.

The rotor core 1011 is of a hollow cylindrical shape and made of a stack of a plurality of magnetic steel plates. The rotor core 1011 has the through-hole 1014 formed in the center thereof. The rotating shaft 1002 is fit in the through-hole 1014, thereby securing the rotor core 1011 to the rotating shaft 1002. The magnetic steel plates of the rotor core 1011 are secured to the length of the rotating shaft 1002 using a fastening means created by, for example, crimping or welding. The rotor core 1011, as can be seen in FIG. 90, has the d-axes and the q-axes. The fastening means is preferably arranged on a magnetic path on the q-axis in the rotor core 1011. The attachment of the rotor 1010 to the rotating shaft 1002 may be achieved using adhesive agent, a combination of keys or grooves, a convex and concave structure, such as a spline, or press-fitting techniques. The d-axis denotes the center axis of a magnetomotive force (i.e., magnetic flux). The q-axis denotes an axis extending magnetically perpendicular to the d-axis. In other words, on the q-axis, one of the N-pole and S-pole have the magnetic flux.

The inner peripheral surface 1014b of the through-hole 1014 has formed thereon the protrusions 1014a each of which lies on the d-axis and protrudes radially inwardly to make a physical contact with the outer periphery of the rotating shaft 1002. The protrusions 1014a are of a rectangular, trapezoidal, or triangular shape. In either case, the stator core 1011 is only required to have a structure in which the inner peripheral surface 1014b of the through-hole 1014 has the protrusions 1014a arranged adjacent each other in the circumferential direction and recesses created between the protrusions 1014a and in which the stator core 1011 contacts the outer periphery of the rotating shaft 1002 through the protrusion 1014a. Instead of the protrusions 1014a on the inner periphery of the through-hole 1014, the rotating shaft 1002 may alternatively be shaped to have protrusions formed on the outer periphery thereof.

The rotor core 1011 has formed therein a plurality of (16 in this embodiment) magnet housing holes 1012 which are located near the outer periphery thereof facing the inner periphery of the stator 1030, extend through the rotor core 1011 in the axial direction, and arranged at a given interval away from each other in the circumferential direction. Every two of the magnet housing holes 1012 are paired. Each pair of the magnet housing holes 1012 exhibits a substantially V-shape in which an interval between the magnetic housing holes 1012 increases radially outward. In terms of an interval between each of the magnet housing holes 1012 and the stator 1030, each of the magnet housing holes 1012 is arranged to have the interval between itself and the stator 1030 which increases toward the d-axis. The magnet housing holes 1012 of each pair are oriented to be symmetrical with respect to the d-axis that is the center of each magnetic pole. In this embodiment, the rotor core 1011 has a total of 8 magnet housing holes 1012 which are arranged at equal intervals away from each other in the circumferential direction.

In this embodiment, each pair of the magnet housing holes 1012 creates one magnetic pole by means of a magnet unit made of an assembly of two or more of the magnets 1013 (which will also be referred to as a magnet assembly 1013). Specifically, a total of 8 magnet assemblies 1013 create a plurality of (8 in this embodiment) magnetic poles whose polarities are alternately arranged in the circumferential direction. The magnets 1013 of each pair developing one magnetic pole are disposed to be line-symmetrical with respect to the d-axis.

The configuration of the magnet housing holes 1012 will be described below in detail. FIG. 92 illustrates the rotor 1011 in which the magnet assembly 1013 is omitted from the magnet housing holes 1012. In FIG. 92, an axis extending radially between the paired magnet housing holes 1012 represents the d-axis. Axes which lie on outer sides of the paired magnet housing holes 1012 and extend magnetically perpendicular to the d-axis represent the q-axes.

Each of the magnet housing holes 1012, as can be seen in FIG. 92, includes the first hole 1012a, the second hole 1012b, and the third hole 1012c. The first hole 1012a is located close both to the outer periphery of the rotor core 1011 and to the q-axis. The second hole 1012b is located closer both to the inner periphery of the rotor core 1011 and to the d-axis than the first hole 1012a is. The third hole 1012c connects between the first hole 1012a and the second hole 1012b. The first hole 1012a extends substantially along the outer periphery of the rotor core 1011. The second hole 1012b extends substantially along the d-axis. The third hole 1012c extends linearly to connect the first hole 1012a and the second hole 1012b together.

Each of the first, second, and third holes 1012a, 1012b, and 1012c is shaped to have a substantially rectangular transverse section extending perpendicular to the axial direction of the rotor core 1011. The length of the transverse section of the third hole 1012c is the longest among the first to third holes 1012a, 1012b, and 1012c. Unless otherwise specified, the lengthwise direction of the magnets 1013 and the magnet housing holes 1012 represents the lengthwise direction of the above transverse section.

The second holes 1012b of the paired magnet housing holes 1012 are, as clearly illustrated in FIG. 92, arranged close to each other across the d-axis. The central bridge 1015 is formed between the adjacent second holes 1012b and extends in the radial direction. The central bridge 1015 is shaped to have a narrow width, thereby causing the magnetic saturation to occur on the d-axis to prevent a magnetic circuit from being developed thereat. This minimizes an amount of leakage of magnetic flux occurring through the central bridge 1015.

The first hole 1012a of each of the magnet housing holes 1012 has a radially outer side wall located close to the outer periphery of the rotor core 1011. The outer bridge 1016 is formed between the first hole 1012a and the outer periphery of the rotor core 1011.

Each of the magnet housing holes 1012, as can be seen in FIG. 91, has disposed therein the main magnet 1021 and the auxiliary magnets 1022 which constitute the magnet assembly 1013. The main magnet 1021 is fit in the third hole 1012c. The auxiliary magnets 1022 and 1023 are fit, one in each of the first hole 1012a and the second hole 1012b. In other words, each of the magnet housing holes 1012 has the auxiliary magnets 1022 and 1023 arranged on sides of the main magnet 1021 opposed to each other in the lengthwise direction. The main magnet 1021 is shaped to have a square transverse section taken in a direction perpendicular to the axial direction of the rotor core 1011. The main magnet 1021 has the magnetic flux acting surfaces (i.e., major surfaces) 1021a and 1021b which are opposed to each other through the width thereof. The magnetic flux acting surface 1021a is located closer to the stator 1030 than the magnetic flux acting surface 1021b is. "The magnetic flux acting surface", as referred to herein, means a surface into which magnetic flux inputted or from which magnetic flux outputted.

The main magnet 1021 is magnetically oriented to have easy axes of magnetization or magnetic north lines therein, in other words, lines of magnetic force defining magnet magnetic paths which are inclined relative to the d-axis and intersect with each other in a region closer to the stator 1030 than the magnet housing hole 1012 is or a region which lies radially inwardly away from the stator 1030 and relatively near the stator 1030. The main magnet 1021 will also be referred to as a first magnet.

In this embodiment, a dimension of the main magnet 1021 for one magnetic pole in the lengthwise direction (i.e., a length of the magnetic flux acting surface 1021a) corresponds to the length Wm of a portion of the magnet unit which creates each magnetic pole. In FIG. 91, the two magnetic flux acting surfaces 1021a lie on opposite sides of each of the d-axes for one magnetic pole. The dimension Wm of a portion of the magnet unit for each magnetic pole in the circumferential direction in this embodiment is, therefore, the sum of a dimension Wm1 of the left-side magnetic flux acting surface 1021a and a dimension Wm2 of the right-side magnetic flux acting surface 1021a in the circumferential direction.

In this embodiment, the stator 1030 also has the teeth 1034 each of which is disposed between the circumferentially adjacent portions of the stator winding 1033 as an inter-conductor member. When the stator winding 1033 is electrically energized, the stator 1030 will work as one magnetic pole (i.e., a N-pole or a S-pole). The sum of widths of the teeth 1034 in the circumferential direction which lies in the range Wn that is a dimension of a circumferentially extending portion of the stator 1030 working as one magnetic pole is equivalent to a total width Wt of the teeth 1034 serving as the inter-conductor members in each magnetic pole. In the structure shown in FIG. 91, the total width Wt=Wt1+Wt2+Wt3+Wt4+Wt5 where Wt2, Wt3, and Wt4 each represent the width or dimension of each of the teeth 1034 in the circumferential direction of the stator core 1031, and Wt1 and Wt5 represent a half of the dimension of each of the teeth 1034 in the circumferential direction.

In each of the embodiments, the easy axes of magnetization in each of the magnets are oriented, after which the magnets are magnetized in a given direction. A direction of magnetic flux in the magnetized magnets represents the direction of magnetization referred to herein.

A direction of a magnetic path (i.e., a line of magnetic force) in each of the magnets which is referred to in the embodiments represents a direction in which magnetic flux extends and may be measured using a probe or mathematically calculated.

The main magnet 1021 has the first end 1021c and the second end 1021d which are opposed to each other in the lengthwise direction. The first and second ends 1021c and 1021d are located close to the q-axis and the d-axis, respectively.

The auxiliary magnets 1022 and 1023 are arranged in the first hole 1012a and the second hole 1012b, respectively, so that they are placed in direct contact with or close to the first end 1021c and the second end 1021d of the main magnet 1021. Each of the auxiliary magnets 1022 and 1023 is oriented to have produced therein easy axes of magnetization, as indicated by an arrow in FIG. 91, which intersect with easy axes of magnetization in the main magnet 1021. The auxiliary magnets 1022 and 1023 each will also be referred to as a second magnet. The main magnet 1021 and the auxiliary magnets 1022 and 1023 are made of rare-earth magnets, such as sintered neodymium magnets.

It is advisable that the magnets 1021 to 1023 be arranged in direct contact with the inner wall of the magnet housing hole 1012. Each of the magnets 1021 to 1023 may alternatively be placed at a small interval away from the inner wall of the magnet housing hole 1012 in light of a difference in coefficient of linear expansion between itself and the rotor core 1011. The magnet housing hole 1012 may have a resinous member or adhesive disposed between the inner wall thereof and each of the magnets 1021 to 1023 to achieve firm securement of the magnets 1021 to 1023 in the magnet housing hole 1012. The use of the resinous member or adhesive to firmly fix the magnets 1021 to 1023 minimizes mechanical vibration or noise and also reduce a deviation of an energized phase of the stator 1030 from the rotor 1010.

The main magnet 1021 is designed to have a volume or size which is the largest among the magnets 1021 to 1023. The main magnet 1021 is a magnet provided depending upon the polarity of each magnetic pole and has a rectangular transverse section.

The paired main magnets 1021 which create one magnetic pole (i.e., a N-pole in the structure of FIG. 91) have easy axes of magnetization which are oriented to a corresponding one of the d-axes and inclined at an angle to that d-axis.

Particularly, each of the main magnet 1021 has an easy axis of magnetization, i.e., a crystallite orientation in which the main magnet 1021 is easy to magnetize. Such an easy axis of magnetization extends perpendicular to the first and second magnetic flux acting surfaces 1021a and 1021b of the main magnet 1021, in other words, parallel to the surfaces of the first and second ends 1021c and 1021d. In a condition where the main magnet 1021 is disposed in the magnet housing hole 1012, the easy axis of magnetization slants at a given angle excluding zero to the d-axis. FIG. 91 demonstrates the N-magnetic pole. The easy axes of magnetization of the paired main magnets 1021 are oriented toward the d-axis and extend toward the outer periphery of the rotor core 1011.

In each of the above embodiments, the easy axis of magnetization and the length or direction of the magnetic path are assumed to be referred to or measured in the absence of a magnetic flux-producing unit (e.g., an excited armature winding) which generates a magnetic field stronger than a coercive force.

The direction of the easy axes of magnetization in the magnet, as referred to herein, is a direction in which the orientation ratio (or percentage) which indicates the degree to which easy axes of magnetization of crystals are aligned with each other or a direction of an average of magnetic orientations in the magnet is 50% or more.

For example, if there are six easy axes of magnetization in a magnet, and five of them are oriented in a first direction, while the rest is oriented in a second direction extending at 90° to the first direction, the orientation ratio will be 5/6. Alternatively, if the rest is oriented in a third direction extending at 45° to the first direction, cos 45°=0.707. Thus, the orientation ratio will be (5+0.707)/6.

An average direction in which all easy axes of magnetization (or magnetic paths) are oriented in a magnet or a direction with which the most common easy axes of magnetization are aligned (i.e., the orientation ration is 50% or more) sometimes represents an easy axis of magnetization (i.e., a direction in which a magnetic path extends) referred to in this disclosure.

Each of the main magnets 1021 has a high orientation ratio for the magnetic flux acting surfaces 1021a and 1021b having a transverse section with long sides. The magnetic orientation in each of the main magnets 1021 is directed perpendicular to the magnetic flux acting surfaces 1021a and 1021b. The main magnet 1021 is, however, designed to have a magnetic flux emerge therefrom in a direction perpendicular to the magnetic flux acting surfaces 1021a and 1021b as long as there are a few crystal components magnetically oriented perpendicular to the magnetic flux acting surfaces 1021a and 1021b.

The auxiliary magnets 1022 and 1023 are installed in spaces where there is no main magnet 1021 in the magnet housing hole 1012 and placed in direct contact with or in the vicinity of the surfaces of the first end 1021c and 1021d of the main magnet 1021. The auxiliary magnets 1022 and 1023 have easy axes of magnetization which are different in orientation from that in the main magnet 1021. Specifically, the easy axes of magnetization (i.e., directions of magnetization or magnetic orientation) in the auxiliary magnets 1022 and 1023 are oriented perpendicular to the first end 1021c and the second end 1021d of the main magnet 1021. In the structure illustrated in FIG. 91, the easy axes of magnetization in the auxiliary magnets 1022 and 1023 extend toward the first end 1021c and the second end 1021d.

The angle which the easy axis of magnetization of the main magnet 1021 makes with the easy axis of magnetization of the auxiliary magnet 1022 on the first end 1021c, in other words, an angle that a forward direction of a magnet magnetic path created in the main magnet 1021 makes with that created in the auxiliary magnet 1022 is set to an acute angle (i.e., less than) 90°. Similarly, the angle which the easy axis of magnetization of the main magnet 1021 makes with the easy axis of magnetization of the auxiliary magnet 1023 on the second end 1021d, in other words, an angle that a forward direction of a magnet magnetic path created in the main magnet 1021 makes with that created in the auxiliary magnet 1023 is set to an acute angle (i.e., less than 90°).

In this embodiment, the auxiliary magnets 1022 and 1023 are disposed on opposite sides of the length of the main magnet 1021, so that the main magnet 1021 is securely positioned by the auxiliary magnets 1022 and 1023. This eliminates the need for positioning protrusions on the inner peripheral wall of the magnet housing holes 1012 for achieving securement of the main magnet 1021 and also alleviate the need for designing the structure of the stator 1030 in light of a difference in coefficient of linear expansion between the positioning protrusions on the rotor core 1011 and the main magnet 1021.

The rotor core 1011 is, as described above, designed to have the magnet housing holes 1012 each of which has the first hole 1012a. The first hole 1021a has the radially outer wall disposed close to the outer periphery of the rotor core 1011 to form the outer bridge 1016 between the first hole 1012a and the outer periphery of the rotor core 1011. The outer bridge 1016 is shaped to have a narrow width, thereby minimizing a risk that the magnetic flux produced by the auxiliary magnet 1022 may be self-short circuited around the outer periphery of the rotor core 1011.

Figure 93A:
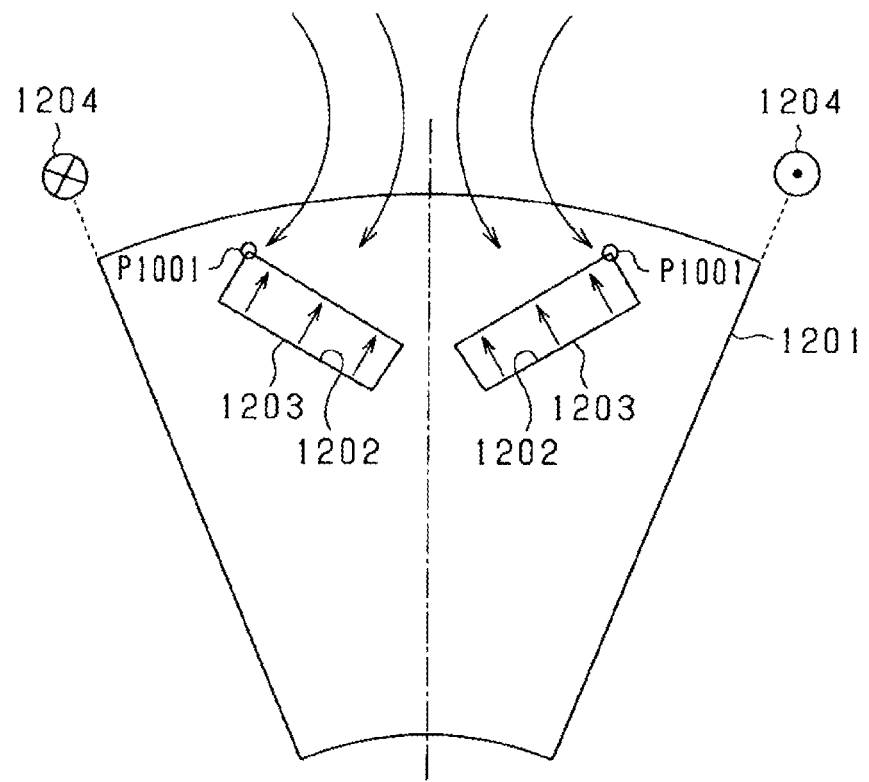
FIGS. 93(a) and 93(b) are views for explaining effects of demagnetizing field on magnets in the third embodiment.
Figure 93B:
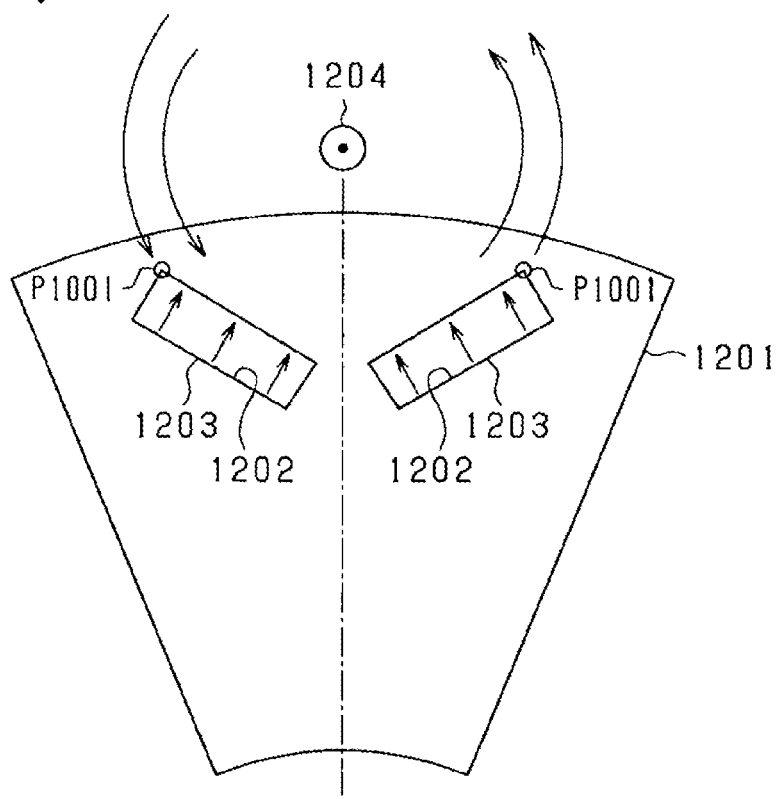
Figure 94:
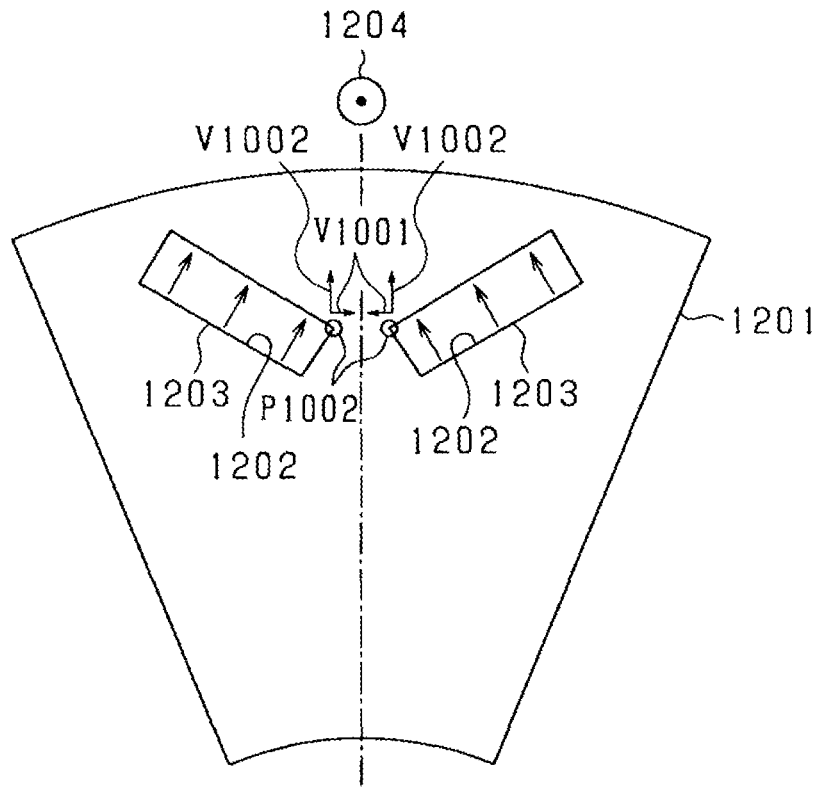
FIG. 94 is a view which explains effects of mutual interference of magnetic fluxes on magnets in the third embodiment.

The magnet assembly 1013 disposed in each of the magnet housing holes 1012 is equipped with the auxiliary magnets 1022 and 1023 in addition to the main magnet 1021, thereby increasing the degree of resistance to demagnetization in the first end 1021c and the second end 1021d disposed on the opposite sides of the length of the main magnet 1021, i.e., the first end 1021c and the second end 1021d. In other words, the auxiliary magnets 1022 and 1023 magnetically serve to increase the length of a magnet magnetic path in the magnet housing hole 1012, thereby increasing the magnet permeance to increase the resistance to facing magnetic field, such as demagnetizing field. This respect will be described below in detail. FIGS. 93(a), 93(b), and 94 demonstrate a comparative example of a rotor in which magnets are typically arranged in a V-shape. The features of the rotor 1010 in this embodiment will be discussed. The rotor in FIGS. 93(a), 93(b), and 94 has the rectangular magnet housing holes 1202 formed in the rotor core 1201. The magnet housing holes 1202 are arranged in a V-shape to be symmetrical with respect to d-axis. The two magnets 1203 are disposed in the magnet housing holes 1202 to have easy axes of magnetization inclined at an angle to the d-axis.

FIGS. 93(a) and 93(b) demonstrate a rotating magnetic field generated in a stator as a demagnetizing field on the outer periphery of the rotor core 1201 upon electrical excitation of the conductors 1204 of a stator winding. Specifically, FIG. 93(a) illustrates the excitation of the conductors 1204 on the q-axes. FIG. 93(b) illustrates the excitation of the conductor 1204 on the d-axis. In each of the conditions in FIGS. 93(a) and 93(b), the rotating magnetic field, as created by the stator, acts as the demagnetizing field. The demagnetizing field leads to a risk that the corner P1001 of each of the permanent magnets 1203 which is located close to the q-axis may be demagnetized.

In order to alleviate the above drawback, the auxiliary magnet 1022 which is disposed close to or in contact with the first end 1021c of the main magnet 1021 functions in the following way. The auxiliary magnet 1022 has the easy axis of magnetization which is, as can be seen in FIG. 91, oriented more perpendicular to the q-axis than the main magnet 1021 is, so that the magnetic flux generated by the auxiliary magnet 1022 works to reinforce the magnetic flux on the end of the main magnet 1021 close to the q-axis. Specifically, the auxiliary magnet 1022 delivers the magnetic flux against a counter magnetic flux from the stator 1030, thereby increasing the resistance to demagnetization near the q-axis.

The auxiliary magnet 1022 is arranged to face the surface of the first end 1021c of the main magnet 1021, so that of magnet magnetic paths facing the surface of the first end 1021c of the main magnet 1021, one passing through the corner P1001 close to the stator 1030 is longer than those of the others. This greatly reduces the demagnetization on the corner P1001 that is the highest probability of demagnetization on the first end 1021c of the main magnet 1021. The magnetic paths in the auxiliary magnets 1022 all may have the same length anywhere therein.

In the structure in FIG. 94, each of the permanent magnets 1203 have the easy axes of magnetization which are inclined at an angle to the d-axis and have extensions oriented to intersect with the d-axis. The magnetic fluxes in the right and left permanent magnets 1203 are, therefore, oriented to the d-axis on the N-pole, thus resulting in a risk that they may interfere with each other and thus demagnetized. More specifically, the magnetic fluxes in the right and left permanent magnets 1203 include flux vectors V1001 extending perpendicular to the d-axis and flux vectors V1002 extending parallel to the d-axis. This may cause the flux vectors V1001 oriented perpendicular to the d-axis to interfere each other, which results in demagnetization on the corners P1002 of the permanent magnets 1203 close to the d-axis.

In order to minimize the above problem, the auxiliary magnet 1023 arranged adjacent the end of each of the main magnets 1021 which is located close to the d-axis works in the following way. Each of the auxiliary magnets 1023, as illustrated in FIG. 91, has the easy axis of magnetization extending substantially parallel to the d-axis, so that the magnetic flux generated by the auxiliary magnet 1023 functions to reinforce the magnetic flux on the second end 1021d of the main magnet 1021. The auxiliary magnets 1023 work to create magnetic fluxes large enough to counter magnetic fluxes generated by the paired right and left main magnets 1021, thereby enhancing the resistance to demagnetization near the d-axis.

When a required degree of torque outputted by the rotating electrical machine 1001 is determined, an effective density of magnetic flux of a magnet is multiplied by an area of a surface of the magnet from which the magnetic flux emerges to derive a magnetic force produced by the magnet. A magnetic force oriented perpendicular to the d-axis usually depends upon a magnetic force produced by the magnet and an inclination of the magnet to the d-axis. The smaller an angle which the V-shaped arranged magnet housing holes 1012 make with each other, that is, an angle at which the length of the main magnet 1021 is inclined to the d-axis, the larger beneficial effects offered by the auxiliary magnets 1023 will be.

Each of the auxiliary magnets 1023 is arranged to face the surface of the second end 1021d of a corresponding one of the main magnets 1021, so that of magnet magnetic paths facing the surface of the second end 1021d of the main magnet 1021, one passing through the corner P1002 close to the stator 1030 is longer than those of the others. This greatly reduces the demagnetization on the corner P1002 that is the highest probability of demagnetization on the second end 1021d of the main magnet 1021. The magnetic paths in the auxiliary magnets 1023 all may have the same length anywhere therein.

In a typical structure, each of the magnet housing holes 1012 has a void space which is unoccupied by the main magnet 1021 or a dead space which is unoccupied by the main magnet 1021 and in which solid adhesive lower in magnetism than the rotor core 1011 or a non-magnetic member is disposed. Each of the magnet housing holes 1012 in this embodiment is, however, designed to have the auxiliary magnets 1022 and 1023 disposed therein without any dead spaces. This layout reinforces the magnetic flux without need for increasing the size of the stator 1030.

Although not illustrated, the magnet assembly 1013 creating the S-pole has the main magnet 1021 and the auxiliary magnets 1022 and 1023 whose easy axes of magnetization are oriented in a direction opposite a direction in which easy axes of magnetization in the main magnet 1021 and the auxiliary magnets 1022 and 1023 of the magnet assemblies 1013 creating the N-pole.

A portion of each of the magnet housing holes 1012 unoccupied by the magnet assembly 1013 serves as a flux barrier which minimizes a risk of a self short-circuit of a magnet-produced magnetic flux in the rotor 1010. In the structure of FIG. 91, each of the magnet housing holes 1012 has the outer flux barrier 1024 disposed closer to the outer periphery of the rotor core 1011 than the auxiliary magnet 1022 is. The outer flux barrier 1024 serves to eliminate a risk that the magnetic flux, as created near the end of the auxiliary magnet 1022, may be self short-circuited on the outer periphery of the rotor core 1011 which faces the stator 1030. The outer flux barrier 1024 also serves to reduce demagnetization of the auxiliary magnet 1022 due to the demagnetizing field from the stator 1030. The outer flux barrier 1024 may be realized by a void space or a non-magnetic material.

The inner flux barrier 1025 is disposed in a portion of the second hole 1012b of each of the magnet housing holes 1012 which is located closer to the d-axis than the auxiliary magnet 1023 is. The second hole 1012*b* of each of the magnet housing holes 1012 will be referred to as a d-axis side extension in which the auxiliary magnet 1023 and the inner flux barrier 1025 are arranged. The inner flux barrier 1025 is located closer to the d-axis than the auxiliary magnet 1023 is. The inner flux barriers 1025 serve to minimize magnetic fluxes flowing perpendicular to the d-axis in the auxiliary magnets 1023 arranged opposed to each other across the d-axis and also function to reduce the inductance on the d-axis, thereby ensuring the stability in producing reluctance torque. The inner flux barrier 1025 may be realized by a void space or a non-magnetic material.

It is not essential that the auxiliary magnets 1022 and 1023 are demagnetized. This is because the main magnet 1021 of each of the magnet assemblies 1013 has a surface which is placed in contact with the rotor core 1011 and functions as a main flux output surface, and the auxiliary magnets 1022 and 1023 mainly play a role in improving the permeance of the magnet assembly 1013. Accordingly, each of the auxiliary magnets 1022 and 1023 in this embodiment is made of a neodymium magnet in which the magnetic flux density Br is higher than that of the main magnet 1021, and the intrinsic coercive force iHc is lower than that of the main magnet 1021. Each of the auxiliary magnets 1022 and 1023 may be made from a mixture of different types of material, such as a mixture of materials of a neodymium magnet and a ferrite magnet.

Magnets which are lower in magnetic coercive force than neodymium magnets include samarium magnets, ferrite magnets, FCC magnets, and alnico magnets in descending order of the degree of coercive force. For instance, when the main magnet 1021 is made of a samarium magnet, the auxiliary magnets 1022 and 1023 are made of ferrite magnets, thereby offering the above beneficial advantages.

The demagnetization of a magnet is usually avoided by increasing the thickness of a portion of the magnet on which a high degree of demagnetizing field acts, producing the magnet to contain an increased quantity of heavy rare earth, or making the magnet to have fine crystals to increase the coercive force. The structure of the rotating electrical machine 1001 in this embodiment is capable of decreasing the demagnetizing field substantially by half, thus eliminating the need for use of heavy rare earth in producing the rotating electrical machine 1001. This enables, for example, parts of vehicles to be produced to contain an increased amount of neodymium having a high density of magnetic flux without use of valuable heavy rare earth, which will result in a decrease in production cost of the rotating electrical machine 1001 which is capable of being manufactured with substantially the same volume of magnet material as in typical structures, but increasing the degree of output torque to be higher by 30% or more than in typical structures.

This embodiment described above offers the following beneficial advantages.

Each of the magnet assemblies 1013 of the rotor 1010, as described above, includes the auxiliary magnet 1022 in addition to the main magnet 1021 which generates a magnetic flux according to a magnetic polarity. The auxiliary magnet 1022 is arranged in the vicinity of or direct contact with the first end 1021*c* of the main magnet 1021 (i.e., an end of the main magnet 1021 close to a boundary between magnetic poles) and has the easy axis of magnetization oriented to intersect with the easy axis of magnetization of the main magnet 1021. This structure causes the auxiliary magnet 1022 to reinforce the magnetic flux appearing on the first end 1021*c* of the main magnet 1021, thereby increasing the resistance to demagnetization of the main magnet 1021 which arises from a demagnetizing field from the stator 1030.

The auxiliary magnets 1023 are arranged in direct contact with or in the vicinity of the second ends 1021*d* of the paired main magnets 1021 to have the easy axes of magnetization oriented to intersect with the easy axes of magnetization in the main magnet 1021. This reinforces the magnetic flux on the end of each of the paired main magnets 1021 which is close to the d-axis. In other words, the resistance to demagnetization arising from interference between the magnetic fluxes near the d-axis is enhanced to minimize the demagnetization of the main magnet 1021.

There is a high risk that the first end 1021*c* of each of the main magnets 1021 may be greatly demagnetized on the corner P1001 facing the q-axis. The auxiliary magnet 1022 is arranged to face the first end 1021*c* of the main magnet 1021, thereby increasing the length of a magnet magnetic path passing through the corner P1001 of the main magnet 1021 to be larger than that of a magnet magnetic path passing through a portion of the first end 1021*c* of the main magnet 1021 other than the corner P1001. In other words, the corner P1001 is used as a flux reinforcing point. The auxiliary magnet 1022 works to reinforce the magnetic flux on the corner P1001. This minimizes a risk of demagnetization on the first end 1021*c* of the main magnet 1021.

There is also a high risk that the d-axis facing second end 1021*d* of each of the main magnets 1021 may be greatly demagnetized on the corner P1002 which is located closer to the stator 1030 than another corner of the second end 1021*d* is. The auxiliary magnet 1023 is arranged to face the second end 1021*c* of the main magnet 1021, thereby increasing the length of a magnet magnetic path passing through the corner P1002 of the main magnet 1021 to be larger than that of a magnet magnetic path passing through a portion of the second end 1021*d* of the main magnet 1021 other than the corner P1002. In other words, the corner P1002 is used as a flux reinforcing point. The auxiliary magnet 1023 works to reinforce the magnetic flux on the corner P1002. This minimizes a risk of demagnetization on the second end 1021*d* of the main magnet 1021.

The second hole 1012*b* (i.e., the d-axis side extension) of each of the magnet housing holes 1012 has the auxiliary magnet 1023 and the inner flux barrier 1025 arranged therein. This enables the volume of material of the auxiliary magnet 1023 arranged closer to the d-axis than the main magnet 1021 is to be minimized and also offers desired beneficial advantages, which also enables the production cost of the electrical rotating machine 1001 to be reduced.

Each of the auxiliary magnets 1022 and 1023 is made to have the intrinsic coercive force iHc which is lower than that of the main magnet 1021. This enables the auxiliary magnets 1022 and 1023 to be made of inexpensive magnets, but the auxiliary magnets 1022 and 1023 work to reinforce the magnetic flux in the main magnet 1021.

The main magnet 1021 may alternatively have the intrinsic coercive force iHc which is lower than that of the auxiliary magnets 1022 and 1023. This enables the main magnet 1021 to be made of an inexpensive magnet, i.e., produced at a decreased cost. Most magnet magnetic flux depends upon an area of an outer surface of the main magnet 1021. The above structure is useful in terms of cost-effectiveness.

The auxiliary magnets 1022 and 1023 designed to produce the intrinsic coercive force higher than that produced by the main magnet 1021 will have an enhanced resistance to demagnetization and thus are suitable for the rotor 1010 exposed to a strong demagnetizing field from the stator 1030.

The auxiliary magnets 1022 and 1023 arranged on opposite sides of the main magnet 1021 may be designed to have degrees of intrinsic coercive force different from each other. In this case, when degrees of effect of demagnetizing fields on the ends of main magnet 1021 close to the d-axis and the q-axis are different from each other, the auxiliary magnets 1022 and 1023 may be designed depending upon the degrees of effect of the demagnetizing field.

The rotor core 1011, as descried above, has the protrusions 1014a formed on the inner periphery of the through-hole 1014. Each of the protrusions 1014a lies on the d-axis and radially inwardly projects to make a mechanical contact with the outer periphery of the rotating shaft 1002. This causes the magnet assemblies 1013 to absorb stress transmitted radially outwardly from the inner periphery of the through-hole 1014 of the rotor core 1011, thereby minimizing position-misalignment of the magnet assemblies 1013 and also alleviating a risk that magnetic characteristics of the magnet assemblies 1013 undesirably change.

Modifications of the rotor 1010 in the third embodiment will be described below. Each modification will be discussed in terms of parts of the rotor 1010 different from those in FIG. 89. Figures which will be used to describe the rotor 1010 illustrate only the rotor 1010, but however, the rotor 1010 is actually arranged radially inside the stator 1030 and faces the inner periphery of the stator 1030 in the same way as referred to above.

Fifteenth Modification

Figure 95:
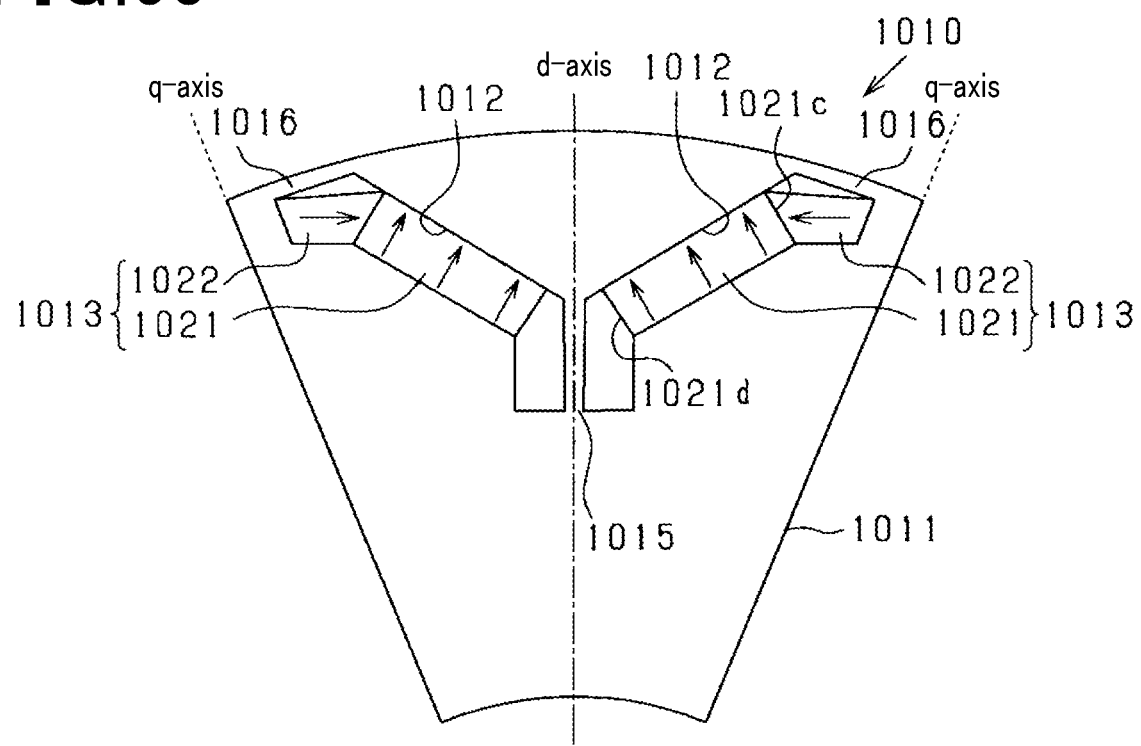
FIG. 95 is a partial plan view which illustrates a rotor in the fifteenth modification.

FIG. 95 illustrates the rotor 1010 in the fifteenth modification which has only the auxiliary magnet 1022 arranged adjacent the first end 1021c of each of the main magnets 1021. For instance, in a case where the paired right and left main magnets 1021 generate low degrees of magnetic force which act to demagnetize one another, one of the auxiliary magnets 1023 which is arranged close to the d-axis may be omitted.

Sixteenth Modification

Figure 96:
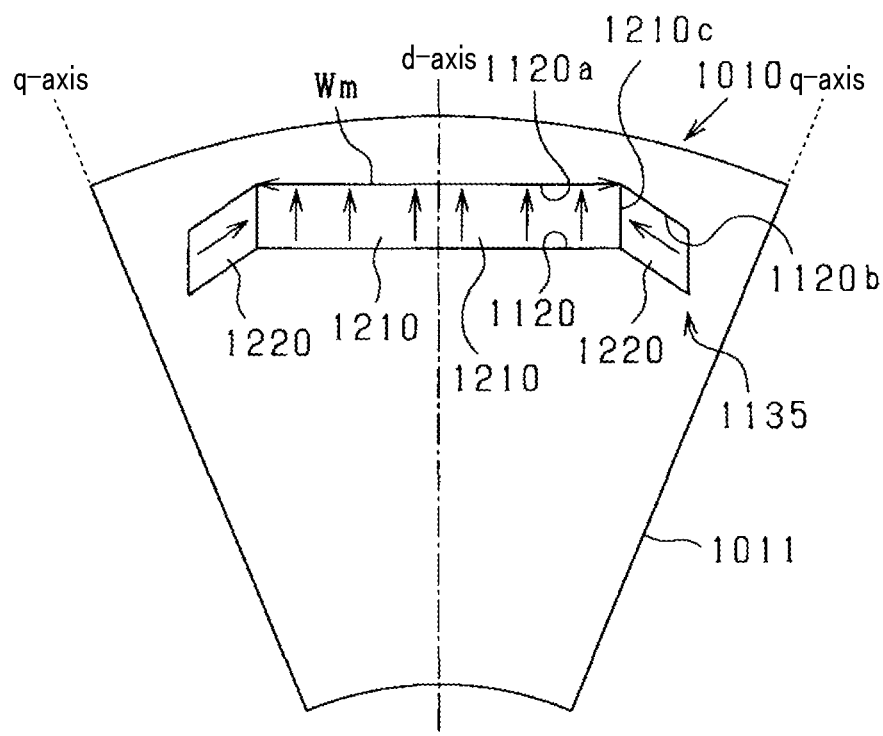
FIG. 96 is a partial plan view which illustrates a rotor in the sixteenth modification.

FIG. 96 illustrates the rotor 1010 in the sixteenth modification. The rotor core 1011 has eight magnet housing holes 1120 formed in portions near the outer periphery thereof which faces the inner periphery of the stator 1030. The magnet housing holes 1120 extend through the rotor core 1011 in the axial direction and are arranged at a given interval away from each other in the circumferential direction.

In the sixteenth modification, each of the magnet housing holes 1120 has disposed therein the magnet assembly 1135 which creates one magnetic pole. The eight magnet assemblies 1135 create a plurality of (i.e., eight in this embodiment) magnetic poles whose polarities alternate in the circumferential direction. The magnet assemblies 1135 which are paired to form one magnetic pole (i.e., N-pole demonstrated in FIG. 96) are arranged to be line-symmetrical with respect to the d-axis.

Each of the magnet housing holes 1120 includes the first hole 1120a and the second holes 1120b. The first hole 1120a extends over the d-axis that is the center of a magnetic pole and has a length extending perpendicular to the d-axis. The second holes 1120b extend from opposite ends of the first hole 1120a and are inclined toward the rotating shaft 1002 at a given angle to the first hole 1120a. The first hole 1120a has disposed therein the main magnet 1210 shaped to have a rectangular transvers section. The auxiliary magnets 1220 are disposed one in each of the second holes 1120b. The auxiliary magnet 1220 may be, like in FIG. 95, arranged adjacent only the first end 1210c of the main magnet 1210. In this modification, a dimension of the main magnet 1210 in a lengthwise direction thereof corresponds to the dimension Wm of a portion of a magnet unit for each magnetic pole in the circumferential direction.

Seventeenth Modification

Figure 97:
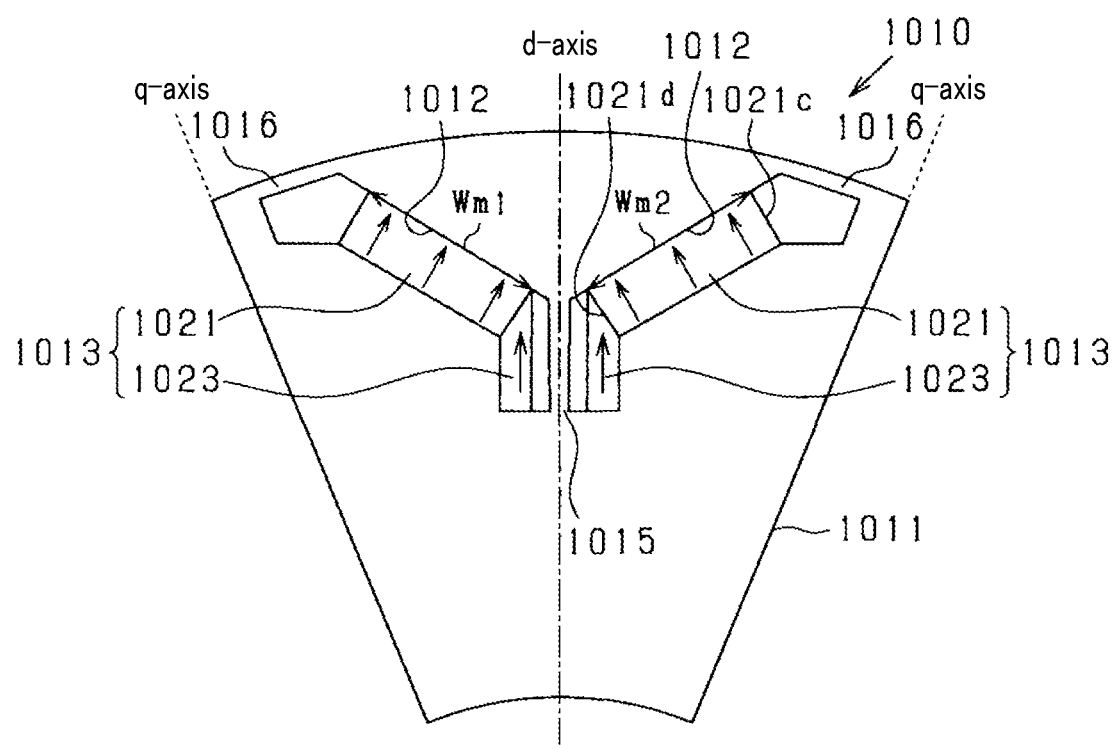
FIG. 97 is a partial plan view which illustrates a rotor in the seventeenth modification.

FIG. 97 illustrates the rotor 1010 in the seventeenth modification. The rotor 1010 has the auxiliary magnet 1023 arranged in contact with or close to only the second end 1021d of each of the main magnets 1021. For instance, when the degree of demagnetizing flux from the stator 1030 is weak, the auxiliary magnet 1022 disposed close to the q-axis may be omitted. In this modification, a dimension of the paired main magnets 1021 for one magnetic pole in the lengthwise direction, that is, a dimension of magnetic flux acting surfaces of the main magnets 1021 corresponds to the dimension Wm of a portion of a magnet unit for each magnetic pole in the circumferential direction. The structure in FIG. 97 has a pair of right and left magnetic flux acting surfaces for one magnetic pole which are arranged on opposite sides of the d-axis. The dimension Wm of a portion of the magnet unit for each magnetic pole is, thus, equivalent to the sum of the dimension Wm1 of the left magnetic flux acting surface and the dimension Wm2 of the right magnetic flux acting surface.

Eighteenth Modification

Figure 98:
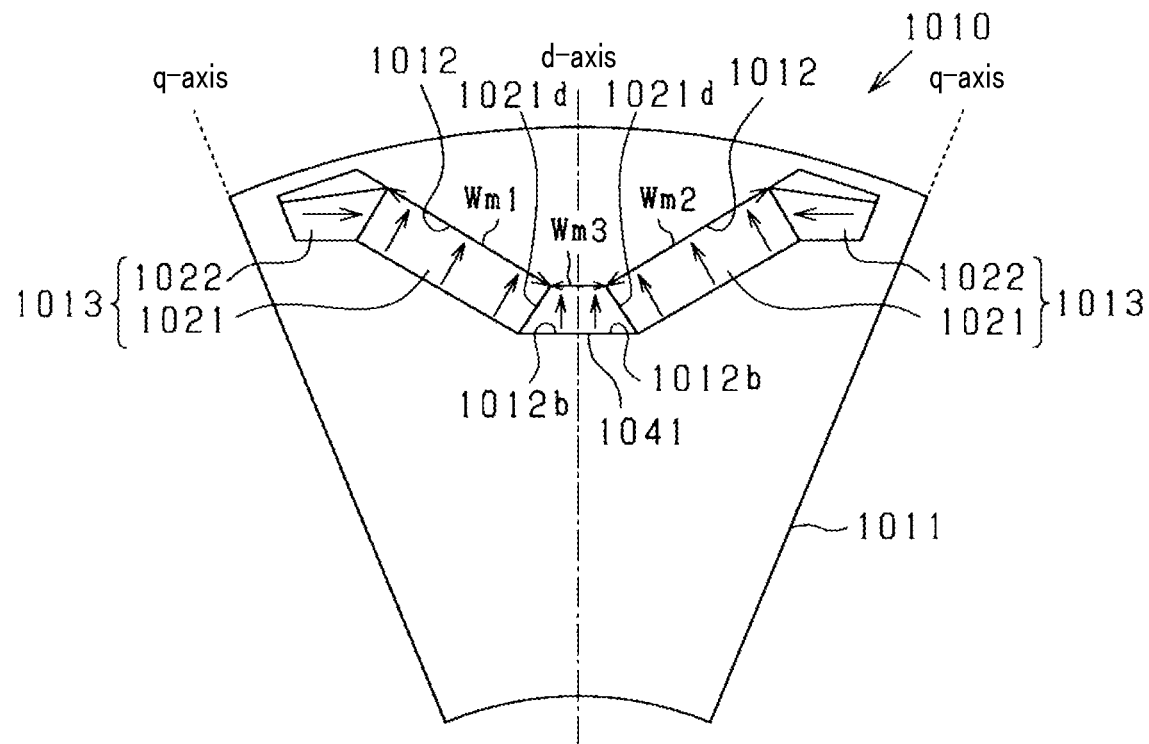
FIG. 98 is a partial plan view which illustrates a rotor in the eighteenth modification.

FIG. 98 illustrates the rotor 1010 in the eighteenth modification. The rotor 1010 has formed therein the paired magnet housing holes 1012 each of which includes the second hole 1012b. The second holes 1012b of the paired magnet housing holes 1012 are joined together to communicate with each other. In other words, the paired magnet housing holes 1012 are shaped to extend continuously across the d-axis that is the center of a magnetic pole. The paired magnet housing holes 1012 include the second holes 1012b which are arranged between the paired right and left main magnets 1021 and in which the auxiliary magnets 1041 are mounted. Each of the auxiliary magnets 1041 is arranged in contact with or close to the second end 1021d of a corresponding one of the main magnets 1021 to have an easy axis of magnetization oriented parallel to the d-axis. The magnetic flux generated by each of the auxiliary magnets 1041 serves to reinforce the magnetic flux on the second end 1021d of a corresponding one of the main magnets 1021. In other words, the auxiliary magnets 1041, like the auxiliary magnets 1023 referred to in FIG. 89, work to deliver magnetic fluxes to compensate for facing magnetic fluxes produced by the paired main magnets 1021, thereby enhancing the resistance to demagnetization around the d-axis.

In this modification, a dimension of the main magnets 1021 for one magnetic pole in the lengthwise direction, that is, a dimension of magnetic flux acting surfaces corresponds to the dimension Wm of a portion of a magnet unit for each magnetic pole in the circumferential direction. The structure in FIG. 98 has the paired right and left main magnets 1021 for one magnetic pole which are arranged across the d-axis. The dimension Wm of a portion of the magnet unit for each magnetic pole is, thus, equivalent to the sum of the dimension Wm1 of the left magnetic flux acting surface, the dimension Wm2 of the right magnetic flux acting surface, and the total dimension Wm3 of stator-facing surfaces of the auxiliary magnets 1041.

Nineteenth Modification

Figure 99:
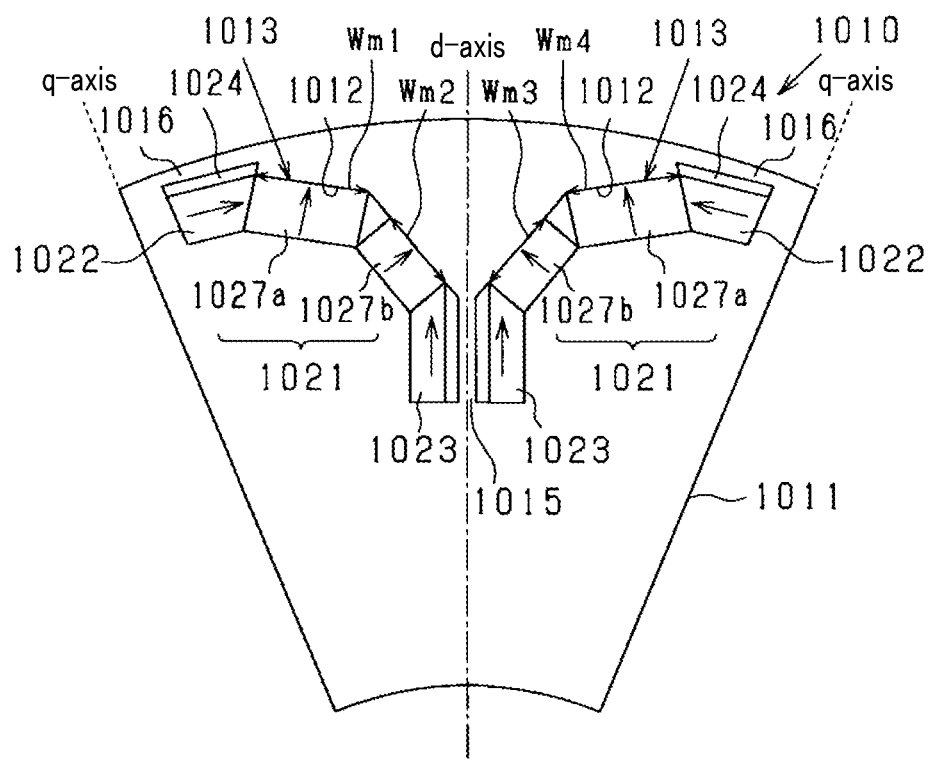
FIG. 99 is a partial plan view which illustrates a rotor in the nineteenth modification.

FIG. 99 illustrates the rotor 1010 in the nineteenth modification. The rotor 1010 has the main magnets 1021 each of which is made of a plurality of magnet segments 1027a and 1027*b* which are separate from each other in a direction from the q-axis to the d-axis. The magnet segments 1027*a* and 1027*b* have easy axes of magnetization which are different in orientation from each other. Each of the magnet segments 1027*a* and 1027*b* is made of a permanent magnet having a rectangular transverse section. The magnet segment 1027*a* which is located closer to the q-axis than the magnet segment 1027*b* is has the easy axis of magnetization oriented more parallel to the q-axis than that of the magnet segment 1027*b* located close to the d-axis.

The magnet segments 1027*a* and 1027*b* of each of the main magnets 1021, as described above, have the easy axes of magnetization oriented in directions different from each other. The easy axis of magnetization of the magnet segment 1027*a* located close to the q-axis is oriented to be nearly parallel to the q-axis, thereby enhancing the resistance to demagnetization of the end of the main magnet 1021 close to the d-axis due to the demagnetizing field from the stator 1030.

The magnet segments 1027*a* and 1027*b* are oriented to have end portions which face each other and are arranged generally in a convex shape protruding toward the stator 1030. in other words, the magnet segments 1027*a* and 1027*b* are arranged not in a straight line shape, but in a shape of two straight lines angled to each other to define the convex shape protruding toward the stator 1030. This layout causes the main magnet 1021 (i.e., the magnet segments 1027*a* and 1027*b*) to be located close to the outer periphery of the rotor core 1011, thereby resulting in a decreased interval between the stator 1030 and the main magnet 1021 to enhance the output torque. The decreased interval between the stator 1030 and the main magnet 1021 adversely results in an increase in degree of the demagnetizing field. The negative effects of such an increase are, however, mitigated by the auxiliary magnets 1022 and 1023.

The structure of the rotor core 1011 enables a portion thereof which is located closer to the stator 1030 than each of the magnet assemblies 1013 (i.e., the magnet housing holes 1012) is and exposed to the sum of magnetic fluxes generated by the stator 1030 and the magnet assemblies 1013 to be reduced in volume thereof, thereby resulting in a decreased region of the rotor core 1011 where the saturation of magnetic fluxes from the stator 1030 and the magnet assemblies 1013 and ensuring the performance of the magnet assemblies 1013.

In this modification, a dimension of the main magnets 1021 for one magnetic pole in the lengthwise direction, that is, a dimension of magnetic flux acting surfaces corresponds to the dimension Wm of a portion of a magnet unit for each magnetic pole in the circumferential direction. The structure in FIG. 99 has the paired main magnets 1021 each of which is made up of the magnet segments 1027*a* and 1027*b* and which creates one magnetic pole are arranged across the d-axis. The dimension Wm of a portion of the magnet unit for each magnetic pole is, thus, equivalent to the sum of the dimension Wm1 of the left magnet segment 1027*a* in the lengthwise direction thereof, the dimension Wm2 of the left magnet segment 1028*b* in the lengthwise direction thereof, the dimension Wm3 of the right magnet segment 1027*b* in the lengthwise direction thereof, and the dimension Wm4 of the right magnet segment 1027*a* in the lengthwise direction thereof.

Twentieth Modification

Figure 100:
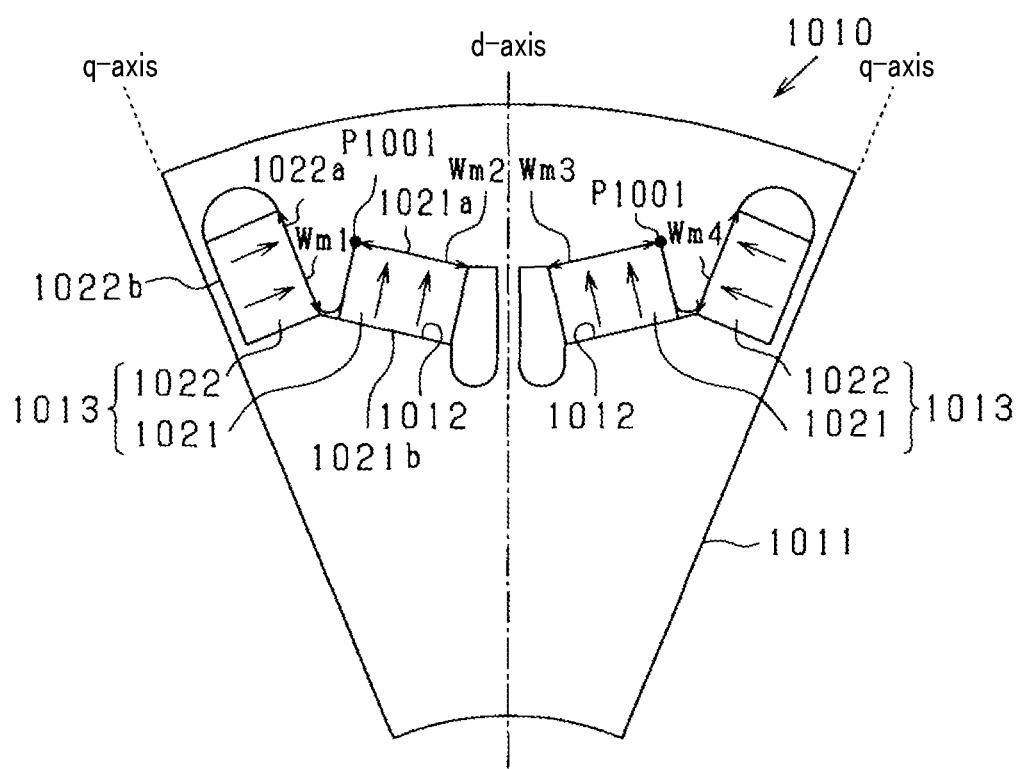
FIG. 100 is a partial plan view which illustrates a rotor in the twentieth modification.

FIG. 100 illustrates the rotor 1010 in the twentieth modification. The rotor 1010 is equipped with the magnet assemblies 1013 each of which includes the main magnet 1021 and the auxiliary magnet 1022 arranged close to or in direct contact with the first end 1021*c*. The main magnet 1021 and the auxiliary magnet 1022 are each shaped to have a rectangular transvers section. The main magnet 1021 has an easy axis of magnetization oriented perpendicular to a pair of the magnetic flux acting surfaces 1021*a* and 1021*b* opposed to each other. Similarly, the auxiliary magnet 1022 has an easy axis of magnetization oriented perpendicular to a pair of the magnetic flux acting surfaces 1022*a* and 1022*b* opposed to each other. The main magnet 1021 and the auxiliary magnet 1022 are disposed in the magnet housing holes 1012 of the rotor core 1011. The easy axis of magnetization of the main magnet 1021 is oriented at a first angle to the d-axis or the q-axis. The easy axis of magnetization of the auxiliary magnet 1022 is oriented at second first angle to the d-axis or the q-axis. The first angle and the second angle are different from each other.

The main magnet 1021 and the auxiliary magnets 1022 are arranged away from each other. Specifically, the auxiliary magnet 1022 is disposed to face a q-axis facing end of the main magnet 1021 through a portion of the rotor core 1011. The easy axis of magnetization of the main magnet 1021 extends substantially parallel or slants at an angle to the d-axis. The easy axis of magnetization of the auxiliary magnet 1022 extends at an angle perpendicular to the d-axis which is larger than that which the easy axis of magnetization of the main magnet 1021 makes with the d-axis. The main magnet 1021 has the corner P1001, in other words, a flux reinforcing portion of the main magnet 1021 which faces the q-axis and is located closest to the stator 1030. The corner P1001 of the main magnet 1021 lies on an extension of the easy axis of magnetization of the auxiliary magnet 1022 and is exposed to the magnetic flux flowing from the auxiliary magnet 1022 to reinforce the magnetic flux on the corner P1001.

Usually, magnets which are rectangular in transverse section and have an easy axis of magnetization extending perpendicular to a pair of opposed magnetic flux acting surfaces thereof have the highest versatility and are excellent in production or cost-effectiveness. In this modification, such a type of magnets are used as the main magnets 1021 and the auxiliary magnets 1022 which are arranged in the rotor core 1011 to have easy axes of magnetization extending different angles to the d-axis or the q-axis. This allows the rotor 1010 to be produced to have a simple structure and achieves reinforcement of the magnetic flux on the end of the main magnet 1021 close to the q-axis.

In the above structure, the main magnet 1021 and the auxiliary magnet 1022 may be made of magnets whose sizes or dimensions and performances are exactly equivalent to each other in order to have a desired degree of resistance to the demagnetization. The main magnet 1021 and the auxiliary magnet 1022 may, however, be shaped to have dimensions different from each other in directions in which the easy axes of magnetization thereof extend.

In this modification, the sum of a total dimension of the main magnets 1021 contributing to creating one magnetic pole, in other words, a total dimension of the magnetic flux acting surfaces 1021*a* in the lengthwise direction and a total dimension of the auxiliary magnets 1022, in other words, a total dimension of the magnetic flux acting surfaces 1022*a* in the lengthwise direction corresponds to the dimension Wm of a portion of a magnet unit for each magnetic pole in the circumferential direction. The structure in FIG. 100 has the paired main magnets 1021 and the paired auxiliary magnets 1022 which create one magnetic pole. The paired main magnets 1021 are arranged across the d-axis. The paired auxiliary magnets 1022 are arranged across the d-axis. The dimension Wm of a portion of the magnet unit for each magnetic pole is, thus, equivalent to the sum of the dimension Wm1 of the left auxiliary magnet 1022 in the lengthwise direction thereof, the dimension Wm2 of the left main magnet 1021 in the lengthwise direction thereof, the dimension Wm3 of the right main magnet 1021 in the lengthwise direction thereof, and the dimension Wm4 of the right auxiliary magnet 1022 in the lengthwise direction thereof.

Twenty-First Modification

FIG. 101(*a*) illustrates the rotor 1010 in the twenty-first modification. The rotor core 1011 has the grooves 1042 formed in an outer peripheral surface thereof which faces the stator 1030. The grooves 1042 extend in the axial direction. The grooves 1042 are located radially outside the auxiliary magnets 1022 in the outer periphery of the rotor core 1011. Each of the auxiliary magnets 1022 and a corresponding one of the grooves 1042 define the outer bridge 1016 therebetween.

The rotor 1010 illustrated in FIG. 101(*b*) has the grooves 1043 formed in the outer peripheral surface thereof. The grooves 1043 extend in the axial direction. Each of the grooves 1043 lies on the d-axis in the outer periphery of the rotor core 1011. The grooves 1043 may be additionally formed on the q-axis in the outer periphery of the rotor core 1011.

The rotor core 1011 has a surface region which faces the stator 1030 and has a high risk of magnetic saturation occurring due to exposure to a rotating magnetic flux from the stator 1030 and a magnetic flux produced by the magnet. The grooves 1042 or 1043 which are formed in the outer periphery of the rotor core 1011 facing the stator 1030 and extend in the axial direction, however, serve to control the orientation or the quantity of magnetic flux in a portion of the rotor core 1011 which is located close to the stator 1030, thereby enhancing the performance of the magnet assemblies 1013.

In this modification, a total dimension of the main magnets 1021 contributing to creating one magnetic pole, in other words, a total dimension of magnetic flux acting surfaces in the lengthwise direction corresponds to the dimension Wm of a portion of a magnet unit for each magnetic pole in the circumferential direction. The structure in each of FIGS. 101(*a*) and 101(*b*) has the paired main magnets 1021 which create one magnetic pole. The paired main magnets 1021 are arranged across the d-axis. The dimension Wm of a portion of the magnet unit for each magnetic pole is, thus, equivalent to the sum of the dimension Wm1 of the left main magnet 1021 in the lengthwise direction thereof and the dimension Wm2 of the left main magnet 1021 in the lengthwise direction thereof.

Fourth Embodiment

Figure 102:
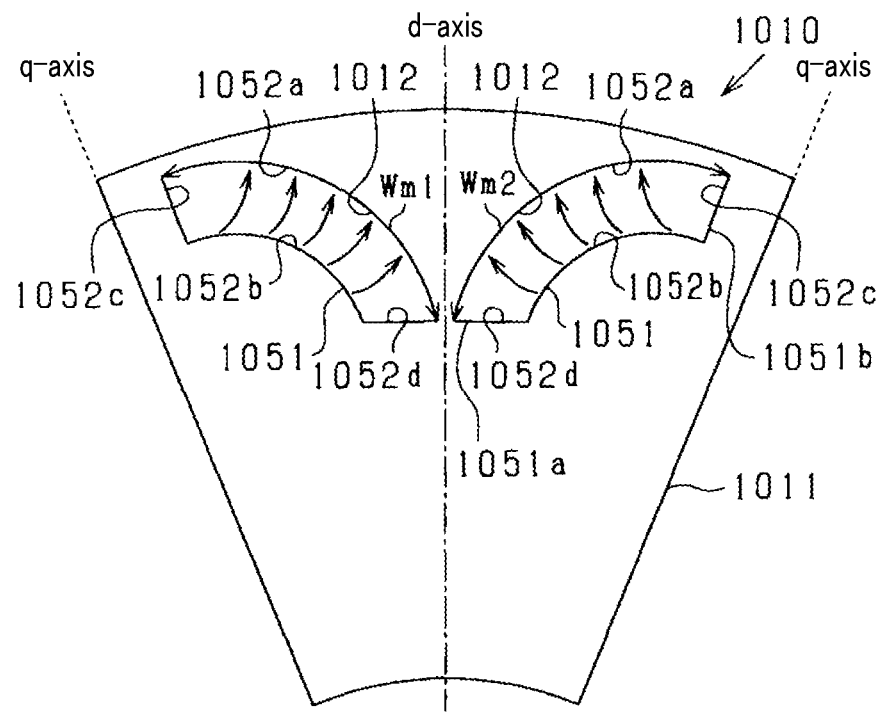
FIG. 102 is a partial plan view which illustrates a rotor in the fourth embodiment.

Features in the fourth embodiment which are different from those in the third embodiment will be described below. Specifically, easy axes of magnetization of magnets are oriented to intersect at an angle that is not 90° with at least one of magnetic flux acting surfaces of the magnets. Particularly, angles which the easy axis of magnetization of each of the magnets makes with the opposed magnetic flux acting surfaces thereof one of which is located closer to the stator 1030 and the other of which is located farther away from the stator 1030 are different from each other. FIG. 102 illustrates the rotor 1010 in the fourth embodiment.

The rotor core 1011, as illustrated in FIG. 102, has pairs of magnet housing holes 1012 each of which is curved in an arc-shape. The rotor core 1011 in FIG. 102, like in FIG. 91, has the paired magnet housing holes 1012 arranged in a substantially V-shape with an interval therebetween increasing radially outward. The paired magnet housing holes 1012 are arranged to be line-symmetrical with respect to the d-axis that is the center of a magnetic pole. Each of the magnet housing holes 1012 is shaped to have an interval between itself and the stator 1030 which increases toward the d-axis.

Each of the magnet housing holes 1012 is defined or surrounded by the curved surfaces 1052*a* and 1052*b* and the flat connecting surfaces 1052*c* and 1052*d*. The curved surfaces 1052*a* and 1052*b* are located at a constant interval away from each other. The connecting surfaces 1052*c* and 1052*d* connect between ends of the curved surfaces 1052*a* and 1052*b* together. The connecting surface 1052*c* which is located closer to the q-axis than the connecting surface 1052*d* is extends parallel to the q-axis. The connecting surface 1052*d* which is located close to the d-axis extends perpendicular to the d-axis.

Each of the magnet housing holes 1012 has fit therein the magnet 1051 whose configuration is contoured to conform with that of the magnet housing hole 1012. The magnets 1051 disposed in the pair of magnet housing holes 1012 serve to create one magnetic pole. Each of the magnets 1051, as can be seen in FIG. 102, has the ends 1051*a* and 1051*b* opposed to each other through a length thereof. Easy axes of magnetization in the magnets 1051 (i.e., directions of inner magnetic forces or magnet magnetic paths) are indicated by arrows. Each of the magnets 1051 has the easy axis of magnetization which extends as a whole from the end 1051*b* close to the q-axis toward the end 1051*a* close to the d-axis and gradually becomes oriented nearly parallel to the d-axis with distance from the end 1051*b*, in other words, as approaching the end 1051*a*. In other words, the easy axis of magnetization is curved in non-linearly in a convex shape which protrudes away from the stator 1030. In other words, the magnet magnetic path created in each of the magnets 1051 extends through a width of the magnet 1051 in an arc-shape bulging toward the center axis of the rotor core 1011.

The above orientation of the easy axes of magnetization in the magnets 1051 enhances the resistance to demagnetization of the magnets 1051 which arises from a demagnetizing field created by a rotating magnetic flux from the stator 1030, thereby minimizing a risk of the demagnetization of the magnets 1051. In other words, the easy axis of magnetization in each of the magnets 1051 is oriented in a convex shape protruding away from the stator 1030 so as to have a first portion of the easy axis of magnetization which is close to the end 1051*b* and oriented near perpendicular to the q-axis and a second portion thereof which is close to the end 1051*a* and oriented nearly parallel to the d-axis, thereby resulting in an increased length of the magnet magnetic path to enhance the magnet-generated magnetic flux and also producing a magnetic flux acting opposite to a demagnetizing field flowing from the stator 1030.

The portion of the easy axis of magnetization which is located around the end 1051*a* of each of the magnets 1051 close to the d-axis is, as described above, oriented nearly parallel to the d-axis, thereby minimizing the demagnetization resulting from mutual interference between magnetic fluxes around the d-axis.

The rotor core 1011 has oriented therein the magnets 1051 each of which has the q-axis side end 1051*b* located closer to the stator 1030 than the d-axis side end 1051*a* is in the radial direction of the rotor core 1011. Each of the magnets 1051 is curved in a convex shape protruding toward the stator 1030 between the end 1051b close to the q-axis and the end 1051a close to the d-axis. In other words, the paired magnets 1051 which are located on opposite sides of the d-axis are arranged in a substantially V-shape. Each of the paired magnets 1051 is curved in an arc-shape bulging toward the stator 1030 (i.e., an upper side in the drawing). The magnet housing holes 1012 are designed to have the same shape as the magnets 1051.

To say it in a different way, the curved surface 1052a of each of the magnet housing holes 1012 which is closer to the stator 1030 than the curved surface 1052b is and serves as a flux output surface is designed in a convex shape which protrudes toward the stator 1030 and is located closer to the stator 1030 than a segment is which extends between the opposed ends of the magnet housing hole 1012, that is, a straight line extending between ends of the curved surface 1051a.

The above structure enables the magnets 1051 to be arranged close to the outer periphery of the rotor core 1011 to decrease a distance between the stator 1030 and each of the magnets 1051, thereby increasing the degree of output torque. The decreased distance between the stator 1030 and each of the magnets 1051 will result in an increase in demagnetizing field, but however, the above described non-linear configuration of the easy axes of magnetization in the magnets 1015 alleviates the adverse effects of the increased demagnetizing field on the magnets 1051.

The structure of the rotor core 1011 enables a portion thereof which is located closer to the stator 1030 than each of the magnets 1051 (i.e., the magnet housing holes 1012) is and exposed to the sum of magnetic fluxes generated by the stator 1030 and the magnets 1051 to be reduced in volume thereof, thereby resulting in a decreased region of the rotor core 1011 where the saturation of magnetic fluxes from the stator 1030 and the magnets 1051 occurs, and ensuring the performance of the magnets 1051.

The convex shape of the magnets 1051 protruding radially outward results in a decrease in volume of a portion of the rotor core 1011 which is located radially outside the magnet housing holes 1012, thereby decreasing a factor of stress concentration caused by the centrifugal force, which increases the mechanical strength of the rotor core 1011.

Compared with the structure of the third embodiment illustrated in FIG. 91 in which the auxiliary magnets 1022 and 1023 are arranged opposite sides of the main magnet 1021, the structure of the rotor 1010 in this embodiment has the magnets 1051 each of which also works in itself to play a role instead of the auxiliary magnets 1022 and 1023.

FIG. 102 demonstrates only the magnets 1051 which create the N-pole. The magnets 1051 which create the S-pole have easy axes of magnetization oriented in a direction opposite a direction in which the easy axes of magnetization in FIG. 102 extend.

Each of the magnets 1051 in FIG. 102 may be made of an assembly of a plurality of magnet segments. Specifically, each of the magnets 1051 may be made of a plurality of magnet segments stacked on one another in the lengthwise direction of the magnet 1051 with ends of the magnet segments placed in contact with each other. The stack of the magnet segments is disposed in each of the magnet housing holes 1012. This layout avoids losses due to eddy currents arising from magnetic fluxes interlinking with the magnets 1051 during an operation of the rotating electrical machine 1001.

Figure 101A:
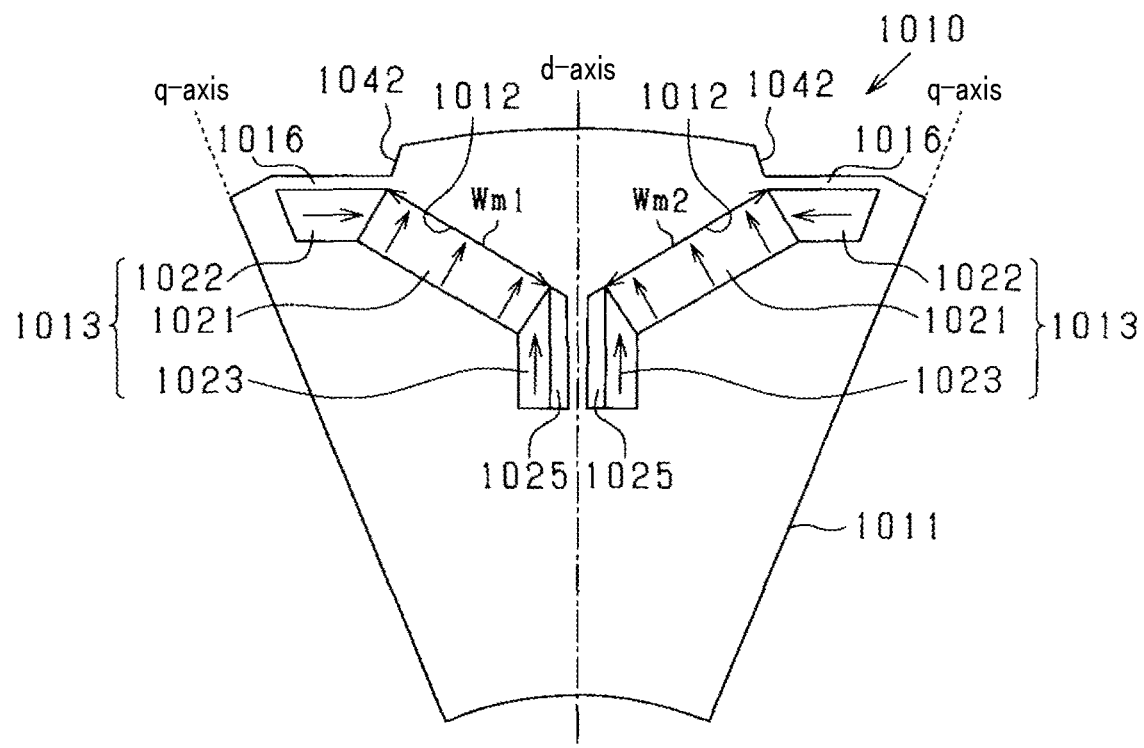
FIGS. 101(a) and 101(b) are partial plan views which illustrate a rotor in the twenty-first modification.
Figure 101B:
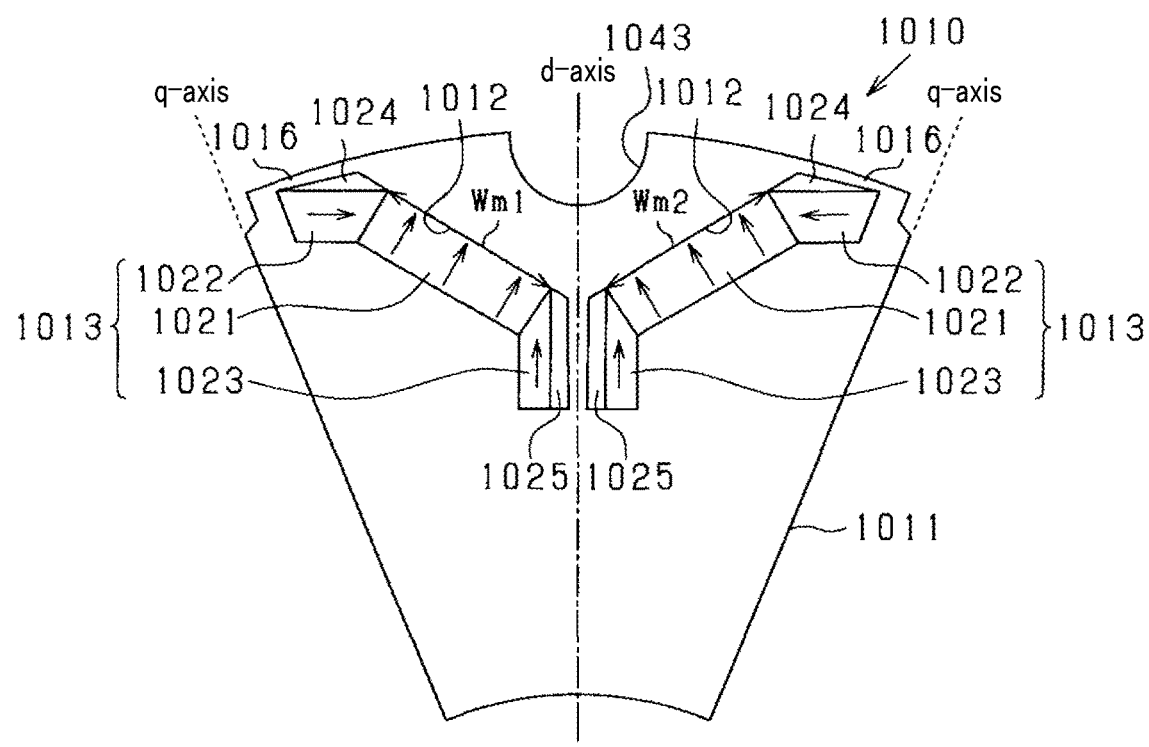

The structure in FIG. 102 may be designed, like in FIGS. 101(a) and 101(b), to have the grooves 1042 and 1043 which are formed on the outer peripheral surface of the rotor core 1011 which face the stator 1030 and extend in the axial direction. This enables the orientation or the quantity of magnetic flux in a portion of the rotor core 1011 which is located close to the stator 1030 to be controlled, thereby enhancing the performance of the magnets 1051.

In the structure of FIG. 102, a total dimension of the stator-facing peripheral surfaces (i.e., magnetic flux acting surfaces) of the magnets 1051 which create one magnetic pole in the lengthwise direction corresponds to the dimension Wm of a portion of a magnet unit for each magnetic pole in the circumferential direction. The paired main magnets 1051 which create one magnetic pole are, as can be seen in FIG. 102, arranged to be symmetrical with respect to the d-axis. The dimension Wm of a portion of the magnet unit for each magnetic pole is, thus, equivalent to the sum of the dimension Wm1 of the left stator-facing peripheral surface and the dimension Wm2 of the right stator-facing peripheral surface.

Figure 103:
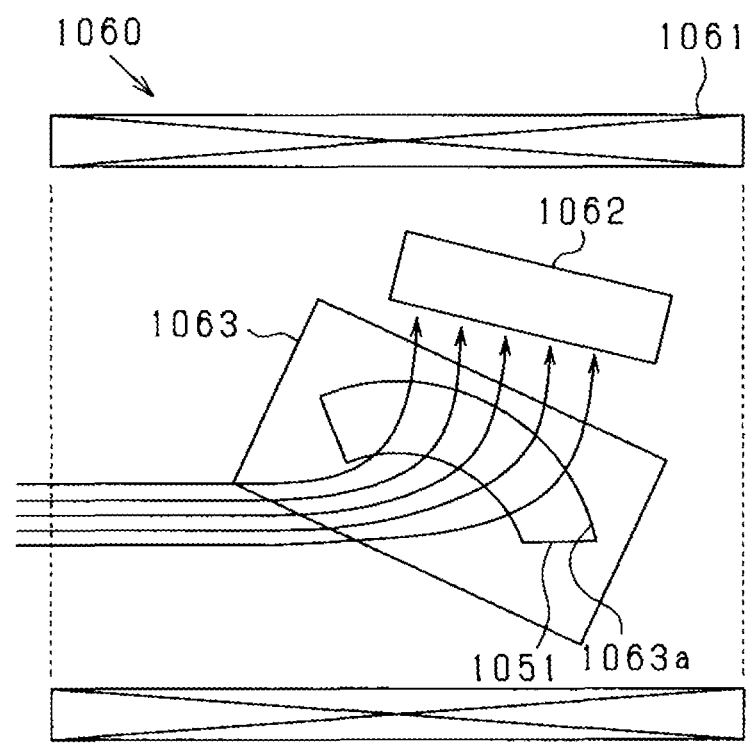
FIG. 103 is an explanatory view for explaining how to magnetize magnets using magnetic field orientation

How to produce the magnets 1051 used in this embodiment will be described below. FIG. 103 demonstrates how to magnetize the magnets 1051 using magnetic field orientation techniques.

The magnetic orientation device 1060, as illustrated in FIG. 103, includes the magnetic field coil 1061, the magnetically orientating iron core 1062, and the die 1063 (i.e., a magnet-making die) which are disposed inside the magnetic field coil 1061. When electrically excited, the magnetic field coil 1061 produces a magnetic field passing inside it. The magnetically orientating iron core 1062 works to curve the magnetic field, as generated by the magnetic field coil 1061, in a selected direction. The curved magnetic field then pass through the die 1063. In summary, the magnetic field coil 1061 generates a linear magnetic field. The magnetically orientating iron core 1062 produces a curved magnetic field. The die 1063 is made of a non-magnetic material and has the die cavity 1063a contoured to conform with the shape of the magnets 1051.

The production of the magnet 1051 is achieved by supplying magnet powder, as made by crushing a magnet material, into the die cavity 1063a of the die 1063 and pressing it into a selected shape within the die cavity 1063a. The magnetically orientating iron core 1062 produces a magnetic field curved into the illustrated shape within the magnetic field coil 1061 to magnetically orient the magnet powder in the die cavity 1063a in such a way that easy axes of magnetization in the magnet powder will be aligned in a given direction. The magnet powder is then pressed into a preform body. The preform body is sintered and magnetized to complete the magnet 1051.

In the above way, the easy axis of magnetization in the magnet 1051 is non-linearly curved into an arc-shape. Afterwards, the magnet 1051 is disposed in each of the magnet housing holes 1012. This causes each of the magnets 1051 to have the easy axis of magnetization which, as illustrated in FIG. 102, extends as a whole from the end 1051b close to the q-axis toward the end 1051a close to the d-axis with a first portion thereof which is close to the end 1051b and oriented near perpendicular to the q-axis and a second portion thereof which is close to the end 1051a and oriented nearly parallel to the d-axis. In other words, the easy axis of magnetization is curved in non-linearly in a convex shape which protrudes away from the stator 1030.

Modifications of the rotor 1010 in the fourth embodiment will be described below. The following discussion will refer to only features of the rotor 1010 different from those in FIG. 102.

Twenty-Second Modification

Figure 104:
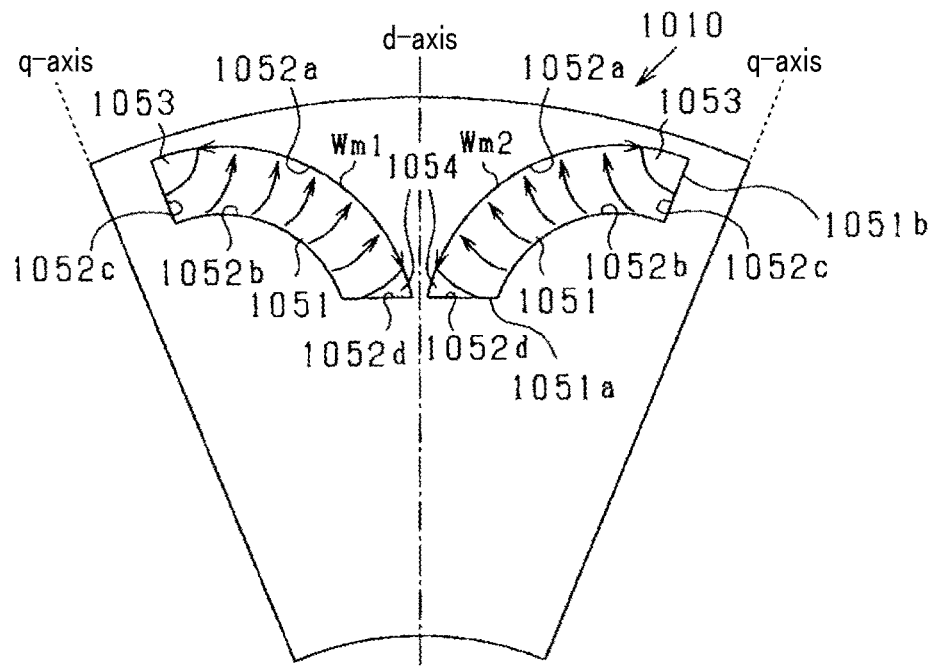
FIG. 104 is a partial plan view which illustrates a rotor in the twenty-second modification.

FIG. 104 illustrates the rotor 1010 in the twenty-second modification. The rotor 1010 includes the magnets 1051 each of which has a first end close to the d-axis and a second end close to the q-axis. The first and second ends are shaped to extend along the easy axes of magnetization in the magnet 1051. Each of the magnet housing holes 1012 has the flux barriers 1053 and 1054 arranged outside the first and second ends of the magnet 1051 curved along the easy axes of magnetization. The flux barriers 1053 and 1054 are made by removing ends of the magnet 1051 which are opposed to each other through a length of the magnet 1051. In other words, each of the magnets 1051 has end surfaces which are oriented to intersect with magnetic flux acting surfaces thereof and extend substantially parallel to the easy axes of magnetization. The flux barriers 1053 and 1054 are disposed outside the d-axis side end 1051a and the q-axis side end 1051b within the magnet housing hole 1012.

Specifically, the rotor 1010 in FIG. 104 has the flux barrier 1053 formed by partly removing a stator-facing corner of the q-axis side end of the magnet 1051 illustrated in FIG. 102. Similarly, the flux barrier 1054 is formed by partly removing a d-axis facing corner of the d-axis side end of the magnet 1051 illustrated in FIG. 102. The ends 1051a and 1051b may be shaped to have curved or planar surfaces.

In a case where the easy axis of magnetization in the magnet 1051 is oriented non-linearly in directions different between portions thereof close to the q-axis side end 1051b and the d-axis side end 1051a, the magnet magnetic path (i.e., the length of a line of inner magnetic force) will be longer than that in a case where the easy axis of magnetization is oriented linearly and extend perpendicular to the length of the magnet. There may be, however, magnetic paths having a decreased length around the ends of the magnet 1051. The length of the magnet magnetic paths is proportional to the permeance of the magnet 1051. It is, thus, undesirable to have the decreased length of the magnet magnetic paths around the ends of the magnet 1051.

In order to alleviate the above problem, the d-axis side end 1051a and the q-axis side end 1051b of each of the magnets 1051 (i.e., the ends of the magnet 1051 intersecting with the magnetic flux acting surfaces of the magnet 1051) are aligned with the easy axis of magnetization in the magnet 1051, thereby minimizing a risk that magnetic paths having a decreased length may be produced locally around the ends of the magnet 1051. The flux barriers 1053 and 1054 are arranged on the d-axis side end 1051a and the q-axis side end 1051b of each of the magnets 1051, thereby reducing demagnetization of the ends of the magnets 1051.

Each of the magnets 1051 may be designed to have the d-axis side end 1051a and the q-axis side end 1051b only one of which is shaped in alignment with the easy axis of magnetization. In the modification of FIG. 104, a total dimension of the stator-facing peripheral surfaces (i.e., the magnetic flux acting surfaces) of the magnets 1051 creating one magnetic pole is equivalent to the dimension Wm of a portion of a magnet unit for each magnetic pole in the circumferential direction. The paired main magnets 1051 which create one magnetic pole are, as can be seen in FIG. 104, arranged on opposite sides of the d-axis. The dimension Wm of a portion of the magnet unit for each magnetic pole is, thus, equivalent to the sum of the dimension Wm1 of the left stator-facing peripheral surface and the dimension Wm2 of the right stator-facing peripheral surface. Note that the stator-facing peripheral surfaces, as illustrated in FIG. 104, exclude the flux barriers 1053 and 1054.

Twenty-Third Modification

Figure 105:
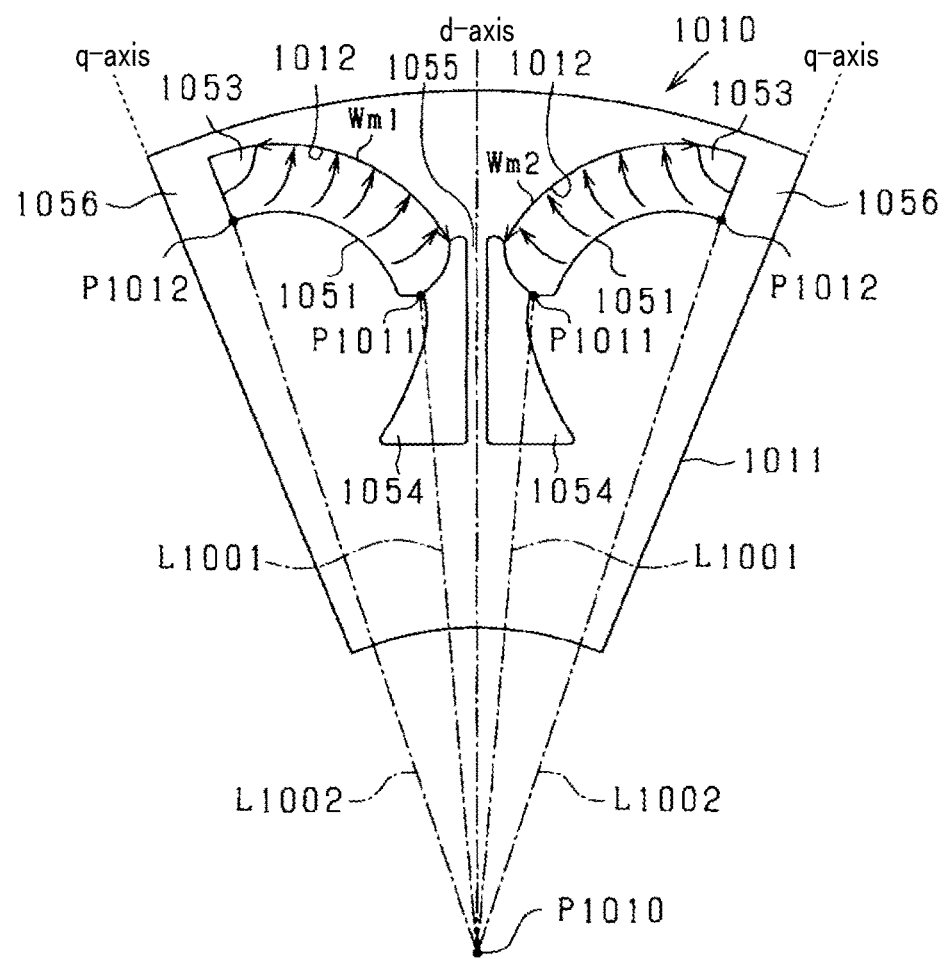
FIG. 105 is a partial plan view which illustrates a rotor in the twenty-third modification.

FIG. 105 illustrates the rotor 1010 in the twenty-third modification. The d-axis side flux barriers 1054 extend along the d-axis from radially inner ends of the magnets 1051 toward the center axis. The d-axis core portion 1055 is disposed between the flux barriers 1054 arranged on opposite sides of the d-axis. In other words, the magnets 1051 include pairs of a first magnet and a second magnet which are arranged on the opposite sides of the d-axis core portion 1055 of the rotor core 1011. The rotor core 1011 has the flux barriers 1054 which are arranged on the opposite sides of the d-axis core portion 1055 and extend from the stator-remote ends of the paired magnets 1051 away from the stator 1030. The flux barriers 1054 are made of portions of the magnet housing holes 1012. Specifically, the flux barriers 1054 is made of a void space or a non-magnetic material, such as synthetic resin or ceramic. The flux barriers 1054 are also referred to as non-magnetic bodies.

Each of the flux barriers 1054 is shaped to bulge to be closer to the q-axis than a line L1001 is. The line L1001 is defined to connect a point P1011 lying on a radially innermost portion of the magnet 1051 and the rotation center P1010 of the rotor core 1011. Each of the flux barriers 1054 may be shaped to have a dimension in the circumferential direction of the magnet 1051 which is selected depending upon a width of the q-axis core portion 1056 disposed outside the magnet 1051 in the circumferential direction in terms of the quantity of magnetic flux on the q-axis. Each of the flux barriers 1054 may be shaped to bulge to lie on the line L1002 or be close to the q-axis than the line L1002 is by a given distance. The line L1002 is defined to connect the q-axis side end P1012 of the magnet housing hole 1012 and the rotation center P1010 of the rotor core 1011.

The above structure results in an increase in magnetic resistance of the d-axis core portion 1055 using the flux barriers 1054, thereby minimizing a risk of magnetic short-circuit between the paired magnets 1051 to enhance effective use of magnetic force.

The d-axis core portion 1055 serves as an iron core which lies on the d-axis and is elongated to extend along the d-axis. The d-axis core portion 1055 also serves as a reinforcement to minimize a risk of accidental removal of the magnets 1051 caused by centrifugal force acting thereon. The d-axis core portion 1055 will be, however, an obstacle in terms of a magnetic circuit. The magnetic resistance of the d-axis core portion 1055 may be increased by increasing the length of the d-axis core portion 1055 in the axial direction. This results in a decrease in vector length of magnetic fluxes oriented to the d-axis in the paired magnets 1051 and also enhances the degree of output torque.

The magnet housing holes 1012 function to divide the rotor core 1011 into q-axis side portions and d-axis side portions. The flux barriers 1054 which serve as non-magnetic bodies are disposed to extend away from the stator 1030. This minimizes mutual effects of magnetic fluxes generated by the paired magnets 1051 and enables the magnetic fluxes to be designed usefully.

Each of the flux barriers 1054 is, as described above, shaped to bulge to be close to the q-axis than the line L1001 is, thereby minimizing the inertia of the rotor 1010. In the modification in FIG. 105, a total dimension of the stator-facing peripheral surfaces (i.e., the magnetic flux acting surfaces) of the magnets 1051 creating one magnetic pole is equivalent to the dimension Wm of a portion of a magnet unit for each magnetic pole in the circumferential direction. The paired main magnets 1051 which create one magnetic pole are, as can be seen in FIG. 105, arranged on opposite sides of the d-axis. The dimension Wm of a portion of the magnet unit for each magnetic pole is, thus, equivalent to the sum of the dimension Wm1 of the left stator-facing peripheral surface and the dimension Wm2 of the right stator-facing peripheral surface. Note that the stator-facing peripheral surfaces, as illustrated in FIG. 105, exclude the flux barriers 1053 and 1054.

Twenty-Fourth Modification

Figure 106:
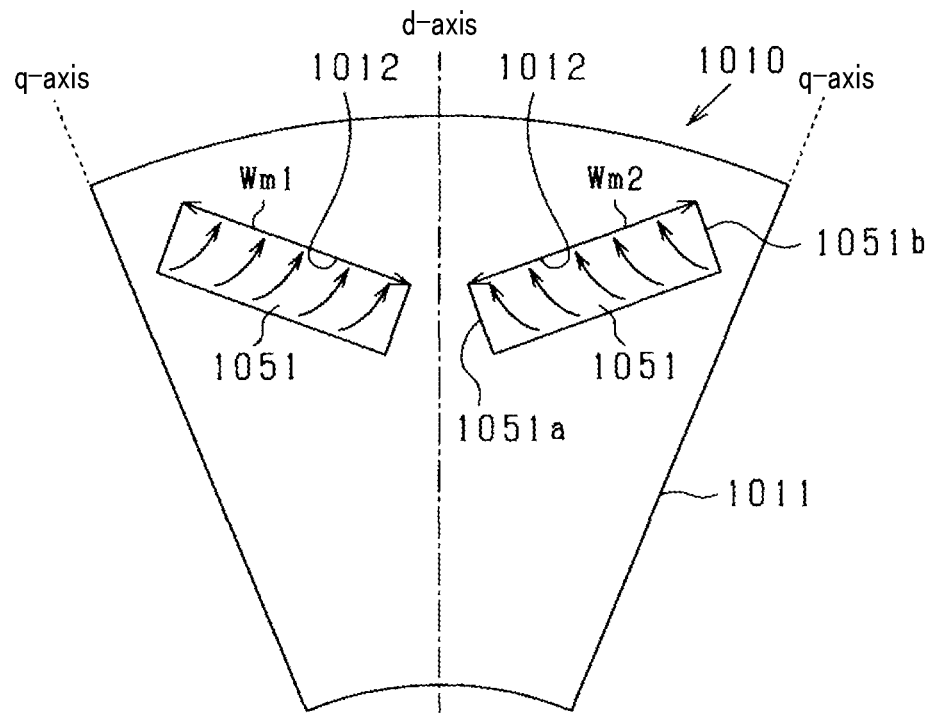
FIG. 106 is a partial plan view which illustrates a rotor in the twenty-fourth modification.

FIG. 106 illustrates the rotor 1010 in the twenty-fourth modification which is different from the above structures in that transverse sections of the magnet housing holes 1012 and the magnets 1051 disposed in the magnet housing holes 1012 (i.e., transverse sections extending perpendicular to the axis of the rotor core 1011) are shaped not to be circular, but rectangular. The paired magnet housing holes 1012 which are disposed on opposite sides of the d-axis are oriented in a V-shape. Similarly, the paired magnets 1051 which are disposed on opposite sides of the d-axis are oriented in a V-shape. The easy axis of magnetization in each of the magnets 1051 is, like in the above structures, oriented non-linearly in directions different between portions thereof close to the q-axis side end 1051b and the d-axis side end 1051a.

In the modification in FIG. 106, a total dimension of stator-facing peripheral surfaces (i.e., magnetic flux acting surfaces) of the magnets 1051 creating one magnetic pole is equivalent to the dimension Wm of a portion of a magnet unit for each magnetic pole in the circumferential direction. The paired main magnets 1051 which create one magnetic pole are, as can be seen in FIG. 106, arranged on the opposite sides of the d-axis. The dimension Wm of a portion of the magnet unit for each magnetic pole is, thus, equivalent to the sum of the length Wm1 of the left magnet 1051 and the length Wm2 of the right manet 1051.

Twenty-Fifth Modification

Figure 107:
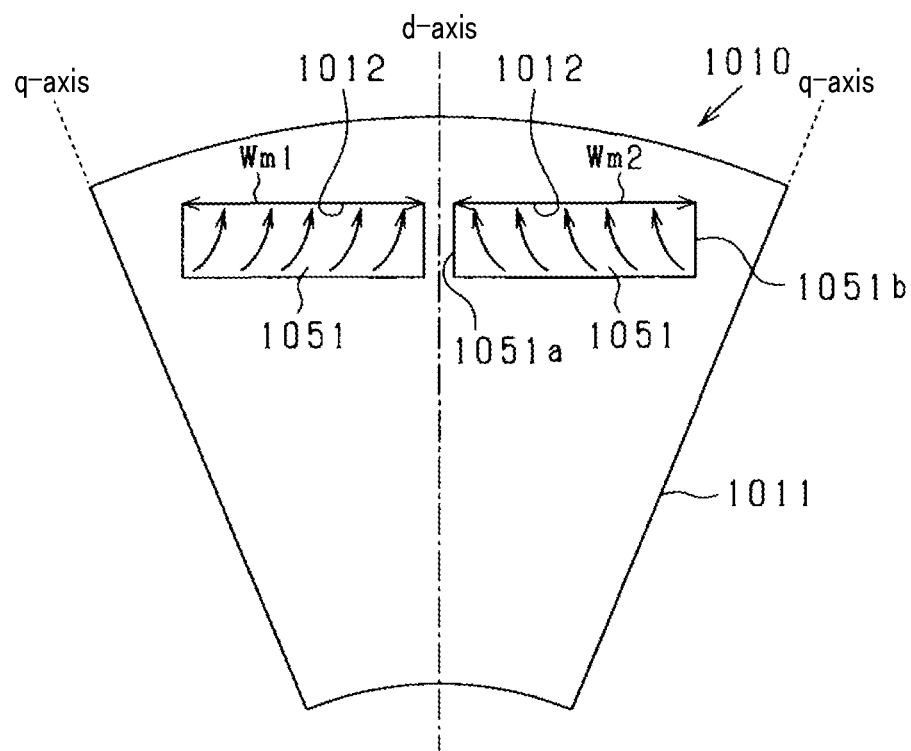
FIG. 107 is a partial plan view which illustrates a rotor in the twenty-fifth modification.

FIG. 107 illustrates the rotor 1010 in the twenty-fifth modification which is different from the above structures in that transverse sections of the magnet housing holes 1012 and the magnets 1051 disposed in the magnet housing holes 1012 (i.e., transverse sections extending perpendicular to the axis of the rotor core 1011) are shaped not to be circular, but rectangular. The paired magnet housing holes 1012 which are disposed on opposite sides of the d-axis are aligned with each other in a direction perpendicular to the d-axis. Similarly, the paired magnets 1051 which are disposed on opposite sides of the d-axis are aligned with each other in the direction perpendicular to the d-axis. The easy axis of magnetization in each of the magnets 1051 is, like in the above structures, oriented non-linearly in directions different between portions thereof close to the q-axis side end 1051b and the d-axis side end 1051a.

In the structure illustrated in FIG. 107, the paired magnet housing holes 1012 are linearly aligned with each other, however, in terms of an interval between each of the magnet housing holes 1012 and the stator 1030, each of the magnet housing holes 1012 is arranged to have the interval between itself and the stator 1030 which increases from the q-axis to the d-axis.

In the modification in FIG. 107, a total dimension of stator-facing peripheral surfaces (i.e., magnetic flux acting surfaces) of the magnets 1051 creating one magnetic pole is equivalent to the dimension Wm of a portion of a magnet unit for each magnetic pole in the circumferential direction. The paired main magnets 1051 which create one magnetic pole are, as can be seen in FIG. 107, arranged on the opposite sides of the d-axis. The dimension Wm of a portion of the magnet unit for each magnetic pole is, thus, equivalent to the sum of the length Wm1 of the left magnet 1051 and the length Wm2 of the right manet 1051.

Fifth Embodiment

Figure 108:
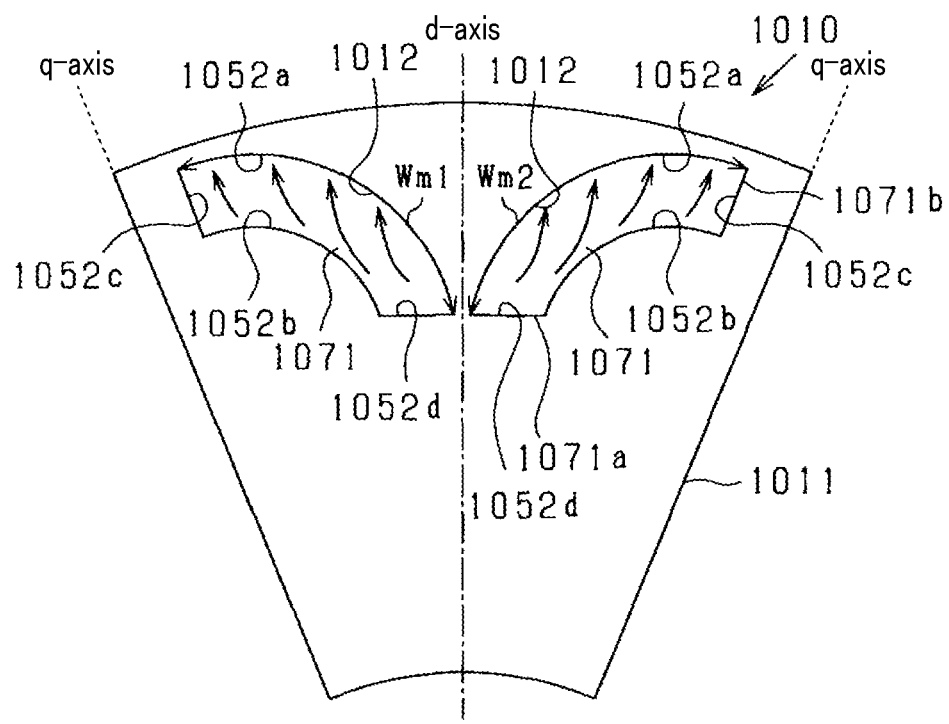
FIG. 108 is a partial plan view which illustrates a rotor in the fifth embodiment.

The fifth embodiment will be described below in terms of features different from those in the third embodiment. The fifth embodiment is, like the fourth embodiment, designed so that angles which the easy axis of magnetization of each of the magnets makes with the opposed magnetic flux acting surfaces thereof one of which is located closer to the stator 1030 and the other of which is located farther away from the stator 1030 are different from each other. FIG. 108 illustrates the rotor 1010 in this embodiment.

The rotor core 1011, as illustrated in FIG. 108, has pairs of magnet housing holes 1012 each of which is curved in an arc-shape. Each of the magnet housing holes 1012 is identical in configuration with that in FIG. 102, and explanation thereof in detail will be omitted here. The magnets 1071 are shaped to have a configuration which is contoured to conform with that of the magnet housing holes 1012. The magnets 1071 are disposed in the magnet housing holes 1012. The magnets 1071 fit in the paired magnet housing holes 1012 create one magnetic pole. In FIG. 108, directions of easy axes of magnetization of the magnets 1071 (i.e., lines of magnetic force or magnet magnetic paths) are indicated by arrows. Each of the magnets 1071 has the easy axis of magnetization which extends as a whole from the end 1071a close to the d-axis toward the end 1071b close to the q-axis and gradually becomes oriented nearly parallel to the d-axis with distance from the end 1071a, in other words, as approaching the end 1071b. In other words, the easy axis of magnetization is curved in non-linearly in a convex shape which protrudes away from the stator 1030. In other words, the magnet magnetic path created in each of the magnets 1071 extends in a convex shape protruding to the rotation center of the rotor core 1011.

The above orientation of the easy axes of magnetization in the magnets 1071 enhances the resistance to demagnetization of the magnets 1071 which arises from a demagnetizing field created by a rotating magnetic flux from the stator 1030, thereby minimizing a risk of the demagnetization of the magnets 1057. In other words, the easy axis of magnetization in each of the magnets 1071 is oriented in a convex shape protruding away from the stator 1030 so as to have a first portion of the easy axis of magnetization which is close to the end 1071a and oriented near perpendicular to the d-axis and a second portion thereof which is close to the end 1071b and oriented nearly parallel to the q-axis, thereby resulting in an increased length of the magnet magnetic path to enhance the magnet-generated magnetic flux and also producing a magnetic flux acting opposite to a demagnetizing field flowing from the stator 1030.

The easy axes of magnetization in the magnets 1071 are oriented not to face each other on the d-axis side ends 1071a, thereby eliminating a risk of demagnetization of the magnets 1071 arising from mutual interference between magnetic fluxes around the d-axis.

The rotor core 1011 is designed to have the magnets 1071 each of which has the q-axis side end 1071b and the d-axis side end 1071a. The q-axis side end 1071b is located radially closer to the stator 1030 than the d-axis side end 1071a is. Each of the magnets 1071 is configured to have a convex shape protruding toward the stator 1030 between the q-axis side end 1071b and the d-axis side end 1071a. In other words, the paired magnets 1071 lying on the opposite sides of the d-axis are arranged in a substantially V-shape, i.e., an arc convex shape protruding toward the stator 1030 (i.e., an upper side in the drawing). The magnet housing holes 1012 have the same configuration as those of the magnets 1071.

To say it in a different way, each of the magnet housing holes 1012 has the curved surfaces 1052a and 1052b. The curved surface 1052a which is closer to the stator 1030 than the curved surface 1052b is and serves as a flux output surface. The curved surface 1052a bulges in a convex shape to be closer to the stator 1030 than a line segment is, this line segment being defined to connect the opposed ends of the magnet housing hole 1012 (i.e., a straight line connecting between opposed ends of the curved surface 1052a).

The above structure enables the magnets 1071 to be located close to the outer periphery of the rotor core 1011 to decrease a distance between the stator 1030 and each of the magnets 1071, thereby enhancing the degree of output torque. The decreased distance between the stator 1030 and each of the magnets 1071 adversely results in an increase in degree of the demagnetizing field. The negative effects of such an increase are, however, mitigated by the non-linearly curved configuration of the easy axes of magnetization in the magnets 1071.

The above structure of the rotor core 1011 enables a portion thereof which is located closer to the stator 1030 than each of the magnets 1071 (i.e., the magnet housing holes 1012) is and exposed to the sum of magnetic fluxes generated by the stator 1030 and the magnets 1071 to be reduced in volume thereof, thereby resulting in a decreased region of the rotor core 1011 where the saturation of magnetic fluxes from the stator 1030 and the magnets 1071 and ensuring the performance of the magnets 1071.

The convex shape of the magnets 1071 protruding radially outward results in a decrease in volume of a portion of the rotor core 1011 which is located radially outside the magnet housing holes 1012, thereby decreasing a factor of stress concentration caused by the centrifugal force, which increases the mechanical strength of the rotor core 1011.

FIG. 108 demonstrates only the magnets 1071 which create the N-pole. The magnets 1071 which create the S-pole are designed to have easy axes of magnetization oriented in a direction opposite a direction in which the easy axes of magnetization in FIG. 108 extend.

It is advisable that the magnet housing holes 1012 in FIG. 108 be shaped to have flux barriers between the paired magnets 1071 to reduce passage of magnetic flux flowing across the d-axis.

Each of the magnets 1071 in FIG. 108 may be made of an assembly of a plurality of magnet segments. Specifically, each of the magnets 1071 may be made of a plurality of magnet segments stacked on one another in the lengthwise direction of the magnet 1071 with ends of the magnet segments placed in contact with each other. The stack of the magnet segments is disposed in each of the magnet housing holes 1012. This layout avoids losses due to eddy currents arising from magnetic fluxes interlinking with the magnets 1071 during an operation of the rotating electrical machine 1001.

In the structure of FIG. 108, a total dimension of the stator-facing peripheral surfaces (i.e., magnetic flux acting surfaces) of the magnets 1071 which create one magnetic pole in the lengthwise direction corresponds to the dimension Wm of a portion of a magnet unit for each magnetic pole in the circumferential direction. The paired main magnets 1071 which create one magnetic pole are, as can be seen in FIG. 108, arranged on the opposite sides of the d-axis. The dimension Wm of a portion of the magnet unit for each magnetic pole is, thus, equivalent to the sum of the dimension Wm/of the stator-facing peripheral surface of the left magnet 1071 and the dimension Wm2 of the stator-facing peripheral surface of the right magnet 1071.

Figure 109:
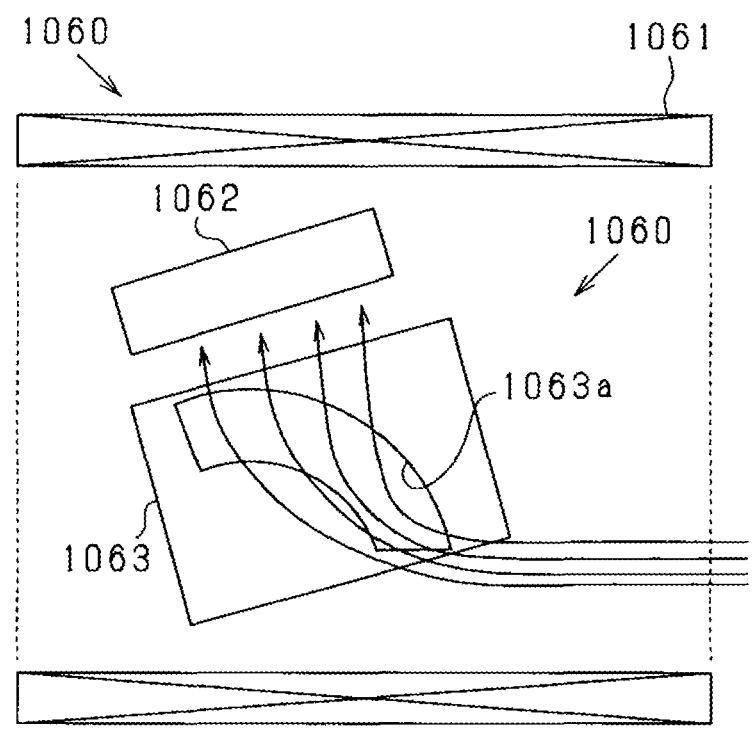
FIG. 109 is an explanatory view for explaining how to magnetize magnets using magnetic field orientation.

How to produce the magnets 1071 used in this embodiment will be described below. FIG. 109 demonstrates how to magnetize the magnets 1071 using magnetic field orientation techniques.

The magnetic orientation device 1060, as illustrated in FIG. 109, includes the magnetic field coil 1061, the magnetically orientating iron core 1062, and the die 1063 (i.e., a magnet making die) which are disposed inside the magnetic field coil 1061. These parts have the same structures as those in FIG. 103.

The production of the magnet 1071 is achieved by supplying magnet powder, as made by crushing a magnet material, into the die cavity 1063a of the die 1063 and pressing it into a selected shape within the die cavity 1063a. The magnetically orientating iron core 1062 produces a magnetic field curved into the illustrated shape within the magnetic field coil 1061 to magnetically orient the magnet powder in the die cavity 1063a in such a way that easy axes of magnetization in the magnet powder will be aligned in a given direction. The magnet powder is then pressed into a preform body. The preform body is sintered and magnetized to complete the magnet 1071.

In the above way, the easy axis of magnetization in the magnet 1071 is non-linearly curved into an arc-shape. Afterwards, the magnet 1071 is disposed in each of the magnet housing holes 1012. This causes each of the magnets 1071 to have the easy axis of magnetization which, as illustrated in FIG. 108, extends as a whole from the d-axis side end 1071a toward the q-axis side end 1071b with a first portion thereof which is close to the d-axis side end 1071a and oriented near perpendicular to the d-axis and a second portion thereof which is close to the q-axis side end 1071b and oriented nearly parallel to the q-axis. In other words, the easy axis of magnetization is curved in non-linearly in a convex shape which protrudes away from the stator 1030.

Modification of Magnet Production Method

The production of magnets with curved easy axes of magnetization may be achieved in the following way illustrated in FIG. 110(a) or 110(b). The magnetic orientation device 1080 includes the magnetic field coil 1081, the magnetically orientating iron core 1082, and the die 1083 (i.e., a magnet making die) which are disposed inside the magnetic field coil 1081. The structure of the magnetic orientation device 1080 is basically identical with that of the above described magnetic orientation device 1060 except for the configuration of the magnetically orientating iron core 1082. The magnetically orientating iron core 1082 is placed at the radially inner center of the magnetic field coil 1081. The magnetically orientating iron core 1082 is of a circular cross section, so that a magnetic orientation magnetic field is concentrated on the center of the magnetically orientating iron core 1082. In the drawing, the line of magnetic force S1001 extends linearly toward the magnetically orientating iron core 1082 and is defined as a magnetic orientation center in this disclosure.

Figure 110A:
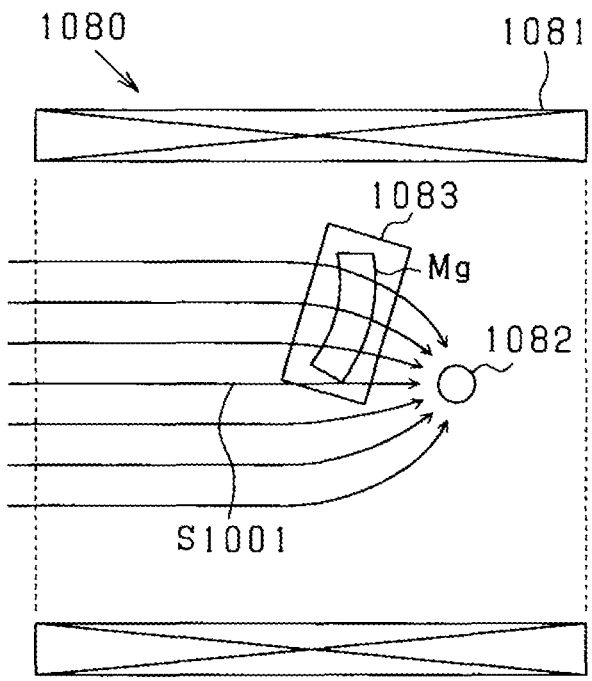
FIGS. 110(a) and 110(b) are explanatory views for explaining how to magnetize magnets using magnetic field orientation.
Figure 110B:
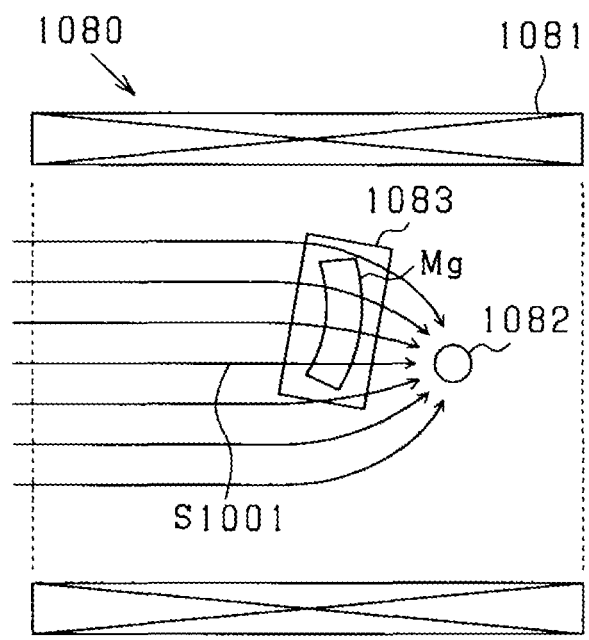

In the structure illustrated in FIG. 110(a), magnet orientation is achieved in a region lying on one of opposite sides of the magnetic orientation center S1001 within a curved magnetic field. In the structure illustrated in FIG. 110(b), magnet orientation is achieved in a region extending across the magnetic orientation center S1001 within a curved magnetic field.

In the production of the magnet Mg, magnet powder is first supplied into the die 1083. The magnetic field coil 1081 generates a magnetic field which is then curved by the magnetically orientating iron core 1082 to magnetically orient the magnet powder in the die 1083. Afterwards, the magnet powder is sintered in the die 1083.

In a case where polygonal permanent magnets are mounted in a rotor, it is preferable that polygonal groups of permanent magnets are placed at different angles to a direction of linear orientation and then magnetically oriented.

Sixth Embodiment

Figure 111:
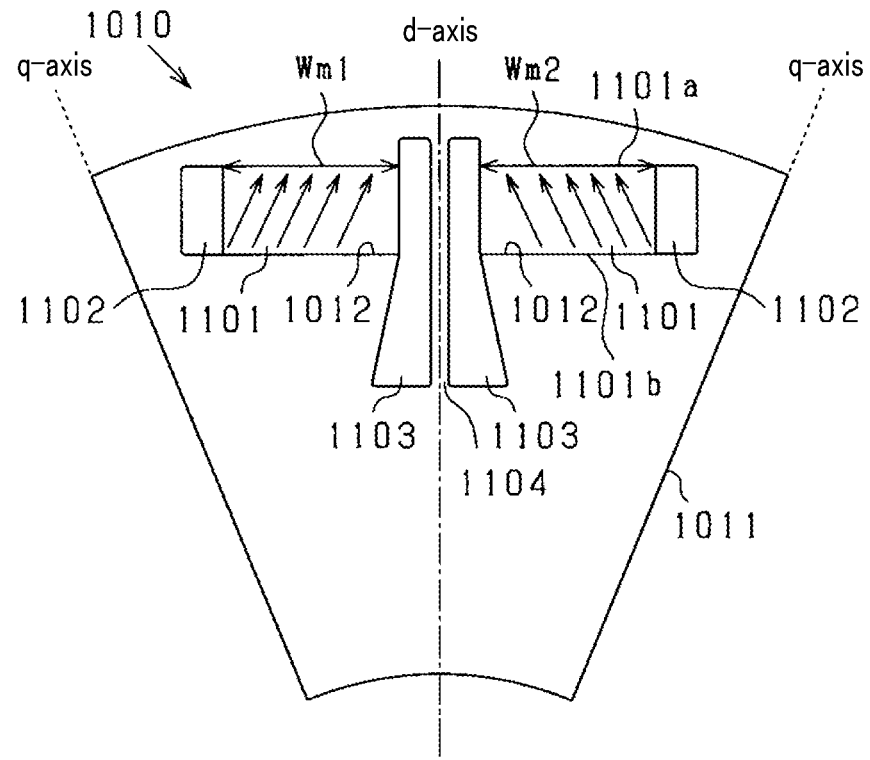
FIG. 111 is a partial plan view which illustrates a rotor in the sixth embodiment.

The sixth embodiment will be described below in terms of features different from those in the third embodiment. In the sixth embodiment, an easy axis of magnetization of a magnet is oriented to intersect at an angle of other than 90° with at least one of magnetic flux acting surfaces of the magnet. Particularly, the easy axis of magnetization in the magnet is inclined at an angle to the d-axis and intersect at an angle of other than 90° with the magnetic flux acting surface of the magnet. FIG. 111 illustrates the rotor 1010 in this embodiment.

Every two of the magnet housing holes 1012 are, as can be seen in FIG. 111, paired. The paired magnet housing holes 1012 linearly extend perpendicular to the d-axis. In terms of a distance between each of the magnet housing holes 1012 and the stator 1030, each of the magnet housing holes 1012 is arranged to have an interval between itself and the stator 1020 which increases toward the d-axis. The paired magnet housing holes 1012 are disposed to be symmetrical with respect to the d-axis that is the center of a magnetic pole. In this embodiment, the rotor core 1011 has eight magnet housing holes 1012 arranged at equal intervals away from each other in the circumferential direction of the rotor cord 1011.

The magnets 1101 mounted in the paired magnet housing holes 1012 create one magnetic pole. The eight pairs of magnets 1101 create a plurality of (i.e., eight in this embodiment) magnetic poles whose polarities alternate in the circumferential direction. The magnets 1101 which are paired to form one magnetic pole are arranged to be linesymmetrical with respect to the d-axis.

Each of the magnets 1101 is shaped to have a square transverse section extending perpendicular to the axial direction. The easy axis of magnetization (i.e., a line of magnetic force defining a magnetic path) in each of the magnets 1101 is inclined to the d-axis and extend to intersect at an angle of other than 90° with the opposed magnetic flux acting surfaces 1101*a* and 1101*b*. Particularly, the easy axis of magnetization of each of the magnets 1101 is oriented to intersect at an angle of other than 90° with two side surfaces of the magnet 1101 which are opposed to each other and function as magnetic flux acting surfaces (i.e., the side surface of the magnet 1101 facing the stator 1030 and the side surface of the magnet 1101 facing away from the stator 1030). In other words, the easy axes of magnetization in the paired magnets 1101 are inclined at an angle to each of the magnetic flux acting surfaces 1101*a* and 1101*b* and intersect with each other at a location closer to the stator 1030 than the magnet housing holes 1012 are. Each of the magnets 1101 is made of a rare earth magnet, such as a sintered neodymium magnet.

One of the paired magnets 1101 arranged on the opposite sides of the d-axis has the easy axes of magnetization oriented in a direction opposite a direction in which the easy axes of magnetization in the other. The easy axes of magnetization in each of the magnets 1101 linearly extend parallel to each other. The easy axes of magnetization in each of the magnets 1101 intersect at an angle of other than 90° with the magnetic flux acting surfaces 1101*a* and 1101*b*, thereby resulting in an increased magnet magnetic path (i.e., the length of a line of inner magnetic force) as compared with when the easy axes of magnetization extend perpendicular to the magnetic flux acting surfaces 1101*a* and 1101*b*. This enhances the magnetic fluxes in the magnets 1101 and also increases the resistance to demagnetization of the magnets 1101 caused by a demagnetizing field arising from a rotating magnetic flux from the stator 1030.

FIG. 111 demonstrates only the magnets 1101 which create the N-pole. The magnets 1101 which create the S-pole are designed to have easy axes of magnetization oriented in a direction opposite a direction in which the easy axes of magnetization in FIG. 111 extend.

In the structure of FIG. 111, a total dimension of the stator-facing peripheral surfaces (i.e., the magnetic flux acting surfaces 1101*a*) of the magnets 1101 which create one magnetic pole in the lengthwise direction corresponds to the dimension Wm of a portion of a magnet unit for each magnetic pole in the circumferential direction. The paired main magnets 1101 which create one magnetic pole are, as can be seen in FIG. 111, arranged on the opposite sides of the d-axis. The dimension Wm of a portion of the magnet unit for each magnetic pole is, thus, equivalent to the sum of the dimension Wm1 of the stator-facing peripheral surface 1101*a* of the left magnet 1101 and the dimension Wm2 of the stator-facing peripheral surface 1101*a* of the right magnet 1101.

Portions of each of the magnet housing holes 1012 unoccupied by the magnet 1101, that is, a first end and a second end of the length of each of the magnet housing holes 1012 which are close to the q-axis and the d-axis, respectively, have disposed therein the flux barriers 1102 and 1103 working to minimize a risk of a self short-circuit of a magnet-produced magnetic flux in the rotor 1010. Specifically, the outer flux barrier 1102 which is arranged on the q-axis side end of each of the magnets 1101 serves to eliminate a risk that the magnetic flux, as created near the q-axis side end of the magnet 1101, may be self short-circuited.

Particularly, the second end of each of the magnet housing holes 1012 which is close to the d-axis extends both toward the stator 1030 along the d-axis and toward the rotating shaft 1002 along the d-axis. The inner flux barrier 1103 disposed on the d-axis side end of each of the magnets 1101 is, therefore, shaped to extend along the d-axis. The inner flux batteries 1103 serve to reduce magnetic fluxes extending perpendicular to the d-axis in the magnets 1101 arranged on the opposite sides of the d-axis and also decrease the inductance on the d-axis to produce a desired degree of reluctance torque. Each of the flux barriers 1102 and 1103 may be made of a void space or a non-magnetic material, such as resin material or ceramic material. The center bridge 1114 which extends along the d-axis is disposed between the paired flux barriers 1102 and 1103.

This embodiment described above offers the following beneficial advantages.

The rotor 10101 of an interior permanent magnet rotating electrical machine has a possible issue that a rotating magnetic field from the stator 1030 may act a demagnetizing field, thereby causing the magnets 1101 to be demagnetized near the surface of the rotor core 1011 which faces the stator 1030. In order to alleviate such a problem, the rotor 1010 in this embodiment has the magnets 1101 in which the easy axes of magnetization are inclined to the d-axis and extend to intersect at an angle of other than 90° with the magnetic flux acting surfaces creating the magnetic fluxes, thereby resulting in an increased magnet magnetic path (i.e., the length of a line of inner magnetic force) as compared with when the easy axes of magnetization extend perpendicular to the magnetic flux acting surfaces. This enhances the magnetic fluxes in the magnets 1101 and also increases the resistance to demagnetization of the magnets 1101 caused by a demagnetizing field arising from a rotating magnetic flux from the stator 1030.

The paired magnets 1101 are arranged on the opposite sides of the d-axis in the rotor core 1011 and have the easy axes of magnetization which are inclined to the magnetic flux acting surfaces thereof and extend to intersect with each other at a location closer to the stator 1030 than the magnet housing holes 1012 are. This increases the resistance to demagnetization of the magnets 1101 caused by a demagnetizing field in the rotor core 1011 and also enhances the magnetic fluxes on the d-axis.

In a case where each of the magnets 1101 has a square transverse section, the length of a magnet magnetic path (i.e., a line of inner magnetic force) is increased by orienting the easy axes of magnetization in the magnets 1101 to intersect at an angle of other than 90° with the magnet side surfaces 1101a and 1101b which face each other and serve as magnetic flux acting surfaces to be longer than a distance between the magnet side surfaces 1101a and 1101b. This enhances the magnet magnetic flux and increases the resistance to demagnetization of the magnets 1101 arising from the demagnetizing field.

The demagnetization of a magnet is usually reduced by increasing the thickness of a portion of the magnet on which a high degree of demagnetizing field acts, producing the magnet to contain an increased quantity of heavy rare earth, or making the magnet to have fine crystals to increase the coercive force. In contrast, the structure of the rotating electrical machine 1001 in this embodiment is designed to add unique features to the easy axes of magnetization in the magnets 1101 to reduce the demagnetization of the magnets 1101 arising from the demagnetizing field without need for increasing the size of the magnets 1101 and using heavy rare earth in producing the magnets 1101. This enables, for example, parts of vehicles to be produced to contain an increased amount of neodymium having a high density of magnetic flux without use of valuable heavy rare earth, thereby increasing the degree of output torque without need for increasing the volume of material for the magnets 1101 and enabling the rotating electrical machine 1001 to be manufactured at an unchanged or decreased cost.

Typical magnets are manufactured to have magnetic orientation parallel to cut or ground surfaces thereof. This is because the number of magnets produced by a single excitation of magnetic orientation magnetic field is maximized by orienting the magnetic orientation magnetic field parallel to the ground surfaces. In contrast, this embodiment has the magnets 1101 which have square transverse sections and in which the magnetic orientation is oblique to the outer peripheries of the magnets 1101. In other words, each of the magnets 1101 is magnetically oriented to have the easy axes of magnetization extending at an angle of other than 90° to the magnetic flux acting surfaces 1101a and 1101b, thereby creating a magnetic path which is located in an end portion of the magnet 1101 most likely to be demagnetized. This results in an increased demagnetization resistance of a portion of the magnet 1101 likely to be demagnetized. The number of produced magnets is, therefore, decreased, but the weight of the magnets can be decreased. It is, therefore, possible to make a large number of magnets by a single magnetic orientation and also decrease a used volume of magnet material, such as neodymium, thereby enabling the magnets to be produced at a low cost.

The estimation made by developers shows that magnets which output the same magnetic force, but have weight lower than typical magnets by 30% can be manufactured, and that it is possible to decrease a used volume of rare earth and the weight or inertia of a rotating electrical machine in which the magnets are installed. This improves a mechanical response rate or a mechanical reliability in operation of the rotating electrical machine, decreases an energy consumption of the rotating electrical machine, and improves the safety of the rotating electrical machine.

Modifications in which portions of the rotor 1010 in the sixth embodiment are modified will be described below. The following discussion will mainly refer to features different from those in the structure illustrated in FIG. 111 with reference to drawings that are partial plan views illustrating a portion of the rotor 1010 which creates one magnetic pole around the d-axis.

Twenty-Sixth Modification

Figure 112:
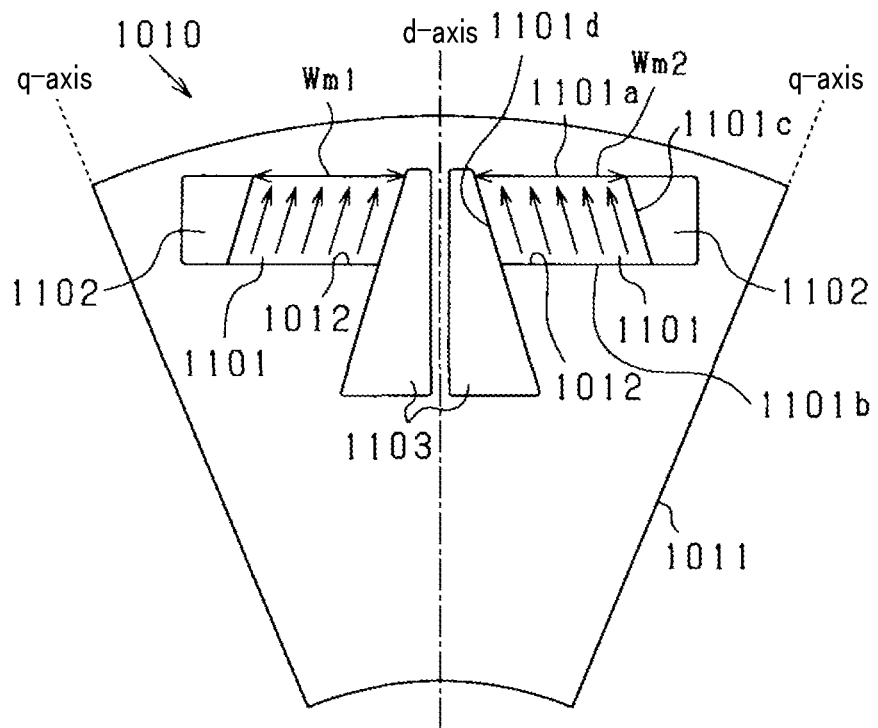
FIG. 112 is a partial plan view which illustrates a rotor in the twenty-sixth modification.

FIG. 112 shows the magnets 1101 in the twenty-sixth modification. Each of the magnets 1101 has the q-axis side end 1101c and the d-axis side end 1101d whose surfaces extend at an angle to the magnetic flux acting surfaces 1101a and 1101b which easy axes of magnetization make with the magnetic flux acting surfaces 1101a and 1101b. In other words, the surfaces of the q-axis side end 1101c and the d-axis side end 1101d of each of the magnets 1101 extend parallel to the easy axes of magnetization. The flux barriers 1102 and 1103 are disposed outside the q-axis side end 1101c and the d-axis side end 1101d of each of the magnets 1101, respectively.

The surfaces of the q-axis side end 1101c and the d-axis side end 1101d of each of the magnets 1101 in FIG. 112 are oriented to be inclined at the same angle as that which the easy axes of magnetization make with the magnetic flux acting surfaces 1101a and 1101b, however, the surface of only the q-axis side end 1101c of each of the magnets 1101 may alternatively be oriented parallel to the easy axes of magnetization. In this case, the d-axis side end 1101d is, like in FIG. 111, oriented parallel to the d-axis. In other words, the transverse section of each of the magnets 1101 is parallelogram, but may be trapezoidal as well as square or rectangular.

The above structure in which the easy axis of magnetization in each of the magnets 1101 is oriented to intersect at an angle of other than 90° with the magnetic flux acting surfaces 1101a and 1101b has the length of magnet magnetic paths which is longer than that in the structure in which the easy axis of magnetization in the magnets 1101 extend perpendicular to the magnetic flux acting surfaces 1101a and 1101b, but however, it leads to a risk that the length of one of the magnet magnetic paths near the end of the magnet 1101 may be shorter than those of the other magnet magnetic paths. This drawback is, however, eliminated by orienting the q-axis side end 1101c of the magnet 1101 parallel to the easy axis magnetization inclined to the magnetic flux acting surfaces 1101a and 1101b.

In the structure illustrated in FIG. 112, portions of the magnet 1101 which do not contribute to increase in magnetic flux are obliquely cut, thereby resulting in a decreased volume of magnetic material as compared with the structure in FIG. 111. This enables the number of magnets produced in a magnet making die to be increased or a used volume of magnet material to be reduced. In the structure of FIG. 112, a total dimension of the stator-facing peripheral surfaces (i.e., the magnetic flux acting surfaces 1101a) of the magnets 1101 which create one magnetic pole corresponds to the dimension Wm of a portion of a magnet unit for each magnetic pole in the circumferential direction. The paired main magnets 1101 which create one magnetic pole are, as can be seen in FIG. 112, arranged on the opposite sides of the d-axis. The dimension Wm of a portion of the magnet unit for each magnetic pole is, thus, equivalent to the sum of the dimension Wm1 of the left stator-facing peripheral surface 1101a and the dimension Wm2 of the right stator-facing peripheral surface 1101a. Note that the q-axis side end 1101c is not a magnetic flux acting surface and thus excluded from the magnet flux acting surface 1101a.

Twenty-Seventh Modification

Figure 113:
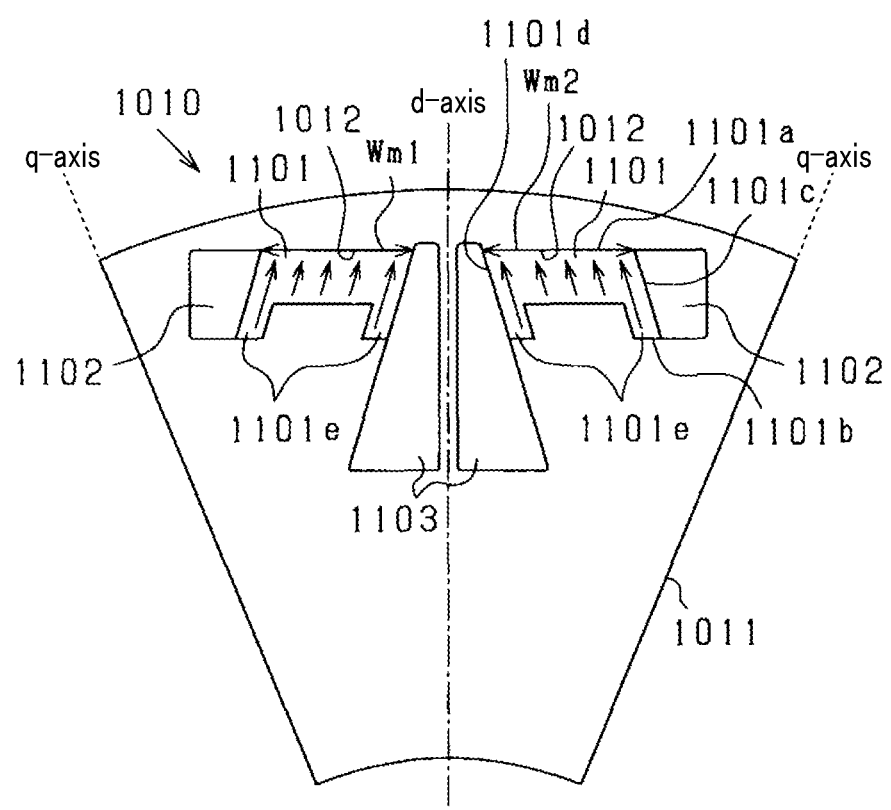
FIG. 113 is a partial plan view which illustrates a rotor in the twenty-seventh modification.

FIG. 113 shows the magnets 1101 in the twenty-seventh modification. Each of the magnets 1101 is shaped to have a first dimension of portions (i.e., easy axes of magnetization) around the q-axis side end 1101c and the d-axis side end 1101d and a second dimension of a portion (i.e., easy axes of magnetization) other than the q-axis side end 1101c and the d-axis side end 1101d. The first dimension is larger than the second dimension. In other words, each of the magnets 1101 has a recess formed in the second magnetic flux acting surface 1101b to define extensions 1101e on the q-axis side end 1101c and the d-axis side end 1101d. The extensions 1101e serve to lengthen some of magnet magnetic paths. The extensions 1101e, thus, function as magnetic flux extensions. The extensions 1101e are formed on the magnetic flux acting surface 1101b which is located closer to the rotating shaft 1002 than the magnetic flux acting surface 1101a is.

In FIG. 113, the extensions 1101e are disposed one on each of the q-axis side end 1101c and the d-axis side end 1101d of each of the magnets 1101, but however, only the q-axis side end 1101c may be designed to have the extension 1101e.

The twenty-seventh modification in which the easy axes of magnetization of the magnets 1101 are oriented to intersect at an angle of other than 90° with the magnetic flux acting surfaces 1101a and 1101b to lengthen the magnet magnetic paths is, as described above, designed to increase the lengths of magnetic paths around the q-axis side end 1101c and the d-axis side end 1101d. This further enhances the resistance to demagnetization of the magnets 1101.

In the structure of FIG. 113, a total dimension of stator-facing peripheral surfaces (i.e., the magnetic flux acting surfaces 1101a) of the paired magnets 1101 which create one magnetic pole corresponds to the dimension Wm of a portion of a magnet unit for each magnetic pole in the circumferential direction. The paired main magnets 1101 which create one magnetic pole are, as can be seen in FIG. 113, arranged on the opposite sides of the d-axis. The dimension Wm of a portion of the magnet unit for each magnetic pole is, thus, equivalent to the sum of the dimension Wm1 of the left stator-facing peripheral surface 1101a and the dimension Wm2 of the right stator-facing peripheral surface 1101a. Note that the q-axis side end 1101c is not a magnetic flux acting surface and thus excluded from the magnet flux acting surface 1101a.

Twenty-Eighth Modification

Figure 114A:
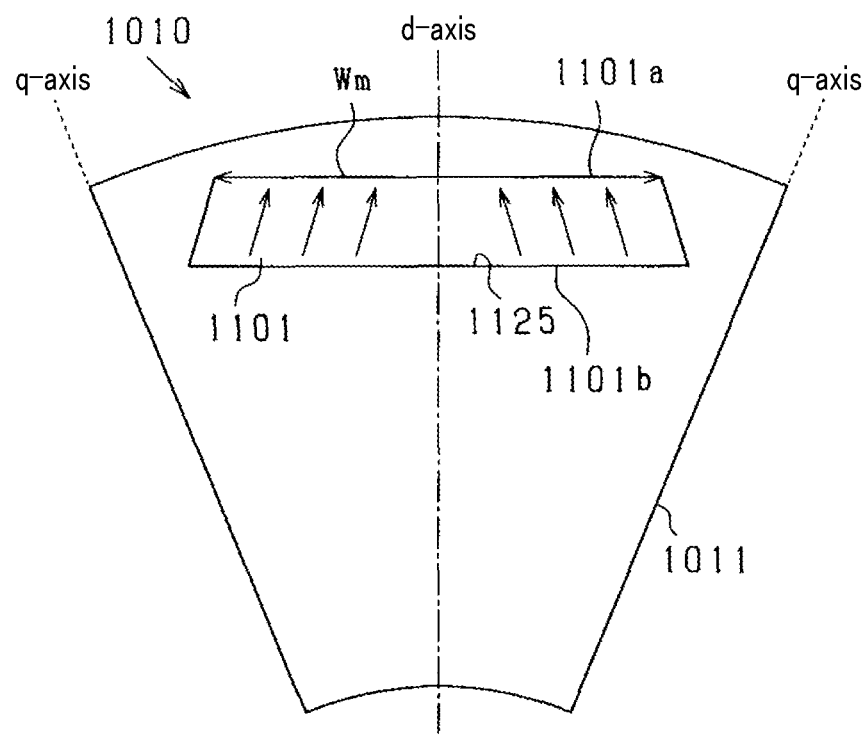
FIGS. 114(a) and 114(b) are partial plan views which illustrate a rotor in the twenty-eighth modification.
Figure 114B:
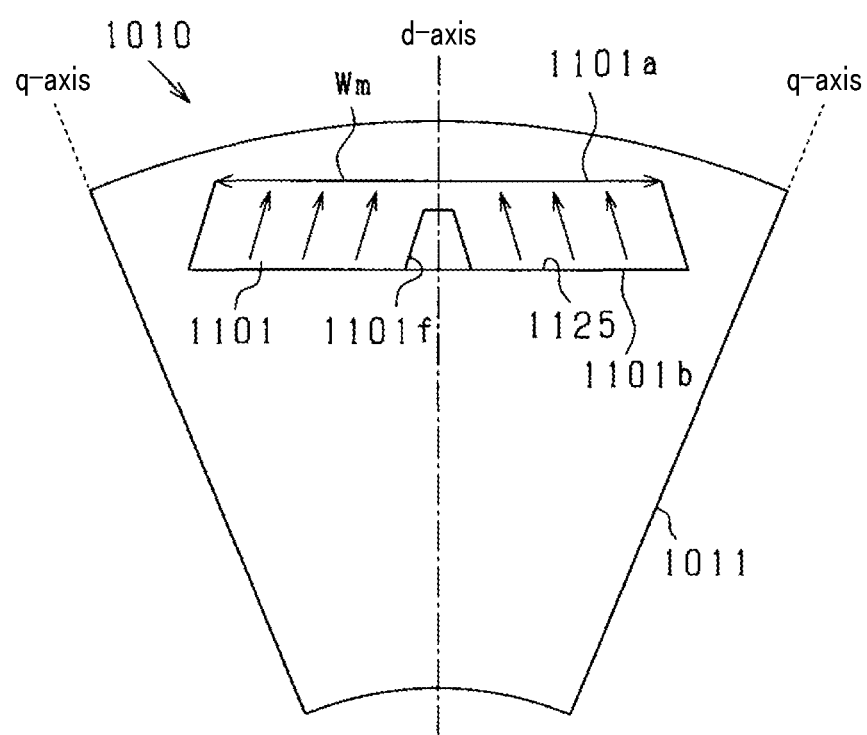

The rotor core 1011 may be designed to have the magnets 1101 arranged in a way, as illustrated in FIG. 114(a) or 114(b).

The rotor 1010 in FIG. 114(a) includes the rotor core 1011 which has eight magnet housing holes 1125 which are formed in portions close to an outer periphery thereof facing an inner periphery of the stator 1030. The magnet housing holes 1125 are arranged at a given interval away from each other in the circumferential direction of the rotor core 1101 and extend through the rotor core 1101 in the axial direction of the rotor core 1101. Each of the magnet housing holes 1125 extends through the d-axis that is the center of the magnetic pole at right angles to the d-axis.

In the twenty-eighth modification, the magnet 1101 disposed in each of the magnet housing holes 1125 includes a right portion and a left portion, as viewed in the drawing, which are located on opposite sides of the d-axis. The left portion has easy axes of magnetization extending obliquely upward in the rightward direction, as viewed in the drawing. The right portion has easy axes of magnetization extending obliquely upward in the leftward direction. This orientation causes the easy axes of magnetization both in the right and left portions of each of the magnets 1101 which are arranged on the opposite sides of the d-axis to pass through a region which lies around the d-axis and is located closer to the stator 1030 than the magnet 1101 (i.e., the magnet housing hole 1125) is. In other words, the right and left portions of the magnet 1101 arranged on the opposite sides of the d-axis have lines defined to extend straight from the easy axes of magnetization are collected to a point which lies on the d-axis and is located closer to the stator 1030 than the magnet 1101 (i.e., outside the ends of the magnets 1101).

The structure of the rotor 1010 illustrated in FIG. 114(a) has a risk that each of the magnets 1101 may have magnet magnetic fluxes interfering with each other on the d-axis, so that it becomes demagnetized. In order to alleviate this problem, each of the magnets 1101, as illustrated in FIG. 114(b), has the groove 1101f formed in the second flux acting surface 1101b on the d-axis. The magnet 1101 has a right side surface and a left side surface, as viewed in the drawing, which define the groove 1101f and face each other through the d-axis. The left side surface is oriented to extend obliquely upward in the rightward direction along the easy axes of magnetization in the left portion, while the right side surface is oriented to extend obliquely upward in the leftward direction along the easy axes of magnetization in the right portion. This structure enables the volume of magnet material to be reduced, thus resulting in a decreased production cost of the magnets 1101.

In the structure of FIG. 114, a dimension of a stator-facing peripheral surface (i.e., a magnetic flux acting surface) of the magnet 1101 creating one magnetic pole is equivalent to the dimension Wm of a portion of the magnet unit for each magnetic pole.

Twenty-Ninth Modification

Figure 115:
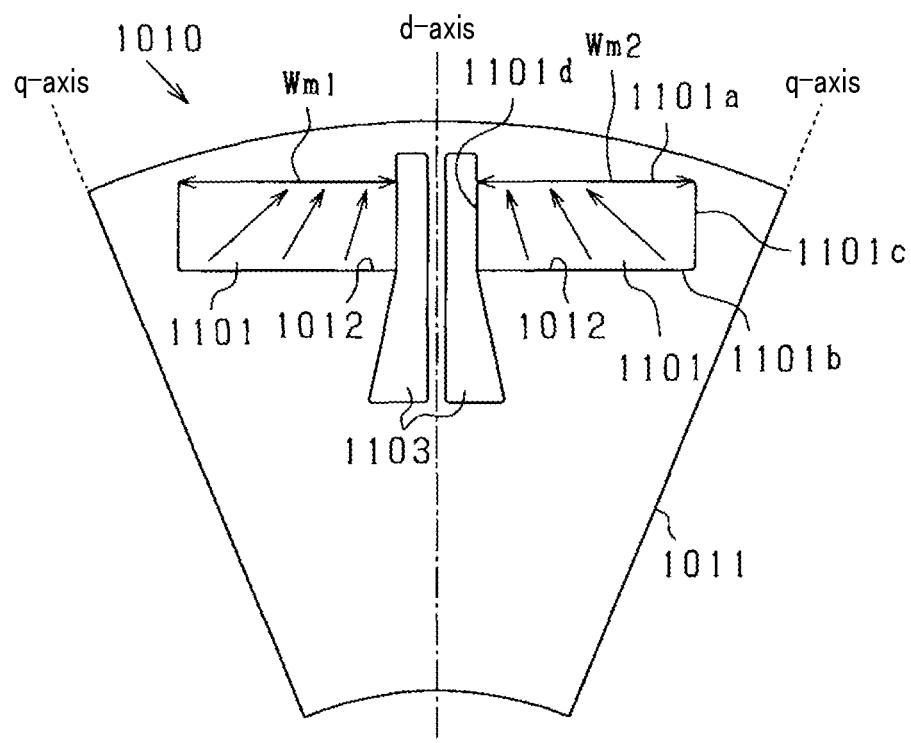
FIG. 115 is a partial plan view which illustrates a rotor in the twenty-ninth modification.

Each of the magnets 1101 in the twenty-ninth modification illustrated in FIG. 115 has easy axes of magnetization one of which is close to the d-axis side end 1101d and oriented in a direction different from that in which one of the easy axes of magnetization which is close to the q-axis side end 1101c extends. Particularly, the easy axis of magnetization located close to the d-axis side end 1101d of each of the magnets 1101 extend nearly parallel to the d-axis. An angle which the easy axes of magnetization make with the d-axis in each of the magnets 1101 (i.e., the degree of non-parallelism of the easy axes of magnetization to the d-axis) increases from the d-axis side end 1101d to the q-axis side end 1101c. In other words, each of the magnets 1101 has a direction of magnetization which differs between portions of the magnet 1101 closer to the d-axis and the q-axis. The easy axis of magnetization in the portion of the magnet 1101 close to the d-axis is oriented more parallel to the d-axis than that in the portion of the magnet 1101 close to the q-axis.

Figure 116:
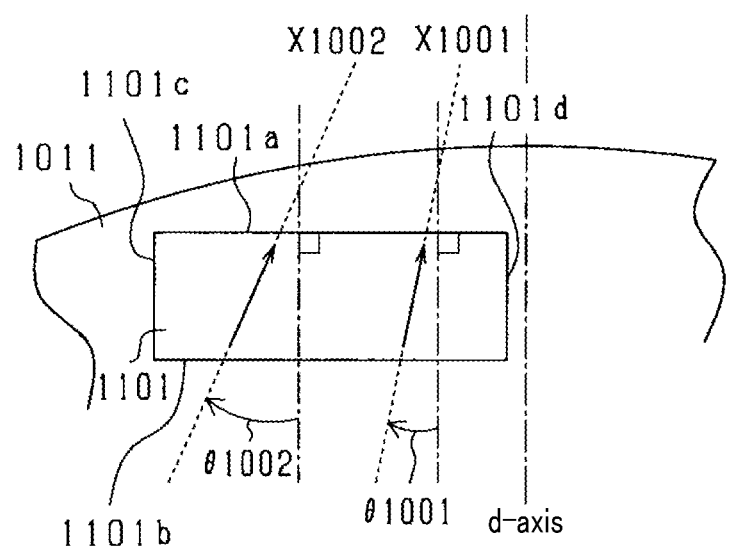
FIG. 116 is a view which shows orientations of easy axes of magnetization of a magnet in detail.

Specifically, if one of the easy axes of magnetization which is located closer to the d-axis side end 1101*d* than to the q-axis side end 1101*c* in each of the magnets 1101 is, as illustrated in FIG. 116, referred to as an easy axis of magnetization X1001, and one of the easy axes of magnetization which is located closer to the q-axis side end 1101*c* than to the d-axis side end 1101*d* in each of the magnets 1101 is referred to as an easy axis of magnetization X1002, the easy axis of magnetization X1001 close to the d-axis side end 1101*d* is more parallel to the d-axis than the easy axis of magnetization X1002 close to the q-axis side end 1101*c* is. An angle θ1002 at which the easy axis of magnetization X1002 is inclined to a direction perpendicular to the magnetic flux acting surfaces 1101*a* and 1101*b*, that is, to the d-axis is larger than an angle θ1001 at which the easy axis of magnetization X1001 is inclined to the direction perpendicular to the magnetic flux acting surfaces 1101*a* and 1101*b* in each of the magnets 1101.

Each of the magnets 1101, therefore, has the easy axes of magnetization whose lengths lying in the magnet 1101, in other words, lengths of magnet magnetic paths each of which extends between ends of a length of a corresponding one of the easy axes of magnetization decrease gradually from the q-axis side end 1101*c* to the d-axis side end 1101*d*. Each of the magnets 1101 may have easy axes of magnetization oriented to intersect at right angles with the magnetic flux acting surfaces 1101*a* and 1101*b* creating magnetic fluxes in addition to the easy axes of magnetization intersecting at an angle of other than 90° with the magnetic flux acting surfaces 1101*a* and 1101*b*.

In the structure illustrated in FIG. 116, each of the magnets 1101 is shaped to have the magnetic flux acting surfaces 1101*a* and 1101*b* extending perpendicular to the d-axis, so that a direction perpendicular to the magnetic flux acting surfaces 1101*a* and 1101*b* is identical with that in which the d-axis extends. In contrast, in a case where each of the magnets 1101 is designed to have the magnetic flux acting surfaces 1101*a* and 1101*b* oriented not to extend perpendicular to the d-axis, the direction perpendicular to the magnetic flux acting surfaces 1101*a* and 1101*b* is different from that in which the d-axis extends. In such a case, the angle θ1002 at which the easy axis of magnetization X1002 close to the q-axis side end 1101*c* of each of the magnets 1101 is inclined to the direction perpendicular to the magnetic flux acting surfaces 1101*a* and 1101*b* is preferably selected to be larger than the angle θ1001 at which the easy axis of magnetization X1001 close to the d-axis side end 1101*d* of each of the magnets 1101 is inclined to the direction perpendicular to the magnetic flux acting surfaces 1101*a* and 1101*b*.

The inclined angles θ1001 and 01002 which represent orientations of the easy axes of magnetization X1001 and X1002 also indicate directions in which the easy axes of magnetization are oriented in each of the magnets 1101 (i.e., directions of magnetic orientation). The direction of the easy axes of magnetization, as described already, is a direction in which the orientation ratio (or percentage) is 50% or more or a direction of an average of magnetic orientations. More specifically, in the structure illustrated in FIG. 116, the orientation ratio of easy axes of magnetization extending at the inclined angle θ1001 in a given region of the magnet 1101 in which the easy axis of magnetization X1001 is present is preferably 50% or more. In other words, an average of angles at which the easy axes of magnetization lying in the region including the easy axis of magnetization X1001 are inclined to the direction perpendicular to the magnetic flux acting surfaces 1101*a* and 1101*b* is preferably identical with the inclined angle θ1001.

In the structure of FIG. 115, a total dimension of stator-facing peripheral surfaces (i.e., the magnetic flux acting surfaces 1101*a*) of the paired magnets 1101 which create one magnetic pole corresponds to the dimension Wm of a portion of a magnet unit for each magnetic pole in the circumferential direction. The paired main magnets 1101 which create one magnetic pole are, as can be seen in FIG. 115, arranged on the opposite sides of the d-axis. The dimension Wm of a portion of the magnet unit for each magnetic pole is, thus, equivalent to the sum of the dimension Wm/of the left stator-facing peripheral surface 1101*a* and the dimension Wm2 of the right stator-facing peripheral surface 1101*a*.

In the twenty-ninth modification, each of the magnets 1101, as described above, has easy axes of magnetization one of which is close to the d-axis side end 1101*d* and oriented in a direction different from that in which one of the easy axes of magnetization which is close to the q-axis side end 1101*c* extends. In other words, an angle which the easy axes of magnetization close to the d-axis side end 1101*d* make with the d-axis is different from that which the easy axes of magnetization close to the q-axis side end 1101*c* make with the d-axis in each of the magnets 1101. This causes magnetic fluxes to be concentrated on a given region located closer to the stator 1030 between the d-axis and the q-axis than each of the magnets 1101 is, thereby enhancing the magnet magnetic fluxes.

The easy axis of magnetization in a portion of the magnet 1101 close to the d-axis side end 1101*d* extends more parallel to the d-axis than that in a portion of the magnet 1101 close to the q-axis side end 1101*c* does. This cause the length of a magnet magnetic path close to the q-axis side end 1101*c* to be larger than that of a magnetic path close to the d-axis side end 1101*d*.

The above layout of the magnetic paths servers to enhance the magnet magnetic flux around the q-axis, thereby increasing the resistance to demagnetization of the q-axis side end 1101*c* arising from the demagnetizing field. The above layout also enables the length of the magnet magnetic path around the d-axis side end 1101*d* to be minimized. Therefore, in a case where the easy axes of magnetization close to the d-axis side ends 1101*d* of the paired magnets 1101 arranged on the opposite sides of the d-axis are inclined to approach each other, it is possible to minimize a risk that the magnetic fluxes around the d-axis side ends 1101*d* interfere with each other. This also reduces the demagnetization of the magnets 1101 around the d-axis.

The degree of inclination of the easy axes of magnetization close to the q-axis side end 1101*c* to a direction perpendicular to the magnetic flux acting surfaces 1101*a* and 1101*b* is, as described above, larger than that of the easy axes of magnetization close to the d-axis side end 1101*d* to the direction perpendicular to the magnetic flux acting surfaces 1101*a* and 1101*b* (i.e., θ1002>θ1001 in FIG. 116). This enables the length of the magnet magnetic path around the q-axis side end 1101*c* to be maximized to increase the resistance to demagnetization around the q-axis side end 1101*c* which results from demagnetizing field in each of the magnets 1101, thereby minimizing the demagnetization around the q-axis side end 1101*c* and increasing the degree of output torque produced by the magnets 1101.

In the structure illustrated in FIG. 115, the magnet housing holes 1012 are shaped to linearly extend perpendicular to the d-axis. The degree of inclination of the easy axes of magnetization close to the q-axis side end 1101*c* to a direction perpendicular to the magnetic flux acting surfaces 1101a and 1101b may be set larger than that of the easy axes of magnetization close to the d-axis side end 1101d to the direction perpendicular to the magnetic flux acting surfaces 1101a and 1101b (i.e., θ1002>θ1001) by orienting the easy axes of magnetization located closer to the d-axis side end 1101d than to the q-axis side end 1101c to be more parallel to the d-axis than those located closer to the q-axis side end 1101c than to the d-axis side end 1101d.

Thirtieth Modification

Figure 117:
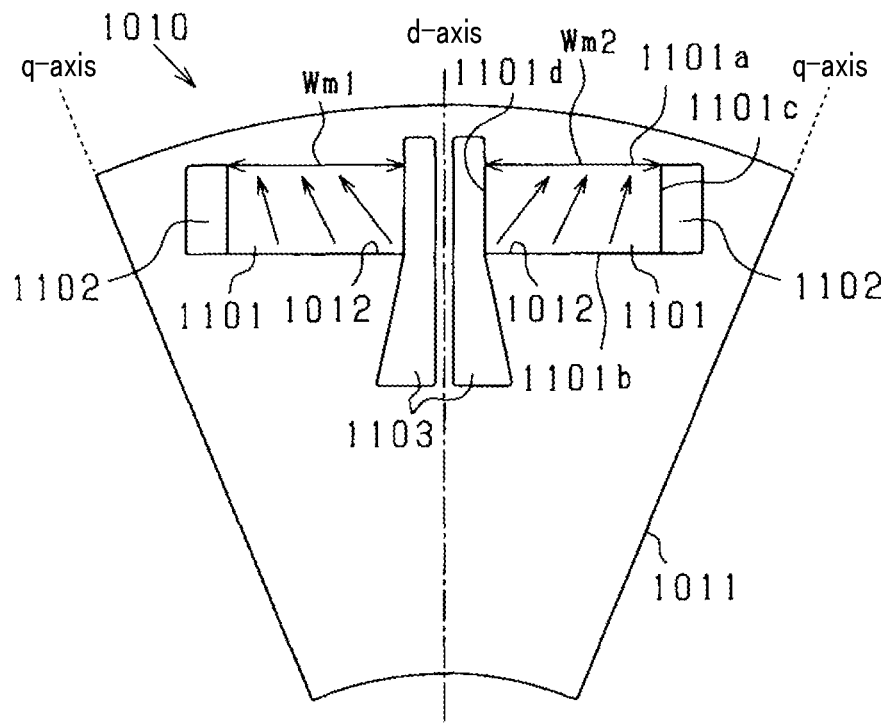
FIG. 117 is a partial plan view which illustrates a rotor in the thirtieth modification.

FIG. 117 illustrates the thirtieth modification in which the easy axes of magnetization one of which is close to the d-axis side end 1101d is, like in the twenty-ninth modification, oriented in a direction different from that in which one of the easy axes of magnetization which is close to the q-axis side end 1101c extends. In other words, directions in which portions of each of the magnets 1101 located close to the d-axis and the q-axis are magnetized are different from each other. The thirtieth modification is, however, designed to have the easy axis of magnetization which is located closer to the q-axis side end 1101c than to the d-axis side end 1101d in each of the magnets 1101 and, unlike the twenty-ninth modification, oriented to be more parallel to the q-axis than that located close to the d-axis side end 1101d is. Lengths of the easy axes of magnetization in each of the magnets 1101, i.e., lengths of magnet magnetic paths each of which extends between ends of a length of a corresponding one of the easy axes of magnetization decrease gradually from the d-axis side end 1101d to the q-axis side end 1101c.

In the above structure, the easy axis of magnetization around the q-axis side end 1101c of each of the magnets 1101 extends parallel to the q-axis, thereby enhancing a magnet magnetic flux which is oriented perpendicular to a stator facing surface of the rotor core 1011, in other words, oriented facing against the demagnetizing field, thereby increasing the resistance to demagnetization around the q-axis side end 1101c of each of the magnets 1101 which arises from the demagnetizing field.

In the structure of FIG. 117, the dimension Wm of a portion of the magnet unit for each magnetic pole in the circumferential direction is, like in the structure illustrated in FIG. 115, equivalent to the sum of the dimension Wm1 of the left stator-facing peripheral surface 1101a and the dimension Wm2 of the right stator-facing peripheral surface 1101a.

Thirty-First Modification

Figure 118:
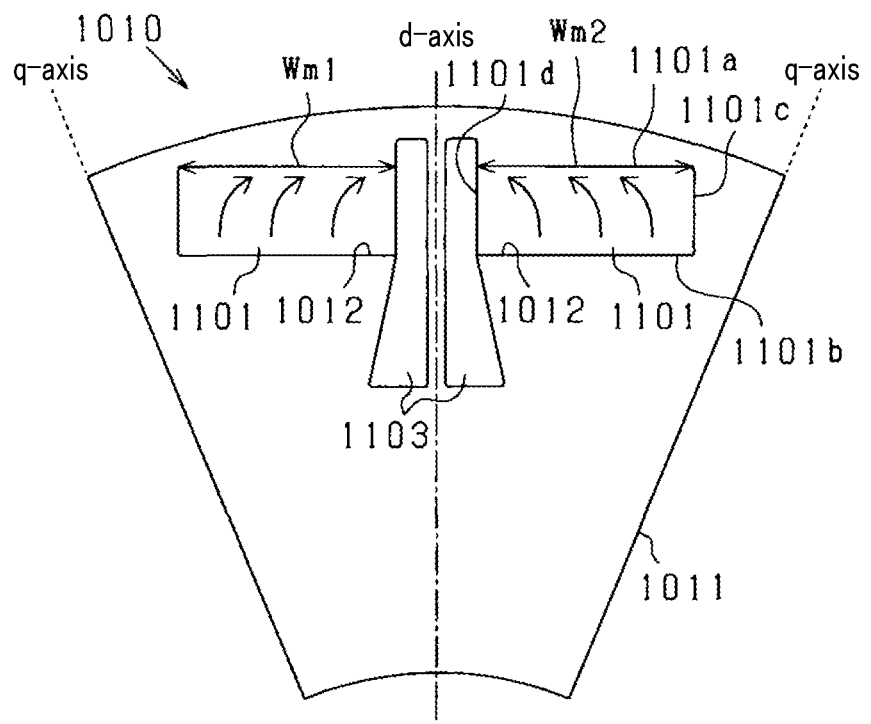
FIG. 118 is a partial plan view which illustrates a rotor in the thirty-first modification.

FIG. 118 illustrates the thirty-first modification in which the easy axes of magnetization in each of the magnets 1101 are curved in a non-linear shape, thereby lengthening magnet magnetic paths to enhance magnet magnetic fluxes in each of the magnets 1101. In the structure of FIG. 118, the dimension Wm of a portion of the magnet unit for each magnetic pole in the circumferential direction is, like in the structure illustrated in FIG. 115, equivalent to the sum of the dimension Wm1 of the left stator-facing peripheral surface 1101a and the dimension Wm2 of the right stator-facing peripheral surface 1101a.

Thirty-Second Modification

Figure 119A:
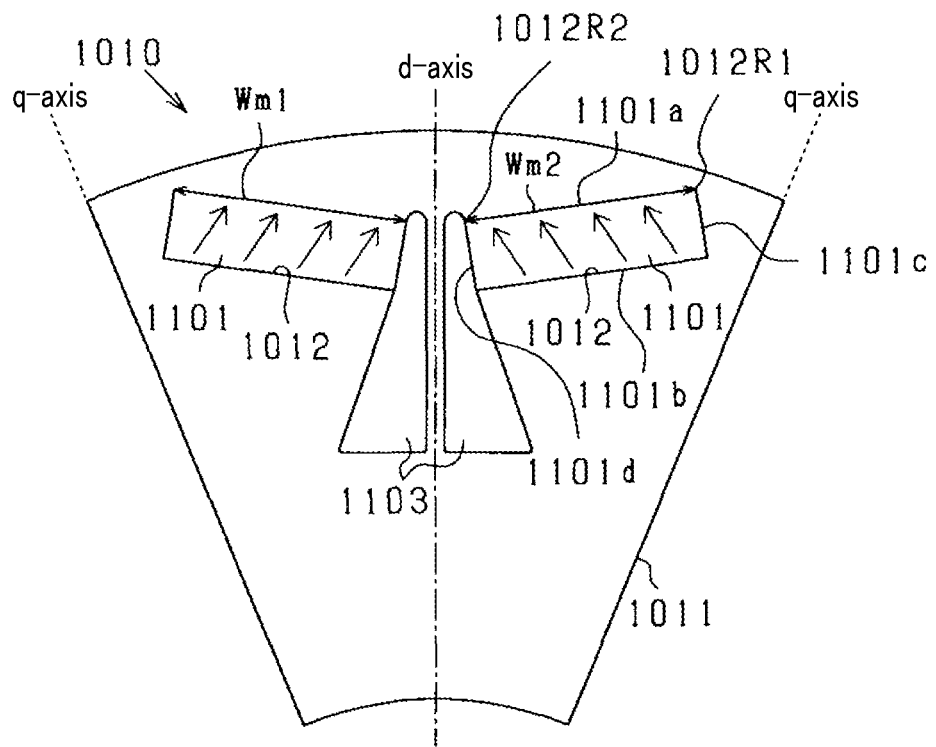
FIGS. 119(a) and 119(b) are partial plan views which illustrate a rotor in the thirty-second modification.
Figure 119B:
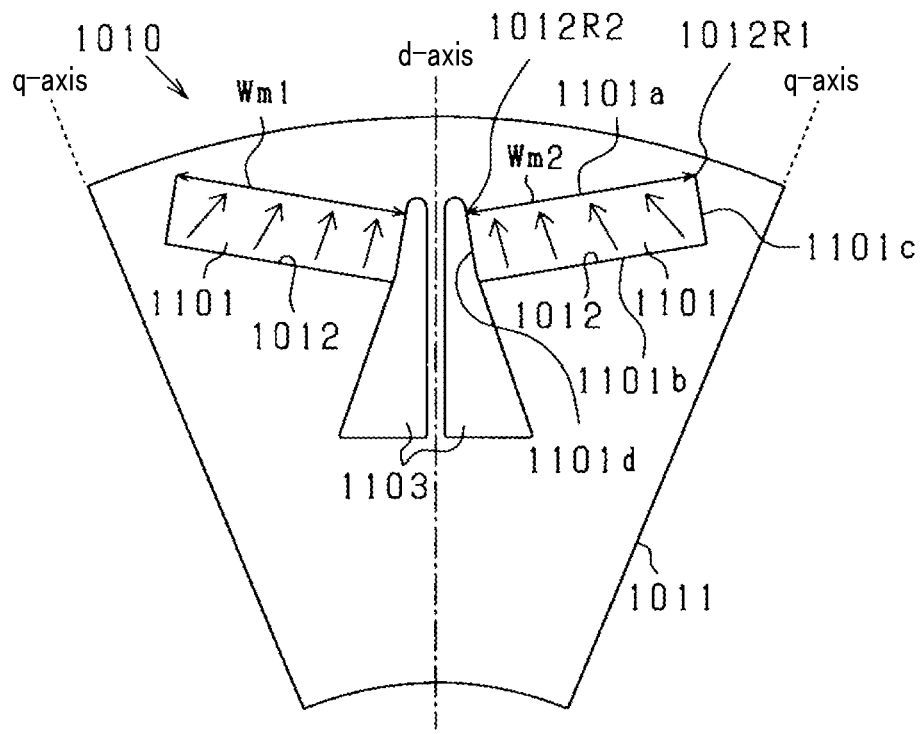

FIGS. 119(a) and 119(b) illustrate the rotor core 1011 which has formed therein the magnet housing holes 1012 every two of which are arranged on opposite sides of the d-axis and paired. The paired magnet housing holes 1012 are arranged in a substantially V-shape with an interval therebetween increasing radially outward. In other words, each of the magnet housing holes 1012 is shaped to have a rectangular transverse section extending perpendicular to the axis of the rotor core 1011. Each of the magnet housing holes 1012 has a first major surface and a second major surface opposed to each other. The first major surface is closer to the stator 1030 than the second major surface is and has the outer corner 1012R1 and the inner corner 1012R2. Each of the magnet housing holes 1012 is inclined to have the outer corner 1012R1 located closer to the stator 1030 than the inner corner 1012R2 is, thereby defining the V-shape of the whole of the paired magnet housing holes 1012.

In the structure illustrated in FIG. 119(a), the easy axes of magnetization in each of the magnets 1101 are, like in the structure illustrated in FIG. 111, inclined to the d-axis and oriented to intersect at an angle of other than 90° with the magnetic flux acting surfaces 1101a and 1101b creating magnetic fluxes.

In the structure illustrated in FIG. 119(b), the easy axes of magnetization one of which is close to the d-axis side end 1101d is, like in the structure illustrated in FIG. 115, oriented in a direction different from that in which one of the easy axes of magnetization which is close to the q-axis side end 1101c extends. In other words, directions in which portions of each of the magnets 1101 located close the d-axis and the q-axis are magnetized are different from each other. Particularly, the easy axis of magnetization which is located closer to the d-axis side end 1101d than to the q-axis side end 1101c in each of the magnets 1101 is oriented to be more parallel to the d-axis than that located close to the q-axis side end 1101c is. The easy axis of magnetization which is located closer to the q-axis side end 1101c than to the d-axis side end 1101d may alternatively be, like in the structure illustrated in FIG. 117, oriented to be more parallel to the q-axis than that located closer to the d-axis side end 1101d than to the q-axis side end 1101c in each of the magnets 1101.

In the structure of FIG. 119, the dimension Wm of a portion of the magnet unit which creates one magnetic pole in the circumferential direction is, like in the structure illustrated in FIG. 115, equivalent to the sum of the dimension Wm1 of the left stator-facing peripheral surface 1101a and the dimension Wm2 of the right stator-facing peripheral surface 1101a.

Thirty-Third Modification

Figure 120A:
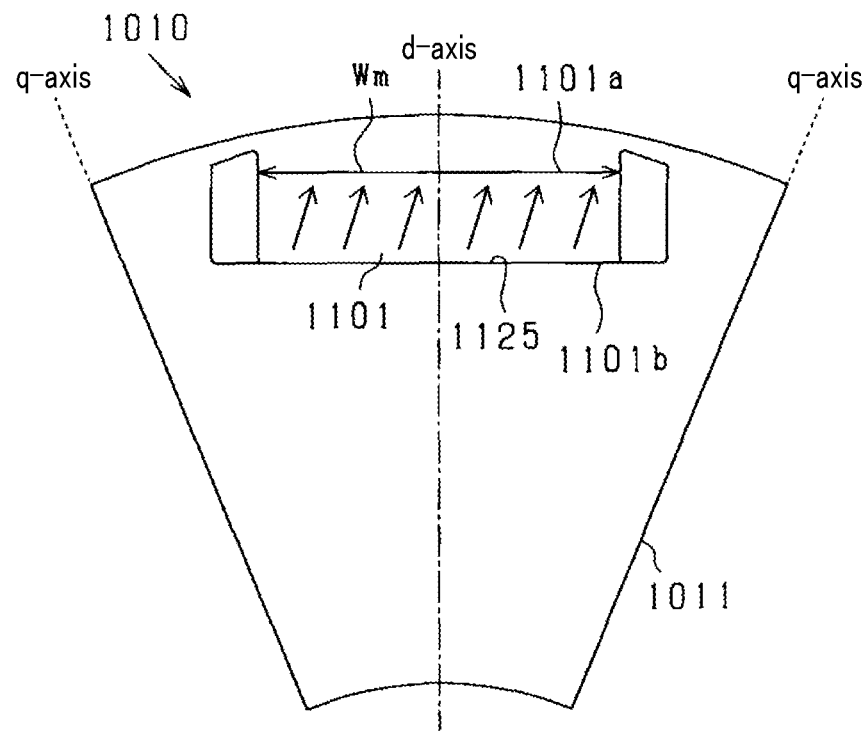
FIGS. 120(a) ad 120(b) are partial plan views which illustrate a rotor in the thirty-third modification.
Figure 120B:
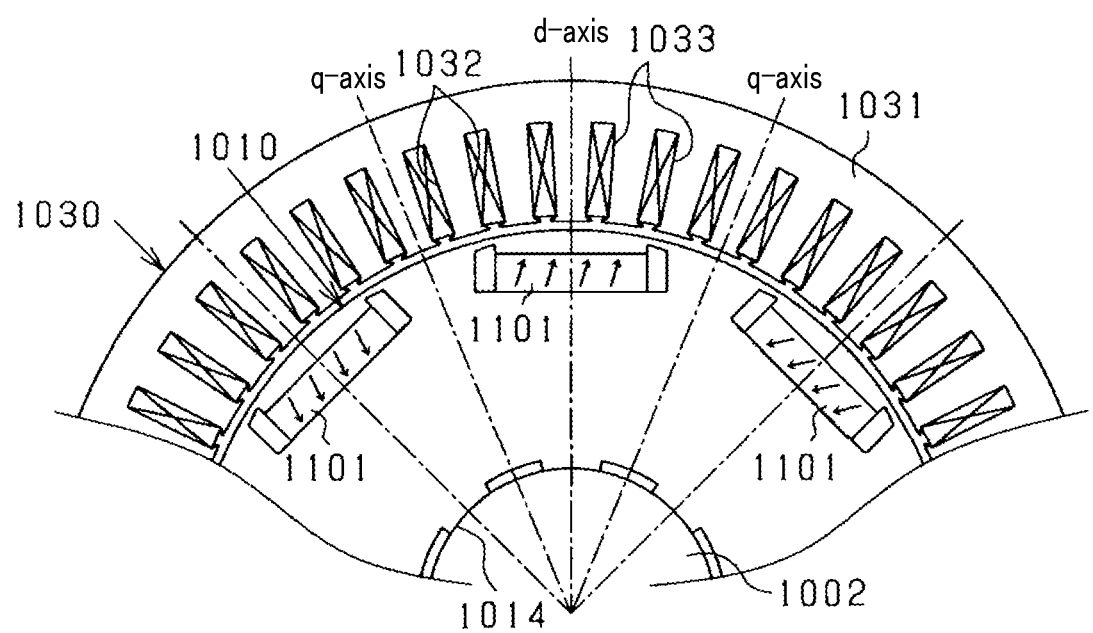

FIGS. 120(a) and 120(b) illustrate the thirty-third modification. In the structure illustrated in FIG. 120(a), each of the magnet housing holes 1125 in the rotor core 1101 has disposed therein the magnet 1101 whose easy axes of magnetization (i.e., directions of magnet magnetic paths) are oriented to be asymmetrical with each other with respect to the d-axis. In other words, the easy axes of magnetization in each of the magnets 1101 are inclined to the d-axis and oriented to intersect at an angle of other than 90° with magnetic flux acting surfaces of the magnet 1101 creating magnetic fluxes. The easy axes of magnetization are oriented in the same directions on opposite sides of the d-axis. The structure illustrated in FIG. 120(a) enables the magnet magnetic paths to be lengthened to enhance the magnetic fluxes against the demagnetizing field. The magnet magnetic paths in the magnets 1101 may be of a curved shape, e.g., a convex shape protruding away from the stator 1030 (downward in the drawing) as well as a linear shape.

In the structure of FIG. 120, the dimension Wm of a portion of the magnet unit which creates one magnetic pole in the circumferential direction is equivalent to a dimension of the magnet 1101 (i.e., the stator-facing peripheral surface 1101a) in the lengthwise direction of the magnet 1101.

FIG. 120(b) illustrates examples of structures of the rotor 1010 and the stator 1030. A middle one of the magnets 1101 illustrated in FIG. 120(b) creates the N-pole. The magnets 1101 arranged on opposite sides of the middle magnets 1101 create the S-poles. Each of the magnets 1101 has a first portion and a second portion which are arranged on the opposite sides of the d-axis for a corresponding one of the magnetic poles. The first and second portions create magnet magnetic paths which are all oblique to the d-axis at the same angle to the circumferential direction of the rotor 1010.

The rotor core 1011 has disposed therein the magnets 1101 each of which has easy axes of magnetization oriented to be asymmetrical with respect to the d-axis, thereby enhancing the peak of torque outputted during forward rotation of the rotor 1010 as compared with the structure in which the easy axes of magnetization are arranged symmetrically with respect to the d-axis. The magnets 1101 whose easy axes of magnetization are arranged to be asymmetrical with respect to the d-axis are, therefore, useful for rotating electrical machines engineered to rotate mainly or only in a single direction.

Thirty-Fourth Modification

Figure 121:
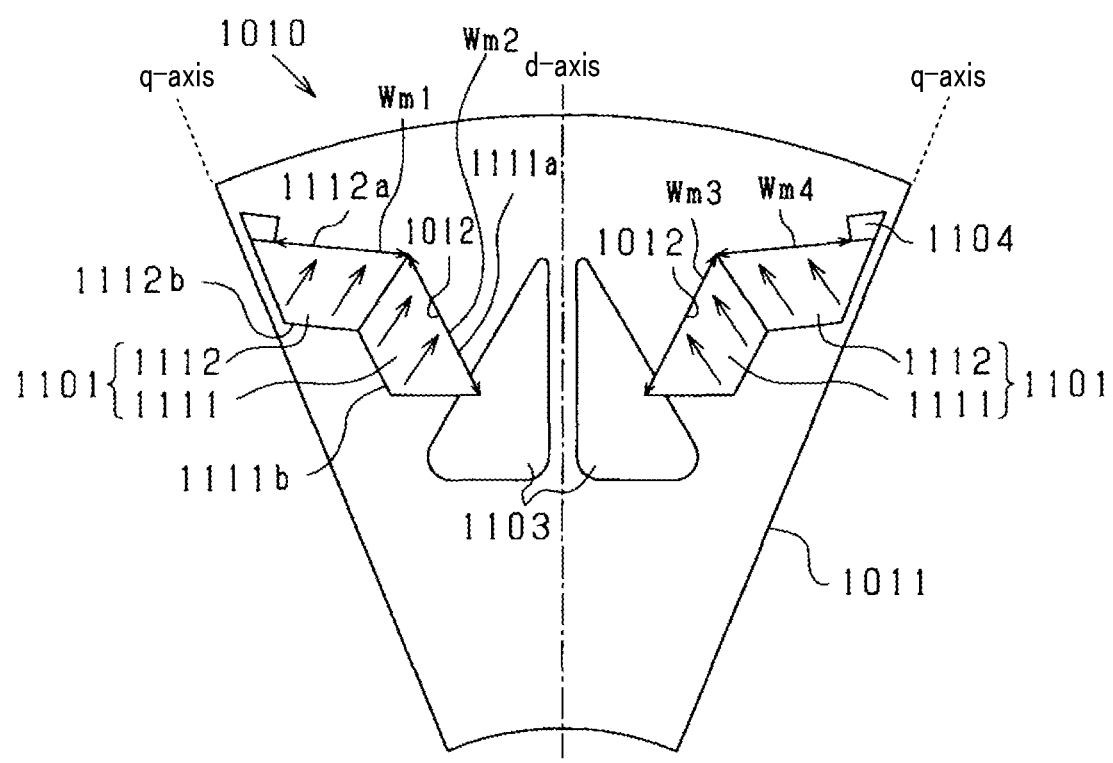
FIG. 121 is a partial plan view which illustrates a rotor in the thirty-fourth modification.

FIG. 121 illustrates the thirty-fourth modification in which the magnets 1101 are arranged on opposite sides of the d-axis and each include two magnets 1111 and 1112 having a trapezoidal transverse section. In other words, each of the magnets 1101 is made of an assembly of the magnets 1111 and 1112. Each of the magnets 1111 and 1112 is of an isosceles trapezoid shape in which both base angles are of the same measure. The magnets 1111 and 1112 have legs placed in direct contact with each other so as to define a convex shape protruding to the stator 1030. Each of the magnets 1111 and 1112 has easy axes of magnetization (i.e., magnet magnetic paths) oriented parallel to one of the legs, so that the easy axes of magnetization extend at an angle of other than 90° with magnetic flux acting surfaces (i.e., longer and shorter bases of the trapezoid). The magnets 1111 and 1112 has the legs which extend parallel to the easy axes of magnetization and are arranged in direct contact with each other, thereby causing the easy axes of magnetization in each of the magnets 1111 and 1112 disposed on the opposite sides of the d-axis to be oriented in the same direction.

In other words, each of the magnets 1101 includes the magnet 1111 (which will also be referred to as a first magnet) and the magnet 1112 (which will also be referred to as a second magnet) which are disposed in a region between the d-axis and the q-axis of each magnetic pole. The magnets 1111 and 1112 are mounted in the magnet housing holes 1012 of the rotor core 1101. The magnets 1111 and 1112 are joined together into a bent or convex shape as a whole which protrudes at the joint toward the stator winding. The magnets 1111 and 1112 have pairs of opposed surfaces through which magnetic fluxes pass (i.e., the magnetic flux acting surfaces 1111a and 1111b of the magnet 1111 and the magnetic flux acting surfaces 1111a and 1111b of the magnet 1112). Each of the magnets 1111 and 1112 has magnet magnetic paths whose lengths are longer than an interval between the paired magnetic flux acting surfaces. The magnet magnetic paths in each of the magnets 1111 and 1112 extend straight and parallel to each other. Each of the magnets 1111 and 1112 has an isosceles trapezoid transverse section with both bases being of the same measure and both legs being of the same measure and also has the magnet magnetic paths oriented in the same direction.

In the structure of FIG. 121, the sum of a total dimension of stator-facing peripheral surfaces (i.e., the magnetic flux acting surfaces 1111a) of the magnets 1111 and a total dimension of stator-facing peripheral surfaces (i.e., the magnetic flux acting surfaces 1112a) of the magnets 1112 corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm1 of the left magnetic flux acting surface 1112a, the dimension Wm2 of the left magnetic flux acting surface 1111a, the dimension Wm3 of the right magnetic flux acting surface 1111a, and the dimension Wm4 of the right magnetic flux acting surface 1112a. Note that portions of the magnetic flux acting surfaces 1112a which face the flux barriers 1104 are excluded from the dimension Wm.

The structure of the rotor 1010 in FIG. 121 has the magnets 1111 and 1112 located close to the stator winding as compared with when the magnets 1111 and 1112 are joined linearly, thereby enhancing the degree of output torque. The decreased interval between the stator winding and each of the magnets 1111 and 1112 adversely results in an increase in degree of the demagnetizing field. The negative effects of such an increase are, however, mitigated by increasing the lengths of magnet magnetic paths between the paired magnetic flux acting surfaces of each of the magnets 1111 and 1112.

The above structure of the rotor core 1011 enables a portion thereof which is located closer to the stator winding than each of the magnets 1101 (i.e., the magnet housing holes 1012) is and exposed to the sum of magnetic fluxes generated by the stator winding and the magnets 1101 to be reduced in volume thereof, thereby resulting in a decreased region of the rotor core 1011 where the saturation of magnetic fluxes from the stator winding and the magnets 1101 occurs, and ensuring the performance of the magnets 1101.

The above structure of rotor 1010 for use in inner rotor rotating electrical machines has a decreased volume of a portion of the rotor core 1011 which is located radially outside the magnet housing holes 1012, thereby decreasing a factor of stress concentration caused by the centrifugal force, which increases the mechanical strength of the rotor core 1011.

Figure 122A:
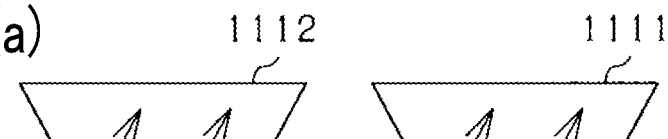
FIGS. 122(a) to 122(f) are views which illustrate structures of magnets.
Figure 122B:
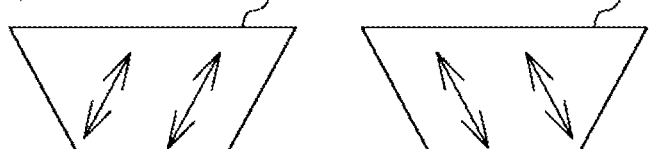
Figure 122C:
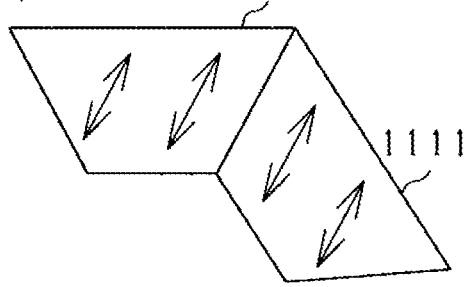

The magnets 1111 and 1112 are made of magnets whose size or dimensions and easy axes of magnetization are equivalent to each other (i.e., magnets of the same part number). The joint of the magnets 1111 and 1112 is achieved by preparing the magnets 1111 and 1112 of the same part number, as demonstrated in FIG. 122(a), reversing the orientation of one of the magnets 1111 and 1112, as illustrated in FIG. 122(b), and then attaching them together, as illustrated in FIG. 122(c). Each of the magnets 1111 and 1112 may alternatively be made of a magnet with lengths of both bases being different from each other.

Figure 122D:
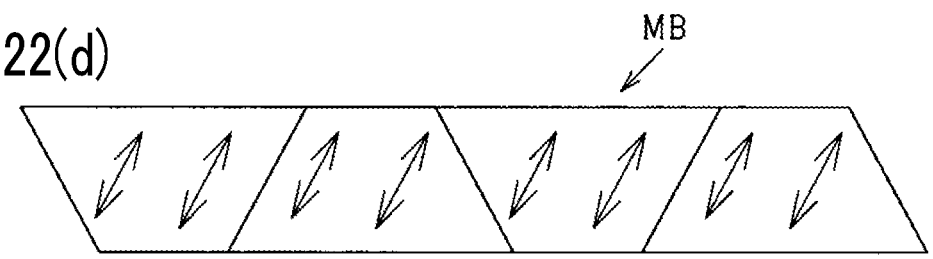

The magnets 1111 and 1112 are preferably designed to have transverse sections of the same shape and each have two adjacent sides intersecting at an angle of other than 90° with each other. When joined together and mounted in the rotor core 1011, the magnets 1111 and 1112 are preferably reversed in orientation thereof to each other. For instance, each of the magnets 1111 and 1112 may be made by, as demonstrated in FIG. 122(d), preparing and orienting a plurality of discrete isosceles trapezoid plate-like magnet blocks MB with obliquely oriented magnet magnetic paths to have long bases alternating in the lengthwise direction thereof. The magnet blocks MB are of the same shape. When joined together and mounted in the rotor core 1011, the magnet blocks MB are reversed in orientation thereof to each other.

Figure 122E:
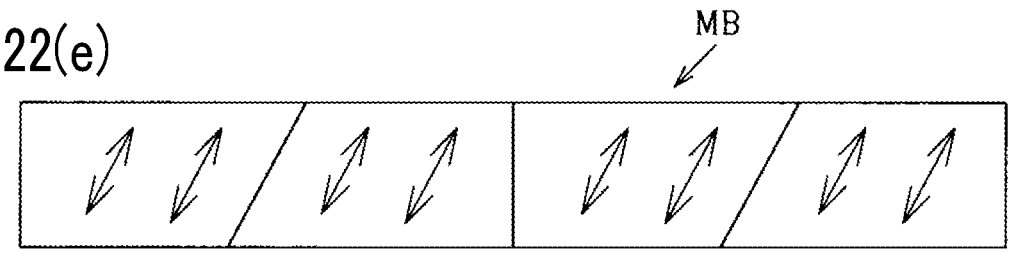
Figure 122F:
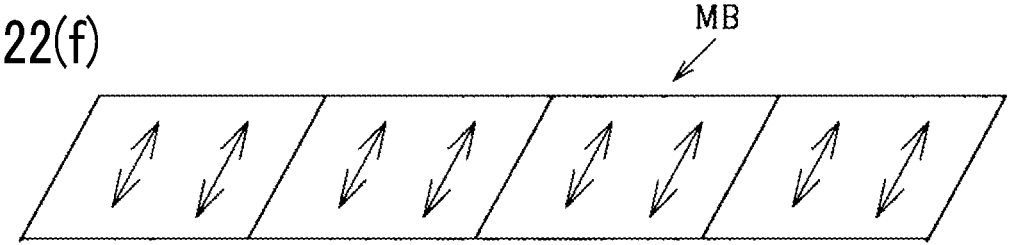

Each of the magnets 1111 and 1112 may alternatively be made of a plurality of discrete magnet blocks MB illustrated in FIG. 122(e) or 122(f). In the structure illustrated in FIG. 122(e), each of the magnet blocks MB has a pair of legs extending obliquely in directions different from each other. In the structure illustrated in FIG. 122(f), each of the magnet blocks MB is of a parallelogram shape. In each of the structures illustrated in FIGS. 122(e) and 122(f), the magnet blocks MB are of the same shape and opposite to each other in orientation thereof when mounted in the rotor core 1011.

Thirty-Fifth Modification

Figure 123:
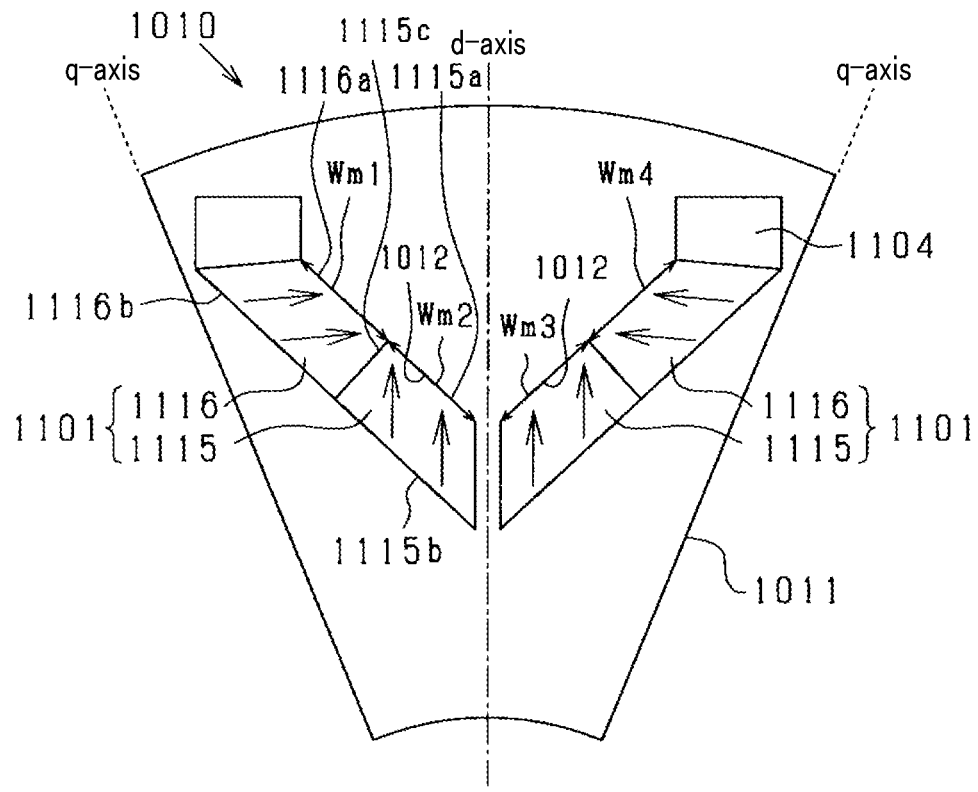
FIG. 123 is a partial plan view which illustrates a rotor in the thirty-fifth modification.

FIG. 123 illustrates the thirty-fifth modification in which each of the magnets 1101 is made of an assembly of two parts: the magnets 1115 and 1116. Specifically, each of the paired magnets 1101 arranged on opposite sides of the d-axis includes the trapezoidal magnets 1115 and 1116 each of which has two base angles different from each other. One of the base angles is 90°, while the other is an acute angle. The magnets 1115 and 1116 are joined together with legs thereof extending at 90° to the bases being placed in direct contact with each other.

Each of the trapezoidal magnets 1115 and 1116 is designed to have easy axes of magnetization (i.e., magnet magnetic paths) extending parallel to one of legs of the trapezoid which extends at an acute angle to the long base of the trapezoid. This causes the easy axes of magnetization in each of the magnets 1115 and 1116 to be oriented to intersect at an angle of other than 90° with magnetic flux acting surfaces (i.e., the short and long bases of the trapezoid). The magnet 1116 located close to the q-axis has the easy axes of magnetization oriented exactly or near perpendicular to the q-axis. The magnet 1115 located close to the d-axis has the easy axes of magnetization oriented exactly or nearly parallel to the d-axis.

In other words, each of the magnets 1101 includes the magnet 1115 (which will also be referred to as a first magnet) located close to the d-axis of a magnetic pole and the magnet 1116 (which will be also be referred to as a second magnet) located close to the q-axis. The magnets 1115 and 1116 are arranged between the d-axis and the q-axis and fixedly mounted in the magnet housing holes 1012 of the rotor core 1011. Each of the magnets 1115 and 1116 has magnet magnetic paths extending straight and parallel to each other. The direction in which the magnet magnetic paths extend in the magnet 1115 is different from that in which the magnet magnetic paths extend in the magnet 1116 after the magnets 1115 and 1116 are disposed in the rotor core 1011.

More specifically, each of the magnet housing holes 1012 is oblique to the d-axis to have a portion which is close to the d-axis and located farther away from the stator winding (i.e., the winding facing outer periphery of the stator core 1011) than a portion close to the q-axis is. The magnet magnetic paths in the magnet 1116 are oriented to extend more perpendicular to the d-axis than those in the magnet 1115 are. The magnet 1115 has a pair of opposed magnetic flux acting surfaces 1115a and 1115b that serve as flux input-output surfaces through which the magnetic fluxes pass. The magnet 1115 creates magnet magnetic paths between the paired magnetic flux acting surfaces 1115a and 1115b. The magnet magnetic paths have lengths longer than an interval between the paired magnetic flux acting surfaces 1115a and 1115b, i.e., the thickness of the magnet 1115. The easy axes of magnetization in the magnet 1115 are magnetically oriented to extend parallel to the magnet magnetic paths. The magnet 1116 has a pair of opposed magnetic flux acting surfaces 1116a and 1116b that serve as flux input-output surfaces into or from which the magnetic fluxes are inputted of outputted. The magnet 1116 creates magnet magnetic paths between the paired magnetic flux acting surfaces 1116a and 1116b. The magnet magnetic paths have lengths longer than an interval between the paired magnetic flux acting surfaces 1116a and 1116b, i.e., the thickness of the magnet 1116. The easy axes of magnetization in the magnet 1116 are magnetically oriented to extend parallel to the magnet magnetic paths therein. The thickness of the magnet 1115 is equivalent to a dimension thereof in a direction perpendicular to the magnetic flux acting surfaces 1115a and 1115b, that is, a minimum distance between the magnetic flux acting surfaces 1115a and 1115b. Similarly, the thickness of the magnet 1116 is equivalent to a dimension thereof in a direction perpendicular to the magnetic flux acting surfaces 1116a and 1116b, that is, a minimum distance between the magnetic flux acting surfaces 1116a and 1116b.

The structure of the rotor 1010 in FIG. 123 enables the resistance to demagnetization of the magnets 1101 arising from a demagnetizing field from the stator winding to be increased by intentionally enhancing the density of magnetic flux in a given region of the rotor core 1011 between the d-axis and the q-axis. Specifically, if the rotor core 1011 has only the magnet 1115, it may lead to a risk that the magnet 1115 may be demagnetized due to the demagnetizing field. The magnet 1116 whose magnet magnetic paths are oriented in a direction different from that in which the magnet magnetic paths extend in the magnet 1115, however, serves to reduce the demagnetization of the magnet 1115 due to the demagnetizing field. This achieves a reduction in demagnetization of the magnet 1101 itself. The above structure enables the magnets 1115 and 1116 to be made of inexpensive parallel anisotropic magnets to have a desired ability to resist the demagnetization thereof.

In the structure of FIG. 123, the sum of a total dimension of stator-facing peripheral surfaces (i.e., the magnetic flux acting surfaces 1116a) of the magnets 1116 of the paired magnets 1101 creating one magnetic pole and a total dimension of stator-facing peripheral surfaces (i.e., the magnetic flux acting surfaces 1115a) of the magnets 1115 of the paired magnets 1101 corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm1 of the left magnetic flux acting surface 1116a, the dimension Wm2 of the left magnetic flux acting surface 1115a, the dimension Wm3 of the right magnetic flux acting surface 1115a, and the dimension Wm4 of the right magnetic flux acting surface 1116a. Note that portions of the magnetic flux acting surfaces 1116a which face the flux barriers 1104 are excluded from the dimension Wm.

Figure 124:
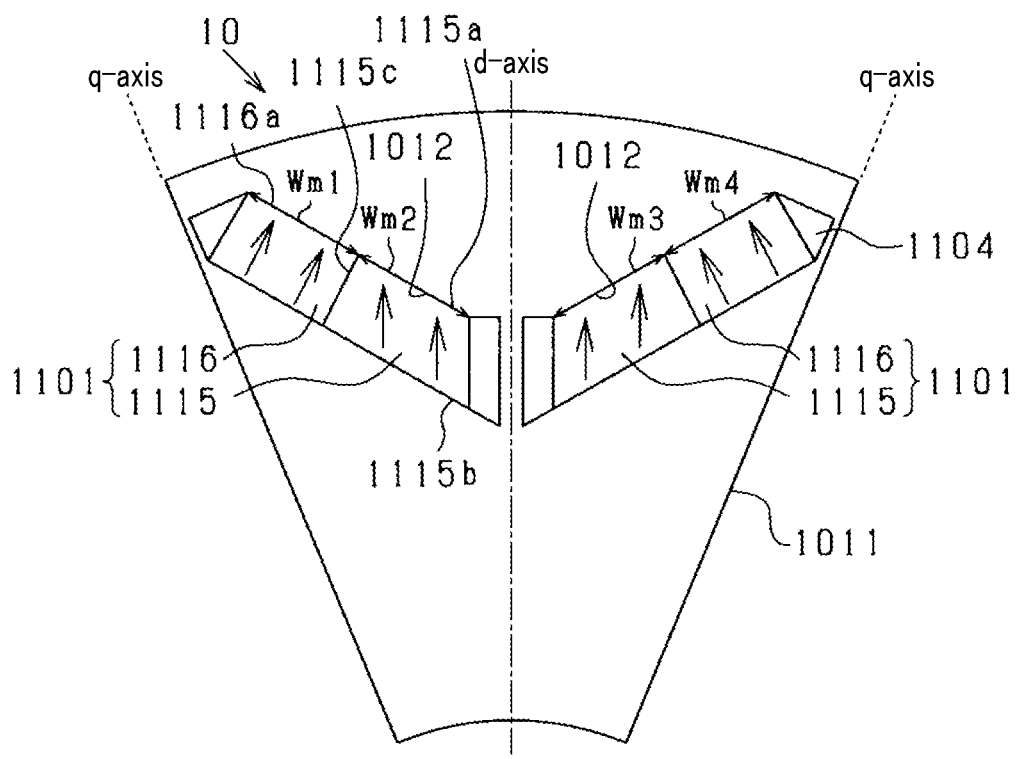
FIG. 124 is a partial plan view which illustrates a rotor in the thirty-fifth modification.
Figure 125:
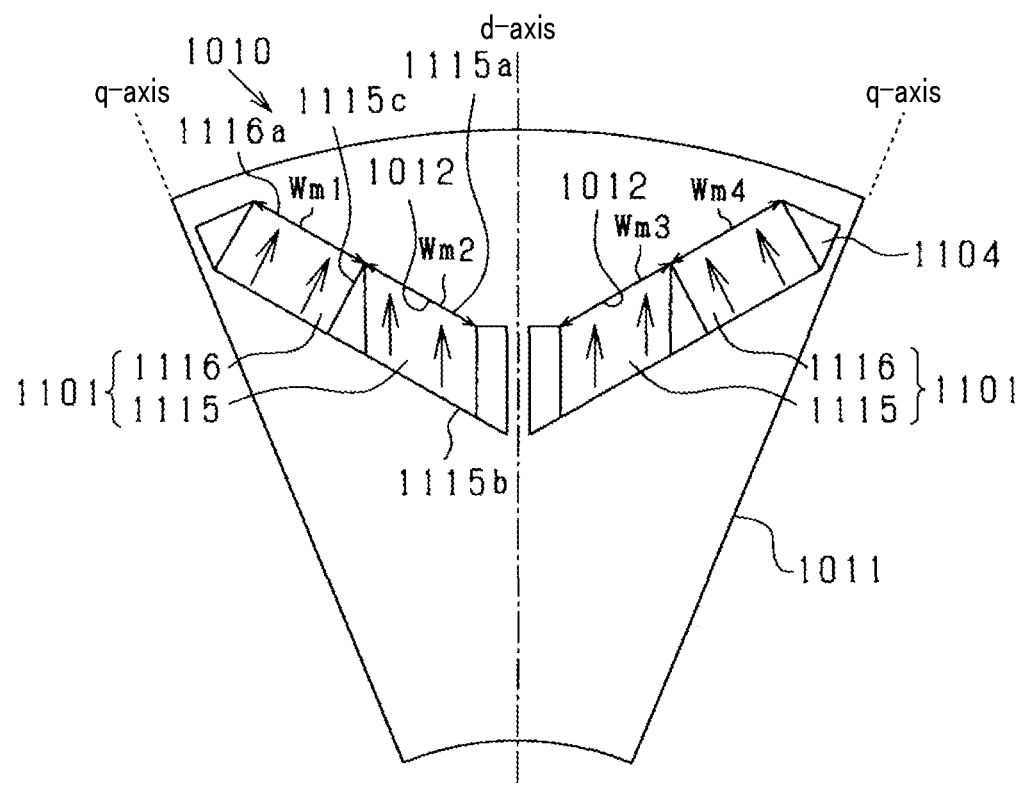
FIG. 125 is a partial plan view which illustrates a rotor in the thirty-fifth modification.

FIGS. 124 and 125 illustrate the rotor 1010 which are modifications of the structure in FIG. 123. Specifically, each of the magnets 1116 which is located closer to the q-axis than the magnet 1115 is made of a magnet whose easy axes of magnetization extend perpendicular to the magnetic flux acting surfaces thereof. In the structure illustrated in FIG. 125, the magnet 1115 close to the d-axis is of a parallelogram shape and has the easy axes of magnetization extending parallel to right and left sides thereof. The magnets 1115 and 1116 of each of the magnets 1101 has a flux barrier disposed therebetween. An iron core may alternatively be arranged between the magnets 1115 and 1116 instead of the flux barrier. In the structure illustrated in FIG. 125, each of the magnets 1115 has a pair of magnetic flux acting surfaces 1115a and 1115b and the q-axis side end 1115c which intersects with the magnetic flux acting surfaces 1115*a* and 1115*b* and extends parallel to the magnet magnetic paths.

In the structures illustrated in FIGS. 124 and 125, the sum of a total dimension of stator-facing peripheral surfaces (i.e., the magnetic flux acting surfaces 1116*a*) of the magnets 1116 of the paired magnets 1101 creating one magnetic pole and a total dimension of stator-facing peripheral surfaces (i.e., the magnetic flux acting surfaces 1115*a*) of the magnets 1115 of the paired magnets 1101, like in the structure illustrated in FIG. 123, corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm1 of the left magnetic flux acting surface 1116*a*, the dimension Wm2 of the left magnetic flux acting surface 1115*a*, the dimension Wm3 of the right magnetic flux acting surface 1115*a*, and the dimension Wm4 of the right magnetic flux acting surface 1116*a*. Note that portions of the magnetic flux acting surfaces 1116*a* which face the flux barriers are excluded from the dimension Wm.

Seventh Embodiment

Figure 126:
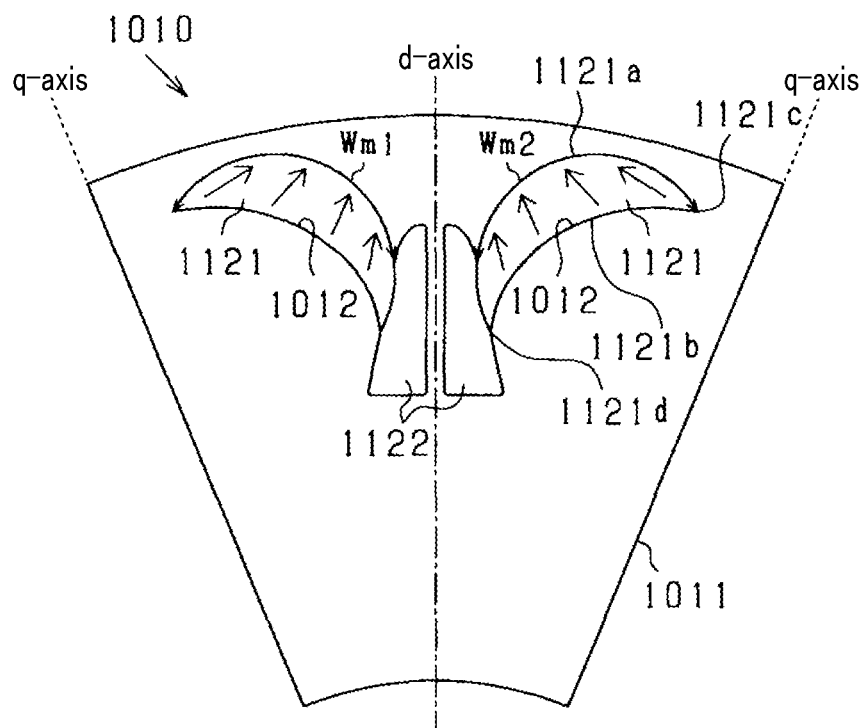
FIG. 126 is a partial plan view which illustrates a rotor in the seventh embodiment.

The seventh embodiment will be described below in terms of features different from those in the third embodiment. FIG. 126 illustrates the rotor 1010 according to the seventh embodiment.

Each of the magnet housing holes 1012, as can be seen in FIG. 126, has a q-axis end and a d-axis end which are opposed to each other in a lengthwise direction of a transverse section thereof. The q-axis side end is located closer to the stator 1030 than the d-axis side end is in the radial direction of the rotor core 1011. Each of the magnet housing holes 1012 is curved in a convex shape protruding toward the stator 1030 between the q-axis side end and the d-axis side end.

The magnet 1121 mounted in each of the magnet housing holes 1012 has the magnetic flux acting surfaces 1121*a* and 1121*b*, the q-axis side end 1121*c*, and the d-axis side end 1121*d*. The q-axis side end 1121*c* is, like in the magnet housing holes 1012, located closer to the stator 1030 than the d-axis side end 1121*d* is in radial direction of the rotor core 1011. Each of the magnets 1121 is curved in a convex shape protruding toward the stator 1030 between the q-axis side end 1121*c* and the d-axis side end 1121*d*.

More specifically, the transverse section of each of the magnets 1121 is curved in a convex shape (e.g., crescent shape) protruding toward the stator 1030. The magnets 1121 may alternatively be configured to have the magnetic flux acting surfaces 1121*a* and 1121*b* each of which has a single or several bends which define the convex shape protruding toward the stator 1030.

Each of the magnets 1121 has the easy axes of magnetization which are oblique to the d-axis and oriented to intersect at an angle of other than 90° with the magnetic flux acting surfaces 1121*a* and 1121*b* creating the magnetic fluxes. Each of the magnets 1121 may be configured to additionally have an easy axis of magnetization extending perpendicular to the magnetic flux acting surfaces 1121*a* and 1121*b*. The easy axes of magnetization may be of a straight shape or a non-linear shape, such as an arc-shape.

In this embodiment, each of the magnets 1121 is designed to have the easy axes of magnetization which are different in orientation between regions close to the q-axis side end 1121*c* and the d-axis side end 1121*d*. Particularly, the easy axis of magnetization in the region located close to the d-axis side end 1121*d* is oriented to be more parallel to the d-axis than in the region located close to the q-axis side end 1121*c*. This layout results in an increase in magnetic paths in the magnet 1121.

The easy axis of magnetization in the region of each of the magnets 1121 close to the q-axis side end 1121*c* may be inclined to the magnetic flux acting surface 1121*a* or 1121*b* at an angle which is larger than an angle that the easy axis of magnetization in the region close to the d-axis side end 1121*d* makes with the magnetic flux acting surface 1121*a* or 1121*b*. The above structure enables the magnet 1121 to be arranged close to the outer periphery (i.e., the stator-facing surface) of the rotor core 1011, thereby resulting in a decrease in magnetic resistance around the d-axis to enhance the degree of output torque. The distance between the stator 1030 and each of the magnets 1121 is, therefore, decreased, but it adversely results in an increase in degree of the demagnetizing field. The negative effects of such an increase are, however, mitigated by increasing the lengths of the magnet magnetic paths in the magnets 1121 in the above way.

The structure of the rotor core 1011 in this embodiment enables a portion thereof which is located closer to the stator 1030 than each of the magnets 1121 (i.e., the magnet housing holes 1012) is and exposed to the sum of magnetic fluxes generated by the stator 1030 and the magnets 1121 to be reduced in volume thereof, thereby resulting in a decreased region of the rotor core 1121 where the saturation of magnetic fluxes from the stator 1030 and the magnets 1121 occurs, and ensuring the performance of the magnets 1121.

Particularly, each of the magnet housing holes 1012 has a void space which is formed in one of the ends of length of the magnet housing hole 1012 and located close to d-axis. The void space is unoccupied by the magnet 1121, but has disposed therein the flux barrier 1122 extending along the d-axis.

In the structure illustrated in FIG. 126, a total dimension of stator-facing peripheral surfaces (i.e., the magnetic flux acting surfaces 1121*a*) of the paired magnets 1121 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm/of the left magnetic flux acting surface 1121*a* and the dimension Wm2 of the right magnetic flux acting surface 1121*a*. Note that portions of the magnetic flux acting surfaces 1121*a* of the magnets 1121 which face the flux barriers 1122 are excluded from the dimension Wm.

Figure 127:
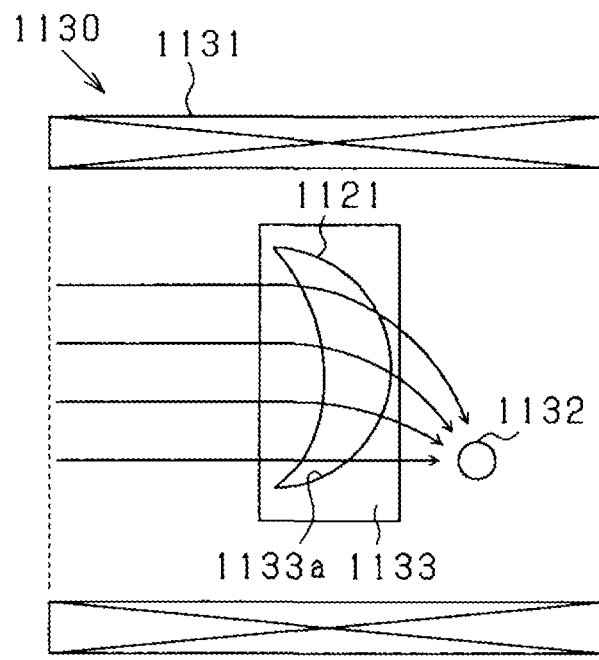
FIG. 127 is an explanatory view for explaining how to magnetize a magnet using magnetic field orientation.

How to produce the magnets 1121 used in this embodiment will be described below. FIG. 127 demonstrates how to magnetize the magnets 1121 using magnetic field orientation techniques. In this example, the left magnet 1121, as viewed in FIG. 126, is magnetized.

The magnetic orientation device 1130, as illustrated in FIG. 127, includes the magnetic field coil 1131, the magnetically orientating iron core 1132, and the die 1133 which are disposed inside the magnetic field coil 1131. When electrically excited, the magnetic field coil 1131 produces a magnetic field passing inside it. The magnetically orientating iron core 1132 works to curve the magnetic field, as generated by the magnetic field coil 1131, in a selected direction. The curved magnetic field then passes through the die 1133. In summary, the magnetic field coil 1131 generates a linear magnetic field. The magnetically orientating iron core 1132 produces a curved magnetic field. The die 1133 is made of a non-magnetic material and has the die cavity 1133*a* contoured to conform with the shape of the magnets 1121.

The production of each of the magnets 1121 is achieved by supplying magnet powder, as made by crushing a magnet material, into the die cavity 1133*a* of the die 1133 and pressing it into a selected shape within the die cavity 1133*a*. The magnetically orientating iron core 1132 produces a magnetic field curved into the illustrated shape within the magnetic field coil 1131 to magnetically orient the magnet powder in the die cavity 1133*a* in such a way that easy axes of magnetization in the magnet powder will be aligned in a given direction. The magnet powder is then pressed into a preform body. The magnetically orienting iron core 1132 is preferably offset from the center of the magnet 1121 in the lengthwise direction of the magnet 1121. The preform body is sintered and magnetized. Such a sequence of steps completes each of the magnets 1121. The production of the right magnet 1121, as viewed in FIG. 126, is achieved by changing the location of the magnetically orientating iron core 1132. In the above way, the magnets 1121 used in the structure illustrated in FIG. 126 are produced.

Figure 128:
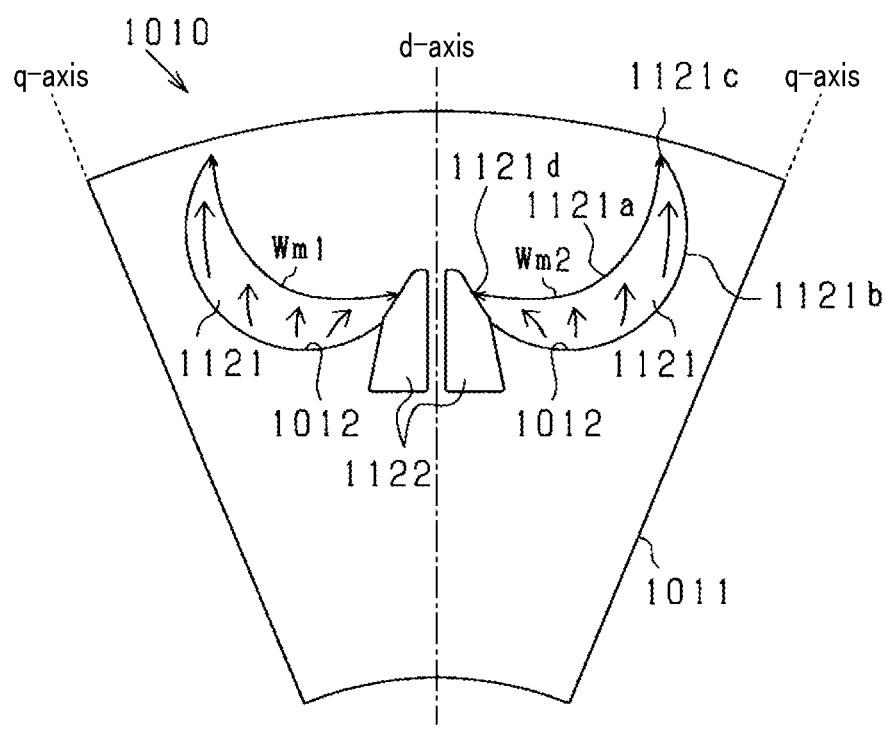
FIG. 128 is a partial plan view which illustrates a rotor in the thirty-sixth modification.

In the structure illustrated in FIG. 128, each of the magnets 1121 has the q-axis side end 1121*c* and the d-axis side end 1121*d*. The q-axis side end 1121*c* is located closer to the stator 1030 than the d-axis side end 1121*d* is in the radial direction of the rotor core 1011. Each of the magnets 1121 is curved in a convex shape protruding away from the stator 1030 between the q-axis side end 1121*c* and the d-axis side end 1121*d*. Specifically, the transverse section of each of the magnets 1121 is curved in a convex shape (e.g., crescent shape) protruding away from the stator 1030 (i.e., toward the rotating shaft 1002). The magnets 1121 may alternatively be formed to have a single or a plurality of bends of the length thereof to define the convex shape protruding away from the stator 1030.

Each of the magnets 1121 has the easy axes of magnetization which are oblique to the d-axis and oriented to intersect at an angle of other than 90° with the magnetic flux acting surfaces 1121*a* and 1121*b* creating the magnetic fluxes. Each of the magnets 1121 may be configured to have an additional easy axis of magnetization extending perpendicular to the magnetic flux acting surfaces 1121*a* and 1121*b*. The easy axes of magnetization may be of a straight shape or a non-linear shape, such as an arc-shape.

The above structure has a wide region of the rotor core 1011 which is located closer to the stator 1030 than each of the magnets 1121 is, thereby enabling a magnet-produce magnetic force in that region to be enhanced by placing magnets therein.

In the structure illustrated in FIG. 128, a total dimension of stator-facing peripheral surfaces (i.e., the magnetic flux acting surfaces 1121*a*) of the paired magnets 1121 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm1 of the left magnetic flux acting surface 1121*a* and the dimension Wm2 of the right magnetic flux acting surface 1121*a*.

Other Embodiments

The rotor 1010 may have one of structures illustrated in FIGS. 129 to 132.

Figure 129:
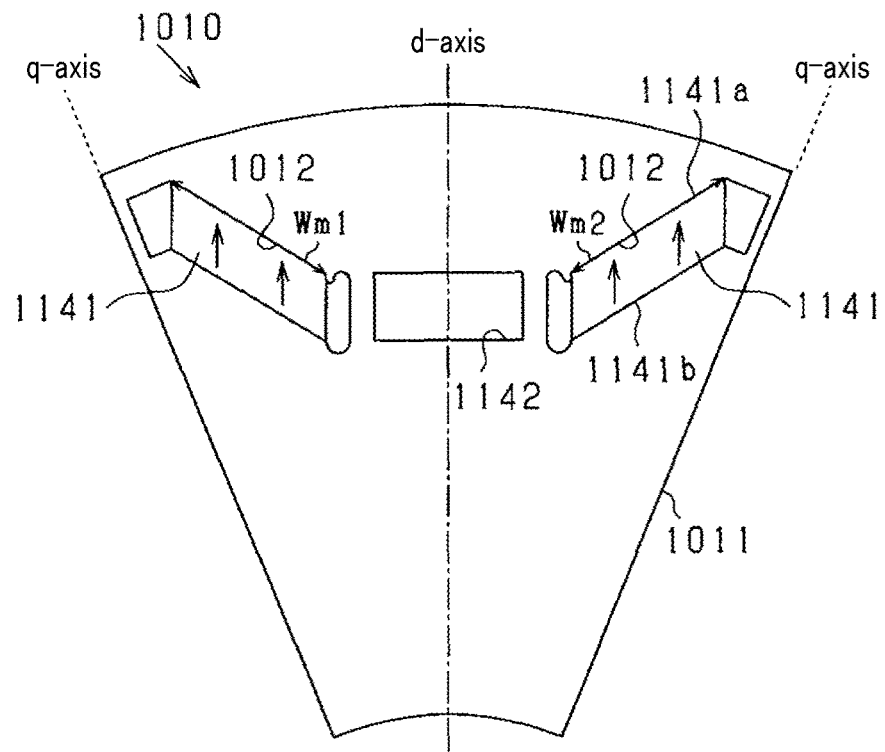
FIG. 129 is a partial plan view which illustrates a rotor in another mode.

The rotor 1010 in FIG. 129 has the magnet housing holes 1012 every two of which are paired and arranged on opposites sides of the d-axis in a V-shape. The magnets 1141 are disposed in the paired magnet housing holes 101, so that they are arranged in a V-shape. The magnets 1141 are oblique to the d-axis and have easy axes of magnetization oriented exactly or near perpendicular to the d-axis. The easy axes of magnetization in each of the magnets 1141 are oriented to intersect at an angle of other than 90° with the magnetic flux acting surfaces 1141*a* and 1141*b* of the magnet 1141. The center opening 1142 is formed around the d-axis between the paired magnet housing holes 1012. The easy axes of magnetization of each of the magnets 1141 are, as described above, oriented to extend exactly or nearly parallel to the d-axis, thereby resulting in a decrease in components of magnetic fluxes which flow to the d-axis to reduce the demagnetization of a portion of each of the magnets 1141 around the d-axis. The center opening 1142 is a void space, but however, it may have a non-magnetic material disposed therein as a non-magnetic member.

In the structure illustrated in FIG. 129, a total dimension of stator-facing peripheral surfaces (i.e., the magnetic flux acting surfaces 1141*a*) of the paired magnets 1141 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm/of the left magnetic flux acting surface 1141*a* and the dimension Wm2 of the right magnetic flux acting surface 1141*a*.

Figure 130:
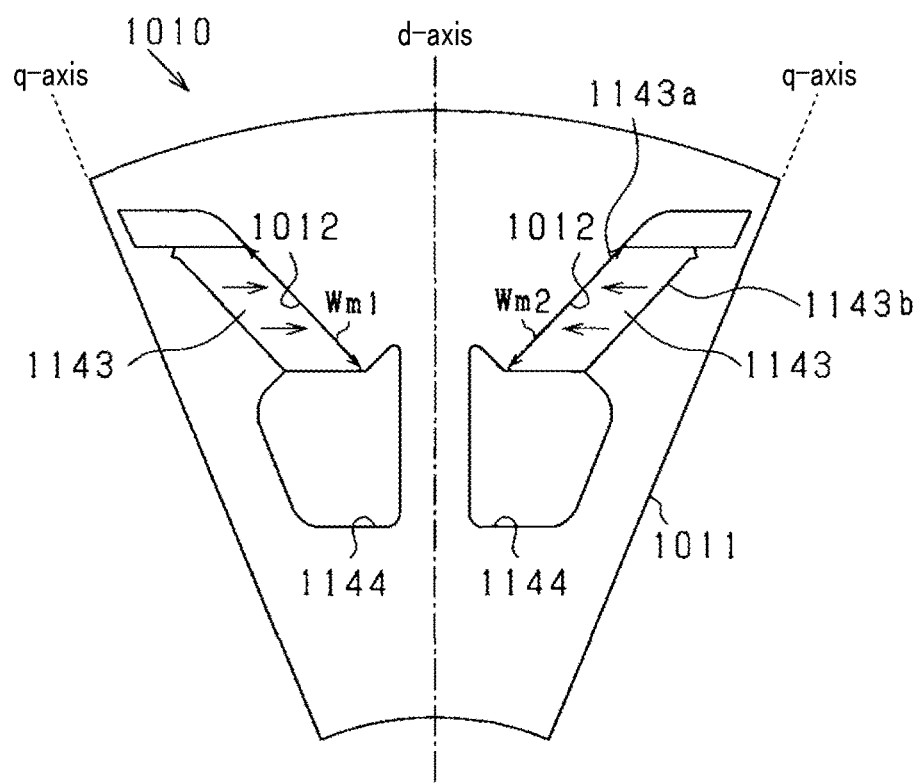
FIG. 130 is a partial plan view which illustrates a rotor in another mode.

FIG. 130 illustrates the rotor 1010 which has the magnets 1143 mounted one in each of the magnet housing holes 1012. Every two of the magnet housing holes 1012 which are arranged on opposite sides of the d-axis are paired in a substantially V-shape. The magnets 1143 are, therefore, arranged in a V-shape. The magnets 1143 are oblique to the d-axis to have easy axes of magnetization oriented exactly or near perpendicular to the q-axis. The easy axes of magnetization of each of the magnets 1143 are oriented to intersect at an angle of other than 90° with the magnetic flux acting surfaces 1143*a* and 1143*b* of the magnet 1143. The flux barrier 1144 is disposed adjacent the d-axis side end of each of the magnet housing holes 1012.

In the structure illustrated in FIG. 130, a total dimension of stator-facing peripheral surfaces (i.e., the magnetic flux acting surfaces 1143*a*) of the paired magnets 1143 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm/of the left magnetic flux acting surface 1143*a* and the dimension Wm2 of the right magnetic flux acting surface 1143*a*. The magnetic flux acting surface 1143*a* excludes a portion of the stator-facing peripheral surface of each of the magnets 1143 which faces the flux barrier 1144.

The structure illustrated in FIG. 130 enhances the magnet magnetic fluxes around the q-axis. This enables beneficial effects of field weakening to be enhanced by orienting a magnetic force directly to the q-axis core portion in the illustrated manner to create magnetic saturation around the d-axis core portion. Additionally, the demagnetization (i.e., self-demagnetization) around the d-axis arising from the magnetic fluxes from the magnets 1142 arranged adjacent each other is reduced by increasing a distance between the same magnetic pole (e.g., a minimum distance between the magnets 1143 arranged on the opposite sides of the d-axis).

Figure 131:
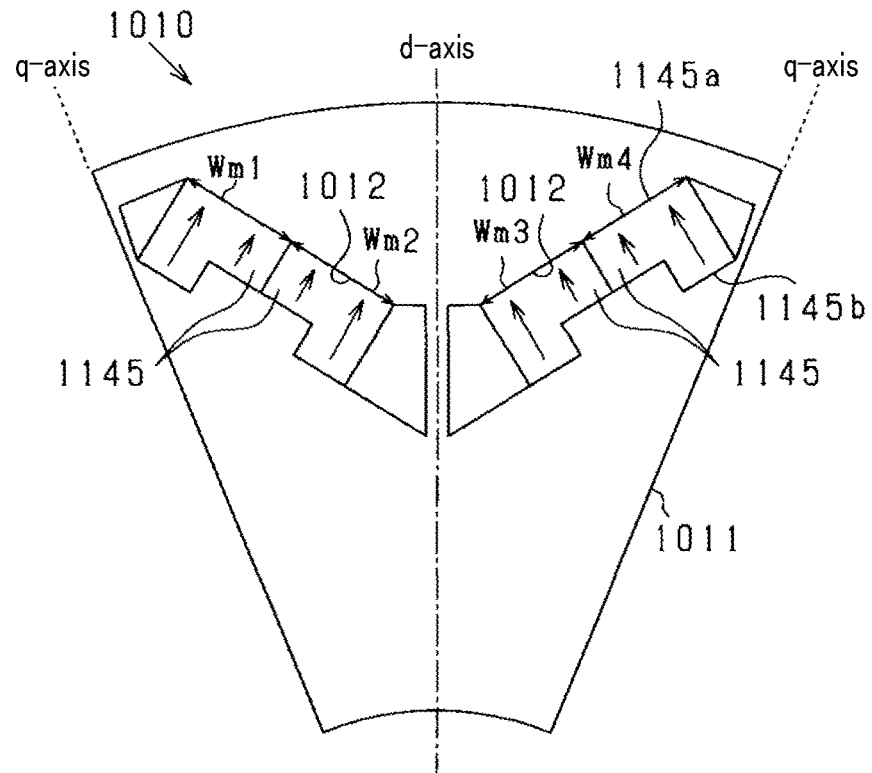
FIG. 131 is a partial plan view which illustrates a rotor in another mode.

The rotor 1010 illustrated in FIG. 131 has the magnets 1145 disposed two in each of the magnet housing holes 1012 which are paired and arranged on opposite sides of the d-axis in a substantially V-shape. The magnets 1145 are, therefore, arranged on the opposite sides of the d-axis in a V-shape. Each pair of the magnets 1145 has easy axes of magnetization whose lengths around both the q-axis-side end and the d-axis side end of the pair of the magnets 1145 are larger than those of the easy axes of magnetization in a middle portion of the pair of the magnets 1145.

Specifically, each of the magnets 1145 is shaped to have a base and a first and a second end which extend at right angles from the base. The magnets 1145 of each pair are mounted in the form of a magnet assembly in each of the magnet housing holes 1012 with the first ends being placed in direct contact with each other. Each of the magnets 1145 of the magnet assembly has the magnetic flux acting surface 1145a which faces the stator 1030 and extends to be flat. The magnetic flux acting surfaces 1145a extend perpendicular to the easy axes of magnetization. Each of the magnets 1145 of the magnet assembly also has the magnetic flux acting surface 1145b which faces away from the stator 1030. The magnetic flux acting surfaces 1145b of the magnet assembly has a center groove formed therein.

In the structure illustrated in FIG. 131, a total dimension of stator-facing peripheral surfaces (i.e., the magnetic flux acting surfaces 1145a) of the magnets 1145 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of a total dimension of the left magnetic flux acting surfaces 1145a (i.e., Wm1+Wm2) and a total dimension of the right magnetic flux acting surface 1145a (Wm3+Wm4). The magnetic flux acting surface 1145a excludes a portion of the stator-facing peripheral surface of each of the magnets 1145 which faces flux barrier.

Figure 132:
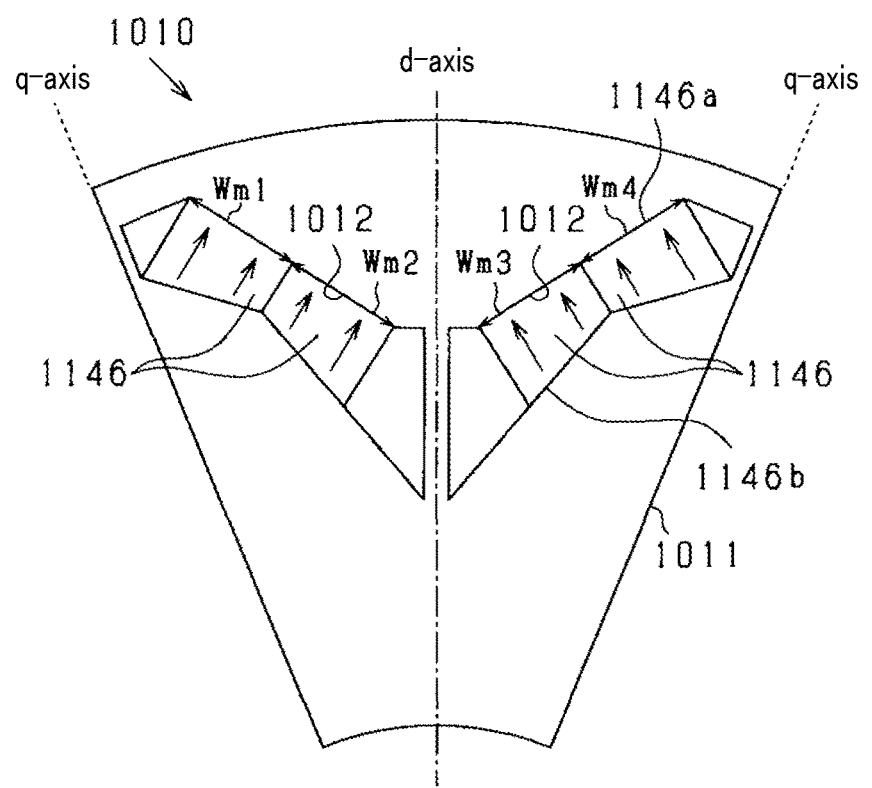
FIG. 132 is a partial plan view which illustrates a rotor in another mode.

The rotor 1010 illustrated in FIG. 132 has the magnets 1146 disposed two in each of the magnet housing holes 1012 which are paired and arranged on opposite sides of the d-axis in a substantially V-shape. The magnets 1146 are, therefore, arranged on the opposite sides of the d-axis in a V-shape.

Each of the magnets 1146 has a trapezoidal transverse section. In other words, each of the magnets 1146 has a first end defining a short base of the trapezoid and a second end which defines a long base of the trapezoid and is longer than the first end. The magnets 1146 are arranged as a pair with the first ends thereof placed in direct contact with each other and mounted in each of the magnet housing holes 1012 as a magnet assembly. Each of the magnets 1146 of the magnet assembly has the magnetic flux acting surface 1146a which faces the stator 1030 and extends to be flat. The magnetic flux acting surfaces 1146a extend perpendicular to the easy axes of magnetization. Each of the magnets 1146 of the magnet assembly also has the magnetic flux acting surface 1145b which faces away from the stator 1030. The magnetic flux acting surfaces 1146b of the magnet assembly has a center groove formed therein.

In the structure illustrated in FIG. 132, a total dimension of stator-facing peripheral surfaces (i.e., the magnetic flux acting surfaces 1146a) of the magnets 1146 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of a total dimension of the left magnetic flux acting surfaces 1146a (i.e., Wm1+Wm2) and a total dimension of the right magnetic flux acting surface 1146a (Wm3+Wm4). The magnetic flux acting surface 1146a excludes a portion of the stator-facing peripheral surface of each of the magnets 1146 which faces flux barrier.

Each of the magnets (e.g., the magnet assemblies 1013) of the above structure may be made of a plurality of discrete magnet segments. The magnet segments are preferably arranged adjacent each other in the length wise direction of each of the magnets on each side of the d-axis. This results in a reduction in loss due to eddy currents in the magnet assembly 1013 that are conductive bodies. For instance, each of the magnet assembly 1013 may be made of a plurality of magnet segments which have a square transverse section and also have different types of easy axes of magnetization. The magnet segments may be arranged in line to constitute the magnet assembly 1013 having an elongated section. This magnet structure enhances the orientation ratio of the magnets as compared with when easy axes of magnetization in magnets having an elongated section are variably oriented.

Each of the above described structures of the rotor 1010 may be designed to have flux barriers around the q-axis side end and/or the d-axis side end of each of the magnets as needed.

The rotor core 1011 of the rotor 1010 may be made of a plurality of discrete core segments which are stacked on each other in an axial direction of the rotor 1010 and offset from each other by a given angle in a circumferential direction of the stator 1010 to create a skew structure of the rotor 1010. This structure reduces a torque ripple.

Instead of the rotating electrical machine in which the rotor 1010 has magnets (e.g., the magnet assemblies 1013) mounted therein, and the stator 1030 has the stator winding 1033 disposed therein, the rotating electrical machine may be engineered to have the stator 1030 in which magnets (e.g., the magnet assemblies 1013) are mounted and the rotor 1010 equipped with the stator winding 1033. In such a structure, the stator core made of a soft magnetic body has magnet housing holes of any of the types, as described above, and magnets of any of the types, as described above, mounted in the magnet housing holes.

Eighth Embodiment

Figure 133:
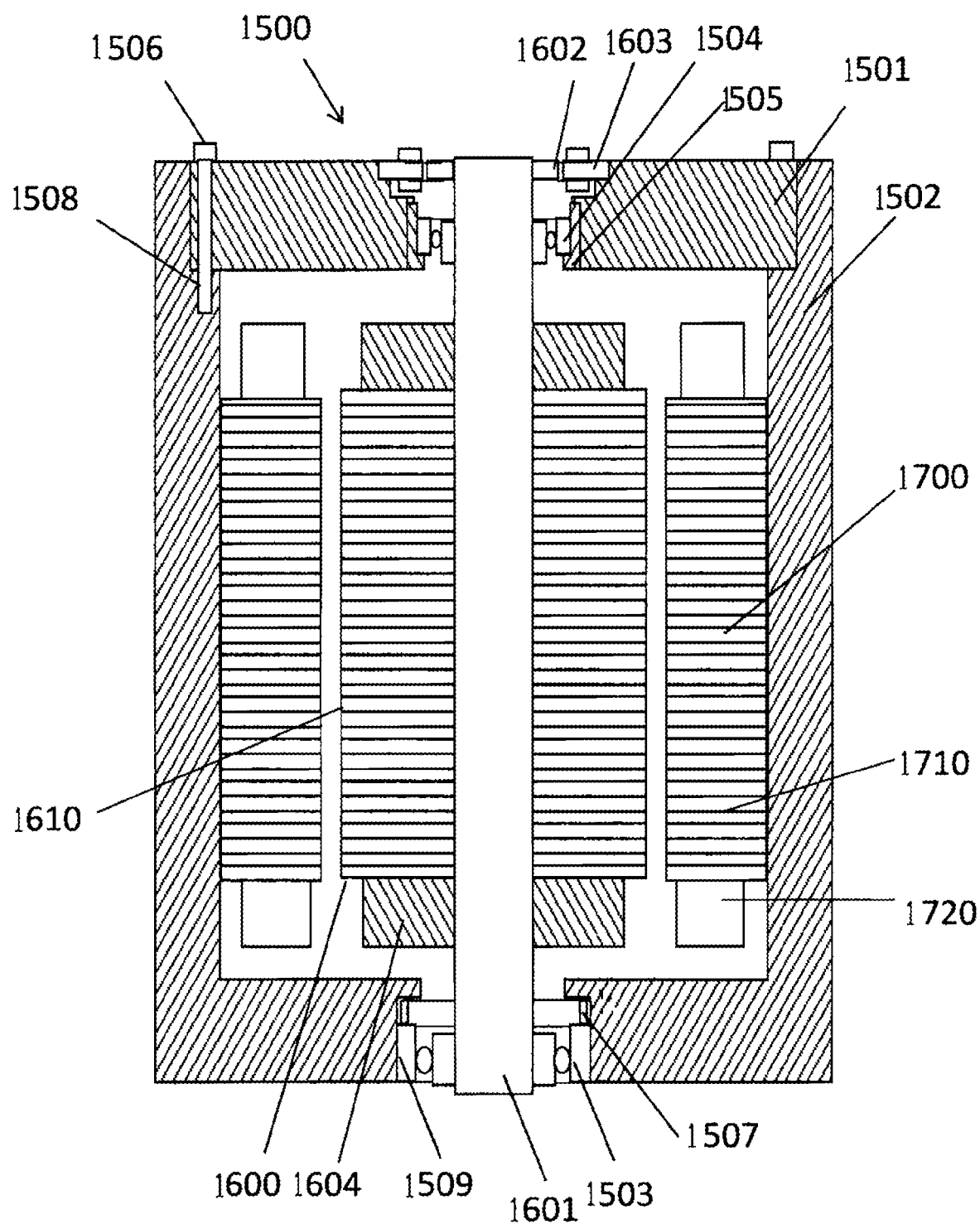
FIG. 133 is a longitudinal sectional view which illustrates a rotating electrical machine in the eighth embodiment.

The rotating electrical machine 1500 according to the eighth embodiment will be described below. The rotating electrical machine 1500 works as an electromagnetic machine. FIG. 133 is a longitudinal sectional view which shows the rotating electrical machine 1500. The rotating electrical machine 1500, as clearly illustrated in FIG. 133, includes the housing end plate 1501, the cylindrical housing 1502, the bearings 1503 and 1504, the bearing holder 1505, the pressure spring 1507, the rotor 1600, and the shaft 1601. The housing end plate 1501 is fit precisely in the cylindrical housing 1502 with a given tolerance.

The housing end plate 1501 has the bearing 1504 which is fit therein with a given tolerance and retains the rotor 1600 to be rotatable. The housing end plate 1501 exhibits a three-dimensional design and is made by aluminum die-casting. The bearing holder 1505 is preferably made from a ferrous material having a low difference in coefficient of expansion between itself and the bearing 1504. The bearing 1504 is fit in the forged metallic bearing holder 1505. The housing end plate 1501 has formed therein a plurality of threaded holes extending through a thickness thereof in the axial direction of the rotating electrical machine 1500. The housing end plate 1505 is fastened to the cylindrical housing 1502 using the screws 1506 inserted into the threaded holes. The cylindrical housing 1502 has formed therein threaded holes 1508 used in fastening the housing end plate 1501 thereto.

The cylindrical housing 1502 has formed therein the retaining hole 1509 in which the bearing 1503 is fit with a given tolerance. The bearing 1503 retains the rotor 1600 to be rotatable. The shaft 1601 is rotatably fit in the rotor 1600 with a given tolerance using the bearings 1503 and 1504. The securement of the bearings 1503 and 1504, the shaft 1601, the housing 1501, and the housing end plate 1502 is achieved by a press fit, but may alternatively be accomplished by a clearance fit using, for example, retaining rings.

The bearing 1503 has an outer race pressed using a given degree of force created by the pressure spring 1507 made of a disc spring. The bearing 1503 has balls disposed between the outer and inner races thereof which are urged all the time by a given degree of force into contact with each other through the balls. This causes loads which achieve contact of the outer and inner races with the balls to be kept constant, which will produce noiseless rotation of the bearing 1503 for a service life thereof. The mechanical pressure produced by the pressure spring 1507 is exerted on the bearing 1503 through the shaft 1601. This causes the inner race of each of the bearings 1503 and 1504 to be located farther away from the rotor 1600 than the outer race is, thereby canceling axial forces acting on the bearings 1503 and 1504 each other to ensure the stability in positioning the rotor 1600 in a desired place relative to the stator 1700 (i.e., an armature).

The above desired place is where the center of the axial length of the rotor 1600 coincides with that of the stator 1700. The bearing 1503 contacts the pressure spring 1507. The surface of contact between the bearing 1503 and the pressure spring 1507 has a coefficient of friction which is 0.4 or higher. A force of friction between bearing 1503 and the pressure spring 1507 serves to stop them from rotating in the circumferential direction thereof. A constant magnetic attraction may be permanently applied to the rotor 1600 equipped with permanent magnets and the stator 1700 by offsetting the centers thereof. Such application of the magnetic attraction is typically known in the field of hard disc drive motors equipped with a disc plate arranged on one of ends of a shaft or fan motors equipped with an impeller disposed on one of ends of a shift.

The rotor 1600 is equipped with the rotor iron core (i.e., stator core) 1610 in which the shaft 1601 is press-fit. The rotor iron core 1610 has permanent magnets (i.e., the magnets 1400) mounted therein. The rotor 1600 serves as a permanent magnet rotor having magnetic poles which alternate between the N-pole and the S-pole. The rotor 1600 is equipped with the end plate 1604 which is press-fit to firmly retain the permanent magnets arranged adjacent each in the axial direction.

The rotor 1600 is also equipped with the resolver rotor 1602 for measuring the degree of rotation of the resolver rotor 1602 press-fit on the shaft 1601. The resolver stator 1603 paired with the resolver rotor 1602 is precisely press-fit in the housing end plate 1501 to be coaxial with the bearing 1504. This embodiment uses press-fit techniques for fastening the shaft 1601 to the resolver rotor 1602 and the rotor iron core 1610. The concept of the resolver rotor 1602 will not be described here in detail. The resolver rotor 1602 and the resolver stator 1603 create high and low magnetic resistances in a space therebetween. The angular position of the resolver rotor 1602 is measured using a variation in voltage developed at a resolver stator winding which arises from a difference between the high and low magnetic resistances and then outputted to the controller 1903 through an AD converter, not shown.

An angular position sensor having the above structure, unlike a Hall element, works to output the measured angular position accurately regardless of the ambient temperature as long as the resolver rotor 1602 and the resolver stator 1603 are precisely made from materials having the same coefficient of linear expansion. Such a type of angular position sensor is, therefore, useful for the rotating electrical machine in this embodiment which is designed to have an increased range where the speed of the rotating electrical machine is controllable. Alternatively, a plurality of Hall sensors used one for each of the phases of the rotating electrical machine or a single Hall sensor designed to measure a selected one of the phases may be employed. The use of a Hall sensor(s) is cost-effective for motors whose size is φ50 in diameter that is too small to use the above resolver, or in surrounding conditions where the ambient temperature does not exceed as high as 80° C.

A tolerance of press-fit of the rotor 1600 on the shaft 1601 is selected to be several micrometers or preferably near zero when the rotating electrical machine 1500 rotates at a maximum speed. This ensures the securement of the rotor 1600 to the shaft 1601 regardless of the speed of the rotor 1600.

Figure 134:
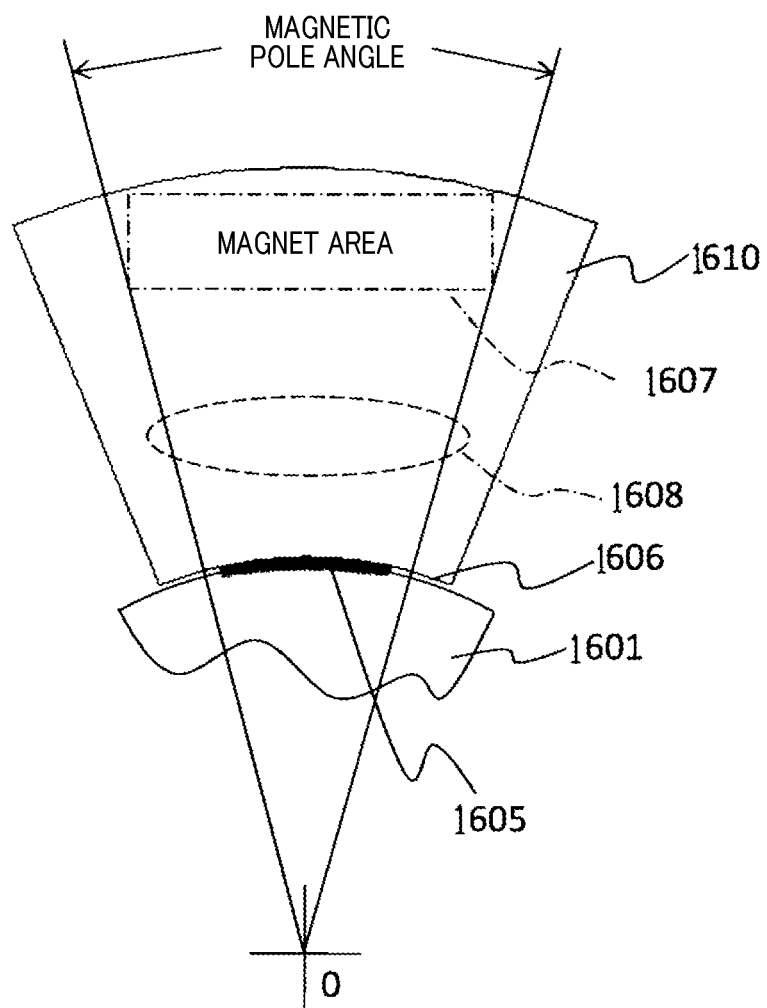
FIG. 134 is a view which illustrates a shaft press-fit in a rotor core.

FIG. 134 demonstrates the press fit. The contact 1605 between the rotor iron core 1610 and the shaft 1601 lies in an angular range in an angle occupied by each magnetic pole of the magnet unit on the inner periphery of the rotor iron core 1610. The contact 1605 is designed to have dimensions to create air gaps 1606 between the rotor iron core 1610 and the shaft 1601 other than the contact 1605. This stops deformation of the rotor iron core 1610 when press-fitted on the shaft 1601 from being transmitted to the outer periphery of the rotor iron core 1610, thereby enabling the high accurate size of air gaps to be determined. The flux barrier 1608 disposed between the magnet unit 1607 indicated by a chain line in FIG. 134 and the shaft 1601 serves to block the transmission of stress, as resulting from the press-fit, to the outer periphery of the rotor iron core 1610.

The dimensional tolerances of the shaft 1601 and the rotor iron core 1610 may be selected to create a clearance fit therebetween. A rotation stopper, such as a key or a pin, may be used to hold the shaft 1601 and the rotor iron core 1610 from rotating relative to each other in the circumferential direction thereof. The achieves high productivity and easy-to-remove structures of the shaft 1601 and the rotor iron core 1610. It is advisable that the key be transition-fit or press-fit on the shaft 1601 although the ease with which the shaft 1601 is removed from the rotor iron core 1610 is slightly reduced. The clearance fit of the key will cause the rotor 1600 to move between an air gap between the key and the key groove during rotation of the rotor 1600, which may result in a deviation of an output of the resolver from an actual angular position of the rotor 1600. This may result in an error in controlling the operation of the rotating electrical machine 1500.

The press-fit of the shaft 1601 in the rotor iron core 1610 may be achieved by splines or knurls formed on the surface of the shaft 1601. The shaft 1601 may alternatively be clearance-fit in the rotor iron core 1610 as long as teeth of the splines formed on the shaft 1601 and grooves formed in the rotor iron core 1610 are designed to mitigate negative factors affecting the control of the rotating electrical machine 1500. The above variation in voltage is transmitted through the stator 1700 to the controller 1930.

Figure 135A:
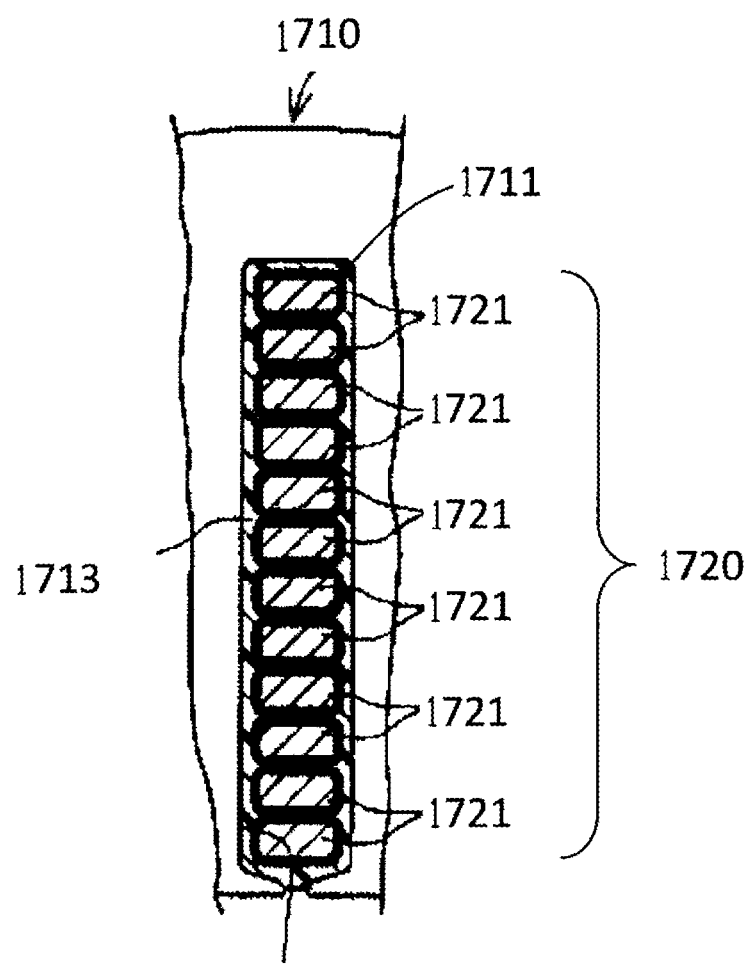
FIG. 135(a) is a view which illustrates a stator winding of a stator.
Figure 135B:
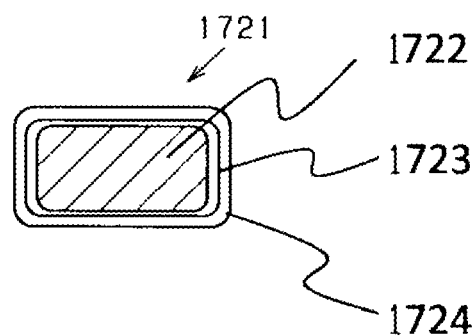
FIG. 135(b) is a sectional view of a conductor.

Next, the structure of the stator 1700 will be described below with refence to FIGS. 135(a) and 135(b). The stator 1700 is equipped with the stator core 1710 and the stator winding 1720 made up of multiple phase windings. The rotating electrical machine 1500 in this embodiment is engineered as a double-slot three-phase permanent magnet rotating electrical machine.

The stator core 1710 has formed therein the slots 1711 in which the conductors 1721 are disposed to constitute the stator winding 1720. Specifically, the stator core 1710 has the forty-eight slots 48 (i.e., 3 phases×2 slots 48 for each of 8 magnetic poles of the rotor 1600). The slots 48 are arranged adjacent each other in the circumferential direction of the stator core 1710. The conductors 1721 each of which has a rectangular transverse section are joined together in the form of a three-phase distributed winding.

The conductors 1721 may be of a hexagonal transverse section as well as quadrangle. Use of the quadrangle shape of the conductors 1721 will result in a higher space factor than round conductors. The space factor, as referred to herein, a ratio of a total cross-sectional area of the conductors 1721 occupying each of the slots 1711 to a cross-sectional area of each of the slots 1711. The use of the quadrangle shape of the conductors 1721 enables the conductors 1721 to be arranged in contact with each other without any clearance therebetween in each of the slots 1711, which realizes the stator winding 1720 having a decreased resistance to dc current. This enables the stator 1700 to be reduced in thickness in the radial direction of the stator 1700.

The conductors 1721 may be made of conductors having an oval transverse section. It is advisable that when mounted in the slots 1711, the conductors 1721 be arranged in a flat shape with the thickness thereof in the radial direction being larger than the width thereof in the circumferential direction of the stator core 1710.

The decrease in thickness of the stator 1700 offers the beneficial advantage that an air gap between the rotor 1600 and the stator 1700 may be increased in size in the radial direction thereof. Usually, the degree of output torque from the rotor 1600 depends upon a product of a radius of a rotor and an electrical current flowing through a conductor and a magnetic flux interlinking with the conductor. An increase in the above space factor, therefore, results in a decreased degree of output torque.

In a rotating electrical machine, an increase in inertia arising from an increase in radius of a rotor may lead to negative effects on the rotating electrical machine. For instance, use of a large-scale rotor in a traction electrical motor which rotates synchronously with rotation of an engine of a vehicle may have a risk that it may be difficult to rotate the motor synchronously with the rotation of the engine.

The rotor 1600, as described later, has a high permeance Pc, thus enabling an effective quantity of magnetic flux of a magnet installed in the rotor 1600 to be increased. This results in an increased degree to which the magnet contributes to production of torque per volume thereof, which will produce a large magnetic flux as compared with the same size of a conventional magnet. Additionally, the impedance of the stator winding 1720 may be set to be low, in other words, the number of the conductors 1721 may be decreased to be smaller than that in a conventional structure in order to decrease a total electrical and mechanical time constant Tk of the rotating electrical machine. Specifically, the electrical and mechanical time constant Tk, as expressed by an equation 1001 below, has a numerator indicating the inductance L. The electrical and mechanical time constant Tk is, therefore, decreased by decreasing the number of turns of the stator winding 1720 by a reciprocal of an increase in magnetic flux in the magnet, thereby improving the mechanical controllability of the rotating electrical machine.

$$Tk = (J \cdot L) = (Kt \cdot Ke) \qquad 1001$$

where J is inertia, L is inductance, Kt is torque constant, and Ke is back-electromotive force constant.

There is an additional advantage that the decrease in inductance will result in a drop in surge voltage. The conductors 1721 need only to be made from a conductive material. For instance, the conductors 1721 may be made of conductors using carbon nanotubes or made from aluminum, silver, or gold.

Each of the conductors 1721 includes the conductive body 1722 and the coating 1723 usually called an enameled film. The coating 1732 covers the conductive body 1722 and is made from polyimide, amide-imide, or polyamide imide. The coating 1723 is also covered with the outer coating layer 1724. The outer coating layer 1724 has a dielectric strength higher than that of the coating 1723. Each of the conductors 1721 may be made of twisted wire or litz wire. Each of the conductor 1721 includes the outer coating layer 1724 made of PEEK material. The outer coating layers 1724 are disposed in each of the slots 1711 together with the varnish 1713. A combination of the slot 1711 and the varnish 1713 and a combination of the varnish 1713 and the outer coating layer 1724 are preferably used to firmly fix parts in the slots 1711.

We have found that it is possible for the above structure to reduce mechanical vibration of the stator winding 1720 to about 3 to 5 dB. It is advisable that the varnish 1713 be epoxy resin or silicone adhesive. This causes the coating 1723, the outer coating layer 1724, and the varnish 1713 to have coefficients of linear expansion which are higher in this order.

Use of PPS as material of the outer coating layer 1724 requires the coefficient of linear expansion of the outer coating layer 1724 to be higher than that of the enameled film (i.e., the coating 1723) because the coefficient of PPS greatly varies depending upon the state thereof. It is, therefore, necessary to control a content of PPS in the outer coating layer 1724 to have the coefficient of linear expansion of the outer coating layer 1724 which is higher than that of the enameled film. The selection of the coefficient of linear expansion in the above way minimizes the degree of stress which arises a difference between coefficients of linear expansion and is exerted on the insulator. For instance, when the stator winding 1720 is cooled gradually from the outer side to the inner side thereof through the varnish 1713 by an air-cooling, a water-cooling, an oil-cooling system installed in an electric rain or an automotive vehicle, it will cause stress to be generated as a function of a difference between coefficients of linear expansion and applied to the insulator. The above structure, however, minimizes the stress acting on the insulator.

The strength of adhesion between the varnish 1713 and the outer coating layer 1724 is selected to be lower than that between the outer coating layer 1724 and the coating 1723, thereby preventing the breakage of the varnish 1713 which results from a difference in coefficient of linear expansion therebetween from being transmitted to the coating 1723. The strength of adhesion between the coating 1723 and the conductive body 1722 is selected to be lower than that between the outer coating layer 1724 and the coating 1723, thereby ensuring the electrical insulation the stator core for the stator winding 1720 by the coating 1723 even if the outer coating layer 1724 is broken. This structure provides beneficial effects on conductive members which protrude outside the slots 1711 and are exposed directly to outside air or cooling oil rather than conductive members disposed inside the slots 1711.

The rotor 1600 includes the hollow cylindrical rotor iron core 1610 whose inner peripheral surface is attached to the outer periphery of the shaft 1601.

Figure 136:
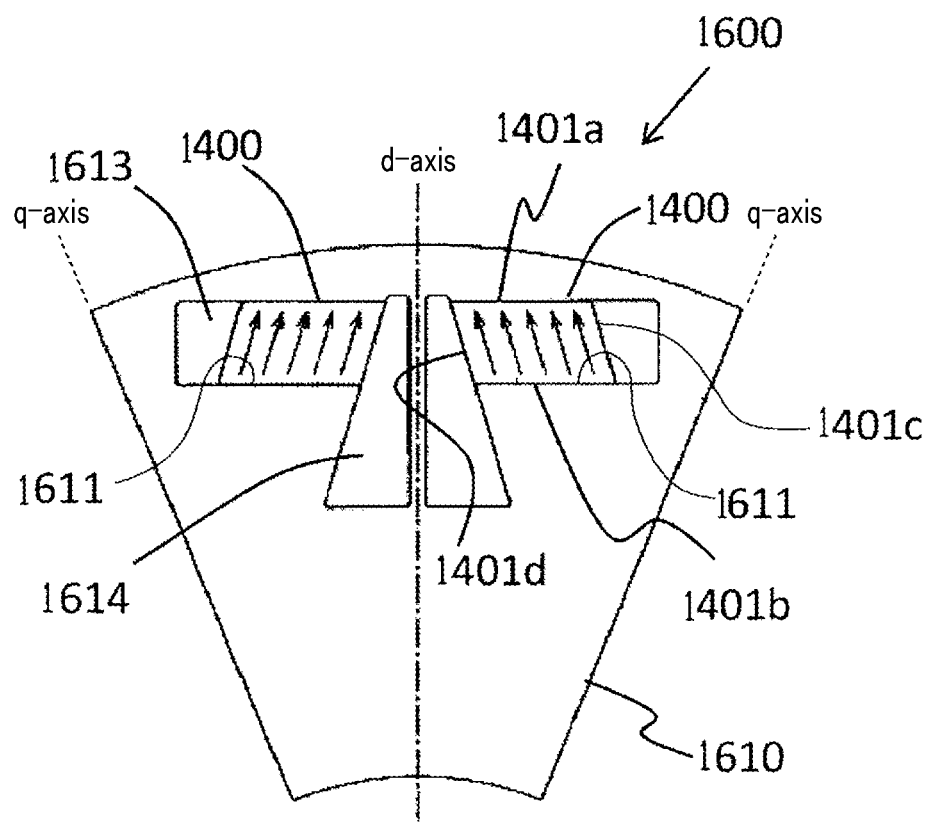
FIG. 136 is a partial plan view which illustrates a structure of a rotor.

FIG. 136 illustrates the structure of the rotor 1600 in detail. FIG. 136 shows only a portion of the rotor 1600 which contributes to generation of one of magnetic poles and whose center lies on the d-axis that is the center of the magnetic pole. The right and left sides of that portion of the rotor 1600 lie on the q-axis that represents the boundary between the magnetic poles.

The rotor iron core 1610 has formed therein the magnet housing holes 1611 arranged on opposite sides of the d-axis. Specifically, the paired magnet housing holes 1611 are disposed symmetrically with respect to a corresponding one of the d-axes and aligned with each other at an interval away from each other across the d-axis. Each of the magnet housing holes 1611 has mounted therein the magnet 1400 which is made of a permanent magnet, such as a sintered neodymium magnet.

Figure 137:
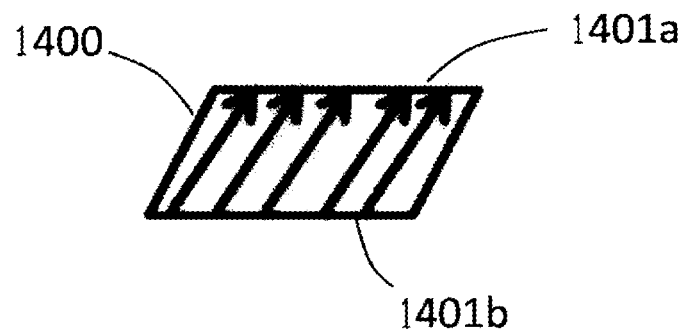
FIG. 137 is a transverse sectional view of a magnet.

The magnets 1400 in this embodiment will be described below with reference to FIG. 137. FIG. 137 shows a transverse section of the magnet 1400 which extends perpendicular to an axial direction of the rotor iron core 1610. A direction in which the magnet 1400 is magnetically oriented is indicated by arrows. Similarly, in the following drawings, directions in which a magnet is magnetically oriented is denoted by arrows. Such orientation direction is a direction in which the easy axes of magnetization of each of the magnets 1400 are oriented as a whole. Magnet magnetic paths are formed along the easy axes of magnetization. The orientation direction of the magnet 1400 also means a direction in which a line of magnetic force extends in the magnet 1400.

The magnet (i.e., magnetic body) 1400, as can be seen in FIG. 137, has a parallelogram transverse section. The magnet 1400 has the first major surface 1401a and the second major surface 1401b which are opposed to each other and face the stator 1700 and the shaft 1601, respectively. The first and second major surfaces 1401a and 1401b serve as magnet flux acting surfaces into or from which magnetic fluxes are inputted or output. In other words, each of the magnets 1400 has two pairs of opposed and parallel-extending surfaces a longer one of which defines the magnet flux acting surfaces 1401a and 1401b. In other words, each of the magnets 1400 has a longer pair of magnetic surfaces and a shorter pair of magnetic surfaces. The longer pair of magnetic surfaces corresponds to a pair of magnet flux acting surfaces 1401a and 1401b. The rotor iron core 1610 has the right and left magnets 1400, as viewed in FIG. 136, which are arranged on the opposite sides of the d-axis to be symmetrical with respect to the d-axis.

Each of the magnets 1400 is magnetically oriented to have crystal orientations aligned in one direction. When an anisotropic has magnetic orientations aligned completely in a given direction, it will offer a performance advantage thereof. The directions of magnetic orientation of the magnets 1400 are aligned in one direction by a magnetic orientation magnetic field during production thereof.

Each of the magnets 1400, as described above, has two pairs of opposed surfaces one of which defines the magnet flux acting surfaces 1401a and 1401b into or from which the magnetic flux is inputted or outputted and other of which defines magnetic flux non-acting surfaces 1401c and 1401d into or from which no magnetic flux enters or emerges. Each of the magnets 1400 has magnet magnetic paths whose length is longer than a thickness thereof, that is, a distance between the magnet flux acting surfaces 1401a and 1401b. Each of the magnets 1400 is also magnetically oriented to have easy axes of magnetization extending substantially parallel to the magnet magnetic paths. In other words, the magnet 1400 is designed to have line segments which are defined to extend along the easy axes of magnetization between the magnet flux acting surfaces 1401a and 1401b and longer than the thickness of the magnet 1400.

In other words, the magnetic orientations of each of the magnets 1400 are directed from the magnetic flux acting surface 1401b to the magnetic flux acting surface 1401a and intersect with an angle of other than 90° with the magnet flux acting surfaces 1401a and 1401b. For instance, the magnetic orientations of the magnet 1400 are parallel to the magnetic flux non-acting surfaces 1401c and 1401d.

Figure 138A:
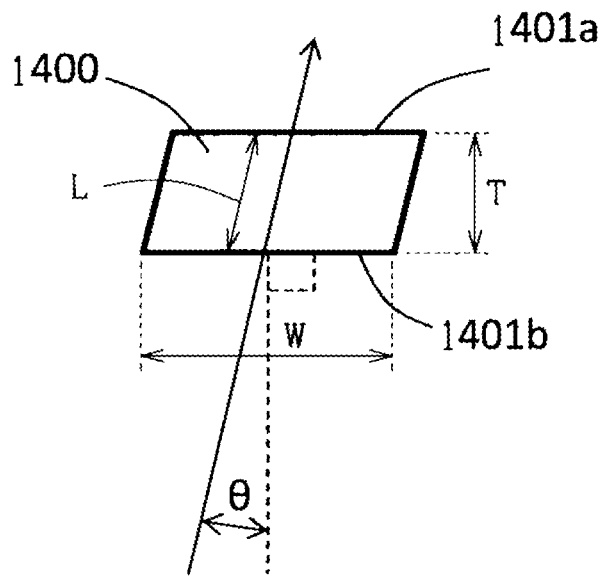
FIGS. 138(a) and 138(b) are views for explaining magnetic orientation of a magnet.
Figure 138B:
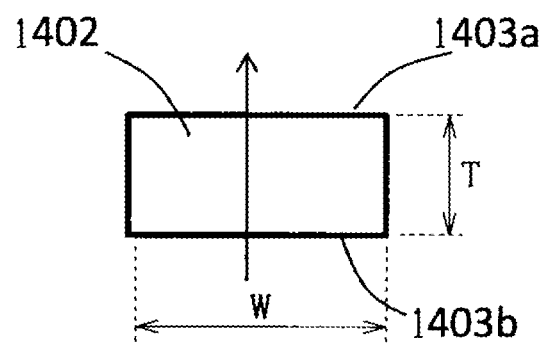

FIG. 138(a) illustrates the magnet 1400 in this embodiment. FIG. 138(b) illustrates the magnet 1402 as a comparative example. The magnets 1400 and 1402 are identical in transverse sectional area with each other. Specifically, the magnets 1400 and 1402 has the same width W that is a dimension of each of the magnetic flux acting surfaces thereof and the same thickness T. The width W, as referred to herein, is equivalent to the dimension of the longer sides of the transverse section of each of the magnets 1400 and 1402. The thickness T is equivalent to the length of a linear line extending between the longer sides of the transverse section of each of the magnets 1400 and 1402. The magnet 1402 illustrated as a comparative example is rectangular in transverse section thereof and has magnetic orientations (i.e., easy axes of magnetization) intersecting at right angles with the magnetic flux acting surfaces 1403a and 1403b.

The magnets 1400 in this embodiment, as described above has the magnetic orientations intersecting at an angle of other than 90° with the magnet flux acting surfaces 1401a and 1401b. In contrast, the magnet 1402 has the magnetic orientation intersecting at right angles with the magnet flux acting surfaces 1403a and 1403b. In other words, the magnet 1402 has the thickness T identical in dimension with the length of magnetic circuits in the magnet 1402 (i.e., the length of the magnet magnetic paths). The magnet 1400 in this embodiment has the magnetic orientations oblique at a given angle θ to the magnetic flux acting surfaces 1401a and 1401b, so that the magnet magnetic paths are longer than the thickness T. It follows that each of the magnets 1400 in this embodiment is identical in weight and total magnetic force with the magnet 1402, but has an increased effective density Bd of magnetic flux. The effective magnetic flux density Bd [T] is given by the following equation 1002.

$$Bd = Br \div \{1 + 1/Pc\} \qquad (1002)$$

where Br[T] is a remanent flux density, and Pc is a coefficient of permeance which represents the degree of ease with which a magnetic flux passes through a magnet.

The equation 1002 shows that when the permeance reaches an infinite value, it will cause Bd and Br to be identical with each other.

Figure 139:
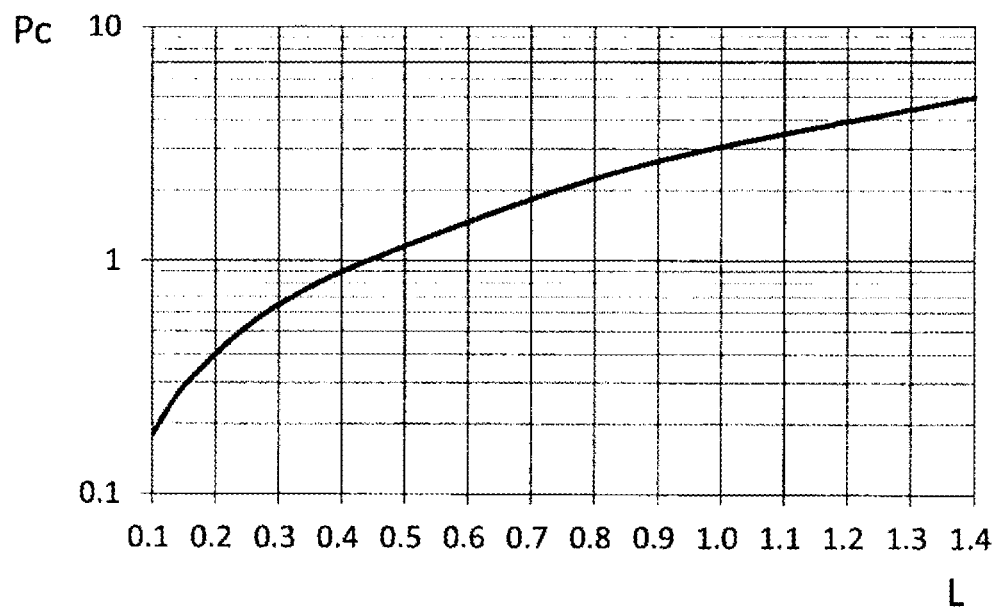
FIG. 139 is a view which represents a relation between length of a magnetic path of a magnet and a permeance coefficient.

FIG. 139 shows a relation between the length L of a magnet magnetic path and the coefficient Pc of permeance. The graph in FIG. 139 shows that the larger the length L of the magnet magnetic path along the magnetic orientation, the higher the coefficient Pc of permeance. The structure of each of the magnets 1400 is engineered to create the easy axes of magnetization (i.e., the magnetic orientations) without changing the volume thereof to be different from that of the conventional structure, thereby resulting in increases in length L of the magnet magnetic paths and the effective density Bd of magnetic flux. The length L of the magnet magnetic paths of the magnets 1400 is larger in dimension than that of the magnet 1402 by 1/cos θ.

In other words, each of the magnet 1400 is designed to have line segments which are defined to extend along the easy axes of magnetization between the magnet flux acting surfaces 1401*a* and 1401*b* and longer than the thickness T of the magnet 1400 by 1/cos θ.

Next, the structure of the rotor 1600 with the magnets 1400 mounted therein will be described below. Each of the magnets 1400, as can be seen in FIG. 136, has the magnet flux acting surfaces 1401*a* and 1401*b* which extend perpendicular to the d-axis and also has the q-axis side end 1401*c* and the d-axis side end 1401*d* which are magnetic flux non-acting surfaces and extend non-parallel to the d-axis. The q-axis side end 1401*c* and the d-axis side end 1401*d* extend at an angle to the magnet flux acting surfaces 1401*a* and 1401*b* which is the same as an angle that the magnetic orientations make with the magnet flux acting surfaces 1401*a* and 1401*b*. In other words, the ends 1401*c* and 1401*d* are oriented in the same direction as the magnetic orientations, that is, extend parallel to the easy axes of magnetization.

Each of the magnet housing holes 1611 is equipped with the flux barrier 1613 which is arranged in an end portion of the magnet housing hole 1611 which faces the q-axis. The flux barrier 1613 is located adjacent the end 1401*c* of the magnet 1400 that is a q-axis end portion of the magnet 1400. Each of the magnet housing holes 1611 is also equipped with the flux barrier 1614 arranged in an end portion thereof facing the d-axis. The flux barrier 1614 is located adjacent the end 1401*d* of the magnet 1400 that is a d-axis end portion of the magnet 1400. The flux barrier 1614 extends along the d-axis toward the shaft 1601.

In FIG. 136, the q-axis side end 1401*c* and the d-axis side end 1401*d* of each of the magnets 1400 are, as described above, oriented to extend at an angle to the magnet flux acting surfaces 1401*a* and 1401*b* which is the same as an angle that the magnetic orientations make with the magnet flux acting surfaces 1401*a* and 1401*b*, but however, this layout may be altered. For instance, although not illustrated, only the q-axis side end 1401*c* of each of the magnets 1400 may extend at an angle to the magnet flux acting surfaces 1401*a* and 1401*b* which is identical with the angle that the magnetic orientations make with the magnet flux acting surfaces 1401*a* and 1401*b*. In other words, the d-axis side end 1401*d* may be oriented parallel to the d-axis. In summary, the transverse section of each of the magnets 1400 may be of a quadrangular shape, such as rectangular, parallelogram, or trapezoidal.

Each of the magnets 1400 may be shaped to have a rectangular transverse section and also have the magnetic orientations intersecting at an angle of other than 90° with the magnet flux acting surfaces 1401*a* and 1401*b*. This structure enables the magnet magnetic paths to have an increased length, but may cause one or some of the magnet magnetic paths have a decreased length around the ends of the magnet 1400. In contrast, each of the magnets 1400 is, as illustrated in FIG. 136, designed to have the q-axis side end 1401*c* oriented at the same angle as that of the magnetic orientation to the magnet flux acting surfaces 1401*a* and 1401*b*, thereby eliminating the above drawback in that one or some of the magnet magnetic paths may have a decreased length.

In the structure illustrated in FIG. 136, portions of the magnet 1400 which do not contribute to increase in magnetic flux are obliquely cut, thereby resulting in a decreased volume of magnetic material as compared with a magnet whose long and short sides extend perpendicular to each other. This results in a decrease in volume of the magnets 1400, thereby enabling the number of magnets produced in a magnet making die to be increased or a used volume of magnet material to be reduced.

Figure 140:
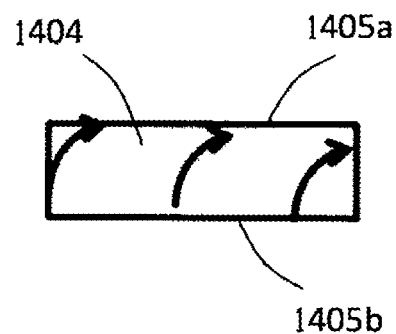
FIG. 140 is a transverse sectional view which illustrates another structure of a magnet.

The rotor 1600 may be engineered to have mounted therein the magnets 1404 illustrated in FIG. 140. Each of the magnets 1404 is shaped to have a rectangular transverse section and also have curved magnetic orientations. Specifically, the magnetic orientations of the magnet 1404 extend in a curved shape to the magnetic flux acting surfaces 1405*a* and 1405*b*. The graph in FIG. 139 shows that the longer the length L of the magnet magnetic paths, the higher the coefficient Pc of permeance. The curved shape of the magnetic orientations results in an increase in length L of the magnet magnetic paths. Such an increase in length L, therefore, enhances the coefficient Pc of permeance.

Figure 141:
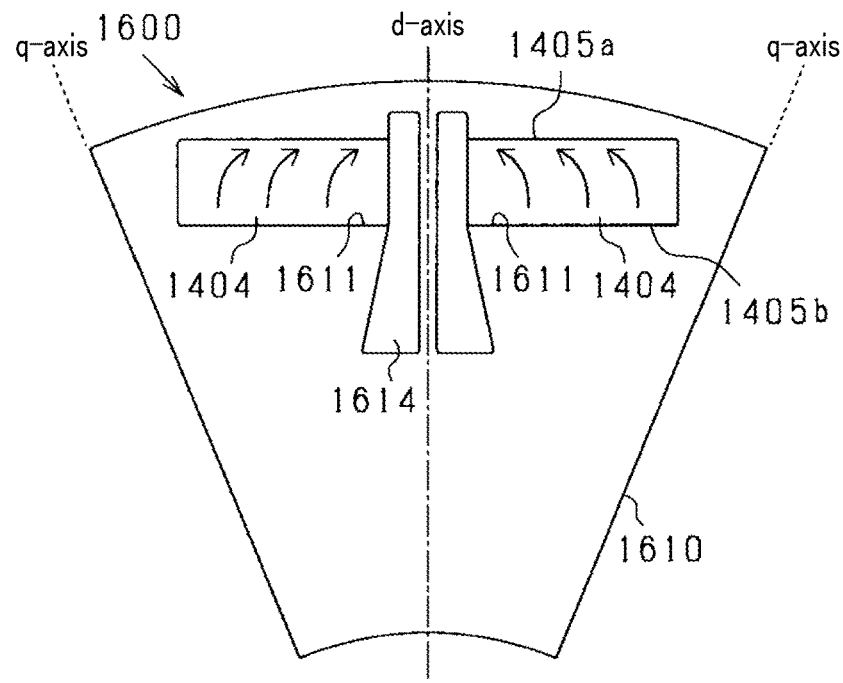
FIG. 141 is a plan view which illustrates a structure of a rotor.

The paired magnet housing holes 1611 lying in a range of the N-pole illustrated in FIG. 141 are arranged to be symmetrical with respect to the d-axis in the rotor iron core 1610. The magnet housing holes 1611 linearly extend perpendicular to the d-axis.

FIG. 141 is a view which demonstrates the magnet housing holes 1611 of the rotor iron core 1610 in which the paired magnets 1404 illustrated in FIG. 140 are mounted. In the structure illustrated in FIG. 141, the two magnets 1404 which are arranged on opposite sides of the d-axis are oriented to be line-symmetrical with respect to the d-axis in the rotor iron core 1610. The paired magnets 1404 have easy axes of magnetization which extend from the magnetic flux acting surface 1405*b* to the magnetic flux acting surface 1405*a* and are curved toward the d-axis.

The flux barrier 1614 is disposed in a portion of each of the magnet housing holes 1611 which is unoccupied by the magnet 1404, in other words, a portion of length of each of the magnet housing holes 1611 which is located close to the d-axis. The flux barrier 1614 works to minimize a risk of a self-short circuit of the magnet magnetic flux in the rotor iron core 1610. Each of the flux barriers 1614 extends along the d-axis.

Next, how to produce the permanent magnet used in the above embodiments will be described below. The following discussion will refer mainly to magnetic orientation steps of a sequence of production processes for making the permanent magnet. First, the sequence of production processes will first be simply discussed.

First, magnet material of, for example, a neodymium magnet is blended. Subsequently, the magnet material is fused in a melting furnace to produce an ingot. The ingot is ground into fine powder whose particle size is on the order of several micrometers (i.e., grinding process). A compact made of the fine powder is placed in a magnetic field and magnetically oriented to align crystal orientations, i.e., easy axes of magnetization with a selected direction (i.e., orientation process). For instance, the fine powder is supplied into a press die and then magnetized to align the crystal orientations of the fine powder with a direction of magnetic orientation magnetic field lines (i.e., orientation field lines) to offer a high degree of magnetic property in the direction of the magnetic orientations. Afterwards, a magnetically oriented magnet (i.e., pressed fine powder) in which the easy axes of magnetization are aligned with the selected direction is sintered in a vacuum and thermally treated (i.e., sintering process). The magnet is then placed in a magnetizing field and magnetized (i.e., magnetizing process). This completes the permanent magnet.

A structure associated with the orientation process will be described in detail with reference to FIGS. 142(a) and 142(b). FIG. 142(a) schematically illustrates a structure of the magnetic orientation device 1300 used in the orientation process (i.e., formation of a magnet in magnetic field). FIG. 142(b) is a view which illustrates a plurality of magnets MG magnetically oriented in the orientation process. FIG. 142(a) shows the die 1250 that is a magnet-making die for use in producing the magnets MG. The die 1250 is set to have paired opposed surfaces (which will become magnetic flux acting surfaces) of the magnet MG which extend to obliquely intersect with orientation field lines.

The magnetic orientation device 1300 is equipped with the magnetic field generator 1301 whose size is large enough to have the die 1250 disposed therein. The magnetic field generator 1301 includes the coil 1301a which, when electrically excited, generates therein an orientation field oriented in a selected direction. The die 1250 is disposed inside the coil 130a to have a normal line N oriented in non-parallel at a given angle to an axial direction of the coil 1301a. The normal line N is defined to extend perpendicular to a given plane which coincides with an outer surface of the magnet-powder compact that is a target to be magnetically oriented in the die 1250 (e.g., a line perpendicular to one of surfaces of the magnet-powder compact disposed inside the die 1250). The orientation field is, therefore, applied at an angle of other than 90° to one of the surfaces of the magnet-powder compact to magnetize the magnet-powder compact. Note that the die 1250 filled with the magnet powder is placed in an inner space of the coil 1301a.

The orientation field 1302, as produced by exciting the magnetic field generator 1301 (i.e., the coil 1301a), is applied to the die 1250 to magnetically orient the magnet power disposed in the die 1250. This produces the magnet MG which has an increased orientation ratio. The orientation ratio also represents a ratio of the remanent flux density Br to the saturation magnetic flux density in the magnet MG.

In this embodiment, a powerful magnetic field is generated by the magnetic field generator 1301 using the coil 1301a, so that the orientation ratio will be 90% or higher. FIG. 142(b) shows a direction in which the magnet MG is magnetically oriented using an oblique solid line. The above orientation process achieves the formation of, for example, the magnets 1400 to have an increased orientation ratio and also enables the magnet MG to have magnetic orientations which extend linearly in parallel to each other.

Alternatively, after magnetically oriented and sintered, the magnet MG may be cut into a plurality of pieces which are, in turn, magnetized. FIG. 143(a) is a sectional view which illustrates the die 1250 in which the magnet MG is disposed.

In the die 1250 illustrated in FIG. 143(a), the magnet MG (i.e., a magnetic block) is disposed which has a size large enough to be divided into a plurality of (four in the drawing) magnets MG1 to MG4. The magnet MG is then magnetically oriented and sintered. Afterwards, the magnet MG is cut into the magnets MG1 to MG4. Usually, the magnet MG will shrink in the sintering process. In view of this, the magnet MG is formed by the die 1250 to compensate for such a shrinkage in the orientation process. In the orientation process, the orientation field is applied to be oblique to a selected one of outer surfaces of the magnet MG. Accordingly, in a case where the magnet MG (i.e., the magnet block) is of a cuboid shape, the magnet MG is preferably cut parallel to the selected one of the outer surfaces thereof.

In the above way, each of the magnets MG1 to MG4 (e.g., the magnet 1400 illustrated in FIG. 137) is produced to have magnet magnetic paths whose length is larger than the thickness of the magnet, that is a distance between magnetic flux acting surfaces of the magnet into or from which the magnetic flux is inputted or outputted and also to create easy axes of magnetization parallel to the magnet magnetic paths.

The die 1250 is, as illustrated in FIG. 143(b), preferably designed to include inner walls: the first walls 1251 and the second walls 1252. The first walls 1251 are oblique to lines of the orientation field (i.e., arrows in the drawing). The second walls 1252 are parallel to the lines of orientation field. In the above way, each of the magnets MG1 to MG4 is produced to have magnet magnetic paths which are longer than the magnet thickness without causing one or some of the magnet magnetic paths to be produced in the orientation process to be shorter than the other. This reduces a required volume of magnet material and also results in a decreased number of cutting operations on the magnet block.

An alternative structure for use in the orientation process will be described below with reference to FIGS. 144(a) and 144(b). FIG. 144(a) is a schematic lateral view of the magnetic orientation device 1310. FIG. 144(b) is a schematic sectional view of the magnetic orientation device 1310 and illustrates a positional relation between the orientation field 1316 and the die 1260.

The magnetic orientation device 1310 in this embodiment includes a pair of coils 1311 and 1312 and a plurality of cores 1313. The coils 1311 and 1312 are coaxially arranged at a given interval away from each other and work to generate a magnetic field. The cores 1313 serve as orientation yokes and are located outside the center of the coils 1311 and 1312 between the coils 1311 and 1312. An assembly of the coils 1311 and 1312 and the cores 1313 works as a magnetic field generator. When electrically excited, the coils 1311 and 1312 generate and orient lines of magnetic field toward the center of the magnetic orientation device 1310. The cores 1313 are arranged away from each other in a circle. The cores 1313 may be located radially outside the coils 1311 and 1312. Each of the cores 1313 is shaped to have a circular transverse section, but may alternatively be of a rectangular or arc-shape in cross section. The die 1260 for use in producing the magnet MG is disposed inside a circle in which the cores 1313 are arranged.

Specifically, when exited, the coils 1311 and 1312 generate and orient lines of magnetic field inwardly toward the center of the magnetic orientation device 1310 to be non-uniform. More specifically, the lines of magnetic field, as created by the coils 1311 and 1312, are oriented non-uniformly depending upon the number of the cores 1313 and an interval between the cores 1313.

In operation, the coils 1311 and 1312 generate magnetic fields 1314 and 1315 which have opposite polarities and are oriented toward the die 1260 in which the magnet powder is disposed. The magnetic fields 1314 and 1315 repel or hit each other to create lines of orientation field 1316 which spread toward the cores 1313. In other words, the repelling action of the magnetic fields 1314 and 1315 with the opposite polarities creates the orientation field 1316 which uniformly and radially spread to the cores 1313 arranged away from each other in a circle, thereby developing a distribution of the orientation field 1316. To say it in a different way, the orientation field 1316 which has a curvature, in other words, a circular outline is created. Use of the orientation field 1316 enables the above described the magnets 1400 and 1404 to be produced to have a high orientation ratio.

FIG. 145(*a*) is a view which illustrates in a direction in which the magnet MG is magnetically oriented. In FIG. 145(*a*), repelling of magnetic fields occurs in a region K1. This causes the orientation field 1316 to be created and spread from the region K1 toward the cores 1313, so that lines of magnetic flux extend in an arc-shape toward each of the cores 1313. The magnet MG is placed in the die 1260 and oriented within the orientation field in a selected direction in which, for example, opposed outer surfaces of the magnet MG that will be magnetic flux acting surfaces intersect obliquely with the orientation field, thereby magnetically orienting the magnet MG in the die 1260 in a desired direction. In the above way, the magnet MG1 (e.g., the magnet 1404 illustrated in FIG. 141) is produced to have magnet magnetic paths whose length is larger in measure than the thickness of the magnet MG, that is a distance between the magnetic flux acting surfaces of the magnet MG into or from which the magnetic flux is inputted or outputted and also to create easy axes of magnetization parallel to the magnet magnetic paths. The above magnetic orientation arrangements are useful for the magnet MG required to be magnetically oriented in an arc-shape.

The die 1260 may be shaped to have a structure illustrated in FIG. 145(*b*). Specifically, the die 1260 is of a circular shape and has eight housings 1261 arranged adjacent each other in a circumferential direction of the die 1260. The housings 1261 are prepared for the bar-shaped cores 1313. The housings 1261 are preferably twice as many as the cores 1313. The dividing walls 1262 and 1263 are arranged one between a respective adjacent two of the housings 1261 and located at angular positions matching orientations of lines of the orientation field 1316.

An alternative structure for use in the orientation process will be described below with reference to FIGS. 146(*a*) and 146(*b*). FIG. 146(*a*) is a schematic lateral view of the magnetic orientation device 1320. FIG. 146(*b*) is a schematic sectional view of the magnetic orientation device 1320 and illustrates a positional relation between the orientation field 1322 and the die 1270.

The magnetic orientation device 1320 in this embodiment includes the linear conductor 1321*a* working as the magnetic field generator 1321. When electrically energized, the conductor 1321*a* generates the orientation field 1322 whose line extends in a circle around the conductor 1321*a*. The dies 1270 in which magnet powder is disposed are arranged around the conductor 1321*a* at a given orientation. Use of the orientation field 1322 enables the above described magnets 1400 and 1404 to be produced with a high orientation ratio. An injection mold may alternatively be used for producing magnets using magnet powder. This enables the magnets to be manufactured without a cutting operation to improve the productivity of the magnets.

A plurality of dies 1270 may be arranged in a circle around the conductor 1321*a*. The orientation of each of the dies 1270 may be determined based on a desired magnetic orientation.

In the above way, a magnet (e.g., the magnet 1404 illustrated in FIG. 141) is produced to have magnet magnetic paths whose length is larger in measure than the thickness of the magnet between magnetic flux acting surfaces of the magnet into or from which the magnetic flux is inputted or outputted and also to create easy axes of magnetization parallel to the magnet magnetic paths. The above magnetic orientation arrangements are useful for the magnet MG required to be magnetically oriented in an arc-shape.

Ninth Embodiment

This embodiment is a modification of the structure of the permanent magnets in the rotor 1600. FIG. 147 illustrates a structure of the rotor 1600 in this embodiment. The magnet housing holes 1611 of the rotor iron core 1610, as can be seen in FIG. 147, have mounted therein the magnets 1410 disposed on opposite sides of the d-axis. The magnets 1410 are arranged to be line-symmetrical with respect to the d-axis.

Each of the magnets 1410 is of a rectangular transverse section and has two side surfaces which are opposed to each other in the radial direction thereof and serve as the magnetic flux acting surfaces 1411*a* and 1411*b* into or from which the magnetic flux is inputted or outputted. Each of the magnets 1410 has a first portion 1412*a* close to the d-axis and a second portion 1412*b* close to the q-axis. The first portion 1412*a* and the second portion 1412*b* are different in direction of magnetic orientation (i.e., easy axes of magnetization) from each other. Specifically, each of the magnets 1410 has magnet magnetic paths which are different in orientation between ends portions of a length of thereof. Particularly, the direction of magnetic orientation in the first portion 1412*a* close to the d-axis is nearly parallel to the d-axis as compared with that of the second portion 1412*b* close to the q-axis. In other words, each of the magnets 1410 has the directions of magnetic orientation (i.e., the easy axes of magnetization) which are different between regions thereof close to the d-axis and the q-axis. The direction of magnetic orientation in the region close to the d-axis is more parallel to the d-axis than in the region close to the q-axis is.

Each of the magnets 1410 also has the q-axis side end 1411*c* and the d-axis side end 1411*d* which are close to the q-axis and the d-axis, respectively, in the lengthwise direction of the magnets 1410. In other words, the magnet 1410 has the q-axis side end 1411*c* and the d-axis side end 1411*d* which are opposed to each other in the lengthwise direction extending along the magnetic flux acting surfaces 1411*a* and 1411*b*. The direction of magnetic orientation (i.e., the easy axis of magnetization) close to one of the d-axis side end 1411*d* and the q-axis side end 1411*c* is different from that close to the other. The direction of magnetic orientation in the first portion 1412*a* of the magnet 1410 located close to the d-axis side end 1411*d* is oriented more parallel to the d-axis than that in the second portion 1412*b* located close to the q-axis side end 1411*c*.

Specifically, if a direction of magnetic orientation in a region of each of the magnets 1410 closer to the d-axis side end 1411*d* than to the q-axis side end 1411*c* is, as illustrated in FIG. 148, expressed by X1001, and a direction of magnetic orientation in a region closer to the q-axis side end 1411*c* than to the d-axis side end 1411*d* is expressed by X1002, the direction X1001 of magnetic orientation is more parallel to the d-axis than the direction X1002 of magnetic orientation is. In other words, the angle θ1002 that the direction of magnetic orientation X1002 makes with a direction perpendicular to the magnetic flux acting surfaces 1411*a* and 1411*b* of the magnet 1410, that is, the d-axis is larger than the angle θ1001 that the direction of magnetic orientation makes with the d-axis. Each of the magnets 1410 in this embodiment is designed to have magnetic paths whose lengths in the direction of magnetic orientation, in other words, distances between initial points and terminal points of the magnet magnetic paths in the direction of magnetic orientation in the magnet 1410 become gradually shorter from the q-axis side end 1101c to the d-axis side end 1101d.

The setting of the directions of magnetic orientation (i.e., orientation angles) illustrated in FIG. 147 reduces lines of magnetic fluxes which are created by the magnets 1410 arranged on the opposite sides of the d-axis and opposed to each other through the d-axis, thereby decreasing the demagnetization arising from repelling of the magnetic fluxes produced by the magnets 1410 arranged on the opposite sides of the d-axis.

The beneficial effects offered by the setting of the directions of magnetic orientation around the d-axis will be described below with reference to FIGS. 174(*a*) and 174(*b*). FIGS. 174(*a*) and 174(*b*) show the rotor core 1650 in which the magnets 1415 are arranged in a V-shape. FIG. 174(*a*) demonstrate a conventional structure. FIG. 174(*b*) shows the structure in this embodiment.

The beneficial effects provided by the magnet 1410 illustrated in FIG. 147 which is magnetically oriented to have easy axes of magnetization which are oblique to a direction perpendicular to the magnetic flux acting surface 1411a near the d-axis side end 1411d of the magnet 1410 and extend toward the d-axis (i.e., the direction X1001 in FIG. 148) will be described with reference to FIGS. 174(*a*) and 174(*b*).

FIGS. 174(*a*) and 174(*b*) show the rotor core 1650 in which the paired magnets 1415 are arranged in a substantially V-shape. FIG. 174(*a*) illustrates the conventional structure in which easy axes of magnetization are perpendicular to magnetic flux acting surfaces of the magnet 1415 near the d-axis side end of the magnet 1415. FIG. 174(*b*) shows the structure which is different from that illustrated in FIG. 147, but has a feature in this embodiment. Specifically, the magnet 1415 in FIG. 174(*b*) has the easy axis of magnetization which is oblique to a direction perpendicular to the magnetic flux acting surfaces near the d-axis side end and extends toward the d-axis.

In FIG. 174(*a*), the magnets 1415 generate the magnetic fluxes Φ10 which are perpendicular to the magnetic flux acting surfaces and each of which includes a flux component Φ11 parallel to the d-axis and a flux component Φ12 perpendicular to the d-axis. The flux components Φ12 perpendicular to the d-axis are magnetic fluxes that act opposite to each other across the d-axis so that they repel each other.

In FIG. 174(*b*), the magnets 1415 generate the magnetic fluxes 120 which intersect at an angle of other than 90° with the magnetic flux acting surfaces near the d-axis and each of which includes a flux component 121 parallel to the d-axis and a flux component 122 perpendicular to the d-axis. The flux component 120 in FIG. 174(*b*) is nearly parallel to the d-axis as compared with the flux component Φ10 in FIG. 174(*a*), so that the flux component 122 perpendicular to the d-axis is shorter than flux component Φ12. This results in a decreased strength of the magnetic fluxes acting opposite to each other across the d-axis, thereby reducing the demagnetization.

The magnet 1410 illustrated in FIG. 147 has the directions of magnetic orientation all of which intersect an angle of other than 90° with the magnetic flux acting surfaces 1411a and 1411b, but however, may be designed to have an additional magnetic orientation intersecting at right angles with the magnetic flux acting surfaces 1411a and 1411b.

The magnet 1410 in FIG. 147, as described above, has two inner and outer surfaces which are opposed to each other in the radial direction and serve as the magnetic flux acting surfaces 1411a and 1411b into or from which the magnetic flux is inputted or outputted and also has the q-axis side surface as the magnetic flux acting surface 1411c into or from which the magnetic flux is inputted or outputted. The direction of magnetic orientation near the q-axis side end of the magnet 1410 is more perpendicular to the d-axis than that near the d-axis side end of the magnet 1410 is, thereby causing the magnetic flux to enter or emerge from the q-axis side end 1411c. For the sake of convenience in the following discussion, inner and outer surfaces of each of the magnets 1410 which are opposed to each other in the radial direction will also be referred to as the first magnetic flux acting surfaces 1411a and 1411b. The q-axis side end 1411c will also be referred to as the second magnetic flux acting surface 1411c. The magnets 1410 have the directions of magnetic orientation oblique to a direction perpendicular to a stator-facing surface (i.e., an upper surface in the drawing), i.e., the first magnetic flux acting surface 1411a, thereby creating the second magnetic flux acting surface 1411c.

Each of the magnets 1410 has created therein magnet magnetic paths extending from one of the first magnetic flux acting surface 1411a and the second magnetic flux acting surface 1411c to the other. Each of the magnets 1410 is disposed in one of the magnet housing holes 1611 with the second magnetic flux acting surface 1411c placed in contact with the inner surface of the magnet housing hole 1611 (i.e., an inner surface of the rotor core 1610) through a smallest possible air gap therebetween.

When the magnet 1410 generates the N-pole, the first magnet flux acting surface 1411a facing the stator will be a magnetic flux output surface, while the first magnetic flux acting surface 1411b facing away from the stator and the second magnetic flux acting surface 1411c will be magnetic flux output surfaces. Alternatively, when the magnet 1410 generates the S-pole, the first magnet flux acting surface 1411a will be a magnetic flux input surface, while the first magnetic flux acting surface 1411b and the second magnetic flux acting surface 1411c will be magnetic flux input surfaces. In other words, in the case of the N-pole, of three magnetic flux acting surfaces of the magnet 1410, the first magnetic flux acting surface 1411a serves as the magnetic flux output surface, while the remaining two: the first magnetic flux acting surface 1411b and the second magnetic flux acting surface 1411c serve as the magnetic flux input surfaces.

When the second magnetic flux acting surface 1411c works as the magnetic flux input surface, it causes the magnetic flux inputted from two magnetic flux acting surfaces (i.e., the first magnetic flux acting surface 1411b and the second magnetic flux acting surface 1411c) to emerge from one magnetic flux acting surface (i.e., the first magnetic flux acting surface 1411a). Alternatively, when the second magnetic flux acting surface 1411c works as the magnetic flux output surface, it causes the magnetic flux inputted from one magnetic flux acting surface (i.e., the first magnetic flux acting surface 1411a) to emerge from two magnetic flux acting surfaces (i.e., the first magnetic flux acting surface 1411b and the second magnetic flux acting surface 1411c). In the above case, the magnetic fluxes are collected or spread at a portion of the rotor core 1610 near the q-axis side end of the magnet 1410.

The first magnetic flux acting surfaces 1411a and 1411b are surfaces contributing to generation of magnetic fluxes (i.e., pole magnetic fluxes) around the center of a magnetic pole. The second magnetic flux acting surface 1411c is a surface contributing to generation of magnetic fluxes passing through the q-axis. Each of the magnets 1410 in this embodiment has magnetic orientations intersecting at an angle of other than 90° with the first magnetic flux acting surfaces 1411a and 1411b and the second magnetic flux acting surface 1411c.

Each of the magnets 1410 creates the magnet magnetic paths between the first magnetic flux acting surface 1411a close to the stator and the second magnetic flux acting surface 1411c. The second magnetic flux acting surface 1411c is defined by the q-axis side end of the magnet 1410. The magnetic fluxes, therefore, flow through the second magnetic flux acting surfaces 1411c (i.e., the q-axis side ends) of the magnets 1410 which have magnetic poles which are arranged adjacent each other and opposite to each other. This enables the state of magnetic saturation in a portion of the rotor core 1610 near the q-axis. In this embodiment, the rotor core 1610 is of an interior permanent magnet type and designed to use, unlike conventional structures, a portion of the rotor core 1610 near each of the q-axes as creating a magnetic circuit, i.e., a magnetic path in the magnet 1410.

The magnets 1410 are mounted in the magnet housing holes 1611 with the second magnetic flux acting surfaces 1411c placed in contact with the inner walls of the magnet housing holes 1611. This layout is useful to create a magnet magnetic path extending through the second magnetic flux acting surfaces 1411c of the magnets 1410 arranged adjacent each other across the q-axis and a portion of the rotor core 1610 between the second magnetic flux acting surfaces 1411c. This achieves suitable control of the magnetic saturation in a portion of the rotor core 1610 near the q-axis.

Tenth Embodiment

This embodiment has a modified structure of permanent magnets mounted in the rotor 1600. FIG. 149 illustrates the structure of the rotor 1600 in this embodiment.

The rotor iron core 1610, as clearly illustrated in FIG. 149, has formed therein the magnet housing holes 1611 arranged on opposite sides of the d-axis. The magnets 1420 are mounted one in each of the magnet housing holes 1611. Each of the magnet housing holes 1611 has a q-axis side end and a d-axis side end which are offset from each other in a radial direction of the rotor iron core 1610. Specifically, the q-axis side end is located outside the d-axis side end in the radial direction. Similarly, each of the magnets 1420 has a q-axis side end and a d-axis side end which are offset from each other in a radial direction of the rotor iron core 1610. The q-axis side end is located outside the d-axis side end in the radial direction. Each of the magnet housing holes 1611 and the magnets 1420 has a transverse section of a convex shape protruding outward in the radial direction of the rotor 1600. In the structure illustrated in FIG. 149, each of the magnet housing holes 1611 and the magnets 1420 is of an arc-shape bulging outwardly in the radial direction of the rotor 1600 and also toward the d-axis. The right and left magnet housing holes 1611 are arranged to be line-symmetrical with respect to the d-axis in a substantially V-shape. Similarly, the right and left magnets 1420 are arranged to be line-symmetrical with respect to the d-axis in a substantially V-shape.

The structure of the rotor 1600 in this embodiment which is different from a conventional structure using flat permanent magnets and beneficial advantages offered by this embodiment will be described below with reference to FIGS. 175 to 178. FIGS. 175 to 178 illustrate the rotor core 1650 in which the magnets 1415 are arranged in a substantially V-shape. In FIG. 175, the magnetizing field 1661 is generated which results from a rotating magnetic field from a stator, not shown, and passes through the d-axis. In FIG. 176, the magnetizing field 1662 is generated which results from a rotating magnetic field from a stator, not shown, and passes through the q-axis. FIG. 177 shows an equivalent magnetic circuit in the interior permanent magnet rotor illustrated in FIG. 178.

In the structure illustrated in FIG. 175 or 176, application of the magnetizing field 1661 or 1662, as generated from the stator, not shown, to the rotor causes a magnetic flux to be inputted from outside the rotor, which may cause the radially outer portion 1651 of the rotor core 1650 to be magnetically saturated by a degree of magnetizing field lower than that by which the radially inner portion 1652 is magnetically saturated. Particularly, the magnetic saturation of the q-axis side portion 1653 whose amount of iron is small is an issue which should be controlled in terms of demagnetization of the q-axis side portion 1653. The magnetic saturation of the q-axis side portion 1653 will result in magnetic saturation of the radially outer portion 1651 surrounded by the magnets 1415 arranged in a V-shape. This reduces the permeability of the radially outer portion 1651, which results in an increase in resistance value of the magnetic resistor R1 illustrated in FIG. 177. In this state, the magnets 1415 lie in the magnetically saturated core, so that they have a low permeance as if they are in air. The magnets 1415 are, therefore, demagnetized or exposed to a decreased amount of magnetic flux.

In contrast, the rotor core 1610 illustrated in FIG. 149 has the magnets 1420 each of which is V-shaped in a convex form protruding outward in the radial direction of the rotor 1600. This configuration of the magnets 1420 leads to a reduced volume of the radially outer portion 1651 of the rotor core 1610 surrounded by the magnets 1420 arranged adjacent each other in the V-shape, that is, an iron containing portion of the rotor core 1610 which is likely to magnetically saturate, thereby resulting in a decrease in resistance value of the magnetic resistor R1 illustrated in FIG. 177. This enhances the resistance of the rotor core 1610 to demagnetization. The convex form of the magnets 1420 which bulges outward in the radial direction of the rotor core 1610 results in a decreased volume of a portion of the rotor core 1610 located close to the outer periphery of the rotor core 1610 around the d-axis, which minimizes the iron loss.

In the structure illustrated in FIG. 149, each of the magnets 1420 has a radially outer surface and a radially inner surface which are opposed to each other as the first magnetic flux acting surfaces 1421a and 1421b into or from which the magnetic flux is inputted or outputted. Each of the magnets 1420 also has the q-axis side end as the second magnetic flux acting surface 1421c into or from which the magnetic flux is inputted or outputted.

A direction of magnetic orientation in each of the magnets 1420 is not straight, but of a curved or convex shape bulging toward the d-axis. This causes the q-axis side end of each of the magnets 1420 to work as the second magnetic flux acting surface 1421c facing the q-axis. A magnet magnetic path is created between the second magnetic flux acting surface 1421c and the first magnetic flux acting surface 1421a which is located closer to the outer periphery of the rotor than the second magnetic flux acting surface 1421c is. The magnet magnetic path has a length longer than a physical thickness of the magnet 1420, that is, a distance between the first magnetic flux acting surfaces 1421a and 1421b. An interval between the second magnetic flux acting surface 1421c and the first magnetic flux acting surface 1421a which is located close to the outer periphery of the rotor, in other words, a minimum distance therebetween which is curved along an easy axis of magnetization is preferably longer than the thickness of the magnets 1420.

When the magnet 1420 generates the N-pole, the first magnet flux acting surface 1421*a* facing the stator (i.e., the upper side in the drawing) will be a magnetic flux output surface, while the first magnetic flux acting surface 1421*b* facing away from the stator (i.e., a lower side in the drawing) and the second magnetic flux acting surface 1421*c* will be magnetic flux output surfaces. Alternatively, when the magnet 1420 generates the S-pole, the first magnet flux acting surface 1421*a* will be a magnetic flux input surface, while the first magnetic flux acting surface 1421*b* and the second magnetic flux acting surface 1421*c* will be magnetic flux input surfaces.

Each of the magnets 1420 also has the magnetic flux non-acting surface 1422 that is a portion of the q-axis side end between the first magnetic flux acting surface 1421*a* and the second magnetic flux acting surface 1421*c*. The magnetic flux non-acting surface 1422 is a surface of the magnet 1420 into and from which no magnetic flux is inputted or outputted. The magnetic flux non-acting surface 1422 is defined by an inwardly curved or arc-shaped portion of the surface of the q-axis side end of the magnet 1420 and extends substantially in a direction of magnetic orientation of the magnet 1420. An interval between the magnetic flux non-acting surface 1422 and the rotor core 1610 (i.e., the inner wall of the magnet housing hole 1611) defines the non-magnetic portion 1621 (i.e., a void space) where there is no magnet in the magnet housing hole 1611). Accordingly, each of the magnets 1420 has the second magnetic flux acting surface 1421*c* that is a portion of the surface of the q-axis side end and works as a magnetic flux acting surface placed in direct contact with the rotor core 1610. Each of the magnets 1420 also has the magnetic flux non-acting surface 1422 placed in non-contact with the rotor core 1610.

The above structure of the rotor 1600 enables a q-axis side portion of the rotor core 1610 which is not used in a conventional interior permanent magnet rotor core to be employed as a magnetic circuit or path through which the magnetic flux passes. In other words, the magnet 1420 has the second magnetic flux acting surface 1421*c* on the q-axis side end thereof, thereby facilitating the ease with which the magnetic flux flows through the q-axis side portion 1622 of the rotor core 1610. The non-magnetic portion 1621 is arranged outside the q-axis side end of the magnet 1420, so that the magnetic flux concentrates on the q-axis side portion 1622. The non-magnetic portion 1621 also serves to disperse magnetic fluxes in the magnet 1420 on the magnetic flux acting surfaces thereof including the second magnetic flux acting surface 1421*c*, thereby minimizing the magnetic saturation to enhance the resistance to demagnetization of the magnet 1420. In other words, the magnet magnetic flux is prevented from circulating in a loop near each of the q-axes in the rotor core 1610. The state of magnetic saturation in the rotor core 1610 is, thus, desirably controllable using the second magnetic flux acting surface 1421*c*.

In the structure illustrated in FIG. 149, a total dimension of stator-facing peripheral surfaces (i.e., the magnetic flux acting surfaces 1421*a*) of the paired magnets 1420 creating one magnetic pole corresponds to the dimension Wm of a portion of the magnet unit which creates one magnetic pole in the circumferential direction. Specifically, the dimension Wm of a portion of the magnet unit which creates one magnetic pole in the circumferential direction is equivalent to the sum of the dimension Wm/of the left magnetic flux acting surface 1421*a* and the dimension Wm2 of the right magnetic flux acting surface 1421*a*. The magnetic flux acting surface 1421*a* excludes a portion of the stator-facing peripheral surface of each of the magnets 1420 which faces the flux barrier.

A supplementary explanation of beneficial advantages offered by the dispersion of magnetic fluxes will be made below. Usually, in an inner rotor, the magnetic flux flowing from a stator hardly reaches a portion of a rotor core which is located radially inside a magnet mounted in the rotor core, so that the magnetic flux, as generated by the magnet, mainly occupies the portion of the rotor core located inside the magnet. Accordingly, the volume of a portion of the rotor core located radially inside the magnet is designed to admit a required amount of magnetic flux generated by the magnet. The structure in this embodiment is, however, designed to have a portion of the rotor core 1610 around the q-axis as a path through which the magnetic flux, as having passed through the second magnetic flux acting surface 1421*c* of the magnet 1420, travels. The achieves desired dispersion of the magnetic fluxes in the rotor core 1610. The second magnetic flux acting surface 1421*c* contributes to decrease in amount of iron in a back side of the rotor 1600 to reduce the size of the rotor 1600 or reduction in magnetic saturation of the rotor 1600.

The q-axis side end of each of the magnets 1420 illustrated in FIG. 149 has the magnetic flux non-acting surface 1422 which is inwardly curved or arc-shaped and along which the magnetic orientation is provided. The magnet magnetic path is created along the arc-shape of the q-axis side end of the magnet 1420 between the magnetic flux acting surfaces 1421*a* and 1421*c*. This enables the volume of the magnets 1420 to be minimized and enhances the resistance to demagnetization of the rotor core 1610.

The rotor core 1610 illustrated in FIG. 149 has right and left flux barriers 1623 arranged closer to the d-axis than the magnets 1420 are which are disposed adjacent each other on the opposite sides of the d-axis. The center core rib 1624 is disposed on the d-axis between the flux barriers 1623. The center core rib 1624 serves to mechanically reinforce of a portion of the rotor core 1610 around the d-axis.

Eleventh Embodiment

This embodiment relates to a modified form of the structure of permanent magnets in the rotor 1600. FIG. 150 illustrates the structure of the rotor 1600 in this embodiment. The rotor core 1610 has formed therein the magnet housing holes 1611 in which the magnets 1430 are mounted. Each of the magnet housing holes 1611 and the magnets 1430 are oriented to straight extend in a direction perpendicular to the d-axis. Specifically, each of the magnets 1430 extends over the d-axis in a direction perpendicular to the d-axis.

The magnet 1430 has an outer surface and an inner surface which are opposed to each other in the radial direction of the rotor 1600 and work as the first magnetic flux acting surfaces 1431*a* and 1431*b* into or from which the magnetic flux is inputted or outputted. The magnet 1430 also has q-axis side ends working as the second magnetic flux acting surfaces 1431*c* into or from which the magnetic flux is inputted or outputted. Specifically, the magnet 1430 has magnetic orientations of curved shapes bulging radially inwardly around portions thereof located close to the q-axes. The magnet 1430, therefore, has magnetic flux acting surfaces (i.e., the second magnetic flux acting surfaces 1431*c*) on the q-axis side ends thereof facing the q-axes. In this structure, magnet magnetic paths are created which extend from the second magnetic flux acting surfaces 1431*c* to the first magnetic flux acting surface 1431*a* or vice versa. The length of the magnet magnetic paths, that is, a minimum distance between the second magnetic flux acting surface 1431*c* and the first magnetic flux acting surface 1431*a* facing the stator is larger than a physical thickness of the magnet 1420, in other words, larger than a minimum distance between the first magnetic flux acting surfaces 1431*a* and 143 lb.

The magnet 1430 has the second magnetic flux acting surfaces 1431*c* on the q-axis side ends thereof, thereby facilitating the ease with which magnetic fluxes flows through the q-axis side portion 1625 of the rotor core 1610. The magnet 1430, therefore, has a high permeance on the q-axis side ends thereof. The magnet 1430 also has the magnetic flux non-acting surface 1432 that are portions of the q-axis side ends between the first magnetic flux acting surface 1421*a* and the second magnetic flux acting surfaces 1421*c*. The magnetic flux non-acting surface 1432 are surfaces of the magnet 1430 into and from which no magnetic flux is inputted or outputted. The magnetic flux non-acting surfaces 1432 are defined by inwardly curved or arc-shaped portions of surfaces of the q-axis side ends of the magnet 1430 and extend substantially in directions of magnetic orientations of the magnet 1430. An interval between each of the magnetic flux non-acting surfaces 1432 and the rotor core 1610 (i.e., the inner wall of the magnet housing hole 1611) defines the non-magnetic portion 1626 (i.e., a void space) where there is no magnet in the magnet housing hole 1611). The non-magnetic portions 1626 lie outside the q-axis side ends of the magnet 1430, thereby facilitating concentration of flows of magnetic flux in the q-axis side portions 1625 of the rotor core 1610.

In the structure illustrated in FIG. 150, a dimension of stator-facing peripheral surface (i.e., the magnetic flux acting surface 1431*a*) of the magnet 1430 creating one magnetic pole corresponds to the dimension Wm of a portion of the magnet unit which creates one magnetic pole in the circumferential direction. The magnetic flux acting surface 1431*a* excludes portions of the stator-facing peripheral surface of the magnet 1430 which face the non-magnetic portions 1626.

In a case where the magnet 1410, 1420, or 1430 illustrated in FIG. 147, 149, or 150 has the second magnetic flux acting surface(s), the shape of the magnet 1410, 1420, or 1430 is optional. In other words, they offer desired beneficial advantages regardless of the shape thereof.

The magnetic orientation of a portion of the magnet 1430 around the d-axis is different in direction from those in the q-axis side ends thereof. Specifically, the magnetic orientation at locations close to the d-axis is parallel to the d-axis, thereby minimizing the demagnetization of a d-axis portion of the magnet 1430 which results from a component of the magnetic orientation which is perpendicular to the d-axis.

In the structure illustrated in FIG. 150, the magnet 1430 extends perpendicular to the d-axis, thereby resulting in a decrease in resistance value of the magnetic resistor R1 illustrated in FIG. 177. This results in a decreased volume of the magnet 1430 as compared with a case where the magnets 1403 are arranged in a V-shape. The structure of the rotor 1600 is useful in, for example, motor generators joined directly to an engine shaft in vehicle. This is because when the rotor 1600 is used in a motor generator of a motor generator system designed to reduce the speed of rotation of the motor generator through a speed reducer to output from an output shaft the same degree of torque as an engine, the mechanical strength of the rotor 1600 is insufficient to withstand a centrifugal force acting thereon. This is the reason why the rotor 1600 in FIG. 150 does not have the core rib 1624 which lies, as illustrated in FIG. 149, on the d-axis and works as a strength reinforcement.

A motor generator used in a system with no speed reducer usually operates at speeds equivalent to 0 to 9000 rpm engine speed, thereby eliminating the need for the core rib 1624 lying on the d-axis. The rotor 1600 in this embodiment is capable of increasing a degree of output torque per unit volume of the magnet 1430 by an amount of magnetic flux corresponding to a portion of the rotor core 1610 around the d-axis illustrated in FIG. 149.

The core rib 1624 on the d-axis serves to reinforce the rotor core 1610, but is thought of as creating a magnetic path through which the magnetic flux, as produced by the magnets 1420, flows in a closed loop within the rotor 1600. The structure illustrated in FIG. 150 is, therefore, useful in electrical motors which rotate at speeds in an engine speed range or small-sized electrical motor whose outer diameter is less than 100 mm and on which a low centrifugal force acts.

FIG. 151 illustrates the magnet 1433 whose structure is a modification of that of the magnet 1430. The magnet 1433 is made of an assembly of a plurality of magnets: the center magnet 1434*a* and the side magnets 1434*b* and 1434*c*. The center magnet 1434*a* extends across the d-axis. The side magnets 1434*b* and 1434*c* are attached to opposite ends of the center magnet 1434*a*. The center magnet 1434*a* is rectangular in transverse cross section. Each of the side magnets 1434*b* and 1434*c* is shaped to have a cut-out corner close both to the outer periphery of the rotor core 1610 and to the q-axis. The magnet 1433 has the same direction of magnetic orientation and the same magnetic flux acting surfaces as those of the magnet 1430 illustrated in FIG. 150.

The magnet 1433 in FIG. 151, like the above structure, has a high permeance in q-axis side ends thereof and minimizes the demagnetization of the central portion of the magnet 1433 due to concentration of magnetic fluxes flowing from either side thereof.

Twelfth Embodiment

The magnet 1440 or 1450 illustrated in FIG. 152(*a*) or 152(*b*) may be employed in the rotor 1600 illustrated in FIG. 136. Specifically, the rotor 1600 has mounted therein the magnets 1440 or 1450 instead of the magnets 1400. Every two of the magnets 1440 or 1450 are arranged on the opposite sides of a respective one of the d-axes to be line-symmetric with respect to the d-axis. In use of permanent magnets, an interval between outer and inner magnetic acting surfaces of the magnet is reset as needed.

The magnet 1440 illustrated in FIG. 152(*a*) has an outer surface and an inner surface which are opposed to each other in the radial direction of the rotor 1600 and serve as the first magnetic flux acting surfaces 1441*a* and 1441*b*. The magnet 1440 also has a left end surface (i.e., q-axis side end) serving as the second magnetic flux acting surface 1441*c*. Specifically, only a portion of the left end surface of the magnet 1440 is used as the second magnetic flux acting surface 1441*c*. The rest of the left end surface serves as a magnetic flux non-acting surface.

The magnet 1450 illustrated in FIG. 152(*b*) has an outer surface and an inner surface which are opposed to each other in the radial direction of the rotor 1600 and serve as the first magnetic flux acting surfaces 1451*a* and 1451*b*. The magnet 1450 also has a left end surface (i.e., the q-axis side end) serving as the second magnetic flux acting surface 1451*c*. Specifically, only a portion of the left end surface of the magnet 1450 is used as the second magnetic flux acting surface 1451c. The rest of the left end surface serves as a magnetic flux non-acting surface.

In the structure illustrated in FIG. 152(a) or 152(b), a total dimension of stator-facing peripheral surfaces (i.e., the first magnetic flux acting surfaces 1441a or 1451a) of the magnets 1440 or 1450 which create one magnetic pole corresponds to the dimension Wm of a portion of the magnet unit which creates one magnetic pole in the circumferential direction.

The magnets 1440 and 1450 have magnetic orientations whose directions are indicated by curved arrows in FIGS. 152(a) and 152(b). The magnets 1440 or 1450 are mounted in the magnet housing holes 1611 arranged on the opposite sides of the d-axis in the rotor core 1610 with the second magnetic flux acting surface 1441c or 1451c facing the q-axis.

Each of the magnets 1440 and 1450 has a physical thickness, i.e., a minimum distance between the first magnetic flux acting surfaces 1441a and 1441b or between the first magnetic flux acting surfaces 1451a and 1451b. The magnets 1440 and 145 are different in physical thickness from each other. Specifically, the physical thickness of the magnet 1440 is smaller than that of the magnet 1450. The magnets 1440 and 1450 are different in curvature of the magnetic orientation (i.e., radius of a circle (which will be referred to as an orientation circle) defined to extend along the direction of the magnetic orientation) from each other. The magnet 1440 is smaller in radius of curvature of the magnetic orientation than the magnet 1450. The orientation ratio in each of the magnets 1440 and 1450 is improved by selecting the radius of curvature of the above orientation circle. The magnet 1440 which is smaller in radius of curvature of the orientation circle than the magnet 1450 is magnetically oriented using, for example, the orientation field 1322 illustrated in FIG. 146(b).

The orientation field in a neodymium magnet is known to be on the order of 2 T. An iron-based core whose saturation magnetic flux density is on the order of 2 T is, therefore, thought of as being difficult to have a sharp change in radius of curvature of the orientation circle. The orientation field generated in the way, as already described with reference to FIGS. 146(a) and 146(b), is therefore considered to create a minimum possible radius of curvature of the orientation circle.

The orientation field 1302 created by the elongated turned coil 1301a which has an elongated length and turned in the way illustrated in FIG. 142(a) is usually considered to increase the curvature of the magnetic orientation in a magnet. The orientation field 1302 illustrated in FIG. 142(a) is easily kept at 2 T or higher within an axial length of the coil 1301a as compared with the orientation field 1322 developed by a small number of conductors described with reference to FIGS. 146(a) and 146(b). The magnetic orientation generated in the way described in FIG. 142(a) is, therefore, suitable to achieve a high orientation ratio.

The directions of magnetic orientations of the magnets 1440 and 1450 will be supplementarily described with reference to FIGS. 153(a) and 153(b). FIG. 153(a) demonstrates the orientation circle 1332 denoted by a chain line which defines a direction of magnetic orientation of the magnet 1440. This is commonly called polar anisotropy orientation. The orientation circle 1332 is defined around the center point 1331 on the q-axis in an air gap space between the outer periphery of a rotor and the inner periphery of a stator. The density of magnetic flux on air gap facing surfaces of the rotor and the stator which transmit the magnetic flux therebetween is controlled to have a sine wave form by setting the direction of magnetic orientation of the magnet 1440 along the orientation circle 1332.

FIG. 153(b) demonstrates the orientation circle 1334 denoted by a chain line which defines a direction of magnetic orientation of the magnet 1450. The orientation circle 1334 has the center point 1333 which is located away from the q-axis toward an adjacent magnetic pole and also away from the air gap space to the stator. This layout of the orientation circle 1334 enhances the orientation ratio.

It is preferable that the magnet 1440 in which the orientation circle 1332 having a small radius of curvature is magnetically oriented by the orientation field 1322 illustrated in FIG. 146(b). It is difficult for the magnetic orientating methods illustrated in FIGS. 146(a) and 146(b) to increase the number of conductors to achieve a high orientation ratio as compared with in FIG. 142(a). It is, therefore, advisable that the orientation circle be defined, like in the FIG. 153(b), to have a large radius of curvature to achieve a high orientation field in the way illustrated in FIG. 142(a).

In the structure illustrated in FIG. 153(a) or 153(b), a total dimension of stator-facing peripheral surfaces (i.e., Wm1+Wm2) of the magnets 1440 or 1450 which create one magnetic pole corresponds to the dimension Wm of a portion of the magnet unit which creates one magnetic pole in the circumferential direction. Note that the dimension Wm does not depend on the thickness of the magnets 1440.

Thirteenth Embodiment

A magnetizing device used in a magnetizing process for a permanent magnet in the thirteenth embodiment will be described below. In the magnetizing process, after magnetically oriented and sintered, the magnet is magnetized by the magnetizing device. The magnetizing device in this embodiment is suitable for producing a magnet equipped with a magnet magnetic path formed in an arc-shaped between opposed magnetic flux acting surfaces of the magnet. For instance, the magnetizing device in this embodiment may be used to manufacture the magnet 1404 in FIG. 140, the magnet 1420 in FIG. 149, the magnet 1430 in FIG. 150, the side magnets 1434b and 1434c in FIG. 151, and the magnets 1440 and 1450 in FIGS. 152(a) and 152(b). The magnetization is executed after the orientation process described with reference to FIGS. 144(a) to 146(b). FIGS. 154(a), 154(b), and 155 illustrate transverse sections of cylindrical magnetizing devices which extend perpendicular to the axial direction of the magnetizing devices.

The magnetizing device 1340, as illustrated in FIG. 154(a), includes the inner magnetizing core 1341 and the outer magnetizing core 1342. The inner magnetizing core 1341 has a cylindrical transverse section. The outer magnetizing core 1342 is of an annular shape and disposed outside an outer periphery of the inner magnetizing core 1341. The inner magnetizing core 1341 will also be referred to as a second magnetizing core. The outer magnetizing core 1342 will also be referred to as a first magnetizing core. An air gap is created between the outer periphery of the inner magnetizing core 1341 and the inner periphery of the outer magnetizing core 1342 and used as a magnet insertion space 1343. The inner and outer magnetizing cores 1341 and 1342 are arranged at a given interval away from each other and face each other. The inner and outer magnetizing cores 1341 and 1342 are each made from soft magnetic material whose saturation magnetic flux density Bs is about 2 T.

The inner magnetizing core 1341 has a plurality of slots 1344 formed in the outer peripheral surface thereof. The slots 1344 are designed as conductor housings and have openings facing the inner peripheral surface of the outer magnetizing core 1342. The slots 1334 are arranged at a given interval away from each other in the circumferential direction of the inner magnetizing core 1341. The magnetizing coils (i.e., magnetizing conductors) 1345 are disposed one in each of the slots 1344. For instance, the inner magnetizing core 1341 may have the magnetizing coils 1345 mounted in the adjacent slots 1344 (which will also be referred to as retainers). Directions in which electrical currents flow through the magnetizing coils 1345 disposed in the adjacent slots 1344 are opposite each other.

In the structure illustrated in FIG. 154(*a*), the inner magnetizing core 1341 has the six slots or retainers 1344. The magnetizing coils 1345 are disposed one in each of the retainers 1344. The single magnetizing coil 1345 may be wound to pass through all of the retainers 1344.

In the magnetizing process, the magnet MG10 that is a target to be magnetized is placed at a given location within the magnet insertion space 1343. The magnetizing coils 1345 are then excited by an exciting device to magnetize the magnet MG10. Upon the excitation of each of the magnetizing coils 1345, the magnetizing field 1346 is created in the magnet insertion space 1343. The line of the magnetizing field 1346 extends around the magnetizing coil 1345 in each of the slots 1344 and crosses both the inner magnetizing core 1341 and the outer magnetizing core 1342. The magnet MG10 placed in the magnet insertion space 1342 is then magnetized by the magnetic flux in the magnetizing field 1346.

The outer magnetizing core 1342 has the thickness T1011 that is a minimum distance between the outer peripheral surface and the inner peripheral surface thereof. The outer magnetizing core 1342 serves as a magnetic flux inducing yoke (i.e., magnetizing yoke) to create a strong magnetic field in a given direction for magnet MG10 placed in the magnet insertion space 1343 when the magnetizing field is developed upon excitation of the magnetizing coils 1345. The outer magnetizing core 1342 is featured to have the thickness T1011 which is smaller than a pole pitch of the inner magnetizing core 1341 (i.e., a distance between the centers of the adjacent slots 1344 on a circle defined to extend on the outer peripheral surface of the inner magnetizing core 1341 or a width of a portion of the core 1341 between the adjacent slots 1344). This causes the magnetizing field 1346 not to reach the outer magnetizing core 1342, thereby creating lines of magnetic flux which extend from a given point on the air gap surface to be coaxial with each other. In other words, the outer magnetizing core 1342 is subjected to magnetic saturation earlier in the radial direction than in the circumferential direction thereof, thereby generating the arc-shaped magnetizing field 346 whose curvature is relatively large within the magnet insertion space 1343.

It is advisable that the radial thickness T1011 of the outer magnetizing core 1342 be selected to be smaller than one-half (½) of the pole pitch of the inner magnetizing core 1341, and that the magnetizing coils 1345 is excited by electrical current high enough to cause the outer magnetizing core 1342 to be magnetically saturated.

The above way facilitates desired magnetization of a magnet magnetically oriented, like in FIG. 152(*a*), that is, the magnet 1440 in which the radius of curvature of the orientation circle is relatively small, thereby achieving a magnetizing percentage of 97% or more.

The magnetizing device 1340 may alternatively be designed, as illustrated in FIG. 154(*b*), not to have the inner magnetizing core 1341 and the slots, but to have the magnetizing coils 1345 facing the outer magnetizing core 1342. When the magnetizing coils 1345 is excited, it produces the magnetizing fields 1346. The inner magnetizing core 1341 may be made from a non-magnetic material as a coil retainer.

In summary, a magnetizing core (i.e., the outer magnetizing core 1342) having a given thickness is used to produce a magnetizing field upon excitation of a conductor (i.e., the magnetizing coils 1345) arranged on one side of the thickness of the magnetizing core along with the magnet MG10, thereby creating an arc-shaped magnet magnetic path extending between opposed surfaces of the magnet MG10. The conductor (i.e., the magnetizing coils 1345) is arranged away from the magnetizing core (i.e., the outer magnetizing core 1342). The magnet MG10 is located away from the circumferential center of the conductor, but closer to the magnetizing core than the conductor is.

The magnetizing device 1350, as illustrated in FIG. 155, has a modification of the structure of the magnetizing device 1340 illustrated in FIG. 154(*a*). Specifically, the cylindrical magnetizing device 1350 includes the inner magnetizing core 1351 and the outer magnetizing core 1352. The inner magnetizing core 1351 has a cylindrical transverse section. The outer magnetizing core 1352 is of an annular shape and disposed outside an outer periphery of the inner magnetizing core 1351. The inner magnetizing core 1351 will also be referred to as a second magnetizing core. The outer magnetizing core 1352 will also be referred to as a first magnetizing core. An air gap is created between the outer periphery of the inner magnetizing core 1351 and the inner periphery of the outer magnetizing core 1352 and used as a magnet insertion space 1353. The inner and outer magnetizing cores 1351 and 1352 are each made from soft magnetic material whose saturation magnetic flux density Bs is about 2 T. The inner magnetizing core 1351 has a plurality of slots 1354 formed in the outer peripheral surface thereof. The slots 1354 are designed as conductor housings and arranged at a given interval away from each other in the circumferential direction of the inner magnetizing core 1351. The magnetizing coils (i.e., magnetizing conductors) 1355 are disposed one in each of the slots 1354. Directions in which electrical currents flow through the magnetizing coils 1355 disposed in the adjacent slots 1354 are opposite each other.

In the structure illustrated in FIG. 155, the inner magnetizing core 1351 has the six slots or retainers 1354. The magnetizing coils 1355 are disposed one in each of the retainers 1354. The single magnetizing coil 1355 may be wound to pass through all of the retainers 1354.

In the magnetizing process, the magnet MG10 that is a target to be magnetized is placed at a given location within the magnet insertion space 1353. The magnetizing coils 1355 are then excited by an exciting device (see FIG. 154(*a*)) to magnetize the magnet MG10. Upon the excitation of each of the magnetizing coils 1355, the magnetizing field 1356 is created in the magnet insertion space 1353. The line of the magnetizing field 1356 extends around the magnetizing coil 1355 in each of the slots 1354 and crosses both the inner magnetizing core 1351 and the outer magnetizing core 1352. The magnet MG10 placed in the magnet insertion space 1352 is then magnetized by the magnetic flux in the magnetizing field 1356.

The outer magnetizing core 1352 serves as a magnetic flux inducing yoke (i.e., magnetizing yoke) to create a strong magnetic field in a given direction for magnet MG10 placed in the magnet insertion space 1353 when the magnetizing field is developed upon excitation of the magnetizing coils 1355. The outer magnetizing core 1352 is featured to have the thickness T1012 that is a minimum distance between the inner peripheral surface and the outer peripheral surface thereof. The thickness T1012 of the outer magnetizing core 1353 is selected to be larger than a pole pitch of the inner magnetizing core 1351 (i.e., a distance between the centers of the adjacent slots 1354 on a circle defined to extend on the outer peripheral surface of the inner magnetizing core 1351 or a width of a portion of the core 1351 between the adjacent slots 1354). Such selection of the thickness T1012 eliminates a risk that the outer magnetizing core 1352 may be magnetically saturated in response to application of a strong magnetic field higher than 2 T to the magnet insertion space 1353. This enables the outer magnetizing core 1352 to create the magnetic field 1356 whose line has a small radius of curvature.

The above way facilitates desired magnetization of a magnet magnetically oriented, like in FIG. 152(*b*), that is, the magnet 1450 in which the radius of curvature of the orientation circle is relatively large, thereby achieving a magnetizing percentage of 97% or more.

The magnetizing device 1350 illustrated in FIG. 155 may alternatively be designed not to have the inner magnetizing core 1351 and the slots 1354, but to have the magnetizing coils 1355 facing the outer magnetizing core 1352. When the magnetizing coils 1355 is excited, it produces the magnetizing fields 1356. The inner magnetizing core 1351 may be made from a non-magnetic material as a coil retainer. In summary, a magnetizing core (i.e., the outer magnetizing core 1352) having a given thickness is used to produce a magnetizing field upon excitation of a conductor (i.e., the magnetizing coils 1355) arranged on one side of the thickness of the magnetizing core along with the magnet MG10, thereby creating an arc-shaped magnet magnetic path extending between opposed surfaces of the magnet MG10.

It is advisable that the above described magnetizing process be performed at ambient temperatures. This results in a decreased degree of coercivity of a magnet to be magnetized, thereby facilitating the magnetization of the magnet.

In a magnet production process using the magnetizing device 1340 or 1350, prior to the magnetizing process, an additional process may be performed which assembles magnets into a selected configuration that will have the N-pole and S-pole alternate after the magnetizing process.

The magnetizing device 1340 or 1350 illustrated in FIGS. 154(*a*), 154(*b*) or FIG. 155 have the plurality of slots 1344 or 1355 arranged at a given pitch away from each other in a circle in the circular inner magnetizing core 1341 or 1351, but however, may alternatively be designed to have the slots 1344 or 1354 arranged linearly at a given interval away from each other. Specifically, each of the magnetizing devices 1340 and 1350 may be configured to have a first magnetizing core and a second magnetizing core which have linear surfaces facing each other. The second magnetizing core has formed therein a plurality of slots which are arranged at a given interval away from each other and in which magnetizing coils are mounted. An air gap between the first and second magnetizing cores is used as a magnet insertion space in which magnet blocks to be magnetized are disposed.

In the above case, the magnetizing device designed to magnetize and produce the magnets 1440 in which the radius of curvature of the orientation circle is relatively small and the magnetizing device designed to magnetize and produce the magnets 1450 in which the radius of curvature of the orientation circle is relatively large are different in thickness (i.e., a dimension in a direction in which the surfaces of the first and second magnetizing cores face each other) between the magnetizing cores (i.e., the first magnetizing cores) thereof in which no magnetizing coils are mounted. Specifically, the first magnetizing core of the magnetizing device designed to magnetize and produce the magnet 1440 has a thickness smaller than a pitch or interval between the magnetizing coils, while the first magnetizing core of the magnetizing device designed to magnetize and produce the magnet 1450 has a thickness larger than a pitch or interval between the magnetizing coils.

Fourteenth Embodiment

The rotor 1600 in the fourteenth embodiment will be described below. The rotor core 1610, as clearly illustrated in FIG. 156, has formed therein the magnet housing holes 1611 each of which extends in an arc-shape across the d-axis. Each of the magnet housing holes 1611 has the magnet 1460 mounted therein. Each of the magnet housing hole 1611 and the magnet 1460 has an arc-shaped transverse section to have a distance between the outer periphery of the rotor core 1610 and the magnet 1460 which gradually increases from the q-axis to the d-axis. In other words, the magnet 1460 is curved in a convex shape bulging radially inwardly so that it is located farthest from the outer periphery of the rotor core 1610 on the d-axis and has an interval between itself and the outer periphery of the rotor core 1610 which increases from the d-axis to the q-axis. Each of the magnet housing hole 1611 and the magnet 1460 is shaped to be line-symmetrical with respect to the d-axis.

The magnet 1460 has an outer surface and an inner surface which are opposed to each other in the radial direction of the rotor core 1610 and serve as the magnetic flux acting surfaces 1461*a* and 1461*b* into or from which the magnetic flux is inputted or outputted. The magnetic flux acting surfaces 1461*a* and 1461*b* are of an arc-shape around the d-axis. In the structure illustrated in FIG. 156, a length of the magnetic flux acting surface 1461*a* of the magnet 1460 creating one magnetic pole corresponds to the dimension Wm of a portion of the magnet unit which creates one magnetic pole in the circumferential direction.

The magnet 1460 has the near d-axis region 1462*a* extending across the d-axis and the outside regions 1462*b* located on opposite sides of the near d-axis region 1462*a*. The near d-axis region 1462*a* and each of outside regions 1462*b* have magnetic orientations which are different in direction from each other. Specifically, the direction of magnetic orientation in the near d-axis region 1462*a* is parallel to the d-axis, while the direction of magnetic orientation in each of the outside regions 1462*b* is oblique toward the d-axis and approaches the d-axis around the outer periphery of the rotor core 1610.

The near d-axis region 1462*a* is defined to extend from the d-axis in opposite circumferential directions over a given angle. Specifically, the near d-axis region 1462*a* extends by an angle θc around the center of the rotor core 1610 through which the d-axis passes. The angle θc is preferably selected to be 32.7 degrees in electrical angle. In a case where a rotating electrical machine includes the stator 1700 which is equipped with the three-phase distributed stator winding 1720 and has 48 slots for 8 poles, that is, 6 slots for each pole, each magnetic pole occupies the 6 slots, in other words, each pole pair occupies the 12 slots, thus generating the $11^{th}$ to $13^{th}$ harmonic. The $11^{th}$ harmonic is, however, eliminated by defining the near d-axis region 1462*a* to occupy 32.7 degrees in electrical angle (i.e., 360° divided by 11 (order)) and using a back electromotive force generated by the magnet 1460 and the stator winding 1720.

Defining the near d-axis region 1462a to occupy more than 32.7 degrees in electrical angle will result in an increased amplitude of harmonics due to an increased amount of magnetic flux. In contrast, defining the near d-axis region 1462a to occupy 32.7 degrees or less in electrical angle will result in a decrease in amount of magnetic flux to be smaller than that when the near d-axis region 1462a occupies more than 32.7 degrees in electrical angle, thus resulting in a decreased amplitude of harmonics.

The angular range (i.e., angle θc) of the near d-axis region 1462a may be selected to be 32.7 degrees or less in electrical angle or 1.0 degree or more in electrical angle. For instance, the angular range may be set to 27.7 degrees in electrical angle (i.e., 360° divided by 13 (order)), thereby eliminating the 13$^{th}$ harmonic. The angular range (i.e., angle θc) of the near d-axis region 1462a may alternatively be selected to be 32.7 degrees or less in electrical angle or 27.7 degrees or more in electrical angle.

Fifteenth Embodiment

The control of energization of the rotating electrical machine 1500 will be described below. First, control of space vectors in this embodiment will be discussed with reference to FIG. 157 demonstrating voltage vectors. In FIG. 157, a magnet magnetic flux Ψ is expressed on the d-axis. A q-axis current Iq is expressed on the q-axis which causes torque to be produced according to Fleming's rule upon application of the magnet magnetic flux Ψ and is oriented perpendicular to the d-axis in electrical angle. FIG. 158 illustrates a portion of the rotor 1600 for each pole. In the structure illustrated in FIG. 158, the rotor core 1610 has two magnets 1470 arranged in a V-shape. The magnets 1470 may alternatively be oriented linearly in a direction perpendicular to the d-axis. Each of the magnets 1470, like the magnets 1410 in FIG. 147, the magnets 1420 in FIG. 149, the magnet 1430 in FIG. 150, the magnet 1433 in FIG. 151, or the magnet 1440 or 1450 in FIG. 152(a) or 152(b), has an outer surface and an inner surface which are opposed to each other in the radius direction of the rotor 1600 and serve as magnetic flux acting surfaces (i.e., the first magnetic flux acting surfaces 1471a and 1471b) into or from which the magnetic flux is inputted or outputted. Each of the magnets 1470 also has a magnetic flux acting surface (i.e., the second magnetic flux acting surface 1471c) which faces the q-axis and into or from which the magnetic flux is inputted or outputted.

When a portion of the rotor core 1610 lying on the d-axis intermediate between the magnets 1470 is at the N-pole, and when a flow of electrical current is, as demonstrated in FIG. 158, applied to the conductor 1721 of the stator winding 1720 in a direction out of the drawing, it will cause the magnetic field Φa perpendicular to the d-axis to be delivered to the rotor 1600, so that the rotor 1600 rotates in the counterclockwise direction.

FIG. 159(a) illustrates the magnetic fields Φb and Φc running around the q-axes. The magnetic fields Φb and Φc cause the portions 1628 of the rotor core 1610 which are located close both to the outer periphery of the rotor core 1610 and to the q-axes to be magnetically saturated. Such a state is illustrated in FIG. 160. In FIG. 160, if a current phase is defined as β in relation to magnet magnetic flux Ψ, a magnetic field arising from the d-axis current Id (i.e., the d-axis current Id in a negative direction) occurs to induce the magnetic saturation when the current phase β lies in a range of 90° to 270°.

The second magnetic flux acting surface 1471c is placed closer to the outer periphery of the rotor core 1610 than the first magnetic flux acting surface 1471a and 1471b are and faces a magnetic saturation region. In FIG. 159(a), a magnetic circuit passing through the second magnetic flux acting surface 1471c has a resistance value which is changed by controlling the magnetic saturation. The magnetic saturation region, therefore, works as a variable resistor R3 in an equivalent circuit, as illustrated in FIG. 159(b). The magnet magnetic flux passing through the second magnetic flux acting surface 1471c, therefore, works as a variable magnetic flux which is changed by changing a magnetic resistance of the variable resistor R3. This is considered synonymous with the fact that the permeance of a magnet is changed, meaning that the magnet works as an electromagnet.

The field weakening control is enabled to be executed using the magnetic flux of Ld·Id on the q-axis by making the magnetic saturation region on the q-axis work as the variable resistor R3, thereby increasing a speed range of the rotating electrical machine operating in the motor mode. It is also possible to expand a control range to increase the speed range in the motor mode. FIG. 160 represents the magnet magnetic flux Ψ on the q-axis which is usually generated in an interior permanent magnet and the magnetic flux of Ld·Id illustrated as being offset from the magnet magnetic flux Ψ for the sake of visibility. The above control is performed by the inverter 1900 (see FIG. 161(a)) equipped with a controller for an excitation current phase and the controller 1930 (see FIG. 162).

The above control with the stator winding 1720 whose number of turns decreased by a reciprocal of an increase in the above described magnet magnetic flux Ψ will cause the current controllability at increased speeds to be improved by a drop in an electrical time constant.

The inverter 1900 will be described below with reference to FIG. 161(a) illustrating the outline of a rotating electrical machine drive system. The inverter 1900 includes the inverter bridge 1910 which works as electrical power controller and is equipped with an upper arm and a low arm each of which includes as many switches as phases of a phase winding. Specifically, the inverter 1900 turns on or off the switches Sp of the upper arm or the switches Sn of the lower arm of the inverter bridge 1910 to control an amount of current applied to each phase of the stator winding 1720. The inverter bridge 1910 has the dc (direct current) power supply 1950 and the smoothing capacitor 1955 connected in parallel thereto. The dc current supply 1950 is made of a battery unit including a plurality of cells connected in series with each other.

The controller 1930 is made of a microcomputer equipped with a CPU and memories and analyzes information about measured parameters associated with the rotating electrical machine 1500 and a demand for the motor mode or the generator mode of operation of the rotating electrical machine 1500 to turn on or off the switches Sp or Sn of the inverter 1900 for control the current supplied to each phase of the stator winding 1720. The measured parameters representing operations of the rotating electrical machine 1500 include an angular position of the rotor 1600, as measured by the above described angular position sensor (i.e., the resolver rotor 1602 and the resolver stator 1603), the voltage measured by the above described voltage sensor, and each phase current measured by the above described current sensor.

The use of the angular position sensor made of the resolver enables the operation of the rotating electrical machine 1500 to be controlled in an increased control range at high temperatures and with high precision.

The inverter bridge 1910 is equipped with series-connected units each made up of the upper arm switch Sp and the lower arm switch Sn for each of three phase windings: a U-phase winging, a V-phase winding, and a W-phase winding of the stator winding 1720. The upper arm switches Sp have high-potential terminals connected to the positive terminal 1911 of the dc power supply 1950. The lower arm switches Sn each have low-potential terminals connected to the negative terminal 1921 of the dc power supply 1950. The U-phase winging, the V-phase winding, and the W-phase winding of the stator winding 1720 have first ends connected to joints of the upper arm switches Sp and the lower arm switches Sn. The U-phase winging, the V-phase winding, and the W-phase winding are star-connected together and have second ends connected to a neutral point. The controller 1930 outputs an operation signal to each of the switches Sp and Sn of the inverter bridge 1910. More specifically, the controller 1930 compares a level of a command voltage for each phase winding with a level of a cyclic carrier wave, such as a triangular wave, in each cycle of the carrier wave in the inverter bridge 1910 to produce and output a pulse-width modulation (PWM) signal for turning on or off the switches Sp and Sn to control the amount of current delivered to the U-phase winging, the V-phase winding, and the W-phase winding.

The phase excitation of the stator winding 1720 is controlled by the operations of the switches Sp and Sn to create a flow of each phase current (i.e., current generating the q-axis current Iq) having a first phase which develops a magnetic flux perpendicular to the d-axis and also to create a flow of each phase current (i.e., current generating the d-axis current Id) having a second phase different from the first phase. This causes the d-axis current Id to variably control the magnetic saturation in the portion 1628 of the rotor core 1610 near the q-axis, as illustrated in FIG. 159(*a*), in which a magnet magnetic path passes through the second magnetic flux acting surface 1471*c*. The d-axis current Id may be developed by the so-called phase advance control to generate a magnetic flux to variably control the magnetic saturation and the magnetic non-saturation in the rotor core 1610.

The controller 1930 may be engineered to control a first electrical current of a phase which generates a magnetic flux perpendicular to the d-axis (see FIG. 158) and a second electrical current different in phase from the first electrical current (see FIG. 159(*b*)) to variably control the magnetic saturation and the magnetic non-saturation of a portion of the stator core 1610 between the second magnetic flux acting surface 1471*c* in each pole pair. For instance, the controller 1930 may variably control the magnetic saturation and the magnetic non-saturation using a torque command for or the speed of rotation of the rotating electrical machine 1500.

For instance, when the rotating electrical machine 1500 is in a low-torque and high-speed range, the controller 1930 achieves the magnetic saturation. When the rotating electrical machine 1500 is in ranges different from above, the controller 1930 achieves the magnetic non-saturation. More specifically, a torque characteristic shown in FIG. 161(*b*) is prepared in which a control switching line A1 is defined. When the rotating electrical machine 1500 falls in a high-speed range A2 which is higher in speed than the control switching line A1, the controller 1930 achieves the magnetic non-saturation.

It is advisable that the phase (i.e., second phase) of the d-axis current Id be advanced earlier than the phase of the q-axis current Iq (i.e., first phase), and that a phase difference angle be lower than 50° or less.

FIG. 162 shows a control operation to control the phase current flowing in each of the U-phase winging, the V-phase winding, and the W-phase winding. The control operation will be described below.

The command current value determiner 1931 uses a toque-to-dq conversion map to determine a d-axis command current value and a q-axis command current value as a function of a command motor torque value or a command generator torque value for the rotating electrical machine 1500 and an electrical angular rate co derived by differentiating an electrical angle θ of rotation of the rotor 1600 with respect to time. The d-q converter 1932 works to convert a value of current (i.e., phase current) measured by each of current sensors provided one for each of three phase windings (i.e., the U-phase winging, the V-phase winding, and the W-phase winding) into d-axis current and q-axis current that are components in a two-dimensional Cartesian coordinate system with the d-axis defined on a line of magnetic field. Such an operation of the d-q converter 1932 is well known in the art, and explanation thereof in detail will be omitted here.

The feedback controller 1933 multiples a difference between the above d-axis current value and the d-axis command current value by a PI (Proportional Integral) gain to calculate a corrected command value, that is, an updated d-axis command voltage value required to bring the d-axis current into agreement with the d-axis command current value in a feedback mode. The q-axis current feedback controller 1934 works to multiply a difference between the above q-axis current value and the q-axis command current value by the PI gain to calculate a corrected command value, that is, an updated q-axis command voltage value required to bring the q-axis current into agreement with the q-axis command current value in the feedback mode.

The two phase-to-three phase converter 1935 works to convert the d-axis command voltage and the q-axis command voltage into command voltages for the U-phase winging, the V-phase winding, and the W-phase winding. The above circuits 1931 to 1935 constitute a feedback controller working to perform feedback control of a fundamental current using a dq transformation algorithm. The command values for the U-phase winging, the V-phase winding, and the W-phase winding are used as feedback control values.

The control signal generator 1936 uses a known triangular carrier comparison algorithm to produce an inverter control signal based on each of the three-phase command voltage. Specifically, the control signal generator 1936 compares a signal, as derived by standardizing the three-phase command voltage using a power supply voltage, with a carrier signal (i.e., carrier wave), such as a triangular wave signal in a PWM control mode to produce and output an on-off signal in the form of a duty signal for operating each of the upper arm and low arm switches Sp and Sn for a corresponding one of the U-phase winging, the V-phase winding, and the W-phase winding. The driver 1937 works to turn on or off the switches Sp and Sn in the inverter bridge 1910 in response to the on-off signal outputted from the control signal generator 1936.

The rotating electrical machine 1500 in this embodiment may be configured to use strong magnets and prepare the stator winding 1720 to have the number of turns equivalent to a multiple of a reciprocal of an increase in magnetic flux produced by the magnets, thus resulting in inductance being decreased to be lower than a given value. In this case, a current sensor which has a level of inductance required to compensate for the above decrease in inductance (i.e., a difference between the inductance and the given value) is preferably arranged between the inverter bridge 1910 and the stator winding 1720 illustrated in FIG. 161(*a*). In other words, this structure uses the current sensor that is a component of the current feedback circuit as an inductor.

In this embodiment, the frequency of the cyclic carrier wave, i.e., a carrier frequency for defining a switching frequency for the switches Sp and Sn in the inverter 1900 is set to be higher than 15 kHz. This causes the PMW control to be executed out of an audio-frequency range, thereby providing the rotating electrical machine drive system in which the noise of the carrier is not uncomfortable. The rotating electrical machine 1500 in this embodiment employs the above structure of the rotor 1600, thereby resulting in a decrease in inductance thereof as compared with conventional rotating electrical machines. This enables the rotating electrical machine 1500 to be controlled using an increased carrier frequency.

The rotating electrical machine 1500 in this embodiment is also designed to have a higher density of magnetic flux and a lower inductance as compared with conventional rotating electrical machines. The rotating electrical machine drive system equipped with the rotating electrical machine 1500 is designed to have a current control map offset to magnet torque (i.e., to Iq) from magnet torque.

The torque T produced by an interior permanent magnet type of rotating electrical machine is typically expressed according to an equation below as a function of the d-axis current Id, the q-axis current Iq, the d-axis inductance Ld, the q-axis inductance Lq, and the magnet magnetic flux T.

$$T = Id \cdot Iq \cdot (Ld - Lq) + \Psi \cdot Iq \qquad 1003$$

where the first term on the right side represents the reluctance torque, and the second term on the right side represents the magnet torque in Eq. 1003.

FIG. 163 demonstrates changes in reluctance torque, magnet torque, and a total torque thereof in a range of 90° to 180° in electrical angle of rotation of the rotor 1600 on the basis of the d-axis. The phase angle on the d-axis is 0°. In FIG. 163, the reluctance toque is indicated by broken lines. The magnet torque is indicated by chain lines. The total torque is indicated by solid lines. The thicker lines represent degrees of torque expressed by Eq. 1003 in the conventional structure.

The graph in FIG. 163 shows that the total torque, as indicated by the thick solid line, produced by the conventional structure is maximized near 130° in current phase, and that the total toque, as indicated by the thin solid line, produced in this embodiment has a peak offset to the q-axis current Iq (i.e., the second term on the second side of Eq. 1003). It is, therefore, possible to enhance the effectiveness of control of the rotating electrical machine 1500 by using the Iq component in a high-speed range where the field weakening control is especially required not to be executed or a range where a high degree of torque is instantaneously required to be produced because the viscosity of a bearing oil is high due to extremely low temperatures, such as −20° C. in the rotating electrical machine 1500, that is, a range where the Id component is low.

When the magnets (e.g., the magnets 1470) in this embodiment is used, the degree of torque outputted in a range where a current phase β that is a phase of a current vector that is the sum of the d-axis current vector and the q-axis current vector on a d-q coordinate system lies between 90° to 135° will be higher than that outputted when the current phase β is 135° (see FIG. 162). Generally, there is a problem that the power factor of the rotating electrical machine drive system is undesirably decreased by the impedance of an inductor mounted therein in a range higher than a current phase β of 90°. This results in an increase in load on the dc current supply 1950 arranged upstream in current flow from the inverter 1900 and the rotating electrical machine 1500. This embodiment is capable of selecting the current phase β to be lower than 135° to maximize the output torque and significantly increasing a range where it is possible to setting the current phase β closer to 90° than to 135°. It is, therefore, possible to decrease a current-carrying capacity which is upstream of the rotating electrical machine 1500 in the rotating electrical machine drive system and depends upon the power factor of a combination of the rotating electrical machine 1500 and the inverter 1900 when the output torque is maximized.

This embodiment mostly offers the beneficial advantages, but may have adverse effects of a drop in inductance on special applications, for instance, where a carrier frequency of 4 kHz is required to be used to control the rotating electrical machine 1500. For a case, the rotating electrical machine drive system is preferably engineered to drive the rotating electrical machine 1500 in an operation mode other than the PWM feedback mode.

Specifically, the controller 1930 may be, as illustrated in FIG. 161(*a*), engineered to include the first excitation controller 1930A and the second excitation controller 1930B. The first excitation controller 1930A uses the command voltage and the carrier wave produced for the inverter bridge 1910 to produce and output PWM signals to turn on or off the switches Sp and Sn to control an amount of current delivered to the stator winding 1720. The second excitation controller 1930B reads, from pattern information about relations between the electrical angles θ or rotation (or the electrical angular rates co) of the rotor 1600 and on-off schedules for the switches Sp and Sn, one of the on-off switching schedules which corresponds to a current electrical angle θ of rotation of the rotor 1600 and then turns on or off the switches Sp and Sn according to the read on-off switching schedule to control the amount of current delivered to the stator winding 1720.

Specifically, the controller 1930 stores the on-off switching schedules in a low-current range, thereby ensuring the stability in performing control using a current of several amperes far apart or quite different from a current value calculated according to the Ohm's law or control using a zero-ampere current. The controller 1930 in this embodiment is capable of switching between the above control modes as needed.

The second excitation controller 1930B working to turn on or off the switches Sp and Sn according to the on-off switching schedule to control the amount of current delivered to the stator winding 1720 may be engineered to control excitation of the stator winding 1720 in a mode of operation using a rectangular wave, as illustrated in FIGS. 173(*a*) to 173(*c*), such as a 120° rectangular wave excitation mode, a 150° rectangular wave excitation mode, or a 180° rectangular wave excitation mode.

The rotor 1600 in this embodiment uses the magnets uniquely magnetically oriented to improve the resistance to demagnetization of the rotor 1600 and is also engineered to control the density of magnetic flux on the surface of the rotor 1600 for enhancing the output torque. This feature will be described below in detail.

The following discussion will refer to the rotor 1600 which has, as an example, the structure illustrated in FIG. 165. The rotor 1600 in FIG. 165 has the rotor core 1610 in which the magnets 1450 described with reference to FIG. 152(*b*) are embedded. Instead of the magnets 1450, another type of magnets may be employed as long as they are magnetically oriented in the way described above. FIG. 164 represents the waveform of density of a surface magnetic flux generated by the magnets 1450 on the surface of the rotor 1600. A solid line indicates the waveform of magnetic flux produced by the magnets 1450. A broken line indicates the waveform of a primary magnetic flux (i.e., fundamental magnetic flux). A chain line indicates the waveform of a $3^{rd}$ magnetic flux (i.e., $3^{rd}$ harmonic magnetic flux).

Each of the magnets 1450 generates a magnetic flux whose waveform is equivalent to the sum of a primary waveform and a $3^{rd}$ waveform of the same pole on the d-axis as a magnetic flux (i.e., interlinkage magnetic flux) interlinking with the stator 1700 (i.e., an armature). For instance, the primary waveform and the $3^{rd}$ waveform both have the positive polarity on the d-axis that is 90° in electrical angle in FIG. 164. The waveform of the density of magnetic flux in the magnet 1450 corresponds to a resultant wave of the primary waveform and the $3^{rd}$ waveform which is 60° out of phase of the primary wave. In other words, the waveform of the density of magnetic flux in the magnet 1450 shows that the density of magnetic flux in the magnet 1450 on the d-axis is higher than the density of magnetic flux indicated by the primary waveform on the d-axis, as denoted by the broken line, and more concentrates on the d-axis than the density of magnetic flux indicated by the primary waveform does.

The above waveform of magnetic flux achieves an increase in torque produced by the rotating electrical machine 1500. This enables a larger degree of torque to be outputted than in use of typical polar anisotropy magnets which generate a sine wave or a Halbach magnet array designed to output an increased degree of torque. The rotating electrical machine 1500 is capable of selecting one of the 120° rectangular wave excitation mode, the 150° rectangular wave excitation mode, and the 180° rectangular wave excitation mode. In either mode, the rotating electrical machine 1500 is thought of as being controlled using electrical current containing a $3^{rd}$ harmonic current, but however, the use of the above structure of magnets ensures the stability in outputting a desired degree of torque.

The structure of the magnets 1450 required to produce the waveform of the density of surface magnetic flux demonstrated in FIG. 164 will be described below with reference to FIG. 165. Each of the magnets 1450 has directions of easy axes of magnetization aligned in an arc shape along the orientation circle 1336 illustrated in FIG. 165. The orientation circle 1336 is defined to have the center point which lies on the q-axis of the rotor 1600 and is located far away from the outer periphery (i.e., a stator-facing surface) of the rotor core 1610. The magnetic orientation of the magnet 1450 along the orientation circle 1336 will cause an easy axis of magnetization to have a larger radius of curvature in a region occupied by the magnet 1450 than that when the center point 1335 of the orientation circle 1336 is defined on or near the outer periphery of the rotor core 1610. This causes the magnet 1450 to be magnetically oriented to have the easy axis of magnetization which extends from the q-axis end (i.e., the second magnetic flux acting surface 1451c) of the magnet 1450 to the d-axis, that is, intersects at exactly or nearly right angles with the q-axis. The magnet 1450 generates magnetic fluxes which concentrate on the first magnetic flux acting surface 1451a and are located close to the d-axis.

The magnet 1450 has a distribution of magnetic flux, as illustrated in FIG. 164, which has the crest point located above a sine wave on the d-axis and also has shallow curves on opposite sides of the crest point where the position of the surface of the rotor 1600 is expressed in terms of angle on an abscissa axis. The frequency analysis of the above distribution of magnetic flux shows that there is a $3^{rd}$ harmonic wave of the fundamental wave.

The percentage of the $3^{rd}$ harmonic component may be controlled by altering the position of the center point 1335 of the orientation circle 1336. Specifically, the increase in the $3^{rd}$ harmonic component is achieved by defining the center point 1335 to be located far away from the surface of the rotor 1600.

The orientation circle 1336 may be defined to have the center point 1335 located out of the q-axis. In other words, the center point 1335 of the orientation circle 1336 may be located on the right or left side of the q-axis in FIG. 165. It is advisable that the magnet 1450 be magnetically oriented both along the orientation circle 1336 having the center point 1335 defined on the d-axis and along the orientation circle 1336 having the center point 1335 defined outside the d-axis. This achieves the magnetic orientation of the magnet 1450 having a magnetic flux containing components other than $3^{rd}$ harmonic component. The phase of the $3^{rd}$ harmonic wave is not necessarily 60°, but may be greater or smaller than 60°. Accordingly, the phase of the $3^{rd}$ harmonic wave may be in a range of 50° to 70°.

It is advisable that the magnet 1450 be designed to have magnetic flux acting surfaces concentrating in an angular range which passes through the d-axis that is the center of each magnetic pole in the rotor core 1610 and is 120° or less and 72° or more in electrical angle. The structure in which the magnetic flux acting surfaces of each of the magnets 1450 are arranged completely within each phase of the stator winding 1720 eliminates a risk of generation of undesirable harmonic waves as compared with the structure in which each phase winding of the stator winding 1720 is disposed within 120° in electrical angle which is commonly used in multi-phase motors. This enables a maximum value of magnetic flux density around the d-axis to be used to produce a desired degree of force according to Fleming's rules in a current control mode using the magnetic flux around the d-axis. The stator 1700 paired with the rotor 1600 is preferably designed to have a slot-less or core-less structure in which a difference in reluctance between itself and the rotor 1600 is small.

Sixteenth Embodiment

FIG. 166 illustrates the rotor 1600 according to this embodiment. The rotor core 1610 has formed therein the magnet housing hole 1611 which extends across the d-axis and is shaped to be asymmetric with respect to the d-axis. The magnet housing hole 1611 has a transverse sectional area which extends perpendicular to the axis of the rotor core 1610 and is of a rectangular convex shape bulging toward the stator 1700.

The magnet 1480 is mounted in the magnet housing hole 1611. The magnet 1480 is of a convex shape which bulges along the d-axis toward the outer periphery of the rotor core 1601 which faces the stator 1700 through an air gap. The magnet 1480 is oriented to have a distance between itself and the outer periphery of the rotor core 1610 in the radial direction of the rotor core 1610. The distance gradually increases from the d-axis to the q-axis to define the convex shape of the magnet 1480 which bulges toward the outer periphery of the rotor core 1610 on the d-axis. In other words, the magnet 1480 is shaped to have a first portion which is located on the d-axis closest to the stator winding and second portions each of which extends from the first portion toward the q-axis to have a distance between itself and the stator winding which increases toward the q-axis. To say it in a different way, the magnet 1480 is of an inverted U-shape in transverse section and has a radially outer peripheral surface and a radially inner peripheral surface each of which is shaped to have a distance between itself and the outer periphery of the rotor core 1610 which gradually increases from the d-axis toward the q-axes. The magnet 1480 may alternatively be shaped to have an inverted V-shape in transverse section.

The directions of magnetic orientation in the magnet 1480 are selected to extend toward the top of a portion of the magnet 1480 on the d-axis so that magnetic fluxes flow from radially inside the rotor core 1610 and concentrate on the top of the portion of the magnet 1480. The direction of magnetic orientation in the magnet 1480 is of an arc-shape substantially along the length of the magnet 1480. The magnet 1480 has a dimension in a direction facing the stator 1700, i.e., a maximum dimension La in the radial direction of the rotor core 1610. The magnet 1480 has a magnetic path which is longer than the maximum dimension La. This enhances the magnet magnetic flux around the d-axis.

The magnet 1480 has the ends 1481 of a length thereof and the crest or top 1482 that is the center of the length of the magnet 1480. The ends 1481 and the top 1482 have magnetic flux acting surfaces through which the magnetic fluxes pass. In other words, the magnet 1480 has a first outer surface (i.e., the top 1482) which is located closest to the stator winding and second outer surfaces (i.e., the ends 1481) which are located farthest from the stator winding. The first and second outer surfaces serve as magnetic flux acting surfaces into or from which the magnetic fluxes are inputted or outputted. It is advisable that the direction of magnetic orientation be exactly or nearly parallel to the d-axis around the d-axis (i.e., the top 1482). This results in the permeance having a high value in the central portion of the magnet 1480. The magnet 1480 has magnet magnetic paths elongated in a lengthwise direction thereof, thereby enhancing the resistance thereof to demagnetization.

The rotor core 1610 illustrated in FIG. 166 has void spaces 1631 and 1632 between the inner surface of the magnet housing hole 1611 and the outer peripheral surface of the magnet 1480 and between the inner surface of the magnet housing hole 1611 and the inner peripheral surface of the magnet 1480. The void spaces 1631 and 1632 serve as flux barriers. The void spaces 1631 and 1632 may alternatively be filled with non-magnetic material. In other words, the magnet 1480 has the inner peripheral surface and the outer peripheral surface excluding the top 1482 which serve as magnetic flux non-acting surfaces through which no magnetic flux passes. The void spaces 1631 and 1632 (i.e., the flux barriers) are located adjacent the magnetic flux non-acting surfaces.

In the structure illustrated in FIG. 166, a length of a stator-facing peripheral surface of the magnet 1480 for each magnetic pole corresponds to the dimension Wm of a portion of the magnet unit which creates one magnetic pole in the circumferential direction. Note that the dimension Wm excludes portions of the stator-facing peripheral surface of the magnet 1480 which are exposed to the non-magnetic portions (i.e., the flux barriers 1631 and 1632).

The magnet 1480 has created therein the magnet magnetic paths which have an increased length in a region located radially inside the rotor core 1610. The magnet 1480 is mounted or occupies a largest possible region in the rotor core 1610. The rotor core 1610 has portions 1633 which are located close to the q-axes and have a high risk that they may be demagnetized. The magnet 1480 is, however, located away from the portions 1633 to desirably define the magnet magnetic paths, thereby enhancing the resistance thereof to demagnetization.

The magnet 1480 is shaped to have a radially inner recess formed in the inner periphery thereof, in other words, geometrically oriented to have an arc-shape or inverted U-shape in transverse section thereof, thereby enabling the volume of the magnet 1480 to be reduced as compared with a dome-shaped magnet having no radially inner recess. This achieves a high degree of permeance of the magnet 1480.

The magnet 1480 is of a semi-elliptical shape with first outer and inner diameters along the d-axis and second outer and inner diameters along a minor axis perpendicular to the d-axis which are smaller than the first outer and inner diameters, but however, may alternatively be of a semi-elliptical shape with the first outer and inner diameters smaller than the second outer and inner diameters. The magnet 1480 may also be of a semi-circular shape with the first outer and inner diameters identical with the second outer and inner diameters.

FIGS. 167(a) and 167(b) illustrate the magnets 1480A and 1480B which are modifications of the magnet 1480 and are different in the second outer diameter from each other. In other words, the magnets 1480A and 1480B have the same length of semi-major axes and different lengths of semi-minor axes. In FIGS. 167(a) to 167(c), the d-axis lies on the center of the length of each of the magnets 1480A to 1480C and extends perpendicular to the lateral direction in the drawing. The magnet 1480B has the short diameter t2 (i.e., the length of the semi-minor axes) which is smaller than the short diameter t1 of the magnet 1480A. A ratio of a first length of the semi-major axis of the magnet 1480B along the d-axis to a second length of the semi-minor axis of the magnet 1480B in a direction perpendicular to the d-axis is greater than that of the magnet 1480A. Accordingly, an inclination of the magnet 1480B relative to the d-axis is greater than that of the magnet 1480A.

The magnet 1480C in FIG. 167(c) is made in the form of a magnet assembly including a plurality of magnets 1484a, 1484b, and 1484c whose directions of magnetic orientation are straight. The magnet assembly 1480C is made of a magnetic unit including the magnets 1484a, 1484b, and 1484c and similar in configuration to the magnet 1480 illustrated in FIG. 166. Specifically, the magnet assembly 1480C extends across the d-axis and includes the center magnet 1484a extending perpendicular to the d-axis and the two outside magnets 1483b and 1484c joined to ends of the length of the center magnet 1484a. Each of the outside magnets 1484b and 1484c is oblique to the d-axis and attached at a first end thereof to a corresponding one of the ends of the center magnet 1484a to have a joint between the first end and the center magnet 1484a which is located closer to the d-axis than a second end opposed to the first end is.

To say it in a different way, the center magnet 1484a and the outside magnets 1484b and 1484c are arranged in a convex shape as a whole which bulges toward the stator 1700 (i.e., an armature).

The direction of magnetic orientation of the center magnet 1484a is perpendicular to the length of the center magnet 1484a, i.e., parallel to the d-axis. The directions of magnetic orientation of the outside magnets 1484b and 1484c are identical with lengthwise directions of the outside magnets 1484b and 1484c and oblique to the d-axis. The center magnet 1484a has opposed major surfaces serving as magnetic flux acting surfaces, while each of the outside magnets 1484b and 1484c has opposed end surfaces serving as magnetic flux acting surfaces.

The center magnet 1484a (which will also be referred to as a first magnet) of the magnet assembly 1480C is located closer to the stator winding than the outside magnets 1484b and 1484c (which will also be referred to as second magnets) are. The center magnet 1484a extends to intersect at right angles with the d-axis. The outside magnets 1484b and 1484c extend from the center magnet 1484a toward the q-axis and also away from the stator winding. Each of the outside magnets 1484b and 1484c has the end surface 1485a which is located closest to the stator wining and the end surface 1485b which is located farther away from the stator winding. The end surfaces 1485a and 1485b serve as magnetic flux acting surfaces into or from which the magnetic flux is inputted or outputted.

The magnet assembly 1480C is, like in the above structures, capable of enhancing the density of magnetic flux around the d-axis to increase the permeance thereof.

Seventeenth Embodiment

FIG. 168 illustrates the rotor 1600 according to this embodiment. The rotor core 1610 has formed therein the magnet housing holes 1641 each of which is located between a respective adjacent two of the d-axes (i.e., the center of each magnetic pole). Each of the magnet housing holes 1641 has a transverse cross section which extends perpendicular to the axis of the rotor core 1610 and is curved in an arc-shape bulging radially toward the center of the rotor core 1610. There are as many magnet housing holes 1641 as the number of magnetic poles. In this embodiment, the rotor core 1610 has eight magnet housing holes 1641 each of which has ends located close to the d-axes. A respective adjacent two of the magnet housing holes 1641 are disposed to face each other through the d-axis core portion 1642 of the rotor core 1610.

Each of the magnet housing holes 1641 has mounted therein the magnet 1490 whose configuration is identical with that of the magnet housing hole 1641. Each of the magnets 1490 is, like the magnet housing holes 1641, curved in a convex or arc-shape bulging radially inwardly to the center of the rotor core 1610. Each the magnets 1490 is located closest to the outer periphery of the rotor core 1610 near the d-axes and farther away from the outer periphery of the rotor core 1610 near the q-axis. In other words, each of the magnets 1490 is of an arc-shape which is symmetrical with respect to the q-axis and bulges away from the stator winding, in other words, toward the center of the rotor core 1610. Each of the magnets 1490 has the ends located near the d-axes. The rotor 1600 has the magnet housing holes 1641 arranged one between the d-axes located adjacent each other in the circumferential direction of the rotor 1600 and also has the magnets 1490 arranged one between the d-axes located adjacent each other in the circumferential direction.

The direction of magnetic orientation of each of the magnets 1490 is of an arc-shape extending along the length of the magnet 1490. Each of the magnets 1490 has end surfaces 1491 of the length thereof which serve as magnetic flux acting surfaces into or from which the magnetic flux is inputted or outputted. In other words, each of the magnets 1490 has the end surfaces near the d-axes which serve as the magnetic flux acting surfaces. Each of the magnets 1490 has a magnet magnetic path whose length is substantially identical with the arc-shaped length of the magnet 1490. Each of the magnets 1490 is designed to have a feature in which the ends of the magnet 1490 lie on the d-axes, and the direction of magnetic orientation faces the ends of the magnets 1490. Each of the magnets 1490 has the magnet magnetic path whose length is longer than a maximum radial distance Lb between the magnet 1490 and the stator 1700 in a direction in which the magnet 1490 faces the stator 1700, that is, the radial direction of the rotor core 1610, thereby enhancing the density of magnetic flux around the d-axes. The magnet magnetic path is shaped to extend the length of the magnet 1490, thereby improving the resistance to demagnetization thereof. The structure in FIG. 168 has rotor characteristics similar to those of a surface-magnet type of rotor.

The rotor core 1610 also has the non-magnetic portion 1643 which is located radially outside each of the magnet housing holes 1641 (i.e., the magnets 1490). The non-magnetic portion 1643 is defined by a void space or filled with non-magnetic material and works as a flux barrier. In other words, the outer peripheral surface of each of the magnets 1490 serves as a magnetic flux non-acting surface into or from which no magnetic flux is inputted or outputted. The non-magnetic portion 1643 is arranged adjacent the magnetic flux non-acting surface. The rotor core 1610 has the bridge 1644 disposed between each of the magnet housing holes 1641 and an adjacent one of the non-magnetic portions 1643 to isolate therebetween.

The above structure of the rotor 1600 magnetically orients the magnets 1490 substantially along the d-axes, thereby enabling a pole-pitch arc and the length of each of the magnet magnetic paths to be substantially identical in dimension with each other. This greatly enhances the resistance of the magnets 1490 to demagnetization thereof. In the structure illustrated in FIG. 168, a length of a stator-facing peripheral surface of each of the magnets 1490 for each magnetic pole corresponds to the dimension Wm of a portion of the magnet unit which creates one magnetic pole in the circumferential direction.

Other Embodiments

This disclosure is not limited to the above embodiments, but however, the embodiments may be altered in various ways without departing from the concept of the present disclosure.

The rotor 1600 of the rotating electrical machine 1500 may alternatively be designed to have following structure. The rotor core 1610 illustrated in FIG. 169 has n layers (i.e., A-layer, B-layer, C-layer, . . . , $n^{th}$-layer) defined to be at different distances from the center point defined on the d-axis. The n layers are preferably arranged to be coaxial with each other. A permanent magnet(s) is disposed in each of the n layers. The permanent magnets in the n layers may be of the same shape, have the same or different properties, or have a combination thereof.

FIG. 170 illustrates an example of the above structure of the rotor 1600. The rotor core 1610 in FIG. 170 has mounted therein the magnet 1430 illustrated in FIG. 150 and the magnets 1440 illustrated in FIG. 152(a). Specifically, the magnet 1430 is arranged in the A-layer of the rotor core 1610. The magnets 1440 are arranged to occupy or extend from the B-layer to the C-layer. The magnet 1430 in the A-layer serves to reduce the demagnetization around ends thereof. The magnets 1440 in the B- and C-layers serve to reduce the demagnetization around outer most peripheries thereof. A combination of the magnets 1430 and 1440 may be changed in the n layers as needed.

In the structure illustrated in FIG. 170, a total length (Wm1+Wm2) of stator-facing peripheral surfaces of the magnets 1440 for each magnetic pole corresponds to the dimension Wm of a portion of the magnet unit which creates one magnetic pole in the circumferential direction The above described structure used in the orientation process may be modified in the following way illustrated in FIGS. 171(*a*) and 171(*b*). FIG. 171(*a*) schematically illustrates the structure of the magnetic orientation device 1360 used in the orientation process (i.e., in-field magnet production). FIG. 171(*b*) illustrates a plurality of magnets MG produced in the orientation process.

The magnetic orientation device 1360 is equipped with the magnetic field generator 1361 whose size is large enough to have the die 1280 disposed therein. The magnetic field generator 1361 includes the coil 1361*a* which, when electrically excited, generates therein an orientation field oriented in a selected direction. The die 1280 is disposed inside the coil 130*a* to have a normal line N which extends at right angles to a selected one of surfaces of each of the magnets MG and is oriented in parallel to the axis of the coil 1361*a*. When energized, the magnetic field generator 1361 (the coil 1361*a*) generates and applies the orientation field 1362 to the die 1280 to magnetically orient magnet-powder compacts placed in the die 1280. This manufactures the magnets MG with a high orientation ratio.

The magnetic field generator 1361 works to produce a powerful magnetic field using the coil 1361*a*, so that the orientation ratio of the magnets MG will be 90% or more. Each of the magnets MG may be used as a magnetic block whose size is large enough to be divided into a plurality of magnets. The magnetic block is magnetically oriented in the orientation process and then cut into a plurality of magnets of a required size. In the orientation process, the die 1280 is disposed inside the magnetic field generator 1361 to have the normal line N oriented in parallel to a selected one of the surfaces of each of the magnets MG in the axial direction of the coil 1361*a*. The surfaces of each of the magnets MG are preferably cut out to finish magnetic flux acting surfaces required to be oriented at a desired angle to the direction of magnetic orientation. This enables permanent magnets to be made which have the magnetic orientation directed at required angles to the magnetic flux acting surfaces thereof. In FIG. 171(*b*), oblique solid lines indicate a direction in which the magnets MG are magnetically oriented. The above orientation process achieves the formation of, for example, the magnets 1400 to have an increased orientation ratio.

In the structure illustrated in FIG. 171(*a*), the die 1280 is, as described above, placed to have the normal line N of each of the magnets MG to be parallel to the axis of the coil 1361*a* of the magnetic field generator 1361, thereby enabling the magnetic field generator 1361 to be reduced in size thereof.

FIG. 172 shows a rotating electrical machine drive system in another embodiment. The rotating electrical machine drive system is designed to have a voltage converter device disposed between the dc current supply 1950 and the inverter bridge 1910 to control voltage input into the inverter bridge 1910. The controller 1930 is also designed to control current supplied to each phase winding of a stator winding in a rectangular wave voltage control mode. The voltage converter device includes the voltage converter 1960, the switching device 1964, and the voltage controller 1963. The switching device 1964 is disposed in a voltage input line leading to the voltage converter 1960. The voltage controller 1963 controls an on/off operation of the switching device 1964.

The voltage converter 1960 includes the primary coil 1961 and the secondary coil 1962. The secondary coil 1962 is larger in number of turns than the primary coil 1961. The number of turns of the secondary coil 1962 may be larger than or equal to that of the primary coil 1961 because they are engineered not to step-up the voltage in this embodiment. The magnetic flux, as created by the primary coil 1961, interlinks with the secondary coil 1962, thereby delivering the voltage developed at the dc current supply 1950 to the inverter bridge 1910 through the secondary coil 1962. The inductance of the voltage converter 1960 is selected to be higher than or equal to a level which minimizes a voltage variation arising from on-off operations of the switching device 1964 disposed between the voltage converter 1960 and the dc current supply 1950. This ensures the stability of operation of the primary coil 1961 to output a magnetic flux which causes the secondary coil 1962 to create a secondary voltage (i.e., dc voltage). The inverter bridge 1910 is, therefore, operated on a variable voltage produced by the switching device 1964 and the primary coil 1961.

The voltage controller 1963 measures, for example, phase currents flowing in the stator winding 1720 and produces and outputs a switching signal in the form of a duty pulse as a function of the measured phase currents to control the on/off operation of the switching device 1964. This variably controls the voltage inputted to the inverter bridge 1910. In this way, the amplitude of voltage for each pulse is reduced to be lower than when a high voltage is delivered at a carrier frequency to the inverter bridge 1910, which minimizes iron losses due to a voltage variation.

A decrease in inductance of the voltage converter 1960 leads to a risk that when the energization of the rotating electrical machine 1500 is controlled using a given carrier frequency, it may result in control divergence. In contrast, the rotating electrical machine drive system in this embodiment works to control the voltage between the dc current supply 1950 and the inverter bridge 1910 before it is inputted to the inverter bridge 1910, thereby minimizing a variation in the voltage and eliminating the risk of control divergence.

The controller 1930 operates in a rectangular wave voltage control mode, such as a 120° rectangular wave voltage control mode. The rectangular wave used in excitation control executed by the controller 1930 to excite the stator winding of the electrical rotating machine 1500 may alternatively have a width in a range of 120° to 180°.

In this embodiment, the voltage inputted to the inverter bridge 1910 is variable. Each of the switches Sp and Sn is turned on or off in response to a rectangular wave switching signal produced as a function of an output from the above described resolver asynchronously with the carrier frequency. When operating in the 120° rectangular wave voltage control mode, as demonstrated in FIGS. 173(*a*) to 173(*c*), the controller 1930 turns on the switches Sp and Sn for each phase cyclically using a rectangular wave pulse which has on-durations set at an interval of 120° in an electrical angle away from each other and then turns off them cyclically for an off-duration of 60° in electrical angle. This causes a total of twelve on and off operations (i.e., four on and off operations for each phase) to be performed on the switches Sp and Sn for a period of time in which voltage is outputted for all the U-phase, V-phase, and W-phase windings of the stator winding 1720 in each electrical angle cycle. This results in a great decrease in switching frequency in the inverter bridge 910 as compared with a typical carrier frequency commonly used in a range of several kHz or more, thereby significantly reducing switching losses in the rotating electrical machine drive system. Although the stator winding 1720 has a decreased inductance, a risk of occurrence of current ripples is minimized. As apparent from the above discussion, in the 150° rectangular wave excitation mode, the on-durations occupy 150° in electrical angle. In the 180° rectangular wave excitation mode, the on-durations occupy 180° in electrical angle.

In the rotating electrical machine 1500 in this embodiment, each of the magnets 1420 is, as illustrated in FIG. 149, designed to have the magnetic orientation, i.e., the direction that the magnetic field flows which extends from the q-axis toward the d-axis, thus resulting in an increase in density of magnetic flux directed toward the center of each magnetic pole (i.e., the d-axis). The 120° rectangular wave excitation mode, not the 180° rectangular wave excitation mode is, therefore, suitable for the rotating electrical machine 1500.

The rotating electrical machine drive system, as referred to in FIG. 172, may be employed for the rotating electrical machine 1001 described in the third to seventh embodiments illustrated in FIGS. 89 to 132.

The rotating electrical machine drive system in FIG. 172 may also be used with outer-rotor surface-magnet rotating electrical machines. FIGS. 179(*a*) and 179(*b*) illustrate structures of the surface-magnet rotor 2010. The rotor 2010 may be employed in the rotating electrical machine 1001 illustrated in FIGS. 89 and 90.

The rotor 2010, as can be seen in FIG. 179(*a*), includes the rotor core 2011 and the magnet 2012 attached to an outer peripheral surface (i.e., a stator winding-facing surface) of the rotor core 2011. The magnet 2012 has opposed magnetic flux acting surfaces 2012*a* and 2012*b* into or from which the magnetic flux is inputted for outputted. The magnet 2012 also has magnet magnetic paths each of which has a length longer than a thickness of the magnet 2012 between the magnetic flux acting surfaces 2012*a* and 2012*b*. The magnet 2012 is magnetically oriented to have easy axes of magnetization which extend along the magnet magnetic paths. In the structure illustrated in FIG. 179, a length of the magnetic flux acting surface 2012*a* of the magnet 2012 for each magnetic pole corresponds to the dimension Wm of a portion of the magnet unit which creates one magnetic pole in the circumferential direction.

The rotor 2010 illustrated in FIG. 179(*b*) includes the rotor core 2011 which has formed in an outer periphery thereof the recess 2013 in which the magnet 2012 is partly embedded. FIG. 180 shows the magnets 2012 each of which is firmly disposed in the rotor core 2011 and has magnet magnetic paths whose orientations are asymmetric with respect to the d-axis. In other words, each of the magnets 2012 is made up of two portions: a right portion and a left portion which are arranged on opposite side of the d-axis for each magnetic pole. The right and left portions have the magnet magnetic paths which are oblique at the same angle to the d-axis. In the structure illustrated in FIG. 180, a length of a stator-facing surface of the magnet 2012 for each magnetic pole corresponds to the dimension Wm of a portion of the magnet unit which creates one magnetic pole in the circumferential direction.

In each of the above embodiments, paired surfaces of each magnet which are opposed to and extend parallel to each other are referred to as the magnetic flux acting surfaces (i.e., the first magnetic flux acting surfaces), but however, paired surfaces of each magnet which are opposed to and extend non-parallel to each other may be designed as the magnetic flux acting surfaces. In this case, the magnet magnetic path may be oriented to intersect at an angle of other than 90° with one of the magnetic flux acting surfaces and also intersect at right angles with the other magnetic flux acting surface.

Each of the above described rotating electrical machines is of a revolving-field type, but however, may be designed to be of a revolving armature type. This type of rotating electrical machine includes a rotor working as an armature secured to a rotation shaft and a stator serving as a magnetic field-producing unit arranged radially outside the rotor. The rotor includes a rotor core and a multi-phase armature winding secured to an outer peripheral portion of the rotor core. The stator includes a stator core and magnets mounted in the stator core.

The present disclosure may be applied to a rotating electrical machine used electively in a generator mode or an electrical motor mode.

The present disclosure may also be applied to an electrical motor or an electromagnetic machine instead of a rotating electrical machine. For instance, this disclosure may be applied to linear motors working to linearly move a movable object. In other words, the rotating electrical machine, as referred to this disclosure, may be designed as an electrical motor or an electromagnetic machine which is equipped with magnets which face a winding and are movable relative to the winding upon excitation of the winding. The magnets have magnetic polarities located alternately in a direction in which they are movable relative to the winding.

This disclosure in this application is not limited to the above described embodiments. This disclosure includes the above embodiments and modifications which may be made by those of ordinally skill in the art. For instance, this disclosure is not limited to parts or combinations of the parts referred to in the embodiments, but may be realized using various combinations of the parts. This disclosure may include additional possible arrangements or omissions of the parts in the embodiments. This disclosure may include exchanges of the parts among the embodiments or combinations of the parts in the embodiments. Disclosed technical scopes are not limited to statements in the embodiments. It should be appreciated that the disclosed technical scopes include elements specified in the appended claims, equivalents of the elements, or all possible modifications of the elements without departing from the principle of this disclosure.

While the present disclosure has been described in terms of embodiments it should be appreciated that the present disclosure is not limited to the embodiments or structures. Therefore, the disclosure should be understood to include all possible embodiments and modifications to the shown embodiments which can be embodied without departing from the principle of the disclosure.

What is claimed is:

1. A rotating electrical machine comprising:
   a magnetic field-producing unit which includes a magnet unit, the magnet unit being equipped with a plurality of magnetic poles arranged to have magnetic polarities located alternately in a circumferential direction of the magnetic field-producing unit;
   an armature which is equipped with a multi-phase winding; and a rotor which is implemented by one of the magnetic field-producing unit and the armature, wherein the magnet unit includes a plurality of magnets which are arranged in the circumferential direction, the magnet unit being magnetically oriented to have an easy axis of magnetization in a region which is located near a d-axis that is defined on a center of the magnetic pole to be more parallel to the d-axis than an easy axis of magnetization in a region located near a q-axis that is defined on a boundary between the magnetic poles, the armature winding includes conductive members which face the magnetic field-producing unit and are arranged at a given interval away from each other in the circumferential direction, the armature includes inter-conductor members each of which is disposed between a respective adjacent two of the conductive members in the circumferential direction, defining a total width of the inter-conductor members arranged within one of the magnetic poles in the circumferential direction as Wt, a saturation magnetic flux density of the inter-conductor members as Bs, a dimension of a portion of the magnet unit equivalent to one of the magnetic poles in the circumferential direction of the magnet unit as Wm, and a remnant flux density in the magnet unit as Br, the inter-conductor members are made of material meeting a relation of $Wt \times Bs \leq Wm \times Br$ or are non-magnetic material, and each of the magnets has an end surface which faces in the circumferential direction and is placed in direct contact with an end surface of a circumferentially adjacent one of the magnets.

* * * * *